US005522069A

United States Patent [19]

Bertone et al.

[11] Patent Number: 5,522,069

[45] Date of Patent: May 28, 1996

[54] SYMMETRIC MULTIPROCESSING SYSTEM WITH UNIFIED ENVIRONMENT AND DISTRIBUTED SYSTEM FUNCTIONS

[75] Inventors: James F. Bertone, Quincy; Bruno DiPlacido, Jr., Dedham; Thomas F. Joyce, Westford; Martin Massucci, Burlington; Lance J. McNally, Townsend, all of Mass.; Thomas L. Murray, Jr., Hollis, N.H.; Chester M. Nibby, Jr., Beverly, Mass.; Michelle A. Pence, Chelmsford, Mass.; Marc Sanfacon, North Chelmsford, Mass.; Jian-Kuo Shen, Belmont, Mass.; Jeffrey S. Somers, Lowell, Mass.; G. Lewis Steiner, Milford, Mass.; William S. Wu, Cupertino, Calif.; Norman J. Rasmussen, Hillsboro, Oreg.; Suresh K. Marisetty, San Jose; Puthiya K. Nizar, El Darado Hills, both of Calif.

[73] Assignee: Zenith Data Systems Corporation, Buffalo Grove, Ill.

[21] Appl. No.: 258,750

[22] Filed: Jun. 10, 1994

Related U.S. Application Data

[63] Continuation of Ser. No. 56,708, Apr. 30, 1993, abandoned.

[51] Int. Cl.[6] ...................................................... G06F 13/00

[52] U.S. Cl. .......................... 395/650; 395/294; 395/302; 364/238.4; 364/239.0; 364/244.3; 364/264; 364/DIG. 1

[58] Field of Search .................................... 395/650, 700, 395/294, 302

[56] References Cited

U.S. PATENT DOCUMENTS

| | | | |
|---|---|---|---|
| 3,796,996 | 3/1974 | Curley et al. | 340/172.5 |
| 3,993,981 | 11/1976 | Cassarino, Jr. et al. | 340/172.5 |
| 3,997,896 | 12/1976 | Cassarino, Jr. et al. | 340/172.5 |
| 4,000,485 | 12/1976 | Barlow et al. | 340/172.5 |
| 4,001,790 | 1/1977 | Barlow | 340/172.5 |
| 4,025,906 | 5/1977 | Riikonen | 340/172.5 |
| 4,030,075 | 6/1977 | Barlow | 340/172.5 |
| 4,361,869 | 11/1982 | Johnson et al. | 364/200 |
| 4,724,519 | 2/1988 | Barlow et al. | 364/200 |
| 4,763,243 | 8/1988 | Barlow et al. | 364/200 |
| 4,764,862 | 8/1988 | Barlow et al. | 364/200 |
| 4,835,674 | 5/1989 | Collins et al. | 364/200 |
| 4,992,930 | 2/1991 | Gilfeather et al. | 364/200 |
| 5,150,466 | 9/1992 | Barlow et al. | 395/325 |
| 5,241,629 | 8/1993 | Barlow et al. | 395/325 |
| 5,243,702 | 9/1993 | Barlow et al. | 395/325 |

OTHER PUBLICATIONS

William J. Dally, "Parallel Processing: Architecture and Directions," (IEEE Computer Society Press, 1989).

"Z-1000 High-Performance Multiuser Computer System—Circuits Analysis Manual" (Zenith Data Systems, 1989).

*Primary Examiner*—Kevin A. Kriess
*Assistant Examiner*—John Q. Chavis
*Attorney, Agent, or Firm*—Fitch, Even, Tabin & Flannery

[57] ABSTRACT

A symmetric multiprocessing system with a unified environment and distributed system functions provides unified address space for all functional units in the system while distributing the execution of various system functions over the functional units of the system whereby each functional unit assumes responsibility for its own aspects of these operations. In addition, the system provides improved system bus operation for transfer of data from memory.

1 Claim, 25 Drawing Sheets

MDP BLOCK DIAGRAM

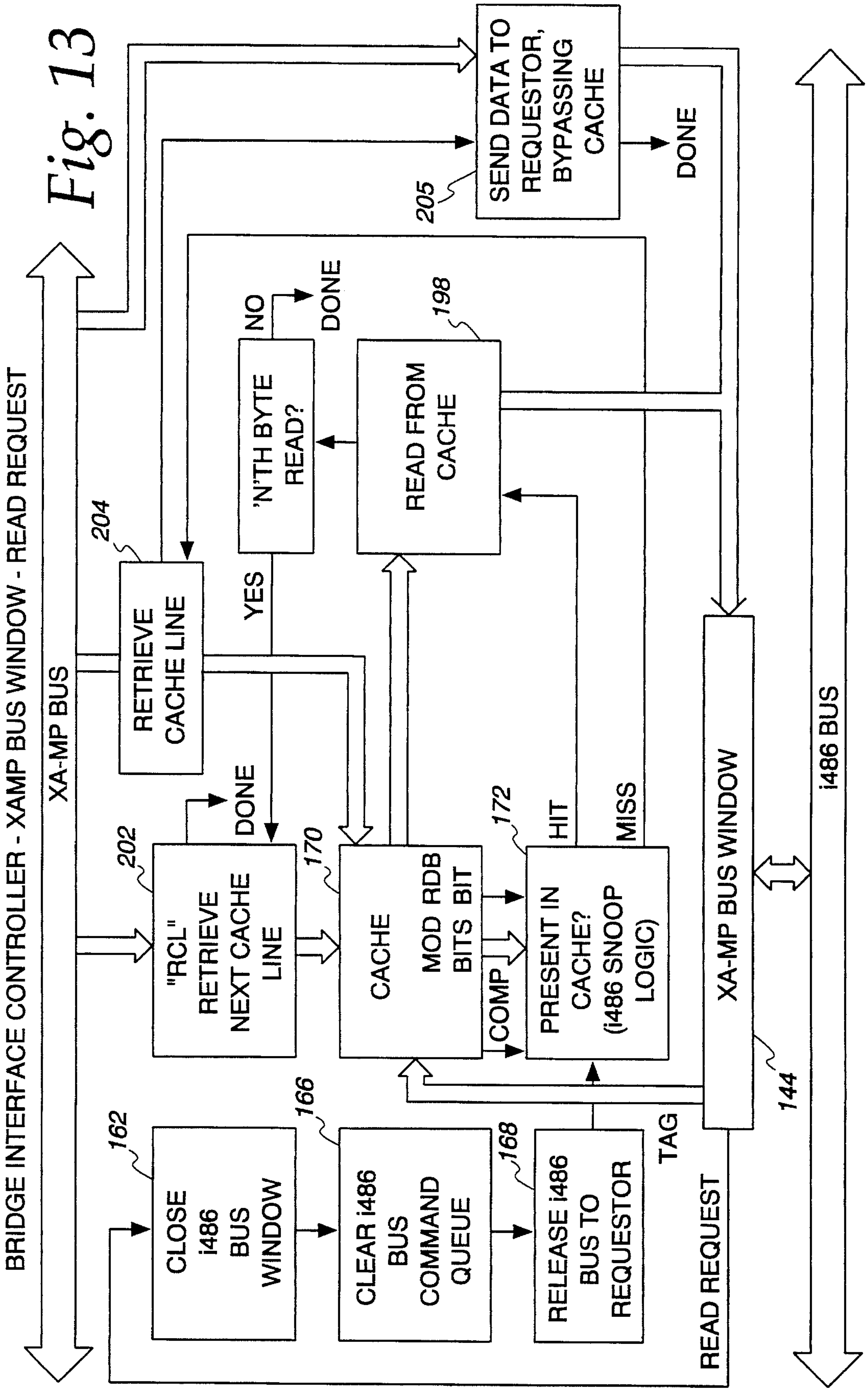
Fig. 13
BRIDGE INTERFACE CONTROLLER - XAMP BUS WINDOW - READ REQUEST
XA-MP BUS
CLOSE i486 BUS WINDOW
162
CLEAR i486 BUS COMMAND QUEUE
166
RELEASE i486 BUS TO REQUESTOR
168
TAG
READ REQUEST
"RCL" RETRIEVE NEXT CACHE LINE
202
DONE
CACHE
MOD RDB BITS BIT
COMP
170
PRESENT IN CACHE? (i486 SNOOP LOGIC)
172
HIT
MISS
XA-MP BUS WINDOW
144
i486 BUS
RETRIEVE CACHE LINE
204
YES
'N'TH BYTE READ?
NO
DONE
READ FROM CACHE
198
SEND DATA TO REQUESTOR, BYPASSING CACHE
205
DONE

20/25

SYMMETRIC MULTIPROCESSING SYSTEM WITH UNIFIED ENVIRONMENT AND DISTRIBUTED SYSTEM FUNCTIONS

CROSS REFERENCE TO RELATED APPLICATIONS

This application is a continuation of patent application Ser. No. 08/056,708, filed on Apr. 30, 1993, now abandoned. This application is also related to international application No. PCT/US94/04836, filed on Apr. 28, 1994.

BACKGROUND OF THE INVENTION

1. Field of the Invention

The present invention relaxes to an improved data processing system and, in particular, to a symmetric data processing system with unified process environment and distributed system functions.

2. Discussion of the Prior Art

A recurring problem in symmetric multiprocessing systems of the prior art, that is, in systems having a plurality of processes wherein any or a plurality of multi-threaded processes may be executed concurrently or in any sequence on any of a plurality of processors, is in providing an environment which is unified from the viewpoint of the processes executing therein but wherein the system functions, such as memory space management, bus access, and data management, are not concentrated in a single processor. Such concentration of system functions, usually resulting from an attempt to present a unified processing environment, presents fundamental limitations in the capabilities of the centralized facility for performing such functions have an upper limit. The use of centralized system functions frequently results in a non-unified environment in that a centralized system cannot handle or even be aware of the requirements of each functional unit in the system.

SUMMARY OF THE INVENTION

The system of the present invention provides a solution to these and other problems of the prior art by providing a system having a unified address space for all functional units in the system while distributing the execution of such system functions as management of address space, management of data and encached data, and arbitration of system bus access over the functional units of the system whereby each functional unit assumes responsibility for its own aspects of these operations.

The system of the present invention further provides an improved system bus operation for transfer or data from memory, memory having adaptive timing dependent upon such factors as the specific memory circuits and bus transfer rates, an improved input/output structure with caching or I/O operations, and an improved means for tracking data status.

Other features, objects and advantages of the present invention will be understood by those or ordinary skill in the art after reading the following descriptions of the present invention, and after examining the drawings, wherein:

BRIEF DESCRIPTION OF THE DRAWINGS

FIG. 13 is a block diagram of a bridge interface controller for a read request;

DESCRIPTION OF A PREFERRED EMBODIMENT

A. Introduction

The following will present a detailed description of a system implementing a presently preferred embodiment of the present invention, starting with a brief summary overview of the system and progressing to detailed descriptions of each of the major functional units of the system. Each description of a major functional unit of the system will, in turn, begin with a block diagram level description of the functional unit, including descriptions of the interstructural and interoperational relationships of the functional unit with other functional units of the system. The block diagram level discussion of a functional unit will be followed by further discussions of certain selected functions and operations of the functional unit.

Each description will be accompanied by drawings to illustrate the corresponding portion of the description, but it should be noted that each drawing will focus particularly on the corresponding description and a given drawing may not show all elements of the functional unit, although all significant elements of each functional unit will be illustrated in a drawing related to the description of the functional unit.

1. Description of a System 10

Figure 1A:
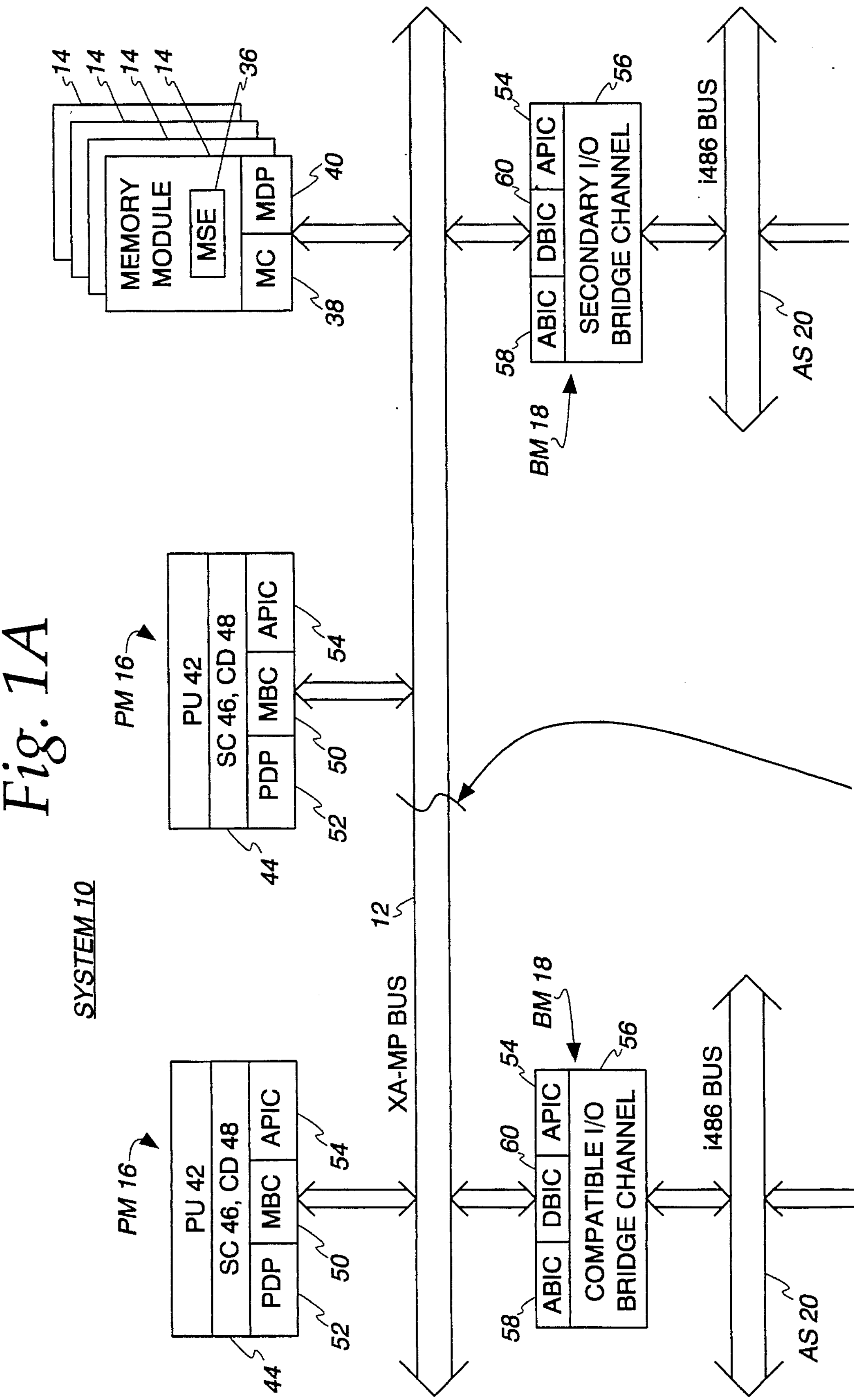
FIGS. 1A and 1B represent a block diagram of a system incorporating the present invention.
Figures 1, 1B:
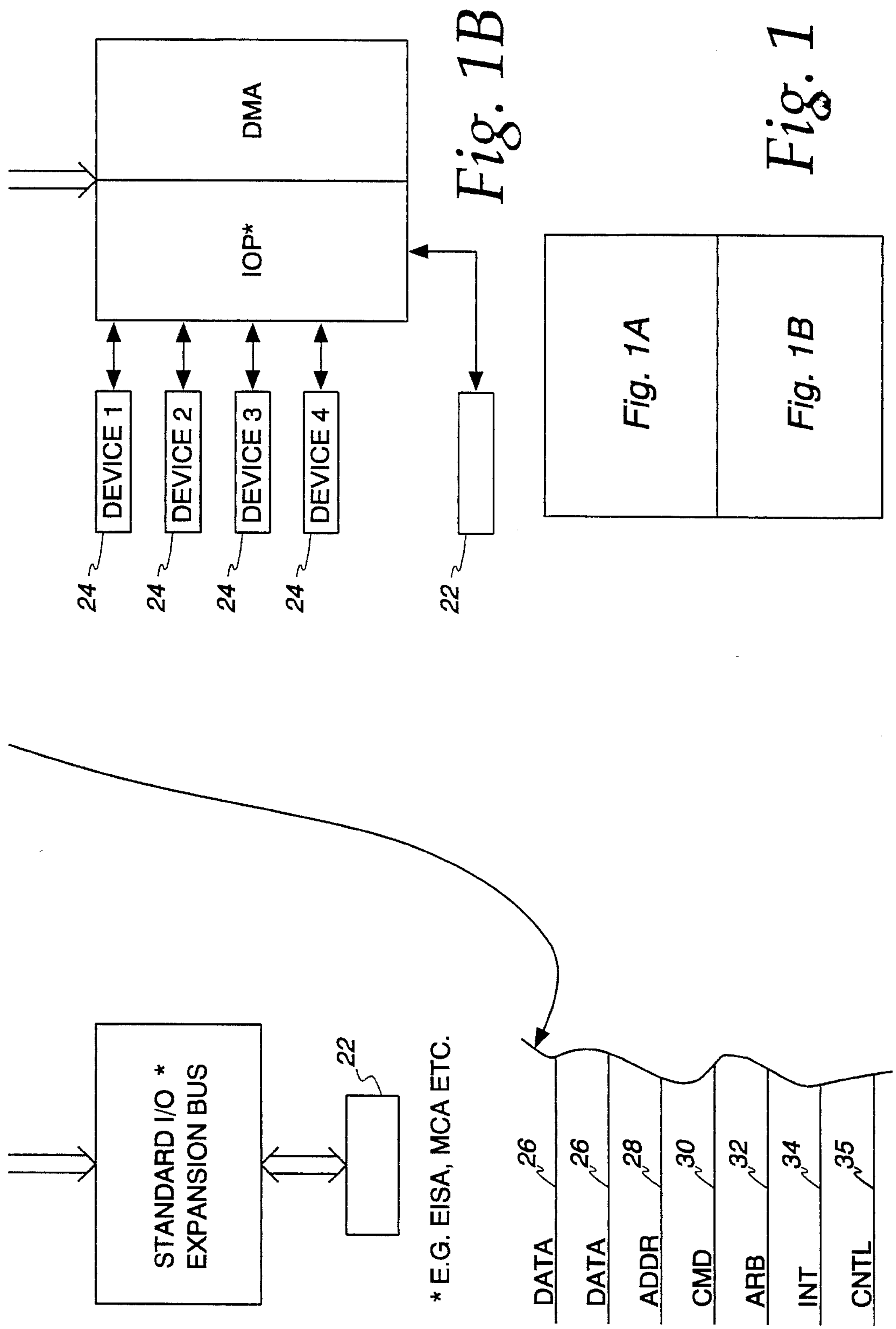

Referring to FIG. 1, therein is represented a general block diagram of a symmetric multi-processing system 10 incorporating and implementing the present invention. As indicated therein, System 10 includes an Extended Architecture-Multiple Processor (XA-MP) Bus 12 which interconnects a plurality of system functional units. The system functional units include one or more Memory Modules (MMs) 14 for storing data and programs for controlling operations of the system and operations on the data, one or more Processor Modules (PMs) 16 responsive to the instructions of the programs for performing the operations directed by the programs, and one or more Bridge Modules (BMs) 18 for interconnecting XA-MP Bus 12 and the system functional units with other Alternate System (AS) Buses 20 connecting to other elements of the system. AS Buses 20 may include, for example, the Intel i486 bus and EISA and MCA buses. AS Buses 20 may in turn interconnect to other System Elements 22, such as processing elements and memories, for example, microprocessors such as Intel i486 microprocessors, and devices such as input/output (I/O) Devices 24, which may include disk drives, keyboards, communications controllers, and visual display generators such as graphics adapters.

As indicated in FIG. 1 and as will be discussed in the following, XA-MP Bus 12 is comprised of either one or two Data Buses 26 for transporting data, an Address (ADDR) Bus 28 for transporting memory and I/O space addresses and slice information and a Command (CMD) Bus 30 for transporting commands indicating bus related operations to be performed by the system units connected from XA-MP Bus 12. Also associated with XA-MP Bus 12 is a plurality of Arbitration (ARB) Lines 32 which are used by the system functional units to arbitrate among themselves for access to XA-MP Bus 12, as well as for other operations described in the following, Interrupt (INT) Lines 34 which are used in interrupt operations, and a number of control lines (CNTL) 35 which will be discussed as necessary in the following. It should be noted that all lines of XA-MP Bus 12 and all control lines associated with XA-MP Bus 12 are registered, or latched, at both ends and that all bus operations are executed with respect to only latched data and signals.

As will also be discussed, the Data Buses 26 of XA-MP Bus 12 are operationally separate from and independent from the ADDR 28 and CMD 30 Buses of XA-MP Bus 12 and the primary mode of information transfer over XA-MP Bus 12, that is, for reads from MMs 14, is in the form of ordered transfers, In addition, the two Data Buses 26 are operationally independent from each other and each may execute a transfer independently of the other.

In ordered transfers, each functional unit tracks its own memory requests through operation of an ordered request queue in each functional unit, and the usual sequence of handshaking operations between an information requester and an information provided is eliminated, thereby enhancing the speed with which memory reads may be performed. XA-MP Bus 12 is also capable of operating in an out-of-order mode wherein the operations of Data Buses 26 are coupled with the operations of ADDR 28 and CMD 30 Buses to perform out-of-order transfers requiring handshaking between the requester and the provider.

Each system functional unit connected to XA-MP Bus 12 is comprised of a set of operational elements for performing the operations to be performed by the corresponding type of functional unit. These operational elements will include a bus interface control unit connected to the ADDR Bus 28 and CMD Bus 30 of XA-MP Bus 12 for controlling operations of the functional unit with respect to XA-MP Bus 12 and a two bus interface data path units, each connected to one of the Data Buses 26, for transporting data between the functional unit's operational elements and XA-MP Bus 12. In alternate implementations or System 10, XA-MP Bus 12 may include, or may use, only a single Data Bus 26 and the functional units will accordingly include, or use, only a single data path connecting to the single Data Bus 26.

In the instance of a MM 14, for example, the operational elements are comprised of Memory Storage Elements (MSE) 36 which, for example, may be comprised of column and row arrays dynamic random access memories (DRAMs) constructed as Single In-Line Memory Modules (SIMM) integrated circuits such as are commonly used for such memories. The memory bus interface control unit is comprised of Memory Controller (MC) 38 while the memory data path unit is comprised of a pair of Memory Data Paths (MDPs) 40, one connected to each Data Bus 26. In the instance of an implementation wherein XA-MP Bus 12 includes a single Data Bus 26, an MM 14 will correspondingly include a single MDP 40.

In the case of a PM 16, the operational elements are comprised of one or more Processor Units 42, each of which may have an internal, primary cache and an associated Cache Mechanism (CM) 44, each of which may in turn be comprised of a Secondary Cache (SC) 46 and a Cache Directory and Controller (CD) 48. There is a PM 16 bus interface control unit for each Processor Unit 42, represented as an Memory Bus Controller (MBC) 50, and a data path unit comprised of one or more Processor Data Paths (PDPs) 52 for each Processor Unit 42, the number of PDPs 52 associated with each Processor Unit 42 again depending upon the number of Data Buses 26 in XA-MP Bus 12. As indicated, each PM 16 further includes one or more Advanced Processor Interrupt Controllers (APICs) 54 connected from IN Lines 34 for handling interrupt operations for the Processor Units 42.

Finally, in the instance of a BM 18, the Operational Elements (OEs) 56 are dependent upon the type or operations that the BM 18 is to support and may, for example, comprise a set of bus interface logic for interfacing with various types of AS Bus 20 or operational elements for specific purposes. In a BM 18, the bus interface control unit is comprised of one or more Advanced Bus Interface Controllers (ABICs) 58, which perform essentially the same type or functions as MBCs S0. There is a bus interface data unit associated with each bus interface control unit and each bus interface data unit is comprised of one or more Data Bus Interface Controllers (DBICs) 60, again dependent upon the number of Data Buses 26, which form essentially the same type of functions as PDPs 52 and MDPs 40. In addition, the DBIC 60 has an internal data cache. Each BM 18 will also include an APIC 54 to handle interrupt operations.

2. Summary of Certain System 10 Architectural Features

As described above, System 10 is a symmetric multiprocessing system wherein processes may be executed in any of a plurality of Processing Units 42 under the control of programs stored in Memory Modules 14. As will be summarized below, and as will be described in detail in following portions of the present description, the system presents a unified operating environment for executing multiple processes concurrently, while many system functions are distributed through the functional units of the system, rather than centralized in a functional unit.

For example, System 10 provides a unified environment by performing all operations within a single address space wherein all data, program and information storage functions of the system occupy that single address space. Such data, program and information storage functions may include, for example, the memory space in MMs 14, the registers of Processor Units 42, and other information storage functions, such as the display memories of video controllers and I/O devices, and the space required to store operating systems and BIOSs, such as the ROM BIOSs commonly used in personal computers.

The management of information storage, however, is generally distributed among the functional units of the system, so that, for example, MMs 14 are responsible for managing the address locations within that address space that are used by MSEs 36 to store data and programs. In a like manner, the PMs 16 are functionally responsible for managing the address space locations occupied by the registers of Processing Units 42 while BMs 18 are responsible for managing the address space locations used by video display controllers and occupied by Read Only Memories and other memories for storing such programs and data as ROM BIOSs.

The management of the single system address space is essentially performed by the mapping of the various storage means, such as the processor registers, the physical memory locations in MMs 14, and such storage as is provided in ROMs for ROM BIOSs and as video memory for video display controllers, into the address space. In System 10, each functional unit is therefore responsible for mapping its associated storage spaces into the single system address space.

To illustrate the distributed management of the system address space, each Processing Unit 42 has a block of registers associated with it for storing control information relating to bus operations. In System 10, however, these registers are addressed as part of the system-wide single address space.

To accomplish this, each processor has a register associated with it for storing a pointer which is essentially an offset address representing the starting address of a first register of the block of registers in the system address space. At system initialization each processing unit, and each functional unit in the system, determines its location, or "slice" number on XA-MP Bus 12, each functional unit being referred to herein as a "slice" in reference to its location on XA-MP Bus 12. As will be described further in a following description of System 10's arbitration mechanism, the slice numbers of the functional units are used to determine the relative priorities of the functional units for XA-MP Bus 12 accesses and are determined at system initialization through operation of the System 10 arbitration mechanism.

The slice numbers are then used to determine the offset pointer values for each block of registers and those values are stored in the associated register for use in addressing the registers of the blocks, with the blocks of registers usually being assigned address space locations high in the address space of the system to avoid conflict with the address space assigned to system memory in the MMs 14.

As will be described certain of this slice number information may be provided to other functional units of the system for use in their mapping of their addressable memory or storage areas into the system address space. For example, the slice numbers are provided from the processing unit functional units to the MMs 14 and are used by the MM 14*s*, in a manner described in a following discussion of MMs 14, to construct as address translation table for converting system address space addresses into physical address locations of the SIMM memory chips in the memories.

Similar processes are followed for each functional unit having addressable storage or memory space associated with it and related to bus operations, with each functional unit mapping its associated storage or memory space into the system address space. Each functional unit is thereafter responsible for detecting addresses on XA-MP Bus 12 which refer to memory or storage address locations in or associated with that functional unit and responding appropriately.

In a like manner, each functional unit of the system is responsible for management of all information residing in its storage spaces, such as data and program instructions. This aspect of the distributed functionality of the system is particularly significant with respect to cached information as each functional unit, except the MMs 14, is provided with a cache mechanism for storing information which is used by or operated upon by the functional unit. A PM 16, therefore is provided with one or more caches, depending upon the number of Processing Units 42 residing therein, for storing program instructions to control operations of the Processing Units 42 and data to be operated upon by the Processing Units 42. In a similar manner, BMs 18, which are primarily input/output units for System 10, are provided with caches for information being transferred between the functional units connected from XA-MP Bus 12 and buses or devices connected from the BMs 18.

To further illustrate the distribution of system functions among the functional units of the system, it is well known in symmetric multiprocessor systems that a process may execute on any processor or the system and that a process may be assigned to a processor, begin execution, cease execution, for example, by the end of the process's processor time slice, and later resume execution on another processor of the system. In System 10, a process will be assigned to a Processing Unit 42 and will begin execution in the Processing Unit 42 with data and instructions belonging to the process being read from MMs 14 to the cache mechanism associated with the initial Processing Unit 42, so that the data and instructions encached in the cache mechanism then "belong to" the functional unit in which the process is executing, that is, to the Processor 42 and associated cache mechanism. If the process is subsequently "switched" out of the initial Processing Unit 42, as just described, the process data and instructions which were encached in the initial Processing Unit 42 will remain in residence in the cache mechanism of the initial Processing Unit 42 and will continue to "belong to" the initial Processing Unit 42 unless there is reason, such as lack of cache memory space, for the Processing Unit 42 to transfer the data and instructions back to memory.

If the process then resumes execution on another Processing Unit 42, the process will request the instructions and data required for the process to execute and will, as described in detail below, place a request for the data or instructions on XA-MP Bus 12. The sequence of events that will then be executed will depend upon whether the data originally read from memory had been modified and, as will be described in greater detail in following portions of this description, only one valid copy of data is allowed to exist in System 10 at any time.

If the data originally read from memory to the cache mechanism of the initial Processing Unit 42 had not been modified, and as such had not been marked as modified in the cache mechanism, the valid copy is assumed to be the copy residing in memory and is read from memory to the cache mechanism of the Processor Unit 42 on which the process is now executing. If the data had been modified and is resident in the cache mechanism of the original Processing Unit 42 as marked as modified, then this modified copy of the data is the only valid copy of the data and "belongs to" the original Processing Unit 42. As will be described further in the following, each functional unit System 10 monitors all read requests appearing on XA-MP Bus 12, in a process referred to as "snooping", and the original Processing Unit 42 will thereby detect the data read request placed on XA-MP Bus 12 by the new Processing Unit 42, as will any other functional unit which contains a "shared" copy of the data.

As described below in the detailed description of XA-MP Bus 12, and other portions of the description of System 10, any functional unit having a copy of requested data will detect a request for the data on XA-MP Bus 12 and may acknowledge the request, which in systems of the prior art would comprise an acknowledgment that the acknowledging unit will respond by providing the requested data. In system 10, however, a functional unit having a modified copy of the data, such as the original Processing Units 42, will assert a Memory Cycle Inhibit (MCI) and CDM command which will cancel the read operation in memory and inform the requesting functional unit that the data will be provided from a source other than the memory. The functional unit having the valid copy of the data, that is, the modified copy of the data will then arbitrate for XA-MP Bus 12 and will provide the modified copy of the data to the new Processing Unit 42 through an out-of-order transfer. The Processing Unit 42 receiving the modified copy of the data from the originally owning Processing Unit 42 becomes the "owner" of the data and assumes responsibility for managing that data at the time of the response.

Other examples of the distribution of system functions among the functional elements of System 10 which will be described in detail in the following include the arbitration of XA-MP Bus 12 access among the functional units, the execution of in-order reads from memory wherein each functional unit requesting a memory read is responsible for tracking its own read requests and detecting and responding to the corresponding memory response, and the adaptive timing of memory operations dependent upon the type of SIMM modules, bus transfer rates, and other factors.

Having described the general structure and operation of a System 10 implementing the present invention, the following will describe the functional units of System 10 in further detail.

B. Detailed Description of a System 10

1. XA-MP Bus 12

Referring again to FIG. 1, XA-MP Bus 12 was described as being comprised of either one or two Data Buses 26 for transporting data, an Address (ADDR) Bus 28 for transporting memory space addresses and a Command (CMD) Bus 30 for transporting commands indicating bus related operations to be performed by the system units connected from XA-MP Bus 14. As also described, a plurality of Arbitration (ARB) Lines 32 are associated with XA-MP Bus 12 and are used by the system functional units to arbitrate among themselves for access to XA-MP Bus 12, as well as for other operations described in the following. Also associated with XA-MP Bus 12 are Interrupt (INT) Lines 34, which arc used in interrupt operations and Control (CNTL) Lines 35.

It should be noted for purposes or the following discussions that the primary data element used in System 10 is a block of data, or instructions, referred to as a cache line because information, that is, data or instructions, is encached in System 10's caches in units referred to as lines wherein each line occupies one address location in a cache memory.

Each cache line contains 256 bits, or 32 bytes, of information and each Data Bus 26 is 64 bits, or 8 bytes, wide so that the transfer of one cache line over a Data Bus 26 requires four bus clock cycles for the actual data transfer. In addition, a standard read from memory is comprised or a cache line, that is, a single read request to memory will result in a cache line of 32 bytes being transferred over XA-MP Bus 12 to the requester, thereby requiring four transfers or the bus.

Each XA-MP Bus 12 operation further requires a bus clock cycle, to switch between "bus owners". That is, a single bus clock cycle is required for control of XA-MP Bus 12 to be transferred from a functional unit which is currently using the bus to execute an operation and to a next functional unit which has acquired access to the bus for a next bus operation.

As will be described in the following with respect to MMs 14, the MSEs 36 of each MM 14 are organized as dual columns of address locations, wherein one column contains even address locations and the other column contains odd address locations and wherein each column stores 64 bits of information. MMs 14 are thereby internally organized as half cache lines, with each row across the two columns comprising a half cache line of 128 bits so that a single read operation from a single row across the two columns of SIMM circuits will provide a half cache line of information. The MM 14 to system address space mapping is preferably structured so that consecutive half cache lines are stored in different groups of SIMM circuits so that two consecutive half cache lines may be read from MMs 14 using different memory RAS (Row Address Strobe) signals, and thus different KAS driver circuits, thereby eliminating additional access delay times when using 80 ns SIMMs.

As described above, in the presently preferred embodiment of System 10, XA-MP Bus 12 is provided with two Data Buses 26, each of 64 bits, or one half cache line, in width, to enhance the speed of information transfer over the bus.

As has been described, the two Data Buses 26 operate independently of each other. Either of Data Buses 26 may be used to perform a bus data transfer, such as a read from memory, wherein a bus data transfer will be completely performed upon one or the other of Data Buses 26, so that two bus transfers may be performed concurrently, one on one Data Bus 26 and the other on the other Data Bus 26.

A single, "standard" XA-MP Bus 12 operation, such as a cache line read from memory, thereby requires five bus clock cycles, one for the transmitting functional unit to take control of the bus and four for the transfer of data over one of the two Data Buses 26. It should also be noted, as described in the detailed descriptions of XA-MP Bus 12 and MMs 14, that System 10 may also perform single bus word transfers, and that a transfer may start with either an even or an odd cache line address, that is, is not limited to even-odd-even-odd and so on.

As has been mentioned above, the Data Buses 26 of XA-MP Bus 12 are operationally separate from and independent from the ADDR 28 and CMD 30 Buses of XA-MP Bus 12 and that information transfers over XA-MP Bus 12 for reads from MMs 14, are in the form of ordered transfers wherein the responses to read requests are fulfilled in the order made. In in-order read operations, the responses may occur a number of bus cycles after the request was accepted by the functional unit which accepted the request for response, depending upon whether there were other requests enqueued for response. This type of operation is referred to as "split cycle" operation as the response may be removed in time from the request.

In ordered transfers in System 10, each functional unit tracks its own memory requests independently of other functional unit memory requests, through operation of an ordered request queue in each functional unit. The ordered request queue allows a functional unit to track both its own requests for memory reads and all ordered transfers from the memory, both to itself and to other functional units, and to detect when an in-order transfer from memory is provided in response to one of its requests occurs. A functional unit will then respond accordingly by accepting the data from XA-MP Bus 12. The usual sequence of handshaking operations executed between an information requester and an information provider in conventional buses is thereby eliminated during the response portion of an in-order read cycle.

In the out-of-order mode, the operations of Data Buses 26 is coupled with the operations of ADDR 28 and CMD 30 Buses to perform out-of-order transfers requiring handshaking between the requester and the provider. In such out-of-order transfers, the unit providing the information in response to a request does not necessarily do so in the same sequence in which the requests were placed on XA-MP Bus 12 and the information provider must accordingly note the address, that is, the slice number of the unit making the request. The unit providing the requested information will then, in effect, couple together the operations of a Data Bus 26 with ADDR Bus 28 and CMD Bus 30 by placing the slice number of the requesting unit, that is, the unit which is to receive the information, on ADDR Bus 28 and an appropriate command on CMD Bus 30 while placing the data on a Data Bus 26, The receiving unit will then respond to the slice address and command to accept the data.

As will be described, requests for data reads from memory are placed on XA-MP Bus 12 as ordered requests. If the data is to be provided from a unit other than the memory, as in the previous example wherein information was returned from a cache mechanism of a processor unit rather than from the memory, the unit containing the information will respond by canceling the memory operation, as described, and will respond with an out-of-order response. To do so, the responding unit must obtain the address, or slice number, of the requesting unit and does so by obtaining the slice number of the requesting unit from the bus arbitration mechanism rather than from the requesting unit, so that the requesting unit does not have to provide a self-identifying address with each request. Each information read request may therefore be originally generated by the requesting unit as an ordered request and the requesting unit does not have to know beforehand how the request will be fulfilled.

As described, ordered operations are used for cache line and bus word reads from memory, which comprise the majority of read operations in System 10. Out-of-order operations are used for cache to cache transfers, word transfers, and I/O operations through BMs 18, thereby optimizing the operation of XA-MP Bus 12 for each type of operation.

Further detailed descriptions of the elements, operations, functions and operations of XA-MP Bus 12 may be found in Appendix 1, titled "XA-MP Bus". It should be noted that this appendix, and others, refers to Processing Units 42 as processors "P5", the associated cache mechanisms as a C5C–C8C, and the APICs 54 as Advanced Processor Interrupt Controllers. These designations refer respectively to Intel Pentium processors, the associated primary and secondary cache integrated circuits available from Intel, and the Intel interrupt processor referred to as the Advanced Processor Interrupt Controller. These elements are available from Intel Corporation, as is well known in the art, and are fully described in the Intel technical and product manuals.

2. Memory Modules 14 a. Description of Memory Controller 38

As has been described, each MM 14 is comprised of an MSE 36, which is a row and column array of memory circuits, such as SIMM modules, for addressably storing and providing data as is well known in the art. Each MM 14 further includes an MC 38 providing control functions for the MM 14 and one or more MDPs 40 forming the data paths between the MSE 36 and XA-MP Bus 12, with each MDP 40 connecting to one of the Data Buses 26.

Figure 2:
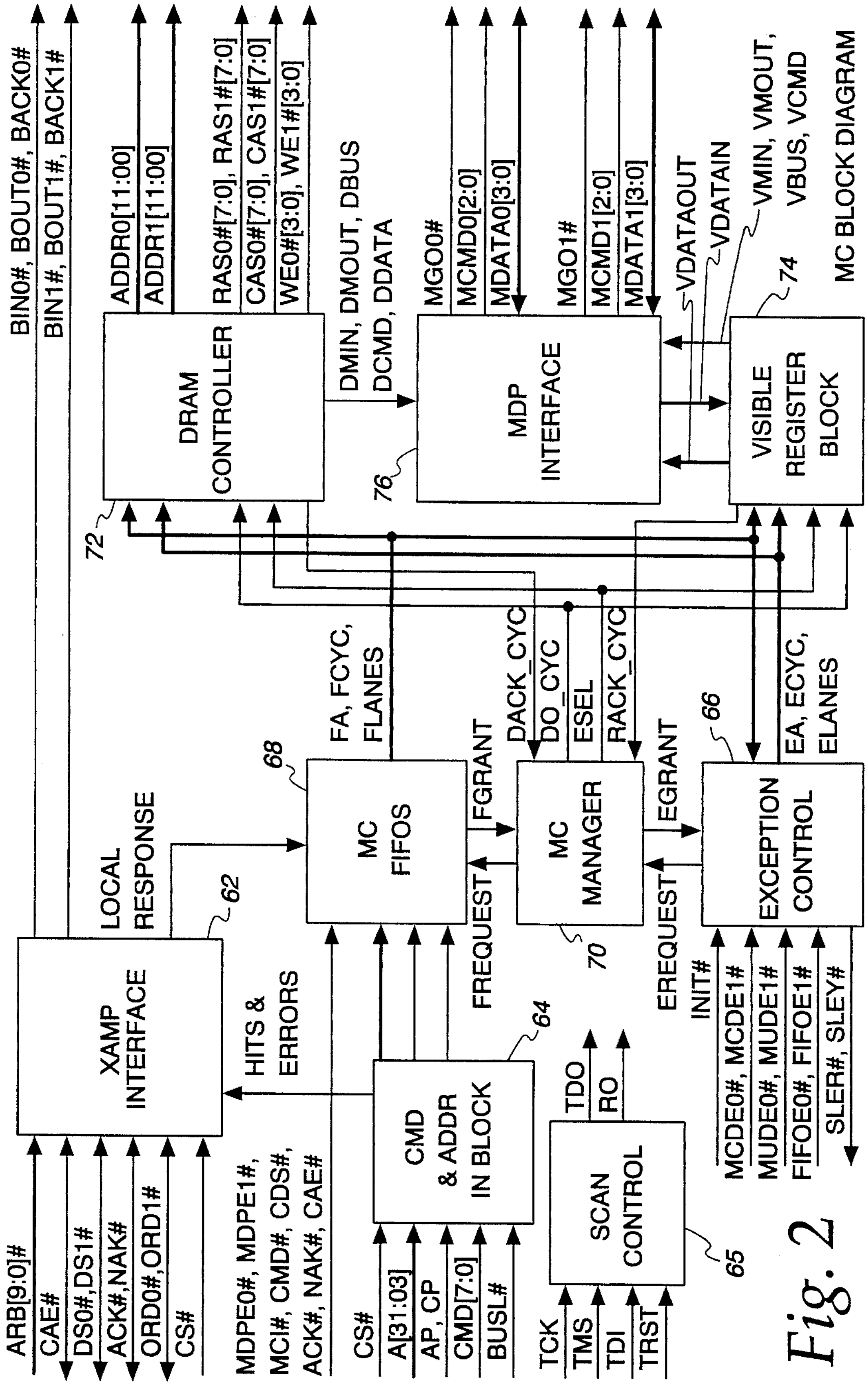
FIG. 2 is a block diagram of a memory controller.
Figure 3:
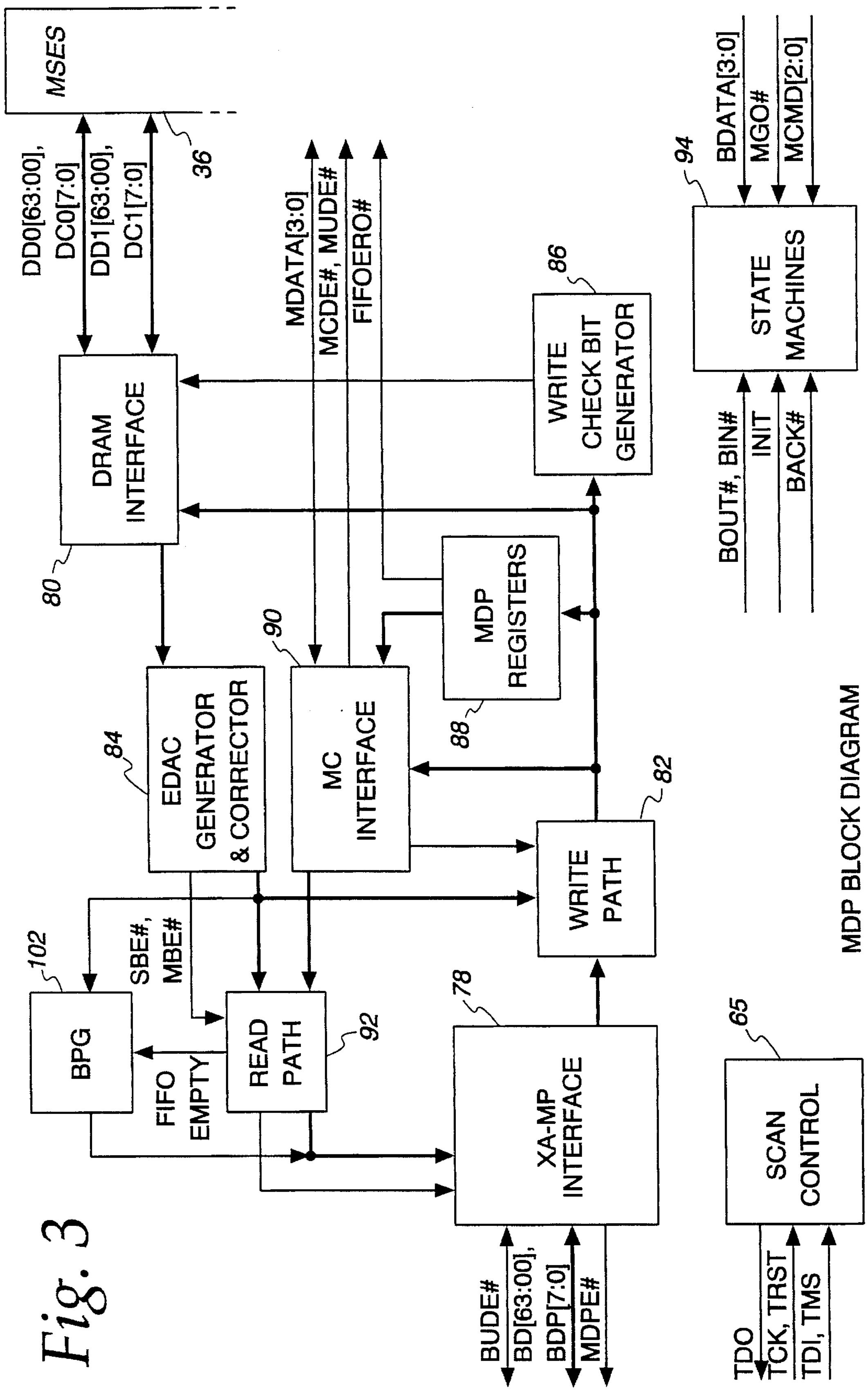
FIG. 3 is a block diagram of a memory data path.

Referring to FIGS. 2 and 3, therein are respectively shown block diagrams of an MC 38 and a MDP 40. Referring first to FIG. 2, the primary interface between an MC 38 and XA-MP Bus 12 and the control lines associated with bus operations is provided by an XAMP Control Interface (XAMPCI) 62 and a Command Address Input Block (CMDAI) 64.

XAMPCI 62 interfaces with certain of the control lines associated with XA-MP Bus 12 operations, which are described in detail in a following detailed description of MC 38. As indicated in FIG. 2, input signals to XAMP Interface 62 from XA-MP Bus 12 include nine ARB signals lines of the system arbitration mechanism (ARB) and a Command Strobe (CS#) indicating the present of a command on CMD 30.

Output signals from XAMPCI 62 include ACK and NAK signals, a CAE# signal indicating that a command or address received by the memory is in error. DS0# and DS1# are individual data strobe signals for the two Data Buses 26 and ORD0# and ORD1# are individual signal for the two Data Buses 26 indicating that an ordered response is present upon the Data Bus 26 corresponding to the ORD# signal.

As indicated, XAMPCI 62 provides a Local Response output to a memory command FIFO (First In-First Out Memory), described below, indicating that an operation request has been received that will be responded to by the memory. XAMPCI 62 also provides a number or outputs to MDP 40, including BIN0# and BIN1# which each correspond to one of the Data Buses 26 and are used to enable the transfer of data from the corresponding Data Buses 26 to MDP 40. BOUT0# and BOUT1# each correspond to one or the Data Buses 26 and are signals used to enable the transfer of data from the memory to the corresponding Data Bus 26. BACK0# and BACK1# each correspond to one of the Data Buses 26 and are signals representing to MDP 40 that a write cycles on the corresponding Data Bus 26 is validly acknowledged and not aborted, for example, by MCI.

CMDAI 64 interfaces with ADDR Bus 28 and Command Bus 30 to receive and provide addresses and commands and with other bus operation control lines which are described in detail in a following detailed description of MC 38. Inputs to CMDAI 64 include the addresses appearing on ADDR Bus 28, the command signals (CMD) from CMD Bus 30, and a command strobe signal CS# indicating that a command is present on CMD Bus 30. The (AP) and (CP) inputs are respectively address and command parity bits. Signal BUSL# is a bus control line input indicating that the requesting functional unit has Locked, that is, taken control of, XA-MP Bus 12 for an extended period.

As represented in FIG. 2, CMDAI 64 provides outputs to the memory command FIFO mentioned above for storage therein, the outputs including the addresses and commands or memory requests and certain control bits. CMDAI 64 also provides Hit and Error output to XAMPCI 62 to indicate when, respectively, received memory requests are valid or invalid, for certain reasons.

It is indicated in FIG. 2 that MC 38 has a further interface to XA-MP Bus 12 and the associated bus operation control lines through an Exception Control (EXCEPT) 66 which is provided to handle exception and error conditions. EXCEPT 66 will not be described further at this point, but is described in the detail in the detailed description of MC 38. MC 38 also includes a Scan Control (SCAN) 65, which also will be described in the detailed description of MC 38.

Memory operation requests are pipelined in MC 38 through operation of a Memory Control FIFO (MC FIFO) 68 mentioned above. As indicated, MC FIFO 68 receives address, command and response inputs from CMDAI 64 and XAMPCI 62, which define memory operations to be performed and stores these operations to be operated upon in the order received.

Other inputs are provided to MD FIFO 68 from MDP 40 and include MDPE0# and MDPE1# bus control signals indicating the presence of a parity error detected on the corresponding Data Bus 26 by MDP 40. A (Memory Cycle Inhibit) MCI# signal indicating that a current memory operation has been canceled, as previously described, and Cache Data Modified (CDM#) and Cache Data Shared (CDS#) signals indicated that the presence of a modified or shared copy of the requested data has been indicated in another functional unit and that the current memory cycle is canceled. The ACK# and NAK# signals respectively indicate that MC 38 has accepted or not accepted a current memory operation, while Command or Address Error (CAE#) indicates that MC 38 has detected a command or address error.

MC FIFO 68 and EXCEPT 66 each have control signal interfaces with an MC MANAGER 70, which provides basic control and management functions for memory operations. As indicated, MC MANAGER 70 receives request signal FREQUEST from MC FIFO 68 indicating the present of a pending request and in return provides an FGRANT signal indicating that the request may be executed. MC MANAGER 70 concurrently provides an EGRANT signal to EXCEPTION 66 indicating the request may be executed and receives an EREQLTEST indicating the presence of a pending request.

As a result of these signals, MC MANAGER 70 then provides control outputs to a DRAM CONTROLLER 72 to be used by DRAM CONTROLLER 72 in controlling the generation of addresses (ADDR), Row Address Strobes (RASs), Column Address Strobes (CASs) and Write Enable (WE) signals to the MSEs 36 of the MMs 14. As is common, MSEs 36 are comprised of dynamic random access memories (DRAMs) physically constructed as SIMM modules.

Other inputs to DRAM CONTROLLER 72 include address, cycle and lane control signals provided from MC FIFO 68 or from EXCEPTION 66 which, as described in detail in the detailed description of MMs 14 are essentially addressing information derived from the request address and command information stored in MC FIFO 68.

As shown in FIG. 2, MC 38 includes a Visible Register Block (VRB) 74 having inputs from MC FIFO 38, EXCEPTION 66, MC Manager 70 and an MDP Interface (MDPI) 76 which is comprised or registers which are accessible to the system and which are used to store and provide basic control and error information.

MDPI 76 essentially provides a control and synchronization interface between MC 38 and MDP 40 to control and synchronized the transfer of data into and out of an MM 14 through MDP 40 with the control or memory operations by MC 38.

As indicated, these control signals exchanged between MC 38 and MDP 40 include multi-bit MC Commands (MCMD0 and MCMD1) which are commands passed between MC 38 and MDP 40 so that each unit may request certain operations of the other. As described in the detailed descriptions of MC 38 and MDP 40, these commands are essentially concerned with the particularly type or memory read or write operation to be performed, such as whether the MSE 36 is to perform a read or a bus word or a cache line from the DRAMs of the SIMM arrays. Data lines MDATA0# and MDATA1# are used to pass data used in MC 38/MDP 40 operations between MC 38 and MDP 40, as described in the detailed description of MC 38 and MDP 40, and signals MGO0# and MGO1# are used to initiate operations by MC 38 or MDP 40.

Further detailed descriptions of MC 38 may be found in Appendix 2, which is titled "Memory Controller".

b. Description of Memory Data Path 40

Referring now to FIG. 3, therein is represented a block diagram of an MDP 40. As described, MC 38 essentially provides all timing and control functions and signals for the MMs 14 and the memory and XA-MP Bus 12 operations performed by the MMs 14 while MDP 14 is essentially a pipelined data path between XA-MP Bus 12 and the memory elements of MSE 36. As has also been described, each MM 14 will have two MDPs 40, one connecting to each of the Data Buses 26, and each functional unit having data connections to Data Buses 26 will similarly each contain two similar data path elements connecting to the two Data Buses 26. In those implementations of System 10 using or having only one Data Bus 26, each MM 14 will have, or will use, only one MDP 40 and each other functional unit will similarly have, or use, only one data path element to connect to the single Data Bus 26.

MDP 40 includes an XA-MP Bus 12 Data Interface (XAMPDI) 78 to XA-MP Bus 12 and a DRAM Interface (DRMI) 80 to the DRAMs of the MSEs 36. As shown, XAMPDI 78 has a bidirectional data interface with Data Buses 26 of XA-MP Bus 12 for transferring 64 bits or data (BD) and 8 bits or data parity (BDP) with XA-MP Bus 12. XAMPDI 78 further has a bidirectional Bus Uncorrected Data Error (BUDE#) signal line interface with a control line associated with XA-MP Bus 12 to receive and provide a signal indicating an uncorrected error in the data being provided to or read from the memory.

MDP 40's data interface with MSE's 36 is provided through DRMI 80 and is comprised of two bidirectional 64 bit wide data paths to and from the DRAMs of MSEs 36, referred to in FIG. 3 as DD0(63:0) and DD1(63:0). As has been described, the memory elements of MSEs 36 are organized as two columns, an even address column and an odd address column, wherein each column is one bus word, or one quarter cache line wide. The two data buses connecting to the MSE 36 memory elements are therefore capable of transferring a bus word in one memory internal cycle or a single cache line in two memory internal cycles. Associated with and parallel with each data bus to the MSEs 36, that is, with DD0(63:0) and DD1(63:0), are two bidirectional Error Detection and Correction buses identified as DC0(7:0) and DC1(7:0) for carrying data check bits between the memory elements of MSEs 36 and MDP 40. In this regard, it should be noted that the MSE's store not only the information but that row of each bus word wide column of the MSEs 36 also contains memory elements for storing data check bits associated with the corresponding bus words stored therein.

The input path from XA-MP Bus 12 extends from XAMPDI 78 to a Write Path memory (WRITE PATH) 82, which is used to pipeline data writes into the MSEs 36, As will be described further below, WRITE PATH 82 also has data path inputs from an EDAC Generator and Corrector (EDAC) 84, which in turn is connected in the data and check bit path output from DKMI 80. As described in the detailed description of MDP 40, this path is used for data write back and correction operations.

The data path output from WRITE PATH 82 is connected to a data path input to DRMI 80, providing the path through which information is written into MSEs 36. The data path output from WRITE PATH 82 is also connected to a data path input into a Write Check Bit Generator (WCBG) 86 which generates check bits for each bus word to be written into MSEs 36 and provides the check bits through a check bit write path input to DRMI 80 in parallel with the data provided as bus words to be written into MSEs 36 from WRITE PATH 82.

The data word output of WRITE PATH 82 is also provided as inputs to MDP Registers (MDPRs) 88 to allow writing of certain MDP 40 registers. The output of WRITE PATH 82 and MDPR 88 arc provided as inputs to an MC Interface (MCI) 90, which interfaces with MDPI 76, previously described, and are used to generate the control and data signals exchanged with MDPI 76. As indicated, the control and data signals exchanged with MDPI 76 further include a FIFO Error signal (FIFOERO#) which indicates when there has been an error in the FIFO comprising WRITE PATH 22 or the FIFO comprising READ PATH 92, such as a requested read operation upon an empty FIFO or a write operation upon a full FIFO.

Next considering the data output path through MDP 40, the data and check bits read from MSEs 36 through DRMI 80 are provided as inputs to EDAC 84, which performs error detection and correction operations and generates corrected data bits for the bus word read from MSE's 36 and error signals SBE# and MBE#, all of which are provided as inputs to READ PATH 92.

READ PATH 92 is essentially a FIFO for pipelining data reads from the MMs 14 and the data bit outputs of READ PATH 92 are provided to XAMPDI 78 for transfer onto SA-MP Bus 12 as required.

Finally, MDP 40 includes State Machines (STATE) 94 which controls certain operations of MDP 40. As indicated, STATE 94 receives a Bus In (BIN#) signal from MD 38 which enables the transfer of data from XA-MP Bus 12 into MDP 40 and a Bus Out (BOUT#) signal from MC 38 which enables the transfer of data from MDP 40 to XA-MP Bus 12. Other signals from MC 38 include a Bus Acknowledge signal (BACK#) which indicates a valid acknowledged write cycle and an Initiate (INIT) signal to initialize MDP 38. STATE 94 also receives BDATA, MGO and MCMD from MC 38, as described further in the detailed descriptions of MC 38 and MDP 40.

Having described the overall structure and operation of an MM 14, focusing in particular on MC 38 and MDP 40, the following will describe certain specific functions and operations of the MM 14.

Further detailed descriptions of MDP 40, including the features described in the following, may be found in Appendix 3, titled "Memory Data Path".

3. Error Correction for Stored Data

MMs 14 perform error correction of data stored in MSEs 36 by a read-correct-writeback operation wherein the read-correct-writeback operations are performed in such a manner as not to delay the normal reading and writing of information from and to the memory elements. In this respect, it has been described above that MDP 40 performs error detection and correction of information read from memory, through operation of EDAC 84 and generates check bits for information written into memory, through operation of WCBG 86, the check bits being written into memory and stored with the information.

When MDP 40 reads a bus word from memory and detects an error in the data, that is, the data is in accordance with the check bits associated with the data, MC 38 will receive MCDE and note the address location of the data in error being corrected through EDAC 84 for transfer to XA-MP Bus 12 and will store this error address information (ERROR ADDR) in a Correction Queue (CORRQ) 96.

Figure 4:
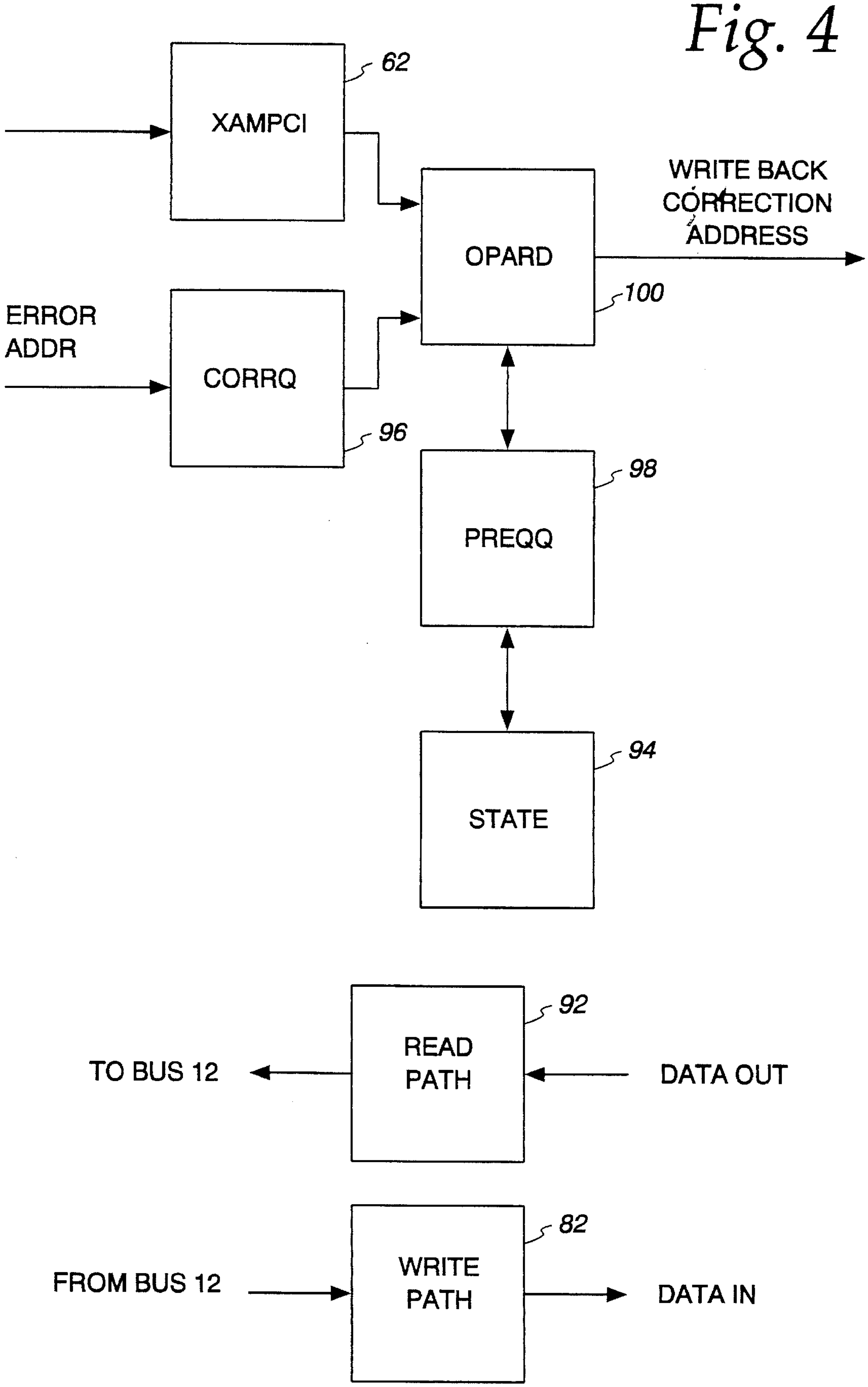
FIG. 4 is a block diagram of a correction queue.

As indicated in FIG. 4, and as has been previously described, memory requests, that is, commands indicating operations to be performed and addresses of information to be read or written are received from XA-MP VIP Bus 12 by XAMPCI 62, are stored in the pipeline queue comprised of XAMPCI 62 if to be executed by the memory, and are executed by MC 38 and MDP 40. As has been described, memory read operations or bus words and cache lines are performed as in-order operations, that is, each operation is performed in the order received. The operations of MC 38 and MDP 40 are coordinated through operation of a Pending Request Queue (PREQQ) 98 maintained by MC 38 wherein MC 38 stores identifications of all pending requests. MDP 40 then provides information regarding requests as executed and provides this information to MC 38's PREQQ 98, thereby allowing MC 38 and MDP 40 to remain in synchronization.

Associated with XAMPCI 62, CORRQ 96 and PREQQ 98 is an Operation Arbitrator (OPARB) 100 which monitors the state of pending requests in XAMPCI 62 to detect when the queue of pending requests is empty. When the queue is empty, OPARB 100 checks CORRQ 96 to determine whether the memory has detected any storage locations containing uncorrected error and, if the addresses of any such locations are enqueued in CORRQ 96, performs read-correct-writeback operations. In each such operation, MDP 40 will, in cooperation with controlling operations of MC 38, read the data from that address location flora MSE 36 through DRMI 80, correct the data through EDAC 84 and provide the data back through WRITE PATH 82. The data will pass through WRITE PATH 82 to WCBG 86, where new check bits will be generated, and the corrected data and new check bits will then be written back into MSEs 36 through DRMI 80. In the event that OPARB 100 detects that CORRQ 96 is full, the data correction operations will be performed as just described, but will be performed even if there are pending requests.

MMs 14 thereby perform error detection and correction on data stored in the MSEs 36, but without interfering with the execution of read and write operations, by storing identifications of locations containing errors and performing read-correct-writeback operations when there are no pending requests.

Another feature of MDP 40 is illustrated by referring to FIG. 3 wherein there is represented a Bated bypass data path around READ PATH 92 with control of Bypass Path gate (BPG) 102 provided by a FIFO EMPTY signal output of READ PATH 92. As has been described, READ PATH 92 is essentially a FIFO queue wherein the information and parity bits resulting from read request operations are passed through the queue and to XA-MP Bus 12 in the order executed. In the event that all request have been executed, the queue will be empty and a new request would have to pass through READ PATH 92's queue, requiring several clock cycles, depending upon the depth of the queue, before being available for transfer to XA-MP Bus 12. In the event the queue is empty, however, this condition is detected by READ PATH 92 which asserts FIFO EMPTY to BPG 102, which responds by gating the information around READ PATH 92 and directly to XAMPDI 78 and MC 38 sends MDP 40 a BOUT signal requesting that data be put onto XA-MP Bus 12, thereby providing the requested information to XA-MP Bus 12 one clock cycle sooner than would be available through READ PATH 92.

4. Adaptive Memory Timing

MMs 14 further includes the capability of adaptively altering the absolute and relative timing of the memory operation timing signals generated by MC 38 and used by MC 38 and MDP 40 in controlling memory operations in such a manner as to adapt the operations of an MM 14 to obtain the maximum speed of operation possible with the particular SIMM circuits used in an MM 14. The controllable signals include the SIMM timing signals, including RAS, CAS and WE, generated by MC 38's DRAM CONTROLLER 72, together with other timing signals generated by MC 38 and used by MC 38 and MDP 40 to control the operations of MM 14.

Figure 5:
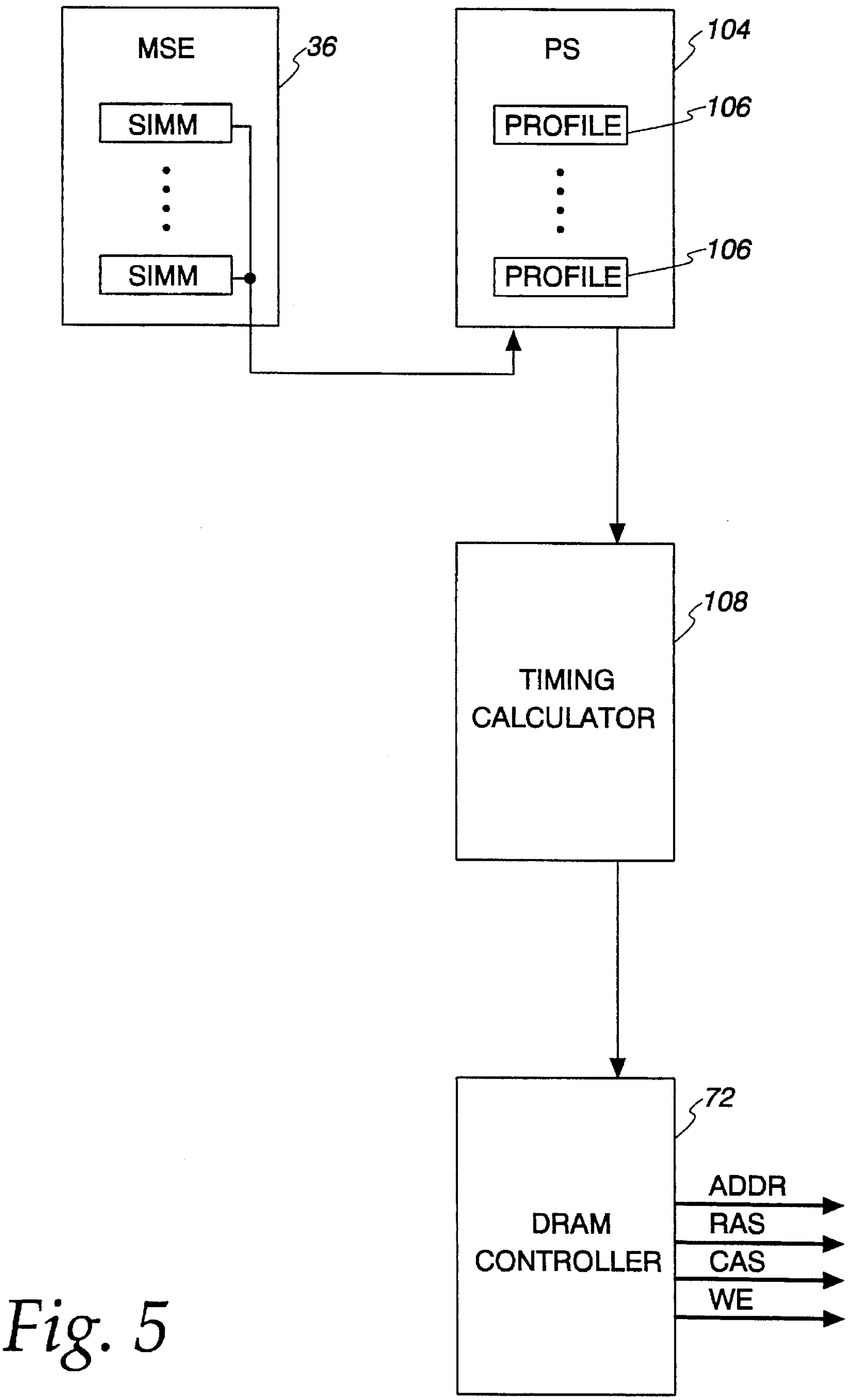
FIG. 5 is a block diagram of adaptive memory timing logic.

Referring to FIG. 5, it is well know that SIMM circuits provide coded values upon certain pin outputs which indicate at least the size and speed of the particular SIMM circuits. In the present system, these encoded values available through the SIMM circuit pins are brought out of the MM 14 MSE 36s and are made available to MC 38. The present system further includes a Profile Store 104, which is located in a storage location in MM 14, wherein Profile Store 104 could contain a Profile 106 for each type of SIMM group which may appear in an MSE 36.

Each Profile 106 contains a set of values representing the timing characteristics of the corresponding type of SIMM module, wherein the timing characteristics represent the various maximum gate delays, recharge times, the liming event intervals of the SIMM module internal circuitry. In the present system the timing characteristic values are not expressed in time units, such as nanoseconds, but are instead values representing the comparative timing characteristics of the SIMM modules, such as counts in terms of the double speed clock. The timing characteristic values, however, are selected to easily represent the timing characteristics of both the SIMM modules and the basic clocks used in MMs 14 to generate timing signals.

At system initialization, MC 38 will read the SIMM module coded timing characteristic values provided from the SIMM module pin outputs and will use the coded values to select and read a corresponding Profile 106 or Profiles 106 from Profile Store 104. The timing characteristic values are then provided to a TIMING CALCULATOR 108 in the MM 14's MC 38. TIMING CALCULATOR 108 is provided with the calculation functions necessary to calculate the maximum time intervals required to perform each SIMM operation, such as the maximum time which must occur between a RAS signal and a next RAS signal, the maximum time which may occur between a write enable signal and the result of the write enable signal, and so forth.

TIMING CALCULATOR 108 will calculate and provide a set of timing control values which represent the times at which timing events are to occur in the operation of the SIMMs, wherein each timing event is represented by a timing signal and the timing control values are in units of clock periods of the MM 14 internal clock used to control the SIMM operations. In the present system, timing events are determined, that is, calculated, as both "absolute" times and as "relative" times wherein the time of occurrence of an "absolute" event is determined relative to a $T_O$ representing the start of a memory operation cycle and a "relative" event is determined relative to a previous event. For example, the time of occurrence of the RAS and CAS signals may be determined as absolute events relative to the $T_O$ start of a memory cycle while the time of occurrence of a WE or the time at which data will appear from the SIMM modules may be determined relative to a previous event, such as the occurrence of a RAS or CAS signal.

The timing control values are then provided to DRAM CONTROLLER 72 and used by DRAM CONTROLLER 72 to generate the actual timing signals, such as RAS, CAS and WE, to the SIMM modules.

It should be noted that in alternate embodiments of the present invention, it may be preferable to pre-calculate the timing values for each profile and to simply load the timing values to DRAM CONTROLLER 72 rather than calculating the timing values through a TIMING CALCULATOR 108 at system initialization.

In a present embodiment of the system, each MM 14 in the system will use a single Profile 106, selecting the profile which matches the slowest SIMM module contained in that particular MM 14. In alternate embodiments, it is possible to use multiple PROFILEs 106 within a single MM 14 to accommodate different SIMMs within an MSE 36. In this latter instance, the DRAM CONTROLLERs 72 will store two or more sets of timing values, possible in a set of registers associated with DRAM CONTROLLERs 72, and will select a set of timing values dependent upon the address locations being accessed, that is, dependent upon the type of SIMM modules currently being accessed.

In a yet further embodiment of the present invention, the timing characteristic values included in PROFILEs 106 will further include timing characteristic values reflecting the data transmission rates of Data Buses 26 of XA-MP Bus 12 and these values will be used in calculating the timing control values provided to DRAM CONTROLLERs 72. In a yet further implementation, DATA Buses 26 within a single system may have different transmission rates and the PROFILEs 106 will contain timing characteristic values for the different bus transfer rates. In this instance, again, DRAM CONTROLLER 72 will be provided with and will use multiple sets of timing control values, with the values used during any memory cycle being dependent upon which DATA Bus 26 the information is being written to or read from.

Finally, as has been described the MSEs 36 are internally organized as two partitions, so that reads from and writes to the MSEs 36 are generally interleaved, if enabled, that is, to or from alternate partitions of the MSEs 36, thereby increasing the overall transfer rate of data into and out of the MSEs 36. In the present embodiment of the system, the interleaving of memory cycles, that is, the alternation of memory cycles to the partitions of the MSEs 36, are controlled by the timing characteristic values provided in the PROFILEs 106 and are executed by what are effectively two DRAM CONTROLLERs 72, one providing the timing signals for each partition of the MSE 36 SIMM array. In this instance, one of the timing signals generated by each of the controllers is a timing signal provided to the other controller to initiate the memory timing cycle of the other controller, that is, a $T_O$ timing signal.

Each controller therefore determines the interval between the conclusion of its own timing cycle and the start of the next timing cycle, generated by the other controller, and thereby controlling the inlerleaving of timing cycles. The timing cycle initiate even generated by each controller may be calculated to occur at any time during the timing cycle of the controller generating the initiate event for the other controller, allowing any degree or period of overlap or non-overlap of the liming cycles, with the interleaving of timing cycles being determined by the profile information.

Finally, TIMING CALCULATOR 108 and DRAM CONTROLLER 72 are implemented in the present implementation of System 10 as two state machines. A detailed description of the design and construction of these state machines in provided in Appendix 4 and, as in Appendices 5, 8 and 10, is presented in the iLogix hardwarre description format using the iLogix hardware design tools available from iLogix Company of Burlington, Mass.

In a further aspect of MMs 14, the refresh cycles of the partitions, which are controlled by DRAM CONTROLLER 72, are controlled individually and the refresh cycles of the DRAMs of the partitions may be staggered to reduce the peak power consumed by refresh, which involves reading all DRAMs of a partition at a time. Refresh control bits are read in and provided to DRAM CONTROLLER 72 to control the timing of the refersh cycles.

5. In-Order and Out-Of-Order Bus Transfers As has been described, the primary mode of information transfer over XA-MP Bus 12 is by in-order operations and is used for bus word and cache line reads from memory. A functional unit other than the memory may respond to a request, however, as when a processor unit holds a modified copy of the requested data in its cache, by asserting an MCI command to cancel the read request in memory and to inform the requester that the request will be fulfilled by another functional unit other than the memory and by an out-of-order transfer.

As described, in-order transfers are responded to by the memory in the order in which the requests are placed on the bus and is initiated by the requester gaining control of XA-MP Bus 12 and placing the address of the requested information on ADDR Bus 28, together with the bus control signals. Each functional unit tracks its own in-order memory requests, independently of other functionals, through operation of an ordered request queue in each functional unit. The ordered request queue in each functional unit allows each function to track both its own requests for memory reads and all ordered transfers from the memory, whether to that functional unit or to another functional unit, to detect when an ordered transfer from memory appears on XA-MP Bus 12 in response to one of its own requests. A functional unit may then respond by accepting the data from XA-MP Bus 12. Ordered transfers thereby eliminate the usual sequence of handshaking operations executed between an information requester and an information provider in the response portion of split bus operations in that the responder is required only to place only the requested information and bus control signals on XA-MP Bus 12 in the order in which the in-order requests are received and is not required to identify the recipient of the information further.

To briefly review and summarize the execution of in-order bus operations as described in other sections of this description of a presently preferred embodiment of the invention, including the appendices which are included in this description, the bus interface control unit of a functional unit will place a request for information on XA-MP Bus 12 by placing the address of the information on ADDR Bus 28, an in-order command for a bus word, cache line or double cache line on CMD 30, and asserting the command strobe (CS). The MM 14 whose address space contains the address of the request will recognize the request as being within its address space and will respond by accepting the request, as indicated by the MM 14 asserting an ACK.

If not canceled by an MCI command asserted by another functional unit, the memory will place the request in its MC FIFO 68 queue to be executed in the order received, wherein the request information stored in MC FIFO 68 includes the type of operation requested and the address of the requested information. If the request is canceled by an MCI command, the request will be canceled and will not be placed in MC FIFO 68.

When the request is finally executed from MC FIFO 68, the memory places the requested information on one or Data Buses 26 in one or more bus transfers. The memory also asserts appropriate control signals on the bus at the start or the transfer, including asserting an ORD#0 or an OED#1 signal, depending upon which of Data Buses 26 is information is being provided, and asserting Data Strobes (DSs).

The bus interface control element of the originally requesting functional unit will detect the occurrence of an in-order response on XA-MP Bus 12, as it has been detecting the occurrence of all in-order responses appearing on XA-MP Bus 12, by monitoring the CMD Bus 30 and the ORD control lines. If the response corresponds to an in-order request that it earlier placed on XA-MP Bus 12, the functional unit will respond by accepting the information from the Data Bus 26 that the information is being sent on and reading the information from the Data Bus 26 as indicated by the Data Strobes.

In the present embodiment or System 10, only the memory has an operation queue, in MC FIFO 68, and this only the memory may contain more than one outstanding request at a time. The functional units other than the memory therefore require only a single register or memory in their bus interface control elements to store their outstanding requests. In alternate embodiments, however, each functional unit may be provided with a request queue in its bus control interface element to store multiple outstanding requests. In this implementation, the in-order request queue in each functional unit may be expanded in a manner similar to the in-order request queue in each MM 14 to provide response indications for multiple requests.

As the above operations of the bus control interfaces of the memory and other functional units are described in detail in the structural and operational descriptions for each functional unit, the following will focus on the in-order queue in the memory and in each functional unit and the functional elements in the memory and in the functional units that operate with and exchange signals with the in-order queues will be understood by reference to the descriptions particular to the memory and the other functional units.

Figure 6:
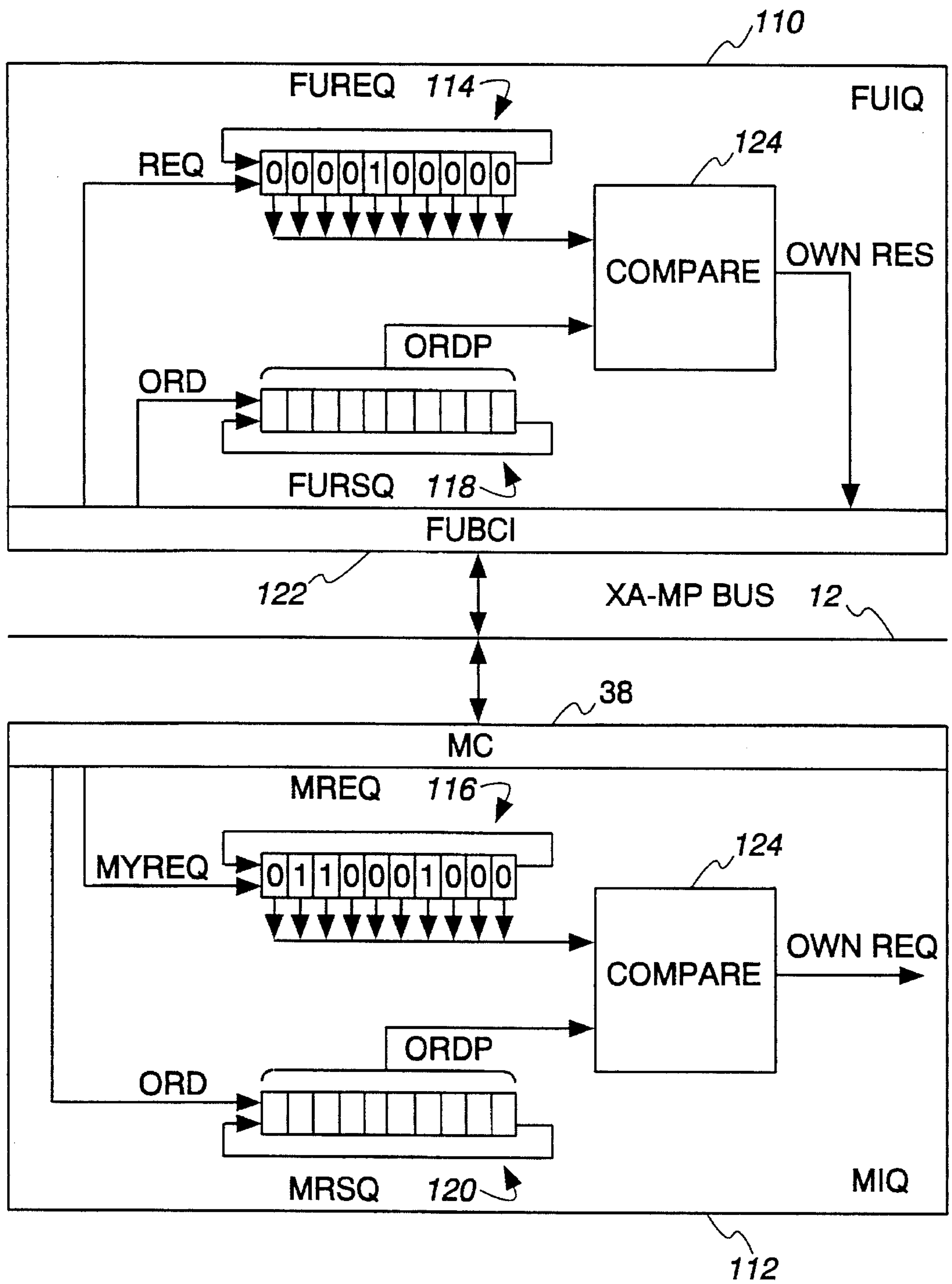
FIG. 6 is a block diagram of an in-order request/response queue.

Referring now to FIG. 6, therein is presented a functional block diagram representation of an in-order queue in a functional unit and the in-order queue in the memory. It should be noted that there is an in-order queue in the bus control interface element of each functional unit and in each MC 38 of each MM 14.

As shown, the in-order request queue residing in a functional unit is identified as Functional Unit In-Order Queue (FUIQ) 110 while the in-order request queue residing in an MC 38 is identified as Memory In-Order Queue (MIQ) 112. Each is comprised of a request queue and a response queue, respectively referred to as Functional Unit Request Queue (FUREQ) 114, Memory Request Queue (MREQ) 116, Functional Unit Response Queue (FURSQ) 118 and Memory Response Queue (MRSQ) 120, wherein FUREQ 114 tracks in-order requests submitted by the functional unit, MREQ 116 tracks in-order requests accepted by the MIC 38 for the MM 14, FURSQ 118 tracks in-order responses appearing on XA-MP Bus 12 from any MM 14 and MRSQ 120 tracks in-order responses appearing on XA-MP Bus 12 from any MM 14.

Referring first to FUIQ 110, the Functional Unit Bus Control Interface (FUBCI) 122 of the functional unit places in-order requests on XA-MP Bus 12 as described elsewhere herein and upon placing each in-order request on XA-MP Bus 12, inserts an indication of the request (REQ) into FUREQ 114. FUREQ 114 may, for example, be implemented as a single bit wide wrap around shift register wherein the output is connected back to the input, so that the requests will rotate in the loop until fulfilled. In this implementation, the insertion of a request indication REQ is accomplished by placing a bit in the input of the shift register, such as a logic "1". FUBCI 112 detects each in-order request placed on XA-MP Bus 12 by any functional unit and clocks FEREQ 114 upon each appearance or an in-order request on XA-MP Bus 12, so that the REQ indications in FUREQ 114 are moved along the shift register and so that the position of any REQ indication thereby represents the relative order or an in-order request by that functional unit relative to all other in-order requests made by all other functional units.

FUIQ 110 tracks all in-order responses appearing on XA-MP Bus 12 through operation of FURSQ 118, which is clocked by the functional unit's FUBCI 122 each time the FUBCI 122 detects an in-order response from an MM 14 on XAMP Bus 12. In response, FURSQ 118 generates a pointer (ORDP) which identifies the occurrence of a current in-order response in a sequence of in-order responses. FURSQ 118 and the analogous MP SQ 120 in MIQ 112 are represented in FIG. 6 as rotating shift registers moving along a bit which represents a current response, but may alternately be implemented as counters whose number output identifies, at any time, a current response in a sequence of responses.

The position of each REQ indication in FUREQ 114 is compared to ORDP from FURSQ 118 by a COMPARE 124 and when the position of an REQ indication is found to coincide with a current response as indicated by ORDP, an Own Response (OPWNRES) output is generated to FUBCI 122 to indicate that a current in-order response corresponds to an in-order request earlier submitted by the functional unit.

In summary, therefore, FURSQ 118 tracks and indicates the sequential occurrence of in-order responses on XA-MP Bus 12 while FUREQ 114 tracks and indicates the location or locations of the functional unit's own in-order requests in the sequence in-order requests that have been placed on XA-MP Bus 12, and a coincidence between FURSQ 118 and FUREQ 114 indicates an in-order response corresponding to an in-order request submitted by the functional unit.

Referring now to MIQ 112, each MM 14 is required to track its own in-order operations relative to in-order operations performed by all MMs 14 resident on XA-MP Bus 12 as each MM 14 will execute in-order operations independently or the other MMs 14, with each MM 14 recognizing in-order requests directed to its own address space and accepting and responding to the requests.

MIQ 112 operates in much the same manner as FUIQ 110, with MRSQ 120 tracking all in-order responses appearing on XA-MP Bus 12 in the same manner as FURSQ 118. MREQ 116, however, tracks the in-order requests accepted by the MM 14 relative to all other in-order requests, placing an indication of a request that it has accepted (MYREQ) into MREQ 116 each time it accepts a request. MC 38 detects each in-order request appearing on XA-MP Bus 12 and clocks MP, EQ 116 each time an in-order request is accepted by any of the MMs 14, that is, upon each occurrence of an in-order request which is not canceled by an MCI. As represented, MREQ 116 may therefore contain several MYREQ indications, one for each accepted by the MM 14, MREQ 116 will thereby contain a sequence of request indications which represents the sequence of occurrence of each in-order request that has appeared on XA-MP Bus 12 and wherein each request accepted by the MM 14 is represented by an MYREQ and each request accepted by another MM 14 is represented by another indication, such as a logic "0".

In a manner similar to FUIQ 110, a COMPARE 124 will provide an Own Request (OWNREQ) output when there is a coincidence between an ORDP output of MRSQ 120 and a MYREQ from MP, EQ 116, thereby indicating that the MM 14 is to execute the corresponding in-order request stored in its MC FIFO 68 as the coincidence indicates that this was the next in-order request accepted by the MM 14s of System 10. MC 38 of the MM 14 will respond to the OWNREQ by executing that request.

Further description of the operation and execution of in-order and out-of-order operations will be found in other sections of the description, including the appendices which are a part of this description of System 10.

6. Address Space Mapping

As described previously, System 10 provides a unified environment by performing all operations within a single address space wherein all data, program and information storage functions or the stem that are related to bus operations occupy that single address space. Such information storage functions may include, for example, the memory space in MMs 14, registers of Processor Units 42, and other information storage functions, such as the display memories of video controllers and I/O devices, and the space required to store operating systems and BIOSs, such as the ROM BIOSs commonly used in personal computers.

The management of bus related information storage, however, is distributed among the functional units of the system, so that, for example, MMs 14 are responsible for managing the address locations within that address space that are used by MSEs 36 to store data and programs. In a like manner, the PMs 16 are functionally responsible for managing the address space locations occupied by the bus related registers of PMs 16 while BMs 18 are responsible for managing the address space locations used by video display controllers and occupied by Read Only Memories and other memories for storing such programs and data as ROM BIOSs.

The management of the single system address space is essentially performed by the mapping of the various storage means, such as the PM 16 registers, the physical memory locations in MMs 14, and such storage as is provided in ROMs for ROM BIOSs and as video memory for video display controllers, into the address space. In System 10, each functional unit is therefore responsible for mapping its bus operation related storage spaces into the single system address space. An example of this mapping has been discussed previously with regard to the mapping of the PM 16 registers into the system address space.

Figure 7:
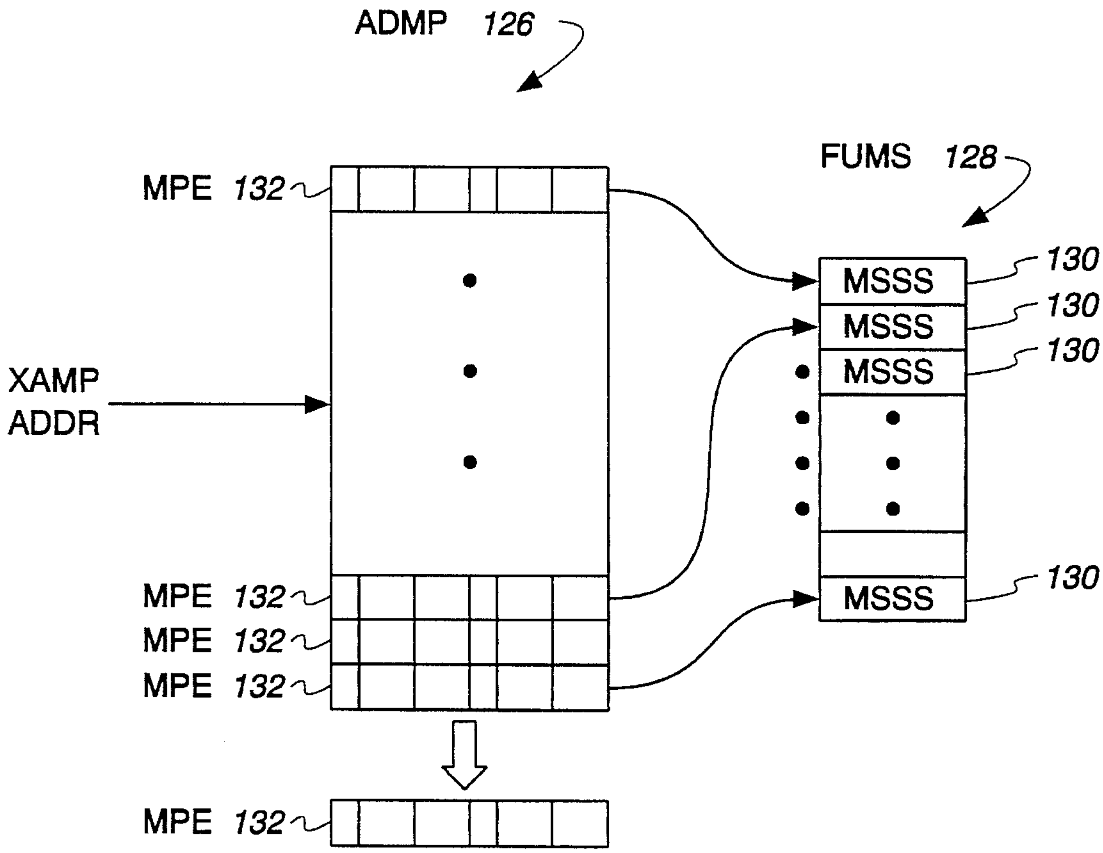
FIG. 7 is a block diagram of address space mapping.

This process is functionally and diagramically illustrated with the aid of FIG. 7, which illustrates the basic mapping function performed in each functional unit. It will be appreciated that the functions described herein may be performed in a number of ways, such as through memory resident tables or through programmed gate array, but that the basic function performed will be essentially the same for each implementation.

FIG. 7 shows the use or an Address Space Map (ASMP) 126 in a functional unit to map and relate system memory space addresses appearing on XA-MP Bus 12 (XAMP ADDRs) into the memory and storage space or spaces in each functional unit, indicated in FIG. 7 as Functional Units Memory Space (FUMS) 128.

As indicated, each RIMS 128 may be organized or partitioned into Memory Space Sub-Spaces (MSSS) 130 which may in turn represent contiguous areas within a single memory space, as in the MSEs 36 of the MMs 14, or individual locations within the memory and storage spaces of or accessible to the functional unit, such as individual ROMs for ROM BIOSs and video memories for video display controllers.

ADMP 126 contains a Map Entry (MPE) 132 for each MSSS 130 of the functional units memory space wherein each MPE 132 also corresponds to an address or range or addresses in the system address space as represented by the XAMP ADDR addresses.

The information contained in each MPE 132 may depend upon the particular functional unit for which the address space mapping is being performed, but will most often at least contain at least a bit represented as bit 134 which indicates that the functional unit contains a memory space (MSSS0 130 corresponding to the corresponding XAMP ADDR address or range of addresses. Bit 134 would be used, for example, in MMs 14 to detect that the MM 14 contains a memory space containing the information indicated by an address provided on XA-MP Bus 12 as part of a memory read request.

Continuing with this example, each MPE 132 may contain further bits or fields that would contain information identifying the row, column and group of SIMM modules containing the corresponding memory locations. Therefore, in addition to quickly identifying whether an address location resides in a given MM 14, the information from the MPE 132 would, with equal speed, translate the address given in the memory request on XA-MP Bus 12 into a physical location in the SIMM modules by concurrently providing the row, column and group numbers of the SIMM modules containing the addressed information and this information can be provided to DRAM CONTROLLER 72 so that a corresponding read operation from the addressed locations in the SIMM modules can be performed without further delay.

In a further example of the address space mapping provided in the functional units of System 10, it may be desirable to offset the address allocations of MSSSs 130 relative to the system address space. An example of such may be in the case of MMs 14 wherein the MMs 14 are to contain a contiguous address space formed of the memory locations of the SIMMs but wherein it is desired to reserve certain low addresses for specific purposes, such as for system or processor registers. In this instance, the functional units outside of MMs 14 would contain registers identifying the address locations to be reserved and the MPEs 132 of the MM 14 ADMPs 126 could be entered into the ADMPs 126 in an offset order, thereby providing an automatic offset in the system address space to memory location mapping performed in the MMs 14. In a similar manner, the coded size information read from the SIMMs may be used by the system to generate ADMP 126 offsets for each MM 14 so that each MM 14 address space to memory location mapping can be offset in a manner to map the individual MM 14 memory locations to form a contiguous address space.

As described, the information contained in the MPEs 134 may differ between functional units, according to the address mapping needs of the functional units, an example of such being the mapping of the Processor Unit 42 registers as compared to the mapping of MM 14 memory locations. In other functional units, the information may, for example, reflect whether the corresponding memory or storage locations are cacheable or non-cacheable or read-only.

Finally, in the present implementation of System 10, the address mapping for the functional units is performed either at system initialization time or beforehand and stored, and is loaded into the ADMPs 126 of the functional units at system initialization.

7. Bus Access Arbitration

As discussed previously, among the system functions which are distributed among the functional units of the system is the contention and arbitration of access to XA-MP Bus 12 by the functional units of the system. The sole exception is MMs 14, which do not arbitrate for access to the bus.

The functional units of System 10, referred to otherwise herein as "slices", each include arbitration logic connected to Arbitration Lines (ARB) 32 to contend for access to XA-MP Bus 12 on a relative priority basis wherein their respective priorities are determined by their "slice" locations along XA-MP Bus 12.

Figure 8:
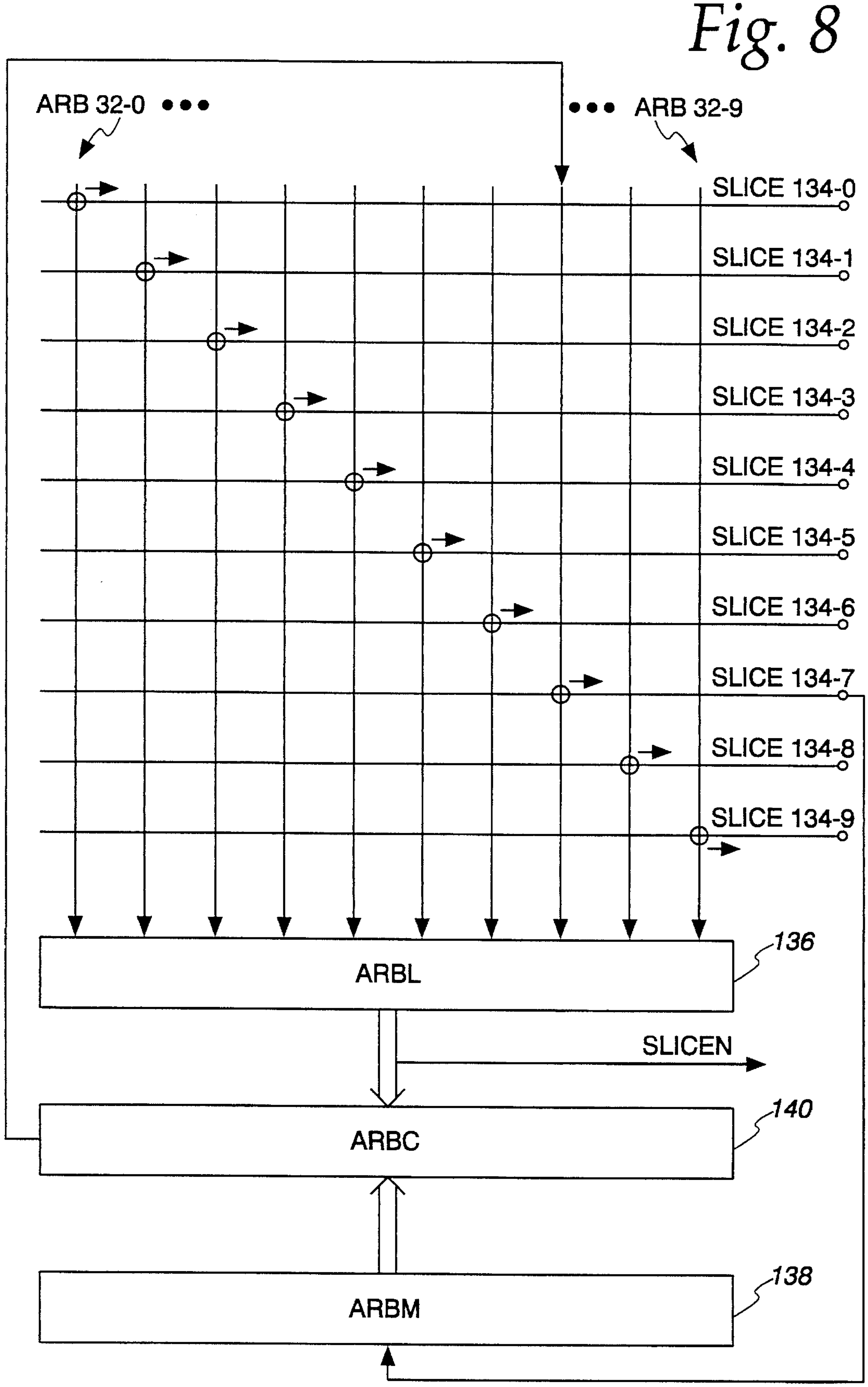
FIG. 8 is a block diagram of a bus access arbitration mechanism.

Referring to FIG. 8, therein is shown a diagrammatic, functional illustration of the arbitration mechanism of System 10. As has been described, arbitration is executed through a plurality of Arbitration Lines (ARB) 32, indicated herein as ARB 32-0 through ARB 32-9. Each slice, or functional unit, of System 10, is indicated in FIG. 8 as one of SLICEs 134-0 through 134-9, thereby representing a system having 10 slices, or functional units. The upper portion of FIG. 8 illustrates the connections of the SLICEs 134 to the ARB 32 lines and the lower portion of FIG. 8 is a functional block diagram representation of the arbitration logic in one SLICE 134.

As indicated, the arbitration logic for each SLICE 134 includes an Arbitration Signal Latch (ARBL) 136 having inputs connected from each ARB Line 32, an Arbitration Mask register (ARBM) 138 also having inputs connected from each ARB Line 32, and Arbitration Control (ARBC) 140. Each ARBC 140 is connected to the ARB Line 32 corresponding to its SLICE 134 to assert its SLICE's own ARB signal onto its own ARB 32 line.

As is diagramically represented in FIG. 8, the connections of each SLICE 134 to the ARB 32 lines is shifted with respect to the other SLICEs 134 as regard the input connections to ARBM 138. That is, each SLICE 134's ARBM 138 has an input connected from ARB 32-0, another connected from AKB 32-1, and so on. These shifted connections are symbolically represented in FIG. 8 by the circles represented at the intersection of one of the connections between an ARB Line 32 and a SLICE 134, wherein the circles indicate connection between the ARB Line 32 and the a first bit input to the ARBM 138 latches, with the order of increasing higher numbered connections being indicated by the arrow adjacent to the circle. It will be understood that the connections to ARB Lines 32 proceed in numeric order across the inputs of each SLICE 134, with the connections "wrapping around" so that each of ARB Lines 32 is connected to an ARBM 138 input of each of the SLICE 134. Each ARB 32 line is also connected to an input of ARBL 136, but through unshifted connections.

In the present implementation of System 10, the BRIDGE 56 is usually assigned the highest priority slice with the PMs 16 occupying lower priority slices. This assignment is not fixed, however, and any functional unit may be plugged into any slice location. The slice locations, and thus the relative priorities, of each slice will then be determined at system initialization, wherein a system master functional unit, usually a BRIDGE 56 will assert a logic level upon its ARB signal output from its ARBC 140. Because of the shifted connections between ARB Lines 32 and the inputs of the ARBMs 138, the logic level from the master unit will appear at successively number inputs across the ARBM 138's of the latches and the input at which the logic level appears at the ARBM 138 inputs of any given slice will determine the slice number, and thus the relative priority of that slice. The inputs from ARB Lines 32 are latched and stored in each slice's ARBM 138 to be subsequently used by each slice as a "mask" in determining the time of access of the slice to XA-MP Bus 12 as described further below.

In the instance when only one slice has asserted its ARB Line 32, that slice will gain control of XA-MP Bus 12 and no arbitration is required. In the instance wherein several slices assert their ARB signals during the same bus clock cycle, however, the slices must arbitrate among themselves to determine which slice will have first access to the bus. In this regard, it should be noted that the arbitration mechanism alternates latches ARB signals into the SRBLs 136 and performs arbitration operations in the ARBCs 140 on every clock cycle.

If a number of slices assert their ARB signals during the same clock cycle, those slices form a "group" which will retain control of XA-MP Bus 12 among themselves by continuing to assert their ARB signals until each has gained access to the bus, each relinquishing access to the bus and releasing their ARB signal after it has executed its bus operation. The selection and sequence of bus accesses among the slices forming a group are performed through the "masks" stored in each slice's ARBM 138 at system initialization. Each slice in a group will, at each clock cycle, compare its mask to the current ARB signals latched in its ARBL 136, which are latched again at each clock cycle. This operation is usually performed by logically ANDing the slice's mask with the currently latched ARB signals. If a slice's ARBC 140 finds that there is a higher priority slice with an ARB signal currently latched into the slice's ARBL 136, the slice yields priority, and control of the bus, to the higher priority slice.

The slices in the group will then arbitrate among themselves at each successive clock cycle, gaining control of the bus according to their relative priorities as each higher priority slice completes it bus operation. Each slice will, upon completing its bus operation, relinquish control of the bus and cease to assert its ARB signal.

According to the priority arbitration rules implemented in the logic circuitry of each slice's ARBC 140, a slice which is a member of a group and which has either completed its bus operation and relinquished control of the bus, or has dropped out of its group by ceasing to assert its ARB signal, may not attempt to assert control for the bus until every member of the group has either completed its respectively bus operation or has dropped out of the group by ceasing to assert its ARB signal as a member of the group.

Further according to the arbitration rules implemented in the ARBCs 140, no slice which is not part of a group can assert its ARB signal or attempt to join the group until every member of the group has either completed its bus operation or has dropped out of the group The exception to this rule is that a high priority slice may break into a group, but cannot break into two consecutive groups if it was NAKed out of the first group.

System 10's arbitration mechanism permits the overlap of bus access arbitration's but not of bus access, by providing a means in ARBC 140 whereby a slice may determine, from the ARB signals, that only one slice remains in a group, or that only a single slice has requested access to the bus at that time, effectively a group with only one member. The timing through the bus line latches at each end of each bus associated line, including the ARB 32 lines, and the alternate execution of ARB signal latches and access arbitration's on successive bus clock cycles permits a potential requester to ascertain that the ARB 32 line of a current owner of the bus will be released on the next bus cycle and to assert its ARB signal during that bus cycle, so that its ARB signal will be latched into the ARBLs 136 of the slices at the next bus cycle. Waiting requesters may thereby initiate the next arbitration for the bus while the last member of a previous group of a single possessor of the bus is completing its bus operation.

Finally, it has been previously described that certain requests for reads of information will result not in an in-order but in an out-of-order operation wherein the request is canceled in memory by another functional unit's assertion of an MCI signal and wherein the functional unit canceling the memory operation will thereafter fulfill the request by performing an out-of-order operation. As has been described, in an out-of-order response to a request the responding unit will arbitrate for access to the bus and when control of the bus is obtained, effectively couple together the operation of ADDR Bus 28, CMD Bus 30 and DATA Buses 26 by placing the requested information on the bus together with a command indicating that this is an out-of-order response and the address of the functional unit that submitted the request.

As has also been described, a requesting functional unit does not identify itself by transmitting its address or other identification when making a request for a single or multiple bus word or for a single or multiple cache line as the request is expected to be fulfilled as an in-order operation, as described previously. It is necessary for the out-of-order responder to identify the requester when executing the out-of-order response and this is performed through the arbitration mechanism. That is, while the requester does not transmit an identification of itself, the requester's slice number is available at each other functional unit of the system and an out-of-order responder which asserts an MCI to cancel the memory operation will read and store the requester's slice number, identified in FIG. 8 as Slice Number (SLICEN) from its ARBC 140, thereafter using that slice number as the requester's address when executing the out-of-order response.

Further details of the structure, function and operations of the arbitration mechanism may be found in the appendices pertaining to the functional units of System 10 and in Appendices 5, 10 and 11, respectively titled "Arbitration Logic –A, –B and –C".

8. Bridge Interface Controller 56

Figure 9:
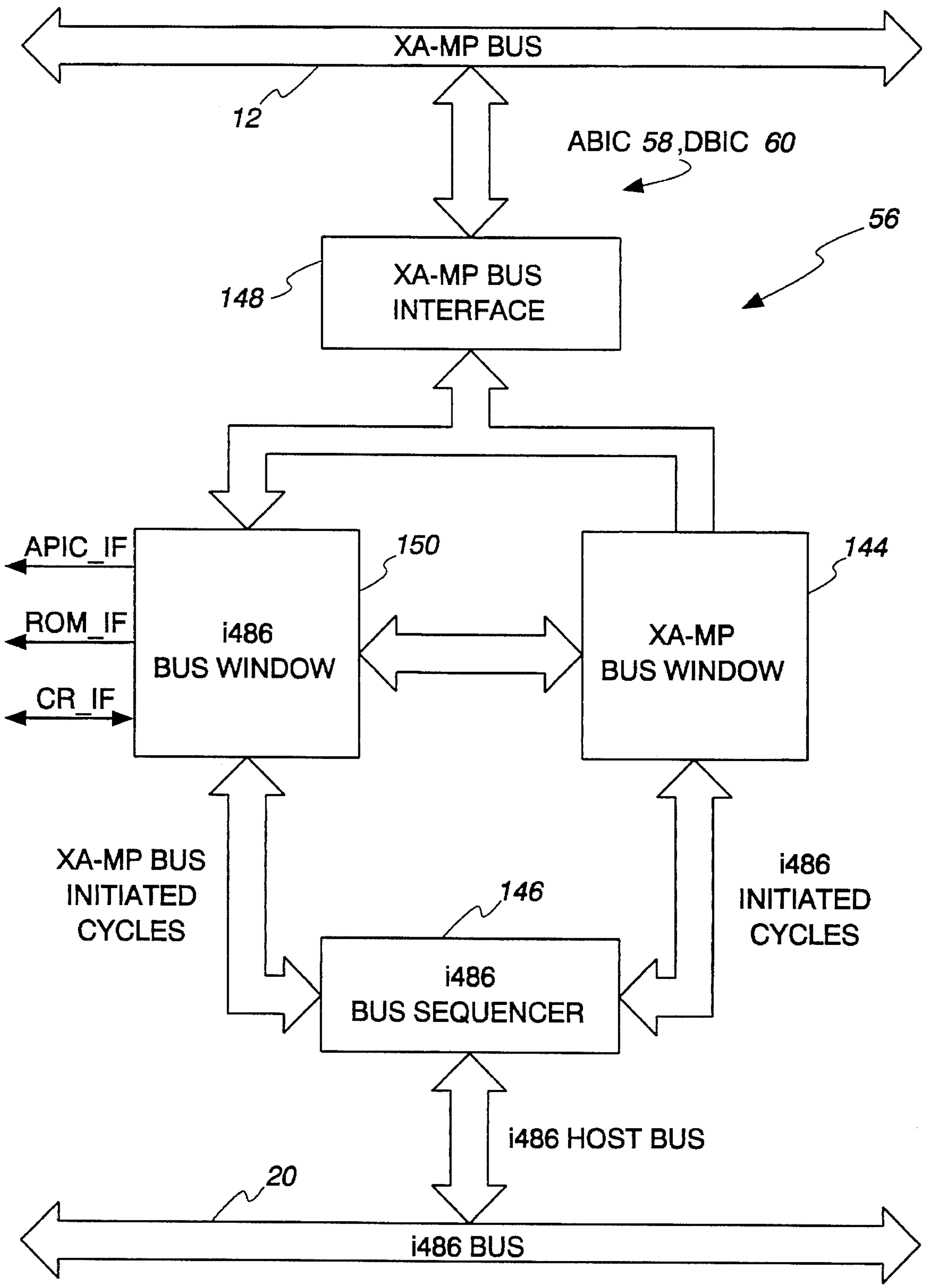
FIG. 9 is block diagram of an I/O bridge.

FIG. 9 presents a functional overview block diagram of the bridge interface controller 56 which interconnects the XA-MP bus 212 and the AS bus 20, which (in the preferred embodiment) is an Intel i486 bus identical to that which interconnects a conventional Intel i486 processor and its associated RAM memory to the other components of a standard personal computer system.

Figure 19:
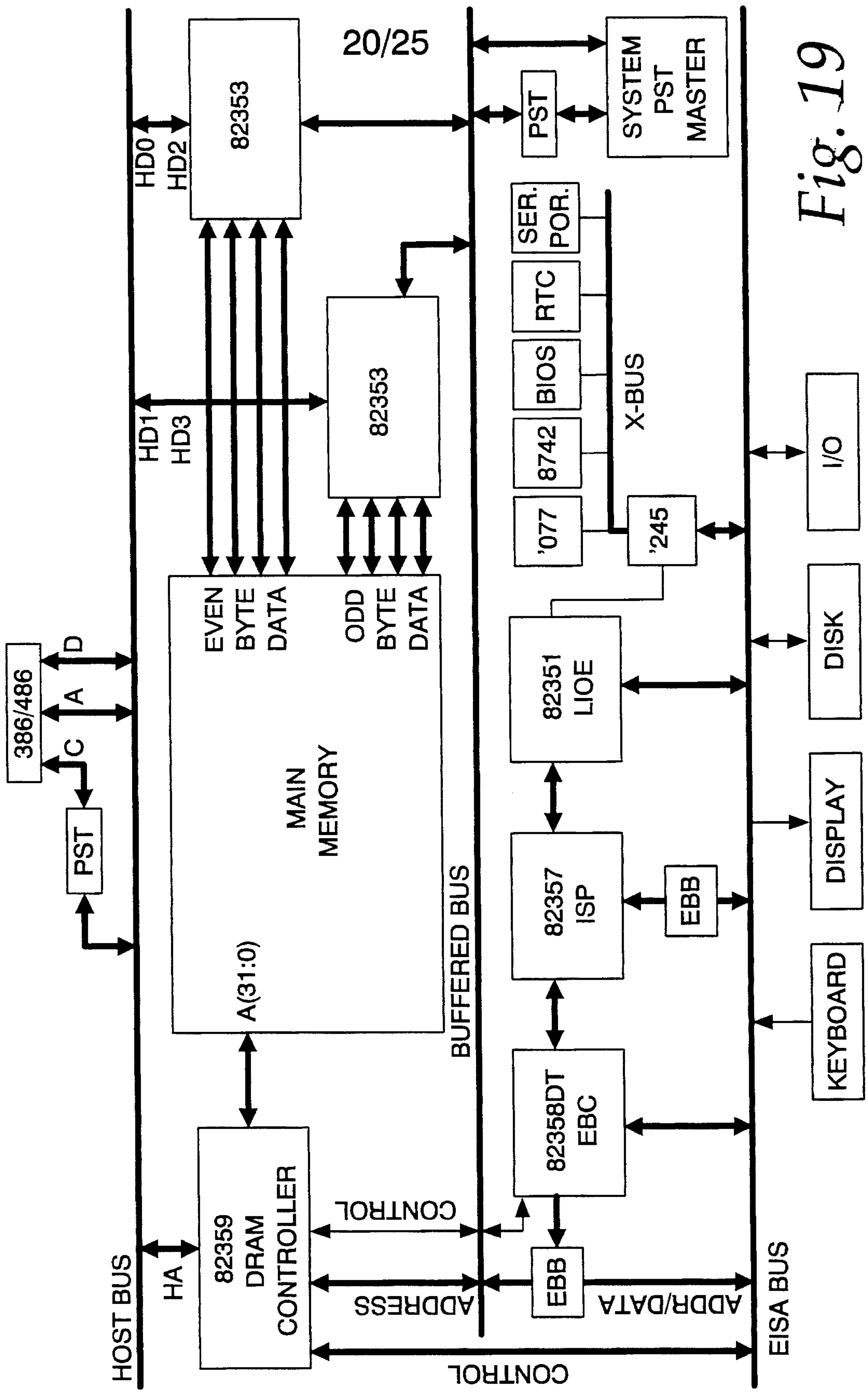
FIG. 19 is a block diagram of a personal computer.

The bridge interface controller 56 can be mounted on the mother board of a server workstation, where the AS bus 20 would connect to a conventional EISA or MCI PC-compatible I/O bus and controller system of the type used in conventional IBM PC compatible-file servers and the like. Presumably, the motherboard would be equipped with EISA or MCI slots for accessory cards, such as local area network adapter cards. It might also drive an SCSI bus leading to one or more hard disk drive systems or other type of standard disk drive controller system. See, for example, FIG. 19 which presents a block diagram of a typical PC 142.

It is also contemplated that associated with the AS bus there will typically be standard PC support hardware, such as an interrupt controller, several direct memory access devices, and bus mastering hardware that permits accessory devices to gain access to and control of the AS bus 20. Most typically, direct memory access devices carrying out such tasks as disk reads and writes will, in response to data output commands received from the central processing units, set up direct memory access (DMA) reads and writes to and from the disk drives over the EISA or MCA bus controller and the bridge interface controller 56 to and from the main system RAM.

With respect to FIG. 9, functionally the bridge interface controller presents a XA-MP bus window to the AS bus 20 through which DMA controllers and other bus masters connected to the EISA or MCI bus can address data store and retrieval commands in precisely the same manner as if these commands were directed to the RAM memory associated with a conventional i486 microprocessor. These commands pass through a sequencer 146, through the window 144, and through a XA-MP bus interface 148 to the XA-MP bus 12, although many of these commands can be satisfied by reference to a cache (to be described) within the bridge interface controller 56 without any need to access the XA-MP bus 21.

The bridge interface controller also presents an i486 bus window 150 to the XA-MP bus 12 through which the multiple processors connected to the XA-MP bus 12 can access directly anything connected to the EISA or MCA bus, such as serial and parallel communication ports, VGA or other display adapters, and ROM-based program code. Such accesses are never cached but pass directly from the XA-MP bus 21 through the interface 148 to the i486 bus window 150 and the sequencer 146 to the AS bus 20 and to the various accessories beyond.

Figure 10:
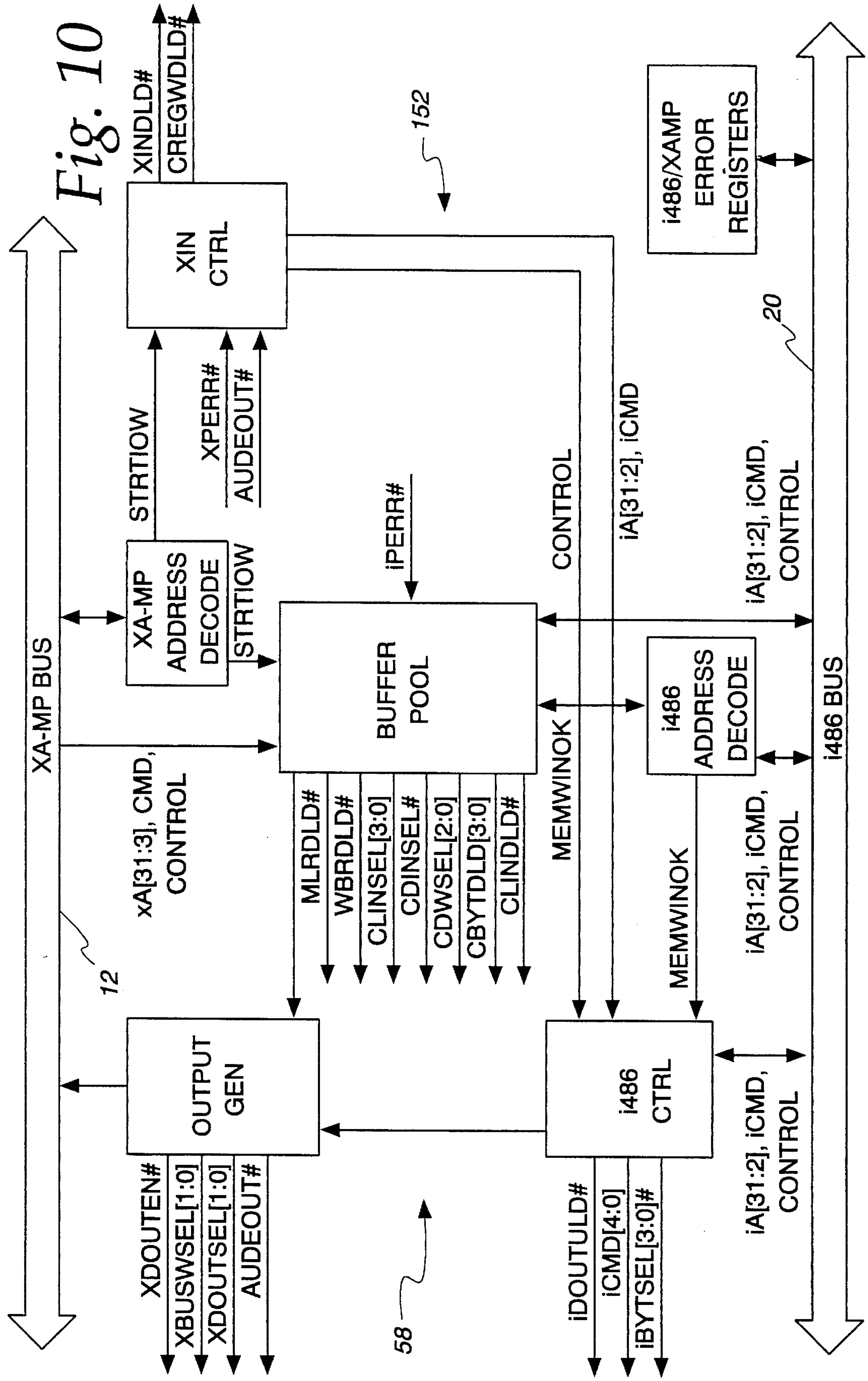
FIG. 10 is a block diagram of a bridge bus interface controller.
Figure 11:
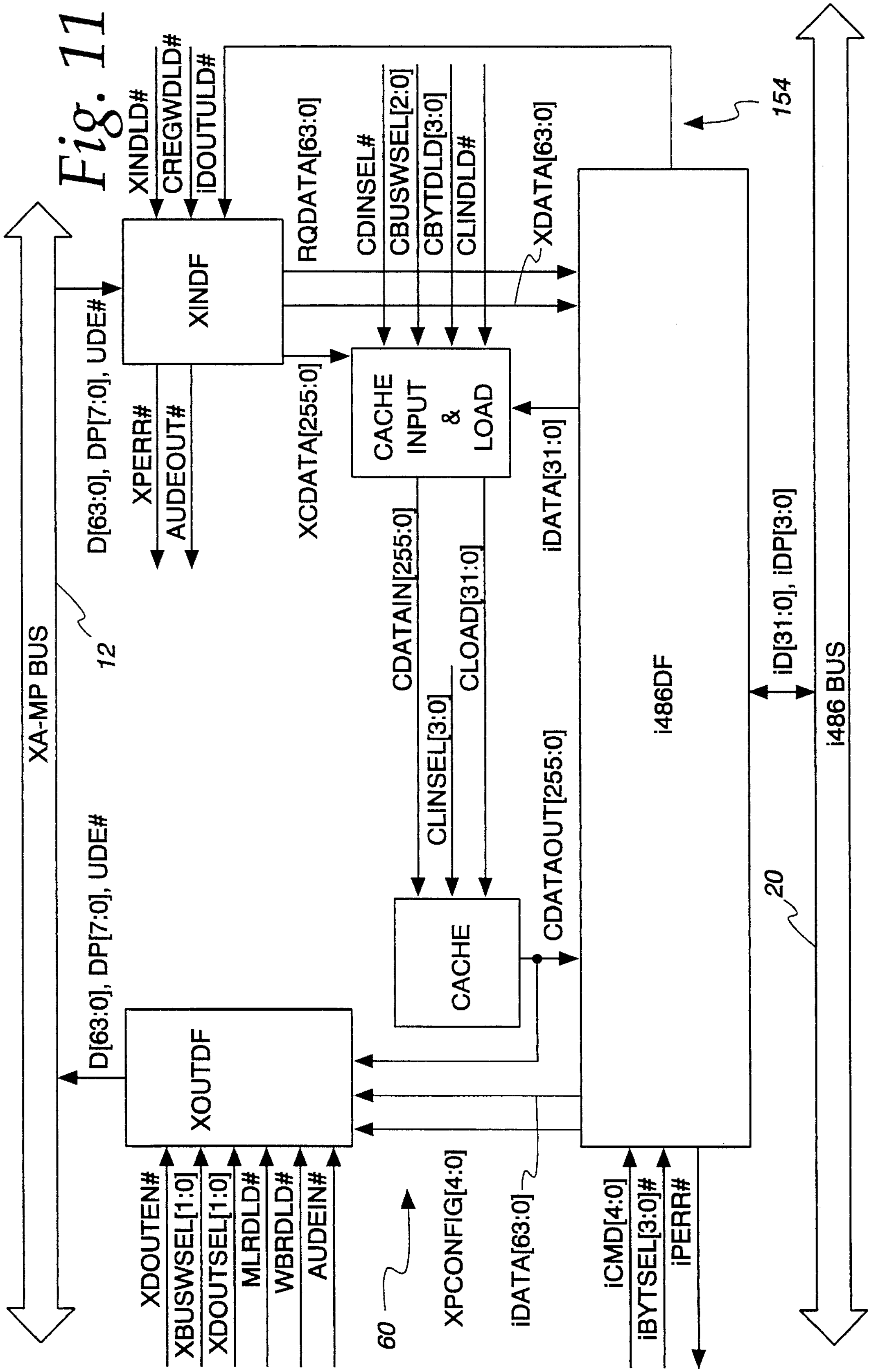
FIG. 11 is a block diagram of a bridge cache.
Figure 12:
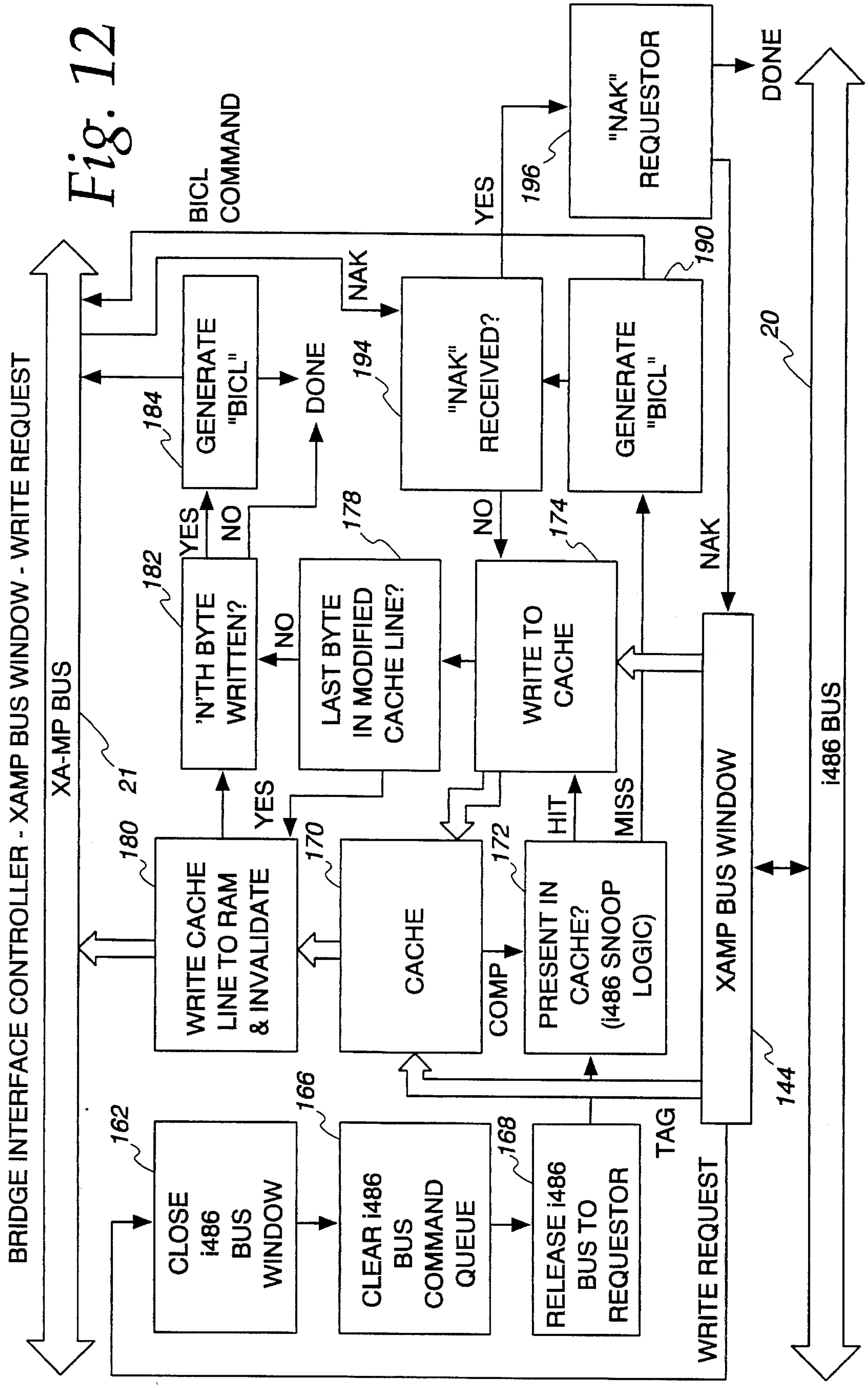
FIG. 12 is a block diagram of a bridge interface controller for a write request.
Figure 15:
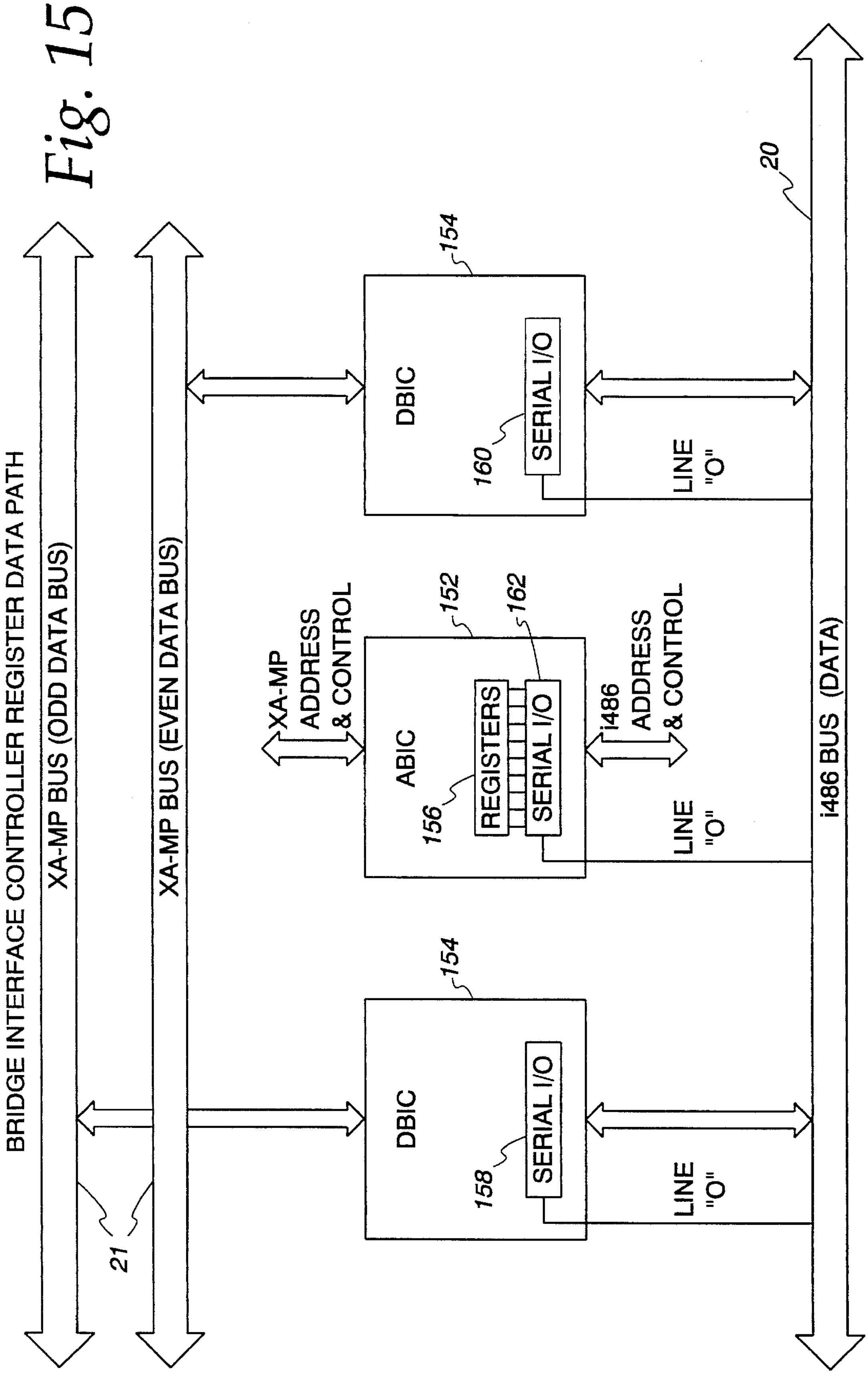
FIG. 15 is a block diagram of a bridge interface register data path.

From a hardware point of view, the bridge interface controller is constructed from three LSI chips; an ABIC chip 152 (FIG. 10) and one or two DBIC chips 154 (FIG. 11). These are connected to the busses 20 and 21 as is illustrated in FIG. 15. Each DBIC chip 154 connects to a respective one of the two data busses within the XA-MP bus 21, and both connect to the AS bus 20. Both contain cache memory, and the associated address tags are contained within the ABIC 152. The bus address and control lines connect primarily to the ABIC 152, which contains most of the bridge control logic. The state registers 156 which define the state of the bridge interface controller are also contained within the ABIC 152. Since these registers must be program accessible, serial I/O interfaces 158, 160, and 162 are provided whereby register values may be serially shifted between the DBICs 154 and the ABIC 152 over data line "0" of the AS bus 20 so that the registers 156 can be loaded from and unloaded to the data bus portions of the XA-MP bus 21. FIGS. 11 and 12 illustrate what elements arc present on each type of chip. The remaining figures do not distinguish between the two types or chips, but consider the bridge interface controller to be a unitary device. An explanation of the signals seen in FIGS. 11 and 12 can be found in the Appendices.

FIG. 12 illustrates in a functional manner those elements of the bridge interface controller 56 that participate in the processing of data write requests originating from bus master or direct memory access devices residing beyond the AS bus 20 in the EISA, ISA, or MCA or SCSI bus system.

When an AS bus write request is received by the XA-MP bus window 144, the bridge interface controller 56 first closes the i486 bus window 150, temporarily cutting off CPU access to the AS bus (step 162). Any pending CPU commands (stored in a i486 command queue 164 shown in FIG. 14) are promptly executed and cleared out (step 166). Next, the bridge interface controller 56 releases the AS bus 20 (step 168) for use by the DMA or bus master or other device.

Next, if it is a write request, a cache 170 is tested to see if it contains a cache line corresponding to the specified address (i486 snoop logic 172). The tag portion of the address presented to the window 144 is fed into the cache 170 and a compare signal signals to the snoop logic 172 whether the line of data exists within the cache 170. If the line is present, then a HIT signal causes a write to cache operation (step 174) to be carried out. If that is the last byte in the cache, and assuming that this cache line contains modified bytes (as marked by modified bits 174 shown in FIG. 16—step 180 in FIG. 12), then at step 180 the cache line is automatically written back to RAM and is freed up for use to receive a later incoming cache line of data, assuming a multiple byte or word transfer is in progress. By thus freeing up a cache line as soon as it is full of incoming data, the data input process is confined to two cache lines and does not overwrite the entire cache, thereby interfering with other input or output transfers that may be in progress simultaneously. The cache thus functions as if it were a buffer for incoming memory write requests, yet behaves as an I/O cache at other times and for the central processing units, as will be explained.

Finally, at step 182, an optional test can be carried out to see if the "n" th byte in the cache line (where "n" is adjustable) has been written. If it has, and we are nearing the end of this cache line, the controller 56 at 184 generates a "BICL" command, which is sensed by all the other caches associated with the multiple processors. If any of those caches contains a modified copy of the next sequential cache line modified, this "BICL" command causes them to write the modified line back to RAM and to mark their cache entries "invalid". Likewise, any caching unit cache that contains an unmodified copy of this next sequential change line mark their cache entries "invalid." This "BICL" command ("Bridge Invalidate Cache Line" command), without the need for a data transfer, thus sets up the system to receive data bytes in the bridge cache. If any central processing unit attempts to access this same cache line while it is being loaded with incoming data, snoop logic 186 (FIG. 16) associated with the XA-MP bus detects that this cache line is marked "modified" and NAKs the memory request attempt until, at step 188, the altered bytes are restored to RAM memory (by WBW commands, with the memory merging the altered bytes with the remainder of the cache line).

If the cache line is not already present within the cache 170, as indicated by the snoop logic 172 generating a MISS, then a BICL command is generated at 190 to insure that only RAM has an updated copy of the cache line, and at step 174 the incoming data is written into an empty cache line in the cache 170, marked with its readability bit 192 (FIG. 16) set to indicate it contains some undefined data and with the appropriate ones of its modified bits 176 (FIG. 16) set to indicate which are the new, incoming data bytes and which are invalid bytes. But if some other cache contains a modified copy of this particular cache line, the snoop logic 186 associated with that particular cache generates a NAK signal (detected at 194) to give the cache unit time to return the modified value to RAM. The peripheral device is stalled until the BICL is accepted and the modified value has been returned to RAM. In most cases, the steps 182 and 184 will have caused the BICL command to go out at an earlier time, so that this NAK and the subsequent delay will not occur.

FIG. 13 illustrates in a functional manner those elements of the bridge interface controller 56 that participate in the processing of data read requests originating from bus master or direct memory access devices residing beyond the AS bus 20 in the EISA, ISA, or MCA or SCSI bus system.

Next, in the case of a read, a cache 170 is tested to see if it contains a cache line corresponding to the specified address (i496 snoop logic 172). The tag portion of the address presented to the window 144 is fed into the cache 170 and a compare signal signals to the snoop logic 172 whether the line of data exists within the cache 170.

If the cache line is present, then a HIT has occurred, and step 198 transfers the requested data from the cache to the waiting device. At step 200, if the "n"th byte, where "n" is adjustable", has just been read, then optionally at 202 a RCL command is issued to cause the next successive cache line of data to be retrieved from RAM (or from some cache where it exists in modified form). If the cache line data is not present, then a MISS occurs, and step 204 initiates an RCL command that retrieves the cache line from RAM memory (or from some other cache where it has been modified). To save time, at the same time the new cache line is loaded into the cache it also bypasses the cache and proceeds directly to the requesting device over a parallel path (step 205).

Figure 14:
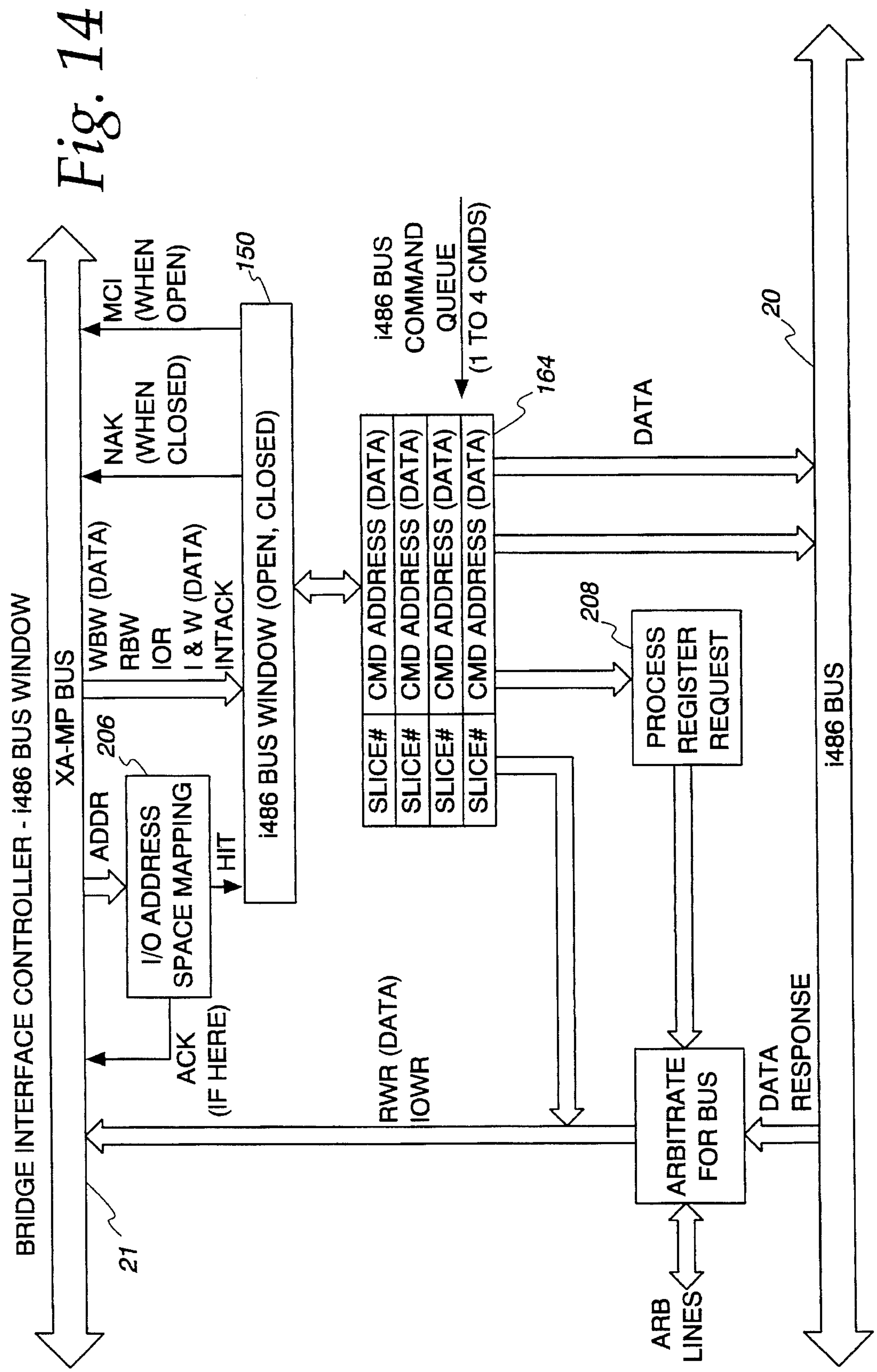
FIG. 14 is a block diagram of a bridge controller for a bus window.

Data reads and writes initiated by the multiple CPUs and directed at devices beyond the bridge interface controller are directed to the i486 bus window 150 shown in FIG. 14. These requests may be of two types: actual CPU FO requests, which require acknowledgment in the case of writes, and CPU memory read and write requests that are to be mapped into the AS Bus 20 address space in some manner. The preferred embodiment, at 206 in FIG. 14, includes a variety of such AS Bus 20 address space mappings, including the following:

ISA compatible mapping of the lower few megabytes of RAM memory to the memory address side of the AS bus address space, such that blocks of memory in 4K, 16K, 64K, and 1 Meg sizes can be marked read only (read AS bus, write to RAM), write only (write to AS bus, read from RAM), read/write (reads and writes to AS bus), and RAM only (no AS action). This enables ROM to be shadowed in RAM, some RAM in AS bus space to appear amidst RAM generally, as is required for VGA and EGA video graphics controllers, and RAM used for shadowing to be effectively made read only. Also, access to some RAM can be switched on and off as needed by various PC ROM BIOS programs. The need for all of this will be apparent to all those skilled in the design of IBM PC compatible computer systems and needs not be explained here in detail.

Four relocatable windows are also provided that map very high memory addresses (above the starting address in the base register "relowin_base") into two 4 MB and two 8 MB windows in AS address space. This facilitates the use of video graphics controllers without interfering with the operating systems which require all of the lower 16 MB of memory for their own purposes.

Another window, variable in size from 16 bytes to 4 gbytes, maps XA-MP memory address cycles into AS bus I/O address space cycles. This window is defined by the registers "begin-con" and "end_con".

All of these AS address mappings and Read only, Write only, (etc.) characteristics are defined by values stored within the registers 156 (FIG. 15) that result in the AS bus address mapping 206 (FIG. 14) which causes the i486 bus window 150 to recognize and to intercept memory and I/O read and write requests addressed to the devices beyond the bridge interface controller 56 and to intercept those requests.

XA-MP bus accesses into the AS bus address space are simply accepted, ACKed and MCIed, and processed (if they are not NAKed because the command queue 164 is full or because the i486 bus window is closed pending action following steps 162 in FIGS. 12 and 13 when a DMA or bus master data transfer is occurring). An MCI cancels any response by normal RAM and advises the CPU making the request that the response will be an "out of sequence" response.

Up to four such requests may be queued up in the bus command queue 164 along with the slice number of the requesting central processing unit. The commands are applied to the AS bus 20. When a response comes back, the bridge controller 56 arbitrates for the main bus (and gains it quickly, since it is assigned the highest priority. Next, it generates an RWR command addressed to the requesting slice and accompanied by the returned data; or, in the case of an I/O address space write, it simply sends out the IOWR (I/O write response) command using only a bus address cycle and no data cycles.

For IBM-PC compatibility, some bridge interface controllers can be designed to respond to an interrupt acknowledge command. When an i486 or Pentium processor from among the multiprocessors acknowledges a hardware interrupt and calls for the interrupt number, the MBC 50 generates an INTA command which is passed to the AS i486 bus as if an i486 bus were acknowledging an interrupt and requesting the interrupt number. The interrupt number, returned by the EISA or MCI logic, is then passed back to the MBC 50 in the form of an RWR command with the interrupt number as data, and is ultimately presented to the Pentium or i486 that needs it.

Bridge interface controller register access commands are processed by step 208 as shown in FIG. 15.

9. Cache Snoop Logic

Figure 16:
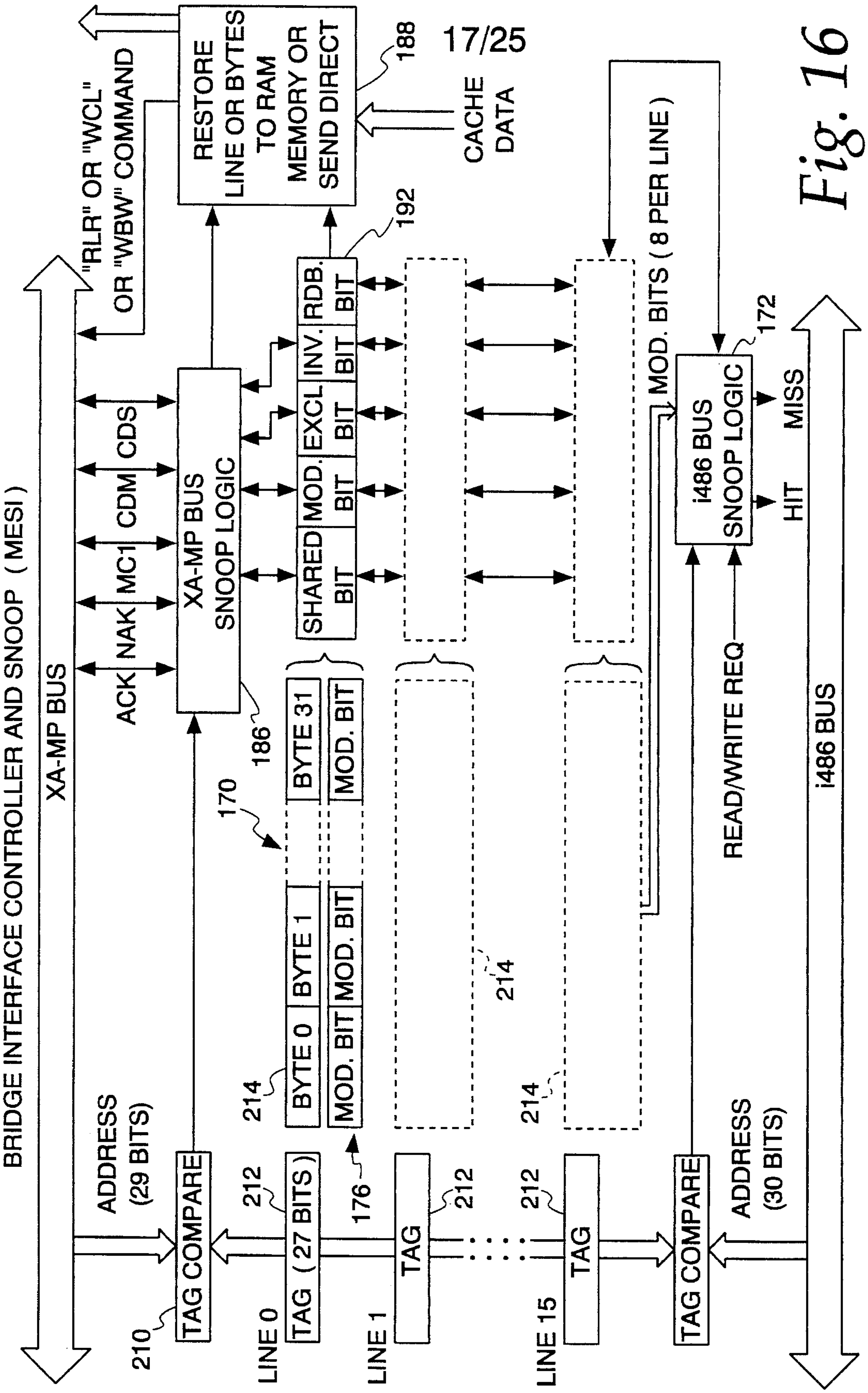
FIG. 16 is a block diagram of a bridge interface controller and snoop.
Figure 17:
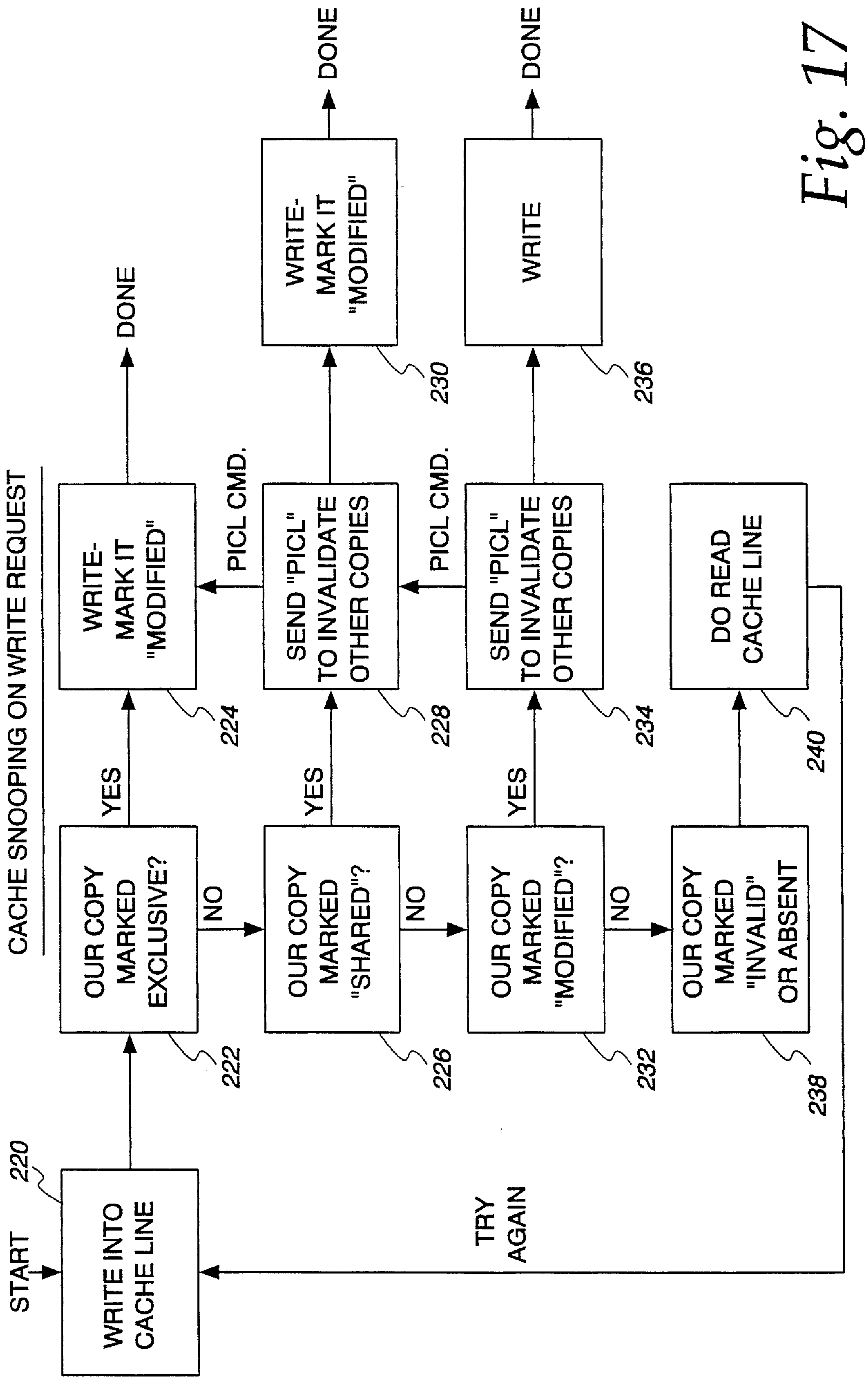
FIG. 17 is a flow chart of snooping on a write request.
Figure 18:
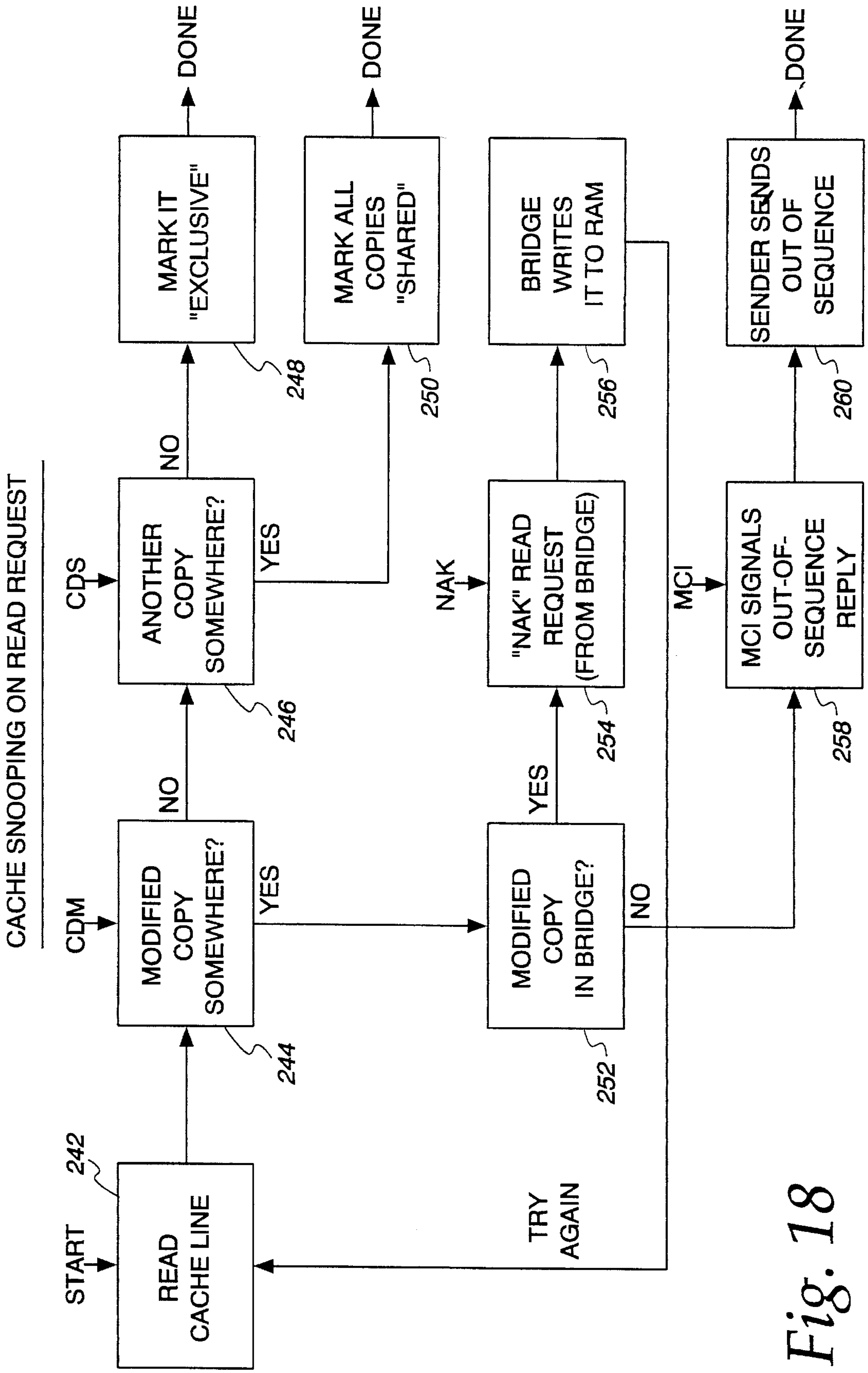
FIG. 18 is a flow chart of snooping on a read request.

FIGS. 16, 17, and 18 illustrate the structure (FIG. 16) and functional operation (FIGS. 17 and 18) of the MESI cache snooping protocol that enables multiple CPU and bridge interface controller caches to function simultaneously and cooperatively in a symmetric bus caching system in which no one party ever owns a cache line. It thus differs from prior MOSI system (where Ownership is replaced by Exclusive access, which means sole but not exclusive access to a cache line).

The convention is as follows: A cache can contain no copy of a cache line; or it can be the Exclusive (meaning only) cache to contain a particular cache line; or, if others also contain a copy, it can be Sharing access to a cache line; or, if the cache line has been altered, it is a Modified cache line and no one else can have it. or, if someone else Modifies their copy, we mark our copy Invalid as if we did not have it, freeing the space for reuse, and sending modified data back to memory.

Accordingly, each cache line is accompanied by flag bits M (for "modify"). E (for "exclusive"); S (for "shared"); and I (for "invalid"). And as shown in FIG. 16, the signals ACK (for "I have it"), NAK (for "try again later"), MCI (for "it will come to you out of sequence"), CDM (for "I have it modified") and CDS (for "I am sharing it") are sent to all of the slice devices that have caches. These enable the caches to snoop each other's contents as addresses are presented on the XA-MP bus 21.

As illustrated in FIG. 16, each cache contains tag compare logic 210 that is able to compare the tag portion of any XA-MP bus address with the tags 212 contained within the local cache 170, providing a compare signal to the XA-MP bus snoop logic 186 if the address exists within the cache 170. The XA-MP bus logic 186 first generates an ACK signal (although the RAM memory may do this; then the snoop logic 186 examines the MESI bits 192 and signals as follows:

if the Exclusive bit or Shared bit is set, it generates the CDS signal;

if the MOD bit is set, it generates the CDM signal, and also the MCI signal to signal that step 188 will send the modified cache line back by an out-of-sequence cache-to-cache RLR transfer (but the bridge controller cache NAKs the request and sends the altered data to RAM using a WCL (if all data is valid) or one or more WBWs (if some is invalid), NAKing until this is done, and then marking the cache line invalid;

otherwise there is no response.

The cache associated with the bridge interface controller differs from the others in that it has the modified bits 176 indicating which bytes are valid data and the readability bit 192 indicating whether the cache line contains only fully readable data (as during output to peripheral device operations). The step 18g, in the case of CPU caches, transfers modified data cache to cache using an out of order RLR transfer; and in the case of bridge controller transfers, transfers modified data back to RAM and NAKs the requesting processor. The bridge controller cache also works as a cache to peripheral devices, as indicated at 172 in FIG. 16 and in FIGS. 12 and 13, but it is modified as explained above to function more as a buffer for DMA transfers into RAM and the like.

a) Write Cycles

The cache snooping operations are summarized in FIGS. 17 and 18: For a CPU cache, in response to a write into a cache line 270, the local cache snoop logic 270 checks to see if the local copy is marked "Exclusive" at 222; and if so, at 224, it is marked "Modified." Nothing more needs to be done, since no other cache contains a copy. No XA-MP bus address or data cycle is required.

At 226, if it is marked "shared," then a "PICL" command is sent out to the other snoop logic units to invalidate other copies of this data that exist in other caches, and again it is marked "Modified". All other copies are marked "Invalid" by their local snoop logic. This takes only a XA-MP bus address cycle and no data cycles.

At 232, if it is marked "Modified," the same steps are taken. Note that the PICL command can detect incoherency errors, since no one else should have a "modified" or "exclusive" copy.

At 238, if our local cache copy is invalid or missing, then one does a RIL and returns to step 220 and re-tries to write into the cache line.

For a bridge cache, the local cache snoop logic 270 checks to see if the local copy is marked "Modified". If it is, nothing more needs to be done.

If it is not marked "Modified", a BICL command is sent to the other snoop logic units to invalidate other copies of this data that exist in other caches, and it is marked "Modified".

This forces the cache containing the modified data to NAK and to send the data back to RAM (see steps 184, 190, 194, and 196 in FIG. 12).

For CPU caches, the modified data is not returned to RAM until it is forced out of the local cache by some new transaction. Then it is moved into the cache writeback register (where it is still in the active cache) and it is sent back to memory by a WCL request.

b) Read Cycles

Read requests, where the data is not present in the local ache (FIG. 18, step 242), begin with execution of the RCL read cache line command. The RAM memory ACKs if the address is valid. The snoop logic 186 in all of the caches examines the address and the local cache for a collision, and then checks the status of the MESI bits if there is a hit. The CDM signal signifies that a modified copy exists in some cache; the CDS signal signifies that an unmodified copy exists somewhere. If there is no CDM or CDS response (steps 244 and 246), then the returned cache line is marked Exclusive at 248. If another copy exists somewhere (step 246), then all copies are marked "Shared." If a modified copy exists in a CPU cache (step 252), then the cache containing the modified copy responds with the MCI signal (step 258) and initiates an out-of-sequence transfer of the modified cache line directly cache to cache at step 260. A quick sequence of such requests for the same modified value can cause a waterfall effect where it is transferred rapidly from cache to cache, only one cache (the last one) having its "Modified" signal set.

If the cache containing the modified value is a bridge controller cache (step 252), the data is probably just arriving from a DMA transfer into RAM. In this case, the read cache line request is NAKed by the bridge controller snoop logic, and the modified data is written into RAM (step 256 in FIG. 18 and step 188 in FIG. 16).

Further details of the bridge I/O logic and operation may be found in Appendix 9, titled "Bridge Interface Controller".

10. Processor Modules 16

The above described features, structures and operations of System 10 are implemented in essentially all functional units of the system, so that principle operational features of PMs 16 will be understood from the above discussions and from the relevant appendices pertaining to the elements of PMs 16, which include Appendix 6, titled "Memory Bus Controller", and Appendix 7, titled "Processor Data Path".

The following will therefore describe PMs 16 at a summary block diagram level, to aid in comprehension of the relevant appendices and the relationship of the features of PMs 16 to the previously described features of System 10.

Figure 20:
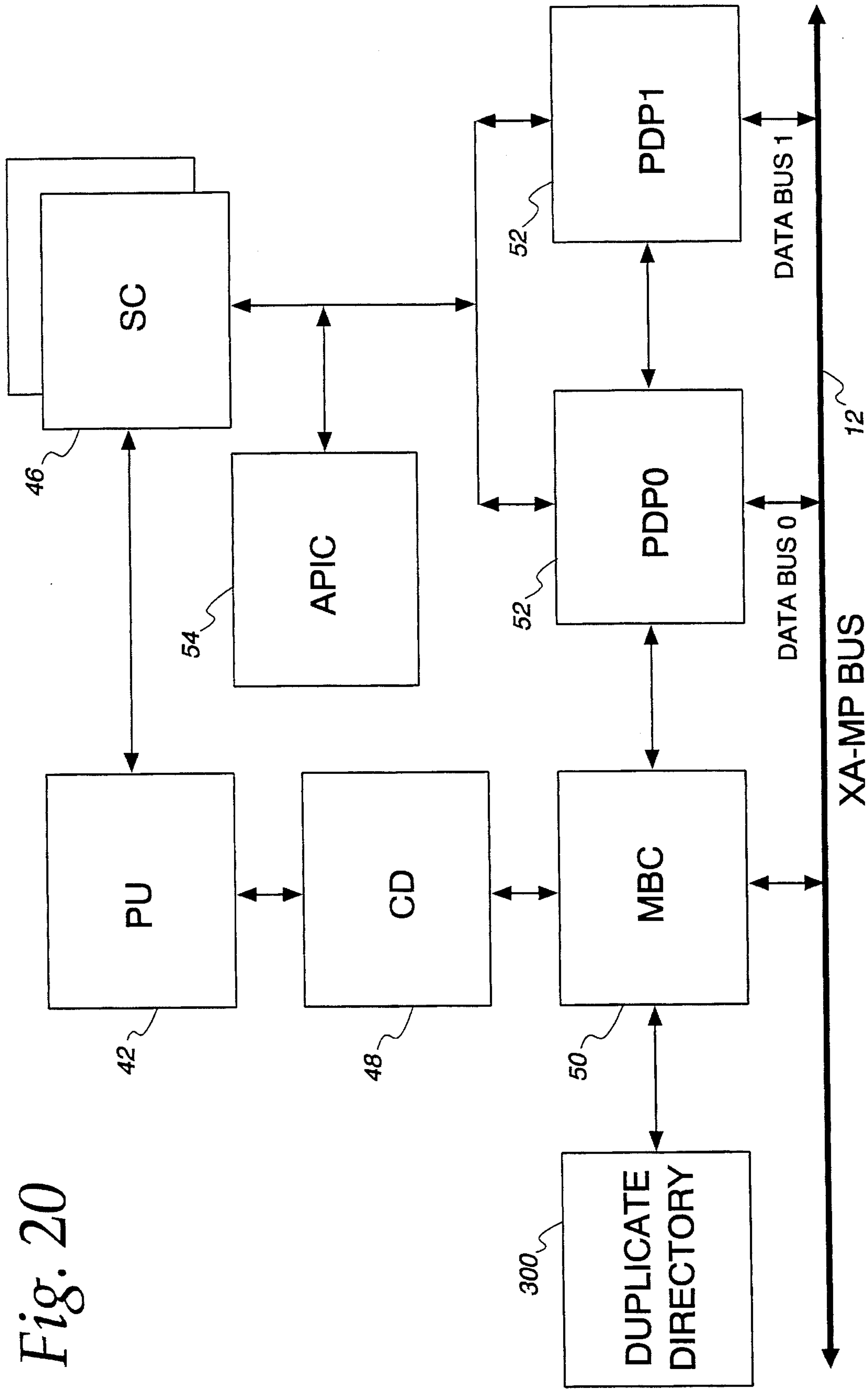
FIG. 20 is a block diagram of a processor functional unit.

Referring to FIG. 20, therein is present an overall block diagram of a PM 16, as shown, and as discussed previously, each PM 16 includes a Processing Unit 42 which includes a primary cache supporting data and instruction reads and writes for the Processing Unit 42 in association with Secondary Cache Mechanism 46 and a Secondary Cache Directory 48 for support of direct Processor Unit 42 operations. It should be noted that Processor Unit 42 is designated by the title P5 and the Cache Directory 48 and Secondary Cache 46 by the titles CSC and CSCs in the Appendices in reference to the presently preferred implementation of PMs 16 wherein P5 is a Pentium microprocessor and C5C and C8C are associated cache mechanisms from Intel Corporation and are referred to by these titles in the appropriate product documentation.

Each PM 16 further includes an Advanced Processor Interrupt Controller (APIC) 54 for interrupt handling and a Duplicate Directory 300 for storing a duplicate of the tag directory of Cache Mechanism 44 for use in snooping operations.

Each PM 16 also includes, as previously described, an MBC 50 for controlling PM 16 operations with respect to XA-MP Bus 12 and two data paths in the form of two PDPs 52, one for the even Data Bus 26 and one for the odd Data Bus 26.

a. Memory Bus Controller 50

Figure 21A:
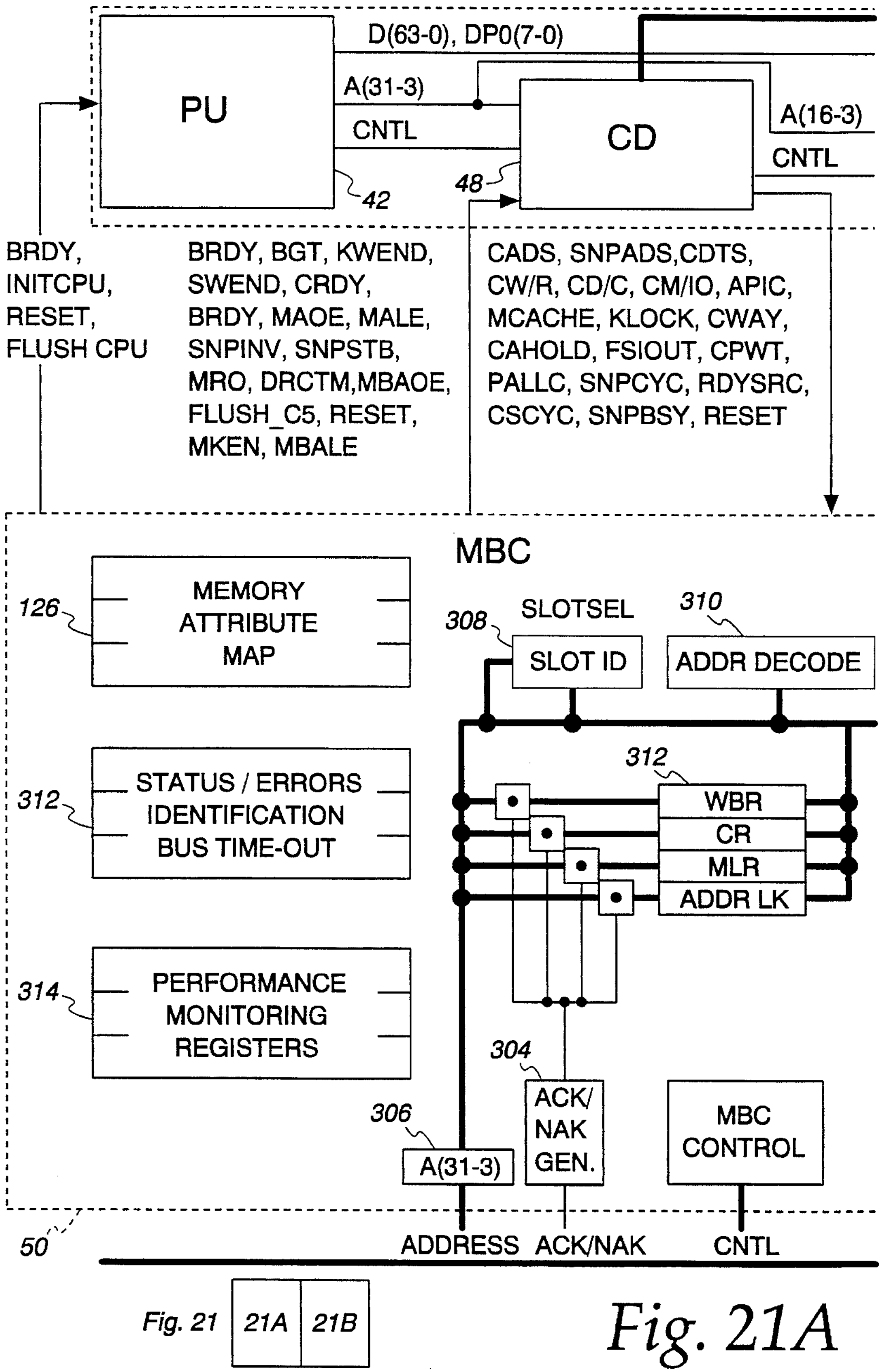
FIGS. 21A and 21B represent a block diagram of a memory bus controller.
Figure 21B:
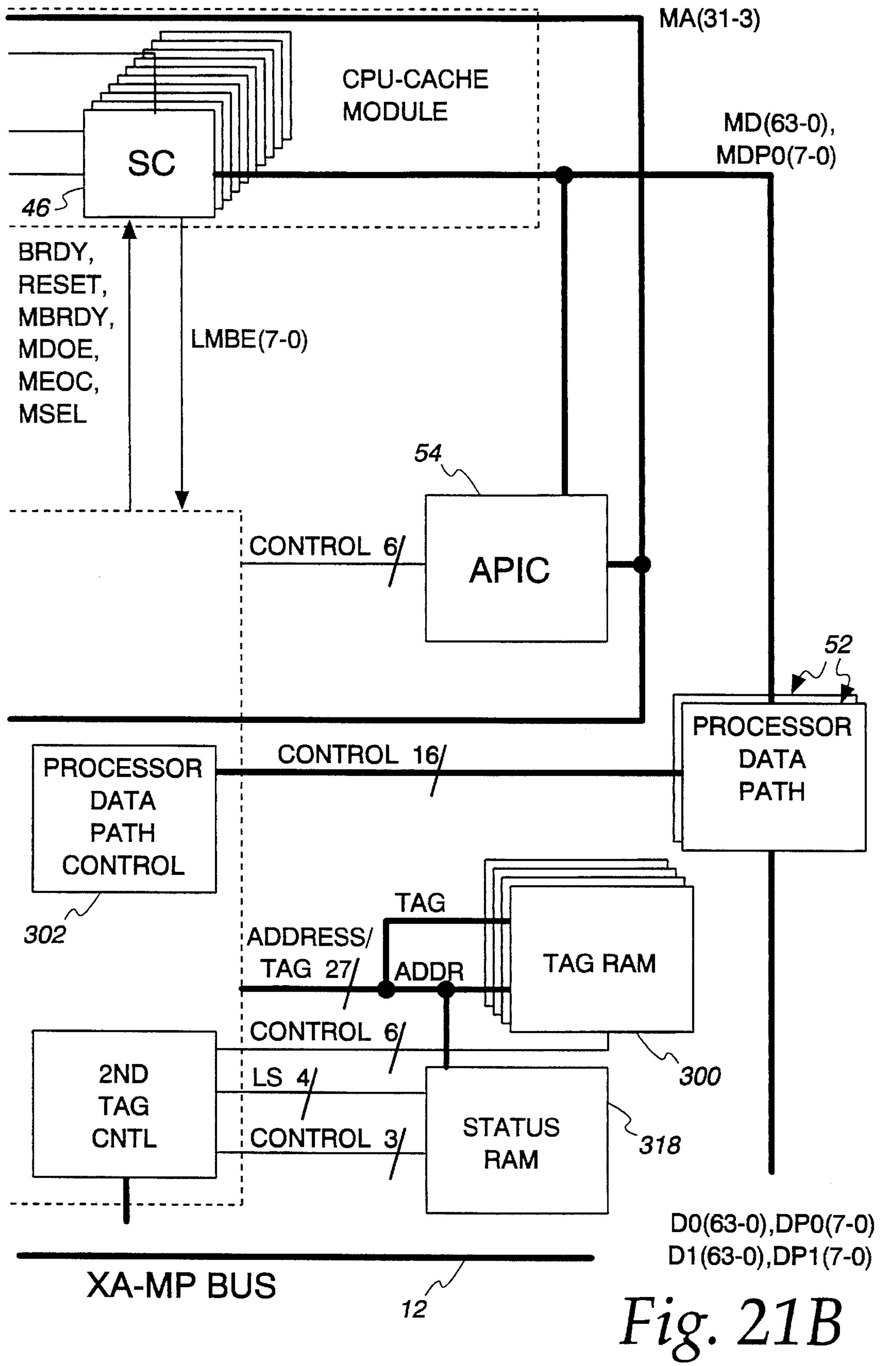

Referring now to FIG. 21, therein is illustrated a further block diagram of PM 16 with greater emphasis on MBC 50. As shown therein, MBC 50 includes a Processor Data Path Control 302 for controlling PDPs 52, an ACK/NAK Generator 304, an Address Register (A) 306, a Slot ID 308 for storing the slice's slice number, and an Address Decode mechanism (ADDR Decode) 310.

MBC 50 further includes a set of Control Registers 312 and an ADMP 126, a set of status and identification registers 312, and performance monitoring registers 314. MBC 50 also includes a 2nd Tag Controller 316 for controlling Duplicate Directory 300, indicated as "Tag RAM" and has an associated Status RAM 318 for storing status information.

Figure 22:
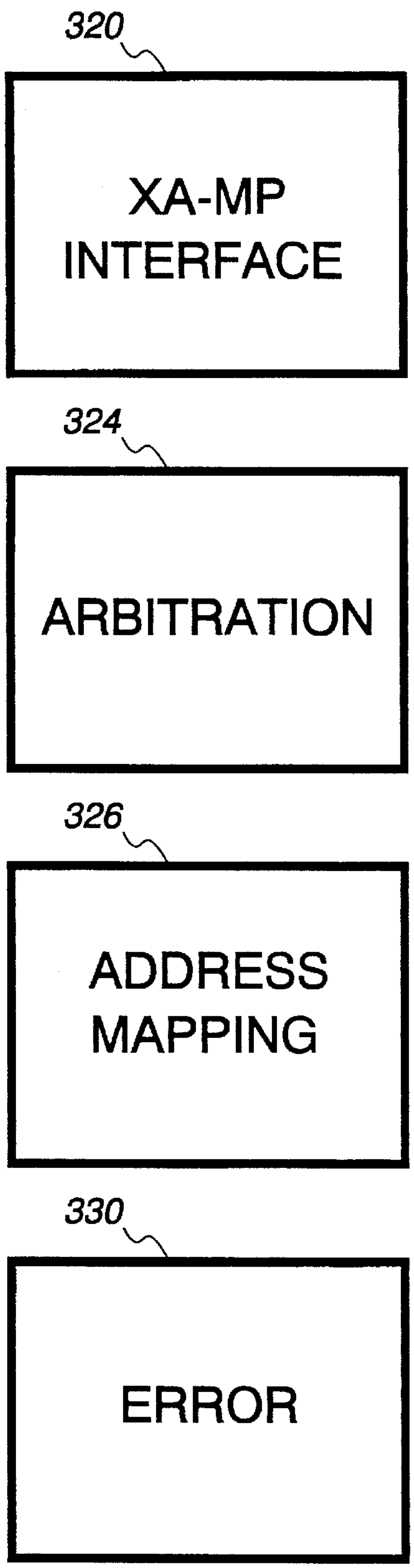
FIG. 22 is a block diagram of a memory bus controller control structure; and, FIG. 23 is a block diagram of a processor data path.

Referring to FIG. 22, MBC 50 further includes various control logic functions which include XA-MP Interface Control 322, a Clock generator 322, Arbitration Logic 324, Snoop Control Logic 186, Address Mapping Control 326, Trap/Status Logic 328 and Error Logic 330, each of which is discussed elsewhere and, in particular, in Appendix 6, titled "Memory Bus Controller".

b. Processor Data Path 52

Figure 23:
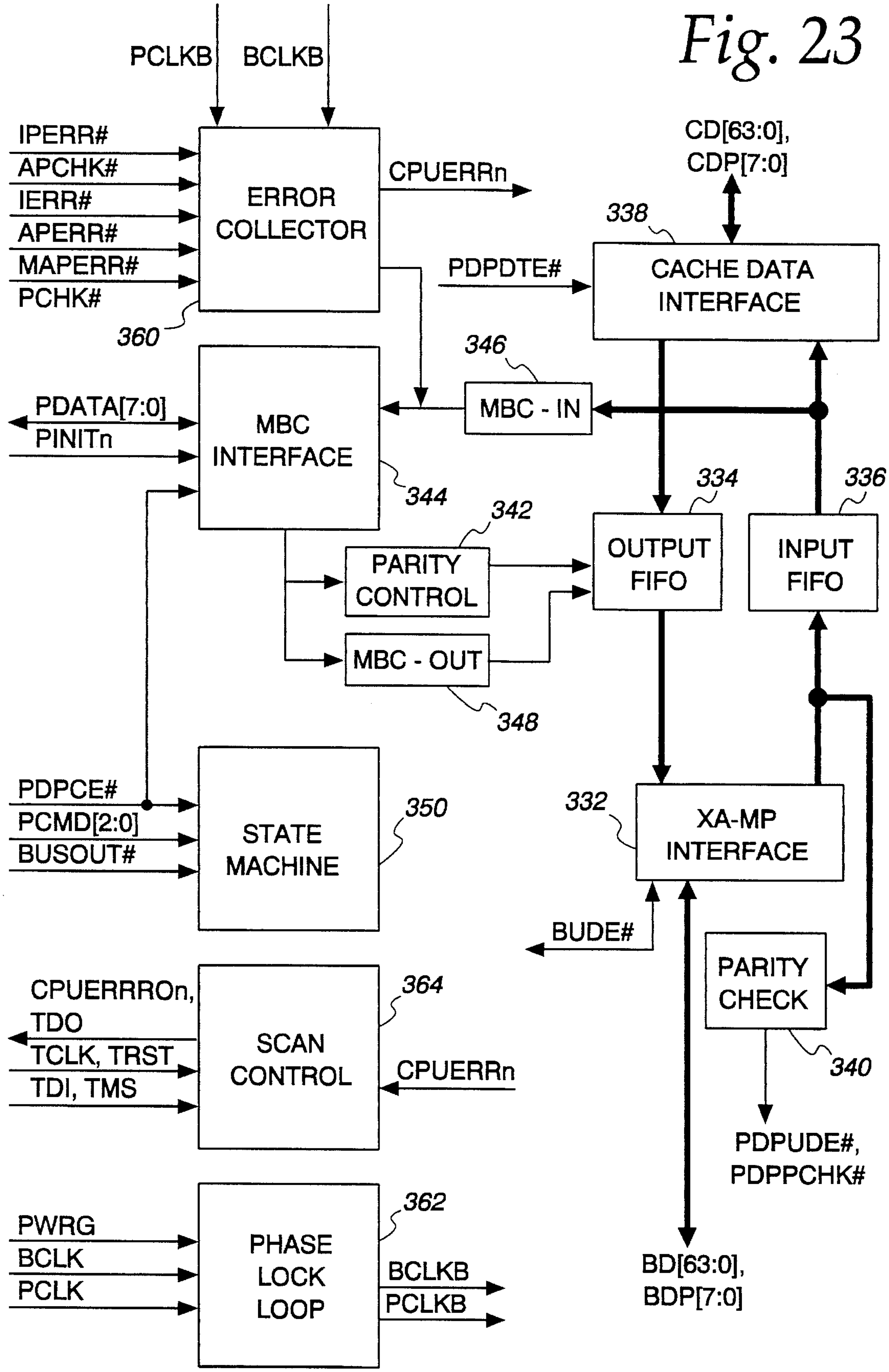

Referring now to FIG. 23, therein is shown a block diagram of a PDP 52. As shown, PDP 52 is comprised of a data path which includes an XA-MP Bus Interface 332 to XA-MP Bus 12, an Output FIFO 334, an Input FIFO 336 and a CACHE-DATA Interface 338 to Cache Mechanism 44. Associated with the input data path is an input data Parity Check 340 and associated with the output data path is an output Parity Control 342.

The interface between the PDP 52 and the MBC 50 is provided through MBC Interface 344, MBC-IN 346 and MBC-OUT 348. Operation of the PDP 52 is provided by a STATE MACHINE 350.

The PDP 52 further includes an ERROR COLLECTOR 360, a PHASE LOCK LOOP 362 for providing clock signals, and SCAN CONTROL 364.

Further details of the structure, operations and functions of a PDP 52 may be found in other descriptions herein, including Appendix 7, title "Processor Data Path".

The above completes a description of a presently preferred embodiment of the present invention. It will be noted that the invention described above may be embodied in yet other specific forms without departing from the essential characteristics thereof. Thus, the present embodiments are to be considered in all respects as illustrative and not restrictive, the scope of the present invention being indicated by the appended claims rather than by the foregoing description, and all changes and modifications which come within the meaning and range of equivalency of the claims are therefore intended to be embraced therein.

APPENDIX 1

XA-MP BUS

TABLE OF CONTENTS

XA-MP BUS ARCHITECTURE ..... 1
1.1 INTRODUCTION ..... 1
1.1.1 Architecture Overview ..... 1
1.1.1.1 XA-MP System Bus Features ..... 1
1.1.1.2 Processor Subsystem Features ..... 3
1.1.1.3 Memory Subsystem Features ..... 3
1.1.1.4 I/O Bridge Features ..... 3
1.1.2 Revision History ..... 4
1.1.3 References ..... 4
1.2 FUNCTIONAL DESCRIPTION ..... 5
1.2.1 Block Diagram ..... 5
1.2.2 Sub-Blocks ..... 5
1.3 SIGNAL DESCRIPTION ..... 5
1.3.1 Address Signals ..... 5
1.3.2 Data Signals ..... 6
1.3.3 Command Signals ..... 7
1.3.4 Control Signals ..... 11
1.3.5 Response Signals ..... 12
1.3.6 Error Reporting Signals ..... 14
1.3.7 Arbitration Signals ..... 15
1.3.7.1 Arbitration Group ..... 15
1.3.7.2 Arbitration State Transitions ..... 15
1.3.7.3 Rules for Group Formation ..... 16
1.3.7.4 Overlap of Arbitration Groups ..... 16
1.3.7.5 High Priority Modes ..... 17
1.3.8 Data Bus Arbitration ..... 17
1.3.8.1 FIFO Queue for Ordered Responses ..... 17
1.3.8.2 Data Bus States ..... 18
1.3.8.3 Arbitration Interlock ..... 19
1.3.9 APIC Bus ..... 19
1.3.10 Miscellaneous Signals ..... 19
1.4 OPERATION ..... 20
1.4.1 Address/Command Bus ..... 20
1.4.2 Address/Command Bus Arbitration ..... 21
1.4.2.1 Slot (Slice) Dependent Priority ..... 21
1.4.2.2 Slice ID Initialization ..... 23
1.4.2.3 Arbitration States ..... 23
1.4.3 Data Bus ..... 24
1.4.4 Miscellaneous ..... 24
1.5 BUS TRANSFER TYPES ..... 24
1.5.1 XA-MP BUS Cycles ..... 24
1.5.1.1 Write Bus Word WBW Cycle ..... 25

1.5.1.2 WCL Cycle ....................26
1.5.1.3 RBW Cycle Ordered Response ....................27
1.5.1.4 RCL Cycle (Ordered Response) ....................28
1.5.1.5 WBW WBW Sequence ....................29
1.5.1.6 WCL WCL Sequence ....................30
1.5.1.7 WBW ORD#(RBW) Sequence ....................32

1.6 ERROR RECOVERY & REPORTING ....................34
1.6.1 Errors Synchronous with Bus Cycles ....................34
1.6.1.1 Command or Address error ....................34
1.6.1.2 Data Parity Error ....................34
1.6.1.3 No Response ....................35
1.6.1.4 Illegal Response ....................35
1.6.1.5 Uncorrected Data Error ....................37
1.6.1.6 Cache Coherency State Errors ....................37
1.6.2 Errors Asynchronous with Bus Cycles ....................38
1.6.3 Slice Error Yellow ....................38
1.6.4 Slice Error Red ....................38

1.7 SYSTEM INITIALIZATION ....................39
1.7.1 Address Map ....................39
1.7.1.1 Boot BIOS ....................40
1.7.1.2 Reserved (Local Registers) ....................41
1.7.1.3 Reserved Global Registers ....................41
1.7.1.3.1 Begin_Init ....................41
1.7.1.4 Local APIC Registers ....................41
1.7.1.5 BIOS ....................42
1.7.1.6 System Initialization Registers ....................42
1.7.1.6.1 Boot Strap Processor Lock (bsp_lock) ....................43
1.7.1.6.2 Boot Strap Processor ID (bsp_id) ....................43
1.7.1.6.3 Once Here Register (once_here) ....................44
1.7.1.6.4 Read Slice Register (read_slice) ....................44
1.7.1.7 Expansion BIOS ....................44
1.7.2 Slice Initialization and Configuration Registers ....................45
1.7.2.1 Slice-ID Register ....................47
1.7.2.1.1 Slice Revision (SLR) Field ....................47
1.7.2.1.2 Slice Identification (SID) Field ....................47
1.7.2.2 Slice Type Register ....................47
1.7.2.2.1 Slice Identification Number (SIN) Field ....................48
1.7.2.3 Control/Status Register ....................48
1.7.2.3.1 My Slice Error Yellow (MYSLEY) ....................48
1.7.2.3.2 Bus Trap Request Yellow (BTRQY) ....................49
1.7.2.3.3 Bus Trap Response (BTRS) ....................49
1.7.2.3.4 Internal Error Yellow (INERY) ....................49
1.7.2.3.5 Slice Error Yellow Enable (SLEYEN) ....................50
1.7.2.3.6 MY Slice Error Red (MYSLER) ....................50
1.7.2.3.7 Bus Trap Request Red (BTRQR) ....................50

1.7.2.3.8 Internal Error Red (INERR) ....................51
1.7.2.3.9 Single Bus Configuration(SBC) ....................51
1.7.2.3.10 Indicator (IND) ....................51
1.7.2.3.11 Phase Indicator (PH) Field ....................52
1.7.2.3.12 Slice Error Red Enable Bit (SLEREN) ....................52
1.7.2.3.13 Parity Control (PC) Field ....................52
1.7.2.3.14 Slice Enable (SEN) ....................54
1.7.2.4 Clears Register ....................54
1.7.2.4.1 Initialize (INIT) ....................54
1.7.2.4.2 Bus Request Trap Yellow Clear (BTRQYC) ....................56
1.7.2.4.3 Internal Error Yellow Clear (INERYC) ....................56
1.7.2.4.4 Bus Response Trap Clear (BTRSC) ....................56
1.7.2.4.5 Bus Request Trap Red Clear (BTRQRC) ....................56
1.7.2.4.6 Internal Error Red Clear (INERRC) ....................57
1.7.2.5 Bus Time Out Value Register ....................57
1.7.2.6 Bus Request Trap Red Registers ....................57
1.7.2.6.1 Error (ERR) Field ....................58
1.7.2.6.2 Command (CMD) Field ....................58
1.7.2.6.3 Byte Lane(BL) Field ....................59
1.7.2.6.4 Address (A) Field ....................59
1.7.2.7 Bus Response Trap Register ....................59
1.7.2.7.1 Error (ERR) Field ....................60
1.7.2.7.2 Command (CMD) Field ....................60
1.7.2.7.3 Slice ID (SID) Field ....................60

1.8 PERFORMANCE MONITORING ....................61
1.8.1 Performance Monitor Counters - PMC0_3 ....................61
1.8.2 Performance Monitor Select Register ....................61
1.8.2.1 Performance Monitor Select Field (PMS) ....................61
1.8.2.2 Enable Bit (E) ....................62

1 XA-MP BUS ARCHITECTURE

1.1 INTRODUCTION

This section describes the architecture of the XA-MP bus. The XA-MP is a high performance scalable bus capable of supporting multiple processors of the Intel ix86 family of microprocessors (i.e. i486 and above). This architecture will initially be implemented with a 6 component chip-set which will allow processor, memory & I/O subsystems to be developed into a high performance symmetrical multiprocessing system.

1.1.1 Architecture Overview

The XA-MP architectural block diagram is shown in Figure 1-1. It is made up of three basic elements, a Processor Subsystem, a Memory Subsystem and a I/O Bridge Subsystem. These are all connected by the XA-MP System Bus.

1.1.1.1 XA-MP System Bus Features

The XA-MP System Bus is a synchronous, demultiplexed, split transaction, high performance bus running at 33Mhz to 66Mhz. The data path consists of one or two independent 64 bit buses, while the initial width of the address bus is fixed at a 32 bit byte address, with allowances for future expansion. The address and data buses are synchronized only during write operations. In all other cases, the three buses function completely independently of each other.

The XA-MP bus supports both in-order and out-of-order (split cycle) data transfers. Among all bus agents, the memory subsystem is the only device which responds with in-order responses. Since in-order responses are not accompanied by any address or identity tag, all bus agents keep track of the in-order response transactions to be able to recognize their own. This achieves a lower address bus utilization.

In addition to the 4 gigabyte memory space supported on the bus, the bus also defines an equivalent size of I/O space. The system bus permits memory or I/O space to be mapped by hardware or firmware into non-message passing bus environments via I/O processors using out-of-order split transfers.

To provide a fast and deterministic response to cache sharing inquiries, and thus a clean cache coherence maintenance technique, the cache line size is fixed at 32 bytes. Cache line operations use a modulo transfer block scheme, starting with the desired bus word and wrapping around for the full line transfer.

The system bus provides a fair and simple arbitration mechanism. This mechanism is based on assigning priorities to bus agents based on their physical slot (slice) positions in the system. This arbitration mechanism allows overlapping of a new arbitration group formation and bus activities of the current group. The arbitration mechanism also allows high priority units to break into an existing arbitration group.

Figure 1-1 XA-MP System Block Diagram.
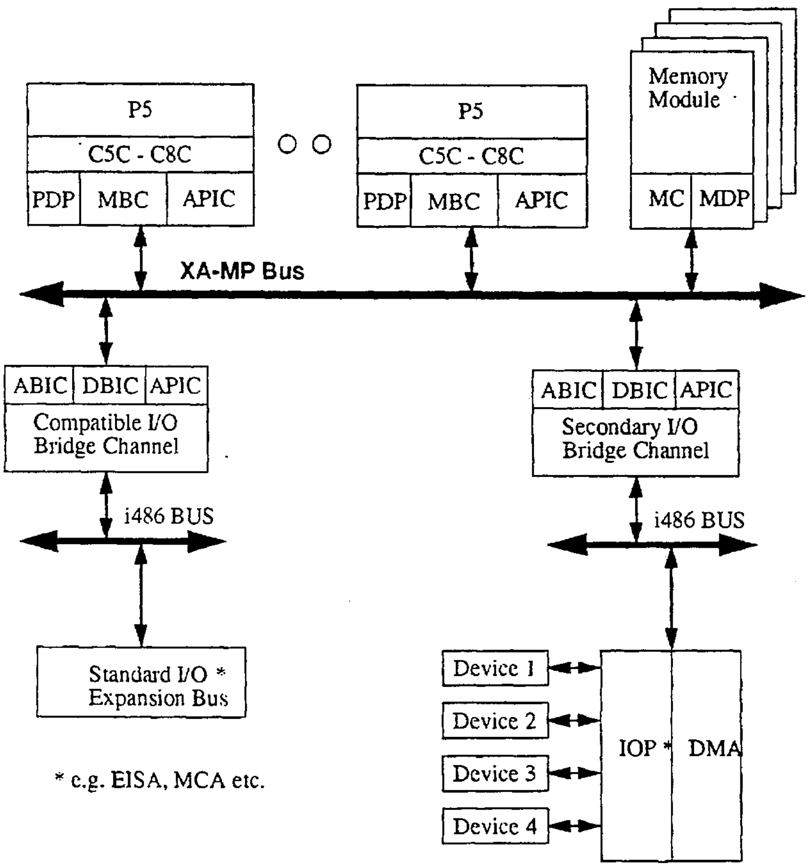
* e.g. EISA, MCA etc.

1.1.1.2 Processor Subsystem Features

The processor/cache (P5, C5C-C8C) units are connected to the system bus through the XA-MP Bus Controller interface which consists of the Memory Bus Controller (MBC), the Processor Data Path Controller (PDP) and the Advanced Programmable Interrupt Controller (APIC). Up to eight of these modules can be placed on the system memory bus. The processor in each module can be either an P5 or a i486[1]and will be interfaced to the XA-MP bus through the C5C cache controller & MBC such that the rest of the system can be designed oblivious to this fact.

The C5C/C8C (cache controller-data cache) pair provides the required secondary caching functionality for each processor and implements the MESI (modified, exclusive, shared, invalid) protocol. The MBC provides the needed control to interface the processor/cache core to the XA-MP bus. The MBC performs transactions requested by the processor on the XA-MP bus as well as providing a secondary cache directory to minimize snoop traffic, provide address pipelining and to maintain cache coherence. The PDP controller is used to interface the XA-MP data bus to the data bus interface of the C8C(s). The APIC provides symmetrical interrupt capability for multiprocessing. The APIC is used for both normal interrupts and interprocessor communication. A well defined interrupt interface is presented to all devices in the system and supports various modes of interrupt delivery to provide the flexibility needed in the system.

1.1.1.3 Memory Subsystem Features

The Memory Subsystems consist of the DRAM array, a Memory Controller (MC) and Memory Data Path Controller (MDP). The optimum unit of transfer is a cache line which is transferred in a burst mode in four bus cycles. Memory interleaving in the system is achieved across memory modules on cache line size boundaries with up to four Memory Subsystems being supported. These subsystems can be initialized to function in the interleaved mode or be part of a linear, possibly noncontiguous, physical address space.

The Memory Subsystem is pipelined and read/write requests to the same location are all serialized in the same queue. Deadlocks are avoided by requiring the memory subsystem to negatively acknowledge all requests arriving at a full request queue or any write requests arriving at a full input write buffer queue.

Memory modules are inhibited from responding to cache line read requests which are owned by a cache controller or an I/O bridge memory map. The inhibition signal is generated by the MBC, or BIC having the line in the modified state and thus owning the line. The I/O bridge will also signal a request that is part of its memory map. Memory modules monitor these signals and remove the latched request from their queue in these cases.

The Memory subsystem supports standard Error Detection and Correction (EDAC) at the DRAM interface.

1.1.1.4 I/O Bridge Features

The I/O Bridge allows the connection of standard boards, high speed peripherals etc. to the XA-MP bus, as depicted in Figure 1-1. An I/O Bridge is a device redirecting I/O traffic between the XA-MP bus and expansion bus(es). The expansion bus may be a standard expansion bus, such as MCA, EISA, a 486 type, or a custom designed bus.

---

[1]The MBC is designed to the P5/C5C/C8C interfaces. The i486/C5/C8 needs external glue logic to be accommodated.

There are three types of transactions that are handled by the I/O Bridge:

1. Interrupts generated in the I/O Channel or expansion bus which need to be directed to the system bus to reach their destination processors.
2. Memory or I/O accesses requested by agents on the system bus to memory modules or I/O devices on the expansion bus.
3. Memory accesses by expansion bus master to system memory on the XA-MP bus.

The I/O Bridge will support DMA operations from expansion bus master devices. The DMA may transfer data to or from system memory. The I/O Bridge adheres to the cache coherency protocol on the XA-MP bus. This is done by utilizing a Bridge Interface Controller (ABIC/DBIC) as depicted in Figure 1-1. With the coexistence of independent I/O activities, there are certain scenarios in which the I/O Bridge and a Cache Controller end up holding the latest non-overlapping word updates of a single line. This effect is due to the independent nature of word transfers by the I/O Channel. In recognition of this fact, the I/O Bridge reacts appropriately to the related bus transactions to preserve the coherency of the related line.

The I/O Bridge is logically composed of the following parts: a Bridge Interface Controller (BIC), and an Advanced Programmable Interrupt Controller(APIC). The BIC is used for maintaining data coherency on memory accesses to and from XA-MP bus system memory by an expansion bus master. The APIC is used to direct interrupts to processors on the XA-MP bus from the expansion bus units. The interface of the BIC is to an i486 based bus and requires a few chips for interface to EISA or MCA. Slow I/O or DMA devices can be interfaced to this i486 based bus. The XA-MP architecture allows for multiple expansion buses in the system.

One of the I/O bridges supporting an expansion bus in the system will be operated in the PC compatibility mode. This is called the Compatible I/O Bridge as shown in Figure 1-1. If an EISA bus were implemented, with an iX86 based processor module, DOS will boot and shrink wrapped DOS applications will run.

1.1.2 Revision History

The current version (0.4) is the second revision of this document.

1.1.3 References

The following are related documents that this section refers to:

1. "82489DX Advanced Programmable Interrupt Controller"
2. "Preliminary P5 CPU Data Book"
3. "Preliminary C5C/C8C Data Book for the P5 CPU"
4. "XA-MP Memory Controller (MC) Target Specification Revision 0.0"
5. "XA-MP Memory Data Path (MDP) Target Specification Revision 0.0"
6. "XA-MP Memory Bus Controller (MBC) Target Specification Revision 0.0"
7. "XA-MP Processor Data Path (PDP) Target Specification Revision 0.0"
8. "XA-MP Bridge Interface Controller (BIC) Target Specification Revision 0.0"

1.2 FUNCTIONAL DESCRIPTION

1.2.1 Block Diagram

1.2.2 Sub-Blocks

1.3 SIGNAL DESCRIPTION

1.3.1 Address Signals

Table 1-1 XA-MP Address

| Signal Name | Type | Function |
|---|---|---|
| A[31:03] | I/O | The address bus defines either a 4 gigabyte memory or I/O address depending on the XA-MP bus command. The address is valid on the bus clock leading edge in which the command strobe is valid. On non-cache line commands (i.e. RBW, WBW) the byte lane information for byte(7-0) is valid one clock after the command strobe on address signals A[15:08]. A zero on a byte lane indicates that byte is valid while a one indicate that it is invalid. All the other address bits are driven to one's while parity needed to be checked on A[15:08]. Byte lanes = all 1's is legal. On read out of order data responses (i.e. RLR, RWR] the module and slice ID of the target is indicated on bits A[14:08]. The rest of the address bits under these conditions will be driven to zero's. The agents checking parity on the bus only need to check A[15:08]. On XA-MP commands that do not use the address bus, the address signals will be driven to all one's with good parity. The byte lane mappings are shown in the table below. |
| AP | I/O | This bit indicates even parity for address bits A[31:03], except for byte lane or module/slice ID then it indicates even parity for A[15:8]. This bit is valid at the same time as the command/address strobe and is checked by all agents every time the command/address strobe is valid. An agent that finds the parity incorrect will signal a command address error (CAE#). |

| Address Bit | Byte |
|---|---|
| A15 | 7 |
| A14 | 6 |
| A13 | 5 |
| A12 | 4 |
| A11 | 3 |
| A10 | 2 |
| A09 | 1 |
| A08 | 0 |

1.3.2 Data Signals

Table 1-2 XA-MP Data

<table>
<tr><th>Signal Name</th><th>Type</th><th>Function</th></tr>
<tr><td>D0[63:00]</td><td>I/O</td><td>Data bus number 0 of dual data bus. The data bus is used for cache line operations and memory or I/O write operations on the bus. Data is valid on the bus clock leading edge one clock after data strobe 0 is valid. In a dual data bus system (i.e. Data Bus 1 exists) the selection of the data bus for write and read operations is done by the state of address bit A[05]. If A[05] = 0, then data will be written/returned on Data Bus 0, while if A[05] = 1, then data will be written/returned on Data Bus 1.</td></tr>
<tr><td>D1[63:00]</td><td>I/O</td><td>Data bus number 1 of dual data bus. The data bus is used for cache line operations and memory or I/O write operations on the bus. Data is valid on the bus clock leading edge one clock after data strobe is valid</td></tr>
<tr><td>DP0[7:0]</td><td>I/O</td><td>These bits indicate even parity for Data Bus 0 according to the following table. These bits are valid at the same time as D0[63:00].
<table>
<tr><th>Data Bits</th><th>Parity Bit</th><th>Data Bits</th><th>Parity Bit</th></tr>
<tr><td>D0[63:56]</td><td>DP0[7]</td><td>D0[31:24]</td><td>DP0[3]</td></tr>
<tr><td>D0[55:48]</td><td>DP0[6]</td><td>D0[23:16]</td><td>DP0[2]</td></tr>
<tr><td>D0[47:40]</td><td>DP0[5]</td><td>D0[15:08]</td><td>DP0[1]</td></tr>
<tr><td>D0[39:32]</td><td>DP0[4]</td><td>D0[07:00]</td><td>DP0[0]</td></tr>
</table></td></tr>
<tr><td>DP1[7:0]</td><td>I/O</td><td>These bits indicate even parity for data bus1 according to the following table. These bits are valid at the same time as D1[63:0].
<table>
<tr><th>Data Bits</th><th>Parity Bit</th><th>Data Bits</th><th>Parity Bit</th></tr>
<tr><td>D1[63:56]</td><td>DP1[7]</td><td>D1[31:24]</td><td>DP1[3]</td></tr>
<tr><td>D1[55:48]</td><td>DP1[6]</td><td>D1[23:16]</td><td>DP1[2]</td></tr>
<tr><td>D1[47:40]</td><td>DP1[5]</td><td>D1[15:08]</td><td>DP1[1]</td></tr>
<tr><td>D1[39:32]</td><td>DP1[4]</td><td>D1[07:00]</td><td>DP1[0]</td></tr>
</table></td></tr>
</table>

1.3.3 Command Signals

Table 1-3 XA-MP Command Signals

| Signal | Type | Function |
|---|---|---|
| CMD[7:0] | I/O | The 8-bit command bus allows for up to 256 XA-MP bus commands as shown in the following table. On commands that read data the module ID is part of the command word as bits CMD[1:0]. This allows for up to 4 modules to share each slice ID. The command is valid at the same time as the address signals. |

| Command | Code | Command | Code | Command | Code | Command | Code |
|---|---|---|---|---|---|---|---|
| RCL(0) | 00 | RBW(0) | 10 | RBWL(0) | 20 | IOR(0) | 30 |
| RCL(1) | 01 | RBW(1) | 11 | RBWL(1) | 21 | IOR(1) | 31 |
| RCL(2) | 02 | RBW(2) | 12 | RBWL(2) | 22 | IOR(2) | 32 |
| RCL(3) | 03 | RBW(3) | 13 | RBWL(3) | 23 | IOR(3) | 33 |
| RIL(0) | 04 | | | | | | |
| RIL(1) | 05 | | | | | | |
| RIL(2) | 06 | | | | | | |
| RIL(3) | 07 | Reserved | 14-17 | Reserved | 24-27 | Reserved | 34-37 |
| WCL | 08 | WBW | 18 | WBWL | 28 | IOW(0) | 38 |
| RLR | 09 | RWR | 19 | | | IOW(1) | 39 |
| | | IOWR | 1A | | | IOW(2) | 3A |
| Reserved | 0A-0B | Reserved | 1B | Reserved | 29-2B | IOW(3) | 3B |
| BICL | 0C | PICL | 1C | | | INTA(0) | 3C |
| | | | | | | INTA(1) | 3D |
| | | | | | | INTA(2) | 3E |
| | | | | | | INTA(3) | 3F |
| Reserved | 0D-0F | Reserved | 1D-1F | Reserved | 2C-2F | Reserved | 40-FF |

| Signal | Type | Function |
|---|---|---|
| CP | I/O | Even parity for the 8-bit command. This bit is valid at the same time as the command/address strobe and is checked by the addressed agent every time the command/address strobe is valid. The addressed agent that finds the parity incorrect will signal a command address error (CAE#). |

Table 1-4 XA-MP Command Descriptions

| Command | Type | Function |
|---|---|---|
| RCL(3-0) | Cache | Read Cache Line. This command requests a cache line transfer in the order specified in the table below, without requiring the invalidation of any other shared or exclusive cache lines. This line ordering is valid for all cache line commands (RIL, WCL) |

| Address = A[31:03] | | | |
|---|---|---|---|
| First Address | Second Address | Third Address | Fourth Address |
| 0 | 1 | 2 | 3 |
| 1 | 0 | 3 | 2 |
| 2 | 3 | 0 | 1 |
| 3 | 2 | 1 | 0 |

| Command | Type | Function |
|---|---|---|
| RIL(3-0) | Cache | Read & Invalidate Cache Line. This command is used to read a cache line by a requesting agent that definitely intends on modifying the line (i.e. Write Miss). |
| WCL | Cache | Write Cache Line. This command is used to write modified cache lines back to memory. This occurs due to either a line replacement or invalidation. |
| PICL | Cache | Processor Invalidate Cache Line. This address only command is used by the processor to invalidate all other matching cache lines in the system. This is commonly used by a processor that wants to write to a line that is in the shared state.<br>This command is only acknowledged by the appropriate system memory not by any of the caches. A system cache getting a snoop hit will need to look at the response from the system memory to validate the command. The memory that acknowledges the command will not perform any operation.<br>A cache that gets a snoop hit to a modified line to this command will assert CDM, which in turn will be interpreted as an illegal response by the requesting agent which will report the SLER(i.e. Slice Error Red). |
| BICL | Cache | I/O Bridge Invalidate Cache Line. This address only command is used by the I/O Bridge to invalidate all matching cache lines in the system. The difference from PICL is that the I/O Bridge is allowed to invalidate cache lines that may be in the modified state while a processor is not. The processor uses this difference to detect illegal cache commands on the XA-MP Bus.<br>This command is only acknowledged by the appropriate system memory not by any of the caches. A system cache getting a snoop hit will need to look at the response from the system memory to validate the command. The memory that acknowledges the command will not perform any operation.<br>A cache that gets a snoop hit to a modified line to this command will NAK the command and write back the line to memory. |

Table 1-4 XA-MP Command Descriptions

| Command | Type | Function |
|---|---|---|
| RLR | Cache | Read Line Response. This command is used by an intervening cache to transfer a cache line (For commands RCL and RIL that received a MCI response) to the requesting agent as an out of order reply, which places the slice and module ID of the requesting agent on address bits A[14:08] as shown in the table below. The slice ID SLID[4:0] is determined by the responding agent by sampling the arbitration signals ARB[9:0]# one bus clock before the address strobe to determine the slice ID of the winner of the bus. The module ID (I) is determined by taking the low order two bits of the command field (CMD[1:0]). The reserved fields must be all zeros with good address parity. |

| Address Bus | | | | | | | | | | | | | | | | | | | | | | | | | | | | |
|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 |
| Reserved | | | | | | | | | | | | | | | | | SLID[4:0] | | | | | 1 | | Reserved | | | | |

| Command | Type | Function |
|---|---|---|
| RBW(3-0) | Memory | Read Bus Word. RBW uses a single address to read data up to the width of the bus (1 to 8 bytes). The valid bytes on the bus are indicated on the second cycle of the command when the byte lane controls are asserted on address signals. A[15:08] as shown in the table below.The command strobe remains asserted for the duration of the byte lane controls on the address bus. The reserved fields must be all zeros with good address parity. |

| Address Bus | | | | | | | | | | | | | | | | | | | | | | | | | | | | |
|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 |
| Reserved | | | | | | | | | | | | | | | | ByteLanes[7:0] | | | | | | | | Reserved | | | | |

| Command | Type | Function |
|---|---|---|
| WBW | Memory | Write Bus Word. WBW uses a single address to write data up to the width of the bus (1 to 8 bytes). The valid bytes on the bus are indicated on the second cycle of the command when the byte lane controls are asserted on address signals A[15:08] in the same manner as RBW. The command strobe remains asserted for the duration of the byte lane controls on the address bus. Any set of byte lanes is valid on the bus. |
| RWR | Response | Read Word Response. This command is used by an agent to transfer a bus word to the original requesting agent as an out of order reply to a read bus word command (RBW. RBWL, and IOR), which places the slice and module ID of the original requesting agent on address bits A[14:08]. The address is formed in the exact same manner as the Read Line Response command above. |

Table 1-4 XA-MP Command Descriptions

| Command | Type | Function |
|---|---|---|
| RBWL(3-0) | Locking | Read Bus Word (Lock). This command is identical to RBW except it indicates to bus units that the first half of an memory address locking operation has started. This command causes the requesting agent to load its Address Lock Register with the cache line address this bus word is part of, which will be used to NAK any requests to this cache line until a WBWL is issued to this address. |
| WBWL | Locking | Write Bus Word (Lock). This command is identical to WBW except it indicates to bus units the completion of an memory address lock operation. This command causes the requesting agent to clear its Address Lock Register. |
| IOR(3-0) | I/O | I/O Read (Out-of-order response only). IOR uses a single address to read data up to the width of the bus (1 to 8 bytes). The address references the bus word location in I/O space. Byte lane controls are indicated on the second cycle of the command when the byte lane controls are asserted on address signals A[15:08] in the same manner as RBW. The command strobe remains asserted for the duration of the byte lane controls on the address bus. |
| IOW(3-0) | I/O | I/O Write. IOW uses a single address to write data up to the width of the bus (1 to 8 bytes). The address references the bus word location in I/O space, byte lane controls are indicated on the second cycle of the command when the byte lane controls are asserted on address signals. A[15:08] in the same manner as RBW. The command strobe remains asserted for the duration of the byte lane controls on the address bus. Since most I/O driver software cannot support write posting, this command causes the I/O unit that accepts the command to return a I/O write response (IOWR) to the requesting agent. This response indicates the completion of the write. |
| IOWR | I/O | I/O Write Response. This address only cycle indicates to the agent that posted the I/O write that it was completed by the agent that accepted the command. The format of the address bus is identical to the RLR command. |
| INTA(3-0) | PC Compatible | Interrupt Acknowledge. This command is used by an agent to acknowledge external interrupts that require the interrupt vector be read directly from the interrupting source instead of the APIC. This functionality is most useful in reading the interrupt vector from the cBIC which may have certain interrupts in PC compatible mode. This cycle is identical to IOR, with the byte lane control being indicated on the second cycle of the command on address signals A[15:08] in the same manner as RBW. The 8-bit interrupt vector is to be returned on data bus byte 0 Dx[7:0], with all other bytes returning zeros with good parity. |

1.3.4 Control Signals

Table 1-5 XA-MP Control

| Signal | Type | Function |
|---|---|---|
| CS# | I/O | Command Strobe. This active low signal when true indicates valid information on the address and command signals. |
| DS0# | I/O | Data Strobe 0. This active low signal when true indicates valid information on Data Bus 0 on the next bus clock cycle after the strobe. |
| DS1# | I/O | Data Strobe 1. This active low signal when true indicates valid information on Data Bus 1 on the next bus clock cycle after the strobe. |
| ORD0# | I/O | Ordered Response Request 0. This active low signal when true indicates the request of an ordered data response on Data Bus 0. This signal remains valid until the in-order requestor gains access to the data bus (DS0 goes inactive from the previous user). |
| ORD1# | I/O | Ordered Response Request 1. This active low signal when true indicates the request of an ordered data response on Data Bus 1. This signal remains valid until the in-order requestor gains access to the data bus (DS1 goes inactive from the previous user). |

Table 1-5 XA-MP Control

| Signal | Type | Function |
|---|---|---|
| SDB# | I/O | Single Data Bus enable. This active low signal must be asserted by any slice which does not support Dual Data Buses. All slices should disable their use of Data Bus 1 after detecting SDB# active. |
| BUSL# | I/O | Bus Lock. This active low signal is used to indicate that an XA-MP bus requesting agent is performing a full bus lock operation. This means that any other agent that needs to perform a Bus operation will not be allowed to arbitrate for the bus while this signal is active, except for cases needed to maintain cache coherence and data being returned due to prior read operations.<br><br>When an agent wants to perform a bus operation it must first check to see if the Bus Lock is not asserted before asserting its arbitration signal. If after asserting its arbitration signal, another agent acquires the bus and asserts Bus Lock, then all agents must deassert their arbitration signals and not rearbitrate for the bus until the Bus Lock signal goes inactive. The only exceptions to this rule are:<br>1. RLR and RWR cycles to complete prior operations.<br>2. Data being returned as part of a read issued by the bus locking agent.<br>3. writes to maintain cache coherence.<br>Any other cycles on the bus while bus lock is true will receive a no response according to the following table.<br><br>Response Allowed: RWR, RLR, IOWR, WCL, WBW, WBWL, RBWL<br>No Response: IOR, IOW, INTA, RCL, RBW, RIL, BICL, PICL<br><br>When the agent does acquire the XA-MP Bus, Bus Lock is asserted at the same time as the address/command strobe (for RBWL or WBWL only) and is held active until the end of the Bus Lock operation or if the bus cycle gets a NAK or error response.<br><br>The agent that owns the Bus Lock can release the signal without issuing a bus cycle, but it must be done synchronous with the bus clock. |

| Response Allowed | No Response |
|---|---|
| RWR | IOR |
| RLR | IOW |
| IOWR | INTA |
| WCL | RCL |
| WBW | RBW |
| WBWL | RIL |
| RBWL | BICL |
| | PICL |

1.3.5 Response Signals

The response signals are valid three bus clocks after the command strobe is valid on the bus when issued by the requesting agent. These responses are issued by responding agent(s) in response to the command. The response signals are composed of two groups, the main response signals (ACK and NAK) and the response qualifiers (MCI, CDM and CDS) as shown in Table 1-6. A no response condition is indicated by the absence of ACK and NAK and will cause the requesting agent to perform a Bus Trap operation (See error recovery & reporting).

Table 1-6 XA-MP Response Signals

| Signal | Type | Function |
|---|---|---|
| ACK# | I/O | Acknowledge. This active low signal is issued by the responding bus agent to the requestor, and indicates the acceptance of the command in the absence of a NAK. |
| NAK# | I/O | Negative Acknowledge. This active low signal is used to indicate a temporary busy condition by either the responding agent (i.e. memory or I/O) or by a listening agent (i.e. cache). |
| MCI# | I/O | Memory Cycle Inhibit. This active low signal serves two purposes. First it indicates to the requesting agent that the memory request will be out-of-order (i.e. memory mapped I/O or cache intervene cycle). Second it is used by the I/O bridges in the system to inhibit the XA-MP system memory from cycling to memory mapped location they contain. This eliminates the need for the XA-MP memory to know where all the memory mapped "holes" in the system are. Each I/O bridge will be responsible for indicating on the XA-MP bus all memory mapped locations by use of this signal. |
| CDM# | I/O | Cache Data Modified. This active low signal indicates that a cache in the system has the requested cache line (RCL or RIL) in the modified state. This signal is used by the requesting agent to set the cache line status to the modified state when the ACK response occurs on the bus. |
| CDS# | I/O | Cache Data Shared. This active low signal indicates that a cache in the system has the requested cache line (RCL) in the shared or exclusive state. This signal is used by the requesting agent to properly set the line status of the cache line (exclusive or shared) when the ACK response occurs on the bus. |

1.3.6 Error Reporting Signals

Table 1-7 XA-MP Error Signals

| Signal | Type | Function |
|---|---|---|
| CAE# | I/O | Command or Address Error. This active low signal indicates an error on the command or address bus and is driven by the agent detecting the error 3 bus clocks after the address strobe. For more information see Error Reporting and Recovery. |
| DPE0# | I/O | Data Parity Error 0. This active low signal indicates that a parity error was detected by an agent receiving data sent on Data Bus 0. This signal is driven by the responding agent 2 bus clocks after receipt of the data in error. For more information see Error Reporting and Recovery. |
| DPE1# | I/O | Data Parity Error 1. This active low signal indicates that a parity error was detected by an agent receiving data sent on Data Bus 1. This signal is driven by the responding agent 2 bus clocks after receipt of the data in error. For more information see Error Reporting and Recovery. |
| UDE0# | I/O | Uncorrected Data Error 0. This active low signal indicates that the data present on Data Bus 0 contains an Uncorrectable data error. For more information see Error Reporting and Recovery. |
| UDE1# | I/O | Uncorrected Data Error 1. This active low signal indicates that the data present on Data Bus 1 contains an Uncorrectable data error. For more information see Error Reporting and Recovery. |
| SLEY# | I/O | Slice Error Yellow. This active low signal is used by any slice in the system to indicate that a "yellow" type error (non-fatal) has occurred. When a slice needs to activate this signal, it must first check to see if the SLEY# signal is not active. If the signal is already active, the slice must wait until it is cleared before activating the signal. This signal is kept active for one clock cycle only. This signal can be looked at by any processor in the system for further processing. The signal is asynchronous to bus transfers but synchronous to the bus clock. For more information see Error Reporting and Recovery. |
| SLER# | I/O | Slice Error Red. This active low signal is used by any slice in the system to indicate that a "red" type error (fatal) has occurred. When a slice needs to activate this signal, it must first check to see if the SLER# signal is not active. If the signal is already active, the slice must wait until it is cleared before activating the signal. This signal is kept active for one clock cycle only. This signal can be looked at by any processor in the system for further processing. The signal is asynchronous to bus transfers but synchronous to the bus clock. For more information see Error Reporting and Recovery |

1.3.7 Arbitration Signals

The arbitration signals as described in Table 1-8, are used to determine which XA-MP bus requesting agent gets control of the command/address bus. In the first implementation of the architecture, there are 10 active low arbitration signals, ARB#[09:00], which allows up to 10 slices on the XA-MP bus.

Table 1-8 XA-MP Arbitration Signals

| Signal | Type | Function |
|---|---|---|
| ARB#[00] | O | Active Low Arbitration Signal every agent asserts to acquire the XA-MP command/ address bus. This signal is etched diagonally down the bus so that each slice on the bus sees it as ARB#[01]. ARB#[02] etc. depending on slice position. |
| ARB#[09:01] | I | This the collection of all the ARB#[00] signals for every slice on the XA-MP bus. A slice will use these signals to determine its position in the arbitration queue, its slice ID on initialization and the ID of a slice that is making a request on the bus. |

1.3.7.1 Arbitration Group

It is important to ensure that all slices in the backplane have an equal opportunity to share the bus bandwidth. The bus uses arbitration groups to achieve fairness of bus access. An arbitration group is a set of slices that have requested bus access during the same clock and need to be assigned bus ownership in turn.

At any given time, an arbitration group may or may not exist. If a group already exists, then all slices in this group are granted bus ownership in turn based on the priority described above. In order to ensure fairness, it is important that other slices are not permitted to join an existing group. They must wait until all the slices participating in the current group have been granted bus ownership. However, on an exceptional basis, high priority requestors such as DMA access may join an existing group to shorten bus access latency.

The Arbitration State Machine is composed of two states: LATC and RESL. The arbitration machine is in the LATC state when the bus is idle, the next bus owner is being determined or an Owner keeps the bus. The machine is in the RESL state when there is an owner change of the bus: no-owner to owner or owner to owner.

1.3.7.2 Arbitration State Transitions

Arbitration state transitions occur as follows:

1. Owner = The highest priority slice of a Group
2. Group = one or more ARBr(s) asserted
3. ARBr = registered ARB lines
4. OwnerChange = Owner deasserts ARBr or a Group is formed LATC --> LATC: No OwnerChange LATC --> RESL: OwnerChange RESL --> LATC: Always

Figure 1-2 Arbitration State Diagram

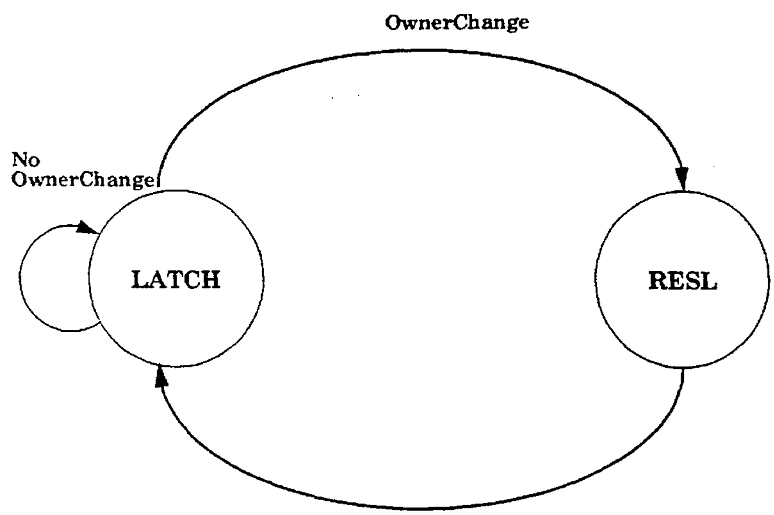

1.3.7.3 Rules for Group Formation

An arbitration group may form in the next clock if the following condition is met in a given clock:

NoGroup or LastSlice

The condition NoGroup means that none of the registered ARB lines (ARBr) are asserted.

The condition LastSlice implies that there is exactly one registered ARB line asserted. This permits the next group to form in an overlapped manner with the last resolution of the current group and eliminate dead clocks between groups.

When an arbitration group is formed, each slice in the group asserts its ARB# line. This is received by all the other slices.

1.3.7.4 Overlap of Arbitration Groups

As noted above, the next arbitration group may form simultaneously with the last resolution of the current group. To implement this, each slice needs to remember the identity of the next bus owner. Members of the new group are permitted to gain ownership of the bus only when the last slice from the current group deasserts its ARBn signal. It is necessary to be able to differentiate this last slice of the current group from other slices that are participating in the next group. The NewOwner of the bus is determined during LATC during the clock before RESL is entered.

1.3.7.5 High Priority Modes

The arbitration protocol discussed above ensures fairness of bus access for all slices. Under certain conditions, it may be necessary for a specific slice to override the fairness algorithm and obtain priority access to the bus. The high priority ARB line may be asserted at any point in time. The high priority slice must remember that the current bus owner is determined using the registered ARB lines.

It is also possible to retain bus ownership for issuing multiple commands (as part of an indivisible chain of operations on the bus). This is done by OWNERS continuing to assert its ARBn line while the command(s) are being issued.

Finally, a slice may drop out of an arbitration group at any time by deasserting its ARB line.

1.3.8 Data Bus Arbitration

Arbitration for the data bus is a separate mechanism from the address command bus, though interlocking between the two does occur for certain bus operations. The data bus supports two types of data transfers in-order and out-of-order.

Ordered responses are handled by putting the request in a FIFO queue and tracking it. This protocol is typically used for DRAM memory with latencies between 100 and 200 ns. Ordered responses do not use the normal arbitration mechanism. Instead, a single open drain signal (ORD#) indicates readiness of a read response. This is used to give priority access of the data bus to read responses over pending write transactions. The address/command bus is not used by ordered responses. The number of ordered responses that may be outstanding at any time is dependent on the system implementation.

The out-of-order response capability permits one or more outstanding split transfer(s) for each requesting agent in the system. Out-of-order transactions are tagged with the Slice:Module ID of the source module. The response arbitrates for use of the command and address buses the same as any request. The data bus is used as in a write transfer. This protocol is used by responders with large or indeterministic response times. Examples are bus bridges, complex cache implementations, etc.

Write transfers and out-of-order read responses occur as address/command, immediately followed by a burst of data. The issuance of the write command or out-of-order read response is delayed until the data bus is available.

1.3.8.1 FIFO Queue for Ordered Responses

Each slice participating in ordered responses tracks all outstanding ordered responses. When a slice has a full FIFO the NAK# line is asserted on the bus, forcing the requesting agent to back off and attempt the request at a later time. This assertion of the NAK# line by any agent limits the number of requests outstanding in the system to the board with the minimum queue depth. The requesting agent may implement a back off mechanism as desired, but should wait for the completion of at least one ordered response before again requesting the bus.

Slices may be implemented that do not send ordered responses, such as dumb I/O boards, with all responses to/from these boards being out of order responses. This can be used to connect a dissimilar bus as a slave only function.

1.3.8.2 Data Bus States

The Data bus occupation state machine has 7 states as shown in Figure 1-3. The state transition is dependent on the command type and interaction between requests and ordered responses. The data bus states are as follows:

1. DI: Data bus IDLE
2. DR: Data bus ordered response path
3. DC: Data bus out-of-order or write path
4. D0: Bus Word 0 of Burst or Word transaction
5. D1: Bus Word 1 of Burst transaction
6. D2: Bus Word 2 of Burst transaction
7. D3: Bus Word 3 of Burst transaction Ordered (ORD#) is deactivated by the in-order agent in the clock after state DR. This event causes the in-order response FIFO to increment and permits the next in-order requestor to activate Ordered (ORD#).

Data Strobe (DS#) is driven active in states DR, DC, D3, D2, and D1. Note that the data strobe always precedes the data itself by 1 bus clock.

Figure 1-3 Data Bus State Machine

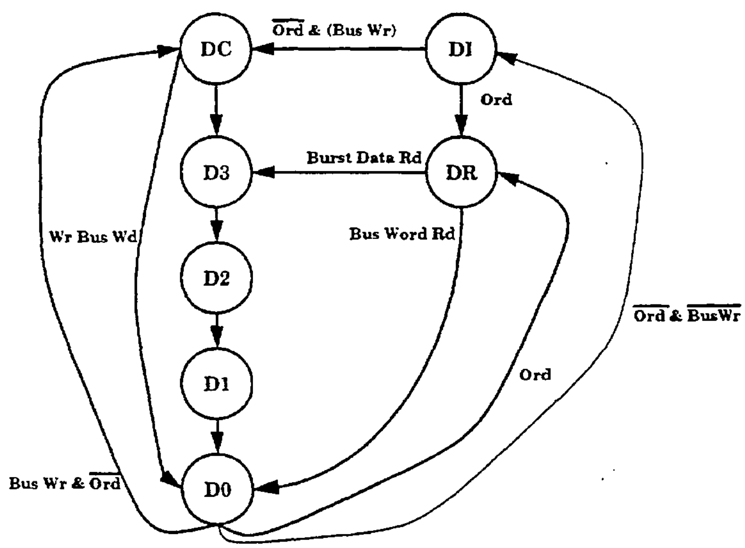

1.3.8.3 Arbitration Interlock

The arbitration state machine can be interlocked with the Address/Command and data bus. A slice that has acquired the use of the command/address bus that needs to use the data bus must hold its ARB# signal active and stay in RESL state until the data bus becomes available. The data bus may be assumed following states DI or D0 if ORD# is inactive. States DI and D0 are true when the Data Strobe (DS#) is inactive.

1.3.9 APIC Bus

The APIC bus is a separate independent bus connecting all processor and I/O APIC devices together. Table 1-9 describes the functionality of the signals that make up the APIC bus. For more information see the 82489DX Advanced Programmable Interrupt Controller for further details.

Table 1-9 XA-MP APIC Bus

| Signal | Type | Function |
|---|---|---|
| ICLK | O | Interrupt clock. |
| MB[3:0] | I/O | APIC Bus. |

1.3.10 Miscellaneous Signals

The Miscellaneous Signals are shown in Table 1-10 and Table 1-11. The Boundary Scan Signals are an optional part of the architecture and could have many implementation alternatives.

Table 1-10 XA-MP System Signals

| Signal | Type | DESCRIPTION |
|---|---|---|
| BCLK | I | Bus Clock 33.3 Mhz |
| BINIT# | I | Bus Initialize. This active low signal is used to perform a full initialize on all bus slices. This signal is driven from one bus slice only, which is usually the cBIC. This signal must be held low for at least 10 bus clocks after power is valid. |
| CBIC# | I | BIC compatibility bit. This bit is used to configure a BIC as the commodity bridge. |

Table 1-11 Boundary Scan Signals

| Signal | Type | DESCRIPTION |
|---|---|---|
| TCK | I | Test Clock |
| TMS | I | Serial Test Mode Select |
| TDI | I | Serial Test Data Input |
| TDO | O | Serial Test Data Output |
| TRST | I | Test Reset |

1.4 OPERATION

This section describes the operation of the XA-MP bus.

1.4.1 Address/Command Bus

The address/command bus is used by a slice to issue commands to other XA-MP bus slices. It is a pipelined bus, in that multiple requests can be issued before the response to the first request is issued. There are two types of operations, bus word and cache line operations as shown in Figure 1-4 and Figure 1-5. Bus word operations take one extra bus clock to drive the byte lane information onto the address bus.

Figure 1-4 XA-MP Bus Word Request Operation.

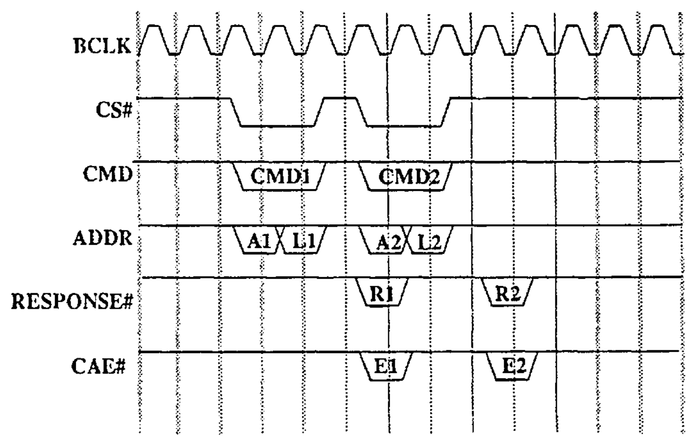

As shown in Figure 1-4 for bus word operations the command strobe is valid for two bus clocks. The address, address parity, command and command parity are sampled by all bus slices on the first bus clock edge the command strobe is valid. While the byte lanes are valid on the second bus clock edge the command strobe is valid. The command strobe is held inactive for a minimum one bus clock before the next active command strobe. The response to these cycles (ACK#, NAK#, MCI#, CDM#, and CDS#) are driven by the responding slice(s), two bus clocks later and valid three bus cycles after the command strobe.

Figure 1-5 XA-MP Bus Cache Line Request Operation

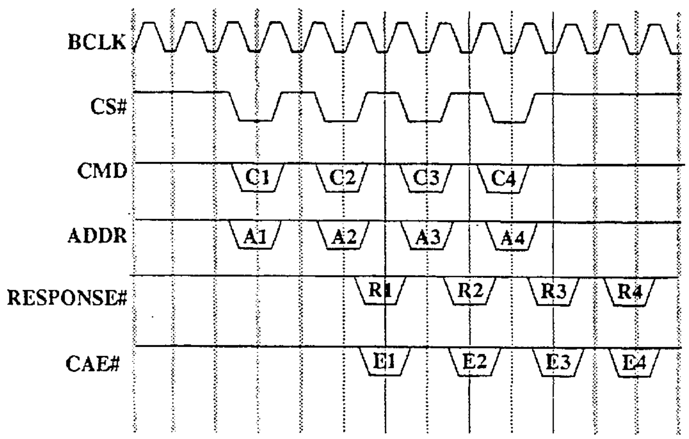

As shown in Figure 1-5 for bus cache line operations the command strobe is valid for one bus clock. The address, address parity, command and command parity are sampled by all bus slices on the clock edge the command strobe is valid. The command strobe is held inactive for a minimum one bus clock before the next active command strobe. The response to these cycles (ACK#, NAK#, MCI#, CDM#, and CDS#) as well as CAE# are driven by the responding slice(s), two bus clocks later and valid three bus cycles after the command strobe.

1.4.2 Address/Command Bus Arbitration

In order for a slice to access the command /address bus it must first arbitrate with all the other bus slices for the use of the command/address bus. As noted in section 1.3.7 on page 15 each slice drives arbitration signal 0, ARB#(0), and receives the other nine arbitration signals, ARB#(9-1). A slice accesses the bus by asserting it's ARB#(0) signal at the proper time within the arbitration state machine sequence A slice can determine when it can drive the command strobe (CS#) by using its slice ID to decode the other arbitration signals.

1.4.2.1 Slot (Slice) Dependent Priority

The bus provides 10 slices numbered 0 through 9. Each slice has an arbitration priority equal to its slice number. Higher numbered slices have higher priority. During arbitration, all contending slices are granted bus ownership in order of descending priority i.e. if all 10 slices contended simultaneously, slice 9 would be the first owner of the bus and slice 0 would be the last owner.

A slice requiring use of the bus will assert its ARB#(0) signal, and during the latch state look at the registered versions of all the other ARB# signals. A slice can only win the bus when all other ARB# signals of higher priority are not asserted. Table 1-12 indicates which ARB# lines must be off in order for a slice to win ownership of the bus. A '1' in the table indicates that the ARB# line is off and a '0' indicates that the ARB# line is on; 'X' is don't care.

Each slice has a unique bus request signal based on slice position. A slice drives its ARB# signal and receives the other 9 ARB# signals. The driven ARB# signal is always on ARB#(0) for a given slice. The other 9 ARB# signals are received sequentially modulo 10, wraparound from ARB#(9) back to ARB#(0), on the next 9 assigned pins of the connector. This requires the ARB# signals to be rotated on the backplane from one slice to the next as shown in Table 1-12.

Table 1-12 Arbitration Winner

| ARB# | SLICE ID | | | | | | | | | |
|---|---|---|---|---|---|---|---|---|---|---|
| | 00 | 01 | 02 | 03 | 04 | 05 | 06 | 07 | 08 | 09 |
| 00 | 0 | 0 | 0 | 0 | 0 | 0 | 0 | 0 | 0 | 0 |
| 01 | 1 | X | X | X | X | X | X | X | X | X |
| 02 | 1 | 1 | X | X | X | X | X | X | X | X |
| 03 | 1 | 1 | 1 | X | X | X | X | X | X | X |
| 04 | 1 | 1 | 1 | 1 | X | X | X | X | X | X |
| 05 | 1 | 1 | 1 | 1 | 1 | X | X | X | X | X |
| 06 | 1 | 1 | 1 | 1 | 1 | 1 | X | X | X | X |
| 07 | 1 | 1 | 1 | 1 | 1 | 1 | 1 | X | X | X |
| 08 | 1 | 1 | 1 | 1 | 1 | 1 | 1 | 1 | X | X |
| 09 | 1 | 1 | 1 | 1 | 1 | 1 | 1 | 1 | 1 | X |

1.4.2.2 Slice ID Initialization

Slice ID (SID) initialization only occurs at bus initialize time. A slice that receives a local initialize will not initialize its slice ID again. When bus initialize is detected ARB#(0) for slice 0 is driven low while all other ARB#(0) signals are high as shown in Figure 1-6. Since the ARB#(0) is seen in consecutive slice positions as ARB#(1), ARB#(2), ARB#(3) etc. each slice can then decode this 10 bit value into its slice ID according to Table 1-13. After bus initialize goes false ARB#(0) for slice 0 is driven high.

Figure 1-6 Slice ID Initialization.

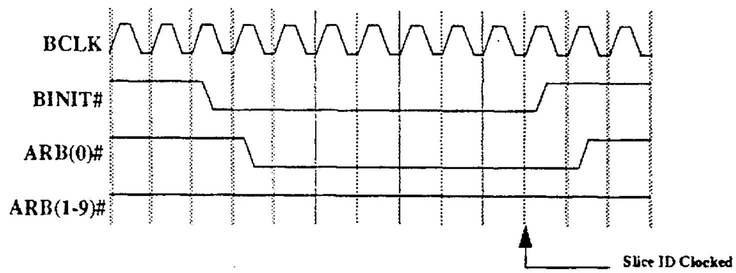

Table 1-13 Slice ID Decoding

| Slice ID | ARBITRATION SIGNAL | | | | | | | | | |
|---|---|---|---|---|---|---|---|---|---|---|
| | 0 | 1 | 2 | 3 | 4 | 5 | 6 | 7 | 8 | 9 |
| 0 | 0 | 1 | 1 | 1 | 1 | 1 | 1 | 1 | 1 | 1 |
| 1 | 1 | 0 | 1 | 1 | 1 | 1 | 1 | 1 | 1 | 1 |
| 2 | 1 | 1 | 0 | 1 | 1 | 1 | 1 | 1 | 1 | 1 |
| 3 | 1 | 1 | 1 | 0 | 1 | 1 | 1 | 1 | 1 | 1 |
| 4 | 1 | 1 | 1 | 1 | 0 | 1 | 1 | 1 | 1 | 1 |
| 5 | 1 | 1 | 1 | 1 | 1 | 0 | 1 | 1 | 1 | 1 |
| 6 | 1 | 1 | 1 | 1 | 1 | 1 | 0 | 1 | 1 | 1 |
| 7 | 1 | 1 | 1 | 1 | 1 | 1 | 1 | 0 | 1 | 1 |
| 8 | 1 | 1 | 1 | 1 | 1 | 1 | 1 | 1 | 0 | 1 |
| 9 | 1 | 1 | 1 | 1 | 1 | 1 | 1 | 1 | 1 | 0 |

1.4.2.3 Arbitration States

After bus initialize occurs all the arbitration signals are deasserted and the arbitration state machines in all slices go into the LATC state. At any time the network can be in either the Latch or Resolution states. All slices are in the same arbitration state at all times.

1. LATCH

This state is active when there are no ARB lines asserted or when determining the next bus owner. All of the arbitration signals are sampled when this state is entered and at each clock while in this state. All the signals that are active form the arbitration group.

2. RESOLUTION

The arbitration state machine goes to this state when the bus owner changes. The arbitration machine remains in this state for only one clock.

1.4.3 Data Bus

1.4.4 Miscellaneous

1.5 BUS TRANSFER TYPES

1.5.1 XA-MP BUS Cycles

1.5.1.1 Write Bus Word WBW Cycle
This timing diagram shows relative timing positions and does not depict actual bus sequences (i.e. a NAKed WBW, a memory cancelled WBW, etc.)
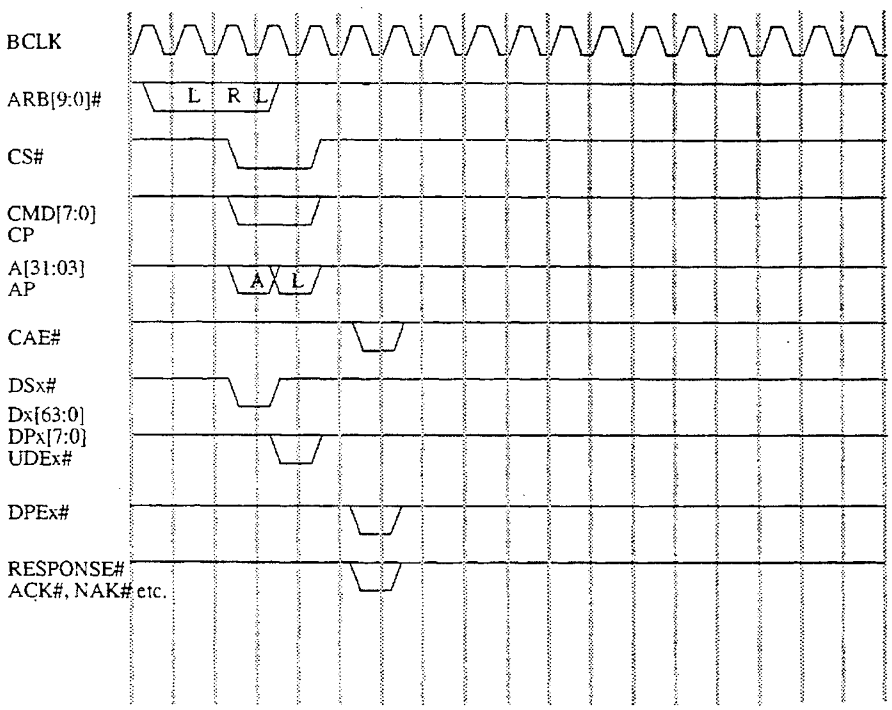
WBW

1.5.1.2 WCL Cycle
This timing diagram shows relative timing positions and does not depict actual bus sequences (i.e. a NAKed WCL, a memory cancelled WCL, etc.).
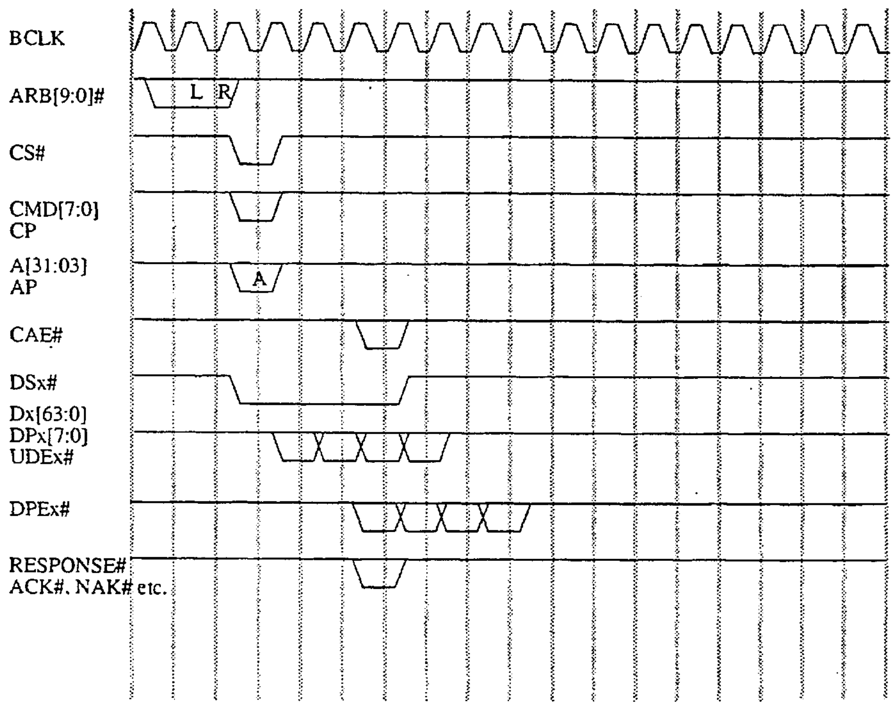
WCL

1.5.1.3 RBW Cycle Ordered Response
This timing diagram shows relative timing positions and does not depict actual bus sequences (i.e. a NAKed RBW, a memory cancelled RBW, etc.).
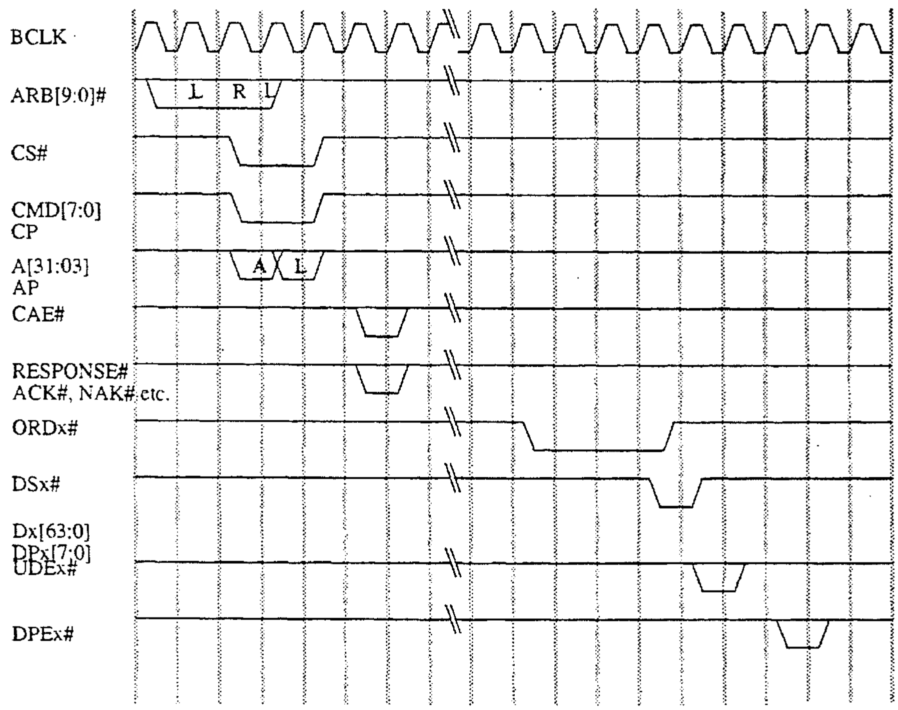
RBW (ordered response)

1.5.1.4 RCL Cycle (Ordered Response)
This timing diagram shows relative timing positions and does not depict actual bus sequences (i.e. a NAKed RCL, a memory cancelled RCL, etc.).
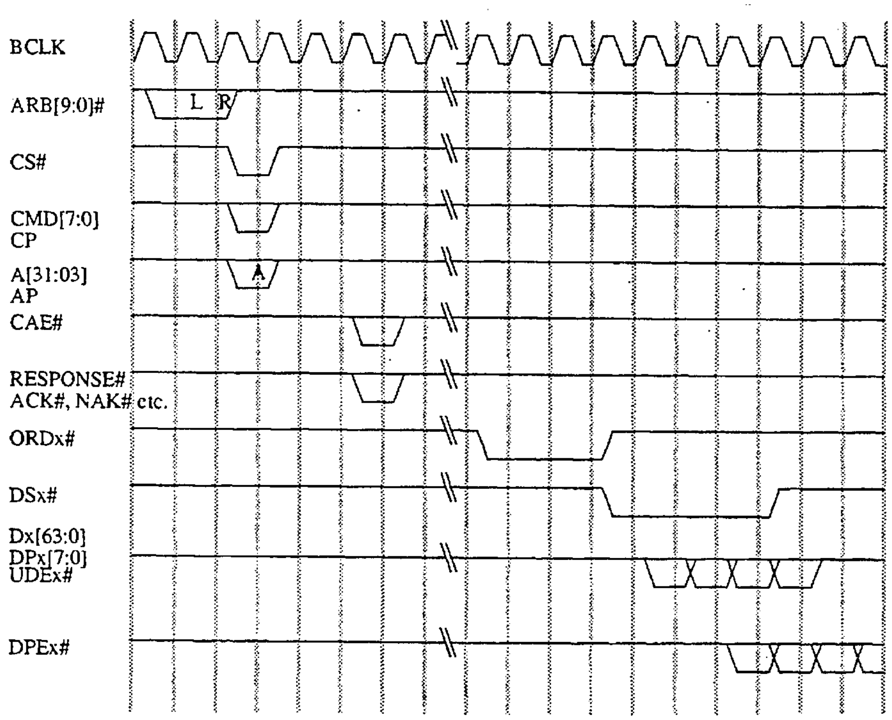
RCL (Ordered Response)

1.5.1.5 WBW WBW Sequence
This timing diagram shows relative timing positions and does not depict actual bus sequences (i.e. a NAKed WBW, a memory cancelled WBW, etc.). Same arbitration group.
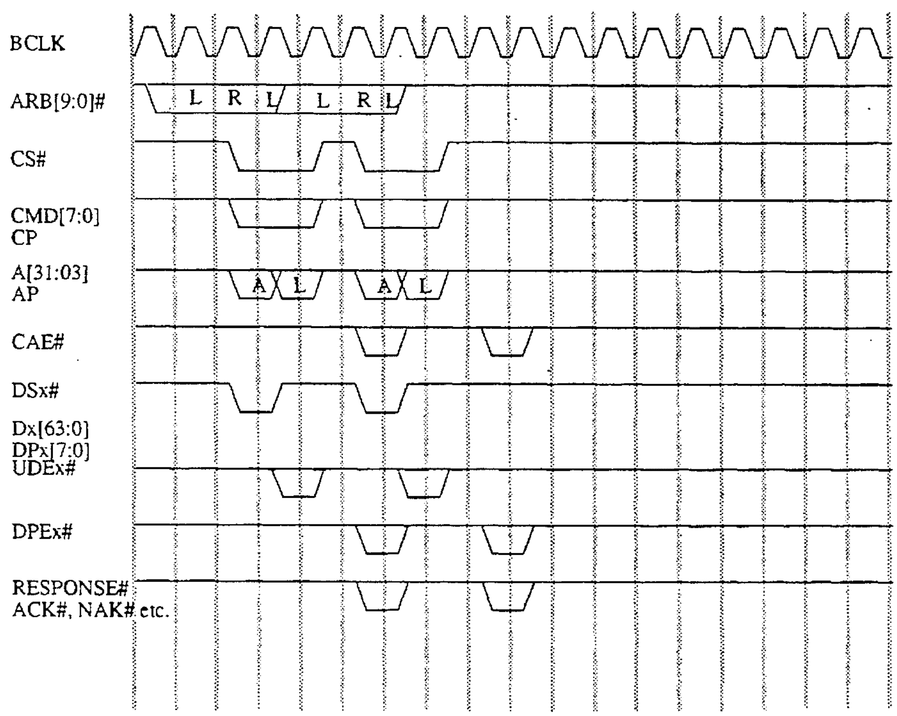
WBW WBW

1.5.1.6 WCL WCL Sequence
This timing diagram shows relative timing positions and does not depict actual bus sequences (i.e. a NAKed WCL, a memory cancelled WCL, etc.). Same arbitration group. Same data bus.
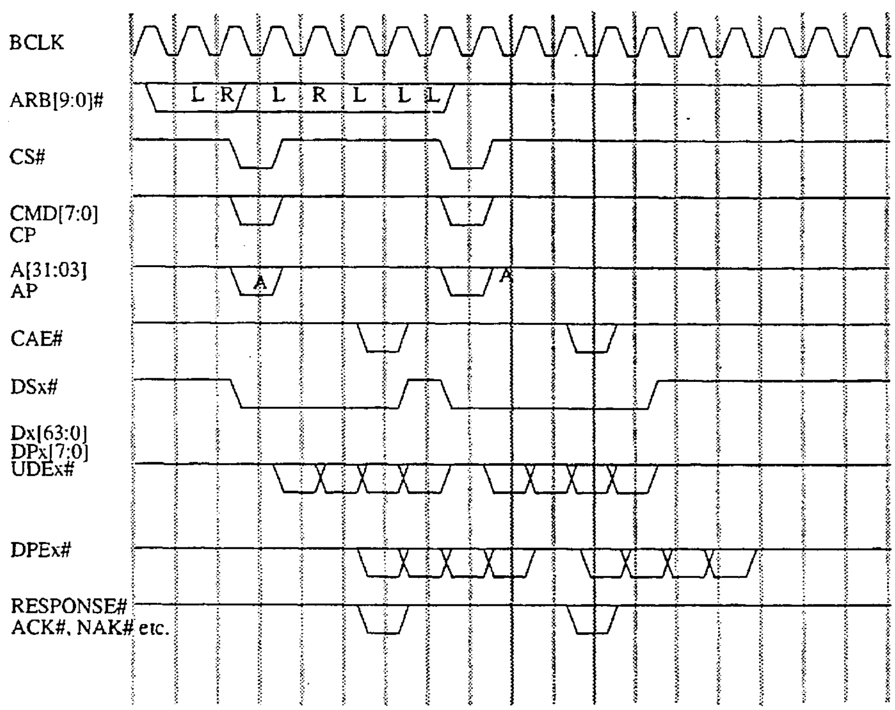
WCL WCL

Same arbitration group. Different data bus.
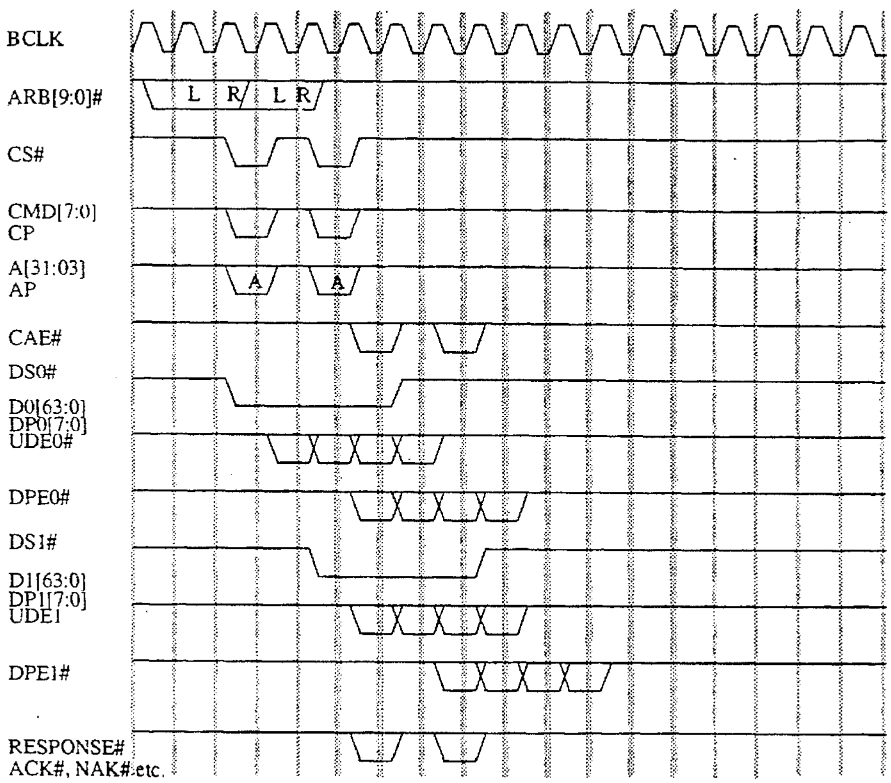
WCL WCL

1.5.1.7 WBW ORD#(RBW) Sequence
This timing diagram shows relative timing positions and does not depict actual bus sequences (i.e. a NAKed WBW, a memory cancelled WBW, etc.). Same data bus. WBW wins data bus
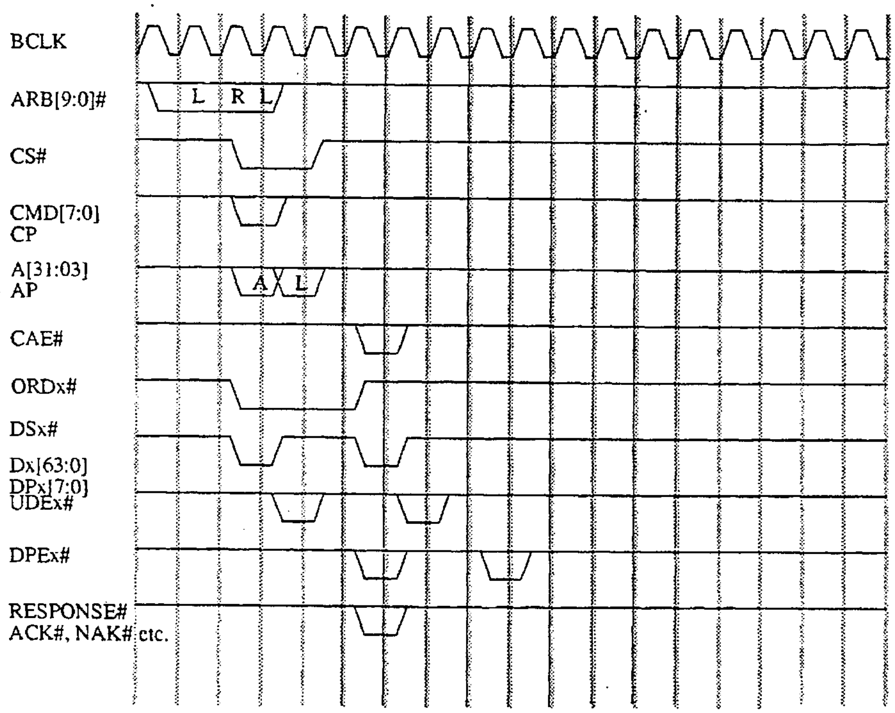
WBW ORD#(RBW)

Same data bus. WBW loses data bus
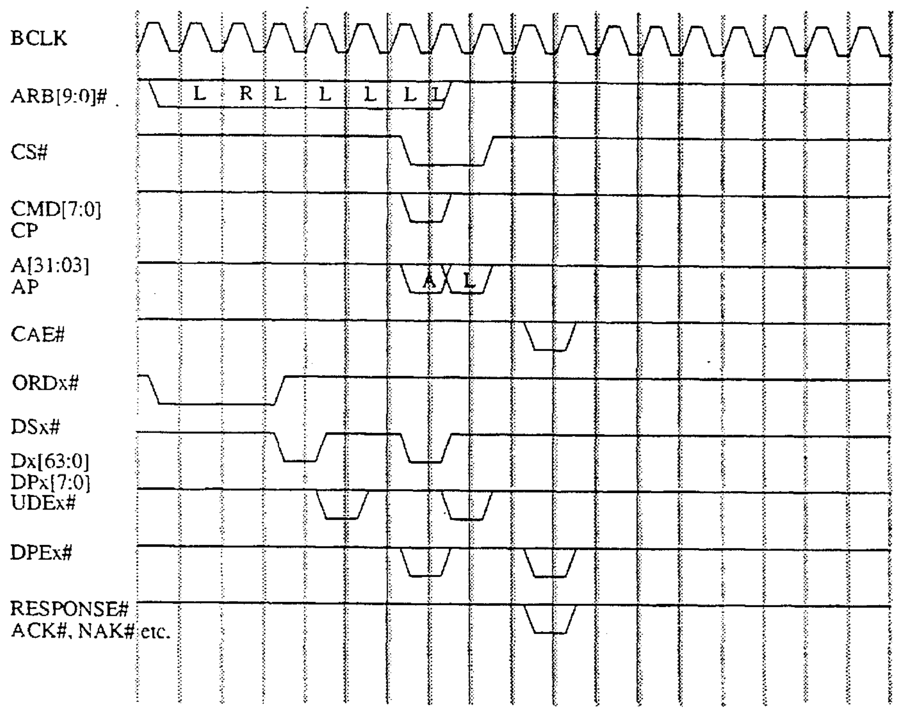
WBW ORD#(RBW)

1.6 ERROR RECOVERY & REPORTING

The XA-MP bus architecture supports a number of error detecting, reporting, and recovery mechanisms. There are basically three categories of detected errors, as follows:

1. Bus requestor detected errors
2. Bus responder detected errors
3. Internal errors

1.6.1 Errors Synchronous with Bus Cycles

Detected errors that occur as a direct result of bus transfer cycles are considered synchronous with the bus cycle. The list of these errors is as follows.

1. Command or Address error.
2. Data Parity error.
3. No Response (no ACK and NAK).
4. Illegal Response.
5. Uncorrectable Data error.
6. Cache Coherency error.

1.6.1.1 Command or Address error

This error is reported by an agent by activating the CAE# signal three bus clocks after the command strobe under the following conditions.

1. Any responder on the bus detects an address and/or command parity error.
2. The addressed responder detects a byte lane parity error.

In response to this error the requesting agent will report the SLER(i.e.Slice Error Red).The requesting agent will record the bus transfer cycle in its Bus Request Trap Red Register. The agent(s) that reported the CAE will also record similar information in its Bus Response Trap Register. For more information on the Bus Trap Registers see section 1.7.2.6 on page 58.

In the case where one agent acknowledges the cycle but another agent reports the error, the agent that acknowledged will ignore the bus cycle.

1.6.1.2 Data Parity Error

This signal(DPE#) goes active when the agent receiving the data detects a data parity error on data that is received. In response to this error the requesting agent will report the SLER(i.e.Slice Error Red).The requesting agent will record the bus transfer cycle in its Bus Request Trap Red Register. The agent(s) that received the data parity error will record information in its Bus Request Trap Register, while the responding agent will record information about the error in it Bus Response Trap Register.

1.6.1.3 No Response

This error occurs when the requesting agent receives no response (no ACK and NAK) three bus clocks after the command strobe was valid on the bus. The agent will report the SLER(i.e.Slice Error Red), record the bus transfer cycle in its Bus Request Trap Red Register and record the bus information into its Bus Request Trap register. All bus responding agents will not respond under the following conditions.

1. Unmapped Address
2. Unimplemented command by the responding agent
3. Responding agent detects a command/address parity error

1.6.1.4 Illegal Response

This error occurs when the requesting agent receives a combination of response & response qualifier signals that are considered illegal for the type of command issued. Table 1-14 outlines each bus command and the responses that are possible for each type of command as well as the expected action to be taken by the requesting agent It must be noted that this table is only valid when CAE and DPE errors do not exist.

Table 1-14 XA-MP Bus Response Actions

| Command | ACK | NAK | MCI | CDM | CDS | ACTION |
|---|---|---|---|---|---|---|
| RCL | 0 | 0 | X | X | X | No Response. Report the SLER |
| | X | 1 | X | X | X | Busy. Retry cycle again |
| | 1 | 0 | 0 | 0 | 0 | In-order Response. Cache to Exclusive |
| | 1 | 0 | 0 | 0 | 1 | In-order Response. Cache to Shared |
| | 1 | 0 | 0 | 1 | X | Illegal Response. Report the SLER |
| | 1 | 0 | 1 | 0 | 0 | Out-of-order Response. Cache to Exclusive |
| | 1 | 0 | 1 | 0 | 1 | Out-of- order Response. Cache to Shared |
| | 1 | 0 | 1 | 1 | 0 | Out-of-order Response. Cache to modified |
| | 1 | 0 | 1 | 1 | 1 | Illegal Response. Report the SLER |
| RIL | 0 | 0 | X | X | X | No Response. Report the SLER |
| | X | 1 | X | X | X | Busy. Retry cycle again |
| | 1 | 0 | 0 | 0 | X | In-order Response. Cache to Modified |
| | 1 | 0 | 0 | 1 | X | Illegal response. Report the SLER |
| | 1 | 0 | 1 | 0 | X | Out-of-order Response. Cache to Modified |
| | 1 | 0 | 1 | 1 | 0 | Out-of-order Response. Cache to Modified |
| | 1 | 0 | 1 | 1 | 1 | Illegal response. Report the SLER |

Table 1-14 XA-MP Bus Response Actions

| Command | ACK | NAK | MCI | CDM | CDS | ACTION |
|---|---|---|---|---|---|---|
| WCL | 0 | 0 | X | X | X | No Response, Report the SLER |
| | X | 1 | X | X | X | Busy, Retry cycle again |
| | 1 | 0 | 0 | 0 | 0 | Cycle Accepted by system memory |
| | 1 | 0 | X | X | 1 | Illegal response, Report the SLER |
| | 1 | 0 | X | 1 | X | |
| | 1 | 0 | 1 | 0 | 0 | Cycle accepted by non-system memory agent |
| RLR, RWR & IOWR | 0 | 0 | X | X | X | No Response, Report the SLER |
| | 0 | 1 | X | X | X | Illegal Response, Report the SLER |
| | 1 | 0 | 0 | 0 | 0 | Cycle Accepted |
| | 1 | 1 | X | X | X | Illegal Response, Report the SLER. |
| | 1 | X | 1 | X | X | |
| | 1 | X | X | 1 | X | |
| | 1 | X | X | X | 1 | |
| PICL | 0 | 0 | X | X | X | No Response, Report the SLER |
| | 0 | 1 | X | X | X | Busy, Retry cycle again |
| | 1 | 0 | 0 | 0 | X | Cycle Accepted, By system memory |
| | 1 | 0 | 1 | 0 | X | Cycle Accepted. By non system memory agent |
| | 1 | 0 | X | 1 | X | Illegal Response, Report the SLER |
| BICL | 0 | 0 | X | X | X | No Response, Report the SLER |
| | X | 1 | X | X | X | Busy, Retry cycle again |
| | 1 | 0 | 0 | 0 | X | Cycle Accepted by system memory |
| | 1 | 0 | 1 | 0 | X | Cycle Accepted by non system memory agent |
| | 1 | 0 | X | 1 | X | Illegal Response, Report the SLER |
| RBW(L) | 0 | 0 | X | X | X | No Response, Report the SLER |
| | X | 1 | X | X | X | Busy, Retry cycle again |
| | 1 | 0 | 0 | 0 | X | Cycle Accepted, In-order response |
| | 1 | 0 | 1 | 0 | X | Cycle Accepted, Out-of-order response |
| | 1 | 0 | X | 1 | X | Illegal Cycle, Report the SLER |

Table 1-14 XA-MP Bus Response Actions

| Command | ACK | NAK | MCI | CDM | CDS | ACTION |
|---|---|---|---|---|---|---|
| WBW(L) | 0 | 0 | X | X | X | No Response. Report the SLER |
| | X | 1 | X | X | X | Busy. Retry cycle again |
| | 1 | 0 | 0 | 0 | X | Cycle Accepted by system memory |
| | 1 | 0 | 1 | 0 | X | Cycle Accepted by non system memory |
| | 1 | 0 | X | 1 | X | Illegal Cycle. Report the SLER |
| IOR & IOW INTA | 0 | 0 | X | X | X | No Response. Report the SLER |
| | X | 1 | X | X | X | Busy. Retry cycle again |
| | 1 | 0 | 1 | 0 | 0 | Cycle Accepted. Out-of-order response |
| | 1 | 0 | 0 | 0 | 0 | Illegal Response. Report the SLER |
| | 1 | 0 | X | 1 | X | |
| | 1 | 0 | X | X | 1 | |

1.6.1.5 Uncorrected Data Error

This error is sent by a slice to indicate to the receiving agent that the data on the data bus has an uncorrectable data error. This signal is activated by a slice for the following reasons.

1. The data being sent has a multiple bit ECC error from system memory or any other slice that uses ECC.
2. The data being sent has a detected parity error prior to being sent on the bus. Slices supporting internal data parity check parity before going to the bus. If the parity is incorrect UDE# is sent by the slice.

Units receiving UDE#,depending on the cycle slices will perform the following.

1. For read data being returned, the requestor will record a Bus Request Trap Red and store the data with incorrect parity. The responder (sending agent) will record the error in it's Bus Response Trap Register.
2. for write operations the sending slice will record information in it's Bus Trap Request Red Register while the receiver will record the data with incorrect parity.

1.6.1.6 Cache Coherency State Errors

A snooping cache on the XA-MP bus can detect a number of errors that may cause a coherency problem. Example of such errors are:

1. Write Bus Word Lock (WBWL) gets a snoop hit to a modified or exclusive line
2. Write Cache Line (WCL) gets a snoop hit to a modified, exclusive or shared line
3. Processor Invalidate Cache Line (PICL) gets a snoop hit to a modified line This error is recorded in the Bus Response Trap Register, with each slice recording additional information in a slice specific register. The action taken by these slice depends on the error type.

1.6.2 Errors Asynchronous with Bus Cycles

Errors that are not a direct result of a bus cycle are considered asynchronous. These errors may be caused by Bus operations but are reported asynchronous to bus operation and are reported using the slice error yellow and slice error red signals. Examples of the types of errors are as follows:

1. Corrected/Uncorrected Errors during Memory Alpha Scrub
2. Uncorrected Error during Memory Read/Modify/Write operations(i.e Byte Writes)
3. Internal errors detected on I/O Bridge.
4. Any other error as determined by a particular slice.
5. Corrected Data returned on XA-MP Bus.

1.6.3 Slice Error Yellow

This Slice Error Yellow signal can be used by any agent to report detected errors via the bus or internal errors to a processor that has a configured interrupt driver to handle the condition.This mechanism allow slices in the system to report error conditions to a configured processor(s) by the interrupt mechanism where an appropriate interrupt handler can then poll the system and record the error condition in some type of error log. The types of errors reported are slice specific. Examples of errors reported are:

1. Corrected Errors during Memory Alpha Scrub
2. Any other recoverable error condition as determined by a particular slice.

A slice that needs to report a Slice Error Yellow must first check the setting of the SLEYEN bit in the Control Status Register. If it is in the disabled state(i.e. 0), then the slice can only record the yellow error. If it is in the enabled state(i.e. 1), then the slice should assert SLEY signal on the XA-MP Bus for one clock period and clear the SLEYEN bit to 0.

1.6.4 Slice Error Red

This Slice Error Red signal can be used by any agent to report detected errors via the bus to a processor that has a configured interrupt driver to handle the condition. For example an I/O bridge takes a Bus Trap Red during a DMA transfer and records the information in its Bus Request Trap Red Register. This error condition would go unnoticed by the processors in the system unless the I/O bridges status was periodically polled. These mechanisms allow slices in the system to report error conditions to a configured processor(s) by the interrupt mechanism where an appropriate interrupt handler can then poll the system and record the error condition in some type of error log. The types of errors reported are slice specific. Examples of errors reported are:

1. Data Parity Error.
2. I/O Bridge DMA gets a Multiple Bit Data Error.
3. Any other unrecoverable error condition as determined by a particular slice.

A slice that needs to report a Slice Error Red must first check the setting of the SLEREN bit in the Control Status Register. If it is in the disabled state(i.e. 0), then the slice can only record the red error. If it is in the enabled state(i.e. 1), then the slice should assert SLER signal on the XA-MP Bus for one clock period and clear the SLEREN bit to 0.

1.7 SYSTEM INITIALIZATION

The system initialization process must facilitate the design of processor modules that may or may not implement on-board RAM or ROM. A P5/486 processor at system initialization is configured in *Real Mode*. *Real Mode* restricts processor accesses to the first mega-byte of the physical address space. This restriction no longer applies when the processor transitions to *Protected Mode*. However, to make the transition, volatile memory (e.g. RAM) is required.

Volatile memory contained on XA-MP memory modules is not available since these modules initialize off-line. Therefore, the XA-MP bus addressable registers required for boot strap processor determination and XA-MP memory module configuration must be addressable in the first mega-byte.

P5/486 processors provide a memory and I/O address space. Registers required for system initialization and configuration are typically located in I/O address space. However, one of the principle objectives of the XA-MP bus architecture is to provide *PC Compatibility*. Support of *PC Compatibility* requires adherence to the defined I/O memory map. Since the *PC Compatible* I/O map is frequently updated, use of this address space for XA-MP system initialization/ configuration registers may inhibit future compliance. Therefore, it is recommended that the I/O address space is not used for the XA-MP bus system and module initialization/configuration registers.

The system initialization process for a multi-processor configuration is required to provide a mechanism to select a single boot strap processor. In addition, if the selected boot strap processor fails prior to the completion of system initialization, the selection process must be repeated among the remaining processor(s) without manual intervention.

1.7.1 Address Map

The XA-MP bus system initialization and module initialization/configuration registers are initially mapped in the lower one megabyte of the memory address space. This allows P5/486 processor modules to determine the boot-strap processor and configure system memory in order to transition to *Protected Mode*. The memory map at system initialization is illustrated in Figure 1-7.

Figure 1-7 Initialization Memory Map
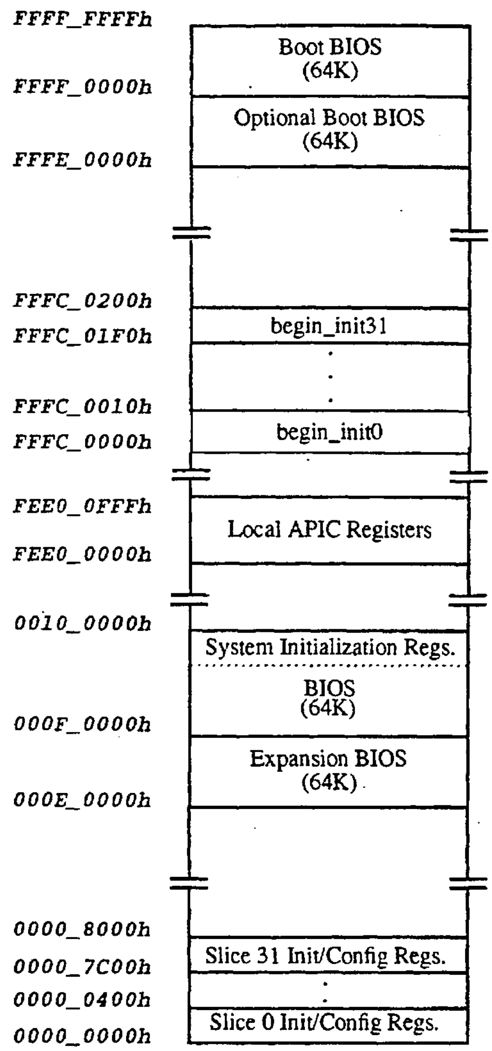
1.7.1.1 Boot BIOS
This memory region is for the contents of the DOS BIOS which is aliased to the top of the 4 Gbyte address space in order to provide the P5/486 with a restart vector. This memory region will not be shadowed.

1.7.1.2 Reserved (Local Registers)

This memory region is reserved for local on-board registers. Local on-board registers cannot be accessed via the XA-MP bus. All registers in this region will be 32-Bit registers and reside on 16-Byte boundaries. A 64 Kilobyte region is reserved for future expansion. A slice will not respond to access to this space.

1.7.1.3 Reserved Global Registers

This memory region is reserved for the future expansion of global registers. Global registers are accessible via the XA-MP bus. The begin_init registers represent global registers. All registers in this region will be 32-Bit registers and reside on 16-Byte boundaries.A slice will not respond to access to this space under the following conditions:

1. Access to these registers which are not double word operations. Byte Lanes [7:0] ≠ 0Fh.
2. Access which are not on 16-byte boundaries (A[03] ≠ 0)
3. Commands other than RBW(L) and WBW(L)
4. Access to a non-implemented register

1.7.1.3.1 Begin_Init

The contents of the begin_init registers specify the base address for module (i.e. slice) initialization/configuration registers which can be located on any 32 Kbyte boundary. Each slice calculates an offset from the contents of the begin_init register. The offset is determined by the physical bus slice location multiplied by 1 Kilobyte. Each slice is allotted 1Kbyte for initialization/configuration. While there is a begin_init register for each slice, the value written in each register should be the same. The rationale for independent registers is to increase system testability.

The begin_init registers are accessible via the XA-MP bus and are 32-Bits wide residing on 128-Bit boundaries. The begin_init register is a read/write register and is set by Bus Initialize to 00000000 h. Only bits [16:00] within the register can be modified. This contains the upper 17-bits of the 32-bit physical address (A[31:15]).The contents of the begin_init register are illustrated in Table 1-15.

Table 1-15 Begin_Init Register

| Begin_Init Register | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
| Reserved | | | | | | | | | | | | | | | A[31:15] | | | | | | | | | | | | | | | | |

1.7.1.4 Local APIC Registers

This area of memory is reserved for the local APIC registers for each processor. There is 4 Kbytes of address space reserved starting at address FEE0_0000 h. These registers can be accessed by the local processor only. For more information on the APIC registers see the 82489DX Advanced Programmable Interrupt Controller. These registers cannot be accessed via the XA-MP Bus.

1.7.1.5 BIOS

This memory region is for the system BIOS typically realized with ROMs residing on a *PC* baseboard. For performance reasons this region is typically shadowed in main memory. The shadowing of this region is controlled through one of the initialization/configuration registers contained within the Compatible I/O Bridge and MBC. Read Only, Write Only, Read/Write and disabled modes are supported. Therefore, main memory acknowledgment on read operations and Compatible I/O Bridge acknowledgment on write operations is supported.

1.7.1.6 System Initialization Registers

This memory region is contained within the BIOS and provides the necessary registers for the determination of the XA-MP boot strap processor. The system initialization registers are bsp_lock, bsp_id, once_here, and read_slice. These registers must reside in the addressable range of a P5/486 processor in *Real Mode.* While the I/O memory map initially appears as the appropriate place for these registers, the I/O map is not stable because of continual BIOS extensions. Therefore, to maintain upward *PC Compatibility* the I/O memory space was chosen not to be used. Embedding the registers within the BIOS is attractive since the BIOS is under the control of the systems designer. Any other location in the memory map would result in the risk of not being *PC Compatible.*

The system initialization registers are 32-Bit registers and reside on 128-Bit boundaries. A slice will not respond to access to this space under the following conditions:

1. Access to these registers which are not double word operations. Byte Lanes [7:0] ≠ 0Fh.
2. Access which are not on 16-byte boundaries (A[03] ≠ 0)
3. Commands other than RBW(L) and WBW(L)
4. Access to a non-implemented register The address mapping of these registers is provided in Table 1-16.

Table 1-16 System Initialization Register Mapping

| Description | Address |
|---|---|
| bsp_lock | 000F_FFB0h |
| bsp_id | 000F_FFC0h |
| once_here | 000F_FFD0h |
| read_slice | 000F_FFE0h |

These registers along with the BIOS can be shadowed by system memory but they will no longer function as intended. Write operations to these registers that are shadowed along with the BIOS will not cause any problems since their usefulness in the boot selection process is no longer required. Shadowing is done by configuring registers located on the cBIC.

1.7.1.6.1 Boot Strap Processor Lock (bsp_lock)

The bsp_lock register is a read only register used to determine the boot strap processor during system initialization. The purpose of this register is to allow all XA-MP bus processors an equal opportunity to become the boot strap processor. The first time after system initialization this register when read will return a value of 00000000 hex. Subsequent register read operations will return the value of 00000001h. Therefore, the first XA-MP bus processor to read this register and obtain the value of 00000000h, can become the boot strap processor. The contents of the bsp_lock register are illustrated in Table 1-17.

Table 1-17 Boot Strap Processor Lock Register

| bsp_lock Register | |
|---|---|
| 31 30 29 28 27 26 25 24 23 22 21 20 19 18 17 16 15 14 13 12 11 10 09 08 07 06 05 04 03 02 01 | 00 |
| Reserved | L |

Where:

1. If L = 0, Processor Won Boot Strap Lock.
2. Else L = 1, Processor Lost Boot Strap Lock.

1.7.1.6.2 Boot Strap Processor ID (bsp_id)

The bsp_id register is used to store the ID of the XA-MP bus boot strap processor. The bsp_id register is updated by the Bus Interface Controller with the slice & module ID of the boot strap processor with the validity bit (V) being set. The register is loaded on the first read operation performed on the bsp_lock register after system initialization.

The bsp_id register is a read/write register that is set by bus initialize to 00000000 h. While write operations to this register are not normal, write access is provided to facilitate increased testability. Only the MID[1:0], SID[4:0], and V bits within the register can be modified. The contents of the bsp_id register are illustrated in Table 1-18.

Table 1-18 Boot Strap Processor ID Register

| bsp_id Register | | | | |
|---|---|---|---|---|
| 31 30 29 28 27 26 25 24 23 22 21 20 19 18 17 16 15 14 13 12 11 10 09 08 | 07 | 06 05 04 03 02 | 01 | 00 |
| Reserved | V | SID[4:0] | MID1 | MID0 |

1.7.1.6.3 Once Here Register (once_here)

The once_here register is used for XA-MP processors to determine whether a "cold" or "hot" system initialization is required. All processors will attempt to become the boot strap processor by being first to read the bsp_lock register. Those that fail will halt. After completing system initialization the boot processor will set the once_here register to 00000001 h (e.g. OHERE bit = 1) and restart the other processors. A read of the once_here register will inform the other processors that "cold" restart firmware (e.g. try to become the boot strap processor) should not be re-executed.

The once_here register is a read/write register and is initialized to 00000000 hex. Only the OHERE bit with in the register can be modified. The contents of the once_here register are illustrated in Table 1-19.

Table 1-19 once_here Register

| once_here Register | |
|---|---|
| 31 ... 01 | 00 |
| Reserved | OHERE |

1.7.1.6.4 Read Slice Register (read_slice)

This read only register as shown in Table 1-20 when read returns to the requesting bus agent, its slice and module identification. This can be used by a processor to determine its own slice identification, so it can access its own slice identification and configuration registers, which are located in the global memory space. When accessed using RBW, the slice ID, SID[4:0] is determined by ARB[9:0], while the module ID, MID[1:0] is equal to command bits CMD[1:0]. A slice should record its slice ID in a local register for further reference, because once this address space is shadowed by system memory it will no longer function.

Table 1-20 Read Slice Register

| read_slice Register | | | |
|---|---|---|---|
| 31 ... 07 | 06 ... 02 | 01 | 00 |
| Reserved | SID[4:0] | MID1 | MID0 |

1.7.1.7 Expansion BIOS

This memory region is for extended BIOS or some expansion bus adapter cards. Hence, this memory region can be shadowed in main memory.

1.7.2 Slice Initialization and Configuration Registers

Each XA-MP module slice contains a 1Kbyte block reserved for initialization/configuration, as shown in Table 1-21. The base address of these registers is determined by the value contained in the slices begin_init register offset by slice ID multiplied by 1Kbyte to form a 32 bit XA-MP bus address as shown below. The registers are 32-Bits and reside on 16-Byte boundaries, with read access to reserved or not implemented locations returning all zeros, while write access to these registers has no effect. A slice will not respond to access to this space under the following conditions:

1. Access to these registers which are not double word operations. Byte Lanes [7:0] ≠ 0Fh.
2. Access which are not on 16-byte boundaries (A[03] ≠ 0)
3. Commands other than RBW(L) and WBW(L)
4. Slices doing ordered responses will only respond to their 1K block register space and not respond to any other request within the supported register space or within the BEGIN_INIT register space.

| Init & Config Base Calculation | | |
|---|---|---|
| A[31:15] | A[14:10] | A[09:00] |
| Begin_Init[16:00] | SID[4:0] | Byte Offset[9:0] |

These registers must be addressable by a P5/486 processor in *Real Mode*. Otherwise a processor couldn't enable main memory in order to transition to *Protected Mode*.

Table 1-21 XA-MP Bus Slice Initialization and Configuration Registers

| Register Layout (bits 31–0) | Relative Byte Location | Register Name |
|---|---|---|
| 31 Reserved 16 \| 15 SLR 8 \| 7 R 5 \| 4 SID 0 | 000 h | Slice-ID |
| 31 Reserved 16 \| 15 ST 0 | 010 h | Slice Type |
| 31 Control/Status 0 | 020 h | Control/Status |
| 31 Clears 0 | 030 h | Clears Register |
| 31 Bus Time Out Value 0 | 040 h | BTOV |
| 31 Reserved 0 | 050-060 h | Reserved |
| 31 Error_Code 24 \| 23 CMD 16 \| 15 BL 8 \| 7 Reserved 0 | 070 h | Bus Request Trap Red 1 |
| 31 A31-A00 0 | 080 h | Bus Request Trap Red 0 |
| 31 Error_Code 24 \| 23 Reserved 16 \| 15 CMD 8 \| 7 R 5 \| 4 SID 0 | 090 h | Bus Response Trap |
| 31 Reserved 0 | 0A0-0F0 h | Reserved |
| 31 Slice Specific Registers 0 | 100-3A0 h | |
| 31 Performance Monitor Counter 3 0 | 3B0 h | PMC3 |
| 31 Performance Monitor Counter 2 0 | 3C0 h | PMC2 |
| 31 Performance Monitor Counter 1 0 | 3D0 h | PMC1 |
| 31 Performance Monitor Counter 0 0 | 3E0 h | PMC0 |
| 31 Performance Monitor Selection Register 0 | 3F0 h | PMS |

1.7.2.1 Slice-ID Register

The Slice-ID register is shown in Table 1-22. This register is used to record the slice identification and revision level for each slice in the system.

This is a read only register (writing will have no effect) with a zero value being returned in the reserved fields.

Table 1-22 Slice ID Register

| Offset 000h | | | Slice ID Register |
|---|---|---|---|
| 31–16 | 15–08 | 07–05 | 04–00 |
| Reserved | SLR[7:0] | Reserved | SID[4:0] |

1.7.2.1.1 Slice Revision (SLR) Field

This 8-bit value is used to identify the revision level for each slice in the system.The format and meaning of this 8-bit value is to be specified by the system OEM vendor.

1.7.2.1.2 Slice Identification (SID) Field

This field is the slice identification number for this particular slice. This number is used to determine the memory location of the configuration and status registers for each slice, as well as the address (when concatenated with the module ID) for out of order read responses. The 5-bit Slice ID is determined at bus initialize time by sampling the arbitration signals. During this time all arbitration signals will be held high except ARB#[0] which is held low. Since all arbitration signals are routed diagonally on the bus, this low signal will show up on a different Arb#[n] signal in each bus slice. Thus by encoding the 32 Arb#[n] signals each slice will have a unique 5-bit slice ID. If a slice detects more than one arbitration signal low at bus initialize, this slice disables itself.

1.7.2.2 Slice Type Register

The Slice Type Register is shown in Table 1-23. This register is used to record the type number for each slice in the system.

This is a read only register (writing will have no effect) with a zero value being returned in the reserved field.

Table 1-23 Slice Type Register

| Offset 010h | Slice Type Register |
|---|---|
| 31–16 | 15–00 |
| Reserved | SIN[15:0] |

1.7.2.2.1 Slice Identification Number (SIN) Field

This field contains the 16-bit identification number for a particular slice and is loaded at bus initialize. The purpose of this register is to provide a way for system software to identify each slice in the system so that the appropriate initialization or driver software can be configured. The format and meaning of this 16-bit value is to be specified by the system OEM vendor.

1.7.2.3 Control/Status Register

The Control/Status Register as shown in Table 1-24 is a read/write (depending upon the field, bits [31:24] are read only and bits[16:0] are read/write) register used to control the overall operating state, and return status of a given slice.

Table 1-24 Control Status Register

| Offset 020h | | | | | | | | Control/Status Register | | | | | | |
|---|---|---|---|---|---|---|---|---|---|---|---|---|---|---|
| 31 | 30 | 29 | 28 | 27 | 26 | 25 | 24 | 23 22 21 20 19 18 17 | 16 | 15 14 13 12 11 10 09 | 08 07 06 05 04 03 | 02 | 01 | 00 |
| MYSLEY | BTRQY | INERY | BTRS | MYSLER | BTRQR | INERR | SBC | Reserved | IND | PH[6:0] | PC[5:0] | SLEREN | SLEYEN | SEN |

1.7.2.3.1 My Slice Error Yellow (MYSLEY)

This read only bit as shown in Table 1-25 indicates that this slice has reported a slice error yellow to the system bus and at least one of the yellow error indicators (BTRQY,INERY) has been set. When a slice reports an error, it captures information about the error. Further reporting of slice yellow errors to the system is suspended until this bit is cleared to zero by clearing the appropriate error indicator(s) (BTRQY, INERY) using the clears register.

Table 1-25 MY Slice Error Yellow Bit

| Bit Field | Bit Setting | Operating Mode |
|---|---|---|
| MYSLEY | 0 | No Slice Error Yellow reported - Initialization State |
| | 1 | Slice Error Yellow reported. |

1.7.2.3.2 Bus Trap Request Yellow (BTRQY)

This read only bit as shown in Table 1-26 indicates that this slice had a Bus Request Trap Yellow occurred. When a slice reports a Bus Request Trap Yellow it captures information about the error in its Bus Request Trap Yellow registers. The slice also attempts at this point to set the Slice Error Yellow signal on the bus. Further capturing of information is suspended until this bit is cleared to zero by using the clears register.

Table 1-26 Bus Trap Request Yellow Bit

| Bit Field | Bit Setting | Operating Mode |
|---|---|---|
| BTRQY | 0 | No Bus Request Trap Yellow - Initialization State |
| | 1 | Bus Request Trap Yellow Recorded. |

1.7.2.3.3 Bus Trap Response (BTRS)

This read only bit as shown in Table 1-27 indicates that this slice had a Bus Response Trap occur. When a slice reports a Bus Response Trap it captures information about the error in its Bus Response Trap register.

Table 1-27 Bus Trap Response Bit

| Bit Field | Bit Setting | Operating Mode |
|---|---|---|
| BTRS | 0 | No Bus Response Trap - Initialization State |
| | 1 | Bus Response Trap Recorded. |

1.7.2.3.4 Internal Error Yellow (INERY)

This read only bit as shown in Table 1-32 indicates that this slice has had an Internal Error Yellow occur. When a slice reports an Internal Error Yellow it records information about the error in a slice specific register(s). Further capturing of these errors will be disabled until this bit is cleared to zero by using the clears register.

Table 1-28 Internal Error Yellow Bit

| Bit Field | Bit Setting | Operating Mode |
|---|---|---|
| INERY | 0 | No Internal Error - Initialization State. |
| | 1 | Internal Error Recorded. |

1.7.2.3.5 Slice Error Yellow Enable (SLEYEN)

This read/write bit as shown in Table 1-29 is used to enable/disable a particular slice to report slice yellow errors to the system, though a slice can still record errors. This bit is used by error handling software to shut down yellow reporting by a particular slice.

Table 1-29 Slice Error Yellow Enable

| Bit Field | Bit Setting | Operating Mode |
|---|---|---|
| SLEYEN | 0 | Slice Error Yellow reporting disabled - Initialization State or if SLEY seen on bus |
| | 1 | Slice Error Yellow reporting enabled |

1.7.2.3.6 MY Slice Error Red (MYSLER)

This read only bit as shown in Table 1-30 indicates that this slice has reported a slice error Red to the system bus. When a slice reports an error, it captures information about the error. Further reporting of slice red errors to the system is suspended until this bit is cleared to zero by clearing the appropriate error indicator(s) (BTRQR, INERR) using the clears register.

Table 1-30 MY Slice Error Red Bit

| Bit Field | Bit Setting | Operating Mode |
|---|---|---|
| MYSLER | 0 | No Slice Error Red reported - Initialization State |
| | 1 | Slice Error Red reported. |

1.7.2.3.7 Bus Trap Request Red (BTRQR)

This read only bit as shown in Table 1-31 indicates that this slice had a Bus Request Trap Red has occurred. When a slice reports a Bus Request Trap Red it captures information about the error in its Bus Request Trap Red registers. The slice also attempts at this point to set the Slice Error Red signal on the bus. Further capturing of information is suspended until this bit is cleared to zero by using the clears register.

Table 1-31 Bus Trap Request Red Bit

| Bit Field | Bit Setting | Operating Mode |
|---|---|---|
| BTRQR | 0 | No Bus Request Trap Red - Initialization State |
| | 1 | Bus Request Trap Red Recorded. |

1.7.2.3.8 Internal Error Red (INERR)

This read only bit as shown in Table 1-32 indicates that this slice has had an Internal Error Red occur. When a slice reports an Internal Error Red it records information about the error in a slice specific register(s). Further capturing of these errors will be disabled until this bit is cleared to zero by using the clears register.

Table 1-32 Internal Error Red Bit

| Bit Field | Bit Setting | Operating Mode |
|---|---|---|
| INERR | 0 | No Internal Error Red - Initialization State. |
| | 1 | Internal Error Red Recorded. |

1.7.2.3.9 Single Bus Configuration(SBC)

This read only bit as shown in Table 1-33 indicates that this slice is configured to use Single Data Bus only.

Table 1-33 Single Bus Configuration

| Bit Field | Bit Setting | Operating Mode |
|---|---|---|
| SBC | 0 | Both Data Buses 0 and 1 are configured. |
| | 1 | only Data Bus 0 is configured. |

1.7.2.3.10 Indicator (IND)

This read/write bit is used to control an external LED indicator as shown in Table 1-34.

Table 1-34 Indicator Bit

| Bit Field | Bit Setting | Operating Mode |
|---|---|---|
| IND | 0 | Indicator off |
| | 1 | Indicator on (initialization state) |

1.7.2.3.11 Phase Indicator (PH) Field

This read/write field shown in Table 1-35 is used by each slice in the system to indicate the current test phase that is being executed. The field is initialized to 7F h and is 00 h when all test phases have passed. The use of this register is flexible. For example, the memory subsystem may run a limited BIST by only doing a few test phases, leaving the remaining phases to be done by the boot processor. Other units may not perform any tests at all, leaving all testing to the boot processor.

Table 1-35 Phase Indicator Field

| Bit Field | Bit Setting | Operating Mode |
|---|---|---|
| PH[6:0] | 7F h | Initialization State |
| | 00 h | Diagnostic/BIST Passed |
| | XX h | Current Test Phase XX |

1.7.2.3.12 Slice Error Red Enable Bit (SLEREN)

This read/write bit as shown in Table 1-36 is used to enable/disable a particular slice to report slice red errors to the system, though a slice can still record errors. This bit is used by error handling software to shut down red reporting by a particular slice.

Table 1-36 Slice Error Red Enable Bit

| Bit Field | Bit Setting | Operating Mode |
|---|---|---|
| SLEREN | 0 | Slice Error Red reporting disabled - Initialization State or if SLER seen on bus |
| | 1 | Slice Error Red reporting enabled |

1.7.2.3.13 Parity Control (PC) Field

The format for this field is shown in Table 1-37 and is used by diagnostic software to generate odd parity for each parity field on the system bus. This will allow the complete testing of bus parity error reporting logic in the system. This field is initialized to 00 h.

The parity control field, when set will result in the slice generating odd parity for the next non-cache memory or I/O bus command. The non-cache commands to be used during error reporting logic testing areWBW,WBWL,IOW and RWR. The setting of any of these bits for cache-type operations(e.g. WCL,RLR,Ordered Response) are not recommanded and the results will be slice dependent.

For WCL ,RLR and Ordered Response, when any of these bits is set , only the first word will generate odd parity.

Table 1-37 Parity Control Field Definitions

| Bit Field | Bit Setting | Operating Mode |
|---|---|---|
| PC[5:0] | 00 h | Generate only EVEN parity (Initialize State) |
| | 01 h | Generates ODD parity on the Address for the next bus cycle. The byte lanes will have EVEN parity. |
| | 02 h | Generates ODD parity on the byte lanes for the next bus cycle. The Address will have EVEN parity. |
| | 03 h | Generates ODD parity for CP for the next bus cycle. |
| | 04 h | Generate UDE0 on the next write(WBW, IOW or WBWL), response (RWR), or Ordered Response operation. |
| | 05 h | Generate UDE1 on the next write(WBW, IOW or WBWL), response (RWR), or Ordered Response operation. |
| | 06-0F h | Reserved |
| | 10 h | Generates ODD parity for DP0[0] on the next operation. |
| | 11 h | Generates ODD parity for DP0[1] on the next operation. |
| | 12 h | Generates ODD parity for DP0[2] on the next operation. |
| | 13 h | Generates ODD parity for DP0[3] on the next operation. |
| | 14 h | Generates ODD parity for DP0[4] on the next operation. |
| | 15 h | Generates ODD parity for DP0[5] on the next operation. |
| | 16 h | Generates ODD parity for DP0[6] on the next operation. |
| | 17 h | Generates ODD parity for DP0[7] on the next operation. |
| | 18 h | Generates ODD parity for DP1[0] on the next operation. |
| | 19 h | Generates ODD parity for DP1[1] on the next operation. |
| | 1A h | Generates ODD parity for DP1[2] on the next operation. |
| | 1B h | Generates ODD parity for DP1[3] on the next operation. |
| | 1C h | Generates ODD parity for DP1[4] on the next operation. |
| | 1D h | Generates ODD parity for DP1[5] on the next operation. |
| | 1E h | Generates ODD parity for DP1[6] on the next operation. |
| | 1F h | Generates ODD parity for DP1[7] on the next operation. |
| | 20-3F h | Reserved |

1.7.2.3.14 Slice Enable (SEN)

This read/write bit as shown in Table 1-38, allows the enabling and disabling of slices in the system. Though interpretation of this bit is slice specific the minimum requirement is that a slice that is disabled must respond and execute commands to its initialization and configuration registers as well as not report any slice errors. The initialization state and effectivity of this bit is slice specific.

Table 1-38 Slice Enable Bit

| Bit Field | Bit Setting | Operating Mode |
|---|---|---|
| SEN | 0 | Slice Disabled |
| | 1 | Slice Enabled |

1.7.2.4 Clears Register

The Clears Register as shown in Table 1-39 is a write only register used to individually clear indicator bits or sections of logic within a slice. Reading this register will produce a value of all zeros.

Table 1-39 Clears Register

| Offset 030h | | | | | | | | Clears Register | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
| INIT | Reserved | | | | | | | | | | | | | | | BTRQYC | INERYC | BTRSC | BTRQRC | INERRC | Slice Specific Clears | | | | | | | | | | |

1.7.2.4.1 Initialize (INIT)

This bit as shown in Table 1-40 is used to soft initialize an individual slice. The slices software visible registers as indicated in Table 1-41 are set to their initialization state.

Table 1-40 Initialize Bit

| Bit Field | Bit Setting | Operating Mode |
|---|---|---|
| INIT | 0 | No Initialize |
| | 1 | Initialize Slice |

Table 1-41 Bus Init vs. Init

| Register | Bus Init | Init |
|---|---|---|
| bsp_lock | X | |
| bsp_id | X | |
| once_here | X | |
| begin_init | X | |
| Slice Revision | X | |
| Slice Identification | X | |
| Slice Type | X | |
| Slice Identification Number | X | |
| My Slice Error Yellow | X | X |
| Bus Trap Request Yellow | X | X |
| Bus Trap Response | X | X |
| Internal Error Yellow | X | X |
| Slice Error Yellow Enable | X | X |
| My Slice Error Red | X | X |
| Bus Trap Request Red | X | X |
| Internal Error Red | X | X |
| Indicator | X | X |
| Phase Indicator | X | X |
| Parity Control | X | X |
| Slice Enable | X | X |
| Bus Time-Out-Value | X | X |
| Bus Request Trap Yellow Register | X | X |
| Bus Response Trap Red Register | X | X |
| Bus Request Trap Red Register | X | X |
| Performance Monitor Counters | X | X |
| Performance Monitor Select Register | X | X |

1.7.2.4.2 Bus Request Trap Yellow Clear (BTRQYC)

This write only bit as shown in Table 1-42 is used to clear the Bus Trap Request Yellow Indicator in the Command/Status Register as well as any bits that create this indicator.

Table 1-42 Bus Request Trap Yellow Clear Bit

| Bit Field | Bit Setting | Operating Mode |
|---|---|---|
| BTRQYC | 0 | No Clear |
| | 1 | Clear Bus Request Trap Yellow Indicator |

1.7.2.4.3 Internal Error Yellow Clear (INERYC)

This write only bit as shown in Table 1-43 is used to clear the Internal Error Yellow indicator in the Command/Status Register as well as any bits that create this indicator.

Table 1-43 Internal Error Yellow Clear Bit

| Bit Field | Bit Setting | Operating Mode |
|---|---|---|
| INERYC | 0 | No Clear |
| | 1 | Clear Internal Error Yellow Indicator |

1.7.2.4.4 Bus Response Trap Clear (BTRSC)

This write only bit as shown in Table 1-44 is used to clear the Bus Response Trap indicator in the Command/Status Register as well as any bits that create this indicator.

Table 1-44 Bus Response Trap Clear Bit

| Bit Field | Bit Setting | Operating Mode |
|---|---|---|
| BTRSC | 0 | No Clear |
| | 1 | Clear Bus Response Trap Indicator |

1.7.2.4.5 Bus Request Trap Red Clear (BTRQRC)

This write only bit as shown in Table 1-45 is used to clear the Bus Trap Request Red Indicator in the Command/Status Register as well as any bits that create this indicator.

Table 1-45 Bus Request Trap Red Clear Bit

| Bit Field | Bit Setting | Operating Mode |
|---|---|---|
| BTRQRC | 0 | No Clear |
| | 1 | Clear Bus Request Trap Red Indicator |

1.7.2.4.6 Internal Error Red Clear (INERRC)

This write only bit as shown in Table 1-46 is used to clear the Internal Error Red indicator in the Command/Status Register as well as any bits that create this indicator.

Table 1-46 Internal Error Red Clear Bit

| Bit Field | Bit Setting | Operating Mode |
|---|---|---|
| INERRC | 0 | No Clear |
| | 1 | Clear Internal Error Red Indicator |

1.7.2.5 Bus Time Out Value Register

This is a read/write register as shown in Table 1-47 is used by each XA-MP bus requesting agent to load its Bus Time-Out timer in order to time-out bus transactions that do not complete. This prevents a bus requesting agent from indefinitely stalling due to incomplete bus transactions.

The Bus Time Out Value is initialized to all zeros, and thus disables the counter until set by the initialization firmware to a value specific to each slice. Once set to a value, every time a bus requestor starts a bus transaction, the timer will decrement at bus clock speed. When the transaction completes the timer stops and reloads from the Bus Time Out Value Register.

A timer value of 2 millseconds or larger is recommended.

If the timer reaches zero it will cause the bus requesting agent to unstall the bus request state machine, and cause the Bus Request Trap register to record the error.

Table 1-47 Bus Time Out Value Register

| Offset 040h | Bus Time Out Value |
|---|---|
| 31 30 29 28 27 26 25 24 23 22 21 20 19 18 17 16 15 14 13 12 11 10 09 08 07 06 05 04 03 02 01 00 | |
| BTOV[31:0] | |

1.7.2.6 Bus Request Trap Red Registers

These are read only registers as shown in Table 1-48 and Table 1-49 are used to record XA-MP bus cycle error conditions as seen by a bus requestor. These registers are used to record the error type, command, and address of the bus transaction in error.

Once a trap has been recorded, the Bus Trap Request Red (BTRQR) indicator bit is set in the control/status register, disabling any further loading of the register until the indicator is cleared.

This information can then be used by the system software to log the error and assist in system maintainability.

Table 1-48 Bus Request Trap Red Register 1

| Offset 070h | Bus Request Trap Red Register 1 | | |
|---|---|---|---|
| 31–24 | 23–16 | 15–08 | 07–00 |
| ERR[7:0] | CMD[7:0] | BL[7:0] | Reserved |

Table 1-49 Bus Request Trap Red Register 0

| Offset 080h | Bus Request Trap Red Register 0 |
|---|---|
| 31–00 | |
| A[31:00] | |

1.7.2.6.1 Error (ERR) Field

The Bus Request Red Error Field as shown in Table 1-50 records the error type of the Bus Request Trap Red.

Table 1-50 Bus Request Trap Red Error Field

| Bit Field | Bit Setting | Operating Mode |
|---|---|---|
| ERR[7:0] | 00 h | Initialization State |
| | 01 h | Bus Time Out Error - RED |
| | 02 h | Uncorrected Data Error (UDE0#) - Bus 0 - RED |
| | 03 h | Uncorrected Data Error (UDE1#) - Bus 1 - RED |
| | 04 h | Command, Address Error (CAE#) - RED |
| | 05 h | Data Parity Error - Bus 0 (DPE0#) - RED |
| | 06 h | Data Parity Error - Bus 1 (DPE1#) - RED |
| | 07 h | No Response - RED |
| | 08 h | Illegal Response - RED |
| | 09-FF h | Reserved |

1.7.2.6.2 Command (CMD) Field

The Bus Request Trap Red Command Field records the 8-bit XA-MP bus command that was being performed by the bus requesting agent when the bus trap occurred.

1.7.2.6.3 Byte Lane(BL) Field

The Byte Lane Field as shown in Table 1-51 records the byte lane sent by the requester during a word access request (e.g. RBW,WBW,IOR,IOW etc.)..

Table 1-51 Byte Lane Fields

| Bit Field | Bit Setting | Operating Mode |
|---|---|---|
| BL[7:0] | 00 h | Initialization State or when non-word access |
| | xx h | Byte Lane sent (meaningful only when word access) |

1.7.2.6.4 Address (A) Field

The Bus Request Trap Red Address Field records the 32-bit XA-MP bus address that was being used by the bus requesting agent when the bus trap occurred. Bits 2 through 0 indicate the lowest byte being accessed by the bus operation.

1.7.2.7 Bus Response Trap Register

This is a read only register as shown in Table 1-52, and is used to record XA-MP bus cycle error conditions as seen by a Bus Responder, or a third party agent like a listening cache. This register is used to record the error type, command, and slice ID of the bus transaction that was being performed by a bus requestor when the responder detected an error.

Once a trap has been recorded, the Bus Trap Response (BTRS) bit is set in the control/status register.

This information can then be used by the system software to log the error and assist in system maintainability.

Table 1-52 Bus Response Trap Register

| Offset 090h | Bus Response Trap Register | | | |
|---|---|---|---|---|
| 31–24 | 23–16 | 15–08 | 07–05 | 04–00 |
| ERR[7:0] | Reserved | CMD[7:0] | Reserved | SID[4:0] |

1.7.2.7.1 Error (ERR) Field

The Bus Response Error Field as shown in Table 1-53 records the error type of the Bus Response Trap. The error type that was reported back on the Bus error signals to the bus requestor is recorded here.

Table 1-53 Bus Response Trap Fields

| Bit Field | Bit Setting | Operating Mode |
|---|---|---|
| ERR[7:0] | 00 h | Initialization State |
| | 01 h | Address Parity Error |
| | 02 h | Command Parity Error |
| | 03 h | Data Parity Error - Bus 0 (DPE0#) |
| | 04 h | Data Parity Error - Bus 1 (DPE1#) |
| | 05 h | Cache Coherency Error |
| | 06h | UDE Error - Bus 0 (UDE0#) |
| | 07h | UDE Error - Bus 1 (UDE1#) |
| | 06-FF h | Reserved |

1.7.2.7.2 Command (CMD) Field

The Bus Response Command Field records the 8-bit XA-MP bus command that was being performed by the bus requesting agent when the bus response trap occurred.

1.7.2.7.3 Slice ID (SID) Field

The Bus Response Trap ID field is used to record the 5-Bit Slice ID of the requesting agent.

1.8 PERFORMANCE MONITORING

The XA-MP architecture includes features to measure and monitor various parameters that contribute to the performance of the system. This information can then be used to "tune" the system hardware and software.

Every slice in the system will have performance monitoring capabilities. The events that are monitored are slice dependent, and are not part of the architecture, though accesses to these mechanisms are defined as part of a standard software interface.

1.8.1 Performance Monitor Counters - PMC0_3

Four read/write 32-bit counters PMC0_3 are provided in each slice. These counters can be configured to count any four events from a pre-determined list of events. These events are selected by programming the performance monitoring select register. The counters are initialized to zero, and can be read by system software while enabled.

1.8.2 Performance Monitor Select Register

The 32-bit Performance Monitor Select Register is a Read/Write register as shown in Table 1-54, is used to control the operation of each of the performance monitoring counters. For each counter there is a 7-bit Performance Monitoring Select Field (PMS), and an enable bit (E). This register is initialized to zero.

Table 1-54 Performance Monitor Select Register

| Offset 3F0h | | | | | | | | | | | | | | | | PMS Register | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
| E3 | PMS3 | | | | | | | E2 | PMS2 | | | | | | | E1 | PMS1 | | | | | | | E0 | PMS0 | | | | | | |

1.8.2.1 Performance Monitor Select Field (PMS)

This 7-bit field as shown in Table 1-54 allows up to four independent events to be monitored by the performance monitoring counters. Though the events selected are slice dependent, there are some events that are defined in the architecture as shown in Table 1-55.

Table 1-55 PMS Encoding

| Field | Code | Operating Mode |
|---|---|---|
| PMS3_0 | 00 h | Count Bus Clocks |
| | 01-7F h | Slice Dependent |

1.8.2.2 Enable Bit (E)

This bit as shown in Table 1-56 is used to enable/disable each of the performance monitoring counters.

Table 1-56 Performance Monitor Counter Enable

| Field | Code | Operating Mode |
|---|---|---|
| Ex | 0 | Performance Counter Ex disabled - initialization state |
| | 1 | Performance Counter Ex enabled |

APPENDIX 2

MEMORY CONTROLLER

MEMORY CONTROLLER (MC) ........ 1
1.1 INTRODUCTION ........ 1
1.1.1 Product Description ........ 1
1.1.2 Revision History ........ 1
1.1.3 References ........ 1
1.2 FUNCTIONAL DESCRIPTION ........ 1
1.2.1 Block Diagram ........ 4
1.2.1.1 XA-MP Interface ........ 4
1.2.1.2 CMD & ADDR IN Block ........ 4
1.2.1.3 MC FIFOS ........ 4
1.2.1.4 MC Manager ........ 6
1.2.1.5 Exception Control ........ 6
1.2.1.6 DRAM Controller ........ 6
1.2.1.7 MDP Interface ........ 6
1.2.1.8 Visible Register Block ........ 6
1.2.1.9 SCAN Control ........ 7
1.2.2 Sub-blocks ........ 7
1.3 PIN DESCRIPTION ........ 8
1.3.1 XA-MP Bus Interface Pins ........ 8
1.3.2 MDP/MC Bus 0 Interface Pins ........ 12
1.3.3 MDP/MC Bus 1 Interface Pins ........ 15
1.3.4 DRAM Array Interface Pins ........ 18
1.3.5 SCAN Interface Pins ........ 18
1.3.6 Pin Assignments ........ 19
1.4 OPERATION ........ 20
1.4.1 XA-MP Bus Interface ........ 20
1.4.1.1 Response Actions ........ 21
1.4.2 MC/MDP Interfaces ........ 22
1.4.2.1 Control Registers ........ 22
1.4.2.1.1 MDP Configuration Registers ........ 22
1.4.2.1.2 Mode 0 Control Registers ........ 23
1.4.2.1.3 Mode 1 Control Register ........ 25
1.4.2.1.4 Data Parity Control Register ........ 26
1.4.2.2 MGO# Timing ........ 28
1.4.2.2.1 DRAM Reads ........ 28
1.4.2.2.2 DRAM Writes ........ 34
1.4.2.2.3 Non-Shift Register Cycles ........ 38
1.4.2.2.4 Shift-In Register Cycles ........ 39
1.4.2.2.5 Shift-Out Register Cycles ........ 40
1.4.2.2.6 XAMP Bus Initialize ........ 41
1.4.2.3 MC/GLUE Data Definitions ........ 42
1.4.2.3.1 Load Phase LEDs ........ 42
1.4.2.3.2 Read External ........ 42
1.4.3 DRAM Array Interface ........ 44
1.4.4 SCAN Interface ........ 71

1.4.5 BIST/XBIST ....................72
1.4.5.1 BIST Functionality ....................72
1.4.5.2 XBIST Functionality....................72
1.4.5.3 Timing....................73
1.4.6 Alpha Scrub ....................74
1.4.6.1 Alpha Scrub Functionality....................74
1.4.6.2 Timing....................74
1.5 SOFTWARE VISIBLE REGISTERS ....................75
1.5.1 Register Mapping/Attributes....................75
1.5.2 Initialization/Configuration Registers....................78
1.5.2.1 begin_init Register....................78
1.5.2.2 Slice-ID Register....................78
1.5.2.2.1 Slice Revision (SLR) Field....................78
1.5.2.2.2 Slice Identification (SID) Field....................78
1.5.2.3 Slice Type Register....................79
1.5.2.3.1 Slice Identification Number (SIN) Field ....................79
1.5.2.4 Control/Status Register....................79
1.5.2.4.1 My Slice Error Yellow (MYSLEY)....................79
1.5.2.4.2 Bus Trap Request Yellow (BTRQY)....................80
1.5.2.4.3 Internal Error Yellow (INERY)....................80
1.5.2.4.4 Bus Trap Response (BTRS)....................80
1.5.2.4.5 My Slice Error Red (MYSLER) ....................80
1.5.2.4.6 Bus Trap Request Red (BTRQR) ....................80
1.5.2.4.7 Internal Error Red (INERR) ....................80
1.5.2.4.8 Single Bus Configuration (SBC) ....................80
1.5.2.4.9 Indicator (IND) ....................81
1.5.2.4.10 Phase Indicator (PH) Field....................81
1.5.2.4.11 Parity Control (PC) Field....................81
1.5.2.4.12 Slice Error Red Enable (SLEREN)....................81
1.5.2.4.13 Slice Error Yellow Enable (SLEYEN) ....................81
1.5.2.4.14 Slice Enable (SEN) ....................81
1.5.2.5 Clears Register....................85
1.5.2.5.1 Initialize (INIT)....................85
1.5.2.5.2 Bus Request Trap Yellow Clear (BTRQYC) ....................85
1.5.2.5.3 Internal Error Yellow Clear (INERYC)....................85
1.5.2.5.4 Bus Response Trap Clear (BTRSC) ....................85
1.5.2.5.5 Bus Request Trap Red Clear (BTRQRC)....................85
1.5.2.5.6 Internal Error Red Clear (INERRC) ....................86
1.5.2.5.7 Uncorrectable Data Error Clear (UDEC)....................86
1.5.2.5.8 Software BIST Enable (SBEN) Bit ....................86
1.5.2.6 Bus Response Trap Register....................87
1.5.2.6.1 Error (ERR) Field ....................87
1.5.2.6.2 Command (CMD) Field....................87
1.5.2.6.3 Slice ID (SID) Field....................87
1.5.2.7 Hardware Configuration Register....................88
1.5.2.7.1 Memory Module Capacity (MMC) Field ....................88

1.5.2.7.2 Refresh Stagger Factor (RSF) Field ........ 89
1.5.2.7.3 Hardware BIST Enable (HBEN) Bit ........ 89
1.5.2.7.4 SIMM Socket Configuration (SSC) Bit ........ 89
1.5.2.8 SIMM Type Register ........ 90
1.5.2.8.1 Group x [1:0] (GRPx[1:0]) Field ........ 90
1.5.2.8.2 Group x [3:2] (GRPx[3:2]) Field ........ 90
1.5.2.9 SIMM Speed Profile Registers ........ 91
1.5.2.10 Software Configuration Register ........ 93
1.5.2.10.1 Extended BIST (XBIST) Bit ........ 93
1.5.2.10.2 Alpha Scrub Enable (ASEN) Bit ........ 93
1.5.2.10.3 Alpha Scrub Error Report Enable (ASEREN) Bit ........ 93
1.5.2.10.4 Hazard Option Disable (HOD) Bit ........ 93
1.5.2.10.5 Modify SIMM Address (MSA) Bit ........ 94
1.5.2.10.6 Reverse Remap Order (RRO) Bit ........ 94
1.5.2.10.7 Group Inhibit(GI) Field ........ 94
1.5.2.10.8 Module Interleave Mode(MIM) Field ........ 94
1.5.2.10.9 Module Interleave Size (MIS) Field ........ 94
1.5.2.10.10 Address Interleave (AI) Bit ........ 94
1.5.2.10.11 Starting Address (SA) Field ........ 94
1.5.2.11 BIST Error Register ........ 97
1.5.2.11.1 BIST Error (BE) Field ........ 97
1.5.2.12 Internal Error Yellow Registers ........ 98
1.5.2.12.1 Alpha Scrub Corrected Data Error (ASCDE) ........ 98
1.5.2.12.2 Partial Write Corrected Data Bit Error (PWCDE) ........ 98
1.5.2.12.3 Read Corrected Data Error (RCDE) ........ 99
1.5.2.12.4 Alpha Scrub Uncorrected Data Error (ASUDE) ........ 99
1.5.2.12.5 Address (A) Field ........ 99
1.5.2.13 Internal Error Red Registers ........ 100
1.5.2.13.1 Partial Write Uncorrected Data Error (PWUDE) ........ 100
1.5.2.13.2 FIFO Error (FIFOE) ........ 100
1.5.2.13.3 Address (A) Field ........ 101
1.5.2.14 Performance Monitor Counters - PMC3 - PMC0 ........ 102
1.5.2.15 Performance Monitor Selection Register ........ 103
1.5.2.15.1 Performance Monitor Selection Field (PMS) ........ 103
1.5.2.15.2 Enable Bit (En) ........ 103
1.6 TESTABILITY ........ 105
1.6.1 IEEE 1149.1 ........ 105
1.6.1.1 Boundary Scan ........ 105
1.6.1.2 Internal Scan ........ 105
1.6.1.3 BIST ........ 105
1.7 ELECTRICAL SPECIFICATIONS ........ 105
1.7.1 Power & Ground ........ 105
1.7.2 Maximum Ratings ........ 105
1.7.3 DC Specifications ........ 105
1.7.4 AC Specifications ........ 105

1.8 MECHANICAL SPECIFICATIONS ........ 106
1.8.1 Package Information ........ 106
1.8.2 Package Thermal Specifications ........ 106
1.9 APPENDIX A - ADDRESS MAPPING ........ 107
1.10 APPENDIX B - SIMM SIGNAL ROUTING ........ 113

1 MEMORY CONTROLLER (MC)

1.1 INTRODUCTION

This specification describes a memory controller that is responsible for interfacing a DRAM array to the high performance XA-MP bus. It contains a set of registers for identification, software configuration, error logging and performance monitoring.

1.1.1 Product Description

The key features of the Memory Controller (MC) are:

1. XA-MP Bus support
2. Supports up to two MDPs for dual data bus operation
3. Automatic SIMM identification and configuration allows SIMM mixing
4. Supports 60 ns and 80 ns SIMMs
5. Supports 1M, 2M, 4M and 8M x 36 bit page mode SIMMs
6. Supports up to 128 Mb with 1M or 2M x 36 SIMMs
7. Supports up to 512 Mb with 4M or 8M x 36 SIMMs
8. Supports module interleaving
9. Supports internal module interleaving
10. Supports optional alpha scrubbing
11. Built in DRAM self test
12. Built in performance monitoring features
13. Supports IEEE 1149.1 scan

1.1.2 Revision History

The current version (0.0) is the first revision of this document.

1.1.3 References

1. "XA-MP Bus Target Specification" Revision 0.0
2. "Memory Data Path Target Specification" Revision 0.0

1.2 FUNCTIONAL DESCRIPTION

The MC provides the address/control connection between the XA-MP bus and the DRAM array. Data to/from the XA-MP and DRAM array is handled by the MDP (Memory Data Path) ASIC under control of the MC. The MC can support independent operation of up to two XA-MP data busses (2 MDPs).

Figure 1-1 MC Connections

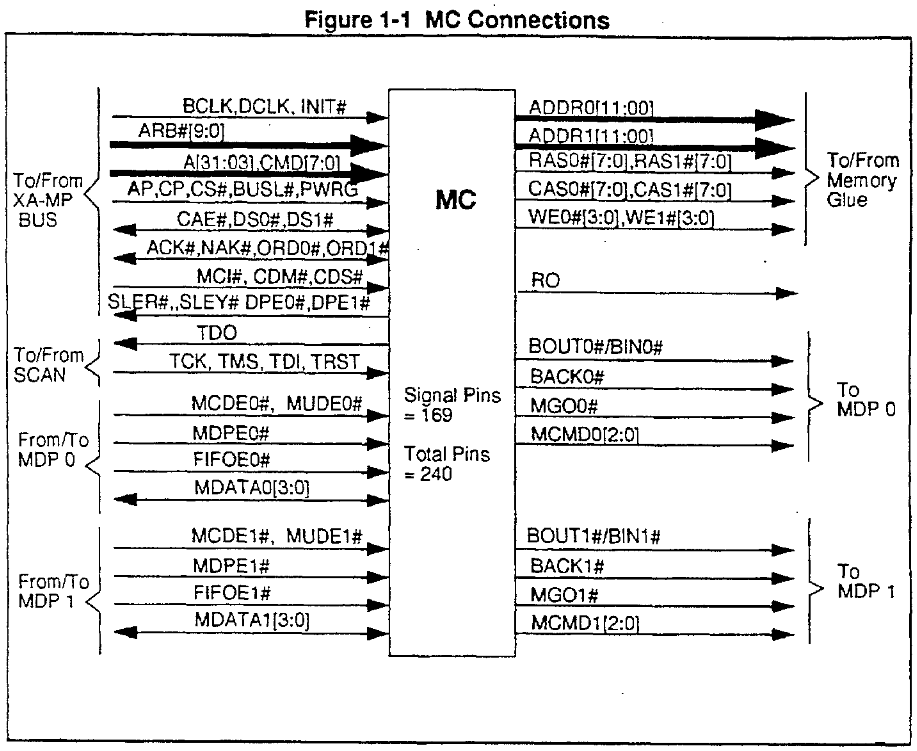

The entire XA-MP Bus Arbitration logic will not be available on the memory controller, instead a subset of the control logic will be supported.

The snooping of the address bus is not supported by the memory controller, the cache coherency is maintained by inhibiting the last command received. When the memory subsystem command and data FIFO's are full, it will negatively acknowledge any further requests thereby forcing the requesting agent to retry the operation, this applies to requests that match the MC's memory map.

The MC can be programmed to operate in several different modes. Each module can have anywhere from 16-512 Mbytes of memory and can be interleaved on cache line boundaries. This module interleaving is limited to 4-way.

Additionally within each module the architecture allows banked or 2-way interleaving.

The memory subsystem can be partially populated at any time. The minimum configuration required is a single group of 128-bit wide memory. The automatic sensing and configuration of the group population information is achieved by a combination of on-board and MC logic..

The memory controller can be used in conjunction with a single or double data bus. One MDP is used for a single data bus approach or two MDP devices for a dual data bus approach.

A CAS before RAS refresh scheme is used for memory refresh. The memory also uses scrubbing logic. If and when a single bit error is detected, it will be corrected by the EDAC logic and written back to the memory at a later time.

1.2.1 Block Diagram

The block diagram of the MC is shown in Figure 1-2. As shown, the MC is composed of the following 9 major blocks:

1. XA-MP Interface
2. CMD & ADDR IN Block
3. MC FIFOS
4. MC Manager
5. Exception Control
6. DRAM Controller
7. MDP Interface
8. Visible Register Block
9. SCAN Control

1.2.1.1 XA-MP Interface

The XA-MP Interface is responsible for all MC control communications with the XA-MP Bus. Operations include the following:

1. Establishing it's slice id at initialization time.
2. Reporting command/address errors.
3. If accessed, provides proper response (ACK#, NAK#) based upon FIFO status.
4. Tracks ordered queue and controls ordered response request.
5. Controls MDP response access to XA-MP Bus.
6. Report data-in parity errors to the XA-MP Bus.

1.2.1.2 CMD & ADDR IN Block

The CMD & ADDR IN Block is responsible for XA-MP bus command & address functions. Operations include the following:

1. Address parity checks
2. Command parity check.
3. Valid command check.
4. Valid memory array address check.
5. Valid register address check.

1.2.1.3 MC FIFOS

The MC FIFOS block is responsible for all the MC queues and queue controls. Operations include the following:

1. Control FIFO operations
2. Pending Read FIFO operations.
3. Ordered response FIFO operations.
4. Aborts internal cycles based upon response qualifiers.
5. Aborts internal write cycles based upon MDP data parity checking.

1.2.1.4 MC Manager

The MC Manager block is responsible for arbitrating internal cycles. Operations include arbitrating between the following:

1. XA-MP bus read/write cycles.
2. Refresh cycles.
3. Alpha scrub cycles.
4. Correction cycles.
5. BIST cycles.
6. Hazard cycles.

1.2.1.5 Exception Control

The Exception Control is responsible for generating the actual control sequences for the following:

1. Refresh cycles.
2. Alpha scrub cycles.
3. Correction cycles.
4. BIST cycles.
5. Hazard cycles.

1.2.1.6 DRAM Controller

The DRAM Controller is responsible for all MC communications with the on-board DRAM memory. Operations include the following:

1. Generation of DRAM remapped addresses.
2. Generation of DRAM write enables.
3. Generation of DRAM remapped timing signals (RAS#, CAS#).

1.2.1.7 MDP Interface

The MDP Interface is responsible for independent control over up to 2 MDP devices. Operations at each interface include the following:

1. Support DRAM read cycles.
2. Support DRAM write cycles.
3. Support register read cycles.
4. Support register write cycles.
5. Support external board read cycles.
6. Support external board write cycles.

1.2.1.8 Visible Register Block

The Visible Register Block is responsible for all MC registers. Operations include the following:

1. Read and shift-out the selected register.
2. Shift-in and write the selected register.

1.2.1.9 SCAN Control

The SCAN Control is responsible for all SCAN interface operations.

1.2.2 Sub-blocks

TBS

1.3 PIN DESCRIPTION

The different sets of signals of the MC are classified as follows:

1. XA-MP Bus Interface Pins
2. MDP/MC Bus 0 Interface Pins
3. MDP/MC Bus 1 Interface Pins
4. DRAM Array Interface Pins
5. SCAN Interface Pins
6. Miscellaneous Pins

1.3.1 XA-MP Bus Interface Pins

Table 1-1 XA-MP Bus Interface Pins

<table>
<tr><th>Signal Name</th><th>Type</th><th>Description</th></tr>
<tr><td>A[31:03]</td><td>I</td><td>Address bus. This 29-bit address bus defines a 4-gigabyte memory address space. The address is valid on the bus clock leading edge in which the command strobe is valid. On non-cache line commands (i.e. RBW, RBWL, WBW and WBWL) the byte lane bits are valid in the clock after the address on A[15:08]. Byte lane bits are active low on the bus (i.e. low = write, high = read).</td></tr>
<tr><td>AP</td><td>I</td><td>Address Parity. This bit indicates even parity for address bits A[31:03]. This bit is valid at the same time as the command strobe.</td></tr>
<tr><td>ARB#[9:0]</td><td>I</td><td>Arbitration. These 10 active low arbitration lines are used to determine module slice number.</td></tr>
<tr><td>CMD[7:0]</td><td>I</td><td>Command. An 8-bit command bus from the XA-MP bus to the memory. The command is valid at the same time as the address signals. The valid memory commands are shown below..
<table>
<tr><th>Command</th><th>Code</th><th>Command</th><th>Code</th><th>Command</th><th>Code</th><th>Command</th><th>Code</th></tr>
<tr><td>RCL(0)<br>RCL(1)<br>RCL(2)<br>RCL(3)</td><td>00<br>01<br>02<br>03</td><td>RBW(0)<br>RBW(1)<br>RBW(2)<br>RBW(3)</td><td>10<br>11<br>12<br>13</td><td>RBWL(0)<br>RBWL(1)<br>RBWL(2)<br>RBWL(3)</td><td>20<br>21<br>22<br>23</td><td>Not Applicable</td><td>30-33</td></tr>
<tr><td>RIL(0)<br>RIL(1)<br>RIL(2)<br>RIL(3)</td><td>04<br>05<br>06<br>07</td><td>Reserved</td><td>14-17</td><td>Reserved</td><td>24-27</td><td>Reserved</td><td>34-37</td></tr>
<tr><td>WCL<br>Not Applicable<br>Reserved</td><td>08<br>09<br>0A-0B</td><td>WBW<br>Not Applicable<br>Reserved</td><td>18<br>19<br>2A-2B</td><td>WBWL<br>Reserved</td><td>28<br>29-2B</td><td>Not Applicable<br>Reserved</td><td>38<br>39-3B</td></tr>
<tr><td>BICL<br>Reserved</td><td>0C<br>0D-0F</td><td>PICL<br>Reserved</td><td>1C<br>1D-1F</td><td>Reserved</td><td>2C-2F</td><td>Not Applicable<br>Reserved</td><td>3C-3D<br>3E-FF</td></tr>
</table></td></tr>
<tr><td>CP</td><td>I</td><td>Command Parity. This bit indicates even parity for CMD[7:0].</td></tr>
</table>

Table 1-1 XA-MP Bus Interface Pins (Continued)

| Signal Name | Type | Description |
|---|---|---|
| CAE# | I/O | Command or Address Error. This active low signal indicates a Command or Address Error. |
| CS# | I | Command Strobe. This active low signal indicates valid information on the address and command signals. |
| DS0# | I/O | Data Strobe 0. This active low signal when true indicates valid information on data bus 0 on the next bus clock cycle after the strobe. |
| DS1# | I/O | Data Strobe 1. This active low signal when true indicates valid information on data bus 1 on the next bus clock cycle after the strobe. |
| DPE0# | I/O | Data Parity Error 0. This active low signal, when driven by the MC, indicates that a parity error was detected on data bus 0. This signal is driven 2 bus clocks after receipt of the data in error. This active low signal, when received by the MC in response to its ordered read response, indicates that the receiving agent saw incorrect parity. |
| DPE1# | I/O | Data Parity Error 1. This active low signal, when driven by the MC, indicates that a parity error was detected on data bus 1. This signal is driven 2 bus clocks after receipt of the data in error. This active low signal, when received by the MC in response to its ordered read response, indicates that the receiving agent saw incorrect parity. |
| ACK# | I/O | Acknowledge. This active low signal, indicates acceptance of the current bus command. |
| NAK# | I/O | Negative Acknowledge. This active low signal, indicates a temporary busy condition and thus no acceptance of the current bus command. |
| MCI# | I | Memory Cycle Inhibit. This active low signal, causes the memory to abort the current XA-MP Bus cycle it has just accepted. |
| CDM# | I | Cache Data Modified. This active low signal, causes the memory to abort the current XA-MP Bus cycle it has just accepted. |
| CDS# | I | Cache Data Shared. This active low signal, under certain conditions causes the memory to abort the current XA-MP Bus cycle it has just accepted. |
| BUSL# | I | Bus Lock. This active low signal is used to indicate that an XA-MP bus requesting agent is performing a full bus lock operation. When BUSL# is high, memory response is normal. When BUSL# is low, memory response is as follows:<br>1) No Response - RCL, RIL, RBW, PICL & BICL.<br>2) Respond - WCL, WBW, WBWL & RBWL. |
| ORD0# | I/O | Ordered Response Request 0. This active low signal when true indicates the request of an ordered data response on data bus 0. This signal remains valid until the in-order requestor gains access to the data bus (DS0# goes inactive from the previous user). |
| ORD1# | I/O | Ordered Response Request 1. This active low signal when true indicates the request of an ordered data response on data bus 1. This signal remains valid until the in-order requestor gains access to the data bus (DS1 goes inactive from the previous user). |

Table 1-1 XA-MP Bus Interface Pins (Continued)

| Signal Name | Type | Description |
|---|---|---|
| SLEY# | I/O | Slice Error Yellow. This active low signal is used to indicate that a "yellow" type error (non-fatal) has occurred. The signal is asynchronous to bus transfers but synchronous to the bus clock and is driven for only one bus clock. When received it is used to reset the SLEYEN bit in the Control/Status register. |
| SLER | I/O | Slice Error Red. This active low signal is used to indicate that a "red" type error (fatal) has occurred. The signal is asynchronous to bus transfers but synchronous to the bus clock and is driven for only one bus clock. When received it is used to reset the SLEREN bit in the Control/Status register. |
| INIT# | I | Initialize. This signal when low causes the MC to initialize itself and start its BIST. |
| PWRG | I | Power Good |
| BCLK | I | Bus Clock. Frequency equals 33.3 Mhz. |
| DCLK | I | Double Clock. This clock frequency is twice the bus clock = 66.6Mhz. |
| 69 | | TOTAL PINS |

Table 1-2 XA-MP Command Description

| Command | Function |
|---|---|
| RCL(3-0) | Read Cache Line. This command requests the memory to do a cache line read. |
| RBW(3-0) | Read Bus Word. This command requests the memory to read data up to the width of the bus (1 to 8 bytes). The valid bytes on the bus are indicated on the second cycle of the command when the byte lane controls are asserted on address signals AD[15:08]. The command strobe remains asserted for the duration of the byte lane controls on the address bus. |
| RBWL(3-0) | Read Bus Word (Lock). This command requests the memory to read data up to the width of the bus (1 to 8 bytes). The valid bytes on the bus are indicated on the second cycle of the command when the byte lane controls are asserted on address signals AD[15:08]. The command strobe remains asserted for the duration of the byte lane controls on the address bus. |
| RIL(3-0) | Read & Invalidate Cache Line. This command requests the memory to do a cache line read. |
| WCL | Write Cache Line. This command requests the memory to do a cache line write. |
| WBW | Write Bus Word. This command requests the memory to write data up to the width of the bus (1 to 8 bytes). The valid bytes on the bus are indicated on the second cycle of the command when the byte lane controls are asserted on address signals AD[15:08]. The command strobe remains asserted for the duration of the byte lane controls on the address bus. |
| WBWL | Write Bus Word (Lock). This command requests the memory to write data up to the width of the bus (1 to 8 bytes). The valid bytes on the bus are indicated on the second cycle of the command when the byte lane controls are asserted on address signals AD[15:08]. The command strobe remains asserted for the duration of the byte lane controls on the address bus. |
| BICL | I/O Bridge Invalidate Cache Line. This command causes the memory to 'always' ACK if the bus address is within its address space, but no internal DRAM cycle is performed as a result of the ACK. |
| PICL | Processor Invalidate Cache Line. This command causes the memory to 'always' ACK if the bus address is within its address space, but no internal DRAM cycle is performed as a result of the ACK. |

1.3.2 MDP/MC Bus 0 Interface Pins

Table 1-3 MDP/MC Bus 0 Interface Pins

| Signal Name | Type | Description |
|---|---|---|
| MCDE0# | I | MC Corrected Data Error 0. An active low signal, from the MDP to MC, used to indicate the occurrence of a single bit EDAC error. |
| MUDE0# | I | MC Uncorrected Data Error 0. An active low signal, from the MDP to MC, used to indicate the occurrence of:<br>1) a multiple bit EDAC error (even number of bit errors or triple bit error within a x4 DRAM).<br>2) write to a visible register received from XA-MP bus with a UDE. |
| MDPE0# | I | MC Data Parity Error 0. An active low signal, from the MDP to the MC, used to indicate the occurrence a parity error detected on data bus 0. |
| FIFOE0# | I | FIFO Error 0. An active low signal, from the MDP to MC, used to indicate the occurrence of a FIFO error. An error occurs when: 1) the Read or Write FIFO was empty and an operation was requested requiring FIFO data or 2) the READ or Write FIFO was full and an operation tried to put data into the FIFO. |
| MDATA0[3:0] | I/O | MC DATA 0. A 4-bit field used to transfer data between the MDP and MC. The content of this field is defined by the MCMD0 field and (MGO0#). |
| BOUT0# | O | Bus OUT 0. An active low signal, from the MC to the MDP, used to enable data from the MDP onto the XA-MP bus. |
| BIN0# | O | Bus IN 0. An active low signal, from the MC to the MDP, used to enable data from the XA-MP bus into the MDP. |
| BACK0# | O | Bus Acknowledge 0. An active low signal, from the MC to MDP, used to indicate:<br>1) Acknowledged write cycle to memory (valid cycle before ACK#).<br>2) Acknowledged write cycle still OK (valid cycle after ACK#). |
| MGO0# | O | MC GO 0. An active low signal, from the MC to the MDP, used with the MCMD0 field to initiate various MDP/GLUE cycles. |
| MCMD0[2:0] | O | MC Command 0. This 3-bit field is used to pass commands from the MC to the MDP. These command signals are valid when MGO0# is active. |
| 15 | | TOTAL PINS |

Table 1-4: MGO0# Commands

| Valid when MGO0# is low | | |
|---|---|---|
| **MCMD0[2:0]** | **FUNCTION** | **MDATA0[3:0]** |
| 000 | DRAM - All Reads | Data from MC to MDP<br>With command<br>MDATA0[0] = Left/Right data word bit<br>MDATA0[1] = Single/Double data word bit<br>MDATA0[3:2] = Cycle type bits<br>when 0,1 or 2, errors are sent to MC and are recorded in YSR/RSR<br>when 3, errors are sent to MC, but are not recorded in YSR/RSR<br>MDATA0[3:0] = 0 = Read Single Left<br>MDATA0[3:0] = 1 = Read Single Right<br>MDATA0[3:0] = 2 = Read Double Left<br>MDATA0[3:0] = 3 = Read Double Right<br>MDATA0[3:0] = 4 = Partial WBW Single Left<br>MDATA0[3:0] = 5 = Partial WBW Single Right<br>MDATA0[3:0] = 6 = Not supported<br>MDATA0[3:0] = 7 = Not supported<br>MDATA0[3:0] = 8 = Alpha Single Left<br>MDATA0[3:0] = 9 = Alpha Single Right<br>MDATA0[3:0] = A = BIST Double Left<br>MDATA0[3:0] = B = BIST Double Right<br>MDATA0[3:0] = C = Correction/Alpha Single Left<br>MDATA0[3:0] = D = Correction/Alpha Single Right<br>MDATA0[3:0] = E = Not supported<br>MDATA0[3:0] = F = Not supported<br>Cycle after command<br>MDATA0[2:0] = SIMM #<br>MDATA0[3] = Reserved |
| 001 | DRAM - Write Full Bus Word<br><br>(Used for DRAM WCL and full WBW or BIST/XBIST WCL) | Data from MC to MDP<br>With command<br>MDATA0[0] = 0 = Left data word<br>MDATA0[0] = 1 = Right data word<br>MDATA0[3:1] = Reserved |
| 010 | DRAM - Write Left<br>(DD1[63:00] / DC1[7:0])<br><br>(Used for partial WBW, alpha or correction cycles) | Data from MC to MDP<br>With command<br>MDATA0[3:0] = LANES[7:4]<br>Next cycle<br>MDATA0[3:0] = LANES[3:0]<br>Where:<br>1 = write<br>0 = no write |

Table 1-4: MGO0# Commands (Continued)

| Valid when MGO0# is low | | |
|---|---|---|
| MCMD0[2:0] | FUNCTION | MDATA0[3:0] |
| 011 | DRAM - Write Right (DD0[63:00] / DC0[7:0])<br><br>(Used for partial WBW, alpha or correction cycles) | Data from MC to MDP<br>With command<br>MDATA0[3:0] = LANES[7:4]<br>Next cycle<br>MDATA0[3:0] = LANES[3:0]<br>Where:<br>1 = write<br>0 = no write |
| 100 | Registers<br><br>MDATA0 decodes:<br><br>0-5 require no shifting<br><br>6-A require Shift-in before command<br><br>C-E require Shift-out after command | Data from MC to MDP<br>MDATA0[3:0] = 0 = Read Software config reg<br>MDATA0[3:0] = 1 = Read Error status reg<br>MDATA0[3:0] = 2 = Read YDE SIMM reg<br>MDATA0[3:0] = 3 = Read RDE SIMM reg<br>MDATA0[3:0] = 4 = Load Software config reg<br>MDATA0[3:0] = 5 = Load Reserved reg [a]<br>MDATA0[3:0] = 6 = Load Data Parity Ctl<br>MDATA0[3:0] = 7 = Load Mode 0 Ctl<br>MDATA0[3:0] = 8 = Load Mode 1 Ctl<br>MDATA0[3:0] = 9 = Read MC reg<br>MDATA0[3:0] = A = Load Phase LEDs<br>MDATA0[3:0] = B = Reserved<br>MDATA0[3:0] = C = Load MC reg<br>MDATA0[3:0] = D = Read MDP Config reg<br>MDATA0[3:0] = E = Read External<br>MDATA0[3:0] = F = Reserved |
| 101 | Shift-in | Data from MC to MDP or GLUE |
| 110 | Shift-out | Data from MDP or GLUE to MC |
| 111 | XAMP Bus Initialize | Not used |

a. Used to increment MDP write fifo output pointer for a write to a Reserved Visible Register.

1.3.3 MDP/MC Bus 1 Interface Pins

Table 1-5 MDP/MC Bus 1 Interface Pins

| Signal Name | Type | Description |
|---|---|---|
| MCDE1# | I | MC Corrected Data Error 1. An active low signal, from the MDP to MC, used to indicate the occurrence of a single bit EDAC error. |
| MUDE1# | I | MC Uncorrected Data Error 1. An active low signal, from the MDP to MC, used to indicate the occurrence of:<br>1) a multiple bit EDAC error (even number of bit errors or triple bit error within a x4 DRAM).<br>2) write to a visible register received from XA-MP bus with a UDE. |
| MDPE1# | I | MC Data Parity Error 1. An active low signal, from the MDP to the MC, used to indicate the occurrence a parity error detected on data bus 1. |
| FIFOE1# | I | FIFO Error 1. An active low signal, from the MDP to MC, used to indicate the occurrence of a FIFO error. An error occurs when: 1) the Read or Write FIFO was empty and an operation was requested requiring FIFO data or 2) the READ or Write FIFO was full and an operation tried to put data into the FIFO. |
| MDATA1[3:0] | I/O | MC DATA 1. A 4 -bit field used to transfer data between the MDP and MC. The content of this field is defined by the MCMD1 field and (MGO1#). |
| BOUT1# | O | Bus OUT 1. An active low signal, from the MC to the MDP, used to enable data from the MDP onto the XA-MP bus. |
| BIN1# | O | Bus IN 1. An active low signal, from the MC to the MDP, used to enable data from the XA-MP bus into the MDP. |
| BACK1# | O | Bus Acknowledge 1. An active low signal, from the MC to MDP, used to indicate:<br>1) Acknowledged write cycle to memory (valid cycle before ACK#).<br>2) Acknowledged write cycle still OK (valid cycle after ACK#). |
| MGO1# | O | MC GO 1. An active low signal, from the MC to the MDP, used with the MCMD1 field to initiate various MDP/GLUE cycles. |
| MCMD1[2:0] | O | MC Command 1. This 3-bit field is used to pass commands from the MC to the MDP. These command signals are valid when MGO1# is active. |
| 15 | | TOTAL PINS |

Table 1-6: MGO1# Commands

| Valid when MGO1# is low | | |
|---|---|---|
| **MCMD1[2:0]** | **FUNCTION** | **MDATA1[3:0]** |
| 000 | DRAM - All Reads | Data from MC to MDP<br>With command<br>MDATA1[0] = Left/Right data word bit<br>MDATA1[1] = Single/Double data word bit<br>MDATA1[3:2] = Cycle type bits<br>when 0,1 or 2, errors are sent to MC and are recorded in YSR/RSR<br>when 3, errors are sent to MC, but are not recorded in YSR/RSR<br>MDATA1[3:0] = 0 = Read Single Left<br>MDATA1[3:0] = 1 = Read Single Right<br>MDATA1[3:0] = 2 = Read Double Left<br>MDATA1[3:0] = 3 = Read Double Right<br>MDATA1[3:0] = 4 = Partial WBW Single Left<br>MDATA1[3:0] = 5 = Partial WBW Single Right<br>MDATA1[3:0] = 6 = Not supported<br>MDATA1[3:0] = 7 = Not supported<br>MDATA1[3:0] = 8 = Alpha Single Left<br>MDATA1[3:0] = 9 = Alpha Single Right<br>MDATA1[3:0] = A = BIST Double Left<br>MDATA1[3:0] = B = BIST Double Right<br>MDATA1[3:0] = C = Correction/Alpha Single Left<br>MDATA1[3:0] = D = Correction/Alpha Single Right<br>MDATA1[3:0] = E = Not supported<br>MDATA1[3:0] = F = Not supported<br>Cycle after command<br>MDATA1[2:0] = SIMM #<br>MDATA1[3] = Reserved |
| 001 | DRAM - Write Full Bus Word<br><br>(Used for DRAM WCL and full WBW or BIST/XBIST WCL) | Data from MC to MDP<br>With command<br>MDATA1[0] = 0 = Left data word<br>MDATA1[0] = 1 = Right data word<br>MDATA1[3:1] = Reserved |
| 010 | DRAM - Write Left (DD1[63:00] / DC1[7:0])<br><br>(Used for partial WBW, alpha or correction cycles) | Data from MC to MDP<br>With command<br>MDATA1[3:0] = LANES[7:4]<br>Next cycle<br>MDATA1[3:0] = LANES[3:0]<br>Where:<br>1 = write<br>0 = no write |

Table 1-6: MGO1# Commands (Continued)

| Valid when MGO1# is low | | |
|---|---|---|
| **MCMD1[2:0]** | **FUNCTION** | **MDATA1[3:0]** |
| 011 | DRAM - Write Right (DD0[63:00] / DC0[7:0])<br><br>(Used for partial WBW, alpha or correction cycles) | Data from MC to MDP<br>With command<br>MDATA1[3:0] = LANES[7:4]<br>Next cycle<br>MDATA1[3:0] = LANES[3:0]<br>Where:<br>1 = write<br>0 = no write |
| 100 | Registers<br><br>MDATA1 decodes:<br><br>0-5 require no shifting<br><br>6-A require Shift-in before command<br><br>C-E require Shift-out after command | Data from MC to MDP<br>MDATA1[3:0] = 0 = Read Software config reg<br>MDATA1[3:0] = 1 = Read Error status reg<br>MDATA1[3:0] = 2 = Read YDE SIMM reg<br>MDATA1[3:0] = 3 = Read RDE SIMM reg<br>MDATA1[3:0] = 4 = Load Software config reg<br>MDATA1[3:0] = 5 = Load Reserved reg [a]<br>MDATA1[3:0] = 6 = Load Data Parity Ctl<br>MDATA1[3:0] = 7 = Load Mode 0 Ctl<br>MDATA1[3:0] = 8 = Load Mode 1 Ctl<br>MDATA1[3:0] = 9 = Read MC reg<br>MDATA1[3:0] = A = Not used, see MGO0#<br>MDATA1[3:0] = B = Reserved<br>MDATA1[3:0] = C = Load MC reg<br>MDATA1[3:0] = D = Read MDP Config reg<br>MDATA1[3:0] = E = Not used, see MGO0#<br>MDATA1[3:0] = F = Reserved |
| 101 | Shift-in | Data from MC to MDP or GLUE |
| 110 | Shift-out | Data from MDP or GLUE to MC |
| 111 | XAMP Bus Initialize | Not used |

a. Used to increment MDP write fifo output pointer for a write to a Reserved Visible Register.

1.3.4 DRAM Array Interface Pins

Table 1-7 DRAM Array Interface Pins

| Signal Name | Type | Description |
|---|---|---|
| ADDR0[11:00] | O | Address bus 0. This 12-bit Address bus is used to send both the Row & Column addresses to the DRAM array. |
| ADDR1[11:00] | O | Address bus 1. This 12-bit Address bus is used to send both the Row & Column addresses to the DRAM array. |
| RAS0#[7:0] | O | Row Address Strobe 0. These 8 lines drive the RAS inputs of the DRAM array. |
| RAS1#[7:0] | O | Row Address Strobe 1. These 8 lines drive the RAS inputs of the DRAM array. |
| CAS0#[7:0] | O | Column Address Strobe 0. These 8 lines drive the CAS inputs of the DRAM array. |
| CAS1#[7:0] | O | Column Address Strobe 1. These 8 lines drive the CAS inputs of the DRAM array. |
| WE0#[3:0] | O | Write Enable 0. These 4 lines drive the WE inputs of the DRAM array. |
| WE1#[3:0] | O | Write Enable 1. These 4 lines drive the WE inputs of the DRAM array. |
| 64 | | TOTAL PINS |

1.3.5 SCAN Interface Pins

Table 1-8 SCAN Interface Pins

| Signal Name | Type | Description |
|---|---|---|
| TCK | I | Test Clock into the MC. |
| TMS | I | Serial Test Mode Select |
| TDI | I | Serial Test Data Input |
| TDO | O | Serial Test Data Output |
| TRST | I | Test Reset |
| RO | O | Ring Oscillator |
| 6 | | TOTAL PINS |

1.3.6 Pin Assignments

Table 1-9 Pin Summary

| | | |
|---|---|---|
| 69 | | XA-MP Bus Interface Pins |
| 15 | | MDP/MC Bus 0 Interface Pins |
| 15 | | MDP/MC Bus 1 Interface Pins |
| 64 | | DRAM Array Interface Pins |
| 6 | | SCAN Interface Pins |
| 169 | 169 | TOTAL MC SIGNAL PINS |
| | 71 | Power and Grounds (42.0% of signals) |
| | 240 | GRAND TOTAL - MC PINS |

1.4 OPERATION

The following sections listed below describe the operation of the MDP:

1. XA-MP Bus Interface
2. MDP/MC Interface
3. DRAM Array Interface
4. SCAN Interface

1.4.1 XA-MP Bus Interface

1.4.1.1 Response Actions

Table 1-10 Response Actions (BUSL = 0)

| | XA-MP Bus | | | | | | | MY | | |
|---|---|---|---|---|---|---|---|---|---|---|
| Command (1) | ACK | NAK | MCI | CDM | CDS | CAE | DPE | ACK | NAK | Memory action |
| X | X | X | X | X | X | X | X | 0 | 0 | No action<br>Not our address.<br>Not our command.<br>Not valid memory mapped register (2). |
| RCL, RIL, RBW, RBWL | 1 | 0 | 0 | 0 | X | 0 | 0 | 1 | 0 | Do cycle |
| WCL, WBW, WBWL | 1 | 0 | 0 | 0 | 0 | 0 | 0 | 1 | 0 | Do cycle |
| PICL, BICL | 1 | 0 | 0 | 0 | X | 0 | 0 | 1 | 0 | No action |
| SC | X | 1 | X | X | X | X | X | 1 | 0 | Abort cycle |
| SC | X | X | 1 | X | X | X | X | 1 | 0 | Abort cycle |
| SC | X | X | X | 1 | X | X | X | 1 | 0 | Abort cycle |
| WCL, WBW, WBWL | X | X | X | X | 1 | X | X | 1 | 0 | Abort cycle |
| SC | X | X | X | X | X | 1 | X | 1 | 0 | Abort cycle |
| WCL, WBW, WBWL | X | X | X | X | X | X | 1 | 1 | 0 | Abort cycle (Write cycles only) |
| All SC except PICL & BICL | X | X | X | X | X | X | X | 0 | 1 | No action<br>Address/command FIFO full.<br>Write FIFO full.<br>Ordered response status queue full.<br>Between end of XAMP INIT and end of Read-External if Register access. |

If BUSL is active, BUSL = 1, the memory will not respond to the following cycles: RCL, RIL, RBW, PICL and BICL.

Notes:

1. Supported commands (SC) are: RCL, RIL, RBW, RBWL, WCL, WBW, WBWL, PICL and BICL.
2. See section 1.5.1 for definition of invalid memory mapped registers.

Specification 60600215 IM-2 R0.1 EPS-1 *DRAFT* Revision A
Figure 1-2 MC BLOCK DIAGRAM
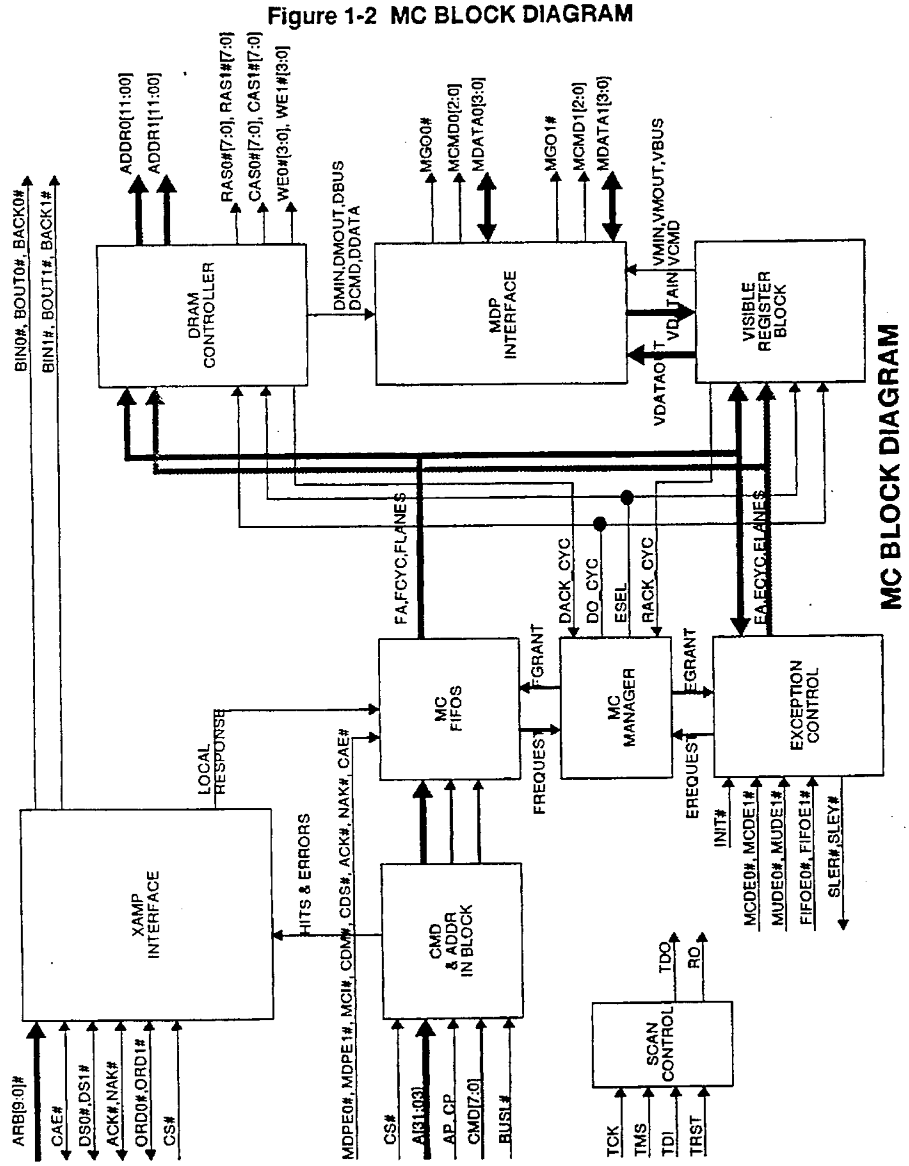

1.4.2 MC/MDP Interfaces

The MC provides two MC/MDP interfaces, one for each data bus.

The MC/MDP interface is used to:

1. Pass initialization/test information between MC and MDP.
2. Pass board information to the MC (MDP does not participate).
3. Pass MC information to the board (MDP does not participate).
4. Control data to/from the MDP and XA-MP bus.
5. Control data to/from the MDP and DRAM array.
6. Pass MC memory mapped register contents to/from the MDP.
7. Pass error signals from the MDP to the MC.

This interface consists of 15 signals composed of:

1. 7 control signals (MC to MDP).
2. 4 bi-directional data signals.
3. 4 error signals (MDP to MC).

1.4.2.1 Control Registers

Five control registers are used for passing information between the MDP and MC chips. These registers are: the MDP Configuration, the Mode 0 thru 2 Control and the Data Parity Control.

1.4.2.1.1 MDP Configuration Registers

These 4-bit registers, one per data bus, are used to pass configuration information from the MDP to the MC.

Table 1-11 MDP Configuration Register 0 & 1

| Data Bus 0 | | | | Data Bus 1 | | | |
|---|---|---|---|---|---|---|---|
| 03 | 02 | 01 | 00 | 03 | 02 | 01 | 00 |
| WFS01 | WFS00 | RFS01 | RFS00 | WFS11 | WFS10 | RFS11 | RFS10 |

1.4.2.1.1.1 Write FIFO Size (WFS0/1) Field

This 2-bit field is used to indicate the size of the MDP Write FIFO in cache line increments.

1.4.2.1.1.2Read FIFO Size (RFS0/1) Field

This 2-bit field is used to indicate the size of the MDP Read FIFO in cache line increments.

Table 1-12 MDP Configuration Register 0/1 Bit Definitions

| Bit Field | Bit Setting | Operating Mode |
| --- | --- | --- |
| RFS0[1:0] or RFS1[1:0] | 0h | 1 Cache Line |
| | 1h | 2 Cache Lines |
| | 2h | 4 Cache Lines |
| | 3h | 8 Cache Lines |
| WFS0[1:0] or WFS1[1:0] | 0h | 1 Cache Line |
| | 1h | 2 Cache Lines |
| | 2h | 4 Cache Lines |
| | 3h | 8 Cache Lines |

1.4.2.1.2 Mode 0 Control Registers

These 8-bit registers, one per data bus, are used to pass Mode control information from the MC to the MDP. It is delivered to the MDP in two consecutive clock cycles. Bit 03 of the first cycle is dynamic and is cleared to zero once the specified operation is initiated. Bits 03 thru 00 of the second cycle are static and must be reloaded to affect the MDP.

Table 1-13 Mode 0 Control Register

| | Data Bus 0 | | | | Data Bus 1 | | | |
| --- | --- | --- | --- | --- | --- | --- | --- | --- |
| | 03 | 02 | 01 | 00 | 03 | 02 | 01 | 00 |
| First cycle | INIT0 | RSV | | | INIT1 | RSV | | |
| Second cycle | SEN0 | FDP01 | FDP00 | BIST0 | SEN1 | FDP11 | FDP10 | BIST1 |

1.4.2.1.2.1 Initialize (INIT0/1)

This bit is used to provide a local initialize, independent of the XAMP Bus initialize, to the MDP and the memory module glue logic. It is sourced by the INIT bit from the MC Clears Register.

1.4.2.1.2.2Slice Enable (SEN0/1)

This bit is used to indicate if the memory module is enabled or disabled.

1.4.2.1.2.3 Force Data Pattern (FDP0/1) Field

This 3-bit field is used to force various data patterns in the MDP for DRAM write cycles while in BIST mode.

1.4.2.1.2.4 Built In Self Test (BIST0/1)

This bit is used to put the MDP into BIST mode.

Table 1-14 Mode 0 Control Register Bit Definitions

| Bit Field | Bit Setting | Operating Mode |
|---|---|---|
| BIST0 or BIST1 | 0 | Normal mode - Initialize state in MDP |
| | 1 | BIST mode |
| FDP0[1:0] or FDP1[1:0] | 0h | Write Back Register data, BIST = X - Initialize state in MDP |
| | 1h | Force all bytes to a 5Ah pattern if BIST = 1 |
| | 2h | Force all bytes to a A5h pattern if BIST = 1 |
| | 3h | Force all bytes to a 00h pattern if BIST = 1 |
| INIT0 or INIT1 | 0 | No Initialize |
| | 1 | Initialize Slice |
| SEN0 or SEN1 | 0 | Slice Disabled - Initialize state in MDP |
| | 1 | Slice Enabled |

1.4.2.1.3 Mode 1 Control Register

These 4-bit registers, one per data bus, are used to pass Mode control information from the MC to the MDP. These bits are dynamic and are cleared to zero by the MDP once the specified operation is initiated.

Table 1-15 Mode 1 Control Registers

| Data Bus 0 | | | | Data Bus 1 | | | |
|---|---|---|---|---|---|---|---|
| 03 | 02 | 01 | 00 | 03 | 02 | 01 | 00 |
| RSV | CLRY0 | CLRR0 | CLRU0 | RSV | CLRY1 | CLRR1 | CLRU1 |

1.4.2.1.3.1 Clear Yellow (CLRY0/1)

This bit is used to clear register bits associated with the reporting of SLEY errors.

1.4.2.1.3.2 Clear Red (CLRR0/1) register bits

This bit is used to clear register bits associated with the reporting of SLER errors.

1.4.2.1.3.3 Clear UDE (CLRU0/1) register bits

This bit is used to clear register bits associated with the reporting of UDE errors.

Table 1-16 Mode 1 Control Register Bit Definitions

| Bit Field | Bit Setting | Operating Mode |
|---|---|---|
| CLRR0 or CLRR1 | 0 | No clear |
| | 1 | Clear the following:<br>Error Status Register [15:12]<br>RDE SIMM Register |
| CLRU0 or CLRU1 | 0 | No clear |
| | 1 | Clear the following:<br>RDE SIMM Register |

Table 1-16 Mode 1 Control Register Bit Definitions

| Bit Field | Bit Setting | Operating Mode |
|---|---|---|
| CLRY0 or CLRY1 | 0 | No clear |
| | 1 | Clear the following:<br>Error Status Register [11:00]<br>YDE SIMM Register |

1.4.2.1.4 Data Parity Control Register

These 8-bit registers, one per data bus, are used to pass data parity and UDE control information from the MC to the MDP. They are delivered to the MDP in two consecutive clock cycles.

Table 1-17 Data Parity Control Registers

| Data Bus 0 | | | | Data Bus 1 | | | | |
|---|---|---|---|---|---|---|---|---|
| 03 | 02 | 01 | 00 | 03 | 02 | 01 | 00 | |
| FUDE0 | Reserved | | | FUDE1 | Reserved | | | First cycle |
| FODP0 | B0[2:0] | | | FODP1 | B1[2:0] | | | Second cycle |

1.4.2.1.4.1 Force UDE (FUDE0/1)

This bit, when set, will cause the MDP to send a UDE with its next XAMP bus ordered response. This bit is dynamic and is cleared by the MDP once the operation is initiated.

1.4.2.1.4.2 Force ODD Data Parity (FODP0/1)

This bit, when set, will cause the MDP to force odd parity on the byte specified by the B field when sending its next XAMP bus ordered response. This bit is dynamic and is cleared by the MDP once the operation is initiated.

1.4.2.1.4.3 Byte (B0/1) Field

This 3-bit field indicates which data byte should generate ODD parity. This field is valid only when FODP is set, else it is a don't care.

Table 1-18 Data Parity Control Register Bit Definitions

| Bit Field | Bit Setting | Operating Mode |
|---|---|---|
| B0[2:0] | 000 - 111 | Byte 0 (DP0[0]) thru byte 7 (DP0[7]). |
| B1[2:0] | 000 - 111 | Byte 0 (DP1[0]) thru byte 7 (DP1[7]). |
| FODP0 | 0 | Generate EVEN parity on all bytes of bus 0 - Initialize state. |
| | 1 | Force ODD parity on byte specified by B0 field for next ordered response. |
| FODP1 | 0 | Generate EVEN parity on all bytes of bus 1 - Initialize state. |
| | 1 | Force ODD parity on byte specified by B1 field for next ordered response. |
| FUDE0 | 0 | No effect on UDE0 - Initialize state. |
| | 1 | Force UDE0 'on' for next ordered response. |
| FUDE1 | 0 | No effect on UDE1 - Initialize state. |
| | 1 | Force UDE1 'on' for next ordered response. |

1.4.2.2 MGO# Timing

This section describes all the MGO# timing cycles which includes the following areas:

1. DRAM Reads
2. DRAM Writes
3. Non-Shift Register Register Cycles
4. Shift-In Register Cycles
5. Shift-Out Register Cycles
6. XAMP Bus Initialize

1.4.2.2.1 DRAM Reads

This section describes DRAM read cycles controlled by MGO# from the MC. DRAM Read cycles are shown in Figure 1-3 and Figure 1-4. The first figure shows Read DRAM Single Word cycles occurring back to back. The next figure shows a quad word DRAM data arrival, in support of a RCL or RIL response cycle. No FLY-BY vs FLY-BY cycles for RBW and RCL are shown in Figure 1-5 thru Figure 1-8.

Figure 1-3 Read DRAM Single Word (RBW) Back to Back

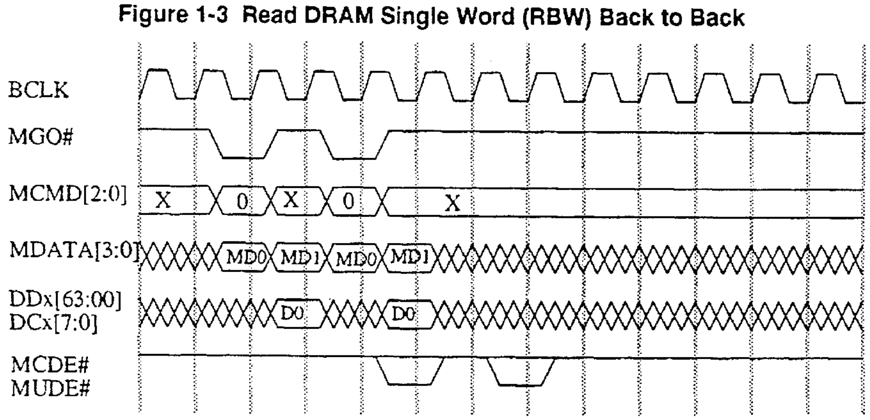

Figure 1-4 Read DRAM Quad Word (RCL)
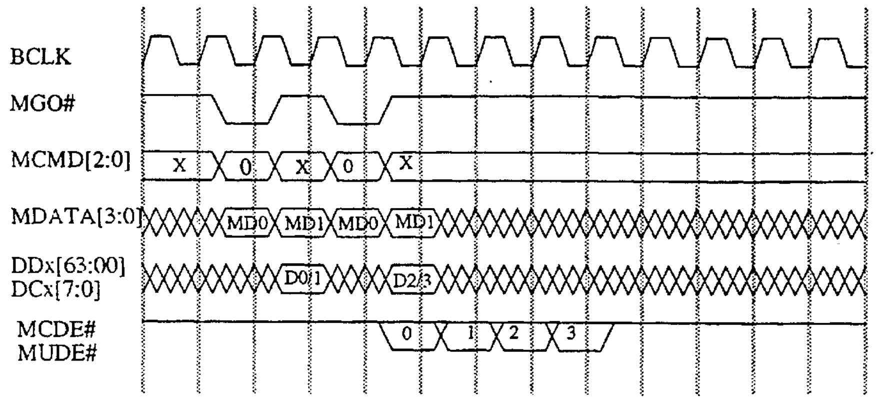

Figure 1-5 Response to RBW (No FLY-BY)
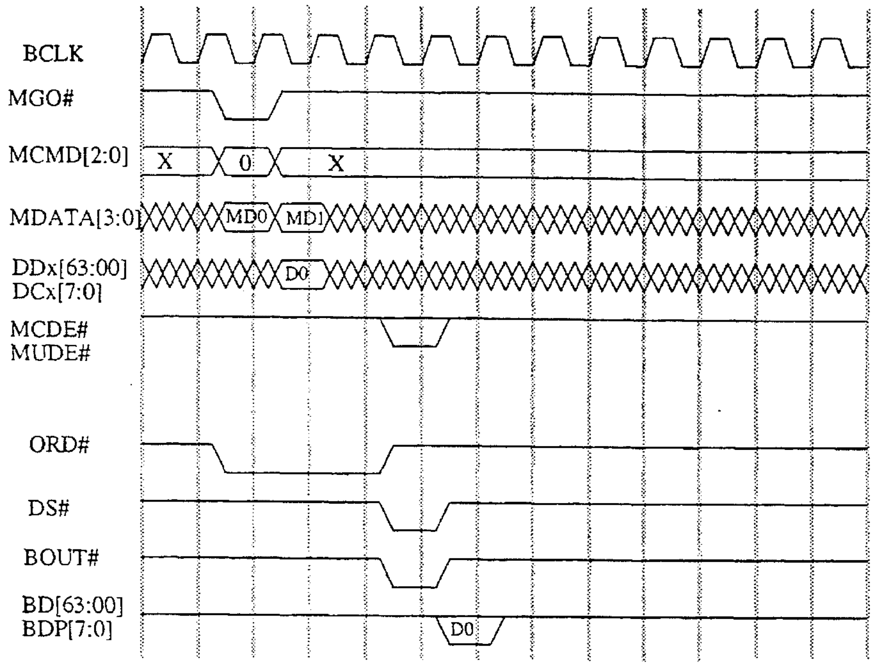

Figure 1-6 Response to RBW (FLY-BY)
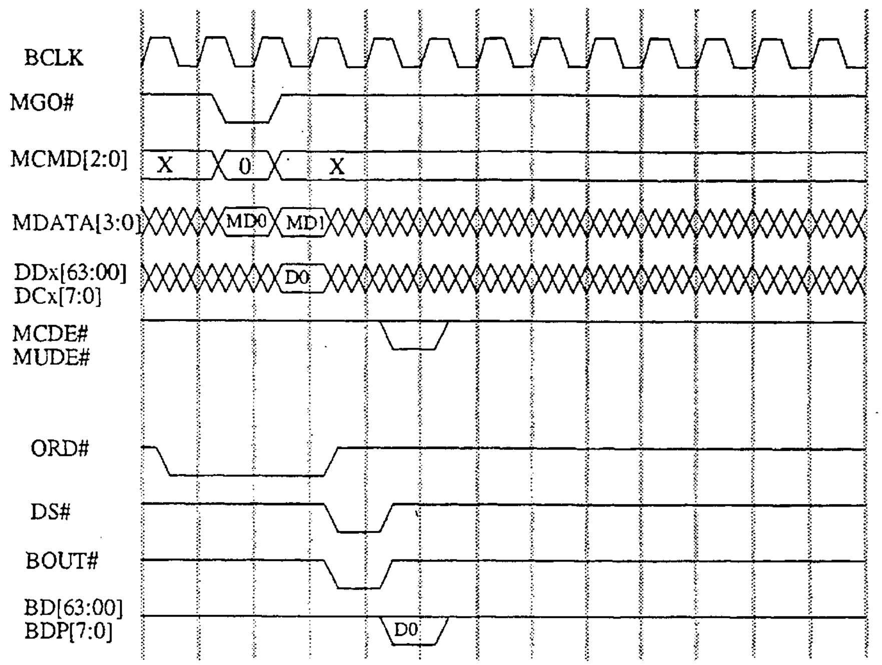

Figure 1-7 Response to RCL (No FLY-BY)
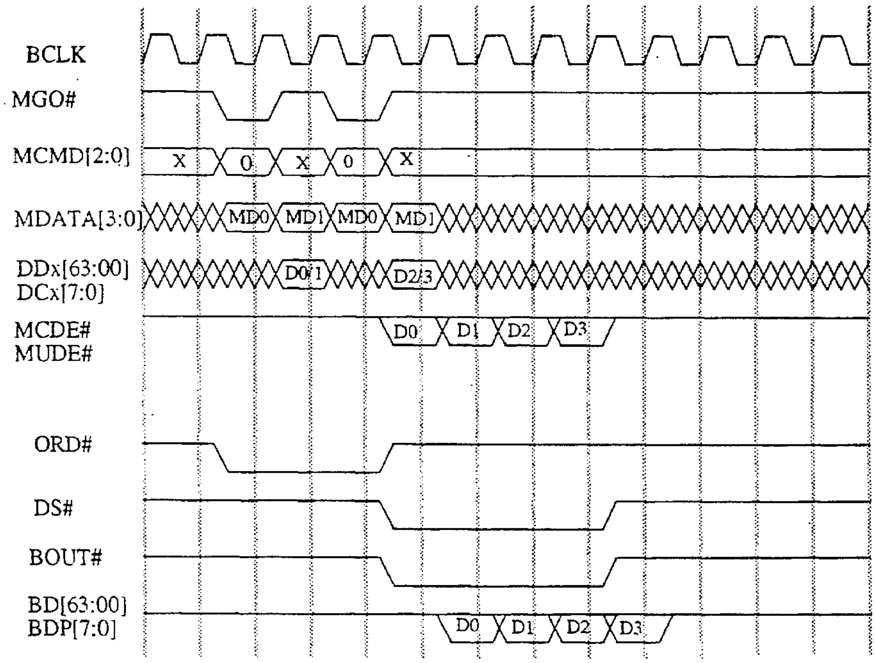

Figure 1-8 Response to RCL (FLY-BY)
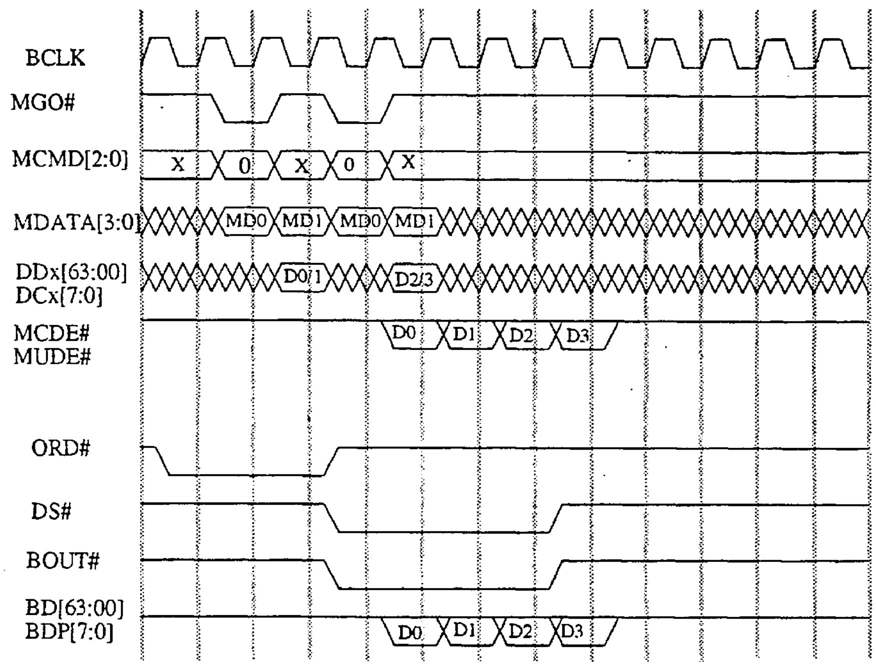

1.4.2.2.2 DRAM Writes

This section describes DRAM write cycles controlled by MGO# from the MC. Write DRAM Left cycles are shown in Figure 1-38 thru Figure 1-11 for various widths of MGO#. Figure 1-13 shows back to back Write DRAM Left cycles using a MGO# width of 2 clocks. Similar figures would also apply to Write DRAM Right cycles. Write DRAM Full Bus Word left cycles are shown in Figure 1-13 thru Figure 1-13 for various widths of MGO#. Figure 1-13 shows a WCL cycle, using the Full Bus Word cycles with a MGO# width of 2 clocks, starting with a left word first. Similar figures would also apply to WCL cycles starting with a right word first.

Figure 1-9 Write DRAM Left [width = 1 clock]

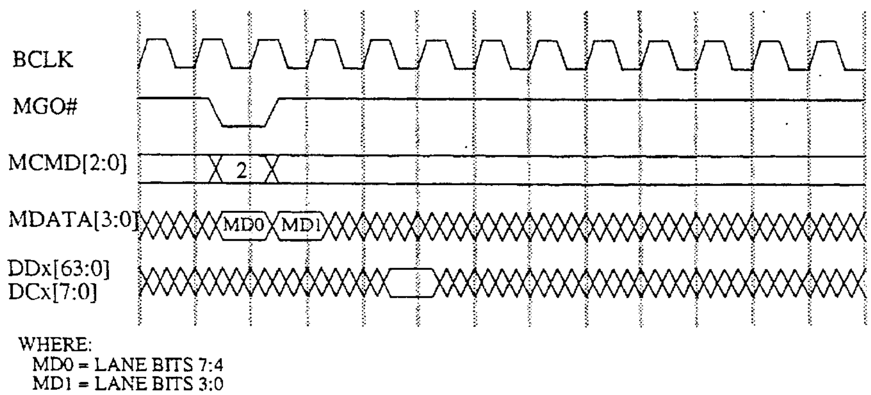

Figure 1-10 Write DRAM Left Extended [width = 2 clocks]

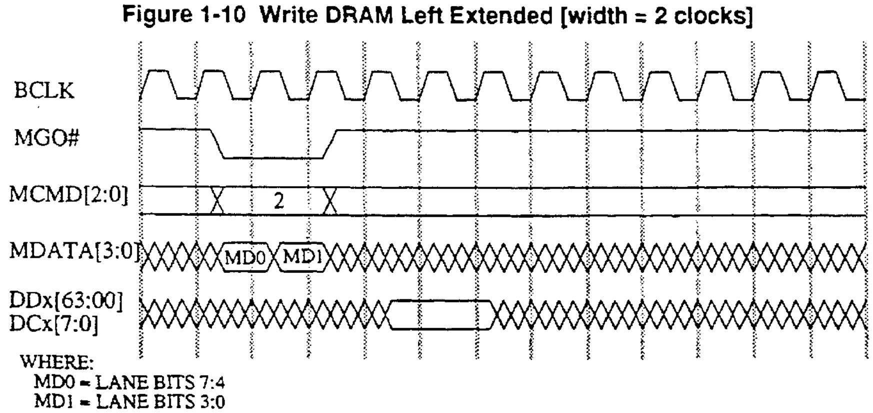

Figure 1-11 Write DRAM Left Extended [width = 3 clocks]
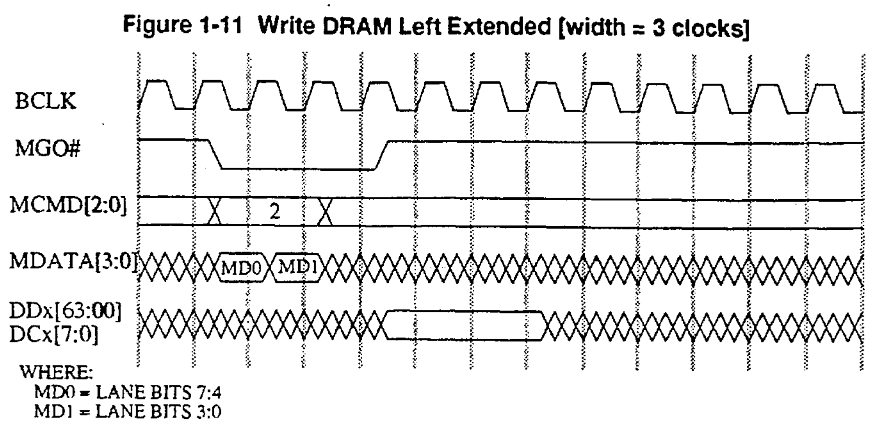
WHERE:
MD0 = LANE BITS 7:4
MD1 = LANE BITS 3:0
Figure 1-12 Write DRAM Left Extended (Back to back) [width = 2 clocks]
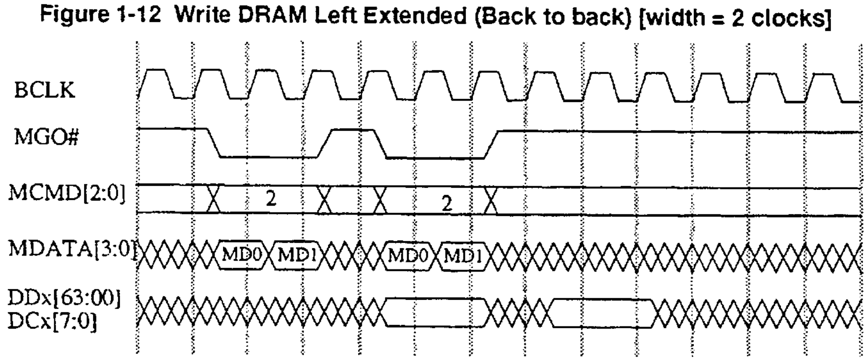
WHERE:
MD0 = LANE BITS 7:4
MD1 = LANE BITS 3:0

Figure 1-13 Write DRAM Full Bus Word (Left) [width = 1 clock]
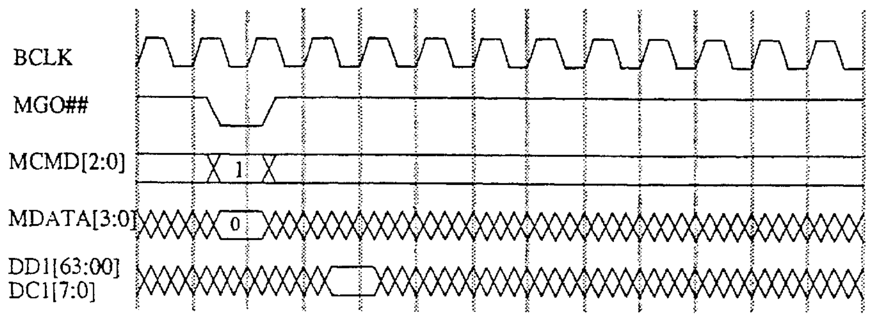
Figure 1-14 Write DRAM Full Bus Word (Left) [width = 2 clocks]
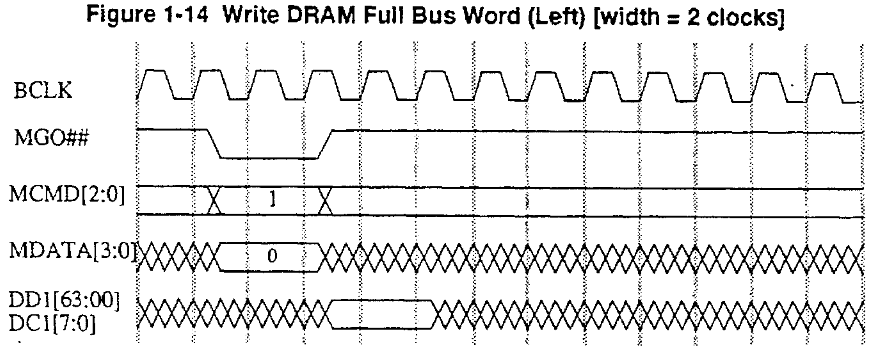
Figure 1-15 Write DRAM Full Bus Word (Left) [width = 3 clocks]
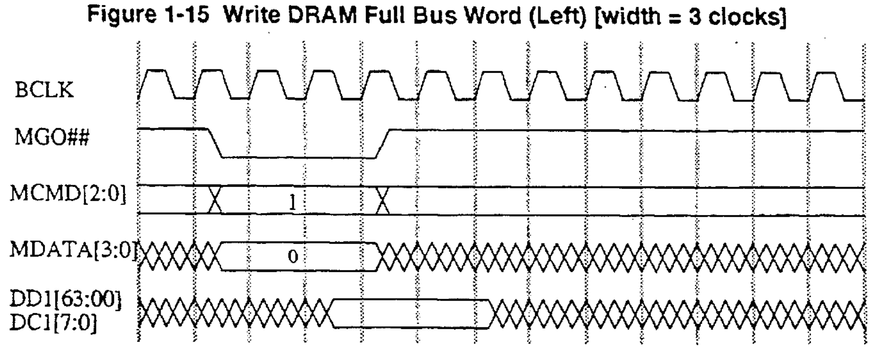

Figure 1-16 Write DRAM WCL (Left first) [width = 2 clocks]
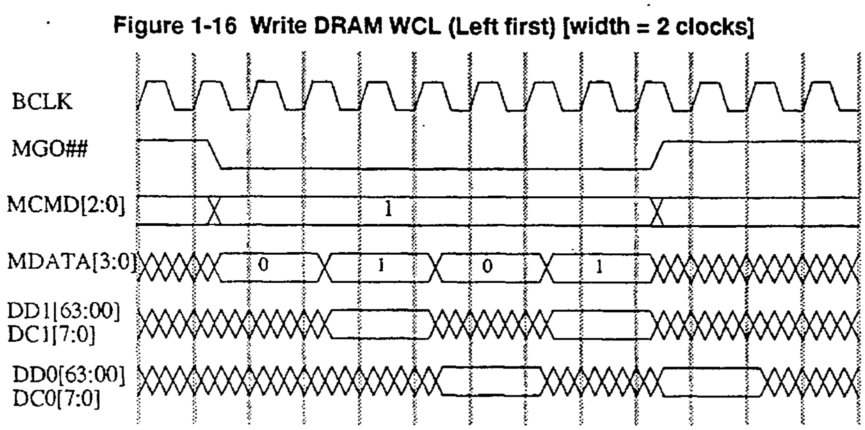

1.4.2.2.3 Non-Shift Register Cycles
This group of register cycles does not involve the transfer of data between the MC/MDP.
Figure 1-17 Read MDP Register
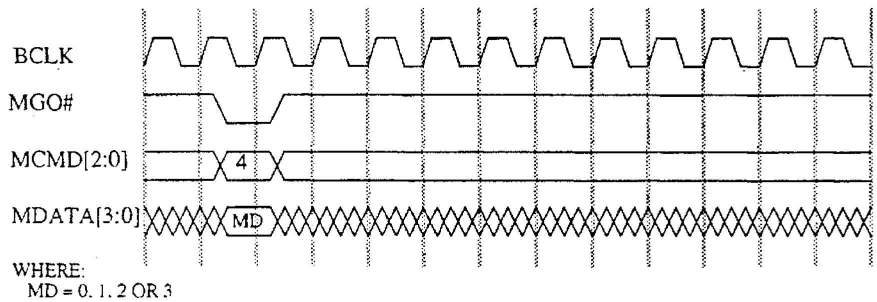
Figure 1-18 Load Software Configuration Register
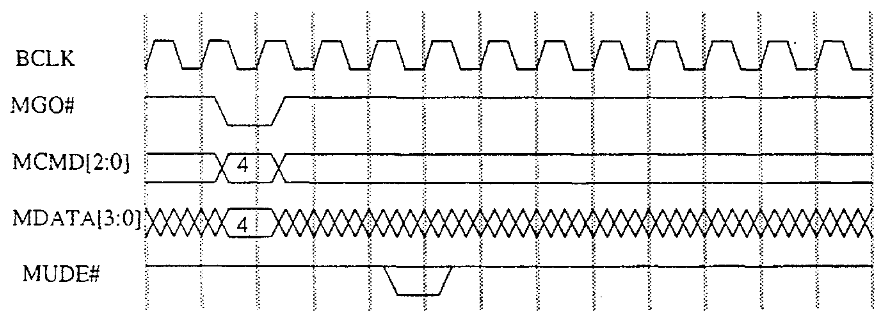
Figure 1-19 Load Reserved Register
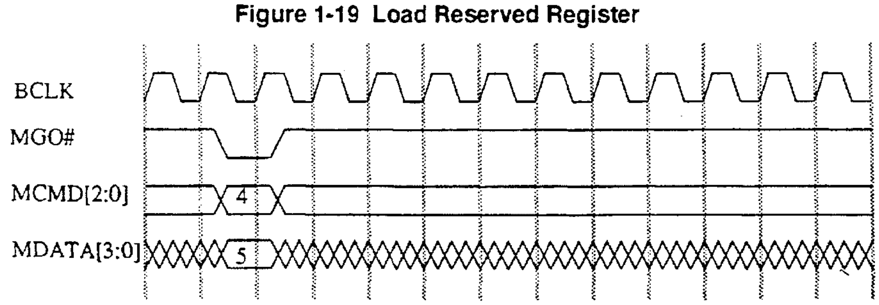

1.4.2.2.4 Shift-In Register Cycles
This group of register cycles requires data to be transfer from the MC to the MDP/GLUE before the register command is issued.
Figure 1-20 Load Data Parity Control/Mode 0 Control Register
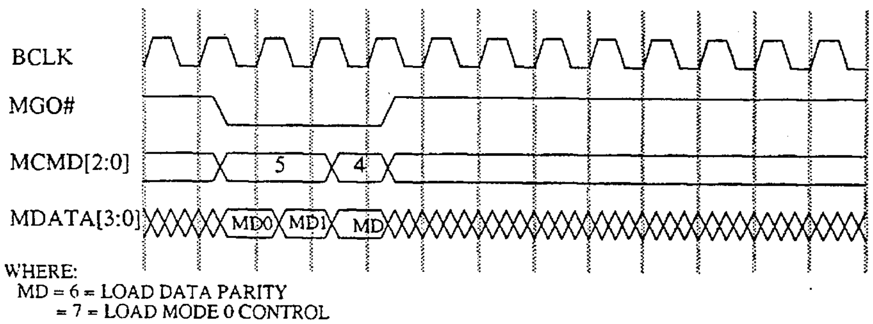
WHERE:
MD = 6 = LOAD DATA PARITY
= 7 = LOAD MODE 0 CONTROL
Figure 1-21 Load Mode 1 Control Register
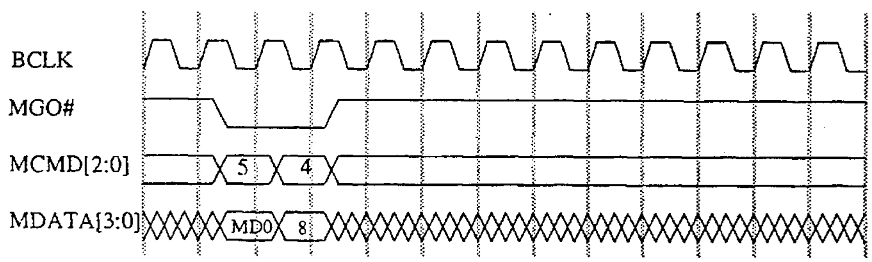
Figure 1-22 Read MC Register
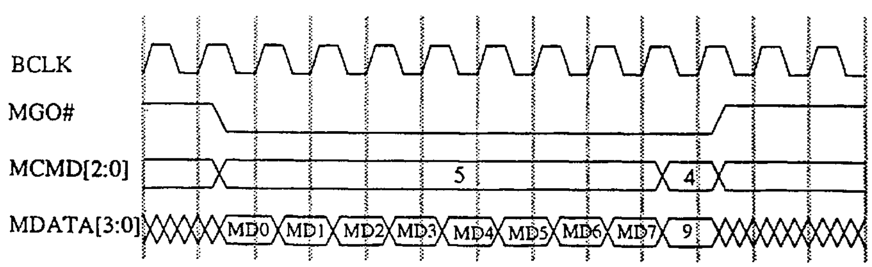

Figure 1-23 Load Phase LEDs (MDP not involved)
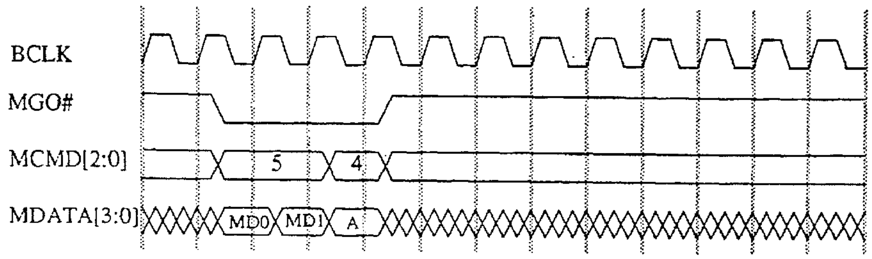
1.4.2.2.5 Shift-Out Register Cycles
This group of register cycles requires data to be transfer from the MDP/GLUE to the MC after the register command is issued.
Figure 1-24 Load MC Register
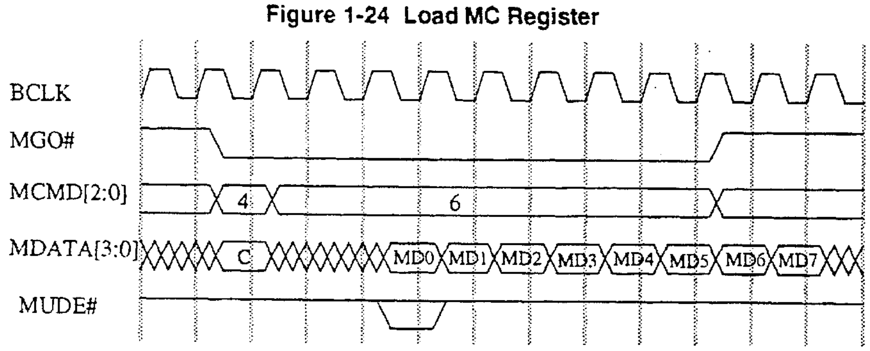

Figure 1-25 Read MDP Configuration Register
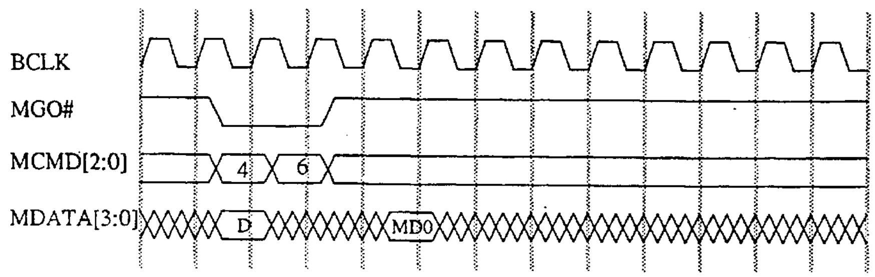
Figure 1-26 Read External (MDP not involved)
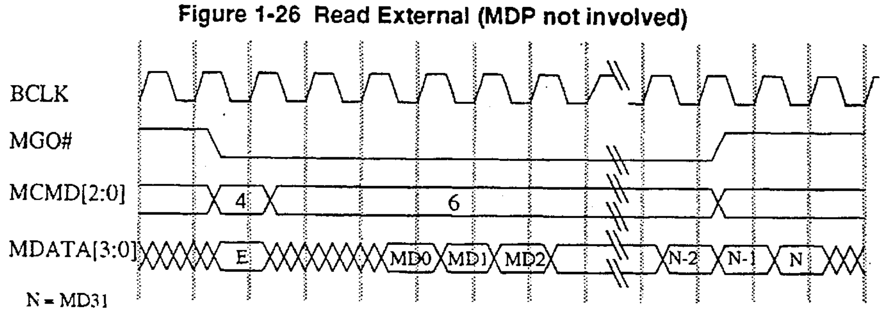
1.4.2.2.6 XAMP Bus Initialize
Figure 1-27 XAMP Bus Initialize
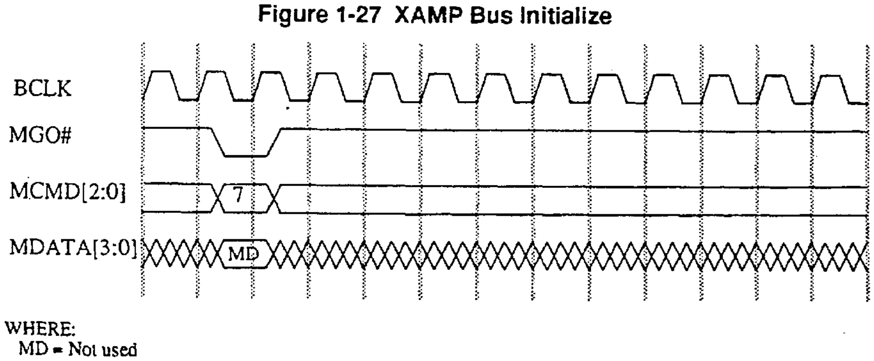

1.4.2.3 MC/GLUE Data Definitions

This section defines the data passed between the MC and board glue logic. This data is transferred as part of the initialization process.

1.4.2.3.1 Load Phase LEDs

Table 1-19 Load Phase LEDs - Data Definition

| MDATA[3:0] | Bits | Source |
|---|---|---|
| MD0 | IND + PH[6:4] | Control/Status Register |
| MD1 | PH[3:0] | Control/Status Register |

1.4.2.3.2 Read External

Table 1-20 Read External - Data Definition

| MDATA[3:0] | Bits | Destination |
|---|---|---|
| MD0 | [15:12] | Slice_ID Register |
| MD1 | [11:08] | Slice_ID Register |
| MD2 | [15:12] | Slice Type Register |
| MD3 | [11:08] | Slice Type Register |
| MD4 | [07:04] | Slice Type Register |
| MD5 | [03:00] | Slice Type Register |
| MD6 | [03:00] | Miscellaneous:<br>[00]: Control/Status Register SBC bit<br>[01]: SLOW bit (0=33MHz, 1=30MHz)<br>[03:02]: Reserved |
| MD7 | [03:00] | Hardware Configuration Register |
| MD8 | [31:28] | SIMM Type Register |
| MD9 | [27:24] | SIMM Type Register |
| MD10 | [23:20] | SIMM Type Register |
| MD11 | [19:16] | SIMM Type Register |

Table 1-20 Read External - Data Definition (Continued)

| MDATA[3:0] | Bits | Destination |
|---|---|---|
| MD12 | [15:12] | SIMM Type Register |
| MD13 | [11:08] | SIMM Type Register |
| MD14 | [07:04] | SIMM Type Register |
| MD15 | [03:00] | SIMM Type Register |
| MD16 | [31:28] | SIMM Speed Profile Register 1 |
| MD17 | [27:24] | SIMM Speed Profile Register 1 |
| MD18 | [23:20] | SIMM Speed Profile Register 1 |
| MD19 | [19:16] | SIMM Speed Profile Register 1 |
| MD20 | [15:12] | SIMM Speed Profile Register 1 |
| MD21 | [11:08] | SIMM Speed Profile Register 1 |
| MD22 | [07:04] | SIMM Speed Profile Register 1 |
| MD23 | [03:00] | SIMM Speed Profile Register 1 |
| MD24 | [31:28] | SIMM Speed Profile Register 0 |
| MD25 | [27:24] | SIMM Speed Profile Register 0 |
| MD26 | [23:20] | SIMM Speed Profile Register 0 |
| MD27 | [19:16] | SIMM Speed Profile Register 0 |
| MD28 | [15:12] | SIMM Speed Profile Register 0 |
| MD29 | [11:08] | SIMM Speed Profile Register 0 |
| MD30 | [07:04] | SIMM Speed Profile Register 0 |
| MD31 | [03:00] | SIMM Speed Profile Register 0 |

1.4.3 DRAM Array Interface

This section shows the proposed timing diagrams for the various cycle sequences listed below:

1. RCL, multi-group, 80ns
2. RCL, single-group, 80ns
3. WCL, multi-group, 80ns
4. WCL, single-group, 80ns
5. RBW/RBW, same partition, 80ns
6. RBW/RBW, different partition, 80ns
7. WBW/WBW, same partition, 80ns
8. WBW/WBW, different partition, 80ns
9. Partial WBW/Correct, 80ns
10. Refresh, 80ns
11. RCL, multi-group, 60ns
12. RCL, single-group, 60ns
13. WCL, multi-group, 60ns
14. WCL, single-group, 60ns
15. RBW/RBW, same partition, 60ns
16. RBW/RBW, different partition, 60ns
17. WBW/WBW, same partition, 60ns
18. WBW/WBW, different partition, 60ns
19. Partial WBW/Correct, 60ns
20. Refresh, 60ns

Figure 1-28 RCL (multi-group, 80ns)
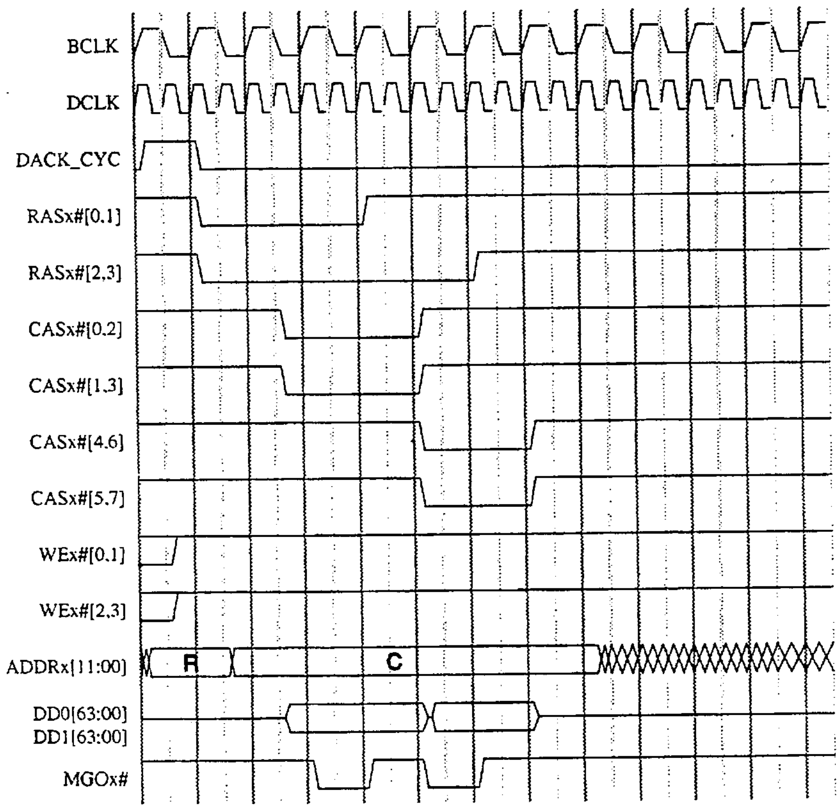

Figure 1-29 RCL (single-group, 80ns)
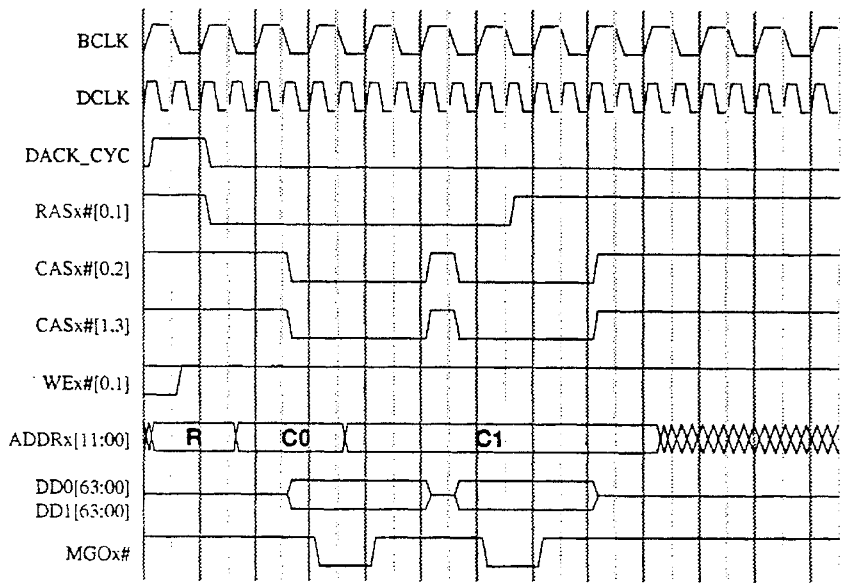

Figure 1-30 WCL (multi-group, 80ns)
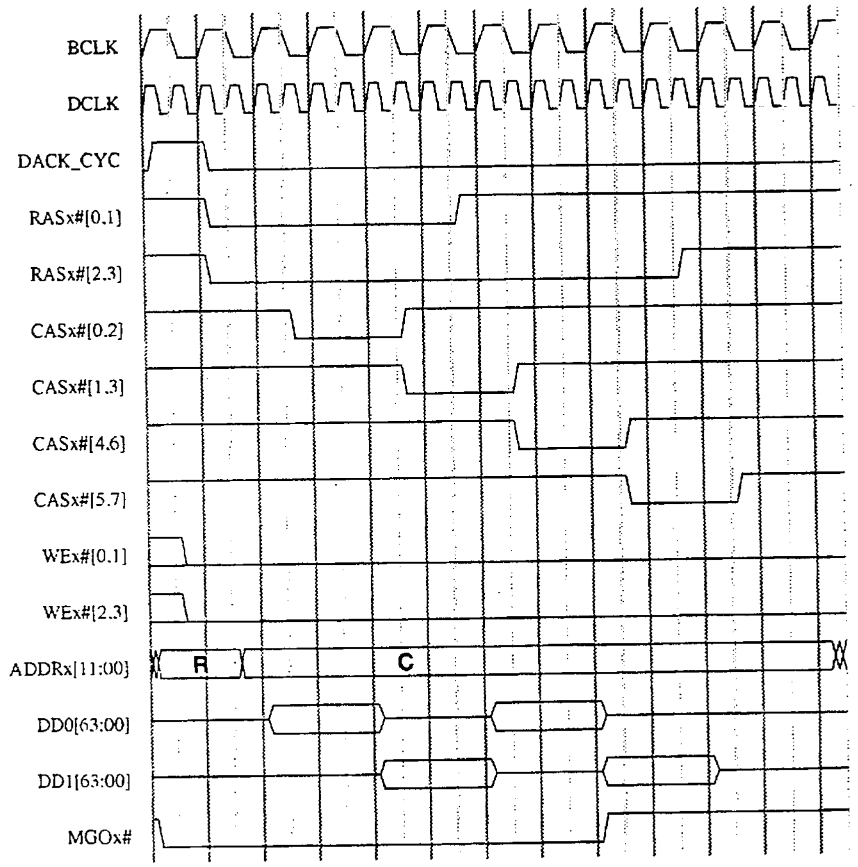

Figure 1-31 WCL (single-group, 80ns)
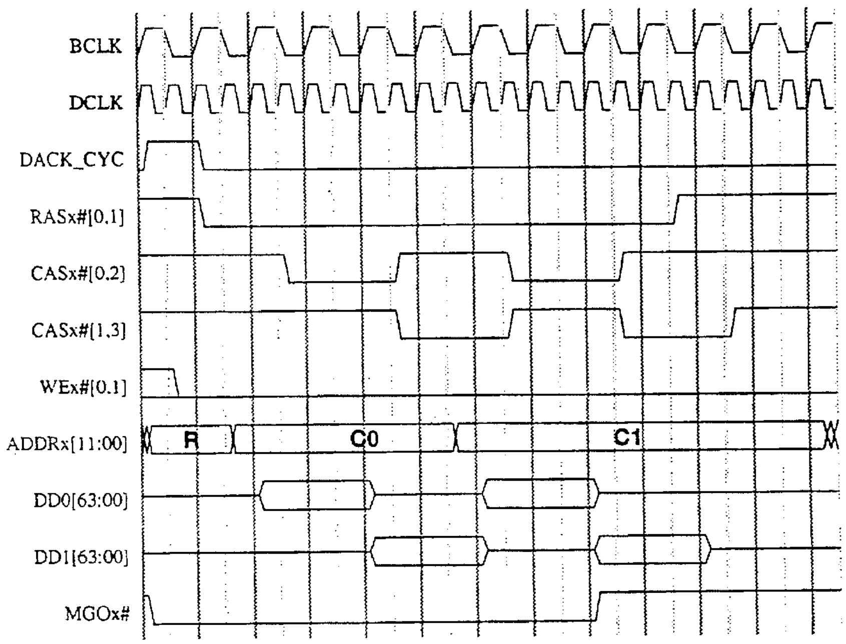

Figure 1-32 RBW/RBW (same partition, 80ns)
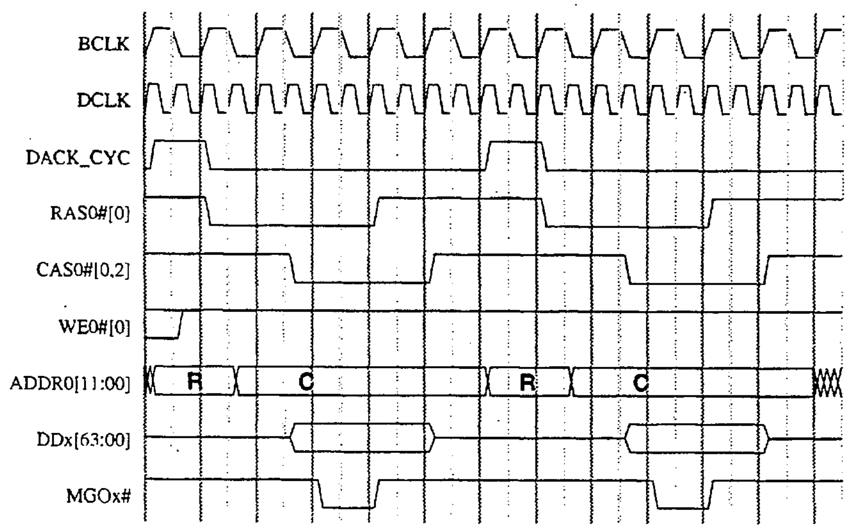

Figure 1-33 RBW/RBW (different partition, 80ns)
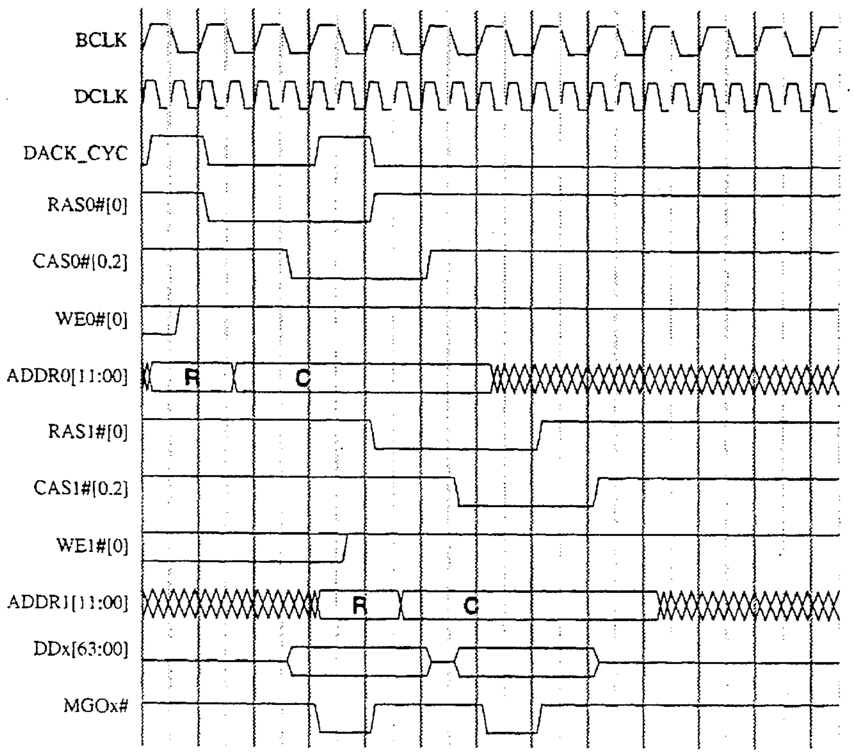

| Specification 60600215 | IM-2 R0.1 EPS-1 | ***DRAFT*** Revision A |
|---|---|---|
Figure 1-34 WBW/WBW (same partition, 80ns)
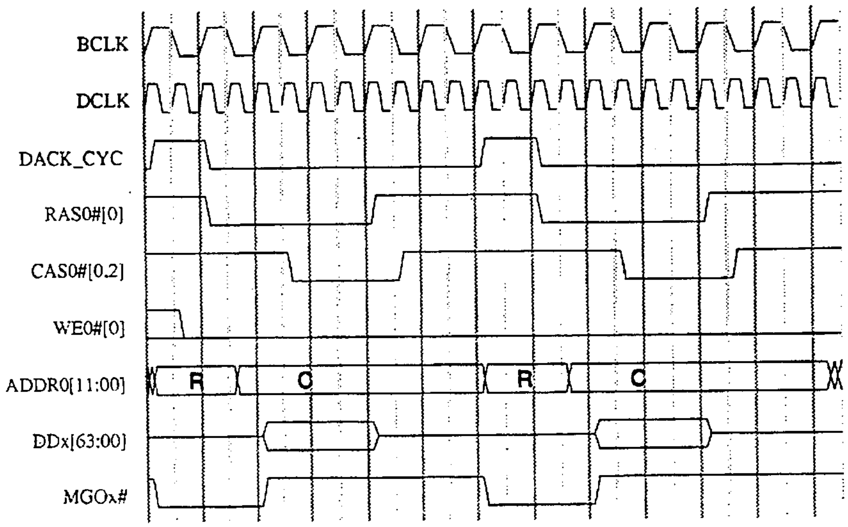

Figure 1-35 WBW/WBW (different partition, 80ns)
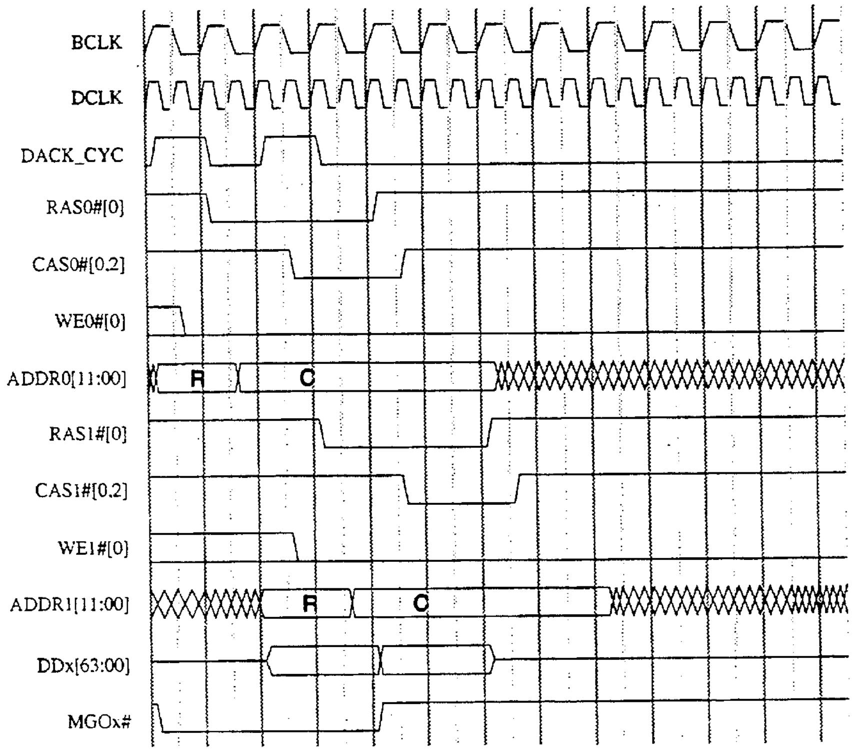

Figure 1-36 Partial WBW/Correct (80ns)
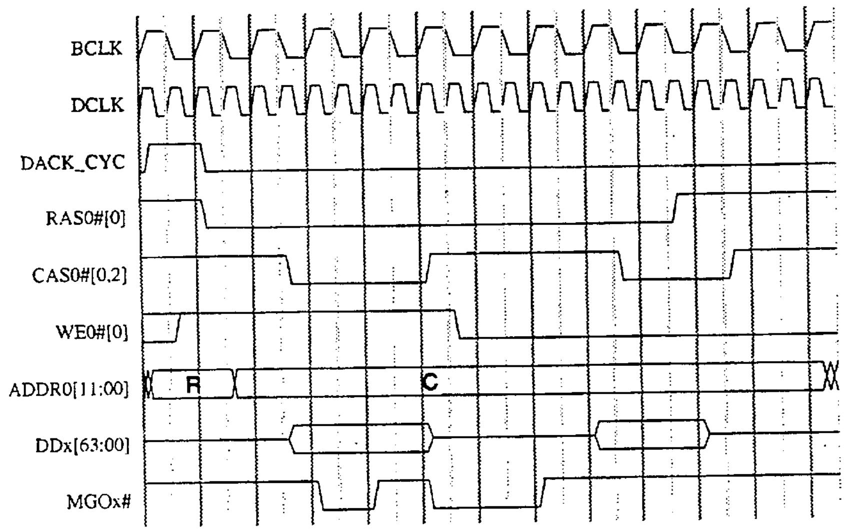

Figure 1-37 Refresh (80ns) (RSF[1:0]=0)
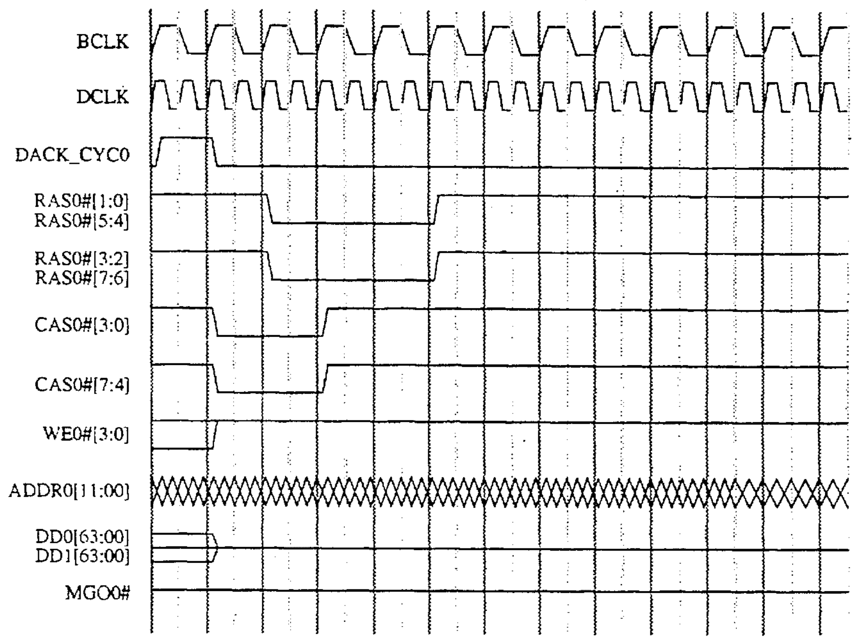

Figure 1-38 Refresh (80ns) (RSF[1:0]=1)
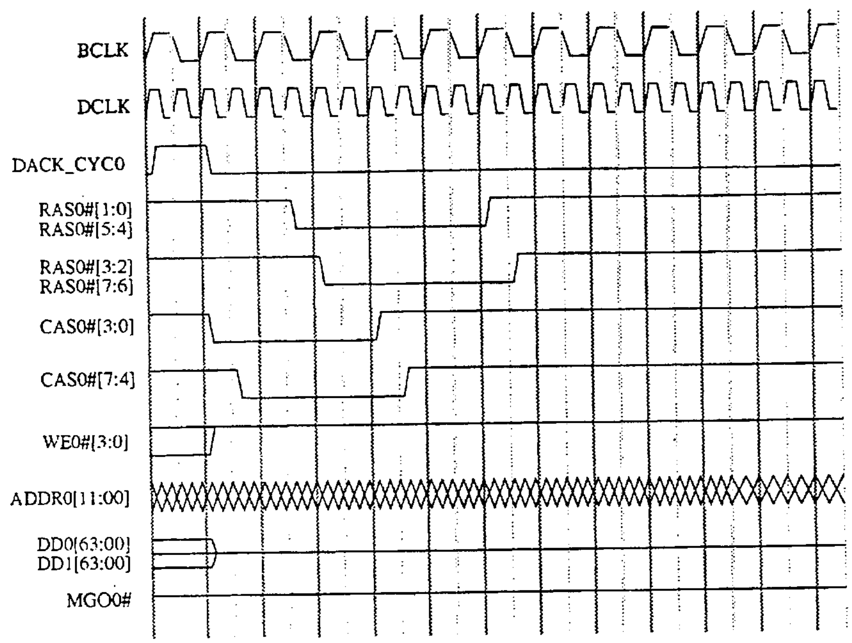

Figure 1-39 Refresh (80ns) (RSF[1:0]=2)
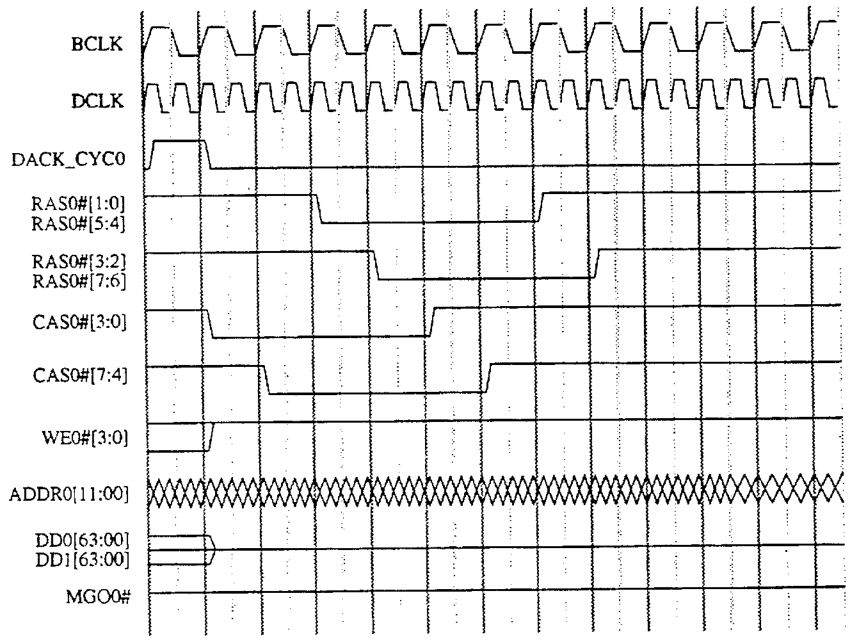

Figure 1-40 Refresh (80ns) (RSF[1:0]=3)
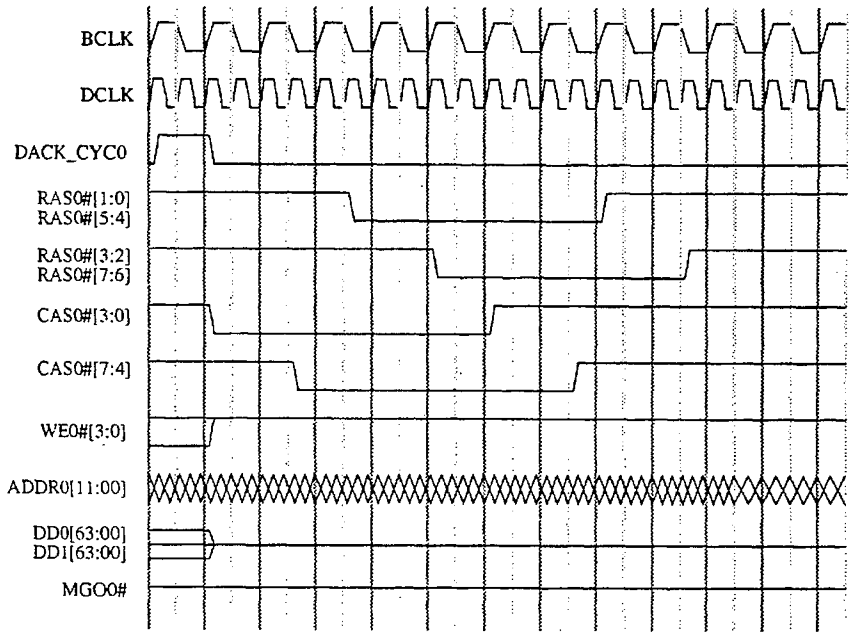

Figure 1-41 RCL (multi-group, 60ns)
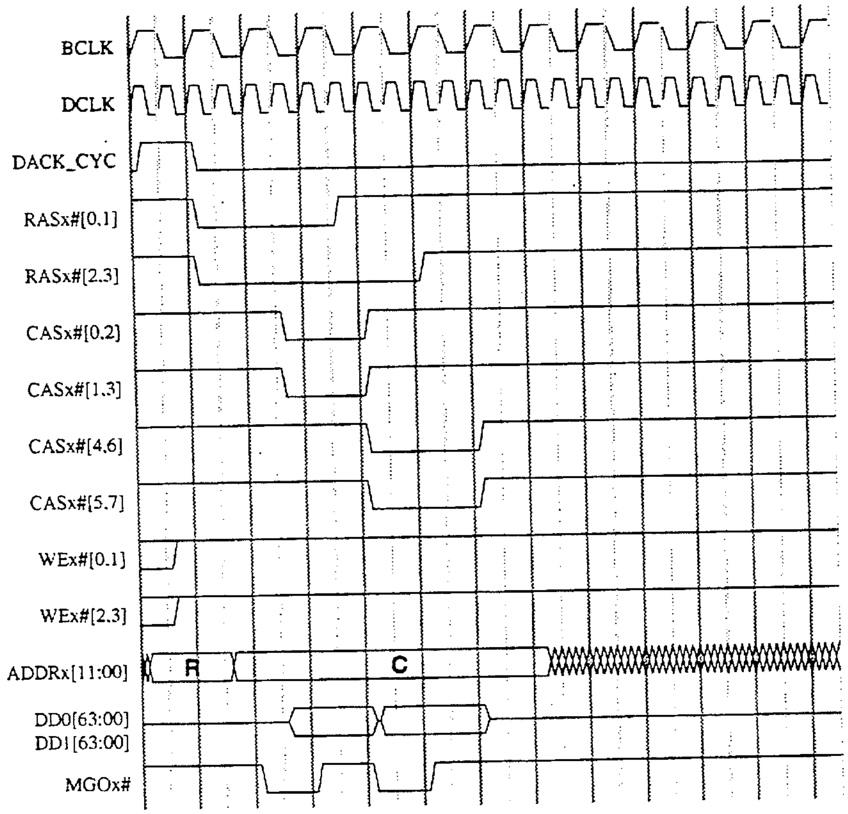

Figure 1-42 RCL (single-group, 60ns)
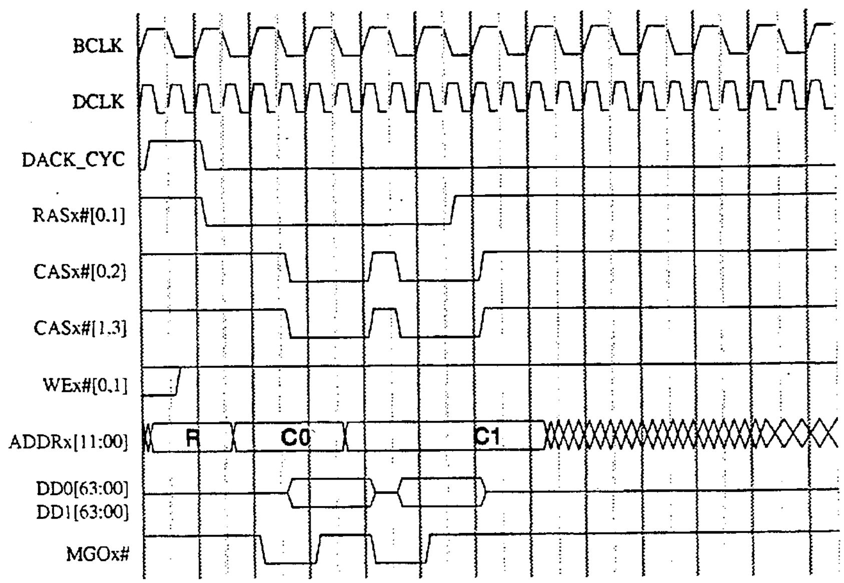

Figure 1-43 WCL (multi-group, 60ns)
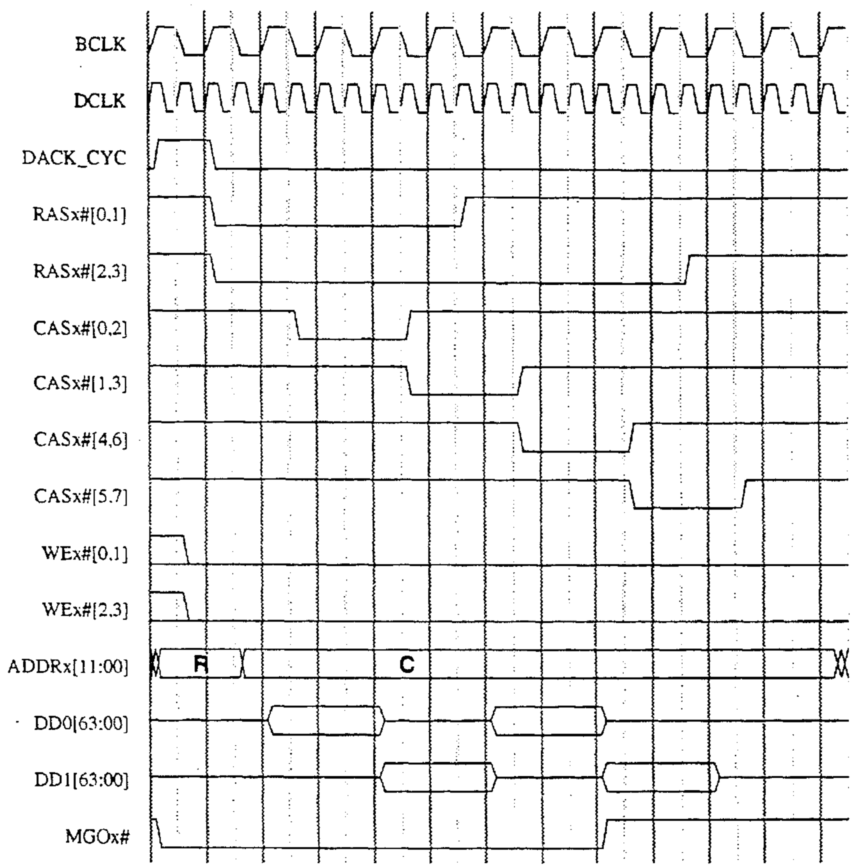

Figure 1-44 WCL (single-group, 60ns)
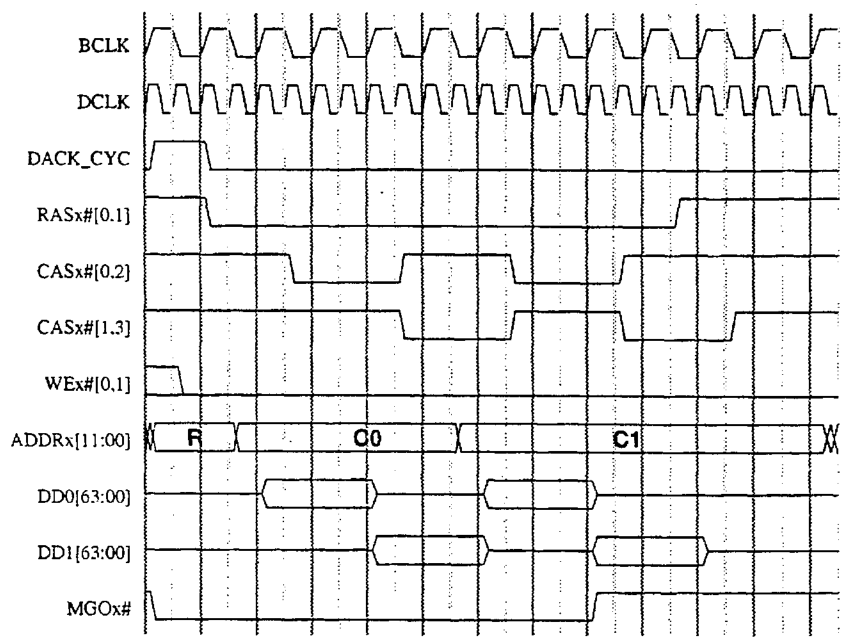

Figure 1-45 RBW/RBW (same partition, 60ns)
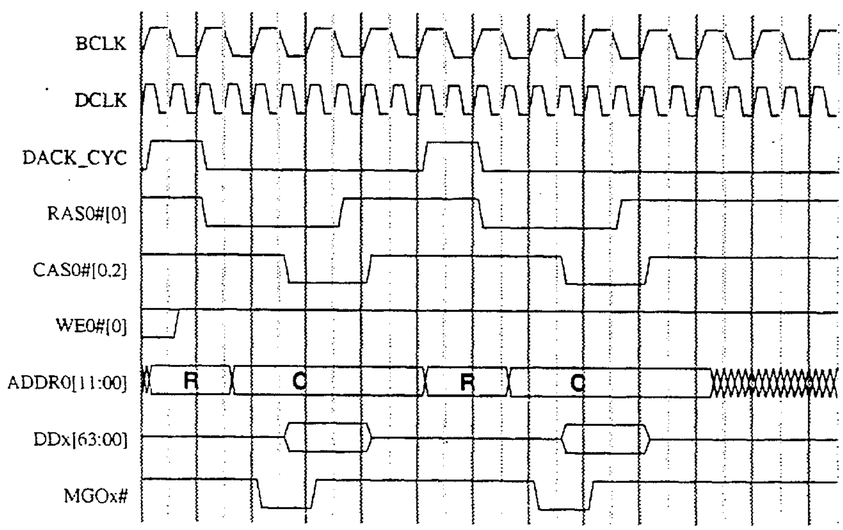

Figure 1-46 RBW/RBW (different partition, 60ns)
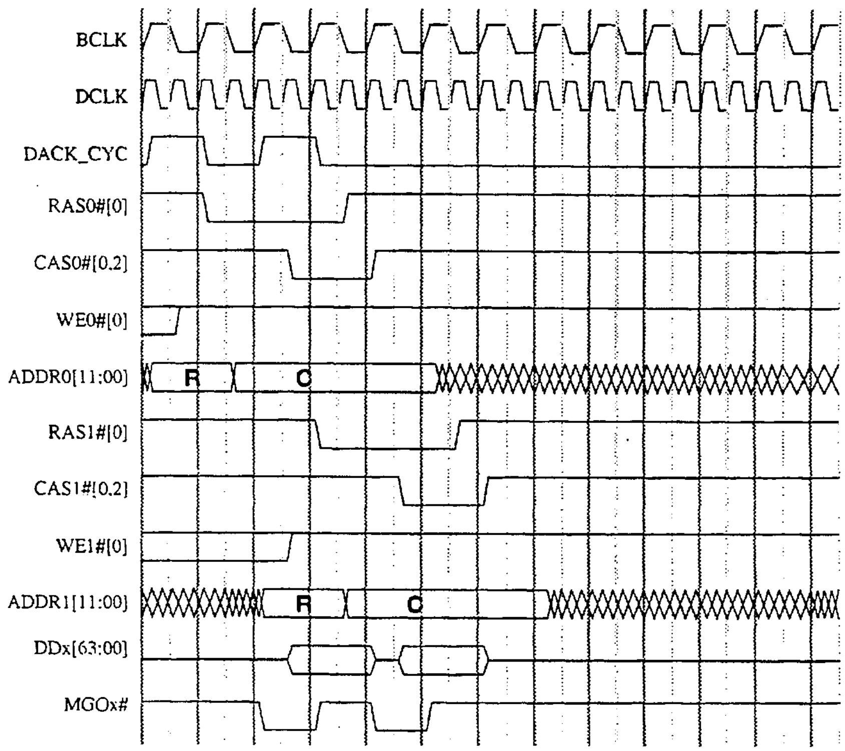

Figure 1-47 WBW/WBW (same partition, 60ns)
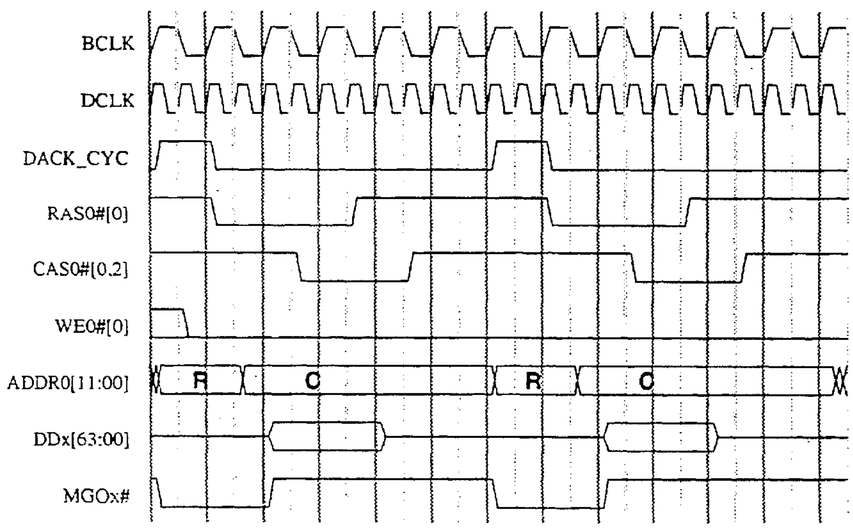

Figure 1-48 WBW/WBW (different partition, 60ns)
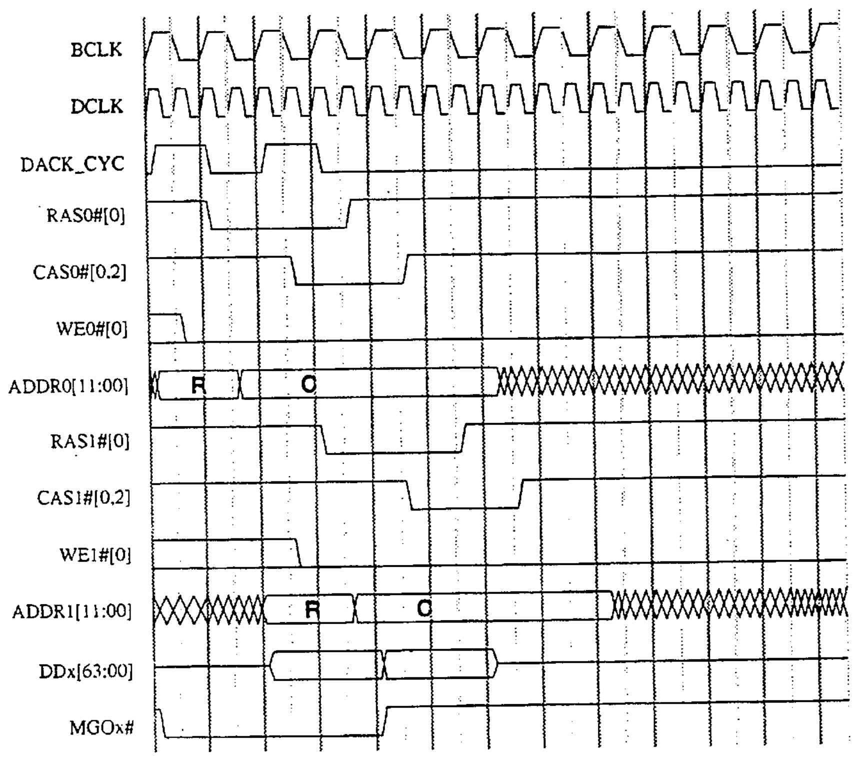

Figure 1-49 Partial WBW/Correct (60ns)
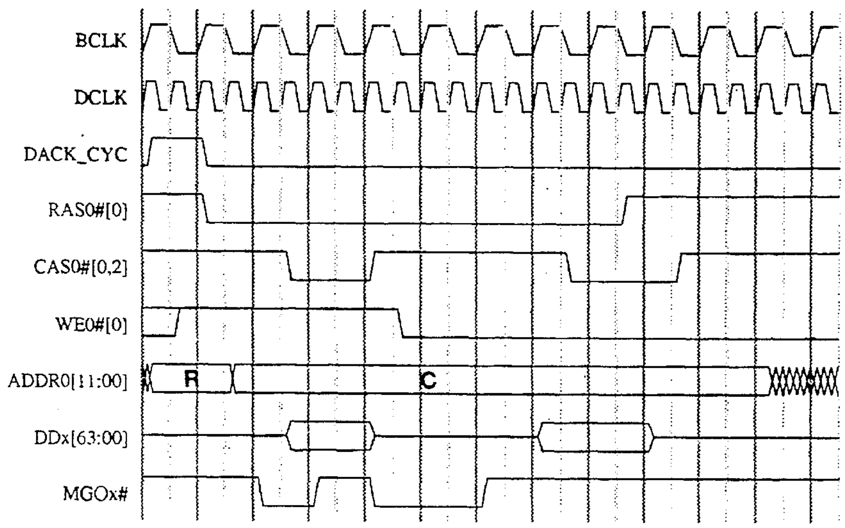

Figure 1-50 Refresh (60ns) (RSF[1:0]=0)
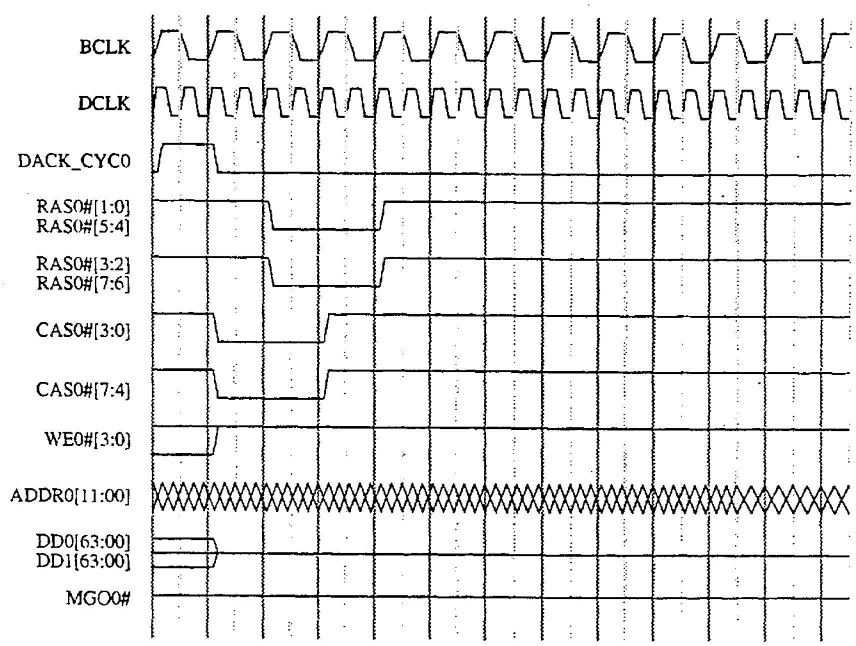

Figure 1-51 Refresh (60ns) (RSF[1:0]=1)
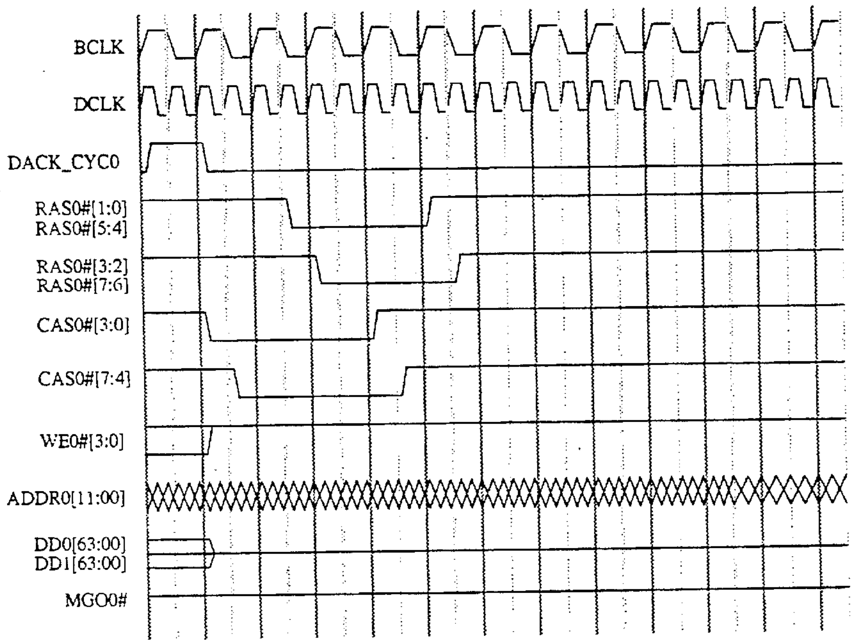

Figure 1-52 Refresh (60ns) (RSF[1:0]=2)
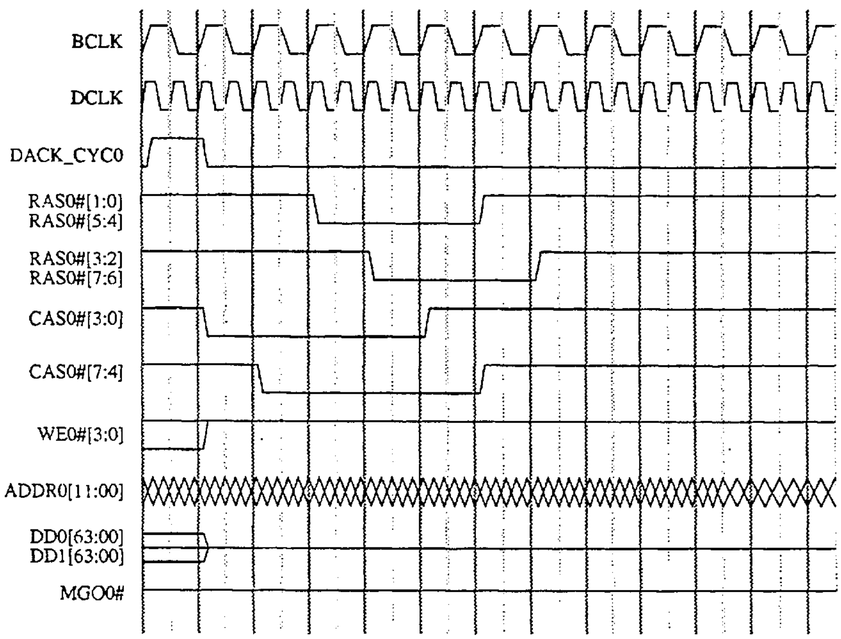

Figure 1-53 Refresh (60ns) (RSF[1:0]=3)
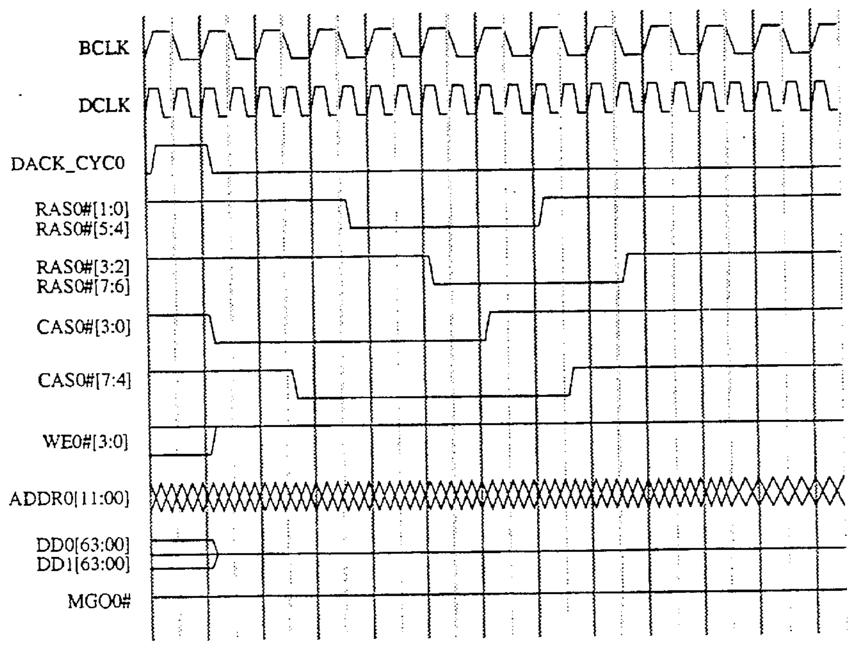

1.4.4 SCAN Interface

TBS

1.4.5 BIST/XBIST

The BIST/XBIST test are used to verify the operation of the memory module DRAM array at operating speed. These test use cache line type cycles to write/read the array. Three passes per 16 Mb are used insure all data and check bits are tested for ones and zeros. Thses optional test, if enabled, are initiated by the system and then controlled by the MC. When completed, test results are stored in the PH (phase field) of the Control/Status register and in the BIST Error register. When in a BIST or XBIST, both are re-initializable.

1.4.5.1 BIST Functionality

Capacity tested:

The BIST will only test the bottom 8 Mb of memory.

Initiation method:

Received INIT# from XA-MP bus and
HBEN (Hardware BIST Enable) = 1 in Hardware Configuration register
- or -
INIT = 1 in Clears register and
HBEN (Hardware BIST Enable) = 1 in Hardware Configuration register and
SBEN (Software BIST Enable) = 1 in Clears register and
XBIST = 0 in Software Configuration register Affected BIST Error register bits:

Only bit 00, which in this case represents the test results of only the bottom 8 Mb of memory, not 16 Mb as in the case of the XBIST.

1.4.5.2 XBIST Functionality

Capacity tested:

The XBIST will test the maximum installed memory in 16 Mb increments starting at the bottom of memory Initiation method:

INIT = 1 in Clears register and
HBEN (Hardware BIST Enable) = 1 in Hardware Configuration register and
SBEN (Software BIST Enable) = 1 in Clears register and
XBIST = 1 in Software Configuration register Affected BIST Error register bits:

Bit 00 up to the maximum number of installed 16 Mb increments. Note, bit 00 now represents a 16 Mb increment.

1.4.5.3 Timing

Approximate BIST time:
(8Mb)(1048576 bytes/Mb)(word/8 bytes)(6 cycles/4 words)(360ns/cycle)
(sec/10*9 ns) = 0.57 sec Approximate maximun XBIST time:
(512Mb)(0.57 sec/8Mb) = 36.5 sec To calculate XBIST time:

1. Read MMC (Memory module capacity in 16 Mb increments) from Hardware Configuration register.
2. Time in sec = MMC x 2 x 0.57

1.4.6 Alpha Scrub

The Alpha Scrub, if enabled, is used to remove soft single bit errors from the DRAM array. Array locations containing hard single bit errors will not be affected by the Alpha scrub. The Alpha scrub logic continuously cycles thru memory, word by word, performing one scrub cycle per eight refresh cyles. During BIST/XBIST mode, the Alpha Scrub is disabled.

1.4.6.1 Alpha Scrub Functionality

Enable Alpha Scrub:

The Alpha Scrub is enabled when ASEN = 1 in the Software Configuration register. The memory initializes with Alpha Scrub off (ASEN = 0).

Error reporting:

Alpha Scrub can be operated with/without its errors being reported. Error reporting is enabled when ASEREN = 1 in the Software Configuration register. The memory initializes with Alpha Scrub error reporting turned off (ASEREN = 0). Since the memory module does not contain any memory maps, a memory doing scrubing thru an area being bypassed by the system MMU will still report any errors in that area. In this case the Alpha Scrub error reporting can be turned off while allowing the Alpha Scrub to remain operational.

1.4.6.2 Timing

Approximate scrub time for largest memory array:

(512 Mb)(1048576 bytes/Mb)(word/8 bytes)(cycle/word)(8 x 16 usec/cycle) (sec/10*6 usec)(min/60 sec)(hr/60 min) = 2.4 hrs Approximate scrub time for smallest memory array:

(16 Mb)(1048576 bytes/Mb)(word/8 bytes)(cycle/word)(8 x 16 usec/cycle) (sec/10*6 usec)(min/60 sec) = 4.5 min

1.5 SOFTWARE VISIBLE REGISTERS

Each XA-MP module slice contains a 1Kbyte block reserved for initialization/configuration registers. The registers are 32-Bits and reside on 16-Byte boundaries. The base address of these registers is determined by the value contained in the slice's begin_init register offset by slice ID multiplied by 1Kbyte to form a 32 bit XA-MP bus address as shown below.

Table 1-21 Visible Register Address

| Init & Config Base Calculation | | |
|---|---|---|
| A[31:15] | A[14:10] | A[09:00] |
| Begin_Init[16:00] | SID[4:0] | Byte Offset[9:0] |

1.5.1 Register Mapping/Attributes

All the configuration, Command and Status registers of the MC and MDP are memory mapped into the address space of the XA-MP Bus and respond only to the following commands: RBW, RBWL, WBW and WBWL. Any read accesses to these registers will result in an Ordered response. A read to a write only, reserved or non-implemented register is ACKed by the memory and returns all zeros. A write to a read only, reserved or non-implemented register is ACKed by the memory. A write to a writable register, received from the XA-MP bus with a BUDE#, is ACKed but the write is not performed. Any access to these registers will receive a NO RESPONSE under the following conditions:

1. Accesses which are not double word operations, byte lanes [7:0] ≠ 0Fh.
2. Accesses which are not on 16 byte boundaries, A[03] ≠ 0.
3. Any accesses, visible register or DRAM, to locations from Begin_Init to Begin_Init + 16K which are not within the memory module's 1Kbyte visible register block.
4. Any accesses, begin_init register or DRAM, to locations FFFC_0000h to FFFC_00F0h which is not the memory module's begin_init register.

The following table lists the different registers with their byte offset address and attributes.

Table 1-22 Register Mapping/Attributes

| DESCRIPTION | Byte Offset | Attributes | | |
|---|---|---|---|---|
| | A[09:00] | Initialization | Read/Write | Clear |
| begin_init Register (MC) | (A) | XA-MP only | Read/Write | None |
| Slice-ID Register (MC) | 000 h | XA-MP only | Read only | None |
| Slice Type Register (MC) | 010 h | XA-MP only | Read only | None |
| Control/Status Register (MC) | 020 h | XA-MP or local | Read/Write | INERYC<br>INERRC<br>BTRSC |
| Clears Register (MC) | 030 h | None | Write only | None |

Table 1-22 Register Mapping/Attributes (Continued)

| DESCRIPTION | Byte Offset | Attributes | | |
|---|---|---|---|---|
| | A[09:00] | Initialization | Read/Write | Clear |
| Bus Time Out Value Register (NOT APPLICABLE) | 040 h | | | |
| Bus Request Trap Yellow Register 1 (NOT APPLICABLE) | 050 h | | | |
| Bus Request Trap Yellow Register 0 (NOT APPLICABLE) | 060 h | | | |
| Bus Request Trap Red Register 1 (NOT APPLICABLE) | 070 h | | | |
| Bus Request Trap Red Register 0 (NOT APPLICABLE) | 080 h | | | |
| Bus Response Trap Register (MC) | 090 h | XA-MP or local | Read only | None |
| RESERVED<br>:<br>RESERVED | 0A0 h<br>:<br>0F0 h | | | |
| Hardware Configuration Register (MC) | 100 h | XA-MP only | Read only | None |
| SIMM Type Register (MC) | 110 h | XA-MP only | Read only | None |
| SIMM Speed Profile Register 1 (MC) | 120 h | XA-MP only | Read only | None |
| SIMM Speed Profile Register 0 (MC) | 130 h | XA-MP only | Read only | None |
| Software Configuration Register (MC) | 140 h | XA-MP only | Read/Write | None |
| BIST Error Register (MC) | 150 h | XA-MP or local | Read only | None |
| Internal Error Yellow Register 1 (MC) | 160 h | XA-MP or local | Read only | INERYC |
| Internal Error Yellow Register 0 (MC) | 170 h | XA-MP or local | Read only | INERYC |
| Internal Error Red Register 1 (MC) | 180 h | XA-MP or local | Read only | INERRC |
| Internal Error Red Register 0 (MC) | 190 h | XA-MP or local | Read only | INERRC |
| RESERVED<br>:<br>RESERVED | 1A0 h<br>:<br>1F0 h | | | |
| Software Configuration Register (MDP) for Data Bus 0 | 200 h | XA-MP only | Read/Write | None |
| Error Status Register (MDP) for Data Bus 0 | 210 h | XA-MP or local | Read only | INERYC<br>INERRC |

Table 1-22 Register Mapping/Attributes (Continued)

| DESCRIPTION | Byte Offset | Attributes | | |
|---|---|---|---|---|
| | A[09:00] | Initialization | Read/Write | Clear |
| Software Configuration Register (MDP) for Data Bus 1 (B) | 220 h | XA-MP only | Read/Write | None |
| Error Status Register (MDP) for Data Bus 1 (B) | 230 h | XA-MP or local | Read only | INERYC INERRC |
| YDE SIMM Register (MDP) for Data Bus 0 | 240 h | XA-MP or local | Read only | INERYC |
| RDE SIMM Register (MDP) for Data Bus 0 | 250 h | XA-MP or local | Read only | INERRC UDEC |
| YDE SIMM Register (MDP) for Data Bus 1 (B) | 260 h | XA-MP or local | Read only | INERYC |
| RDE SIMM Register (MDP) for Data Bus 1 (B) | 270 h | XA-MP or local | Read only | INERRC UDEC |
| RESERVED<br>:<br>RESERVED | 280 h<br>:<br>3A0 h | | | |
| Performance Monitor Counter 3 (MC) | 3B0 h | XA-MP or local | Read/Write | None |
| Performance Monitor Counter 2 (MC) | 3C0 h | XA-MP or local | Read/Write | None |
| Performance Monitor Counter 1 (MC) | 3D0 h | XA-MP or local | Read/Write | None |
| Performance Monitor Counter 0 (MC) | 3E0 h | XA-MP or local | Read/Write | None |
| Performance Monitor Selection Register (MC) | 3F0 h | XA-MP or local | Read/Write | None |

Notes:

(A) Does not use byte offset, see begin_init Register defined in Section 1.5.2.1.

(B) Required for dual data busses.

1. In a dual bus system, each bus has its own independent copy of the four MDP registers.
2. In a single bus system, the single copy of the four MDP registers is available at two different addresses. Reading or writing either address gives the same result.

1.5.2 Initialization/Configuration Registers

1.5.2.1 begin_init Register

The begin_init register is memory mapped into the address space of the system at FFFC0000h offset by it's SLICE ID on 16 byte boundaries. It is a read/write register and is initialized to 00000000 hex only by the XA-MP initialize. The Clears (local) initialize has no effect on the register contents. Only register bits 16 thru 00, A[31:15], can be modified. Any read accesses to this register will result in an Ordered response. This register is programmed by any bus master at boot-up time to configure it with appropriate address value for mapping the memory mapped registers of a Slice into the address space of the processor.

Table 1-23 begin_init Register

| begin_init Register | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
| Reserved | | | | | | | | | | | | | | | A[31:15] | | | | | | | | | | | | | | | | |

1.5.2.2 Slice-ID Register

The Slice-ID register is used to record the slice identification and the revision level for the memory module. This is a read only register with a zero value being returned in the reserved fields. This register is loaded only as a result of an XA-MP initialize.

Table 1-24 Slice-ID Register

| Offset 000h | | | | | | | | | | | | | | | | Slice ID Register | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
| Reserved | | | | | | | | | | | | | | | | SLR[7:0] | | | | | | | | Reserved | | | SID[4:0] | | | | |

1.5.2.2.1 Slice Revision (SLR) Field

This 8-bit value is used to identify the revision level for the memory module. The 8-bit memory slice revision is loaded during bus initialize as a two 4-bit groups from the memory module

1.5.2.2.2 Slice Identification (SID) Field

This field is the slice identification number for the memory module. This number is used to determine the memory location of its configuration and status registers. The 5-bit Slice ID is determined at bus initialize time by sampling the arbitration signals. During this time all arbitration signals will be held high except ARB#[0] which is held low. Since all arbitration signals are routed diagonally on the bus, this low signal will show up on a different ARB#[n] signal in each bus slice. Thus by encoding the ARB#[n] signals each slice will have a unique 5-bit slice ID.

1.5.2.3 Slice Type Register

The Slice Type Register is used to record the identification number of the memory module. This is a read only register with a zero value being returned in the reserved field. This register is loaded only as a result of an XA-MP initialize

Table 1-25 Slice Type Register

| Offset 010h | | | | | | | | | | | | | | | | Identification Register | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
| Reserved | | | | | | | | | | | | | | | | SIN[15:00] | | | | | | | | | | | | | | | |

1.5.2.3.1 Slice Identification Number (SIN) Field

This field contains the 16-bit identification number for the memory module. It is loaded at bus initialization time as four 4-bit groups from the memory module.

1.5.2.4 Control/Status Register

The Control/Status Register is a field dependent read/write register used to control the operating state of the memory and return status from the memory. Register bits 0 thru 16 are read/write, while register bits 24 thru 31 are read only. The memory may also write this register to indicate status it wishes to display to the software. This register is initialized by either an XA-MP or Clears (local) initialize.

Table 1-26 Control/Status Register

| Offset 020h | | | | | | | | | | | | | | | | Control/Status Register | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
| MYSLEY | BTRQY | INERY | BTRS | MYSLER | BTRQR | INERR | SBC | Reserved | | | | | | | IND | PH[6:0] | | | | | | | PC[5:0] | | | | | | SLEREN | SLEYEN | SEN |

1.5.2.4.1 My Slice Error Yellow (MYSLEY)

This read only bit indicates that this slice has reported a slice error yellow to the system bus and at least one of the yellow error indicators (BTRQY,INERY) has been set. When a slice reports an error, it captures information about the error. Further reporting of slice yellow errors to the system is suspended until this bit is cleared to zero by clearing the appropriate error indicator(s) (BTRQY, INERY) using the clears register.

1.5.2.4.2 Bus Trap Request Yellow (BTRQY)

This read only bit indicates that this slice had a Bus Request Trap Yellow has occurred. Since memory never participates in bus arbitration groups, it can not be a bus requestor. Thus, this bit is not used by the memory and will always return a zero.

1.5.2.4.3 Internal Error Yellow (INERY)

This read only bit indicates that the memory has had an Internal Error Yellow occur. When a slice reports an Internal Error Yellow it records information about the error in a slice specific register(s). Further capturing of these errors will be disabled until this bit is cleared to zero by using the clears register. This bit is loaded independent of whether it can currently be reported to the system via SLEY.

1.5.2.4.4 Bus Trap Response (BTRS)

This read only bit indicates that this slice had a Bus Response Trap occur. When a slice reports a Bus Response Trap it captures information about the error in its Bus Response Trap register. This signal does not drive SLEY or SLER.

1.5.2.4.5 My Slice Error Red (MYSLER)

This read only bit indicates that this slice has reported a slice error Red to the system bus. When a slice reports an error, it captures information about the error. Further reporting of slice yellow errors to the system is suspended until this bit is cleared to zero by clearing the appropriate error indicator(s) (BTRQR, INERR) using the clears register.

1.5.2.4.6 Bus Trap Request Red (BTRQR)

This read only bit indicates that this slice had a Bus Request Trap Red has occurred. Since memory never participates in bus arbitration groups, it can not be a bus requestor. Thus, this bit is not used by the memory and will always return a zero.

1.5.2.4.7 Internal Error Red (INERR)

This read only bit indicates that this slice has had an Internal Error Red occur. When a slice reports an Internal Error Red it records information about the error in a slice specific register(s). Further capturing of these errors will be disabled until this bit is cleared to zero by using the clears register. This bit is loaded independent of whether it can currently be reported to the system via SLER.

1.5.2.4.8 Single Bus Configuration (SBC)

This read only bit indicates that the memory is configured to use only data bus 0.

1.5.2.4.9 Indicator (IND)

This read/write bit is used to control an external LED indicator. The memory will turn this bit on at initialization time, but does not participate in turning the bit off.

1.5.2.4.10 Phase Indicator (PH) Field

This read/write field is used by the memory to indicate the current test phase that is being executed. The field is initialized to 7F h and is written to 00 h when all tested phases have passed. It initially is written by the MC to indicate the status of the memory BIST/XBIST. After the BIST/XBIST is completed, it is written by the boot processor to indicate the status of processor's memory testing. Writing of this field during the BIST/XBIST by the boot processor, while not normal operation, is not inhibited by the MC.

1.5.2.4.11 Parity Control (PC) Field

This read/write field is used by diagnostic software to generate a UDE or bad (ODD) parity for each data byte field on the system bus. This will allow the complete testing of UDE and all bus parity error reporting logic in the system. This field is initialized to 00 h

1.5.2.4.12 Slice Error Red Enable (SLEREN)

This read/write bit is used to enable/disable a particular slice from reporting slice red errors to the system, though a slice can still record errors. This bit is used by error handling software to shut down red reporting by a particular slice.

1.5.2.4.13 Slice Error Yellow Enable (SLEYEN)

This read/write bit is used to enable/disable a particular slice from reporting slice yellow errors to the system, though a slice can still record errors. This bit is used by error handling software to shut down yellow reporting by a particular slice.

1.5.2.4.14 Slice Enable (SEN)

This read/write bit allows enabling/disabling of the memory module by the system. When disabled, the memory module will not respond to accesses to its DRAM array and will not report Slice Errors. Software visible registers are always available to the system independent of the state of the SEN bit. The memory module is always initialized to the disabled state. The memory can set itself into the disabled state if a hazard is detected and the HOD (Hazard Option Disable) bit in the Software Configuration Register is set.

Table 1-27 Control/Status Register Bit Definitions

| Bit Field | Bit Setting | Operating Mode |
|---|---|---|
| BTRQR | 0 | Not applicable - Initialization state |
| BTRQY | 0 | Not applicable - Initialization state |
| BTRS | 0 | No Bus Response Trap - Initialization state |
| | 1 | Bus Response Trap Recorded |
| IND | 0 | Indicator off |
| | 1 | Indicator on - Initialization state |
| INERR | 0 | No Internal Error Red - Initialization state |
| | 1 | Internal Error Red Recorded |
| INERY | 0 | No Internal Error Yellow - Initialization state |
| | 1 | Internal Error Yellow Recorded |
| MYSLER | 0 | No Slice Error Red reported - Initialization State |
| | 1 | Slice Error Red reported. |
| MYSLEY | 0 | No Slice Error Yellow reported - Initialization State |
| | 1 | Slice Error Yellow reported. |
| PH[6:0] | 7F h | Initial state |
| | 7E h | SID determination successful. |
| | 7D h | Refresh test |
| | 7C h | DRAM array test |
| | 7B h | Bist bypassed (skip 7D and 7C) |
| | 7A h | DRAM array test completed - No available memory groups |
| | 79 h | DRAM array test completed - Uncorrected Data Errors |
| | 78 h | DRAM array test completed - Corrected Data Errors |
| | 77 h | DRAM array test completed - No errors |
| | 76 - 00 h | Testing by processor |
| SBC | 0 | Configured for both data bus 0 and 1. |
| | 1 | Configured only for data bus 0. |
| SEN | 0 | Slice Disabled - Initialization State |
| | 1 | Slice Enabled |

Table 1-27 Control/Status Register Bit Definitions (Continued)

| Bit Field | Bit Setting | Operating Mode |
|---|---|---|
| SLEREN | 0 | Slice Error Red reporting disabled<br>- Initialization State<br>- SLER seen on bus |
| | 1 | Slice Error Red reporting enabled |
| SLEYEN | 0 | Slice Error Yellow reporting disabled<br>- Initialization State<br>- SLEY seen on bus |
| | 1 | Slice Error Yellow reporting enabled |

Table 1-27 Control/Status Register Bit Definitions (Continued)

| Bit Field | Bit Setting | Operating Mode |
|---|---|---|
| PC[5:0] | 00 h | Generate only EVEN parity (Initialize State) |
| | 01 h | Generates ODD parity on the Address (Not applicable) |
| | 02 h | Generates ODD parity on the byte lanes (Not applicable) |
| | 03 h | Generates ODD parity for CP (Not applicable) |
| | 04 h | Generate UDE0 on the next Ordered Response operation. |
| | 05 h | Generate UDE1 on the next Ordered Response operation. |
| | 06-0F h | Reserved |
| | 10 h | Generates ODD parity for DP0[0] on the next operation. |
| | 11 h | Generates ODD parity for DP0[1] on the next operation. |
| | 12 h | Generates ODD parity for DP0[2] on the next operation. |
| | 13 h | Generates ODD parity for DP0[3] on the next operation. |
| | 14 h | Generates ODD parity for DP0[4] on the next operation. |
| | 15 h | Generates ODD parity for DP0[5] on the next operation. |
| | 16 h | Generates ODD parity for DP0[6] on the next operation. |
| | 17 h | Generates ODD parity for DP0[7] on the next operation. |
| | 18 h | Generates ODD parity for DP1[0] on the next operation. |
| | 19 h | Generates ODD parity for DP1[1] on the next operation. |
| | 1A h | Generates ODD parity for DP1[2] on the next operation. |
| | 1B h | Generates ODD parity for DP1[3] on the next operation. |
| | 1C h | Generates ODD parity for DP1[4] on the next operation. |
| | 1D h | Generates ODD parity for DP1[5] on the next operation. |
| | 1E h | Generates ODD parity for DP1[6] on the next operation. |
| | 1F h | Generates ODD parity for DP1[7] on the next operation. |
| | 20-3F h | Reserved |

1.5.2.5 Clears Register

The Clears Register is a write only register used to individually clear indicator bits or sections of logic within a slice. Reading this register will produce a value of all zeros.

Table 1-28 Clears Register

| Offset 030h | | | | | | | | | Clears Register | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
| INIT | Reserved | | | | | | | | | | | | | | | BTRQYC | INERYC | BTRSC | BTRQRC | INERRC | Reserved | | | | | | | | | UDEC | SBEN |

1.5.2.5.1 Initialize (INIT)

This write only bit is used to soft initialize the memory module. When the bit is received high by the memory, it will cause the memory to do the following:

1. Clear all error indicators
2. Inhibit clearing of software configuration information
3. Remap DRAM array
4. Execute BIST or XBIST if slice is disabled (See SBEN, bit 00 this register)

1.5.2.5.2 Bus Request Trap Yellow Clear (BTRQYC)

This write only bit is used to clear the Bus Trap Request Yellow Indicator in the Command/Status Register. This bit is not used by the memory.

1.5.2.5.3 Internal Error Yellow Clear (INERYC)

This write only bit is used to clear the Internal Error Yellow indicator in the Command/Status Register and its associated error information registers.

1.5.2.5.4 Bus Response Trap Clear (BTRSC)

This write only bit is used to clear the Bus Response Trap indicator in the Command/Status Register.

1.5.2.5.5 Bus Request Trap Red Clear (BTRQRC)

This write only bit is used to clear the Bus Trap Request Red Indicator in the Command/Status Register. This bit is not used by the memory.

1.5.2.5.6 Internal Error Red Clear (INERRC)

This write only bit is used to clear the Internal Error Yellow indicator in the Command/Status Register and its associated error information registers.

1.5.2.5.7 Uncorrectable Data Error Clear (UDEC)

This write only bit is used to clear the MDP UDE SIMM Register.

1.5.2.5.8 Software BIST Enable (SBEN) Bit

This bit is used to determine if a BIST is to be performed with the INIT (bit 31 this register). See Table below for details.

Table 1-29 Clears Register Bit Definitions

| Bit Field | Bit Setting | Operating Mode |
|---|---|---|
| BTRQRC | 0 | Not applicable |
| BTRQYC | 0 | Not applicable |
| BTRSC | 0 | No Clear |
| | 1 | Clear Bus Response Trap Indicator |
| INERRC | 0 | No Clear |
| | 1 | Clear the following:<br>INERR bit, Control/Status Register<br>Internal Error Red Registers 0 & 1<br>Error Status Register (MDP), red bits only<br>RDE SIMM Register (MDP) |
| INERYC | 0 | No Clear |
| | 1 | Clear the following:<br>INERY bit, Control/Status Register<br>Internal Error Yellow Registers 0 & 1<br>Error Status Register (MDP), yellow bits only<br>YDE SIMM Register (MDP) |
| INIT | 0 | No Initialize |
| | 1 | Initialize Slice (See SBEN) |

Table 1-29 Clears Register Bit Definitions (Continued)

| Bit Field | Bit Setting | Operating Mode |
|---|---|---|
| SBEN | 0 | BIST disabled, no BIST at local initialization (INIT) |
| | 1 | BIST enabled, do BIST at local initialization (INIT), if HBEN = 1 in Hardware Configuration Register |
| UDEC | 0 | No Clear |
| | 1 | Clear RDE SIMM Register (MDP) |

1.5.2.6 Bus Response Trap Register

The Bus Response Trap Register is a read only register used to record XA-MP bus cycle error conditions as seen by a Bus Responder. This register is used to record the error type, command and slice ID of the bus transaction that was being performed by a bus requestor when the responder detected an error. Once a trap has been recorded, the Bus Trap Response (BTRS) bit is set in the Control/Status Register. This information can then be used by the system software to log the error and assist in system maintainability. This register is initialized to all zeros by either an XA-MP or Clears (local) initialize.

Table 1-30 Bus Response Trap Register

| Offset 090h | Bus Response Trap Register | | | |
|---|---|---|---|---|
| 31–24 | 23–16 | 15–08 | 07–05 | 04–00 |
| ERR[7:0] | Reserved | CMD[7:0] | Reserved | SID[4:0] |

1.5.2.6.1 Error (ERR) Field

This Error Field records the type of error causing the Bus Response Trap.

1.5.2.6.2 Command (CMD) Field

The Command Field records the 8-bit XA-MP bus command that was being performed by the bus requesting agent when the Bus Response Trap occurred.

1.5.2.6.3 Slice ID (SID) Field

The Slice ID field is used to record the 5-Bit Slice ID of the requesting agent when the Bus Response Trap occurred.

Table 1-31 Bus Response Trap Bit Definitions

| Bit Field | Bit Setting | Operating Mode |
|---|---|---|
| CMD[7:0] | 00-FF h | Requestor Command |
| ERR[7:0] | 00 h | Initialization State |
| | 01 h | CAE# due to Address Parity Error |
| | 02 h | CAE# due to Command Parity Error |
| | 03 h | Data Parity Error - Bus 0 (DPE0#). Additional information concerning this error is contained in the Error Status Register of the appropiate MDP. |
| | 04 h | Data Parity Error - Bus 1 (DPE1#). Additional information concerning this error is contained in the Error Status Register of the appropiate MDP. |
| | 05 h | Cache Coherency Error (Not Applicable) |
| | 06-FF h | Reserved |
| SID[4:0] | 00-1F h | Requestor Slice ID |

1.5.2.7 Hardware Configuration Register

The Hardware Configuration Register is a read only register used to provide the MC with external memory module information. These parameters are a function of the module design and installed SIMMs and are therefore not alterable by software. This register is loaded only as a result of an XA-MP initialize.

Table 1-32 Hardware Configuration Register

| Offset 100h | Hardware Configuration Register | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
| Reserved | | | | | | | | | | | | | | | | | | MMC[5:0] | | | | | | Reserved | | | | RSF1 | RSF0 | HBEN | SSC |

1.5.2.7.1 Memory Module Capacity (MMC) Field

This 6-bit field indicates the total SIMM capacity installed in the memory module in 16Mb increments. See Table below for details.

1.5.2.7.2 Refresh Stagger Factor (RSF) Field

This field indicates the amount of stagger required by the memory module for a refresh cycle. See Table below for details.

1.5.2.7.3 Hardware BIST Enable (HBEN) Bit

This bit indicates if the memory module requires a BIST is to be performed at initialization time. See Table below for details.

1.5.2.7.4 SIMM Socket Configuration (SSC) Bit

This bit indicates which SIMM socket configuration is being used by the memory module. See Table below for details.

Table 1-33 Hardware Configuration Register Bit Definitions

| Bit Field | Bit Setting | Operating Mode |
|---|---|---|
| HBEN | 0 | BIST disabled, no BIST at initialization |
| | 1 | BIST enabled, do BIST at XA-MP initialization, see SBEN in Clears Register for local initialization |
| MMC[5:0] | 00 h | No SIMMs installed |
| | 01 h | 16 Mb installed |
| | 02 h | 32 Mb installed |
| | : | : |
| | 20 h | 512 Mb installed (Max using 32Mb SIMMs) |
| | 21-3F h | Invalid values |
| RSF[1:0] | 00 | No stagger, do all DRAMs per refresh cycle |
| | 01 | Two DRAM groups interleaved and staggered by 1 66Mhz clock |
| | 10 | Two DRAM groups interleaved and staggered by 2 66Mhz clocks |
| | 11 | Two DRAM groups interleaved and staggered by 3 66Mhz clocks |
| SSC | 0 | 16 sockets - uses 4Mb, 8Mb, 16Mb or 32Mb SIMMs |
| | 1 | 32 sockets - uses only 4Mb or 16Mb SIMMs |

1.5.2.8 SIMM Type Register

The SIMM Type Register is a read only register used to provide installed SIMM group information. A SIMM group consists of 4 SIMMs used to provide a 128-bit wide read or write cycles. SIMMs within a group must be identical. When the SSC bit from the Hardware Configuration Register is '0', SIMM groups 4 thru 7 will be read at initialization time, but their contents are ignored. These parameters are a function of the installed SIMMs and are therefore not alterable by software. This register is loaded as a result of an XA-MP initialize.

Table 1-34 SIMM Type Register

| Offset 110h | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| SIMM Type Register | | | | | | | | | | | | | | | | | | | | | | | | | | | | | | | |
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
| GRP7[3:0] | | | | GRP6[3:0] | | | | GRP5[3:0] | | | | GRP4[3:0] | | | | GRP3[3:0] | | | | GRP2[3:0] | | | | GRP1[3:0] | | | | GRP0[3:0] | | | |

1.5.2.8.1 Group x [1:0] (GRPx[1:0]) Field

This 2-bit field is used to indicate the SIMM group speed with respect to the loaded speed profile.

1.5.2.8.2 Group x [3:2] (GRPx[3:2]) Field

This 2-bit field is used to indicate the SIMM capacity used within the specified SIMM group. See Table below for details.

Table 1-35 SIMM Type Register Bit Definitions

| Bit Field | Bit Setting | Operating Mode |
|---|---|---|
| GRPx[1:0] | 00 | SIMM group in not installed |
| | 01 | SIMM group slower than speed profile (Not used during remapping) |
| | 10 | SIMM group is equals speed profile |
| | 11 | SIMM group faster than speed profile |
| GRPx[3:2] | 00 | 4 Mb SIMMs (4M DRAM technology) |
| | 01 | 8 Mb SIMMs (4M DRAM technology) |
| | 10 | 16 Mb SIMMs (16M DRAM technology) |
| | 11 | 32 Mb SIMMs (16M DRAM technology) |

1.5.2.9 SIMM Speed Profile Registers

The SIMM Speed Profile Registers are read only registers used to provide software visibility to the variable SIMM timing parameter setup for the memory module. These parameters are a function of the memory module and are therefore not alterable by software. These registers are loaded only by the XA-MP initialize.

Table 1-36 SIMM Speed Profile Register 1

| Offset 120h | | | | | | | | | | SIMM Speed Profile Register 1 | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
| SS | | CPD | Reserved | | | | tAA | | | | tASC | | | tASR | | | tCAC | | | tCAH | | | tCHR | | | tCP | | | tCPA | | |

Table 1-37 SIMM Speed Profile Register 0

| Offset 130h | | | | | | | | | | SIMM Speed Profile Register 0 | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
| tCSR | | | tDH | | | tDS | | | tRAC | | | | tRAH | | | tRAS | | | | tRDH | | | tRP | | | tRSH | | | tWCW | | |

Table 1-38 SIMM Speed Profile Register Bit Definitions

| Bit Field | Bit Setting | Operating Mode |
|---|---|---|
| SS[1:0] | 00 | SIMM speed - Reserved for 100 ns |
| | 01 | SIMM speed - Reserved for 70 ns |
| | 10 | SIMM speed - 80 ns |
| | 11 | SIMM speed - 60 ns |
| CPD | | Cross Partition Delay |
| tAA | | COLSEL to Data setup in MDP |
| tASC | | COLSEL to CAS on delay |
| tASR | | DACK_CYC to RAS on delay |
| tCAC | | CAS on to Data setup in MDP |
| tCAH | | CAS to NEXTCOL delay |

Table 1-38 SIMM Speed Profile Register Bit Definitions (Continued)

| Bit Field | Bit Setting | Operating Mode |
|---|---|---|
| tCHR | | RAS on to CAS off delay (refresh) |
| tCP | | CAS off to CAS on delay (SGRL) |
| tCPA | | CAS off to Data setiup in MDP (SGRL) |
| tCSR | | CAS on to RAS on delay (refresh) |
| tDH | | CAS on to DATA off in MDP delay |
| tDS | | DATA on in MDP to CAS on delay |
| tRAC | | RAS on to Data setup in MDP |
| tRAH | | RAS on to COLSEL delay |
| tRAS | | RAS on to RAS off delay |
| tRDH | | LDIN in MDP to CAS off delay |
| tRP | | RAS off to RAS on delay |
| tRSH | | CAS on to RAS off delay |
| tWCW | | CAS on to CAS off delay (writes) |

1.5.2.10 Software Configuration Register

The software configuration register is used to configure the memory module with information related to how it will set up its address map. This is a read/write register, however writing is only permitted when memory is in the disabled state (SEN = '0' in Control/Status Register). When a write to this register is completed, the MC will do the following: 1) use bits 12 thru 27 to remap the internal memory and 2) clear the alpha scrub address register. Writing to this register during a BIST/XBIST will cause unspecified BIST/XBIST results. This register is initialized to all zeros only by the XA-MP initialize.

Table 1-39 Software Configuration Register

| Offset 140h | | | | | | | | | | | | Software Configuration Register | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
| XBIST | ASEN | ASEREN | HOD | MSA | RRO | GI[7:0] | | | | | | | | MIM2 | MIM1 | MIM0 | MIS1 | MIS0 | AI | Reserved | | | | SA[7:0] | | | | | | | |

1.5.2.10.1 Extended BIST (XBIST) Bit

This bit is used to determine when the MC should test its entire DRAM array. See Table below for details.

1.5.2.10.2 Alpha Scrub Enable (ASEN) Bit

This bit is used to enable/disable alpha scrubbing. See Table below for details.

1.5.2.10.3 Alpha Scrub Error Report Enable (ASEREN) Bit

This bit is used to enable/disable reporting of errors (CDE and UDE) occurring during alpha scrub cycles. The bit is provided to prevent continuous reporting of Red errors in system deallocated memory while alpha scrub cycles are enabled. See Table below for details.

1.5.2.10.4 Hazard Option Disable (HOD) Bit

This bit is used to provide a memory disable option when a hazard to further operation is detected by the memory. When this option bit is enabled and either the FIFOE0 or FIFOE1 bit in the Internal Error Red Register 1 is on, the memory will go into the disabled state.

WARNING!

> The memory disabled state is an emergency system stop. In this state, the memory will not accept new DRAM read/write cycles and will not deliver any outstanding read responses, thus stopping the system.

1.5.2.10.5 Modify SIMM Address (MSA) Bit

When the bottom of memory is bad at boot time, this bit can be used to address a different area within the bottom SIMM memory group. This does not affect the capacity of the memory and may result in the bottom of memory being good, thus allowing the system to boot.

1.5.2.10.6 Reverse Remap Order (RRO) Bit

When the bottom of memory is bad at boot time and using the MSA bit still results in bad bottom memory, this bit can be used to reverse the remapping order of the SIMM memory groups. This does not affect the capacity of the memory and may result in the bottom of memory being good, thus allowing the system to boot.

1.5.2.10.7 Group Inhibit(GI) Field

This field is programmed to inhibit a defective memory SIMM group from being used when the memory is remapped. A SIMM group is composed of four SIMMs, the smallest increment of installed SIMMs. Single density SIMMs contain one group, while double density SIMMs contain two groups. Multiple SIMM groups may also be inhibited. This reduces the capacity of the memory and may result in an interleaved memory being remapped into banked mode (See AI bit).

1.5.2.10.8 Module Interleave Mode(MIM) Field

This field is programmed to configure the memory module in different addressing modes. See Table below for details. See MIS Field for size of interleaving (bytes).

1.5.2.10.9 Module Interleave Size (MIS) Field

This field is programmed to configure the size, in bytes, of the block used by a memory module when it is in interleave mode.

1.5.2.10.10 Address Interleave (AI) Bit

This bit is programmed to configure the memory array into internal banked or 2-way interleave mode.. If the bit is programmed for 2-way interleaving, but the remap process determines it is not achievable, this bit be automatically reset back to banked mode and the module remains in banked mode. See Table below for details.

1.5.2.10.11 Starting Address (SA) Field

This field specifies the starting address, A[31:24], of the memory module in 16Mb increments. The memory will calculate its ending address by using this field along with bits 25 thru 12 of this register and its internal memory capacity. Thus, memory modules can always be setup in a contiguous addresses space (no holes) or with holes as required by the system.

Note, if the ending address, calculated by adding the starting address plus the internal memory capacity, wraps around back to low order memory, then the entire memory capacity is treated as not being present. Thus, even if the slice enable bit (SEN) = 1, any read/write accesses to a memory location will result in a no response. However, the visible registers can still be accessed during this condition.

Table 1-40 Software Configuration Register Bit Definitions

| Bit Field | Bit Setting | Operating Mode |
|---|---|---|
| AI | 0 | Banked - Initialization state |
| | 1 | 2-way interleaved |
| ASEN | 0 | Disable DRAM alpha scrubbing - Initialization state |
| | 1 | Enable DRAM alpha scrubbing |
| ASEREN | 0 | Disable alpha scrub error reporting - Initialization state |
| | 1 | Enable DRAM alpha scrub error reporting |
| HOD | 0 | Do not disable memory if hazard detected - Initialization state |
| | 1 | Disable memory if hazard detected |
| GI[7:0] | 0000 0000 | All SIMM groups enabled - Initialization state |
| | XXXX XXX1 | Disable SIMM group 0 |
| | XXXX XX1X | Disable SIMM group 1 |
| | XXXX X1XX | Disable SIMM group 2 |
| | XXXX 1XXX | Disable SIMM group 3 |
| | XXX1 XXXX | Disable SIMM group 4 |
| | XX1X XXXX | Disable SIMM group 5 |
| | X1XX XXXX | Disable SIMM group 6 |
| | 1XXX XXXX | Disable SIMM group 7 |
| MIM[2:0] | 000 | Banked - no interleaving - Initialization state |
| | 001 | Reserved (defaults to initialization state) |
| | 010 | 2-way interleaving - Interleave groups 0,2,4,6... |
| | 011 | 2-way interleaving - Interleave groups 1,3,5,7... |
| | 100 | 4-way interleaving - Interleave groups 0,4,8... |
| | 101 | 4-way interleaving - Interleave groups 1,5,9... |
| | 110 | 4-way interleaving - Interleave groups 2,6,10... |
| | 111 | 4-way interleaving - Interleave groups 3,7,11... |

Table 1-40 Software Configuration Register Bit Definitions (Continued)

| Bit Field | Bit Setting | Operating Mode |
|---|---|---|
| MIS[1:0] | 00 | 32 bytes - Initialization state |
| | 01 | 64 bytes |
| | 10 | Reserved (defaults to initialization state) |
| | 11 | Reserved (defaults to initialization state) |
| MSA | 0 | Normal SIMM addressing - Initialization state |
| | 1 | Modified SIMM addressing |
| RRO | 0 | Remap memory from SIMM group 0 -> 7 - Initialization state |
| | 1 | Remap memory from SIMM group 7 -> 0 |
| SA[7:0] | 00-FEh | Starting address in 16Mb increments |
| XBIST | 0 | No eXtended BIST - Initialization state |
| | 1 | Do eXtended BIST |

1.5.2.11 BIST Error Register

This read only register gives the BIST/XBIST error history of the internally remapped memory module in increments of 16Mb. Bit 00 equals the status of the least significant 16Mb increment, while bit 31 equals the status of the most significant 16Mb increment (Max memory module capacity). This register is first initialized to all ones as a result of either a XA-MP or Clears (local) initialize.

If XBIST is enabled (HBEN, SBEN and XBIST = 1for local initialize), as each 16Mb test is successfully completed, a zero will then be loaded into the appropiate bit. For a memory module below maximum capacity, the missing increments will remain a '1' after completion of the XBIST.

If BIST is enabled (HBEN = 1 for XA-MP initialize or both HBEN and SBEN = 1 and XBIST = 0 for local initialize), if the first 8Mb test is successfully completed, a zero will then be loaded into Bit 00. All other bits will remain a '1' after completion of the BIST. Note, in this special case, Bit 00 represents the status of only the first 8Mb of memory.

Table 1-41 BIST Error Register

| Offset 150h | BIST Error Register |
|---|---|
| 31 ... 00 | BE[31:00] |

Bits: 31 30 29 28 27 26 25 24 23 22 21 20 19 18 17 16 15 14 13 12 11 10 09 08 07 06 05 04 03 02 01 00 — field BE[31:00]

1.5.2.11.1 BIST Error (BE) Field

For XBIST, each bit in this field represents the status of a particular 16Mb increment.
BE[00] = status of 00-16Mb
BE[01] = status of 16-32Mb
etc.

For BIST, bit 00 represents the status of the first 8Mb increment.
BE[00] = status of 00-08Mb
BE[01] -> BE[31] = always '1'

Table 1-42 BIST Error Register Bit Definitions

| Bit Field | Bit Setting | Operating Mode |
|---|---|---|
| BE[31:00] | 0 | No error - BIST completed successfully |
| | 1 | Memory increment not present if above module capacity<br>or<br>If PH[6:0] = 7C, Uncorrected or Corrected Data Error<br>or<br>If PH[6:0] = 7B, Corrected Data Error |

1.5.2.12 Internal Error Yellow Registers

These read only registers are used to trap the source of an asynchronous SLEY(slice error yellow). Register 1 will contain the source of the error and register 0 will contain its address. The first error occurring will freeze both registers. After the system has read the error information, the INERYC bit in the Clears Register will clear Register 1 and allow Register 0 to begin updating with each DRAM cycle. These registers are initialized to all zeros by either an XA-MP or Clears (local) initialize. Register 0 will remain at all zeros until the first DRAM cycle, at which time it will be updated with the DRAM address.

Table 1-43 Internal Error Yellow Register 1

| Offset 160h | | | | | | | | Internal Error Yellow Register 1 |
|---|---|---|---|---|---|---|---|---|
| 31 | 30 | 29 | 28 | 27 | 26 | 25 | 24 | 23–00 |
| ASCDE1 | ASCDE0 | PWCDE1 | PWCDE0 | RCDE1 | RCDE0 | ASUDE1 | ASUDE0 | Reserved |

Table 1-44 Internal Error Yellow Register 0

| Offset 170h | Internal Error Yellow Register 0 |
|---|---|
| 31–00 | A[31:00] |

1.5.2.12.1 Alpha Scrub Corrected Data Error (ASCDE)

These bits, if enabled by ASEREN in the Software Configuration Register, indicate that a single bit error occurred on the read portion of a Alpha Scrub cycle. ASCDE0 indicates an error associated with data bus 0 while ASCDE1 indicates an error associated with data bus 1. See Table below for details.

1.5.2.12.2 Partial Write Corrected Data Bit Error (PWCDE)

These bits indicate that a single bit error occurred on the read portion of a partial write cycle. PWCDE0 indicates an error associated with data bus 0 while PWCDE1 indicates an error associated with data bus 1. See Table below for details.

1.5.2.12.3 Read Corrected Data Error (RCDE)

These bits indicate that a single bit error occurred on a read cycle. RCDE0 indicates an error associated with data bus 0 while RCDE1 indicates an error associated with data bus 1. See Table below for details.

1.5.2.12.4 Alpha Scrub Uncorrected Data Error (ASUDE)

These bits, if enabled by ASEREN in the Software Configuration Register, indicate that a multiple bit error occurred on the read portion of an Alpha Scrub cycle. ASUDE0 indicates an error associated with data bus 0 while ASUDE1 indicates an error associated with data bus 1. See Table below for details.

1.5.2.12.5 Address (A) Field

The address field is used to record the address of the error. Address bits 02 thru 00 indicate the lowest byte being accessed by the bus operation.

Table 1-45 Internal Error Yellow Register Bit Definitions

| Bit Field | Bit Setting | Operating Mode |
|---|---|---|
| A[31:00] | | Address of error |
| ASCDE0 or ASCDE1 | 0 | No error - Initialization state |
| | 1 | Alpha Scrub Corrected Data Error (single bit error) |
| ASUDE0 or ASUDE1 | 0 | No error - Initialization state |
| | 1 | Alpha Scrub Uncorrected Data Error (multiple bit error) |
| PWCDE0 or PWCDE1 | 0 | No error - Initialization state |
| | 1 | Partial Write Corrected Data Error (single bit error) |
| RCDE0 or RCDE1 | 0 | No error - Initialization state |
| | 1 | Read Corrected Data Error (single bit error) |

1.5.2.13 Internal Error Red Registers

These read only registers are used to trap the sources of an asynchronous SLER (slice error red). Register 1 contains two error fields which can be loaded concurrently, the UDE field in bits 28 and 29 and the FIFO Error field in bits 26 and 27. If the first error is in the UDE field, the UDE field and address register 0 are both frozen. This does not effect the recording of a FIFO error prior to clearing the registers. If the first error is in the FIFO error field, the FIFO error field is frozen. This does not effect the recording of a UDE and its address prior to clearing the registers. After the system has read the error information, the INERRC bit in the Clears Register will clear Register 1 and allow Register 0 to begin updating with each DRAM cycle. These registers are initialized to all zeros by either an XA-MP or Clears (local) initialize. Register 0 will remain at all zeros until the first DRAM cycle, at which time it will be updated with the DRAM address.

Table 1-46 Internal Error Red Register 1

| Offset 180h | | Internal Error Red Register 1 | | | |
|---|---|---|---|---|---|
| 31-30 | 29 | 28 | 27 | 26 | 25-00 |
| Res | PWUDE1 | PWUDE0 | FIFOE1 | FIFOE0 | Reserved |

Table 1-47 Internal Error Red Register 0

| Offset 190h | Internal Error Red Register 0 |
|---|---|
| 31-00 | |
| A[31:00] | |

1.5.2.13.1 Partial Write Uncorrected Data Error (PWUDE)

These bits indicate that a multiple bit error occurred on the read portion of a partial write cycle. PWUDE0 indicates an error associated with data bus 0 while PWUDE1 indicates an error associated with data bus 1. See Table below for details.

1.5.2.13.2 FIFO Error (FIFOE)

These bits indicate that a FIFO error has occurred while transferring data to/from the MDP ASIC. FIFOE0 indicates an error associated with data bus 0 while FIFOE1 indicates an error associated with data bus 1. Additional information concerning this error is contained in the Error Status Register of the appropiate MDP. See Table below for details.

1.5.2.13.3 Address (A) Field

The address field is used to record the address of a UDE error. The address field is not valid for FIFO errors. Address bits 02 thru 00 indicate the lowest byte being accessed by the bus operation.

Table 1-48 Internal Error Red Register Bit Definitions

| Bit Field | Bit Setting | Operating Mode |
|---|---|---|
| A[31:00] | | Address of UDE error |
| FIFOE0 or FIFOE1 | 0 | No error - Initialization state |
| | 1 | FIFO error |
| PWUDE0 or PWUDE1 | 0 | No error - Initialization state |
| | 1 | Partial Write Uncorrected Data Error (multiple bit error) |

1.5.2.14 Performance Monitor Counters - PMC3 - PMC0

Four programmable 32-bit read/write counters PMC3..0 are provided. These counters can be configured to count any four events from a pre-determined list of events. These events are selected by programing the Performance Monitor Selection Register. The counters are initialized to zero by either an XA-MP or local initialize. The counters can be read or written by system software while enabled.

Table 1-49 PMC3 Register

| Offset 3B0h | PMC3 Register | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
| PMC3[31:00] | | | | | | | | | | | | | | | | | | | | | | | | | | | | | | | |

Table 1-50 PMC2 Register

| Offset 3C0h | PMC2 Register | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
| PMC2[31:00] | | | | | | | | | | | | | | | | | | | | | | | | | | | | | | | |

Table 1-51 PMC1 Register

| Offset 3D0h | PMC1 Register | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
| PMC1[31:00] | | | | | | | | | | | | | | | | | | | | | | | | | | | | | | | |

Table 1-52 PMC0 Register

| Offset 3E0h | PMC0 Register | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
| PMC0[31:00] | | | | | | | | | | | | | | | | | | | | | | | | | | | | | | | |

1.5.2.15 Performance Monitor Selection Register

The 32-bit Performance Monitor Selection Register is read/write register used to control the operation of each of the performance monitor counters. For each counter there is a 7-bit Performance Monitor Selection Field (PMS), and a enable bit (E). This register is initialized to all zeros by either an XA-MP or local initialize.

Table 1-53 Performance Monitor Selection Register

| Offset 3F0h | | | | | | | | | | | | | | | | PMS Register | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
| E3 | PMS3 | | | | | | | E2 | PMS2 | | | | | | | E1 | PMS1 | | | | | | | E0 | PMS0 | | | | | | |

1.5.2.15.1 Performance Monitor Selection Field (PMS)

This 7-bit field allows up to four independent events to be monitored by the performance monitor counters.

1.5.2.15.2 Enable Bit (En)

This bit is used to enable/disable the associated performance monitor counter.

Table 1-54 PMS Register Bit Definitions

| Field | Code | Operating Mode | Notes |
|---|---|---|---|
| PMS3 thru PMS0 | 00 h | Count Bus Clocks | |
| | 01h | Count all MC generated NAKs | |
| | 02h | Count only MC generated NAKs due to a full command FIFO | |
| | 03h | Count only MC generated NAKs due to a full data-input FIFO | |
| | 04h | Count all XA-MP bus cycles | |
| | 05h | Count FLY-BY cycles | |
| | 06h | Count aborted FLY-BY cycles | |
| | 07h | Count all XA-MP bus DRAM cycles | 1 |
| | 08h | Count all DRAM cycles (RCL = 1) | 2 |
| | 09h | Reserved | |
| | 0Ah | Count overlay cycles | |
| | 0Bh | Count CDE correction cycles (RCL not equal 1) | 3 |
| | 0Ch | Count CDE cycles with command FIFO not empty | |
| | 0Dh | Count response cycles - Bus 0 (RCL = 1) | |
| | 0Eh | Count response FLY-BY cycles - Bus 0 (RCL = 1) | |
| | 0Fh | Count response cycles - Bus 1 (RCL = 1) | |
| | 10h | Count response FLY-BY cycles - Bus 1 (RCL = 1) | |
| | 11-7F h | Reserved (Counter will NOT count) | |
| E3 thru E0 | 0 | Associated counter is disabled | |
| | 1 | Associated counter is enabled | |

Notes:

1. Only DRAM cycles caused by XA-MP reads/writes.
2. Any DRAM cycle (XA-MP reads/writes, refresh, alpha or correction).
3. Due to RCL, RBW and RBWL (does not count CDEs due to alpha or partial writes).

1.6 TESTABILITY

TBS

1.6.1 IEEE 1149.1

TBS

1.6.1.1 Boundary Scan

TBS

1.6.1.2 Internal Scan

TBS

1.6.1.3 BIST

TBS

1.7 ELECTRICAL SPECIFICATIONS

TBS

1.7.1 Power & Ground

TBS

1.7.2 Maximum Ratings

TBS

1.7.3 DC Specifications

TBS

1.7.4 AC Specifications

TBS

1.8 MECHANICAL SPECIFICATIONS

TBS

1.8.1 Package Information

TBS

1.8.2 Package Thermal Specifications

TBS

1.9 APPENDIX A - ADDRESS MAPPING

The memory module must support the following module address maps:

Banked mode
1. Internally banked addressing
2. Internally 2-way interleaved addressing 2-Way interleaving - on 32 byte boundary
1. Internally banked addressing
2. Internally 2-way interleaved addressing 2-Way interleaving - on 64 byte boundary
1. Internally banked addressing
2. Internally 2-way interleaved addressing 4-Way interleaving - on 32 byte boundary
1. Internally banked addressing
2. Internally 2-way interleaved addressing 4-Way interleaving - on 64 byte boundary
1. Internally banked addressing
2. Internally 2-way interleaved addressing

Figure 1-54 Banked Memory

DRAM = DRAM technology
SIMM = SIMM size
IAI = Internal Address Interleaving
1 = Banked, 2 = 2-way interleaved
M= Multi group, S = Single group

| DRAM | SIMM | IAI | ADDRESS | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|
| | | | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
| 4M | 4M or 8M | 1M | M | M | M | M | M | D | D | R | R | R | R | R | R | R | R | R | R | C | C | C | C | C | C | C | C | C | C | DW | DW | L | L | L |
| | | 2M | M | M | M | M | M | D | R | R | R | R | R | R | R | R | R | R | C | C | C | C | C | C | C | C | C | C | D | DW | DW | L | L | L |
| | | 1S | M | M | M | M | M | D | D | D | R | R | R | R | R | R | R | R | R | R | C | C | C | C | C | C | C | C | C | CW | DW | L | L | L |
| | | 2S | M | M | M | M | M | D | D | R | R | R | R | R | R | R | R | R | R | C | C | C | C | C | C | C | C | C | D | CW | DW | L | L | L |
| 16M | 16M or 32M | 1M | M | M | M | D | D | R | R | R | R | R | R | R | R | R | R | R | C | C | C | C | C | C | C | C | C | C | C | DW | DW | L | L | L |
| | | 2M | M | M | M | D | R | R | R | R | R | R | R | R | R | R | R | C | C | C | C | C | C | C | C | C | C | C | D | DW | DW | L | L | L |
| | | 1S | M | M | M | D | D | D | R | R | R | R | R | R | R | R | R | R | R | C | C | C | C | C | C | C | C | C | C | CW | DW | L | L | L |
| | | 2S | M | M | M | D | D | R | R | R | R | R | R | R | R | R | R | R | C | C | C | C | C | C | C | C | C | C | D | CW | DW | L | L | L |

Definitions used are as follows:

L = lane bits
C = CAS address
R = RAS address
W = Word select
D = Decoded RAS
M = Module decode

BANKED MODULE

Figure 1-55 2-Way Interleaved Module (32 byte boundary)

DRAM = DRAM technology
SIMM = SIMM size
IAI = Internal Address Interleaving
1 = Banked, 2 = 2-way interleaved
M= Multi group, S = Single group

| DRAM | SIMM | IAI | ADDRESS 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|---|---|---|
| 4M | 4M or 8M | 1M | M | M | M | M | D | D | R | R | R | R | R | R | R | R | R | R | C | C | C | C | C | C | C | C | C | C | M | DW | DW | L | L | L |
| | | 2M | M | M | M | M | D | R | R | R | R | R | R | R | R | R | R | C | C | C | C | C | C | C | C | C | C | D | M | DW | DW | L | L | L |
| | | 1S | M | M | M | M | D | D | D | R | R | R | R | R | R | R | R | R | R | C | C | C | C | C | C | C | C | C | M | CW | DW | L | L | L |
| | | 2S | M | M | M | M | D | D | R | R | R | R | R | R | R | R | R | R | C | C | C | C | C | C | C | C | C | D | M | CW | DW | L | L | L |
| 16M | 16M or 32M | 1M | M | M | D | D | R | R | R | R | R | R | R | R | R | R | R | C | C | C | C | C | C | C | C | C | C | C | M | DW | DW | L | L | L |
| | | 2M | M | M | D | R | R | R | R | R | R | R | R | R | R | R | C | C | C | C | C | C | C | C | C | C | C | D | M | DW | DW | L | L | L |
| | | 1S | M | M | D | D | D | R | R | R | R | R | R | R | R | R | R | R | C | C | C | C | C | C | C | C | C | C | M | CW | DW | L | L | L |
| | | 2S | M | M | D | D | R | R | R | R | R | R | R | R | R | R | R | C | C | C | C | C | C | C | C | C | C | D | M | CW | DW | L | L | L |

Definitions used are as follows:

L = lane bits
C = CAS address
R = RAS address
W = Word select
D = Decoded RAS
M = Module decode

2-WAY INTERLEAVED MODULE (32 byte boundary)

Figure 1-56 2-Way Interleaved Module (64 byte boundary)

DRAM = DRAM technology
SIMM = SIMM size
IAI = Internal Address Interleaving
1 = Banked, 2 = 2-way interleaved
M= Multi group, S = Single group

| DRAM | SIMM | IAI | ADDRESS | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|
| | | | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
| 4M | 4M or 8M | 1M | M | M | M | M | D | D | R | R | R | R | R | R | R | R | R | R | C | C | C | C | C | C | C | C | C | M | C | DW | DW | L | L | L |
| | | 2M | M | M | M | M | D | R | R | R | R | R | R | R | R | R | R | C | C | C | C | C | C | C | C | C | C | M | D | DW | DW | L | L | L |
| | | 1S | M | M | M | M | D | D | D | R | R | R | R | R | R | R | R | R | C | C | C | C | C | C | C | C | C | M | C | CW | DW | L | L | L |
| | | 2S | M | M | M | M | D | D | R | R | R | R | R | R | R | R | R | C | C | C | C | C | C | C | C | C | C | M | D | CW | DW | L | L | L |
| 16M | 16M or 32M | 1M | M | M | D | D | R | R | R | R | R | R | R | R | R | R | R | C | C | C | C | C | C | C | C | C | C | M | C | DW | DW | L | L | L |
| | | 2M | M | M | D | R | R | R | R | R | R | R | R | R | R | R | C | C | C | C | C | C | C | C | C | C | C | M | D | DW | DW | L | L | L |
| | | 1S | M | M | D | D | D | R | R | R | R | R | R | R | R | R | R | R | C | C | C | C | C | C | C | C | C | M | C | CW | DW | L | L | L |
| | | 2S | M | M | D | D | R | R | R | R | R | R | R | R | R | R | R | C | C | C | C | C | C | C | C | C | C | M | D | CW | DW | L | L | L |

Definitions used are as follows:

L = lane bits
C = CAS address
R = RAS address
W = Word select
D = Decoded RAS
M = Module decode

2-WAY INTERLEAVED MODULE (64 byte boundary)

Figure 1-57 4-Way Interleaved Module (32 byte boundary)

DRAM = DRAM technology
SIMM = SIMM size
IAI = Internal Address Interleaving
1 = Banked, 2 = 2-way interleaved
M= Multi group, S = Single group

| DRAM | SIMM | IAI | ADDRESS 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|---|---|---|
| 4M | 4M or 8M | 1M | M | M | M | D | D | R | R | R | R | R | R | R | R | R | R | C | C | C | C | C | C | C | C | C | C | M | M | DW | DW | L | L | L |
| | | 2M | M | M | M | D | R | R | R | R | R | R | R | R | R | R | C | C | C | C | C | C | C | C | C | C | D | M | M | DW | DW | L | L | L |
| | | 1S | M | M | M | D | D | D | R | R | R | R | R | R | R | R | R | R | C | C | C | C | C | C | C | C | C | M | M | CW | DW | L | L | L |
| | | 2S | M | M | M | D | D | R | R | R | R | R | R | R | R | R | R | C | C | C | C | C | C | C | C | C | D | M | M | CW | DW | L | L | L |
| 16M | 16M or 32M | 1M | M | D | D | R | R | R | R | R | R | R | R | R | R | R | C | C | C | C | C | C | C | C | C | C | C | M | M | DW | DW | L | L | L |
| | | 2M | M | D | R | R | R | R | R | R | R | R | R | R | R | C | C | C | C | C | C | C | C | C | C | C | D | M | M | DW | DW | L | L | L |
| | | 1S | M | D | D | D | R | R | R | R | R | R | R | R | R | R | R | C | C | C | C | C | C | C | C | C | C | M | M | CW | DW | L | L | L |
| | | 2S | M | D | D | R | R | R | R | R | R | R | R | R | R | R | C | C | C | C | C | C | C | C | C | C | D | M | M | CW | DW | L | L | L |

Definitions used are as follows:

L = lane bits
C = CAS address
R = RAS address
W = Word select
D = Decoded RAS
M = Module decode

4-WAY INTERLEAVED MODULE (32 byte boundary)

Figure 1-58 4-Way Interleaved Module (64 byte boundary)

DRAM = DRAM technology
SIMM = SIMM size
IAI = Internal Address Interleaving
1 = Banked, 2 = 2-way interleaved
M= Multi group, S = Single group

| DRAM | SIMM | IAI | ADDRESS | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|
| | | | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
| 4M | 4M or 8M | 1M | M | M | M | D | D | R | R | R | R | R | R | R | R | R | R | C | C | C | C | C | C | C | C | C | M | M | C | DW | DW | L | L | L |
| | | 2M | M | M | M | D | R | R | R | R | R | R | R | R | R | R | C | C | C | C | C | C | C | C | C | C | M | M | D | DW | DW | L | L | L |
| | | 1S | M | M | M | D | D | D | R | R | R | R | R | R | R | R | R | R | C | C | C | C | C | C | C | C | M | M | C | CW | DW | L | L | L |
| | | 2S | M | M | M | D | D | R | R | R | R | R | R | R | R | R | R | C | C | C | C | C | C | C | C | C | M | M | D | CW | DW | L | L | L |
| 16M | 16M or 32M | 1M | M | D | D | R | R | R | R | R | R | R | R | R | R | R | C | C | C | C | C | C | C | C | C | C | M | M | C | DW | DW | L | L | L |
| | | 2M | M | D | R | R | R | R | R | R | R | R | R | R | R | C | C | C | C | C | C | C | C | C | C | C | M | M | D | DW | DW | L | L | L |
| | | 1S | M | D | D | D | R | R | R | R | R | R | R | R | R | R | R | C | C | C | C | C | C | C | C | C | M | M | C | CW | DW | L | L | L |
| | | 2S | M | D | D | R | R | R | R | R | R | R | R | R | R | R | C | C | C | C | C | C | C | C | C | C | M | M | D | CW | DW | L | L | L |

Definitions used are as follows:

L = lane bits
C = CAS address
R = RAS address
W = Word select
D = Decoded RAS
M = Module decode

4-WAY INTERLEAVED MODULE (64 byte boundary)

1.10 APPENDIX B - SIMM SIGNAL ROUTING
Figure 1-59 SIMM SIGNAL ROUTING - 16 SOCKETS
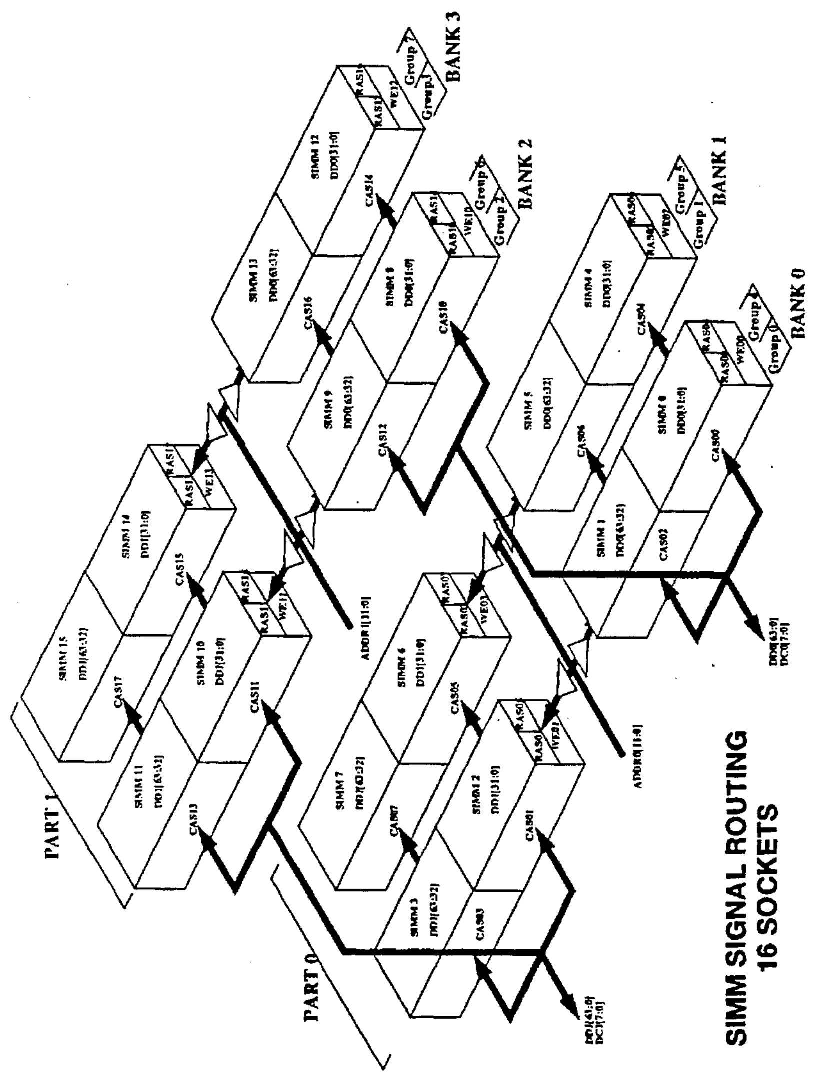

Figure 1-60 SIMM SIGNAL ROUTING - 32 SOCKETS
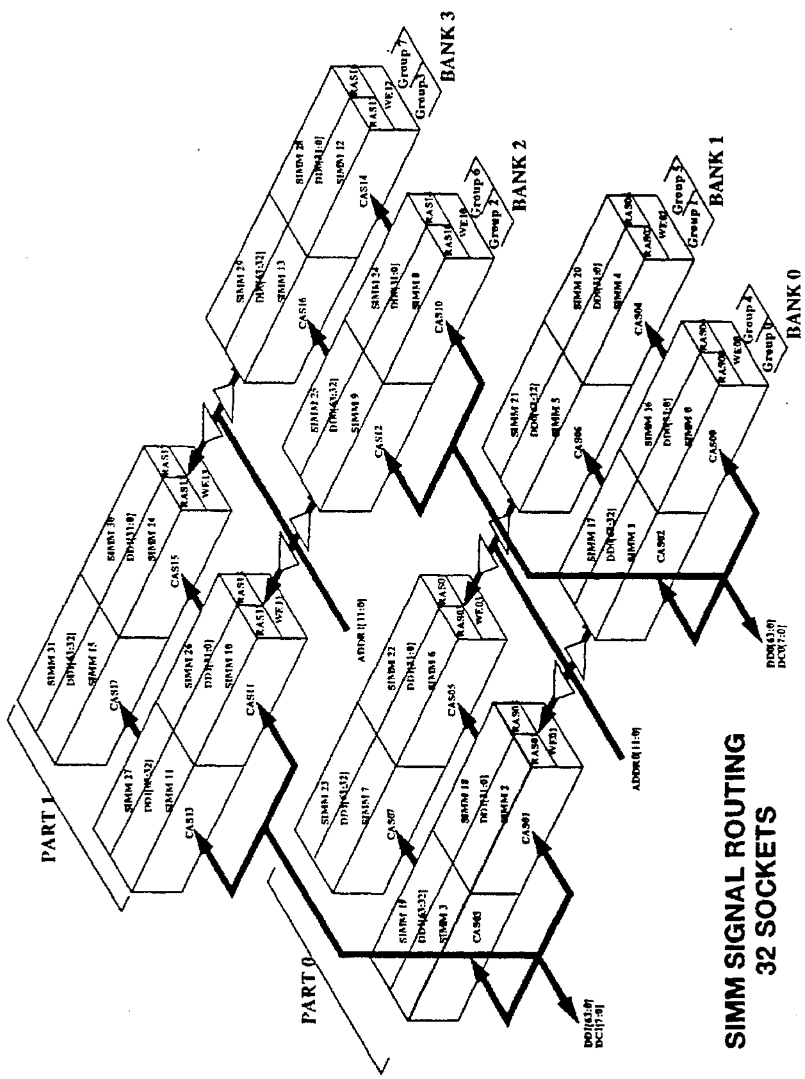

APPENDIX 3

MEMORY DATA PATH

MEMORY DATA PATH (MDP) ..... 1
1.1 INTRODUCTION ..... 1
1.1.1 Product Description ..... 1
1.1.2 Revision History ..... 1
1.1.3 References ..... 1
1.2 FUNCTIONAL DESCRIPTION ..... 1
1.2.1 Block Diagram ..... 3
1.2.1.1 XA-MP Interface ..... 3
1.2.2 DRAM Interface ..... 3
1.2.2.1 EDAC Generator & Corrector ..... 5
1.2.2.2 MDP Registers ..... 5
1.2.2.3 MC Interface ..... 5
1.2.2.4 Read Path ..... 5
1.2.2.5 SCAN Control ..... 5
1.2.2.6 State Machines ..... 6
1.2.2.7 Write Check Bit Generator ..... 6
1.2.2.8 Write Path ..... 6
1.2.3 Sub-blocks ..... 6
1.3 PIN DESCRIPTION ..... 7
1.3.1 XA-MP Bus Interface Pins ..... 7
1.3.2 MC/MDP Interface Pins ..... 8
1.3.3 DRAM Array Interface Pins ..... 10
1.3.4 SCAN Interface Pins ..... 11
1.3.5 Pin Assignments ..... 11
1.4 OPERATION ..... 12
1.4.1 XA-MP Bus Interface ..... 12
1.4.1.1 Write Cycles ..... 12
1.4.1.2 Read Response Cycles ..... 19
1.4.2 MDP/MC Interface ..... 21
1.4.2.1 Control Registers ..... 21
1.4.2.1.1 MDP Configuration Register ..... 21
1.4.2.1.1.1 Write FIFO Size (WFS) Field ..... 21
1.4.2.1.1.2 Read FIFO Size (RFS) Field ..... 21
1.4.2.1.2 Mode 0 Control Register ..... 22
1.4.2.1.2.1 Initialize (INIT) ..... 22
1.4.2.1.2.2 Slice Enable (SEN) ..... 23
1.4.2.1.2.3 Force Data Pattern (FDP) Field ..... 23
1.4.2.1.2.4 Built In Self Test (BIST) ..... 23
1.4.2.1.3 Mode 1 Control Register ..... 24
1.4.2.1.3.1 Clear Yellow (CLRY) ..... 24
1.4.2.1.3.2 Clear Red (CLRR) register bits ..... 24
1.4.2.1.3.3 Clear UDE (CLRU) register bits ..... 24
1.4.2.1.4 Data Parity Control Register ..... 25
1.4.2.1.4.1 Force UDE (FUDE) ..... 25
1.4.2.1.4.2 Force ODD Data Parity (FODP) ..... 25

1.4.2.1.4.3 Byte (B) Field ....................25
1.4.2.2 MGO# Timing ....................27
1.4.2.2.1 XAMP Bus Initialize ....................27
1.4.2.2.2 Non-Shift Register Cycles ....................27
1.4.2.2.3 Shift-In Register Cycles ....................29
1.4.2.2.4 Shift-Out Register Cycles ....................33
1.4.2.3 DRAM Array Interface ....................36
1.4.2.3.1 DRAM Reads ....................36
1.4.2.3.2 DRAM Writes ....................42
1.4.3 SCAN Interface ....................47
1.4.4 Failing SIMM/Group Numbers ....................47
1.5 SOFTWARE VISIBLE REGISTERS ....................48
1.5.1 Register Mapping ....................48
1.5.2 Register Attributes ....................48
1.5.3 Initialization/Configuration Registers ....................48
1.5.3.1 Software Configuration Register ....................48
1.5.3.1.1 Force Write FIFO (FWF) Field ....................49
1.5.3.1.2 Force Read FIFO (FRF) Field ....................49
1.5.3.1.3 CB Generation Disable (CBGDIS) ....................49
1.5.3.1.4 Check Bit (CB) Field ....................49
1.5.3.2 Error Status Register ....................50
1.5.3.2.1 Write FIFO Empty Error (WFEE) ....................50
1.5.3.2.2 Write FIFO Full Error (WFFE) ....................50
1.5.3.2.3 Read FIFO Empty Error (RFEE) ....................50
1.5.3.2.4 Read FIFO Full Error (RFFE) ....................50
1.5.3.2.5 Data Parity Error (DPE) ....................51
1.5.3.2.6 Error Count (CNT) Field ....................51
1.5.3.2.7 Byte Error (BE) Field ....................51
1.5.3.3 YDE SIMM Register ....................52
1.5.3.3.1 Alpha Uncorrected Data Error (AUDE) ....................52
1.5.3.3.2 Corrected Data Error (CDE) ....................52
1.5.3.3.3 Error Count (CNT) Field ....................52
1.5.3.3.4 SIMM Number (SIMM) Field ....................52
1.5.3.3.5 Syndrome (SYND) Field ....................53
1.5.3.4 RDE SIMM Register ....................54
1.5.3.4.1 Uncorrected Data Error (UDE) ....................54
1.5.3.4.2 Error Count (CNT) Field ....................54
1.5.3.4.3 SIMM Number (SIMM) Field ....................54
1.5.3.4.4 Syndrome (SYND) Field ....................54
1.5.4 Performance Monitor Registers ....................55
1.6 TESTABILITY ....................56
1.6.1 IEEE 1149.1 ....................56
1.6.1.1 Boundary Scan ....................56
1.6.1.2 Internal Scan ....................56
1.6.1.3 BIST ....................56

1.7 ELECTRICAL SPECIFICATIONS ....................56
1.7.1 Power & Ground ....................56
1.7.2 Maximum Ratings ....................56
1.7.3 DC Specifications ....................56
1.7.4 AC Specifications ....................56
1.8 MECHANICAL SPECIFICATIONS ....................57
1.8.1 Package Information ....................57
1.8.2 Package Thermal Specifications ....................57
1.9 APPENDIX A - SIMM SIGNAL ROUTING ....................58

1 MEMORY DATA PATH (MDP)

1.1 INTRODUCTION

This specification describes a memory data path ASIC that is responsible for interfacing a DRAM array's data path to a high performance, 64 bit, split transaction bus. Up to two MDPs may be used for dual bus operation. It contains a set of registers for error logging and diagnostic testing.

1.1.1 Product Description

The key features of the Memory Data Path (MDP) are:

1. XA-MP Bus support
2. 64 bit wide EDAC
3. EDAC correction in one clock cycle
4. EDAC detects all triple errors in x4 DRAMs
5. 16-deep output read FIFO
6. 8-deep input write FIFO
7. Automatic read FLY-BY
8. Automatic identification of failing SIMMs
9. Supports IEEE 1149.1 scan

1.1.2 Revision History

The current version (0.0) is the first revision of this document.

1.1.3 References

1. "XA-MP Bus Target Specification" Revision 0.0
2. "Memory Controller Target Specification" Revision 0.0

1.2 FUNCTIONAL DESCRIPTION

The MDP provides the data connection between the XA-MP bus and the memory DRAM array under control of the MC (Memory Controller). The MDP, as shown in Figure 1-1 supports four interfaces: 1) a 128 bit wide data bus on the DRAM array side, 2) a 64 bit wide data path on the XA-MP Bus side, 3) an MDP/MC control bus and 4) a SCAN bus. The 128 bit data path on the DRAM array side will allow 2 128-bit transfers (each from different banks) to be multiplixed to the MDP. Within the MDP each transfer is again multiplexed resulting in 4 64-bit data transfers, one at each clock, for a cache line read.

The MDP has two sets of FIFO's for temporary data storage, one for Read cycles from DRAM and the other for Write cycles from the XA-MP bus. This dual FIFO structure allows for simultaneous data transfer activities on the XA-MP Bus side and the DRAM array side. The buffer management is completely handled by MC.

Figure 1-1 MDP Connections

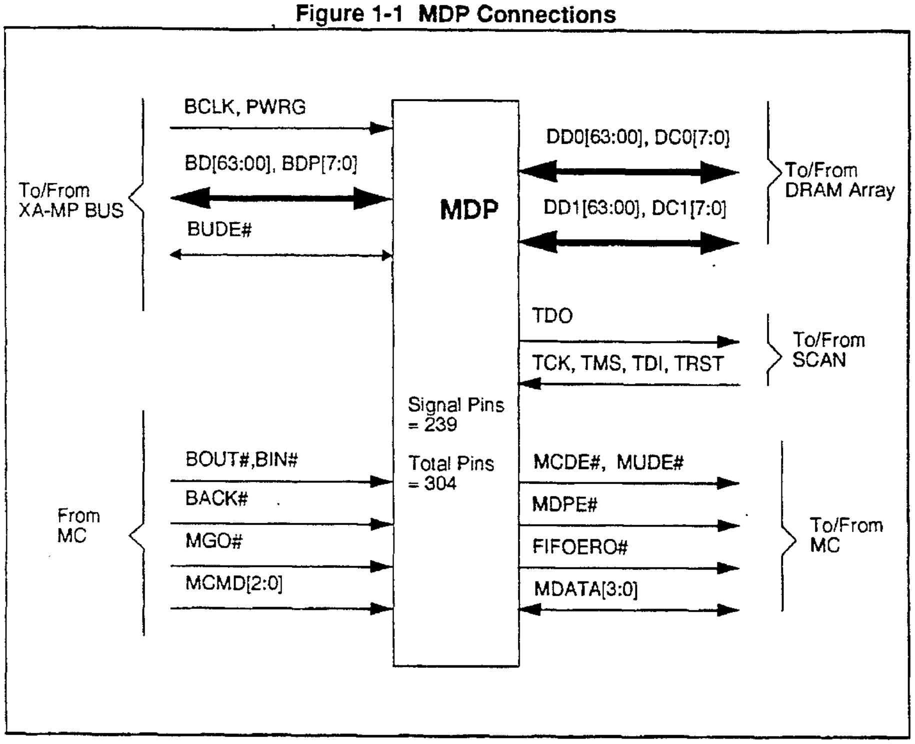

There are two types of Read data transfers that will be supported in this architecture:

1. Fly-By -- The Fly-By read data transfers take place when the Read FIFO is empty and the XA-MP Bus data lines are already granted to the MC. In this case, the data from the DRAM is sent immediately onto the XA-MP Bus bypassing the Read FIFO.
2. Buffered -- The Buffered data transfers take place when either the Read FIFO is not empty or the data cannot be immediately sent out onto the XA-MP Bus. This happens when the MC is not the next responding agent of the ordered response queue or the XA-MP data bus is not available due to a bus write cycle conflict.

The MDP supports an EDAC protection scheme on the DRAM array side. The Single Error Correction, Double, triple & quad errors in adjacent bits of a nibble Detection (SEC-DED-S4ED) scheme has been chosen for this architecture. This scheme has an extra 4-bit error detection capability than the normal modified Hamming SEC-DED EDAC scheme. This kind of EDAC scheme detects errors caused by faulty x4 type DRAM chips.

The MDP supports bus-word writes to the memory. In this mode, any non 64-bit bus-word write triggers a read modify write operation for merging the data to recompute the new EDAC check bits.

1.2.1 Block Diagram

The block diagram of the MDP is shown in Figure 6-2. As shown, the MDP is composed of the following 10 major blocks:

1. XA-MP Interface
2. DRAM Interface
3. EDAC Generator & Corrector
4. MDP Registers
5. Read Path
6. SCAN Control
7. State Machines
8. Visible Register Interface
9. Write Parity Generator
10. Write Path

1.2.1.1 XA-MP Interface

The XA-MP Interface is responsible for all MDP communications with the XA-MP bus. Operations include the following:

1. Register and error check input data from all Bus Word or Cache Line Write cycles.
2. Report data-in parity errors to the MC and itself under control of the MC.
3. Generate parity on all output data.
4. Send data and EDAC error signals to XA-MP bus under control of the MC.

1.2.2 DRAM Interface

The DRAM interface is responsible for all MDP communications with the on-board DRAM memory. Operations include the following:

1. Register double (128 bit) or single (64 bit) wide input data.
2. Multiplex the input data in proper sequence to the EDAC Generator and Corrector block.
3. Direct and send output data (64 bits) on the proper portion of the 128 bit output data bus.

Figure 1-2 MDP BLOCK DIAGRAM
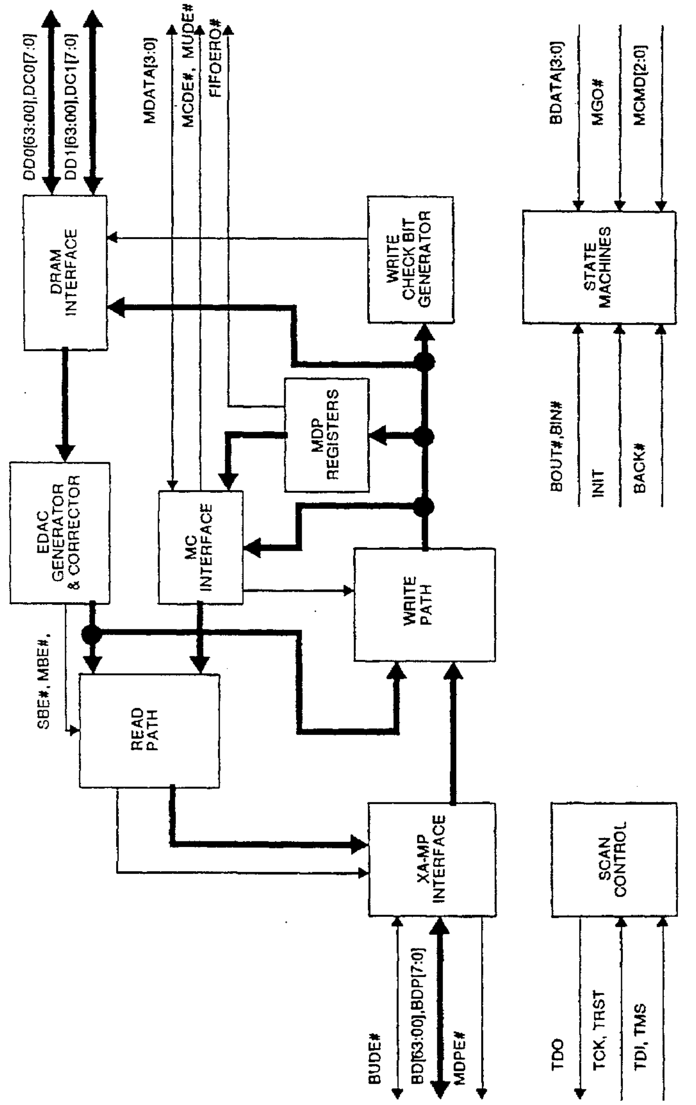
MDP BLOCK DIAGRAM

1.2.2.1 EDAC Generator & Corrector

The EDAC Generator & Corrector is responsible for detecting errors on input data received from the DRAM Interface. Operations include the following:

1. Generate syndrome bits from input data.
2. If no error, data is passed on unchanged.
3. If error is single bit, indicate Corrected Data Error and pass on corrected data.
4. If error is mutiple bit, indicate Uncorrected Data Error and pass on unchanged data.
5. If error, indicate syndromes in error status register.

1.2.2.2 MDP Registers

The MDP Registers block is responsible for loading and reading all MDP visible registers. Operations include the following:

1. Loading the selected MDP visible register from Write Path.
2. Sending the selected MDP visible register to Visible Register Interface.

1.2.2.3 MC Interface

The MC Interface is responsible for loading and reading all MC visible and control registers. Operations include the following:

1. Loading MC visible registers from the Write Path to the MC via MC/MDP 4-bit shift path.
2. Sending MC visible registers to Read Path from the MC via MC/MDP 4-bit shift path.
3. Loading MC control registers from MC via MC/MDP 4-bit control path.
4. Sending MDP control register to MC via MC/MDP 4-bit shift path.
5. Sending MDP visible registers to Read Path.

1.2.2.4 Read Path

The Read Path is responsible for DRAM input data and software visible register data until it is sent to the XA-MP Interface. Operations include the following:

1. Selection of DRAM or visible register input data.
2. Sending of data directly to the XA-MP Interface if in Fly-by mode.
3. Storage of data into Read FIFO if not in Fly-by mode.
4. Sending data from Read FIFO output to the XA-MP Interface under control of the MC.

1.2.2.5 SCAN Control

The SCAN Control is responsible for all SCAN interface operations.

1.2.2.6 State Machines

The State Machines are responsible for the proper operation of all the other MDP blocks. These include the following functions:

1. Write FIFO input.
2. Write FIFO output.
3. Write FIFO error.
4. Ouput to DRAM.
5. Output to registers (visible and control).
6. Input from DRAM.
7. Input from registers (visible and control).
8. Read FIFO input.
9. Read FIFO output
10. Read FIFO error
11. Input to write back buffer.

1.2.2.7 Write Check Bit Generator

The Write Check Bit Generator is responsible for sending check bits to the DRAM Interface. Operations include the following:

1. If normal mode, generate EDAC check bits.
2. If test mode, force EDAC check bits to preloaded value.

1.2.2.8 Write Path

The Write Path is responsible for XA-MP input data or write back data until it is sent to the DRAM or Visible Register Interface. Operations include the following:

1. Buffers XA-MP input data to Write FIFO.
2. Under control of the MC sends Write FIFO output to the Visible Register Interface.
3. Under control of the MC sends one of the following to the DRAM Interface:
    1. Write FIFO output only
    2. Mixed Write FIFO and Write Back Register (EDAC partial writes).
    3. Write Back Register only (Correction of single bit errors).
    4. One of three data patterns for internal BIST at initialization time.

1.2.3 Sub-blocks

TBS

1.3 PIN DESCRIPTION

The different sets of signals of the MDP are classified as follows:

1. XA-MP Bus Interface Pins
2. MC/MDP Interface Pins
3. DRAM Array Interface Pins
4. SCAN Interface Pins

1.3.1 XA-MP Bus Interface Pins

Table 1-1 XA-MP Bus Interface Pins

<table>
<tr><th>PIN NAME</th><th>Type</th><th>DESCRIPTION</th></tr>
<tr><td>BD[63:00]</td><td>I/O</td><td>Bus Data. A 64-bit data bus between the MDP and the XA-MP Bus.</td></tr>
<tr><td>BDP[7:0]</td><td>I/O</td><td>Bus Data Parity. These bits indicate even parity for each byte of data bus BD[63:00] according to the following table. These bits are valid at the same time as the data bus.
<table>
<tr><th>Data Bits</th><th>Parity Bit</th><th>Data Bits</th><th>Parity Bit</th></tr>
<tr><td>BD[63:56]</td><td>BDP[7]</td><td>BD[31:24]</td><td>BDP[3]</td></tr>
<tr><td>BD[55:48]</td><td>BDP[6]</td><td>BD[23:16]</td><td>BDP[2]</td></tr>
<tr><td>BD[47:40]</td><td>BDP[5]</td><td>BD[15:08]</td><td>BDP[1]</td></tr>
<tr><td>BD[39:32]</td><td>BDP[4]</td><td>BD[07:00]</td><td>BDP[0]</td></tr>
</table></td></tr>
<tr><td>BUDE#</td><td>I/O</td><td>Bus Uncorrected Data Error. An active low signal used to indicate the following:<br>1) When sent by the MDP this signal indicates:<br>1) The occurrence of a multiple bit EDAC error (even number of bit errors or triple bit error within a x4 DRAM).<br>2) A forced test UDE condition.<br>2) When recieved by the MDP. write data contains an error.</td></tr>
<tr><td>PWRG</td><td>I</td><td>Power Good</td></tr>
<tr><td>BCLK</td><td>I</td><td>Bus Clock. Frequency equals 33.3 Mhz.</td></tr>
<tr><td>75</td><td></td><td>TOTAL PINS</td></tr>
</table>

1.3.2 MC/MDP Interface Pins

Table 1-2 MC/MDP Interface Pins

| Signal Name | Type | Description |
|---|---|---|
| MCDE# | O | MC Corrected Data Error. An active low signal, from the MDP to MC, used to indicate the occurrence of a single bit EDAC error. |
| MUDE# | O | MC Uncorrected Data Error. An active low signal, from the MDP to MC, used to indicate the occurrence of:<br>1) a multiple bit EDAC error (even number of bit errors or triple bit error within a x4 DRAM).<br>2) write to a visible register receoved from XA-MP bus with a UDE. |
| MDPE# | O | MC Data Parity Error. An active low signal, from the MDP to the MC, used to indicate the occurrence a parity error detected on the data bus. |
| FIFOERO# | O | FIFO Error. An active low signal, from the MDP to MC, used to indicate the occurrence of a FIFO error. An error occurs when: 1) the Read or Write FIFO was empty and an operation was requested requiring FIFO data or 2) the READ or Write FIFO was full and an operation tried to put data into the FIFO.<br>RO. This pin also serves as the SCAN Ring Oscillator output. |
| MDATA[3:0] | I/O | MC DATA. A 4 -bit field used to transfer data between the MDP and MC. The content of this field is defined by the MCMD field and (MGO#). |
| BOUT# | I | Bus OUT. An active low signal, from the MC to the MDP, used to enable data from the MDP onto the XA-MP bus. |
| BIN# | I | Bus IN. An active low signal, from the MC to the MDP, used to enable data from the XA-MP bus into the MDP. |
| BACK# | I | Bus Acknowledge. An active low signal, from the MC to MDP, used to indicate:<br>1) Acknowledged write cycle to memory (valid cycle before ACK#).<br>2) Acknowledged write cycle still OK (valid cycle after ACK#). |
| MGO# | I | MC GO. An active low signal, from the MC to the MDP, used with the MCMD field to initiate various MDP/GLUE cycles. |
| MCMD[2:0] | I | MC Command. This 3-bit field is used to pass commands from the MC to the MDP. These command signals are valid when MGO# is active. |
| 15 | | TOTAL PINS |

Table 1-3: MGO# Commands

| Valid when MGO# is low | | |
|---|---|---|
| **MCMD[2:0]** | **FUNCTION** | **MDATA[3:0]** |
| 000 | DRAM - All Reads | Data from MC to MDP<br>With command<br>MDATA[0] = Left/Right data word bit<br>MDATA[1] = Single/Double data word bit<br>MDATA[3:2] = Cycle type bits<br>when 0,1 or 2, errors are sent to MC and are recorded in YSR/RSR<br>when 3, errors are sent to MC, but are not recorded in YSR/RSR<br>MDATA[3:0] = 0 = Read Single Left<br>MDATA[3:0] = 1 = Read Single Right<br>MDATA[3:0] = 2 = Read Double Left<br>MDATA[3:0] = 3 = Read Double Right<br>MDATA[3:0] = 4 = Partial WBW Single Left<br>MDATA[3:0] = 5 = Partial WBW Single Right<br>MDATA[3:0] = 6 = Not supported<br>MDATA[3:0] = 7 = Not supported<br>MDATA[3:0] = 8 = Alpha Single Left<br>MDATA[3:0] = 9 = Alpha Single Right<br>MDATA[3:0] = A = BIST Double Left<br>MDATA[3:0] = B = BIST Double Right<br>MDATA[3:0] = C = Correction/Alpha Single Left<br>MDATA[3:0] = D = Correction/Alpha Single Right<br>MDATA[3:0] = E = Not supported<br>MDATA[3:0] = F = Not supported<br>Cycle after command<br>MDATA[2:0] = SIMM #<br>MDATA[3] = Reserved |
| 001 | DRAM - Write Full Bus Word<br><br>(Used for DRAM WCL and full WBW or BIST/XBIST WCL) | Data from MC to MDP<br>With command<br>MDATA[0] = 0 = Left data word<br>MDATA[0] = 1 = Right data word<br>MDATA[3:1] = Reserved |
| 010 | DRAM - Write Left<br>(DD1[63:00] / DC1[7:0])<br><br>(Used for partial WBW, alpha or correction cycles) | Data from MC to MDP<br>With command<br>MDATA[3:0] = LANES[7:4]<br>Next cycle<br>MDATA[3:0] = LANES[3:0]<br>Where:<br>1 = write<br>0 = no write |

Table 1-3: MGO# Commands (Continued)

| Valid when MGO# is low | | |
|---|---|---|
| MCMD[2:0] | FUNCTION | MDATA[3:0] |
| 011 | DRAM - Write Right (DD0[63:00] / DC0[7:0])<br><br>(Used for partial WBW, alpha or correction cycles) | Data from MC to MDP<br>With command<br>MDATA[3:0] = LANES[7:4]<br>Next cycle<br>MDATA[3:0] = LANES[3:0]<br>Where:<br>1 = write<br>0 = no write |
| 100 | Registers<br><br>MDATA decodes:<br><br>0-5 require no shifting<br><br>6-A require Shift-in before command<br><br>C-E require Shift-out after command | Data from MC to MDP<br>MDATA[3:0] = 0 = Read Software config reg<br>MDATA[3:0] = 1 = Read Error status reg<br>MDATA[3:0] = 2 = Read YDE SIMM reg<br>MDATA[3:0] = 3 = Read RDE SIMM reg<br>MDATA[3:0] = 4 = Load Software config reg<br>MDATA[3:0] = 5 = Load Reserved reg [a]<br>MDATA[3:0] = 6 = Load Data Parity Ctl<br>MDATA[3:0] = 7 = Load Mode 0 Ctl<br>MDATA[3:0] = 8 = Load Mode 1 Ctl<br>MDATA[3:0] = 9 = Read MC reg<br>MDATA[3:0] = A = Load Phase LEDs<br>MDATA[3:0] = B = Reserved<br>MDATA[3:0] = C = Load MC reg<br>MDATA[3:0] = D = Read MDP Config reg<br>MDATA[3:0] = E = Read External<br>MDATA[3:0] = F = Reserved |
| 101 | Shift-in | Data from MC to MDP or GLUE |
| 110 | Shift-out | Data from MDP or GLUE to MC |
| 111 | XAMP Bus Initialize | Not used |

a. Used to increment write fifo output pointer for a write to a Reserved Visible Register.

1.3.3 DRAM Array Interface Pins

Table 1-4 DRAM Array Interface Pins

| Pin Name | Type | DESCRIPTION |
|---|---|---|
| DD0[63:00] | I/O | DRAM Data 0. A 64-bit data bus between the DRAM array and the MDP. This bus represents the LS 64 bits of a 128 bit field. |
| DC0[7:0] | I/O | DRAM Check-bit 0. An 8-bit EDAC check bit bus, for DD0[63:00], between the DRAM array and the MDP. |

Table 1-4 DRAM Array Interface Pins (Continued)

| Pin Name | Type | DESCRIPTION |
|---|---|---|
| DD1[63:00] | I/O | DRAM Data 1. A 64-bit data bus between the DRAM array and the MDP. This bus represents the MS 64 bits of a 128 bit field. |
| DC1[7:0] | I/O | DRAM Check-bit 1. An 8-bit EDAC check bit bus, for DD1[63:00], between the DRAM array and the MDP. |
| 144 | | TOTAL PINS |

1.3.4 SCAN Interface Pins

Table 1-5 SCAN Interface Pins

| Signal Name | Type | Description |
|---|---|---|
| TCK | I | Test Clock into the MDP. |
| TMS | I | Serial Test Mode Select |
| TDI | I | Serial Test Data Input |
| TDO | O | Serial Test Data Output |
| TRST | I | Test Reset |
| 5 | | TOTAL PINS |

1.3.5 Pin Assignments

Table 1-6 Pin Summary

| | | |
|---|---|---|
| 75 | | XA-MP Bus Interface Pins |
| 15 | | MC/MDP Interface Pins |
| 144 | | DRAM Array Interface Pins |
| 5 | | SCAN Interface Pins |
| 239 | 239 | TOTAL MDP SIGNAL PINS |
| | 65 | Power and Grounds (27.2% of signals) |
| | 304 | GRAND TOTAL - MDP PINS |

1.4 OPERATION

The following sections listed below describe the operation of the MDP:

1. XA-MP Bus Interface
2. MDP/MC Interface
3. DRAM Array Interface
4. SCAN Interface

1.4.1 XA-MP Bus Interface

The MDP participates in bus write and read response cycles under control of the MC.

1.4.1.1 Write Cycles

Write cycles supported by the MDP include WBW(L) and WCL. These stand alone cycles are shown in Figure 1-3 and Figure 1-4, while various sequences of these cycles are shown in Figure 1-5 thru Figure 1-8.

Figure 1-3 Single WBW
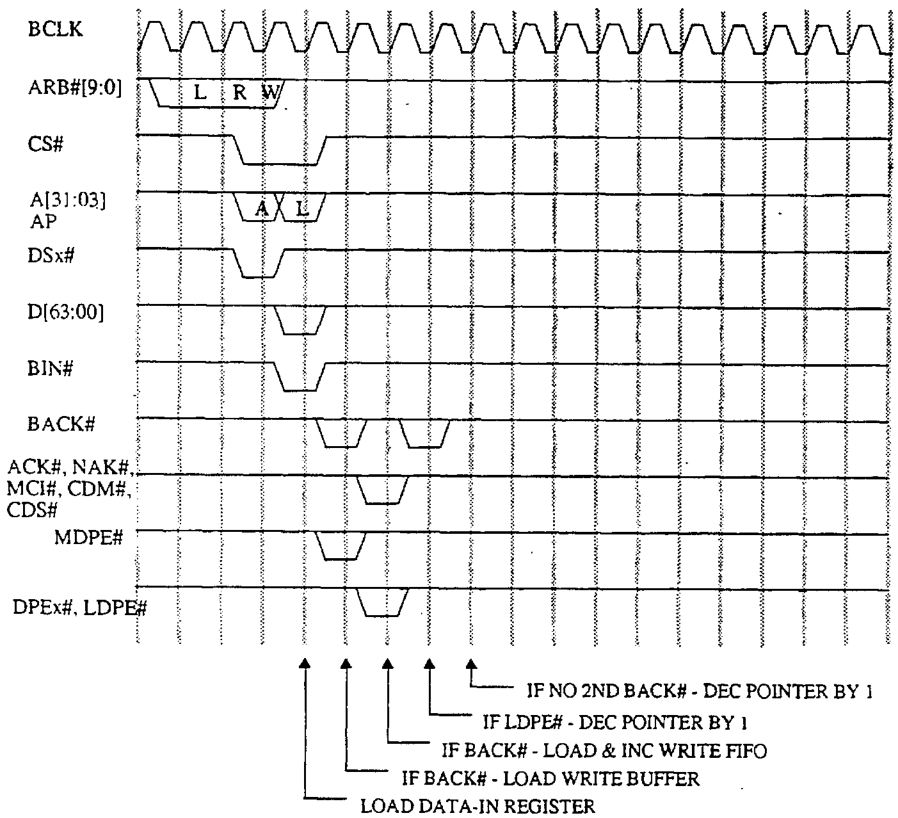

Figure 1-4 Single WCL
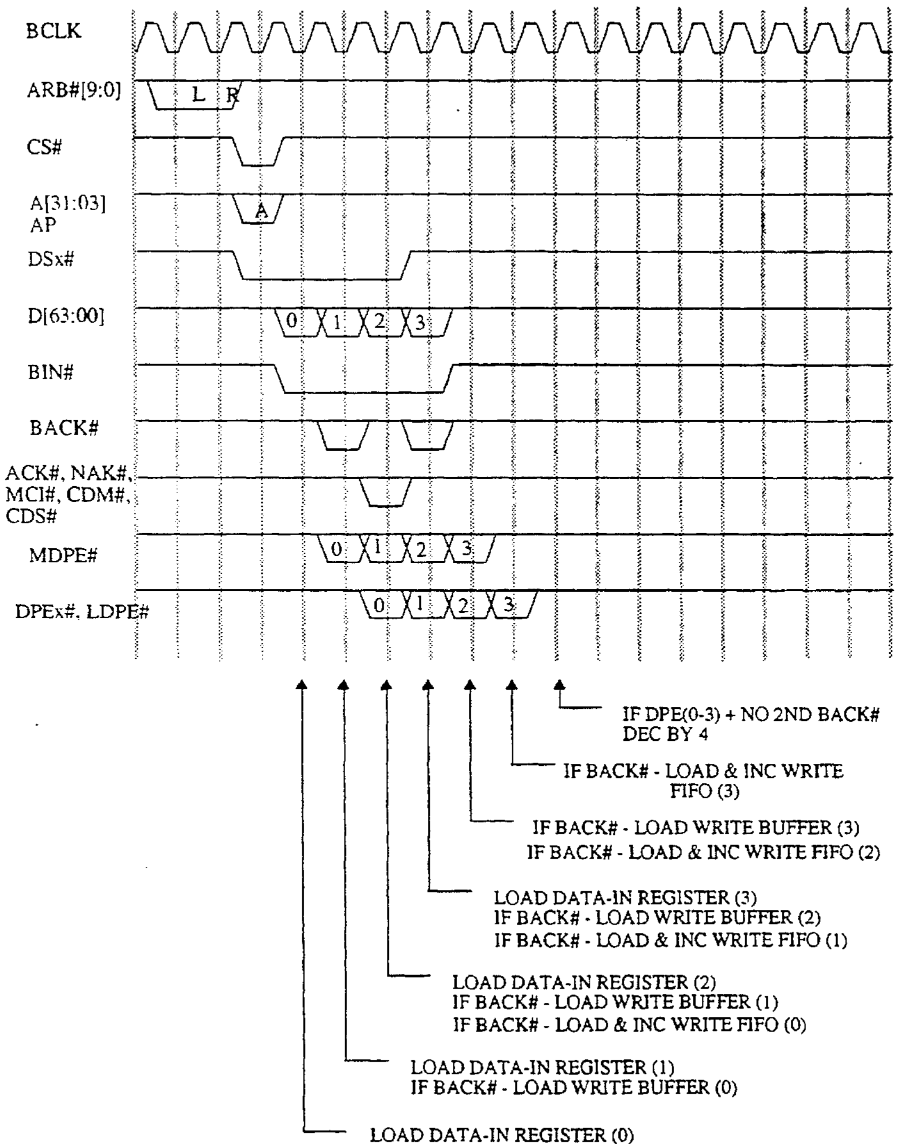

Figure 1-5 WBW WBW
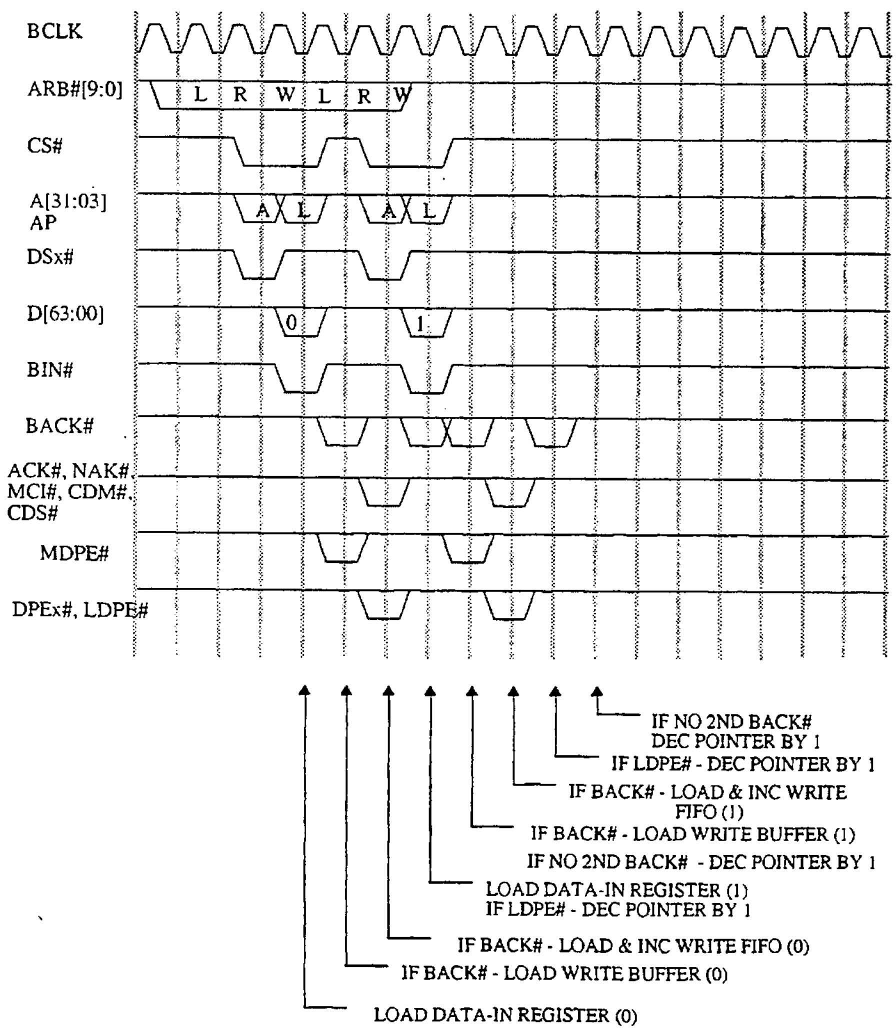

Figure 1-6 WBW WCL
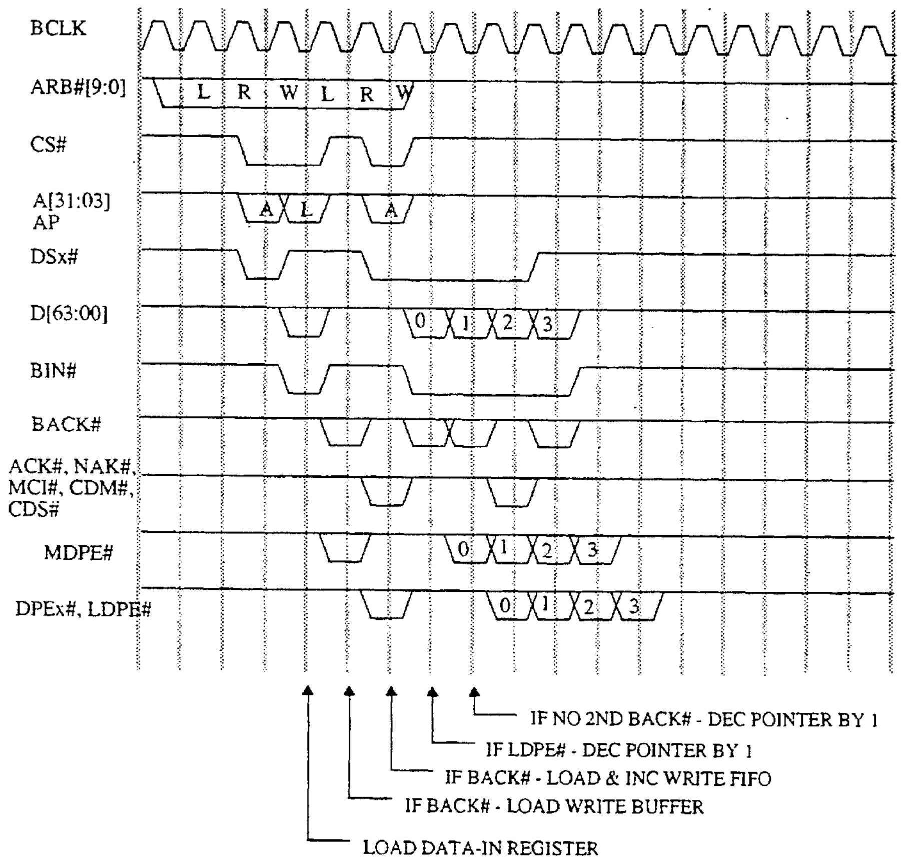

Figure 1-7 WCL WBW
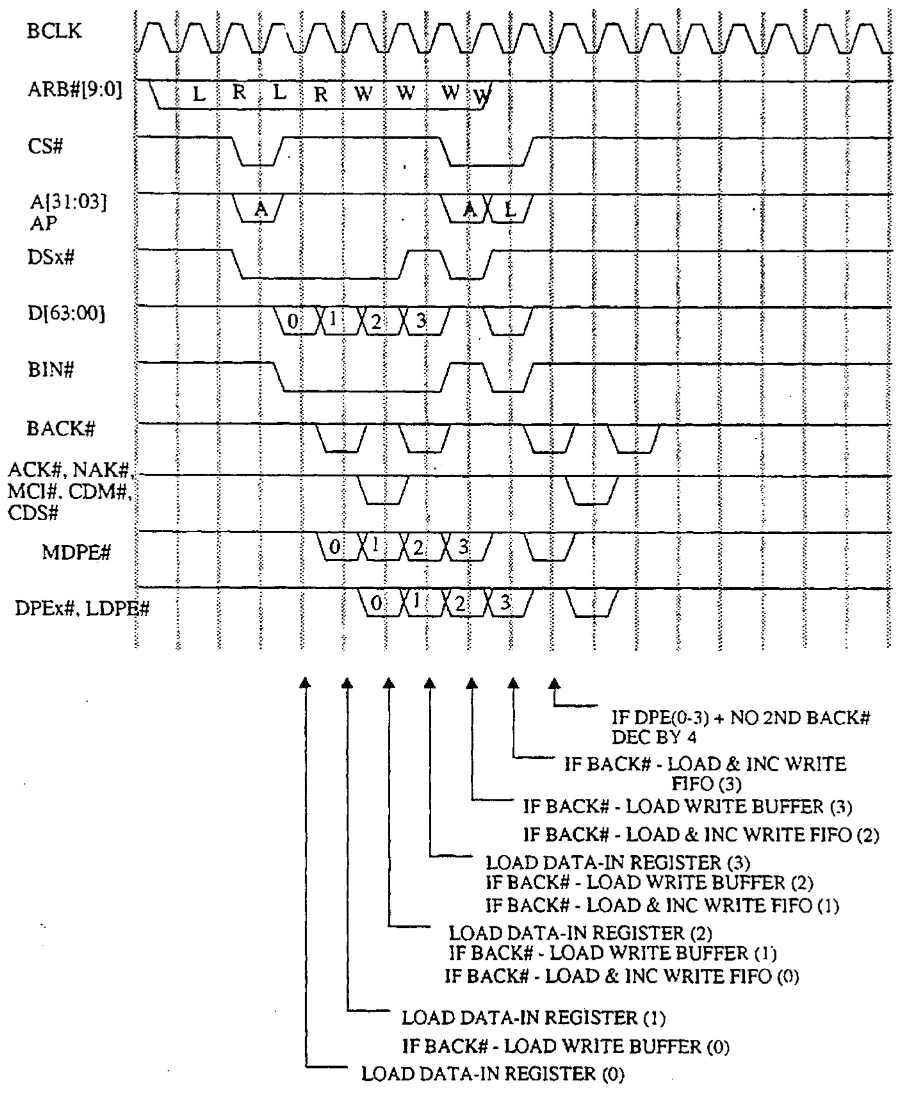

Figure 1-8 WCL WCL
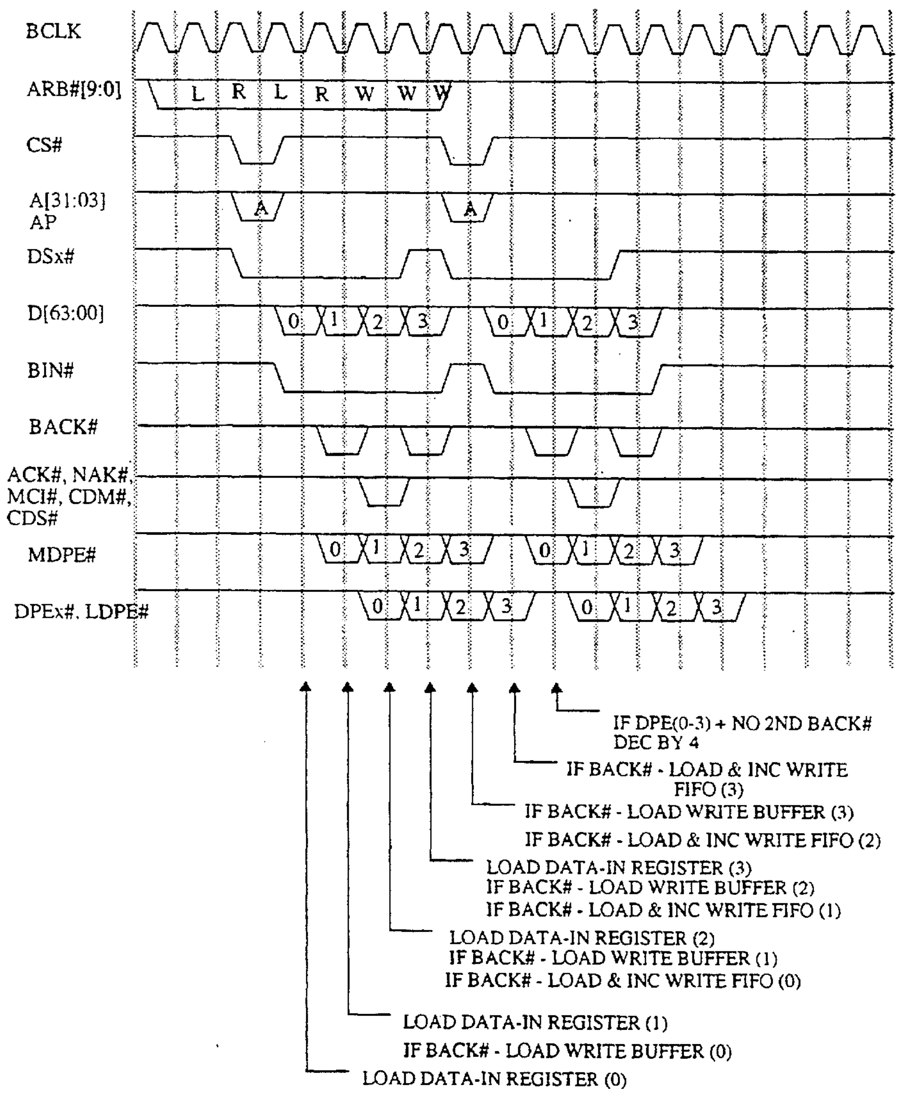

1.4.1.2 Read Response Cycles
Read response cycles supported by the MDP include responses to RBW, RCL and RIL. These stand alone cycles are shown in Figure 1-9 and Figure 1-10. For a description of FLY-BY see DRAM Interface section.
Figure 1-9 Response to RBW.
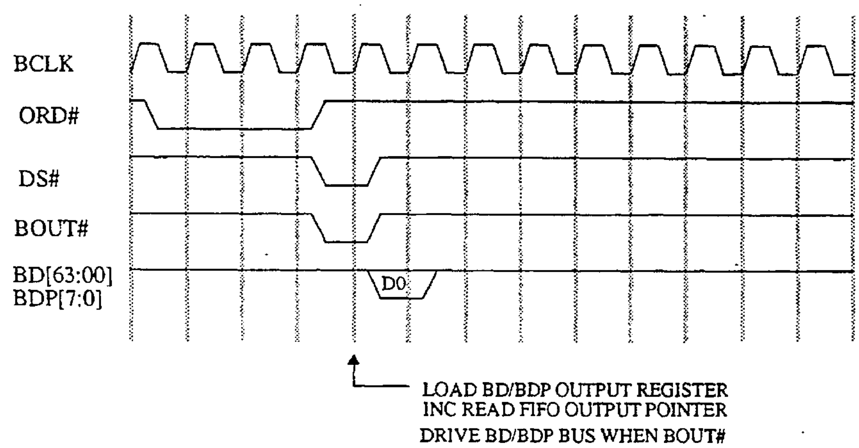

Figure 1-10 Response to RCL
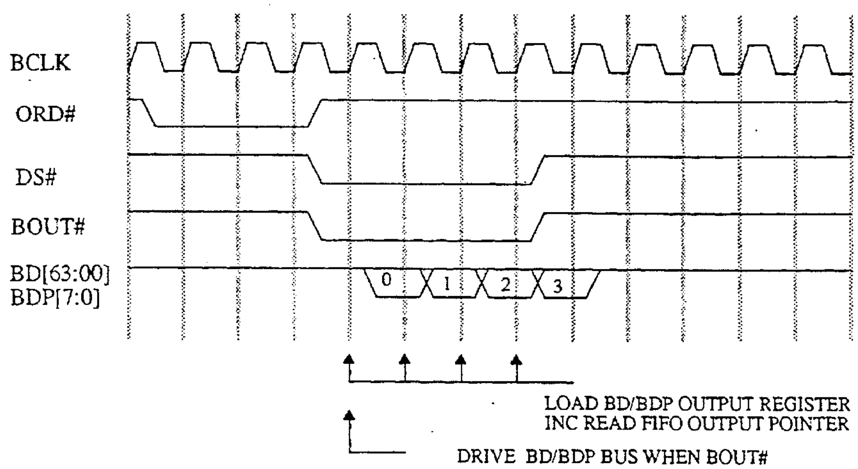

1.4.2 . MDP/MC Interface

The MDP/MC interface is used to:

1. Pass initialization/test information between MC and MDP.
2. Pass board information to the MC (MDP does not participate).
3. Pass MC information to the board (MDP does not participate).
4. Control data to/from the MDP and XA-MP bus.
5. Control data to/from the MDP and DRAM array.
6. Pass MC memory mapped register contents to/from the MDP.
7. Pass error signals from the MDP to the MC.

This interface consists of 15 signals composed of:

1. 7 control signals (MC to MDP).
2. 4 bi-directional data signals.
3. 4 error signals (MDP to MC).

1.4.2.1 Control Registers

Five control registers are used for passing information between the MDP and MC chips. These registers are: the MDP Configuration, the Mode 0 thru 2 Control and the Data Parity Control.

1.4.2.1.1 MDP Configuration Register

This 4-bit register is used to pass configuration information from the MDP to the MC.

Table 1-7 MDP Configuration Register

| 03 | 02 | 01 | 00 |
|---|---|---|---|
| WFS1 | WFS0 | RFS1 | RFS0 |

1.4.2.1.1.1 Write FIFO Size (WFS) Field

This 2-bit field is used to indicate the size of the MDP Write FIFO in cache line increments.

1.4.2.1.1.2Read FIFO Size (RFS) Field

This 2-bit field is used to indicate the size of the MDP Read FIFO in cache line increments.

Table 1-8 MDP Configuration Register Bit Definitions

| Bit Field | Bit Setting | Operating Mode |
|---|---|---|
| RFS[1:0] | 0h | 1 Cache Line |
| | 1h | 2 Cache Lines |
| | 2h | 4 Cache Lines |
| | 3h | 8 Cache Lines |
| WFS[1:0] | 0h | 1 Cache Line |
| | 1h | 2 Cache Lines |
| | 2h | 4 Cache Lines |
| | 3h | 8 Cache Lines |

1.4.2.1.2 Mode 0 Control Register

This 8-bit register is used to pass Mode control information from the MC to the MDP. It is delivered to the MDP in two consecutive clock cycles. Bit 03 of the first cycle is dynamic and is cleared to zero once the specified operation is initiated. Bits 03 thru 00 of the second cycle are static and must be reloaded to affect the MDP. This register is initialized only by a XAMP bus initialize.

Table 1-9 Mode 0 Control Register

| 03 | 02 | 01 | 00 | |
|---|---|---|---|---|
| INIT | RSV | | | First cycle |
| SEN | FDP1 | FDP0 | BIST | Second cycle |

1.4.2.1.2.1 Initialize (INIT)

This bit is used to provide a local initialize, independent of the XAMP Bus initialize, to the MDP. It is sourced by the INIT bit from the MC Clears Register.

1.4.2.1.2.2 Slice Enable (SEN)

This bit is used to indicate if the memory module is enabled or disabled. If disabled, writes are not permitted to its Software Configuration Register.

1.4.2.1.2.3 Force Data Pattern (FDP) Field

This 3-bit field is used to force various data patterns in the MDP for DRAM write cycles while in BIST mode.

1.4.2.1.2.4 Built In Self Test (BIST)

This bit is used to put the MDP into BIST mode. It has no effect on reading/writing visible registers. However, during DRAM write cycles it forces a selectable write pattern to memory and during DRAM read cycles it prevents loading of the read fifo.

Table 1-10 Mode 0 Control Register Bit Definitions

| Bit Field | Bit Setting | Operating Mode |
|---|---|---|
| BIST | 0 | Normal mode - Initialize state |
| | 1 | BIST mode |
| FDP[1:0] | 0h | Write Back Register data. BIST = X - Initialize state |
| | 1h | Force all bytes to a 5Ah pattern if BIST =1 |
| | 2h | Force all bytes to a A5h pattern if BIST = 1 |
| | 3h | Force all bytes to a 00h pattern if BIST = 1 |
| INIT | 0 | No Initialize |
| | 1 | Initialize Slice |
| SEN | 0 | Slice Disabled - Initialize state |
| | 1 | Slice Enabled |

1.4.2.1.3 Mode 1 Control Register

This 4-bit register is used to pass Mode control information from the MC to the MDP. These bits are dynamic and are cleared to zero once the specified operation is initiated. This register is initialized only by a XAMP bus initialize.

Table 1-11 Mode 1 Control Register

| 03 | 02 | 01 | 00 |
|---|---|---|---|
| RSV | CLRY | CLRR | CLRU |

1.4.2.1.3.1 Clear Yellow (CLRY)

This bit is used to clear register bits associated with the reporting of SLEY errors.

1.4.2.1.3.2 Clear Red (CLRR) register bits

This bit is used to clear register bits associated with the reporting of SLER errors.

1.4.2.1.3.3 Clear UDE (CLRU) register bits

This bit is used to clear register bits associated with the reporting of UDE errors.

Table 1-12 Mode 1 Control Register Bit Definitions

| Bit Field | Bit Setting | Operating Mode |
|---|---|---|
| CLRR | 0 | No clear - Initialize state |
| | 1 | Clear the following:<br>Error Status Register [15:12]<br>RDE SIMM Register |
| CLRU | 0 | No clear - Initialize state |
| | 1 | Clear the following:<br>RDE SIMM Register |
| CLRY | 0 | No clear - Initialize state |
| | 1 | Clear the following:<br>Error Status Register [11:00]<br>YDE SIMM Register |

1.4.2.1.4 Data Parity Control Register

This 8-bit register is used to pass data parity and UDE control information from the MC to the MDP. It is delivered to the MDP in two consecutive clock cycles. This register is initialized only by a XAMP bus onitialize.

Table 1-13 Data Parity Control Register

| 03 | 02 | 01 | 00 | |
|---|---|---|---|---|
| FUDE | Reserved | | | First cycle |
| FODP | B[2:0] | | | Second cycle |

1.4.2.1.4.1 Force UDE (FUDE)

This bit, when set, will cause the MDP to send a UDE with its next XAMP bus ordered response. This bit is dynamic and is cleared by the MDP once the operation is initiated.

1.4.2.1.4.2 Force ODD Data Parity (FODP)

This bit, when set, will cause the MDP to force odd parity on the byte specified by the B field when sending its next XAMP bus ordered response. This bit is dynamic and is cleared by the MDP once the operation is initiated.

1.4.2.1.4.3 Byte (B) Field

This 3-bit field indicates which data byte should generate ODD parity. This field is valid only when FODP is set, else it is a don't care.

Table 1-14 Data Parity Control Register Bit Definitions

| Bit Field | Bit Setting | Operating Mode |
|---|---|---|
| B[2:0] | 000 - 111 | Byte 0 (BDP[0]) thru byte 7 (BDP[7]). |
| FODP | 0 | Generate EVEN parity on all bytes - Initialize state. |
| | 1 | Force ODD parity on byte specified by B field for next ordered response. |

Table 1-14 Data Parity Control Register Bit Definitions

| Bit Field | Bit Setting | Operating Mode |
|---|---|---|
| FUDE | 0 | No effect on BUDE - Initialize state. |
| | 1 | Force BUDE 'on' for next ordered response. |

1.4.2.2 MGO# Timing

This section describes all the MGO# timing cycles for the MDP/MC interface which includes the following areas:

1. XAMP Bus Initialize
2. Non-Shift Register Register Cycles
3. Shift-In Register Cycles
4. Shift-Out Register Cycles

1.4.2.2.1 XAMP Bus Initialize

Figure 1-11 XAMP Bus Initialize

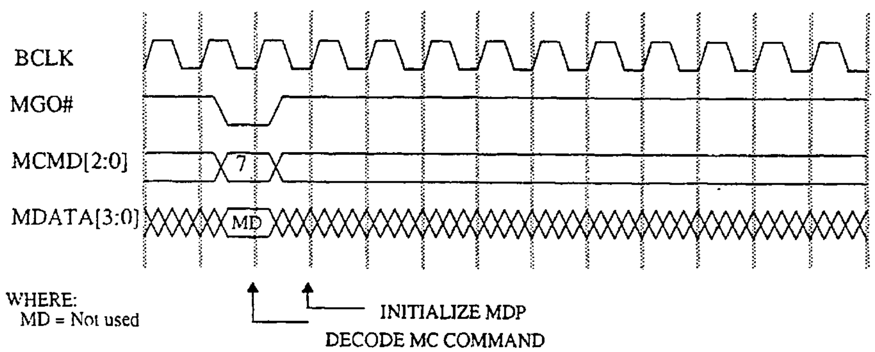

1.4.2.2.2 Non-Shift Register Cycles

This group of register cycles does not involve the transfer of data between the MC/MDP.

Figure 1-12 Read MDP Register

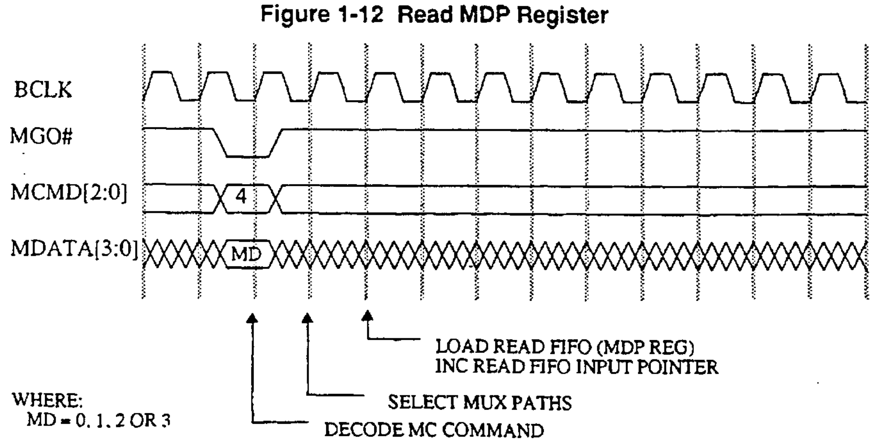

Figure 1-13 Load Software Configuration Register
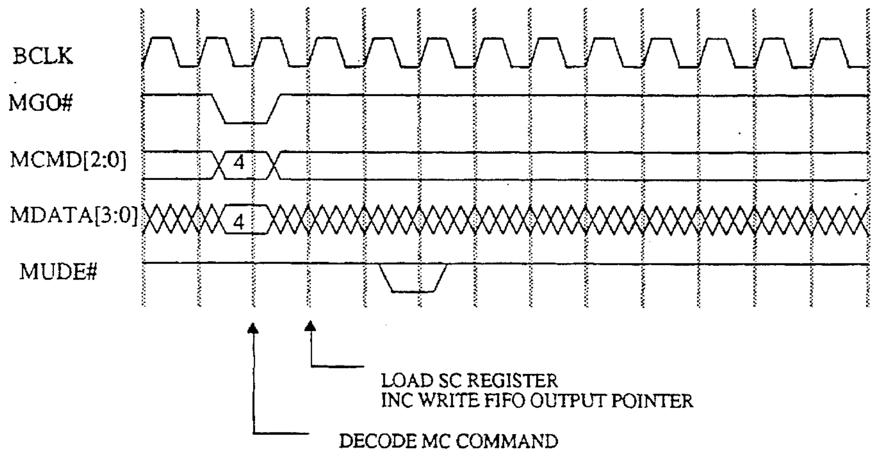
Figure 1-14 Load Reserved Register
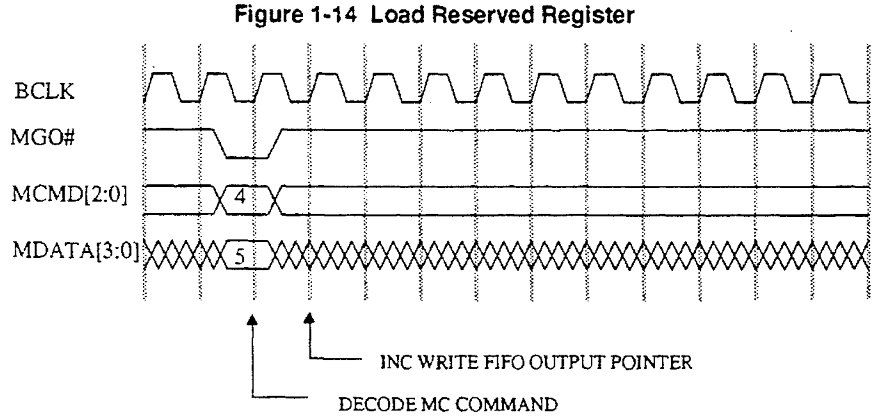

1.4.2.2.3 Shift-In Register Cycles
This group of register cycles requires data to be transfer from the MC to the MDP/GLUE before the register command is issued.
Figure 1-15 Load Data Parity Control/Mode 0 Control Registers
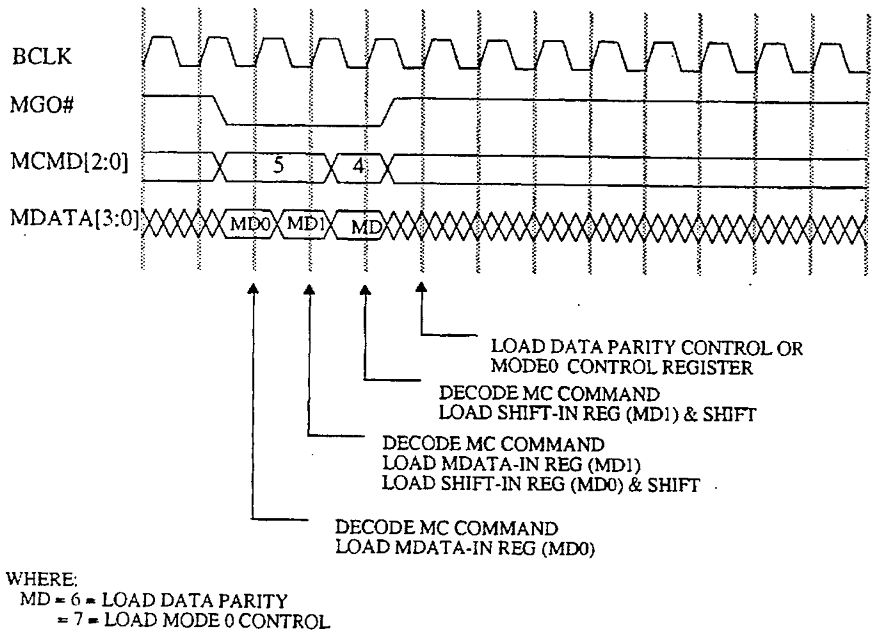

Figure 1-16 Load Mode 1 Control Register
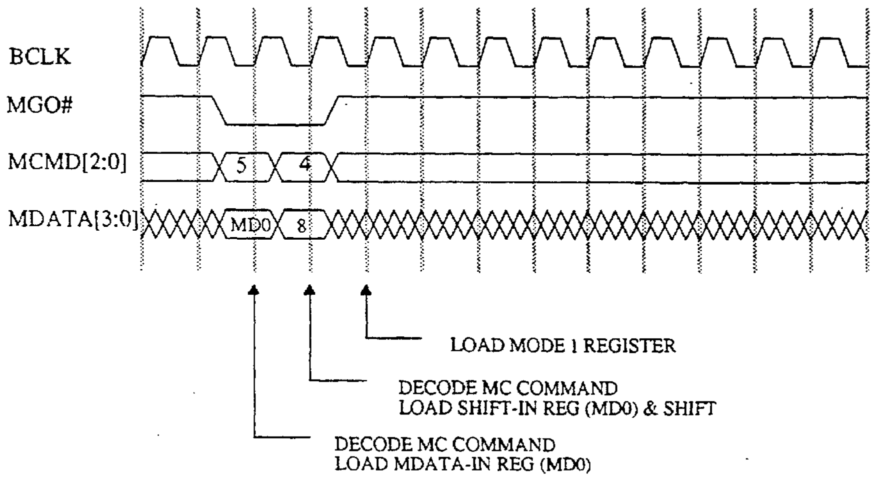

Figure 1-17 Read MC Register
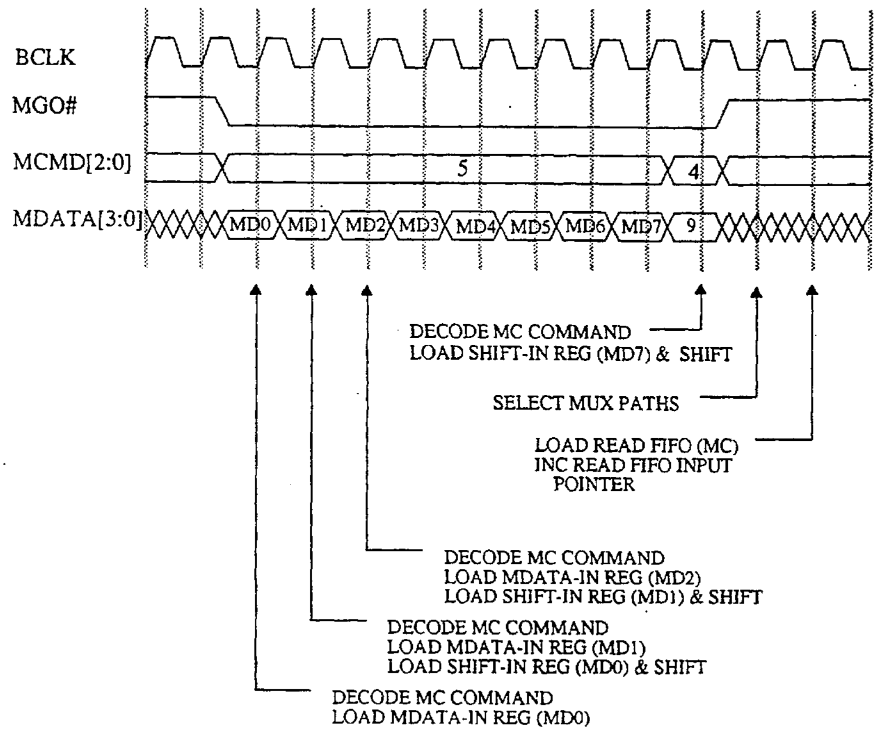

Figure 1-18 Load Phase LEDs (MDP not involved)
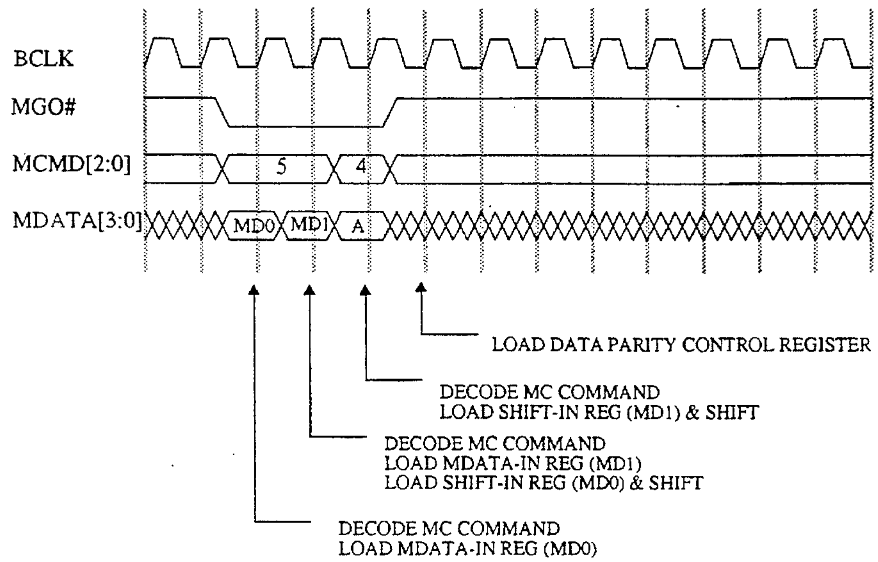

1.4.2.2.4 Shift-Out Register Cycles
This group of register cycles requires data to be transfer from the MDP/GLUE to the MC after the register command is issued.
Figure 1-19 Load MC Register
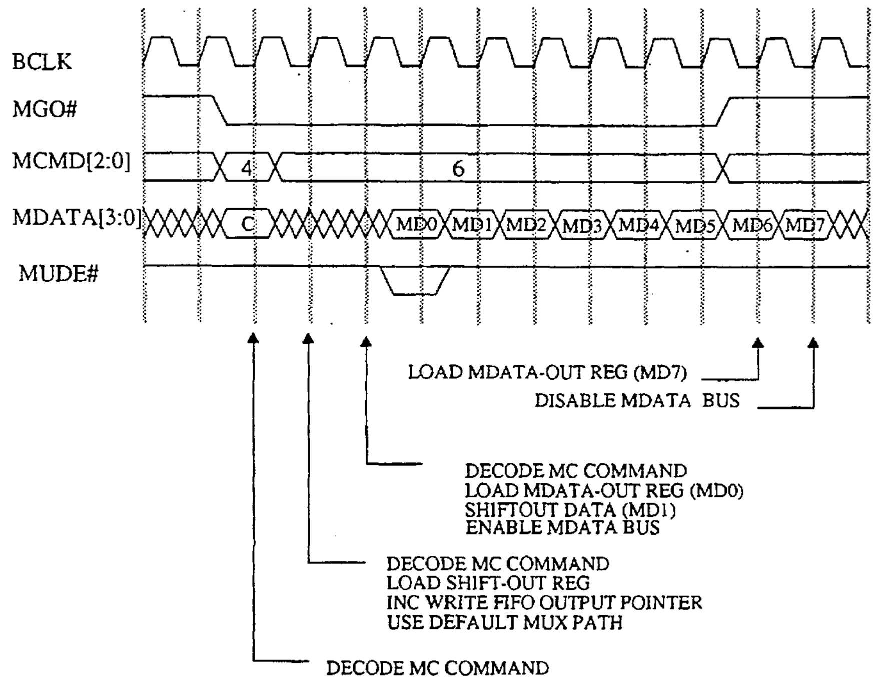

Figure 1-20 Read MDP Configuration Register
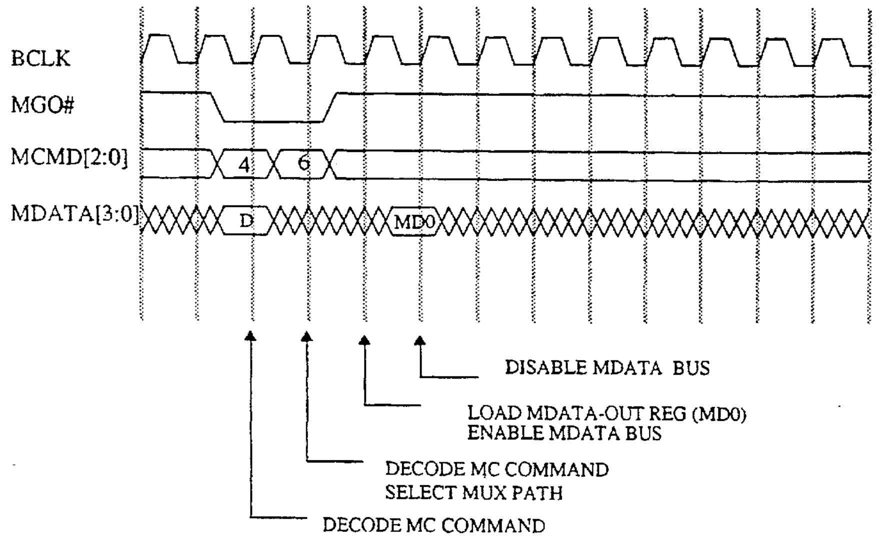

Figure 1-21 Read External (MDP not involved)
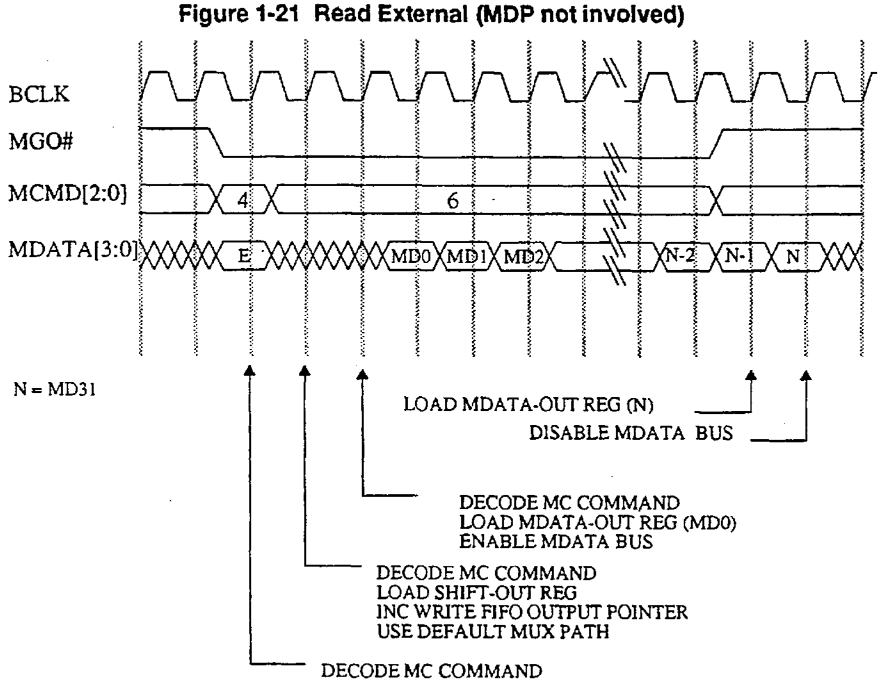

1.4.2.3 DRAM Array Interface

This section describes all the MGO# timing cycles for the DRAM interface which includes the following areas:

1. DRAM Reads
2. DRAM Writes

1.4.2.3.1 DRAM Reads

This section describes DRAM read cycles controlled by MGO# from the MC. DRAM Read cycles are shown in Figure 1-22 and Figure 1-23. The first figure shows Read DRAM Single Word cycles occurring back to back. The next figure shows a quad word DRAM data arrival, in support of a RCL or RIL response cycle. No FLY-BY vs FLY-BY cycles for RBW and RCL are shown in Figure 1-24 thru Figure 1-27.

Figure 1-22 Read DRAM Single Word (RBW) Back to Back

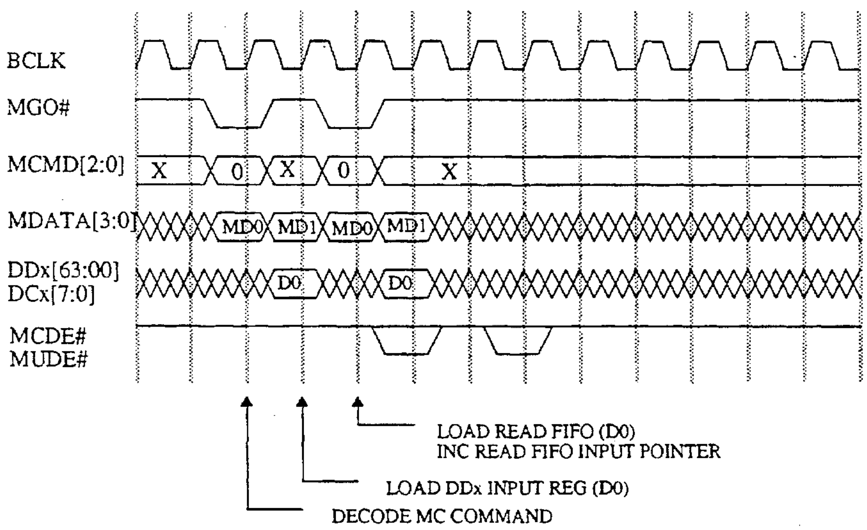

Figure 1-23 Read DRAM Quad Word (RCL)
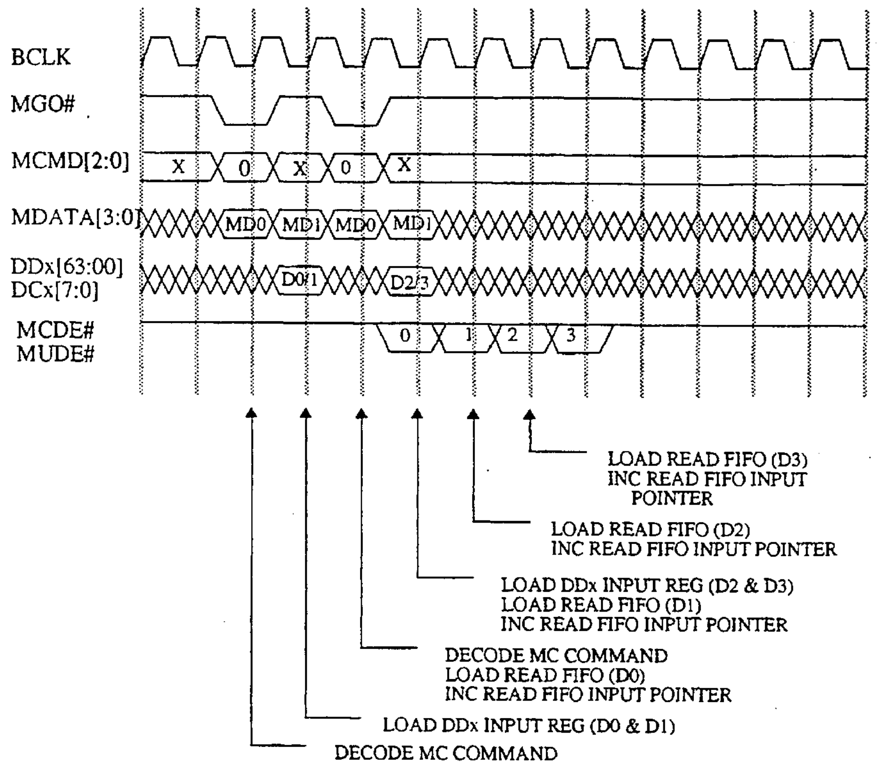

Figure 1-24 Response to RBW (No FLY-BY)
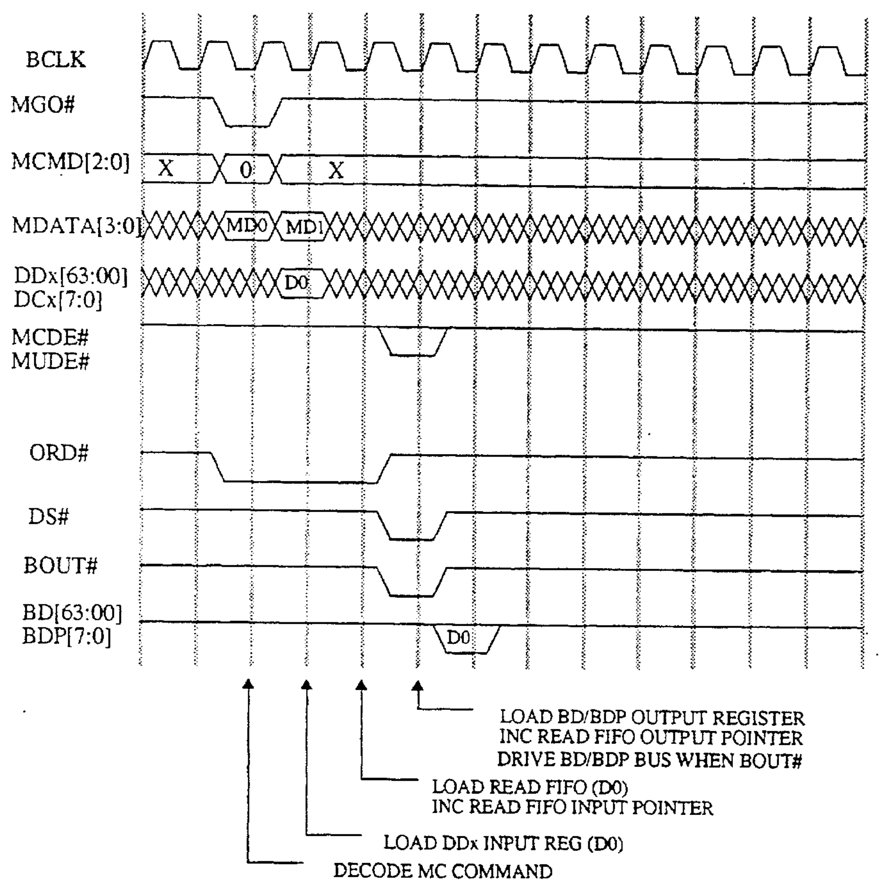

Figure 1-25 Response to RBW (FLY-BY)
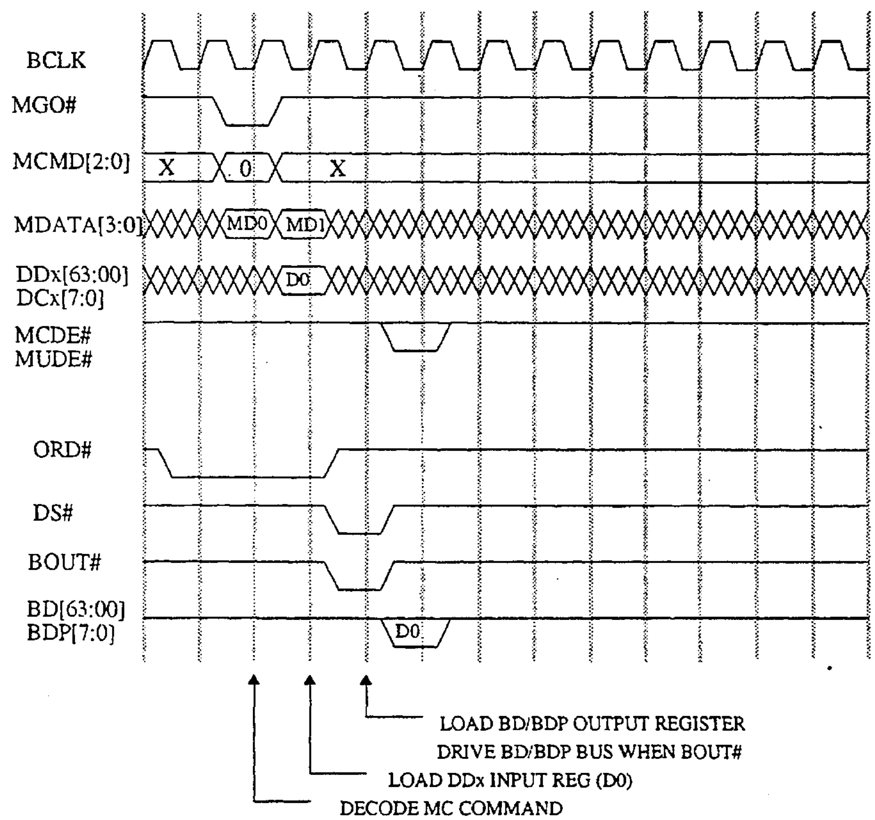

Figure 1-26 Response to RCL (No FLY-BY)

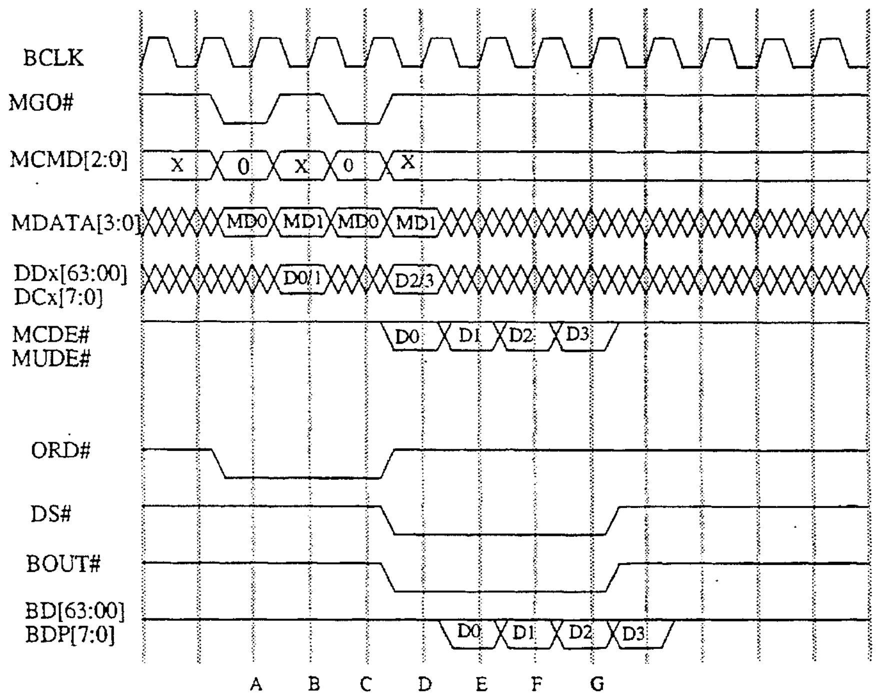

A = DECODE MC COMMAND
B = LOAD DDx INPUT REG (D0 & D1)
C = DECODE MC COMMAND
LOAD READ FIFO (D0) & INC READ FIFO INPUT POINTER
D = LOAD DDx INPUT REG (D2 & D3)
LOAD READ FIFO (D1) & INC READ FIFO INPUT POINTER
LOAD BD/BDP OUTPUT REG (D0) & INC READ FIFO OUTPUT POINTER
DRIVE BD/BDP BUS WHEN BOUT#
E = LOAD READ FIFO (D2) & INC READ FIFO INPUT POINTER
LOAD BD/BDP OUTPUT REG (D1) & INC READ FIFO OUTPUT POINTER
F = LOAD READ FIFO (D3) & INC READ FIFO INPUT POINTER
LOAD BD/BDP OUTPUT REG (D2) & INC READ FIFO OUTPUT POINTER
G = LOAD BD/BDP OUTPUT REG (D3) & INC READ FIFO OUTPUT POINTER

Figure 1-27 Response to RCL (FLY-BY)
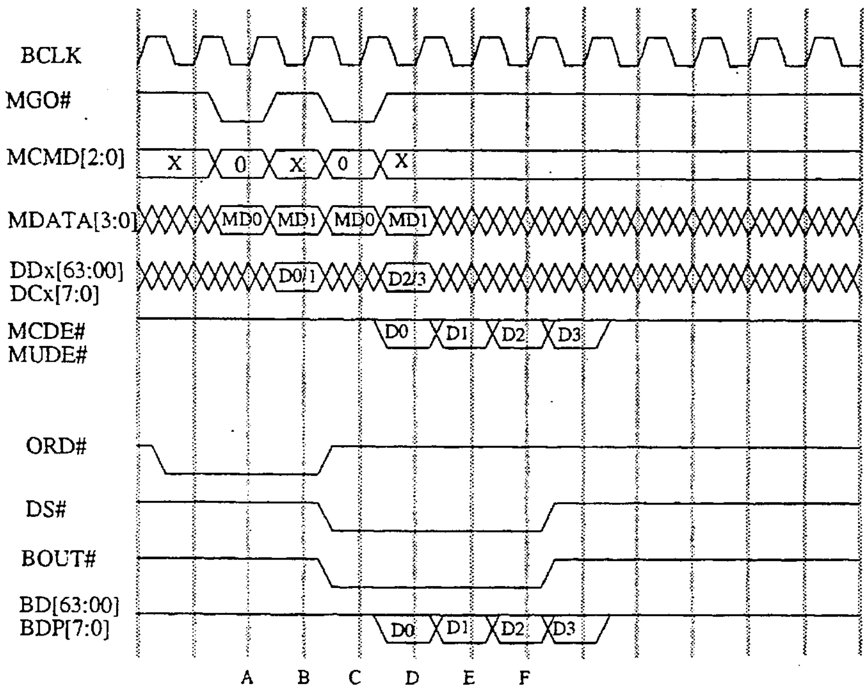
A = DECODE MC COMMAND
B = LOAD DDx INPUT REG (D0 & D1)
C = DECODE MC COMMAND
LOAD BD/BDP OUTPUT REG (D0)
DRIVE BD/BDP BUS WHEN BOUT#
D = LOAD DDx INPUT REG (D2 & D3)
LOAD BD/BDP OUTPUT REG (D1)
E = LOAD BD/BDP OUTPUT REG (D2)
F = LOAD BD/BDP OUTPUT REG (D3)

1.4.2.3.2 DRAM Writes

This section describes DRAM write cycles controlled by MGO# from the MC. Write DRAM Left cycles are shown in Figure 1-28 thru Figure 1-30 for various widths of MGO#. Figure 1-31 shows back to back Write DRAM Left cycles using a MGO# width of 2 clocks. Similar figures would also apply to Write DRAM Right cycles. Write DRAM Full Bus Word left cycles are shown in Figure 1-31 thru Figure 1-31 for various widths of MGO#. Figure 1-31 shows a WCL cycle, using the Full Bus Word cycles with a MGO# width of 2 clocks, starting with a left word first. Similar figures would also apply to WCL cycles starting with a right word first.

Figure 1-28 Write DRAM Left [width = 1 clock]

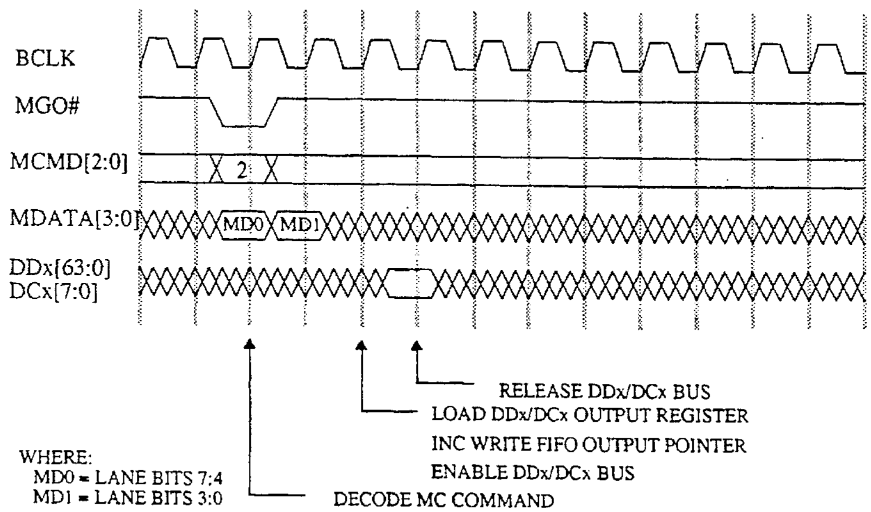

Figure 1-29 Write DRAM Left Extended [width = 2 clocks]
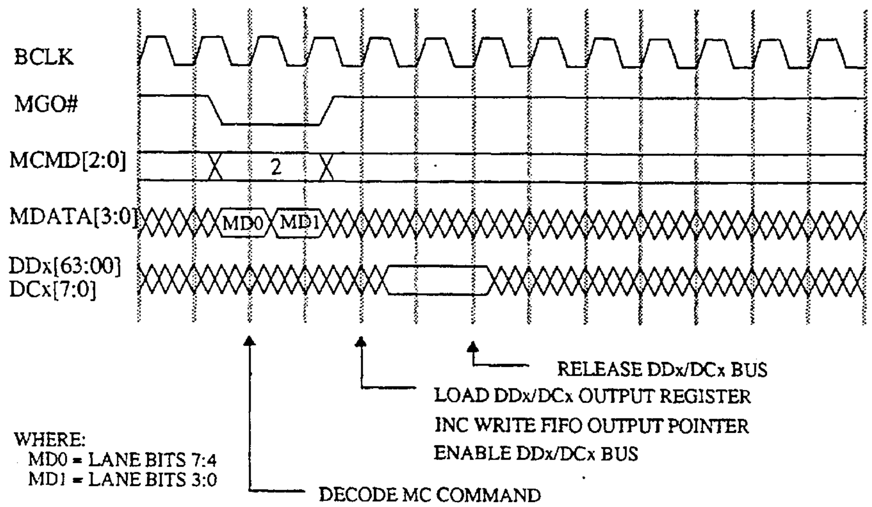
Figure 1-30 Write DRAM Left Extended [width = 3 clocks]
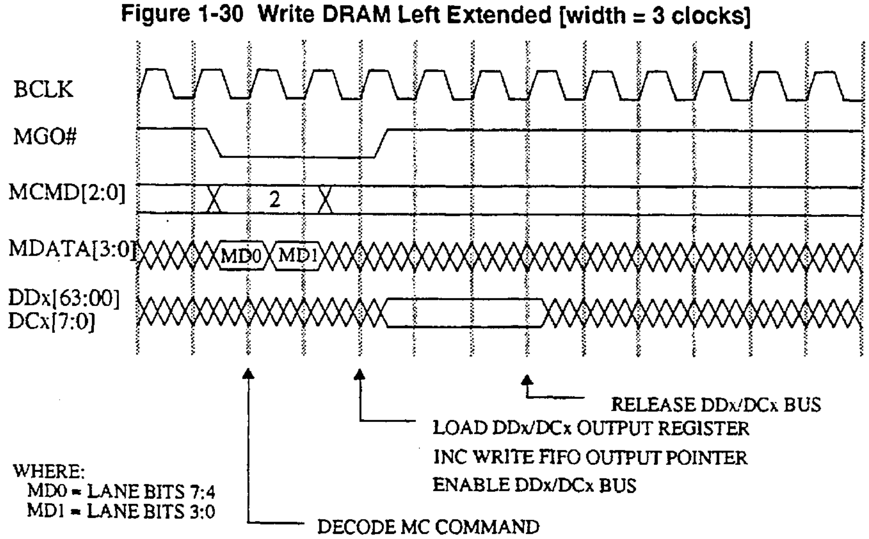

Figure 1-31 Write DRAM Left Extended (Back to back) [width = 2 clocks]
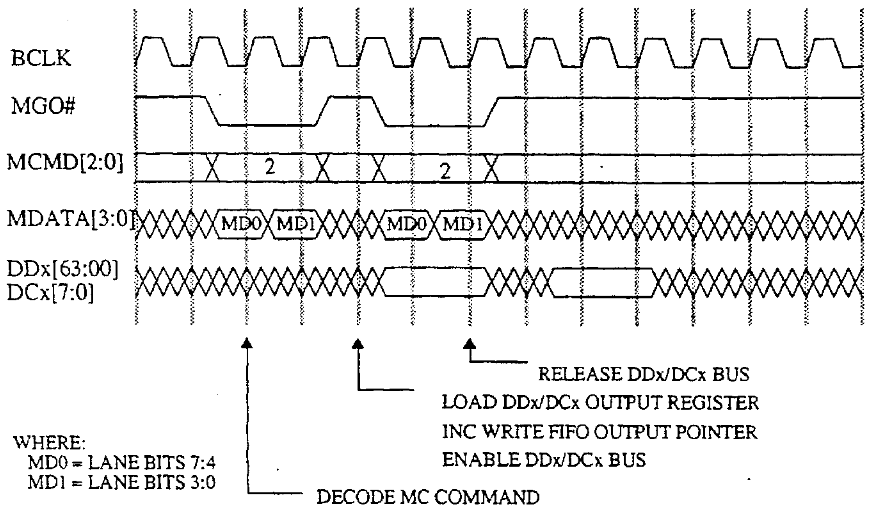
Figure 1-32 Write DRAM Full Bus Word (Left) [width = 1 clock]
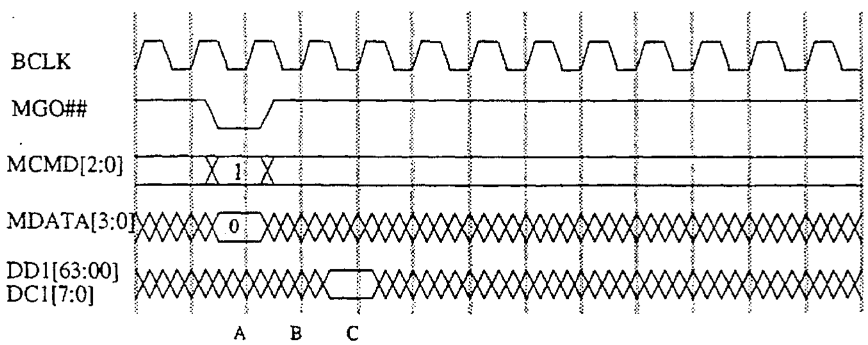
A = DECODE MC COMMAND
B = LOAD DD1/DC1 OUTPUT REGISTER. INC WRITE FIFO OUTPUT POINTER
ENABLE DD1/DC1 BUS
C =RELEASE DD1/DC1 BUS

Figure 1-33 Write DRAM Full Bus Word (Left) [width = 2 clocks]
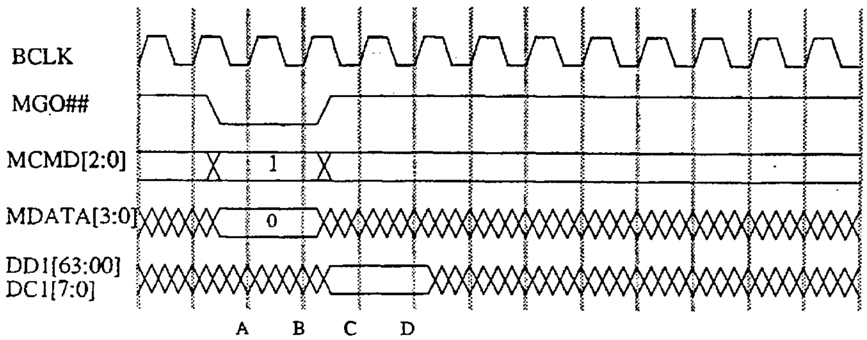
A = DECODE MC COMMAND
B = LOAD DD1/DC1 OUTPUT REGISTER, INC WRITE FIFO OUTPUT POINTER
ENABLE DD1/DC1 BUS
D =RELEASE DD1/DC1 BUS
Figure 1-34 Write DRAM Full Bus Word (Left) [width = 3 clocks]
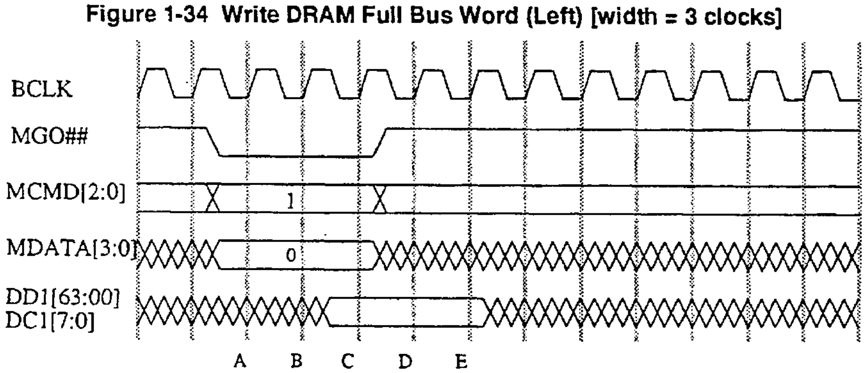
A = DECODE MC COMMAND
B = LOAD DD1/DC1 OUTPUT REGISTER, INC WRITE FIFO OUTPUT POINTER
ENABLE DD1/DC1 BUS
E =RELEASE DD1/DC1 BUS

Figure 1-35 Write DRAM WCL (Left first) [width = 2 clocks]

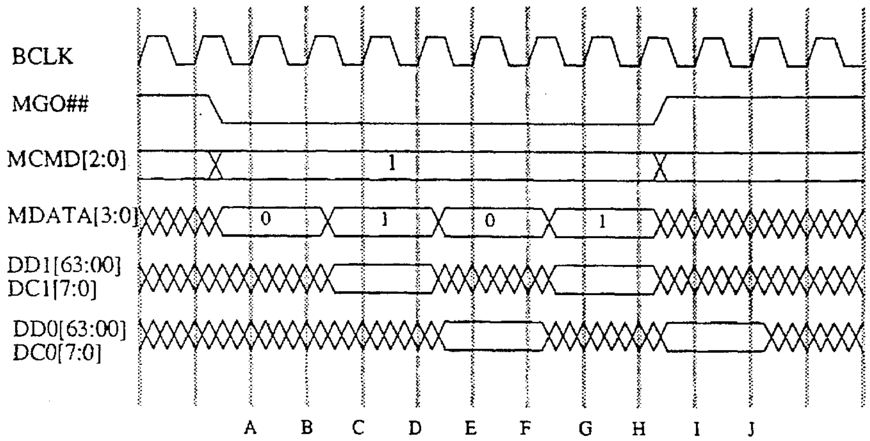

A = DECODE MC COMMAND

B = LOAD DD1/DC1 OUTPUT REGISTER, INC WRITE FIFO OUTPUT POINTER
ENABLE DD1/DC1 BUS

C = DECODE MC COMMAND

D = LOAD DD0/DC0 OUTPUT REGISTER, INC WRITE FIFO OUTPUT POINTER
ENABLE DD0/DC0 BUS, RELEASE DD1/DC1 BUS

E = DECODE MC COMMAND

F = LOAD DD1/DC1 OUTPUT REGISTER, INC WRITE FIFO OUTPUT POINTER
ENABLE DD1/DC1 BUS, RELEASE D01/DC0 BUS

G = DECODE MC COMMAND

H = LOAD DD0/DC0 OUTPUT REGISTER, INC WRITE FIFO OUTPUT POINTER
ENABLE DD0/DC0 BUS, RELEASE DD1/DC1 BUS

J = RELEASE DD0/DC0 BUS

1.4.3 SCAN Interface

TBS

1.4.4 Failing SIMM/Group Numbers

A 5-bit field is required to identify 1 failing SIMM out of a possible 32 SIMMs. The MC supplies a 3-bit field which identifies 1 of the 8 128 bit groups (MS three bits). The MDP then supplies the lower 2 bits to identify the 1 failing SIMM out of four. See Appendix A to relate Table 1-15 to SIMM socket signal routing.

Table 1-15 SIMM Group Numbers

| SIMM/Group Numbers | | | | | | | | SIMM/Group Numbers | | | | | | | | |
|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | SIMM |
| 7 | | | | 6 | | | | 5 | | | | 4 | | | | Group |
| 15 | 14 | 13 | 12 | 11 | 10 | 9 | 8 | 7 | 6 | 5 | 4 | 3 | 2 | 1 | 0 | SIMM |
| 3 | | | | 2 | | | | 1 | | | | 0 | | | | Group |
| Left 64 bits | | Right 64 bits | | Left 64 bits | | Right 64 bits | | Left 64 bits | | Right 64 bits | | Left 64 bits | | Right 64 bits | | |
| 128 bits | | | | 128 bits | | | | 128 bits | | | | 128 bits | | | | |

Where:
Right 64 bits = DD0[63:0]
Left 64 bits = DD1[63:0]

For a CDE ( single bit error), the two LS bits are defined as:
L/R = 0 and EUS = 0 -> 00
L/R = 0 and EUS = 1 -> 01
L/R = 1 and EUS = 0 -> 10
L/R = 1 and EUS = 1 -> 11

For a UDE (multiple bit error) only a SIMM pair must be identified. Thus the LSB is a don't care and the next most significant bit is defined as:
L/R = 0 -> 0
L/R = 1 -> 1

1.5 SOFTWARE VISIBLE REGISTERS

1.5.1 Register Mapping

These registers reside in the memory address space mapped by the MC. See the MC for more details.

1.5.2 Register Attributes

This section summarizes the various attributes of the MDP registers.

Table 1-16 Register Attribute Summary

| DESCRIPTION | Initialization | Read/Write | Clear |
|---|---|---|---|
| Software Configuration Register | XA-MP only | Read and Write | None |
| Error Status Register | XA-MP or local | Read only | CLRR and CLRY |
| YDE SIMM Register | XA-MP or local | Read only | CLRY |
| RDE SIMM Register | XA-MP or local | Read only | CLRR or CLRU |

1.5.3 Initialization/Configuration Registers

1.5.3.1 Software Configuration Register

This register is used for verifying Write/Read FIFO error reporting and EDAC operation. At boot up time the processor should configure this register according to its needs. This is a read/write register, however writing is only permitted when memory is in the disabled state and the data was received from the XA-MP bus without a BUDE#. This register is initialized to all zeros only by the XA-MP initialize.

Table 1-17 Software Configuration Register

<table>
<tr><td colspan="32">Offset 200h or 220h Software Configuration Register</td></tr>
<tr><td>31</td><td>30</td><td>29</td><td>28</td><td>27</td><td>26</td><td>25</td><td>24</td><td>23</td><td>22</td><td>21</td><td>20</td><td>19</td><td>18</td><td>17</td><td>16</td><td>15</td><td>14</td><td>13</td><td>12</td><td>11</td><td>10</td><td>09</td><td>08</td><td>07</td><td>06</td><td>05</td><td>04</td><td>03</td><td>02</td><td>01</td><td>00</td></tr>
<tr><td colspan="16">Reserved</td><td>FWF1</td><td>FWF0</td><td>FRF1</td><td>FRF0</td><td colspan="3">Reserved</td><td>CBGDIS</td><td colspan="8">CB[7:0]</td></tr>
</table>

1.5.3.1.1 Force Write FIFO (FWF) Field

This field is used to force a Write FIFO error for diagnostic testing. When in a Force Write FIFO Empty mode, a Write FIFO Empty error will be generated each time a Write FIFO read occurs. When in a Force Write FIFO Full mode, a Write FIFO Full error will be generated each time a Write FIFO write occurs. See Table below for details.

1.5.3.1.2 Force Read FIFO (FRF) Field

This field is used to force a Read FIFO error for diagnostic testing. When in a Force Read FIFO Empty mode, a Read FIFO Empty error will be generated each time a Read FIFO read occurs. When in a Force Read FIFO Full mode, a Read FIFO Full error will be generated each time a Read FIFO write occurs. See Table below for details.

1.5.3.1.3 CB Generation Disable (CBGDIS)

This bit is used to enable/disable EDAC check bit generation. See Table below for details.

1.5.3.1.4 Check Bit (CB) Field

This field is used as the check bits written to memory for diagnostic purposes when the check bit generation logic is disabled by CBGDIS. When using this mode, alpha refresh should be disabled via the MC Software Configuration Register, else single/multiple bit errors maybe inadvertently created. See Table below for details.

Table 1-18 Software Configuration Register Bit Definitions

| Bit Field | Bit Setting | Operating Mode |
|---|---|---|
| CB[7:0] | 00h - FFh | Valid when CBDIS = 1 |
| CBGDIS | 0 | Enable EDAC check bit generation - Initialization state |
| | 1 | Disable EDAC check bit generation, use CB[7:0] as check bits |
| FRF[1:0] | 00 | Normal operation |
| | 01 | Force Read FIFO empty |
| | 10 | Force Read FIFO full |
| | 11 | Reserved |
| FWF[1:0] | 00 | Normal operation |
| | 01 | Force Write FIFO empty |
| | 10 | Force Write FIFO full |
| | 11 | Reserved |

1.5.3.2 Error Status Register

This read only register is used for reporting Write/Read FIFO errors and XA-MP data bus errors (DPE). These error groups are independent and can be reported concurrently. This register is initialized to all zeros by either an XA-MP or local initialize.

The Write/Read FIFO error group consists of a 4-bit field. The first Write/Read FIFO error occurring will freeze this field and issue a FIFOE# signal to the MC, which in turn will issue a SLER to the system. This 4-bit field is cleared by the CLRR bit in the Mode 2 Control Register.

The XA-MP data bus error group consists of a 12-bit field. After the first DPE error is detected, a subsequent DPE occuring before this field is cleared, will NOT overlay the BE[] field, but will be counted in the CNT[] field. This 12-bit field is cleared by the CLRY bit in the Mode 1 Control Register.

Table 1-19 Error Status Register

| Offset 210h or 230h | Error Status Register | | | | | | | | |
|---|---|---|---|---|---|---|---|---|---|
| 31 30 29 28 27 26 25 24 23 22 21 20 19 18 17 16 | 15 | 14 | 13 | 12 | 11 | 10 | 09 | 08 | 07 06 05 04 03 02 01 00 |
| Reserved | WFEE | WFFE | RFEE | RFFE | DPE | CNT2 | CNT1 | CNT0 | BE[7:0] |

1.5.3.2.1 Write FIFO Empty Error (WFEE)

This bit indicates that a Write FIFO underflow error has occurred. This occurs when the Write FIFO is empty and write data is requested for: 1) writing to DRAM or 2) loading a register.

1.5.3.2.2 Write FIFO Full Error (WFFE)

This bit indicates that a Write FIFO overflow error has occurred. This occurs when the Write FIFO is full and a XA-MP write cycle writes data to the Write FIFO.

1.5.3.2.3 Read FIFO Empty Error (RFEE)

This bit indicates that a Read FIFO underflow error has occurred. This occurs when the Read FIFO is empty and a XA-MP data response cycle request read data from the Read FIFO.

1.5.3.2.4 Read FIFO Full Error (RFFE)

This bit indicates that a Read FIFO overflow error has occurred. This occurs when the Read FIFO is full and data is written to the Read FIFO from the DRAM or a register.

1.5.3.2.5 Data Parity Error (DPE)

This bit indicates that a XA-MP data byte error has been detected. The byte error field will display the status of each byte. See Table below for more details.

1.5.3.2.6 Error Count (CNT) Field

This field counts multiple occurrences of Data Parity Errors. The first Data Parity Error will not alter this field, subsequent Data Parity Errors will increment this field. See Table below for details.

1.5.3.2.7 Byte Error (BE) Field

This field traps the XA-MP data byte parity errors for diagnostic purposes. This field is updated with byte error status when the first error occurs and is then frozen until the register is cleared. See Table below for details.

Table 1-20 Error Status Register Bit Definitions

| Bit Field | Bit Setting | Operating Mode |
|---|---|---|
| CNT[2:0] | 000 | No errors - Initialization state |
| | 001 - 111 | Error count, freezes at 111 |
| DPE | 0 | No error - Initialization state |
| | 1 | One or more data bytes contain incorrect parity |
| BE[7:0] | 00h | No parity error in byte - Initialization state |
| | 01h - FFh | Parity error in indicated bytes |
| RFEE | 0 | No error - Initialization state |
| | 1 | Read FIFO Empty Error |
| RFFE | 0 | No error - Initialization state |
| | 1 | Read FIFO Full Error |
| WFEE | 0 | No error - Initialization state |
| | | Write FIFO Empty Error |
| WFFE | 0 | No error - Initialization state |
| | | Write FIFO Full Error |

1.5.3.3 YDE SIMM Register

The Yellow Data Error SIMM Register is a read only register that traps the SIMM number and the syndrome pattern resulting from the first CDE or Alpha UDE error being detected by the EDAC logic for all read cycles except: 1) alpha reads when alpha reporting is disabled and 2) correction cycles. A subsequent CDE or Alpha UDE occuring before this register is cleared, will NOT overlay the SIMM[] or SYND[] fields, but will be counted in the CNT[] field. This register is cleared by the CLRY bit in the Model Control Register. This register is initialized to all zeros by either an XA-MP or local initialize.

Table 1-21 YDE SIMM Register

| Offset 240h or 260h | YDE SIMM Register | | | | | | |
|---|---|---|---|---|---|---|---|
| 31–18 | 17 | 16 | 15 | 14 | 13 | 12–08 | 07–00 |
| Reserved | AUDE | CDE | CNT2 | CNT1 | CNT0 | SIMM[4:0] | SYND[7:0] |

1.5.3.3.1 Alpha Uncorrected Data Error (AUDE)

This bit indicates that at least one Alpha multi bit EDAC error has been detected. The information in the other fields is now considered valid. This bit will not be set if CDE is being set or is already set. See Table below for more details.

1.5.3.3.2 Corrected Data Error (CDE)

This bit indicates that at least one single bit EDAC error has been detected. The information in the other fields is now considered valid. This bit will not be set if AUDE is already set. See Table below for more details.

1.5.3.3.3 Error Count (CNT) Field

This field counts multiple occurrences of CDE and/or AUDE. The first CDE and/or AUDE will not alter this field, subsequent CDE and/or AUDE will increment this field. See Table below for details.

1.5.3.3.4 SIMM Number (SIMM) Field

This field traps the CDE or AUDE failing SIMM number for diagnostic purposes. The number represents the actual socket number where the failure occurred. For CDE errors, the entire field is used to locate the failing SIMM. For AUDE errors, the least significant bit is treated as a don't care, thus identifing two failing SIMMs. This field is loaded with the SIMM number when the first error occurs and is then frozen until the register is cleared. See Table below for details.

1.5.3.3.5 Syndrome (SYND) Field

This field traps the Corrected Data Error (single bit) syndrome bits from the EDAC logic for diagnostic purposes. This field is loaded with syndrome information when the first error occurs and is then frozen until the register is cleared. See Table below for details.

Table 1-22 YDE SIMM Register Bit Definitions

| Bit Field | Bit Setting | Operating Mode |
|---|---|---|
| AUDE | 0 | No error - Initialization state |
| | 1 | A least one alpha multi bit error |
| CNT[2:0] | 000 | When CDE = 1 or AUDE = 1, no rrors detected after initial error. Initialization state |
| | 001 - 111 | CDE and/or AUDE count after initial error, freezes at 111 |
| CDE | 0 | No error - Initialization state |
| | 1 | A least one single bit error |
| SIMM[4:0] | 00000-11111 | Only valid when CDE = 1 or AUDE = 1<br>This field provides the following information:<br>1) Failing SIMM socket number<br>a) SIMM[4:0] when memory contains 32 SIMM sockets<br>b) SIMM[3:0] when memory contains 16 SIMM sockets<br>2) Failing group number<br>SIMM[4:2] independent of number of SIMM sockets<br>Note: SIMM[0] is don't care for AUDE. |
| SYND[7:0] | 00h | No EDAC error - Initialization state |
| | ??h | CDE or AUDE code |

1.5.3.4 RDE SIMM Register

The Red Data Error SIMM Rregister is a read only register that traps the SIMM number and the syndrome pattern resulting from the first UDE error being detected by the EDAC logic for all read cycles except: 1) alpha reads and 2) correction cycles. A subsequent UDE occuring before this register is cleared, will NOT overlay the SIMM[] or SYND[] fields, but will be counted in the CNT[] field. This register is cleared by either the CLRR or CLRU bits in the Mode 1 Control Register. This register is initialized to all zeros by either an XA-MP or local initialize.

Table 1-23 RDE SIMM Register

| Offset 250h or 270h | RDE SIMM Register | | | | | |
|---|---|---|---|---|---|---|
| 31–17 | 16 | 15 | 14 | 13 | 12–08 | 07–00 |
| Reserved | UDE | CNT2 | CNT1 | CNT0 | SIMM[4:0] | SYND[7:0] |

1.5.3.4.1 Uncorrected Data Error (UDE)

This bit indicates that at least one double or multiple bit EDAC error has been detected. The information in the other fields is now considered valid. See Table below for more details.

1.5.3.4.2 Error Count (CNT) Field

This field counts multiple occurrences of Uncorrected Data Errors. The first Uncorrected Data Error will not alter this field, subsequent Uncorrected Data Errors will increment this field. See Table below for details.

1.5.3.4.3 SIMM Number (SIMM) Field

This field traps the Uncorrected Data Error failing SIMM numbers for diagnostic purposes. The number represents the actual two socket numbers (N and N+1) where the failure occurred (Note, SIMM0 is treated as a don't care, thus a 02h requires SIMM 02h and 03h be replaced). This field is loaded with the SIMM number when the first error occurs and is then frozen until the register is cleared. See Table below for details.

1.5.3.4.4 Syndrome (SYND) Field

This field traps the Uncorrected Data Error (multiple bit) syndrome bits from the EDAC logic for diagnostic purposes. This field is loaded with syndrome information when the first error occurs and is then frozen until the register is cleared. An even number of ones in this field indicates a double or even multiple bit error, while an odd number of ones indicates an odd multiple bit error. See Table below for details.

Table 1-24 RDE SIMM Register Bit Definitions

| Bit Field | Bit Setting | Operating Mode |
|---|---|---|
| CNT[2:0] | 000 | When UDE = 1, no Uncorrected Data Errors detected after the initial error. - Initialization state |
| | 001 - 111 | Uncorrected Data Error count after initial error, freezes at 111 |
| UDE | 0 | No error - Initialization state |
| | 1 | At least one double or multiple bit error |
| SIMM[4:0] | 00000-11110 | Only valid when UDE = 1<br>This field provides the following information:<br>1) Failing 2 SIMM socket numbers (Note,SIMM[0] is a don't care and is always a zero)<br>a) SIMM[4:0] when memory contains 32 SIMM sockets<br>b) SIMM[3:0] when memory contains 16 SIMM sockets<br>2) Failing group number<br>SIMM[4:2] independent of number of SIMM sockets |
| SYND[7:0] | 00h | No EDAC error - Initialization state |
| | ??h | Uncorrected Data Error (double or multiple bit) code |

1.5.4 Performance Monitor Registers

The MDP does not contain any performance monitor registers. However, the the MC does contain performance monitor registers to measure the effect of the MDP read FLY-BY logic.

1.6 TESTABILITY

TBS

1.6.1 IEEE 1149.1

TBS

1.6.1.1 Boundary Scan

TBS

1.6.1.2 Internal Scan

TBS

1.6.1.3 BIST

TBS

1.7 ELECTRICAL SPECIFICATIONS

TBS

1.7.1 Power & Ground

TBS

1.7.2 Maximum Ratings

TBS

1.7.3 DC Specifications

TBS

1.7.4 AC Specifications

TBS

1.8 MECHANICAL SPECIFICATIONS

TBS

1.8.1 Package Information

TBS

1.8.2 Package Thermal Specifications

TBS

1.9 APPENDIX A - SIMM SIGNAL ROUTING
Figure 1-36 SIMM SIGNAL ROUTING - 16 SOCKETS
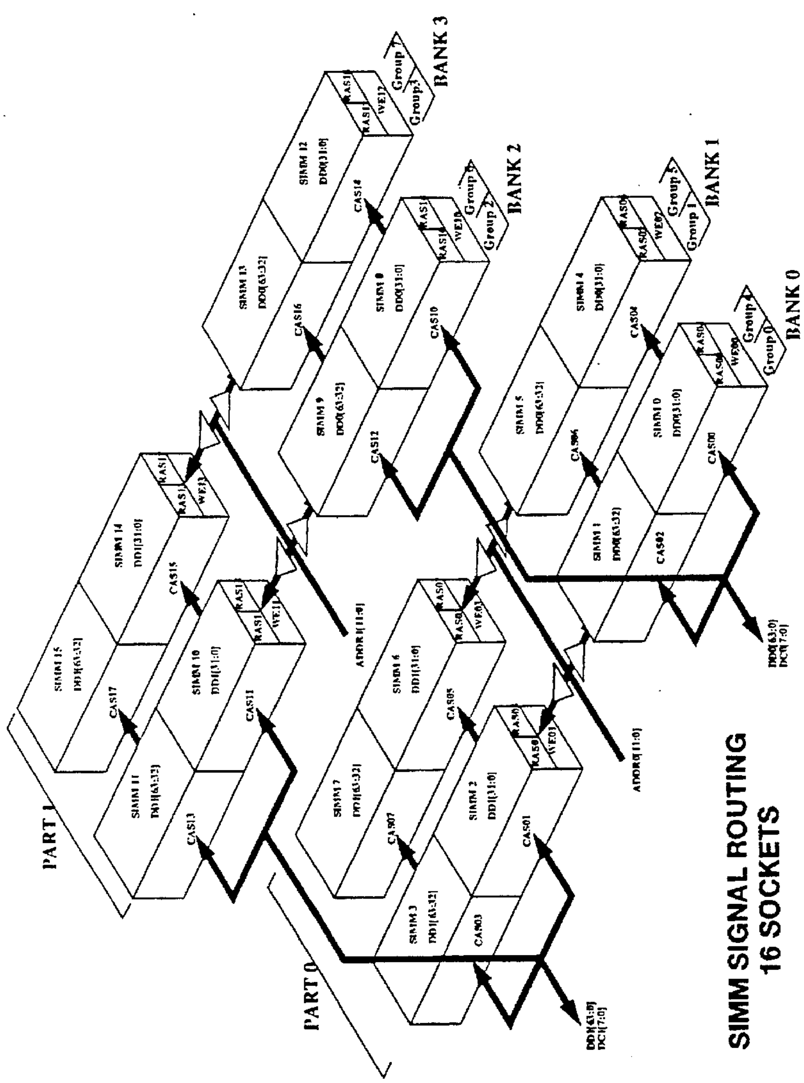

Figure 1-37 SIMM SIGNAL ROUTING - 32 SOCKETS
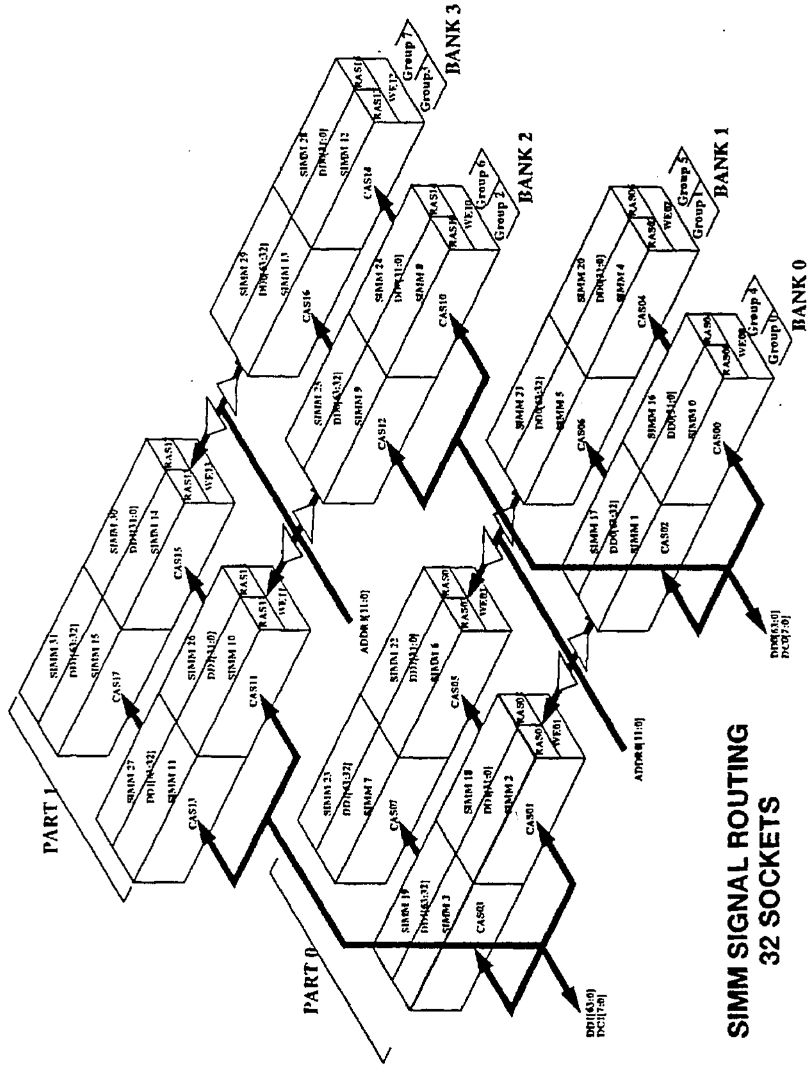

APPENDIX 4

ADAPTIVE MEMORY TIMING STATE MACHINE

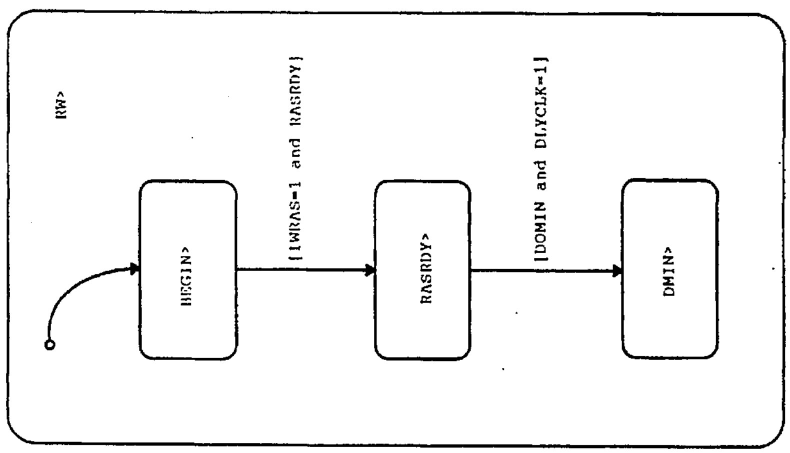
Chart: RW Version:19 Date: 22-APR-1993 08:48:56

```
ionary for chart RW
------------------

:s with Static Reactions and Activities Throughout/Within
-----------------------------------------------------------
r
 BASIC
ions: entering/CNTWE:=1;
        COLSEL:=0;
        NEXT_COL:=0;
        SC_RASON;
        if BIST_MODE=0 then
          GEN_DORDEN
        end if

 BASIC
ions: entering/SC_CASOFF;
        if BIST_MODE=0 then
          GEN_DRDY
        end if;
        SAMP_EDAC;
        LD_REL

Y
 BASIC
ions: entering/COLSEL:=1;
        SC_CASON;
        SC_GEN_DOMIN;
        SC_RASOFF

 OR
ions:  [CNT0=1]/RASON
       [CNT1=1]/CASON
       [CNT2=1]/GEN_DOMIN
       [CNT3=1]/RASOFF
       [CNT4=1]/CASOFF
       [CNTWE=1]/WE:=0

its defined and/or used in chart RW
-----------------------------------
MODE (data-item); defined in chart: DRAM_CYC_GEN
 BIT

' (action); defined in chart: RW
ition: WCASA:=0;
        GEN_CYCDONE

 (action); defined in chart: RW
ition: WCASA:=1

(data-item); defined in chart: DRAM_CYC_GEN
 BIT-ARRAY
es: 3 Downto 0

data-item); defined in chart: DRAM_CYC_GEN
 BIT-ARRAY
es: 3 Downto 0
```

```
CNT2 (data-item); defined in chart: DRAM_CYC_GEN
Type: BIT-ARRAY
Indices: 3 Downto 0

CNT3 (data-item); defined in chart: DRAM_CYC_GEN
Type: BIT-ARRAY
Indices: 3 Downto 0

CNT4 (data-item); defined in chart: DRAM_CYC_GEN
Type: BIT-ARRAY
Indices: 3 Downto 0

CNTWE (data-item); defined in chart: DRAM_CYC_GEN
Type: BIT-ARRAY
Indices: 1 Downto 0

COLSEL (data-item); defined in chart: DRAM_CYC_GEN
Type: BIT

CPD (data-item); defined in chart: DRAM_CYC_GEN
Type: BIT

DLYCLK (data-item); defined in chart: DRAM_CYC_GEN
Type: BIT

DOMIN (condition); defined in chart: DRAM_CYC_GEN

GEN_CYCDONE (action); defined in chart: DRAM_CYC_GEN
Definition: tr!(CYCDONE)

GEN_DOMIN (action); defined in chart: DRAM_CYC_GEN
Definition: tr!(DOMIN)

GEN_DORDEN (action); defined in chart: DRAM_CYC_GEN
Definition: if XDBUS=0 then
              DB0_DORDEN:=1
            else
              DB1_DORDEN:=1
            end if

GEN_DRDY (action); defined in chart: DRAM_CYC_GEN
Definition: if PDBUS=0 then
              IDB0_DRDY:=1
            else
              IDB1_DRDY:=1
            end if

IRELEASE (data-item); defined in chart: DRAM_CYC_GEN
Type: INTEGER
Number of bits: 5

IRELVAL (data-item); defined in chart: DRAM_CYC_GEN
Type: BIT

IWRAS (data-item); defined in chart: DRAM_CYC_GEN
Type: BIT

LD_REL (action); defined in chart: RW
Definition: IRELEASE:=4+TRDH+2*CPD;
            IRELVAL:=1
```

```
TIME (data-item); defined in chart: DRAM_CYC_GEN
: INTEGER
er of bits: 4

_COL (data-item); defined in chart: DRAM_CYC_GEN
: BIT

FF (action); defined in chart: RW
nition: IWRAS:=0

N (action); defined in chart: RW
nition: IWRAS:=1

DY (condition); defined in chart: DRAM_CYC_GEN
nition: RASRDY0=1 and RASRDY1=1 and RASRDY2=1 and RASRDY3=1
        and RASRDY4=1 and RASRDY5=1 and RASRDY6=1 and RASRDY7=
        1

_EDAC (action); defined in chart: DRAM_CYC_GEN
nition: CNTSE0:=8

ASOFF (action); defined in chart: RW
nition: CNT4:=4+TRDH

ASON (action); defined in chart: RW
nition: if TASC=0 then
          CASON
        else
          CNT1:=TASC
        end if

EN_DOMIN (action); defined in chart: RW
nition: if MINITIME=0 then
          GEN_DOMIN
        else
          CNT2:=MINITIME
        end if

ASOFF (action); defined in chart: RW
nition: if TASC+TRSH=0 and TRAS<=TRAH+1 then
          RASOFF
        else
          if TRAS>TRAH+1 then
            CNT3:=MAX(TASC+TRSH,TRAS-TRAH-1)
          else
            CNT3:=TASC+TRSH
          end if
        end if

ASON (action); defined in chart: RW
nition: if TASR=0 then
          RASON
        else
          CNT0:=TASR
        end if

: (data-item); defined in chart: DRAM_CYC_GEN
:: BIT-ARRAY
ces: 2 Downto 0

TASR (data-item); defined in chart: DRAM_CYC_GEN
Type: BIT-ARRAY
Indices: 2 Downto 0

TRAH (data-item); defined in chart: DRAM_CYC_GEN
Type: BIT-ARRAY
Indices: 2 Downto 0

TRAS (data-item); defined in chart: DRAM_CYC_GEN
Type: BIT-ARRAY
Indices: 3 Downto 0

TRDH (data-item); defined in chart: DRAM_CYC_GEN
Type: BIT-ARRAY
Indices: 2 Downto 0

TRSH (data-item); defined in chart: DRAM_CYC_GEN
Type: BIT-ARRAY
Indices: 2 Downto 0

WCASA (data-item); defined in chart: DRAM_CYC_GEN
Type: BIT

WE (data-item); defined in chart: DRAM_CYC_GEN
Type: BIT
```

Figure 1-1 RW State Machine Scheduled Actions
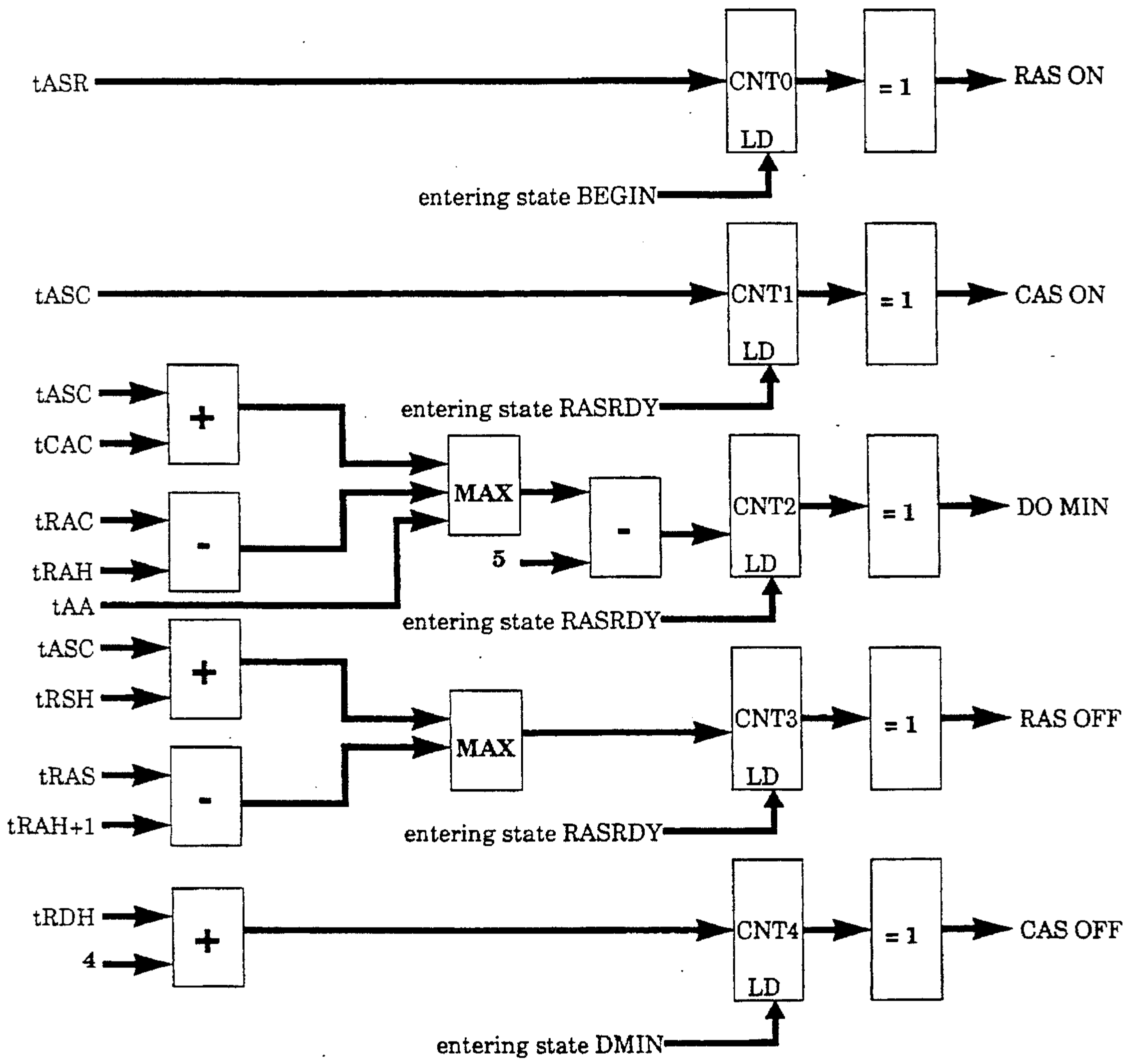

Figure 1-2 RW Timing Diagram
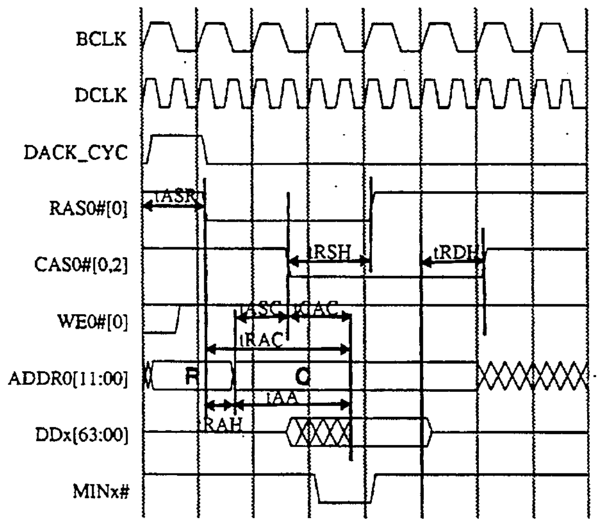

Table 1: DRAM Timing Parameters

| Parameter | Definition | SIMM spec | | extra | SSP 60 | SSP 80 | prac-tical min | # of bits |
|---|---|---|---|---|---|---|---|---|
| | | -60 | -80 | | | | | |
| tAA | COLSEL to Data setup in MDP | 30 | 40 | 0 | 5 | 5 | 1 | 4 |
| tASC | COLSEL to CAS on delay | 0 | 0 | 0 | 2 | 2 | 1 | 3 |
| tASR | DACK_CYC to RAS on delay | 0 | 0 | +1 | 1 | 1 | 0 | 3 |
| tCAC | CAS on to Data setup in MDP | 15 | 20 | 0 | 3 | 3 | 1 | 3 |
| tCAH | CAS on to NEXTCOL delay | 15 | 15 | 0 | 2 | 2 | 0 | 3 |
| tCHR | RAS on to CAS off delay (refresh) | 10 | 10 | 0 | 2 | 2 | 1 | 3 |
| tCP | CAS off to CAS on delay (SGRL) | 10 | 10 | 0 | 1 | 1 | 1 | 3 |
| tCPA | CAS off to Data setup in MDP (SGRL) | 35 | 45 | 0 | 4 | 5 | 1 | 3 |
| tCSR | CAS on to RAS on delay (refresh) | 10 | 10 | min 1 | 2 | 2 | 1 | 3 |
| tDH | CAS on to DATA off in MDP delay | 15 | 15 | 0 | 2 | 2 | 1 | 3 |
| tDS | DATA on in MDP to CAS on delay | 0 | 0 | 0 | 1 | 1 | 0 | 3 |
| tRAC | RAS on to Data setup in MDP | 60 | 80 | 0 | 6 | 7 | 1 | 4 |
| tRAH | RAS on to COLSEL delay | 10 | 10 | 0 | 1 | 1 | 0 | 3 |
| tRAS | RAS on to RAS off delay (refresh) | 60 | 80 | 0 | 4 | 6 | 2 | 4 |
| tRDH | LDIN in MDP to CAS off delay | N/A | N/A | 0 | 0 | 0 | 0 | 3 |
| tRP | RAS off to RAS on delay | 40 | 60 | 0 | 3 | 4 | 1 | 3 |
| tRSH | CAS on to RAS off delay | 15 | 20 | +1 | 1 | 1 | 0 | 3 |
| tWCW | CAS on to CAS off delay (writes) | 15 | 20 | 0 | 4 | 4 | 1 | 3 |
| | | | | | | | Total | 57 |

Figure 1-3 Single Bit Error Correction Writeback During Idle
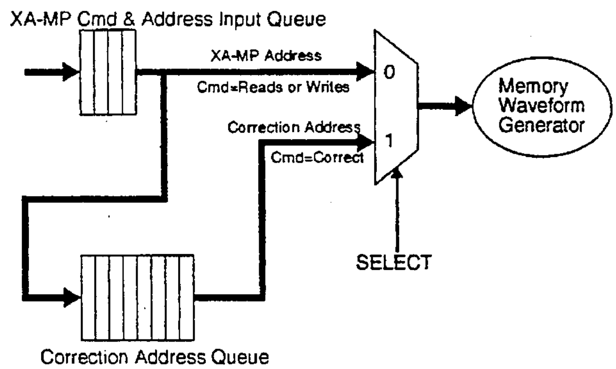
```
if (XA-MP Address Input Queue empty and Correction Address Queue not empty) or
   (Correction Address Queue full) then
     SELECT=1
else
     SELECT=0
end if
```

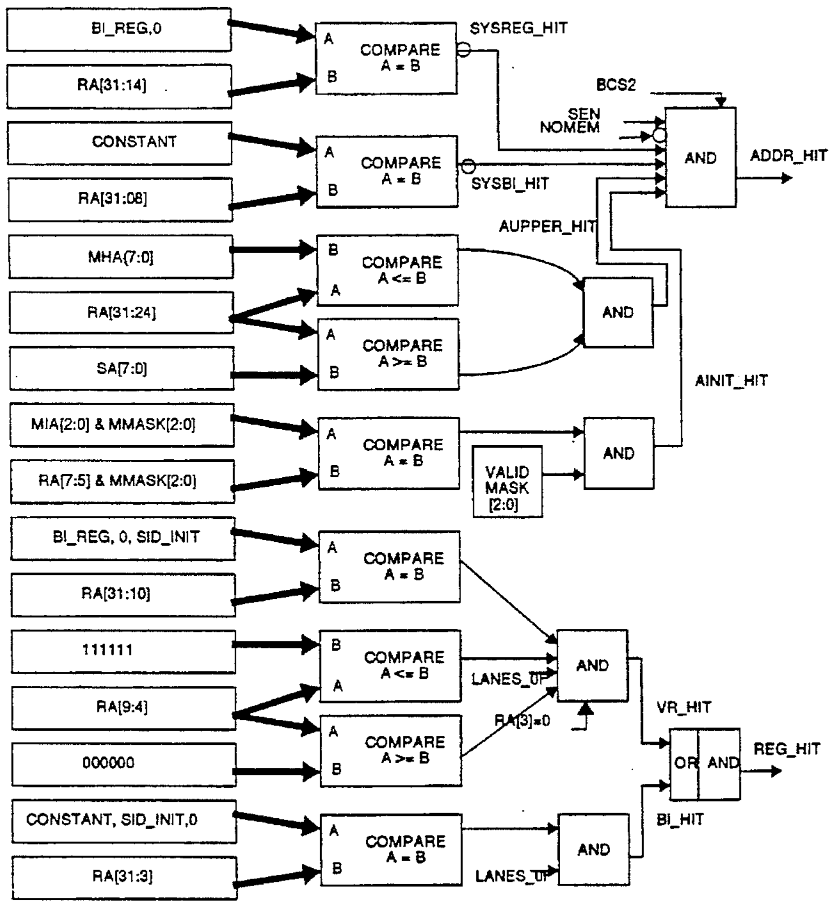
ADDRESS/REGISTER HIT LOGIC

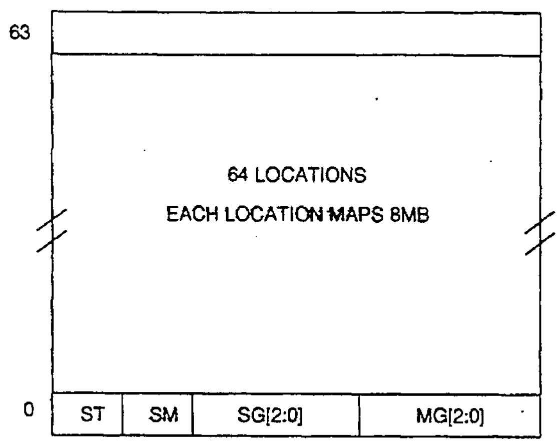
ST = SIMM TECHNOLOGY
0 = 4M DRAMs
1 = 16M DRAMs
SG = SINGLE GROUP NUMBER
MG = MULTI GROUP NUMBER
SM = SINGLE/MULTI GROUP
0 = SINGLE GROUP
1 = MULTI GROUP
MAPPER TABLE DESCRIPTION
ZENITH DATA SYSTEMS CONFIDENTIAL AND PROPRIETARY

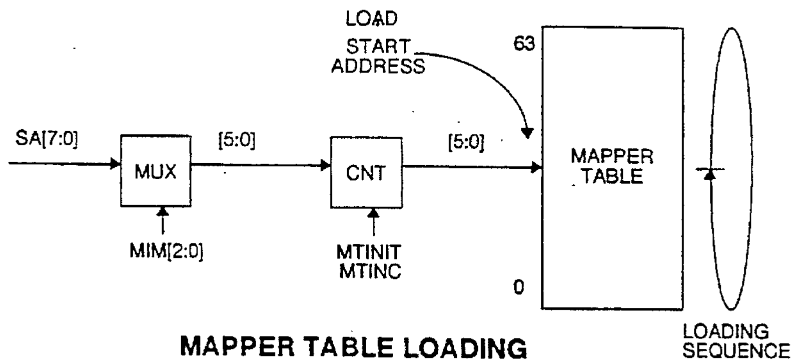
MAPPER TABLE LOADING
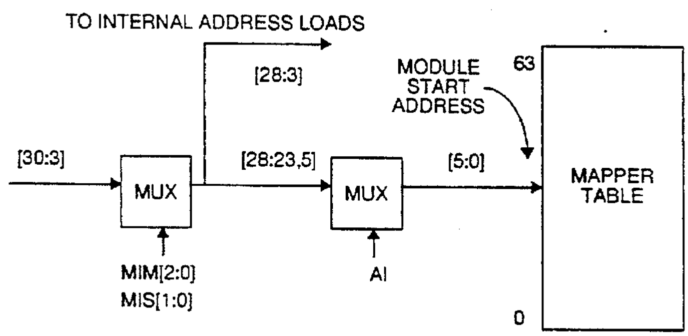
MAPPER TABLE READING

APPENDIX 5

ARBITRATION LOGIC A

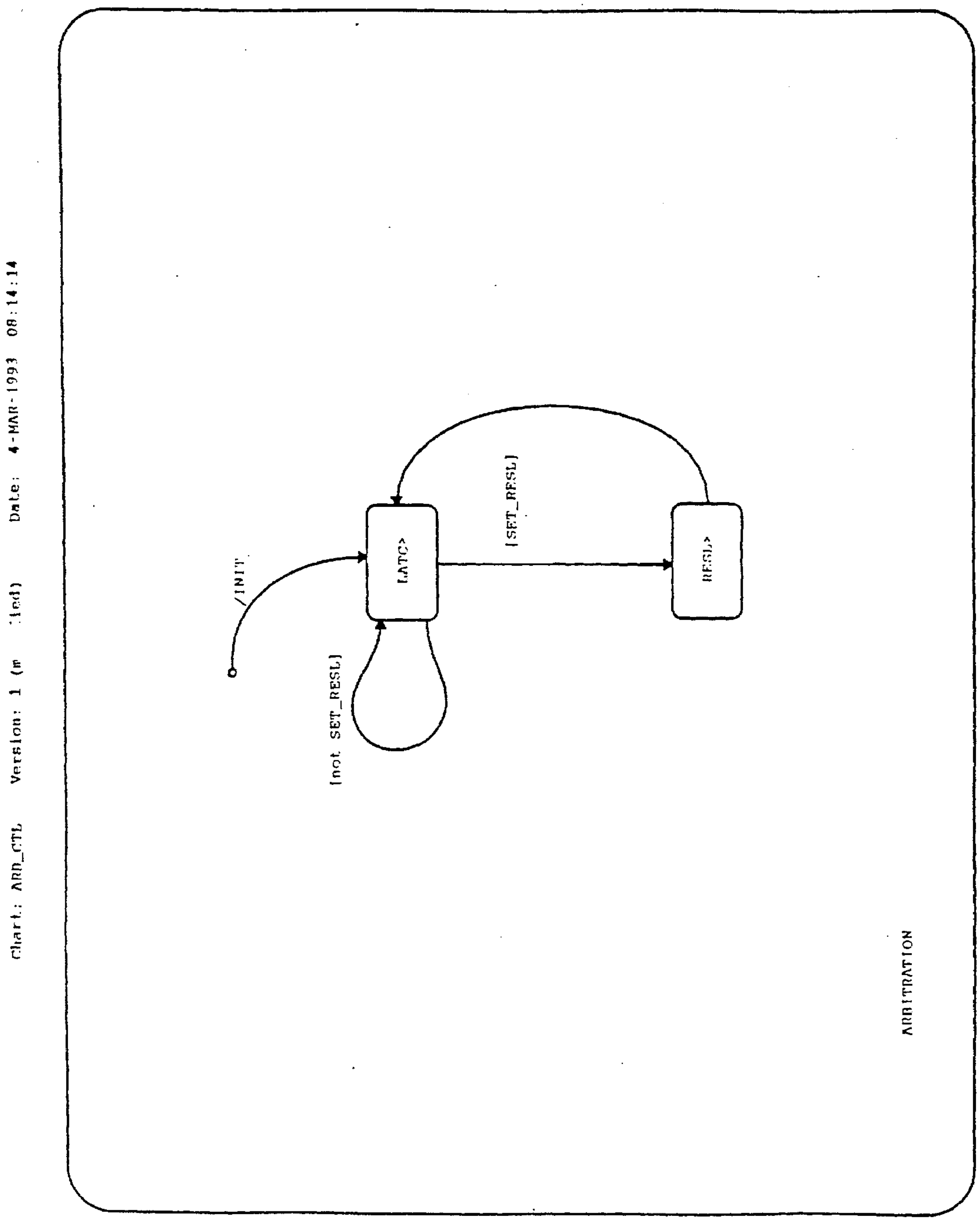
Chart: ARB_CTL
Date: 4-MAR-1993 08:14:14
/INIT
LATC>
[SET_RESL]
RESL>
[not SET_RESL]
ARBITRATION

```
mary fo   hart ARB_CTL
-------   ------------

: with Static Reactions and Activities Throughout/Within
---------------------------------------------------------

BASIC
ons: entering/if NO_ARB then
        BUS_USED:=0
     end if


BASIC
ons: entering/CHKWINNER;
     BUS_USED:=1
     exiting/GETRSID

ts defined and/or used in chart ARB_CTL
---------------------------------------
data-item); defined in chart: ARB_CTL
BIT-ARRAY
s: 9 Downto 0

 (data-item); defined in chart: ARB_CTL
BIT

ED (data-item); defined in chart: ARB_CTL
BIT

NER (action); defined in chart: ARB_CTL
tion: CHKWINNER0;
      CHKWINNER1;
      CHKWINNER2;
      CHKWINNER3;
      CHKWINNER4;
      CHKWINNER5;
      CHKWINNER6;
      CHKWINNER7;
      CHKWINNER8;
      CHKWINNER9

NER0 (action); defined in chart: ARB_CTL
tion: if SID=0b0000 then
        if ARBR(1)=1 then
          OWNER:=0b0001
        else
          if ARBR(2)=1 then
            OWNER:=0b0010
          else
            if ARBR(3)=1 then
              OWNER:=0b0011
            else
              if ARBR(4)=1 then
                OWNER:=0b0100
              else
                if ARBR(5)=1 then
                  OWNER:=0b0101
                else
                  if ARBR(6)=1 then
                    OWNER:=0b0110
                  else
                    if ARBR(7)=1 then
                      OWNER:=0b0111
                    else
                      if ARBR(8)=1 then
                        OWNER:=0b1000
                      else
                        if ARBR(9)=1 then
                          OWNER:=0b1001
                        else
                          if ARBR(0)=1 then
                            OWNER:=0b0000
                          end if
                        end if
                      end if
                    end if
                  end if
                end if
              end if
            end if
          end if
        end if
      end if

CHKWINNER1 (action); defined in chart: ARB_CTL
Definition: if SID=0b0001 then
              if ARBR(2)=1 then
                OWNER:=0b0010
              else
                if ARBR(3)=1 then
                  OWNER:=0b0011
                else
                  if ARBR(4)=1 then
                    OWNER:=0b0100
                  else
                    if ARBR(5)=1 then
                      OWNER:=0b0101
                    else
                      if ARBR(6)=1 then
                        OWNER:=0b0110
                      else
                        if ARBR(7)=1 then
                          OWNER:=0b0111
                        else
                          if ARBR(8)=1 then
                            OWNER:=0b1000
                          else
                            if ARBR(9)=1 then
                              OWNER:=0b1001
                            else
                              if ARBR(0)=1 then
                                OWNER:=0b0000
                              else
                                if ARBR(1)=1 then
                                  OWNER:=0b0001
                                end if
                              end if
                            end if
                          end if
                        end if
```

```
                    OWNER:=0b0011
                  else
                    if ARBR(4)=1 then
                      OWNER:=0b0100
                    end if
                  end if
                end if
              end if
            end if
          end if
        end if
      end if
    end if
  end if
end if

INER5 (action); defined in chart: ARB_CTL
tion: if SID=0b0101 then
        if ARBR(6)=1 then
          OWNER:=0b0110
        else
          if ARBR(7)=1 then
            OWNER:=0b0111
          else
            if ARBR(8)=1 then
              OWNER:=0b1000
            else
              if ARBR(9)=1 then
                OWNER:=0b1001
              else
                if ARBR(0)=1 then
                  OWNER:=0b0000
                else
                  if ARBR(1)=1 then
                    OWNER:=0b0001
                  else
                    if ARBR(2)=1 then
                      OWNER:=0b0010
                    else
                      if ARBR(3)=1 then
                        OWNER:=0b0011
                      else
                        if ARBR(4)=1 then
                          OWNER:=0b0100
                        else
                          if ARBR(5)=1 then
                            OWNER:=0b0101
                          end if
                        end if
                      end if
                    end if
                  end if
                end if
              end if
            end if
          end if
        end if
      end if

NER6 (action); defined in chart: ARB_CTL
efinition: if SID=0b0110 then
             if ARBR(7)=1 then
               OWNER:=0b0111
             else
               if ARBR(8)=1 then
                 OWNER:=0b1000
               else
                 if ARBR(9)=1 then
                   OWNER:=0b1001
                 else
                   if ARBR(0)=1 then
                     OWNER:=0b0000
                   else
                     if ARBR(1)=1 then
                       OWNER:=0b0001
                     else
                       if ARBR(2)=1 then
                         OWNER:=0b0010
                       else
                         if ARBR(3)=1 then
                           OWNER:=0b0011
                         else
                           if ARBR(4)=1 then
                             OWNER:=0b0100
                           else
                             if ARBR(5)=1 then
                               OWNER:=0b0101
                             else
                               if ARBR(6)=1 then
                                 OWNER:=0b0110
                               end if
                             end if
                           end if
                         end if
                       end if
                     end if
                   end if
                 end if
               end if
             end if
           end if

CHKWINNER7 (action); defined in chart: ARB_CTL
Definition: if SID=0b0111 then
              if ARBR(8)=1 then
                OWNER:=0b1000
              else
                if ARBR(9)=1 then
                  OWNER:=0b1001
                else
                  if ARBR(0)=1 then
                    OWNER:=0b0000
                  else
                    if ARBR(1)=1 then
                      OWNER:=0b0001
                    else
                      if ARBR(2)=1 then
                        OWNER:=0b0010
                      else
                        if ARBR(3)=1 then
```

```
                end if
              end if
            end if
          end if
        end if
      end if

INER2 (action); defined in chart: ARB_CTL
tion: if SID=0b0010 then
        if ARBR(3)=1 then
          OWNER:=0b0011
        else
          if ARBR(4)=1 then
            OWNER:=0b0100
          else
            if ARBR(5)=1 then
              OWNER:=0b0101
            else
              if ARBR(6)=1 then
                OWNER:=0b0110
              else
                if ARBR(7)=1 then
                  OWNER:=0b0111
                else
                  if ARBR(8)=1 then
                    OWNER:=0b1000
                  else
                    if ARBR(9)=1 then
                      OWNER:=0b1001
                    else
                      if ARBR(0)=1 then
                        OWNER:=0b0000
                      else
                        if ARBR(1)=1 then
                          OWNER:=0b0001
                        else
                          if ARBR(2)=1 then
                            OWNER:=0b0010
                          end if
                        end if
                      end if
                    end if
                  end if
                end if
              end if
            end if
          end if
        end if
      end if

NER3 (action); defined in chart: ARB_CTL
tion: if SID=0b0011 then
        if ARBR(4)=1 then
          OWNER:=0b0100
        else
          if ARBR(5)=1 then
            OWNER:=0b0101
          else
            if ARBR(6)=1 then
              OWNER:=0b0110
          else
            if ARBR(7)=1 then
              OWNER:=0b0111
            else
              if ARBR(8)=1 then
                OWNER:=0b1000
              else
                if ARBR(9)=1 then
                  OWNER:=0b1001
                else
                  if ARBR(0)=1 then
                    OWNER:=0b0000
                  else
                    if ARBR(1)=1 then
                      OWNER:=0b0001
                    else
                      if ARBR(2)=1 then
                        OWNER:=0b0010
                      else
                        if ARBR(3)=1 then
                          OWNER:=0b0011
                        end if
                      end if
                    end if
                  end if
                end if
              end if
            end if
          end if
        end if
      end if

CHKWINNER4 (action); defined in chart: ARB_CTL
Definition: if SID=0b0100 then
              if ARBR(5)=1 then
                OWNER:=0b0101
              else
                if ARBR(6)=1 then
                  OWNER:=0b0110
                else
                  if ARBR(7)=1 then
                    OWNER:=0b0111
                  else
                    if ARBR(8)=1 then
                      OWNER:=0b1000
                    else
                      if ARBR(9)=1 then
                        OWNER:=0b1001
                      else
                        if ARBR(0)=1 then
                          OWNER:=0b0000
                        else
                          if ARBR(1)=1 then
                            OWNER:=0b0001
                          else
                            if ARBR(2)=1 then
                              OWNER:=0b0010
                            else
                              if ARBR(3)=1 then
```

```
                OWNER:=0b0011
              else
                if ARBR(4)=1 then
                  OWNER:=0b0100
                else
                  if ARBR(5)=1 then
                    OWNER:=0b0101
                  else
                    if ARBR(6)=1 then
                      OWNER:=0b0110
                    else
                      if ARBR(7)=1 then
                        OWNER:=0b0111
                      end if
                    end if
                  end if
                end if
              end if
            end if
          end if
        end if
      end if
    end if
  end if

INER8 (action); defined in chart: ARB_CTL
tion: if SID=0b1000 then
        if ARBR(9)=1 then
          OWNER:=0b1001
        else
          if ARBR(0)=1 then
            OWNER:=0b0000
          else
            if ARBR(1)=1 then
              OWNER:=0b0001
            else
              if ARBR(2)=1 then
                OWNER:=0b0010
              else
                if ARBR(3)=1 then
                  OWNER:=0b0011
                else
                  if ARBR(4)=1 then
                    OWNER:=0b0100
                  else
                    if ARBR(5)=1 then
                      OWNER:=0b0101
                    else
                      if ARBR(6)=1 then
                        OWNER:=0b0110
                      else
                        if ARBR(7)=1 then
                          OWNER:=0b0111
                        else
                          if ARBR(8)=1 then
                            OWNER:=0b1000
                          end if
                        end if
                      end if
                    end if
```

```
                          end if
                        end if
                      end if
                    end if
                  end if
                end if
              end if

CHKWINNER9 (action); defined in chart: ARB_CTL
Definition: if SID=0b1001 then
              if ARBR(0)=1 then
                OWNER:=0b0000
              else
                if ARBR(1)=1 then
                  OWNER:=0b0001
                else
                  if ARBR(2)=1 then
                    OWNER:=0b0010
                  else
                    if ARBR(3)=1 then
                      OWNER:=0b0011
                    else
                      if ARBR(4)=1 then
                        OWNER:=0b0100
                      else
                        if ARBR(5)=1 then
                          OWNER:=0b0101
                        else
                          if ARBR(6)=1 then
                            OWNER:=0b0110
                          else
                            if ARBR(7)=1 then
                              OWNER:=0b0111
                            else
                              if ARBR(8)=1 then
                                OWNER:=0b1000
                              else
                                if ARBR(9)=1 then
                                  OWNER:=0b1001
                                end if
                              end if
                            end if
                          end if
                        end if
                      end if
                    end if
                  end if
                end if
              end if
            end if

GETRSID (action); defined in chart: ARB_CTL
Definition: if SID(3..0)<OWNER(3..0) then
              RSID(3..0):=SID(3..0)+0b1010-OWNER(3..0)
            else
              RSID(3..0):=SID(3..0)-OWNER(3..0)
            end if

INIT (action); defined in chart: ARB_CTL
Definition: SID_LD;
```

```
      i' "WO_ARB then
          d_ER:=1
      else
         ARB_ER:=0
      end if

 (condition); defined in chart: ARB_CTL
tion: ARBR=0b0000000000

(data-item); defined in chart: ARB_CTL
BIT-ARRAY
s: 3 Downto 0

lata-item); defined in chart: ARB_CTL
BIT-ARRAY
s: 3 Downto 0

SL (condition); defined in chart: ARB_CTL
tion: (ARBR(OWNER)=0 and BUS_USED=1 or BUS_USED=0) and not
      NO_ARB

ata-item); defined in chart: ARB_CTL
BIT-ARRAY
s: 3 Downto 0

 (action); defined in chart: ARB_CTL
tion: if ARBR(9)=1 then
        SID(3..0):=0b1001
      end if;
      if ARBR(8)=1 then
        SID(3..0):=0b1000
      end if;
      if ARBR(7)=1 then
        SID(3..0):=0b0111
      end if;
      if ARBR(6)=1 then
        SID(3..0):=0b0110
      end if;
      if ARBR(5)=1 then
        SID(3..0):=0b0101
      end if;
      if ARBR(4)=1 then
        SID(3..0):=0b0100
      end if;
      if ARBR(3)=1 then
        SID(3..0):=0b0011
      end if;
      if ARBR(2)=1 then
        SID(3..0):=0b0010
      end if;
      if ARBR(1)=1 then
        SID(3..0):=0b0001
      end if;
      if ARBR(0)=1 then
        SID(3..0):=0b0000
      end if

B (condition); defined in chart: ARB_CTL
tion: ARBR(0)+ARBR(1)+ARBR(2)+ARBR(3)+ARBR(4)+ARBR(5)+ARBR
      (6)+ARBR(7)+ARBR(8)+ARBR(9)/=1
```

APPENDIX 6

MEMORY BUS CONTROLLER

TABLE OF CONTENTS

MEMORY BUS CONTROLLER........1
1.1 INTRODUCTION........1
1.1.1 Product Description........1
1.1.2 Revision History........1
1.1.3 References........1
1.2 FUNCTIONAL DESCRIPTION........1
1.2.1 Block Diagram........1
1.2.1.1 XA-MP Bus Functional Summary........3
1.2.1.2 P5/C5C/C8C Functional Summary........3
1.2.1.3 Data Path Functional Summary........3
1.2.1.4 Secondary Tag Functional Summary........4
1.2.1.5 APIC Functional Summary........4
1.2.2 Sub-Blocks........5
1.2.2.1 Arbitration Control........5
1.2.2.2 Request Control........5
1.2.2.3 Response Control........5
1.2.2.4 Data Recovery........5
1.2.2.5 Snoop Control........6
1.2.2.6 Secondary Tag Control........6
1.2.2.7 Cache Attribute Control........7
1.2.2.8 Bus Trap Control........8
1.2.2.9 Status Control........8
1.2.2.10 Performance Monitor Control........8
1.2.2.11 APIC Control........8
1.2.2.12 Data Path Control........8
1.2.2.13 Clock Synchronizer........8
1.3 PIN DESCRIPTION........9
1.3.1 XA-MP Bus Interface Pins........10
1.3.2 P5/C5C/C8C Interface........11
1.3.2.1 P5 Interface........11
1.3.2.2 C5C/C8C Interface Pins........13
1.3.3 Data Path Interface Pins........16
1.3.4 Secondary Tag Interface Pins........17
1.3.5 APIC Interface Pins........19
1.3.6 SCAN Interface Pins........19
1.3.7 Miscellaneous Pins........19
1.3.8 Pin Assignments........21
1.4 OPERATION........21
1.4.1 XA-MP Bus Interface........21
1.4.1.1 RCL(0) - Ordered Read Response........24
1.4.1.2 RIL(0) -Ordered Read Response........27
1.4.1.3 RCL(0) - Out Of Order Read Response........29
1.4.1.4 WCL Cycle........31

1.4.1.5 PICL Cycle ....33
1.4.1.6 RLR Cycle ....34
1.4.1.7 RBW(0) and RBWL(0) -Ordered Read Response ....35
1.4.1.8 RBW(0) and RBWL(0) - Out Of Order Read Response ....37
1.4.1.9 WBW and WBWL Cycle ....39
1.4.1.10 RWR Cycle ....40
1.4.1.11 IOR(0) Cycle ....41
1.4.1.12 IOW Cycle ....43
1.4.1.13 INTA(0) Cycle ....45
1.4.1.14 Special Cycle ....47
1.4.1.15 NAK Handling ....49
1.4.1.16 Data Parity Error Handling ....49
1.4.1.17 Address/command bus parity error handling ....49
1.4.1.18 Time-out Error Handling ....49
1.4.1.19 Address Lock Cycles ....49
1.4.1.20 Registers Read/write Cycles ....50
1.4.2 P5/C5C/C8C Interface ....51
1.4.2.1 P5/C5C/C8C Cycles ....51
1.4.2.2 Write Cycle: ....54
1.4.2.2.1 CPU Generated Write Cycles ....54
1.4.2.2.2 Cache Generated Write Cycles ....54
1.4.2.2.3 Memory Bus Controller Responsibility ....54
1.4.2.2.4 Write to C5C/C8C Shared or Exclusive Lines ....55
1.4.2.2.5 Write Allocation and Read for Ownership ....55
1.4.2.3 Read Cycles ....55
1.4.2.3.1 Memory Bus Controller Responsibility ....56
1.4.2.4 I/O and special cycles ....56
1.4.2.5 MBC-C5C/C8C Protocol ....57
1.4.2.5.1 Read/write from C5C ....57
1.4.2.5.2 Read from C5C+Arbitration ....58
1.4.2.5.3 Noncaching write from C5C+Arbitration ....59
1.4.2.5.4 Write Through ....60
1.4.2.5.4.1 Write Squashing (E->M state transition) ....60
1.4.2.5.4.2 Write through (S->M state transition) ....61
1.4.3 Processor Data Path Interface ....62
1.4.4 Secondary Tag Interface ....62
1.4.4.1 Organization ....62
1.4.4.2 Theory of Operation ....64
1.4.4.2.1 Address bus Snoop cycle. ....64
1.4.4.2.2 Bus Snoop Cycles vs. CPU Cache Entry States ....66
1.4.4.2.3 Bus Snoop Cycles vs. Pending Cycles ....68
1.4.4.2.3.1 Snoop Hit On a Different Cache Line ....68
1.4.4.2.3.2 Snoop Hit on Pending Line ....69
1.4.4.3 Duplicate Secondary Tag Protocol ....75
1.4.4.3.1 Snoop Hit/Miss With No State Change ....75
1.4.4.3.2 Snoop Hit With State Change (Clean Line Hit) ....76

1.4.4.3.3 Snoop hit with state change (modified line write back) 77
1.4.4.3.4 Cacheable Read And Snoop ....78
1.4.5 .... APIC Interface79
1.4.6 SCAN Interface....79
1.4.7 Miscellaneous Interface....79
1.5 SOFTWARE VISIBLE REGISTERS....79
1.5.1 Register Mapping....79
1.5.2 Begin_init....80
1.5.2.1 Control/Status Register 2....80
1.5.2.2 CC_Error Register....82
1.5.2.3 ISA_Map Registers....83
1.5.2.4 Cacheability Barricade Address Register....85
1.5.2.5 Programmable Attribute Map Registers....85
1.5.2.6 MBC Revision Register....86
1.5.3 Performance Monitoring Registers....86
1.5.3.1 Performance Monitor Select Register....87
1.6 TESTABILITY....88
1.6.1 IEEE 1149.1....88
1.6.1.1 Boundary Scan....89
1.6.1.2 Internal Scan....89
1.6.1.3 BIST....89
1.7 ELECTRICAL SPECIFICATIONS....89
1.7.1 Power & Ground....89
1.7.2 Maximum Ratings....89
1.7.3 DC Specifications....89
1.7.4 AC Specifications....89
1.8 MECHANICAL SPECIFICATIONS....89
1.8.1 Package Information....89
1.8.2 Package Thermal Specifications....89

1 MEMORY BUS CONTROLLER

1.1 INTRODUCTION

This specification describes a memory bus controller that is responsible for interfacing a P5 processor and a C5C/C8C cache core unit to a high performance, dual 64 bit, split transaction bus. The Memory Bus Controller is also responsible for controlling a duplicate secondary tag directory (DSD) and a Advanced Programmable Interrupt Controller (APIC). It contains a set of registers for identification, error logging, address decode, cacheability, performance monitoring etc.

1.1.1 Product Description

The key features of the Memory Bus Controller (MBC) are:

1. XA-MP Bus support
2. P5/C5C/C8C support
3. Advanced Programmable Interrupt controller(APIC)
4. Secondary tag control/interface
5. Address Lock
6. Performance monitoring hooks
7. Memory attribute map registers

1.1.2 Revision History

The current version (0.0) is the first revision of this document.

1.1.3 References

1. "XA-MP Bus Target Specification" Revision 0.0
2. "82489DX Advanced Programmable Interrupt Controller"
3. "Preliminary P5 CPU Data Book"
4. "Preliminary C5C/C8C Data Book for the P5 CPU"
5. "Processor Data Path Target Specification" Revision 0.0

1.2 FUNCTIONAL DESCRIPTION

1.2.1 Block Diagram

Figure 1-1 is a high level block diagram of the Memory Bus Controller and the components it supports. An overview of the components can be found in the sections following.

Figure 1-1 Processor Module Block Diagram
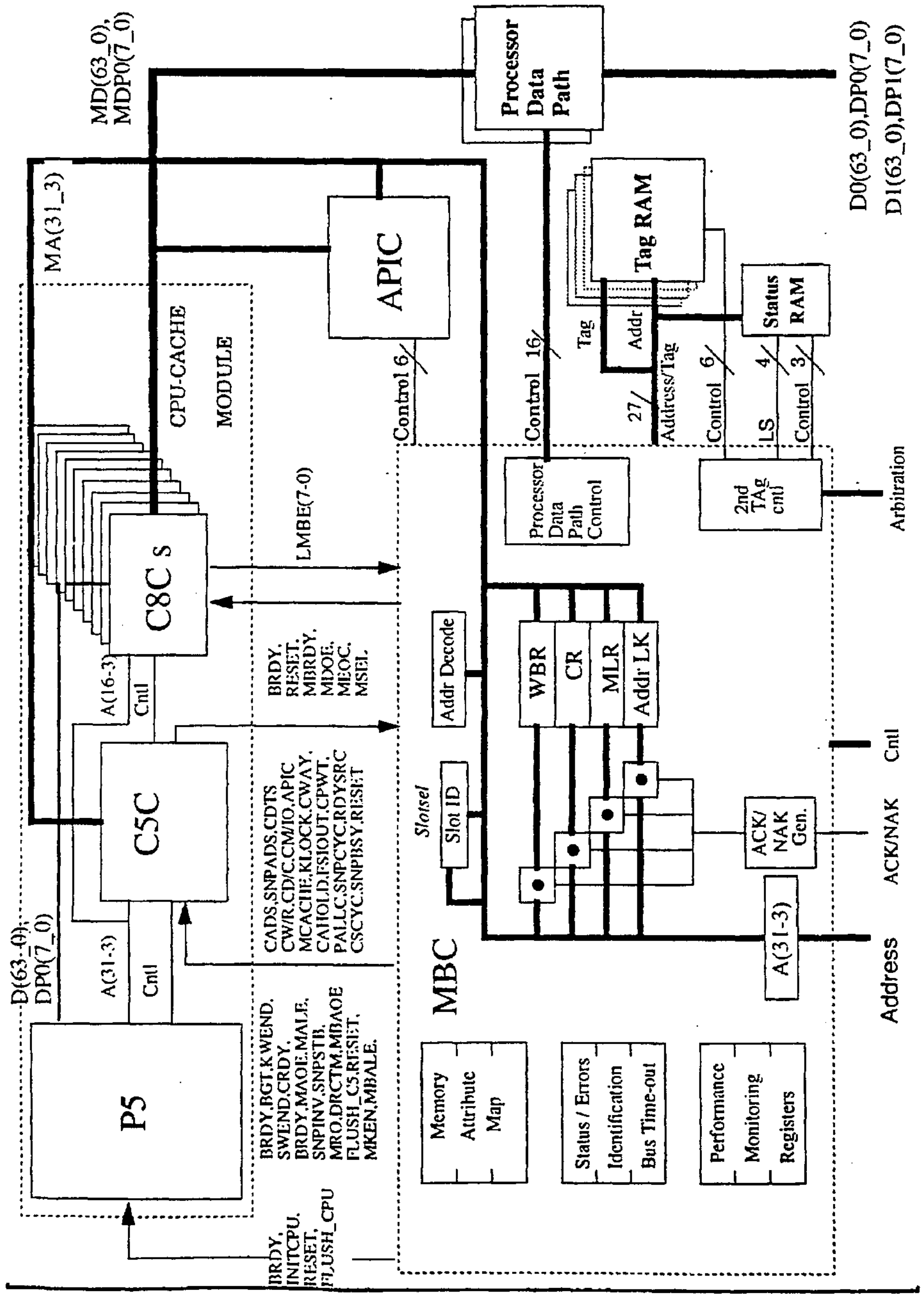

1.2.1.1 XA-MP Bus Functional Summary

The bus that the MBC interfaces to is described in the "XA-MP Bus Target Specification". The following is a summary of the key features of the XA-MP Bus:

1. Demultiplexed 32 bit address bus and dual 64 bit data buses
2. Split transaction - out of order response and in order response support
3. Fair arbitration
4. Flow control - negative acknowledgment and retry mechanism
5. Byte parity protected address and data bus
6. MESI cache coherency support
7. Cache to cache ownership transfer
8. 32 byte block transfer

1.2.1.2 P5/C5C/C8C Functional Summary

The processor/cache core unit supported by the MBC is a P5/C5C/C8C:

Table 1-1 Cache Organization

| Processor/Cache core | 256 K Byte |
|---|---|
| P5/C5C/C8C | 256KB, 32 byte line, 1 line per sector |

The key features of the processor/cache core are:

1. 32 byte line size, 4 transfers per full line access
2. Write allocation for higher cache hit rate
3. Cache to cache ownership transfer
4. MSI cache coherency support, MESI cache coherency For a more detailed description of the P5/C5C/C8C, see their respective specifications: "Preliminary P5 CPU Data Book" and the "Preliminary C5C/C8C Data Book for the P5 CPU".

1.2.1.3 Data Path Functional Summary

The data path is comprised of the following functional blocks:

1. PARITY LOGIC
2. DATA PATH REGISTERS
3. DATA INPUT/OUTPUT

The Data Path supports a 64 bit wide data bus on the processor side and a 64 bit wide data path on the XA-MP Bus side. For a more detailed description of the Data Path, see "Processor Data Path Target Specification".

1.2.1.4 Secondary Tag Functional Summary

The C5C can support cost-effectively a wide range of system designs - from uniprocessor to high end multiprocessor designs. For high end multiprocessor systems, the C5C is designed to be able to optionally support a duplicate secondary tag directory (DSD) by providing signals to the MBC so that the MBC can shadow the C5C externally. Together with the DSD, the MBC provides the following important functions to satisfy the requirements of a high performance shared memory multiprocessor bus:

1. A deterministic two clock snoop turnaround time: the duplicate secondary tag directory allows bus pipelining, a new address can be put out onto the XA-MP Bus every other cycle.

2. Decoupling of the C5C from bus snooping: Here, the DSD will snoop the address bus continuously without C5C involvement. The MBC will only initiate a C5C snoop cycle on a snoop hit that will require a state change in the C5C (based on secondary tag information). While the C5C is busy servicing a snoop cycle, e.g. a snoop hit on a modified line, the duplicate secondary tag directory will continue snooping the bus.

This decoupling eliminates the problem of bus pipeline stalls due to the C5C restricted backoff protocol. The C5C restricted backoff protocol requires that a snoop hit on a modified line be serviced right away. This is because the C5C cannot perform another snoop until the modified line is written back. As a result, a snoop hit on a modified line will stall all CPU/cache units on the bus from putting any new address onto the address bus until the modified line is written back (intervene cycle).

The DSD eliminates most of the possible bus pipeline/CPU stalls by snooping the address bus continuously while a snoop hit on a modified line is being serviced by the C5C that it is shadowing. The DSD will only refuse (by asserting the Negative Acknowledgment [NAK] line of the XA-MP Bus) to service another snoop hit that will require a C5C state change if the C5C that it is shadowing is busy servicing a snoop hit on a modified line (as indicated by the C5C SNPBSY signal). Since the DSD can continue to snoop the address bus after the NAK assertion cycle, only the NAKed CPU will be stalled. The decoupling also reduces contention between CPU accesses and snoop accesses for the C5C.

The duplicate secondary tag directory is composed of 8K*15 of tag information and 4K*4 of clearable status for the cache lines. While the C5C is configured to support the MSI cache coherency protocol, the duplicate secondary tag directory is configured to maintain a MESI cache coherency bus protocol, further reducing the amount of bus traffic. The difference in cache coherency protocol here will be handled by the MBC via C5C write filtering and bus snoop filtering.

1.2.1.5 APIC Functional Summary

The Advanced Programmable Interrupt Controller (APIC) is a support device for Multi-Processor (MP) systems integrating interrupt control, and timers. The APIC is connected to the processor/cache core through an interrupt line, a local address bus, and a local data bus. However, it relies on the MBC to assert the ready/chip select signals. For a more detailed description of the APIC, see the "82489DX Advanced Programmable Interrupt Controller" specification.

1.2.2 Sub-Blocks

1.2.2.1 Arbitration Control

The Arbitration Control Block (ACB) implements the XA-MP Bus arbitration protocol. The ACB establishes the slice ID at reset, arbitrates multiple simultaneous requests for the Address bus, and determines the requesting slice id for reply cycles. The ACB is composed of the following:

1. Arbitration state machine
2. Slice encoder
3. Arbitration latch register
4. slice identification register
5. Reply slice identification register
6. Address bus grant

1.2.2.2 Request Control

The Request Control Block (RQB) implements the XA-MP Bus command initiation protocols. The RQB signals Command strobe (CS#) and enables the address and data. The RQB takes signals from the C5C and retry logic to make Commands for the XA-MP Bus. The RQB is composed of the following:

1. Request control state machine
2. XA-MP Bus command encoder
3. Response checker
4. CAE control, address and address parity generation

1.2.2.3 Response Control

The Response Control Block (RSB) implements the control of the XA-MP Bus memory-mapped register architecture. The RSB acknowledges XA-MP Bus reads or writes to its memory mapped space, cancels the memory, and acquires data from or sends data to the targeted register. The RSB is composed of the following:

1. Begin_Init Register
2. Register responder
3. Register control state machine

1.2.2.4 Data Recovery

The Data Recovery Block (DRB) implements the XA-MP Bus in order and out of order data transfer protocols. The DRB maintains in-order-queues for the two data buses, acknowledges out of order data transfers to its slice id or in order data transfers to its in order queue. The DRB controls cycle progress signals to the P5/C5C/C8C. The DRB also interfaces to the Data Path Control Block to acquire the bus data and to the RQB for retry in the event of NAKs. The DRB is composed of the following:

1. Out of order responder
2. BGT generator
3. In-order queue/responder-bus#0
4. In-order queue/responder -bus#1
5. MBRDY/BRDY generator

1.2.2.5 Snoop Control

The Snoop Control Block (SCB) implements the flow/control protocol of the XA-MP Bus. The SCB monitors the duplicate secondary tag directory, the associated registers/comparators (MLR, ALR, CR and WBR), and the XA-MP Bus to determine which activity or response is appropriate. The activities and responses that the SCB can initiate are:

1. XA-MP Bus NAK# response
2. XA-MP Bus CDM#, CDS#, MCI# response
3. C5C update activity
4. C5C intervene - write-back
5. C5C intervenes - cache-to-cache ownership transfer The SCB is composed of the following:

1. Snoop state machine
2. Snoop Address Register
3. Snoop Command Register
4. Current Register
5. Modified Line Register
6. Write Back Register
7. Address Lock Register

1.2.2.6 Secondary Tag Control

The Secondary Tag Control Block (STC) implements the duplicate secondary tag directory function. The STC controls the operation of the tag and line status RAMs (which are located off chip). The STC outputs tag address, reads or writes the tag and/ or line status, or checks the tag hit lines. The STC can perform the following:

1. Determine if there is a hit and at what level it occurred.
2. Read any tag in the tag RAMs.
3. Read the line status.
4. Write a new tag into the tag RAMs according to the CWAY signal from the C5C.
5. Write new line status into the line status RAM.
6. Flush the line status RAM to Invalid and the tag RAMs to zeros The STC is composed of the following:

1. Secondary Tag state machine.
2. Line Status Register.
3. Line Status Pipeline Register 1.
4. Line Status multiplexor - 3 X 4.
5. Secondary Tag Register.
6. Secondary Tag Address Register.
7. Secondary Tag Address Pipeline Register 1.
8. Secondary Tag Address multiplexor - 2 X 12.
9. Secondary Tag Address/Tag multiplexors - 4 X 2 and 2 X 25.

1.2.2.7 Cache Attribute Control
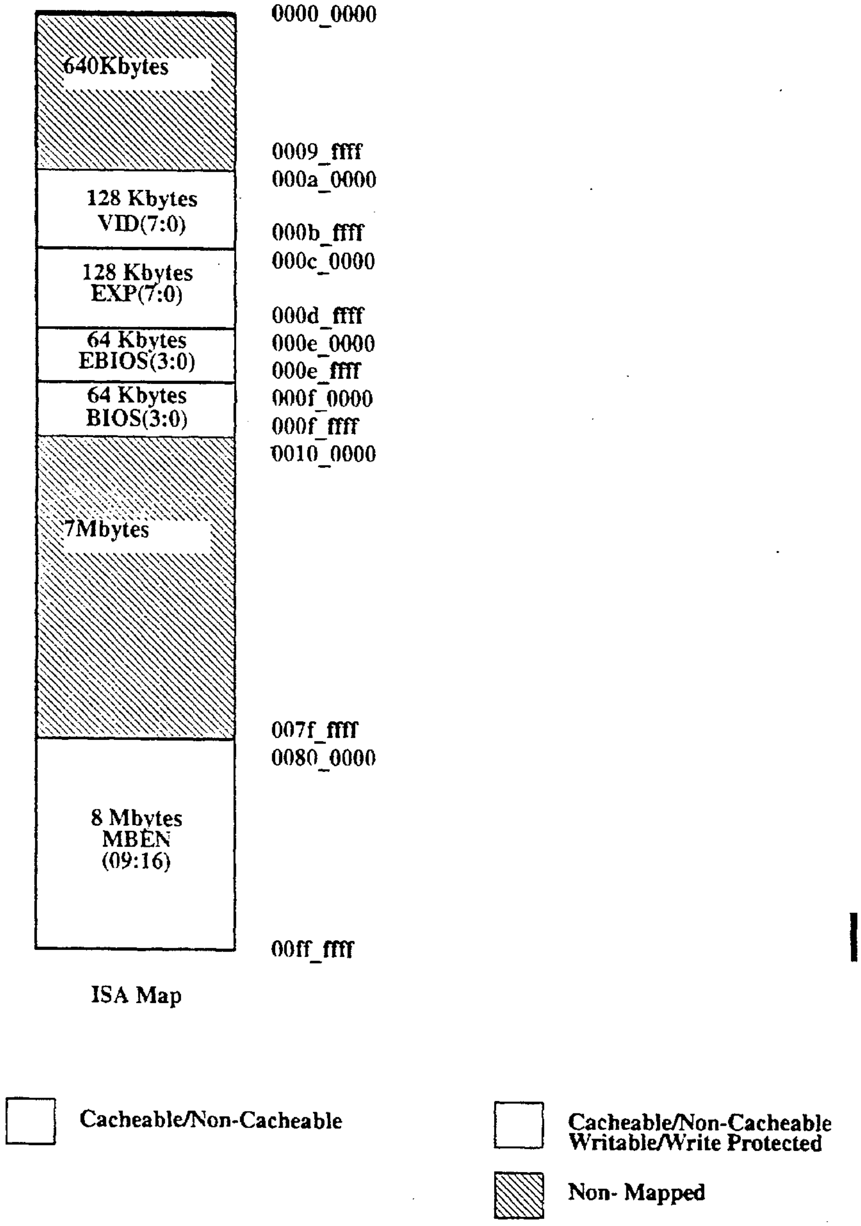
ISA Map

1.2.2.8 Bus Trap Control

T.B.D.

1.2.2.9 Status Control

T.B.D.

1.2.2.10 Performance Monitor Control

T.B.D.

1.2.2.11 APIC Control

T.B.D.

1.2.2.12 Data Path Control

T.B.D.

1.2.2.13 Clock Synchronizer

T.B.D.

1.3 PIN DESCRIPTION

The Memory Bus Controller is responsible for interfacing a P5/C5C/C8C cache core unit to the XA-MP shared memory multiprocessor bus. It is also responsible for controlling a duplicate secondary tag directory, a Advanced Programmable Interrupt controller (APIC) and allowing accesses to its internal registers. The following sections are descriptions of the interfaces and their associated protocols.

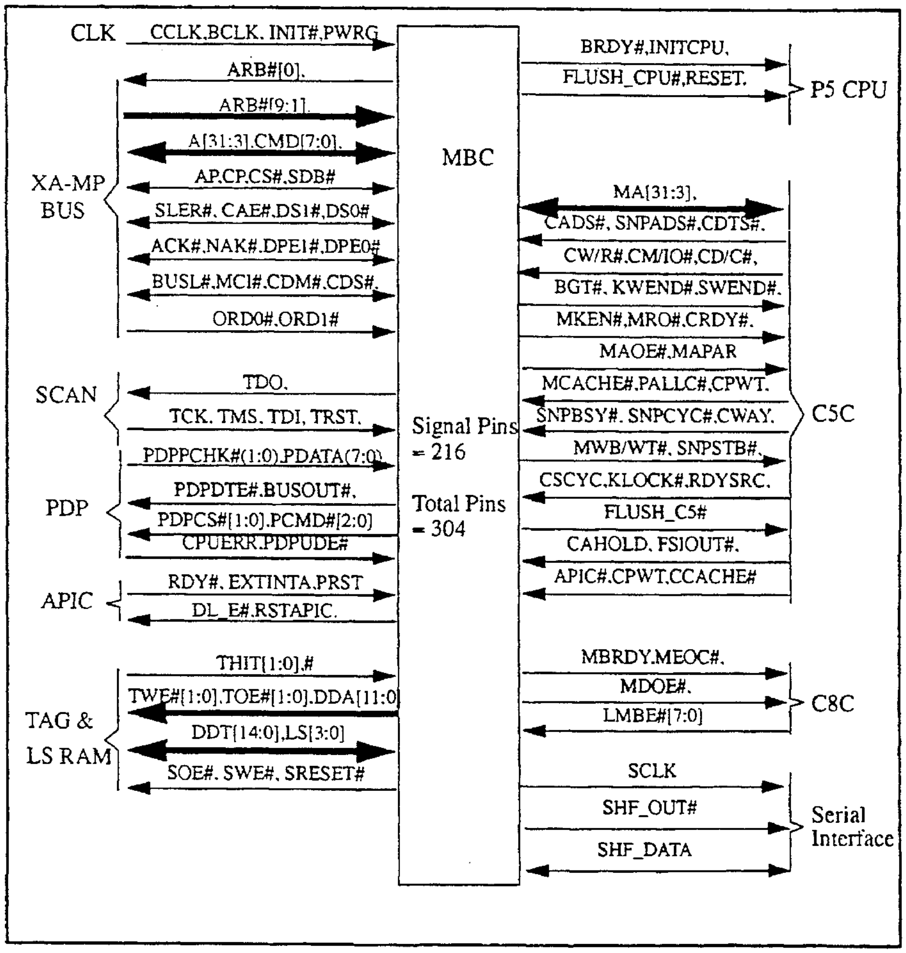

1.3.1 XA-MP Bus Interface Pins

The MBC-System bus interface is a subset of the interface specified in the XA-MP Bus spec. In what follows, only the MBC-system bus specific interface will be listed. The complete functionality and timing of the signals are described in the "XA-MP Bus Target Specification".

Table 1-2 XA-MP Bus Interface

| Signal Name | Type | Description |
|---|---|---|
| A[31:03] | I/O | 29-bit Address bus. |
| ACK# | I/O | ACKnowledge - This signal indicates a Command/Address receive acknowledge from the selected bus agent on the XA-MP Bus. |
| AP | I/O | Address Parity - even parity for address bits A[35:3]. |
| ARB#[0] | O | ARBitration (0) - active low signal every agent asserts to acquire the XA-MP address/command bus. This signal is daisy chained down the bus is such a manner that each slice on the bus will see it as ARBARB#[1], ARB#[2] etc. depending on slot position. |
| ARB#[9:1] | I | ARBitration (9:1) - the collection of all the ARB#[0] signals for every slice on the XA-MP Bus. A slice will use these signals to determine it's position in the arbitration queue, it's slice ID on initialization and the ID of a slice that is making a request on the bus. |
| BUSL# | I/O | BUS Lock. This active low signal is used to indicate that an XA-MP Bus agent is performing a full bus lock operation. |
| CAE# | I/O | Command. Address Error - an active low signal used to indicate the occurrence of a command or address parity error on the bus, signaled by all agents on the bus. |
| CDM# | I/O | Cache Data Modified - an active low signal, used to intervene a memory cycle. |
| CDS# | I/O | Cache Data Shared - an active low signal, used to signal sharing of cache lines. |
| CMD[7:0] | I/O | CoMmanD - an 8-bit command bus. |
| CP | I/O | Command Parity - parity for CMD[7:0]. |
| CS# | I/O | Command Strobe - this active low signal indicates the validity of the data presented on the bus. |
| DPE0# | I/O | Data Parity Error 0. This active low signal indicates that a parity error was detected by a receiving agent on data sent on data bus 0. In the case of single bus word transfers this signal is driven by the receiving agent 2 bus clocks after receipt of the data in error. |
| DPE1# | I/O | Data Parity Error 1. This active low signal indicates that a parity error was detected by a receiving agent on data sent on data bus 1. In the case of single bus word transfers this signal is driven by the receiving agent 2 bus clocks after receipt of the data in error. |
| DS0# | I/O | Data Strobe 0. This active low signal when true indicates valid information on data bus 0 on the next bus clock cycle after the strobe. |
| DS1# | I/O | Data Strobe 1. This active low signal when true indicates valid information on data bus 1 on the next bus clock cycle after the strobe. |

Table 1-2 XA-MP Bus Interface

| Signal Name | Type | Description |
|---|---|---|
| ORD0# | I | ORDered response request 0. This active low signal when true indicates the request of an ordered data response on data bus 0. This signal remains valid until the in-order requestor gains access to the data bus (DS0 goes inactive). |
| ORD1# | I | ORDered response request 1. This active low signal when true indicates the request of an ordered data response on data bus 1. This signal remains valid until the in-order requestor gains access to the data bus (DS1 goes inactive). |
| MCI# | I/O | Memory Cycle Inhibit. An open collector active low signal. This signal causes the memory to abort the current XA-MP Bus cycle it has just accepted. |
| NAK# | I/O | Negative AcKnowledge - an open collector active low signal. The assertion of this signal indicates a busy condition of the receiving agent for the initiated command. |
| PWRG | I | PoWeR Good. This active high signal signifies that nominal operating voltages have been reached. |
| SDB# | I/O | Single Data Bus Enable. This active low signal must be asserted by any slice which does not support Dual Data Buses. All slices should disable their use of Data Bus 1 after detecting SDB# active. |
| SLE# | I/O | SLice Error. This active low signal is used by any slice in the system to indicate that an internal error (fatal or non-fatal) has occurred. This signal is active for 1 bus clock and can be looked at by the by any processor in the system for further processing. The signal can be either synchronous or asynchronous to bus transfers. |
| 66 | | Total Pins |

1.3.2 P5/C5C/C8C Interface

1.3.2.1 P5 Interface

The following are the MBC interfaces to the P5 signals. The complete functionality and timing of the signals are described in the P5 specification

Table 1-3 MBC-P5 Interface

| Signal Name | Type | Description |
|---|---|---|
| BRDY# | O | Burst ReaDY - causes data to be strobed into or out of P5. This signal also drives the C5C and C8Cs. |
| FLUSH_CPU# | O | FLUSH CPU - Forces the CPU to write back all modified lines and invalidate its internal caches. On completion, a special cycle will be generated by the CPU indicating completion of the invalidation and writeback. |
| INITCPU | O | INITialize CPU - forces the P5 to begin execution in a known state |

Table 1-3 MBC-P5 Interface

| Signal Name | Type | Description |
|---|---|---|
| RESET | O | **RESET** - initiates CPU and cache execution at a known state. This signal also drives the PDP. C5C, and C8Cs. The following signals are sample by the C5C at the falling edge of RESET. FLUSH# must be deasserted. |
| 4 | | Total Pins |

| SIGNAL | ASSERTED/DEASSERTED or CLOCKED |
|---|---|
| CFG0 (CNA#) | asserted (high) |
| CFG1 (SWEND#) | deasserted (low) |
| CFG2 (KWEND#) | deasserted (low) |
| CLDRV (BGT#) | deasserted (low) |
| HIGHZ# (MBALE) | asserted (low) |
| MALDRV (SYNC#) | not used by MBC - (pulled up externally) |
| SNPMD (SNPCLK#) | clocked |
| WWOR# (MALE) | deasserted (high) |

1.3.2.2 C5C/C8C Interface Pins

The following are the MBC interfaces to the C5C cache controller. The complete functionality and timing of the signals are described in the C5C/C8C Specification.

Table 1-4 MBC-C5C Interface

| Signal Name | Type | Description |
|---|---|---|
| APIC# | I | **Advanced Programmable Interrupt controller** address decoding - when active indicates that the current address is an APIC address (0 FEE0 0000 to 0 FEE0 03FF). This is the chip select for the APIC. |
| BGT# (CLDRV) | O | **B**us **G**uaranteed **T**ransfer - generated by the MBC to indicate that it is committed to completing a given cycle. Until BGT# is active, the CPU-cache chip set owns the cycle and may abort the cycle upon an intervening bus snoop. Once BGT is asserted, the MBC owns the cycle, freeing the chip set for other operations.<br><br>CLDRV - Cache **L**ow **DR**i**V**e - determines the drive strength of the connections between the C5C and C8C. must be low during RESET for 512K cache and high for 256K cache. |
| CADS# | I | Cache **AD**dress **S**trobe - generated by the C5C to request that the MBC execute an XA-MP Bus cycle |
| CAHOLD | I | Cache Address **HOLD** - CAHOLD is asserted at the falling edge of FSIOUT if the BIST passes in the C5C |
| CCACHE# | I | CPU **CACHE**. This active low signal is a latched version of the P5 CPU Cache# output signal during a CPU cycle on the XA-MP Bus. CCACHE# is used by the MBC to determine the proper number of BRDY#s to provide to the CPU. |
| CD/C# | I | Cycle Data/Command control indicates whether current cycle is code or data. |
| CDTS# | I | Cache **D**a**T**a **S**trobe - indicates CPU data is available in the next clock on writes, indicates the earliest period in which BRDY# may be asserted on reads. |
| CM/IO# | I | Cycle Memory/Input-Output control |
| CPCD | I | CPU **P**age **C**ache **D**isable |
| CPWT | I | CPU **P**age **W**rite **T**hrough |
| CRDY# (SLFTST#) | O | Cache memory bus **ReaDY** - indicates to the CPU-cache chip set that a cycle has completed and makes chip set resources available for the next cycle. This signal also drives the C8Cs.<br><br>SLFTST# (**S**e**LF** **T**e**ST**) active with MBALE on the falling edge of RESET invokes the self-test of the C5C |
| CSCYC | I | CPU Split **CYC**le Indication - Indicates a split Lock cycle. |
| CW/R# | I | Cycle **W**rite/**R**ead control - indicates whether current cycle is a read or a write |
| CWAY | I | Cache **WAY** - driven by the C5C to indicate the WAY to be used by the requested cycle. |
| FLUSH_C5# | O | Cache **FLUSH** - causes the CPU-cache chip set to write all modified lines to memory and invalidate all tag locations. |

Table 1-4 MBC-C5C Interface

| Signal Name | Type | Description |
|---|---|---|
| FSIOUT# | I | Flush, Sync, Initialization **OUT** - indicates the start and end of the flush |
| KLOCK# | I | Cache **LOCK** - tracks the P5 LOCK# signal |
| KWEND# (CFG2) | O | Cacheability Window **END** - generated by the MBC to indicate to the CPU-cache chip set that the cacheability window (the period during which cacheability is determined) has expired. When KWEND# is asserted, the CPU-cache chip set latches the memory cacheability signal (MKEN#) and makes determinations based on the cacheability attribute. Memory Read Only (MRO#) is also sampled at this point.<br><br>CFG2 - ConFiGuration bit 2 - CFG(2:0) determine the cache size, line ratio, and tag size. CFG2 is low for the 256K cache. |
| MA[31:3] | I/O | Memory Address - address bus to the C5C comprised of the following three fields:<br><br>SIGNAL — DESCRIPTION<br>MCFA(5:0) — Memory bus Configurable Address lines<br>MSET(10:0) — Memory bus SET number<br>MTAG(11:0) — Memory bus TAG bits<br>MA(4:3) — Memory sub-line address |
| MAOE# | O | Memory Address Output Enable - output enable control for the C5C output buffers. |
| MAPAR | O | Memory Address **PAR**ity. When MAOE#=1, MAPAR reflects address parity for the line address, i.e. MA[31:5], provided to the C5C. |
| MCACHE# | I | Memory **CACHE** internal cacheability - indicates cycle cacheability attribute from C5C, with MKEN indicates how many BRDYs the MBC must return on a read request, both must be active for a cache line read. |
| MKEN# | O | Memory Cache **EN**able -signals cacheability to C5C, with MCACHE indicates how many BRDYs the MBC must return on a read request, both must be active for a cache line read. |
| MRO# | O | Memory **R**ead Only - designates current line as read only |
| MWB_WT# | | Memory Write-Back/Write-Through. Signals whether requested line is marked as write-back or write-through. |
| PALLC# | I | Potential **ALL**oCate - generated by the C5C and indicates that the current write cycle can potentially allocate a cache line. |
| RDYSRC | I | ReaDy SouRCe - indicates the source of the CPU BRDY# generation. When high indicates the MBC should supply the BRDY#; when low the C5C will supply the BRDY# signal. |
| SNPADS# | I | SNooP **AD**dress Strobe - initiates a snoop write-back cycle. Functions the same as CADS but is valid only on write back cycles. When SNPADS is active the MBC aborts all pending cycles. |

Table 1-4 MBC-C5C Interface

| Signal Name | Type | Description |
|---|---|---|
| SNPBSY# | I | SNooP BuSY - indicates additional snoop processing in progress. |
| SNPCYC# | I | SNooP CYCle - indicates snoop look-up is occurring in the C5C tag RAMs. |
| | | Signal SNPINV - will be logical 1 on the C5C. MBC Snoops always invalidate. |
| SNPSTB# | O | SNooP STroBe - initiates a snoop in the C5C |
| SWEND# (CFG1) | O | Snoop Window END - generated by the MBC to indicate that the snoop window has ended. When SWEND# is asserted, the CPU-cache chip set latches DiReCt To Modified (DRCTM#). When a cycle begins, the chip set prevents snooping until it receives SWEND#. The chip set can then update its tag RAM.<br>CFG1 - ConFiGuration bit 1 - CFG(2:0) determine the cache size, line ratio, and tag size. CFG1 is low for the 256K cache. |
| 60 | | Total Pins |

The following are the MBC interfaces to the C8C cache memory device. The complete functionality and timing of the signals are described in the C5C/C8C Specification.

Table 1-5 MBC-C8C Interface[a]

| Pin Name | Type | Description |
|---|---|---|
| LMBE#(7:0) | I | Memory Byte ENables latched in the C8C - one per C8C |
| MBRDY# | O | Memory Burst ReaDY - burst ready input to C8C memory buffers |
| MDOE# | O | Memory Data Output Enable - tri-states or enables C8C memory data outputs |
| MEOC# | O | Memory End Of Cycle - ends a C8C cycle and switches internal C8C buffers |
| 11 | | Total Pins |

a. 10 C8C's are required for each 256K of cache RAM.

1.3.3 Data Path Interface Pins

The following are the MBC interfaces to the Processor Data Path signals. The complete functionality and timing of the signals are described in the PDP specification.

Table 1-6 MBC-Data Path Interface

| Signal Name | Type | Description |
|---|---|---|
| CPUERR# | I | **CPU ERR**or - Asserted in response to the occurrence of a CPU error. See "Processor Data Path Target Specification" for details. |
| BUSOUT# | O | **BUS OUT**put enable - this signal, used in conjunction with the PDPCE#[1:0], enables the bus data and bus parity in the PDP onto the XA-MP Bus. |
| PDPCE#(1:0) | O | **PDP** Command **E**nable - this signal selects one of the two PDPs for operation. |
| PCMD[2:0] | O | **PDP** Co**M**man**D** - these signals, used in conjunction with the PDPCS#[1:0], flow from the MBC to PDP and are used to issue commands to the PDP. (see command table below) |
| PDATA(7:0) | I/O | **PDP DATA** - this 8 bit path provides an interface between the PDP and MBC for transferring PDP control information and provides a path for the MBC internal registers to be transferred to and from the XA-MP Bus. |
| PDPDTE# | O | **PDP** **D**a**T**a **E**nable - this signal, used in conjunction with the PDPCS#[1:0], enables the data and parity in the PDP onto the cache data bus. |

| DESCRIPTION | PCMD2 | PCMD1 | PCMD0 |
|---|---|---|---|
| Inactive/reserved for external device | 0 | 0 | 0 |
| load MBC register into PDP<br>PDATA(7:0) = 0 - register read | 0 | 0 | 1 |
| read error field | 0 | 1 | 0 |
| load parity control | 0 | 1 | 1 |
| load MBC register from PDP | 1 | 0 | 0 |
| read word/line data returned to C8C<br>PDATA(7:0) = 0 - read line ordered<br>PDATA(7:0) = 1 - read word ordered<br>PDATA(7:0) = 2 - read line out of order<br>PDATA(7:0) = 3 - read word out of order<br>PDATA(7:0) = 4 - force read line of all zero<br>PDATA(7:0) = 5 - force read word of all zero | 1 | 0 | 1 |
| write word/line<br>PDATA(7:0) = 0 - write line<br>PDATA(7:0) = 1 - write word<br>PDATA(7:0) = 4 - abort write | 1 | 1 | 0 |
| reserved | 1 | 1 | 1 |

Table 1-6 MBC-Data Path Interface

| Signal Name | Type | Description |
|---|---|---|
| PDPPCHK#(1:0) | I | **PDP** Parity **CHecK** - an active low data parity error signal from the PDP to the MBC generated due to parity errors on data transfers. This signal is latched by the error status register of the MBC. |
| PDPUDE# | I | **PDP** Uncorrected **Data Error** - an active low signal used to indicate that the data presently inside the PDP contains an uncorrected error. |
| 19 | | Total Pins |

1.3.4 Secondary Tag Interface Pins

The MBC is responsible for controlling the duplicate secondary tag directory (comprised of four 4K*8 Tag RAMs and one 4K*8 SRAM) and its related logic (Figure 1-2). The states of the cache entries (MESI) are stored in the SRAM. On active CS# (qualified with BCLK), the address on the system bus is latched for second tag lookup. The tables below describe the required interface pins.

Table 1-7 MBC-Tag RAM Interfaces

| Signal Name | Type | Description |
|---|---|---|
| DDA(11:0) | O | Duplicate Directory Address - the address for the duplicate directory. |
| DDT(14:0) | I/O | Duplicate Directory Tag - the tag for the duplicate directory. |
| LS[3:0] | I/O | Line Status - the following is the functionality of each of the bits. |
| SOE# | O | SRAM Output Enable - asserted on tag lookup. |
| SWE# | O | SRAM Write Enable - asserted on tag update. |
| SRESET# | O | SRAM **RESET** - resets the contents of the SRAM and invalidates all cache lines. |
| THIT[1:0] | I | Tag **HIT** - THIT0 and THIT1 are ORed outputs of each of the two tag RAMs(TAG0 and TAG1, respectively). If THIT0/THIT1 is one, then there is an address/tag match. However, whether there ia a snoop hit or will also be dependent on the outputs(states) of the SRAM. |

LS[3:0] line status bits:

| Line Status | LS1 | LS0 |
|---|---|---|
| | LS[3]:LS[2] | LS[1]:LS[0] |
| Modified | 0 : 1 | 0 : 1 |
| Exclusive | 1 : 1 | 1 : 1 |
| Shared | 1 : 0 | 1 : 0 |
| Invalid | 0 : 0 | 0 : 0 |

Table 1-7 MBC-Tag RAM Interfaces
| Signal Name | Type | Description |
|---|---|---|
| TOE#(1:0) | O | Tag RAM Output Enable. |
| TWE#[1:0] | O | Tag Write Enable - used to update the tag RAM on a cache line replacement. |
| 40 | | Total Pins |
Figure 1-2 MBC connections to Tag RAMS and SRAM
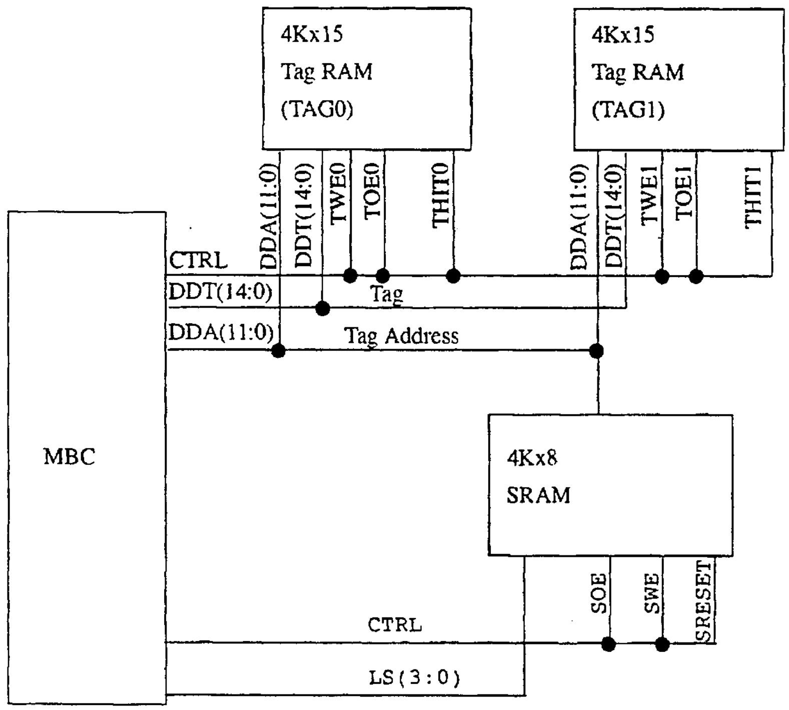

1.3.5 APIC Interface Pins

The MBC-APIC interface is a subset of the interface specified in the APIC spec. The complete functionality and timing of the signals are described in the APIC Specification.

Table 1-8 MBC-APIC Interfaces

| Signal Name | Type | Description |
|---|---|---|
| RDY# | I | **ReaDY** - indicates that the current bus cycle complete. |
| EXTINTA | I | **EXTernal INTerrupt Acknowledge** - asserted by the APIC when an external interrupt controller is expected to respond to the INTA cycle instead of the local APIC. This signal is used for compatibility with the 8259A interrupt controller. |
| PRST | I | Processor **ReSeT** |
| RSTAPIC | O | **ReSeT APIC** |
| DL_E# | O | Data Latch Enable |
| 5 | | Total Pins |

1.3.6 SCAN Interface Pins

Table 1-9 SCAN Path and Control

| Signal Names | Type | Description |
|---|---|---|
| TCK | I | Test ClocK - for IEEE 1149 JTAG |
| TDI | I | Test serial Data Input - for IEEE 1149 JTAG |
| TDO | O | Test serial Data Output - for IEEE 1149 JTAG |
| TMS | I | Test Mode Select - for IEEE 1149 JTAG |
| TRST | I | Test ReSeT - for IEEE 1149 JTAG |
| 5 | | Total Pins |

1.3.7 Miscellaneous Pins

The serial interface is used to load in the slice revision field (SLR) into the Slice ID Register, the slice identification number field (SIN) of the Slice Type Register, the single bus configuration bit (SBC) of the Control/Status Register and store out the phase indicator field (PH) bits and indicator bit (IND) of the Control/Status Register. The load in bits are input on the SHF_DATA pin in the order SLR(0), SLR(1) ... SLR(7), SIN(0), SIN(1), ... SIN(15), SBC. The phase indicator field (PH) bits and indicator bit (IND) of the Control/Status Register are stored out on the SHF_DATA pin in the order PH(0), PH(1), ... PH(6), IND .

Figure 1-3 Timing- External Serial Interface - STORE OUT

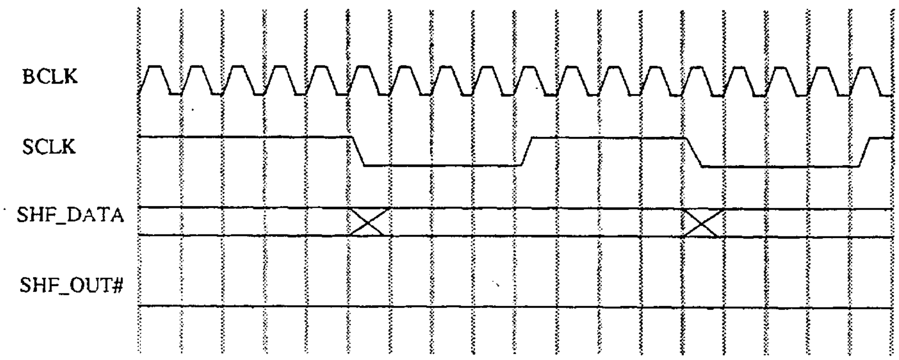

Figure 1-4 Ti ming- External Serial Interface - LOAD IN

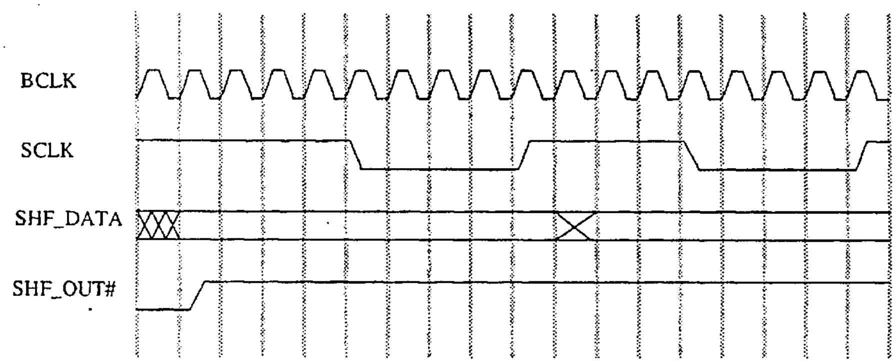

Table 1-10 Serial Interface

| Signal Names | Type | Description |
|---|---|---|
| SCLK | O | Shift CLocK - Approx 4MHZ ( BCLK/8 ) |
| SHF_OUT# | O | **SHiFt OUT** - Active Low direction of transfer - normally asserted(low) |
| SHF_DATA | I/O | **SHiFt DATA** - serial data in/out |
| 3 | | Total Pins |

Table 1-11 Initialization and Control

| Signal Names | Type | Description |
|---|---|---|
| BCLK | I | system Bus CLocK |
| CLK | I | CPU CLocK |

Table 1-11 Initialization and Control

| Signal Names | Type | Description |
|---|---|---|
| INIT# | I | RESET/Initialization |
| 3 | | Total Pins |

Table 1-12 MBC PIN SUMMARY

| | |
|---|---|
| 66 | XA-MP Bus Interface pins |
| 4 | P5 Interface pins |
| 71 | C5C/C8C Interface pins |
| 19 | Processor Data Path interface pins |
| 40 | Secondary Cache Tag Interface pins |
| 5 | APIC Interface pins |
| 5 | SCAN Path and Control |
| 3 | Serial Shift Interface |
| 3 | Initialization and Control |
| 216 | Total Pins |
| 304 | Grand Total - MBC total + power and ground |

1.3.8 Pin Assignments

1.4 OPERATION

1.4.1 XA-MP Bus Interface

Table 1-13 MBC XA-MP Bus Commands

| Command | Type | Function |
|---|---|---|
| RCL(0) | Cache | Read Cache Line. This command requests a cache line transfer, without requiring the invalidation of any other shared or exclusive cache lines |
| RIL(0) | Cache | Read & Invalidate Cache Line. This command is used to read a cache line for an Allocation. All caches in the system invalidate their matching cache line. |
| WCL | Cache | Write Cache Line. This command is used to write modified cache lines back to memory. This occurs due to either a line replacement or intervenes. |
| PICL | Cache | Processor Invalidate Cache Line. This address only command (no data is transferred) all caches in the system to invalidate their matching cache line. |

Table 1-13 MBC XA-MP Bus Commands

| Command | Type | Function |
|---|---|---|
| RLR | Cache | Read Line Response. This command is used by an intervening cache to transfer a cache line to the requesting agent. |
| RBW(0) | Memory | Read Bus Word. RBW(0) uses a single address to read data up to the width of the bus (8 bytes). The valid bytes on the bus are indicated on the second cycle of the command when the byte lane controls are asserted on address signals A[15:08]. The command strobe remains asserted for the duration of the byte lane controls on the address bus. Any set of contiguous byte lanes is valid on the bus. |
| WBW | Memory | Write Bus Word. WBW uses a single address to write data up to the width of the bus. The valid bytes on the bus are indicated on the second cycle of the command when the byte lane controls are asserted on address signals A[15:08]. The command strobe remains asserted for the duration of the byte lane controls on the address bus. Any set of contiguous byte lanes is valid on the bus. |
| RWR | Memory | Read Word Response. This command is similar to write bus word except that address bits A[15:08] contain the slice ID of the original requesting agent. |
| RBWL(0) | Locking | Read Bus Word (Lock). This command is identical to RBW(0) except it indicates to bus units that the first half of an memory address locking operation has started. This command causes the requesting agent to load it's Address Lock Register with the bus word address, which will be used to NAK any lock requests to that bus word until the lock operation is complete. |
| WBWL | Locking | Write Bus Word (Lock). This command is identical to WBW except it indicates to bus units the completion of an memory address lock operation. This command completes the lock operation and causes the requesting agent to clear it's Address Lock Register. |
| IOR(0) | I/O | I/O Read. IOR(0) allows the read of I/O data to the byte level. The address references the bus word location in I/O space. The valid bytes on the bus are indicated on the second cycle of the command when the byte lane controls are asserted on address signals A[15:08]. The command remains asserted for the duration of the byte lane controls on the address bus. Any set of contiguous byte lanes is valid on the bus. |

Table 1-13 MBC XA-MP Bus Commands

| Command | Type | Function |
|---|---|---|
| IOW | I/O | I/O Write. IOW allows the write of I/O data to the byte level. The address references the bus word location in I/O space. The valid bytes on the bus are indicated on the second cycle of the command when the byte lane controls are asserted on address signals A[15:08]. The command remains asserted for the duration of the byte lane controls on the address bus. Any set of contiguous byte lanes is valid on the bus. |
| INTA | PC Compatible | Interrupt Acknowledge. This command is used by an agent to acknowledge external interrupts that require the interrupt vector be read directly from the interrupting source instead of the APIC. This functionality is most useful in reading the interrupt vector from the cBIC which may have certain interrupts in PC compatible mode. This cycle is identical to IOR, with the byte lane control being indicated on the second cycle of the command on address signals. A[15:08]. in the same manner as RBW. The 8-bit interrupt vector is to be returned on data bus byte 0 Dx[7:0], with all other bytes returning zeros with good parity. |

The following table illustrates the encoding

Table 1-14 Memory Reads

| | RCL | RBW | RBW | RBWL | RIL |
|---|---|---|---|---|---|
| CADS | ASRT[a] | | | | |
| CM/IO | MEMORY | | | | |
| CW/R | READ | | | | |
| MCACHE | ASRT | DEAS[b] | X[c] | X | X |
| KLOCK | DEAS | DEAS | DEAS | ASRT | DEAS |
| RDYSRC | ASRT | ASRT | ASRT | X | DEAS |
| MKEN | ASRT | X | DEAS | X | X |

a. ASRT means signal is ASseRTed: active low = low; active high = high
b. DEAS means signal is DEASserted: active low = high; active high = low
c. don't care - may be either asserted or deasserted

Table 1-15 Memory Writes

| | PICL | SQUASH | WCL | WBWL | WBW | WBW | WBW | WBW |
|---|---|---|---|---|---|---|---|---|
| CADS | ASRT | | | | | | | |
| CPCD | DEAS | X | X | X | ASRT | X | X | X |
| CPWT | DEAS | X | X | X | X | ASRT | X | X |

Table 1-15 Memory Writes

| | PICL | SQUASH | WCL | WBWL | WBW | WBW | WBW | WBW |
|---|---|---|---|---|---|---|---|---|
| CM/IO | MEMORY | | | | | | | |
| CW/R | WRITE | | | | | | | |
| MRO | DEAS | X | X | X | X | X | X | ASRT |
| MKEN | X | ASRT | X | X | X | X | DEAS | X |
| MCACHE | DEAS | X | ASRT | X | DEAS | DEAS | DEAS | DEAS |
| PALLC | DEAS | ASRT | X | X | X | X | ASRT | DEAS |
| KLOCK | DEAS | X | X | ASRT | DEAS | DEAS | DEAS | DEAS |

Table 1-16 I/O and Special Cycles

| | IOR | IOW | INTA | Special |
|---|---|---|---|---|
| CADS | ASRT | | | |
| CM/IO | I/O | I/O | I/O | X |
| CD/C | DATA | DATA | CODE | CODE |
| CW/R | READ | WRITE | READ | WRITE |
| EXTINTA | | | ASRT | |

Table 1-17 Snoops

| | WCL | RLR |
|---|---|---|
| SNPADS | ASRT | |
| MLR | Active | Inactive |

1.4.1.1 RCL(0) - Ordered Read Response

Figure 1-4 shows relative timing positions and does not depict actual bus sequences (i.e. a NAKed RCL(0), a cancelled RCL(0), etc.). This is an example of a line fill from memory.

The XA-MP Bus signals are synchronous and change on the rising edge of BCLK. The signals to P5/C5C/C8C are synchronous with either BCLK or CCLK. For details of the P5/C5C/C8C, see their respective target specifications.

Specification 60600215 IM-2 R0.1 EPS-1 *DRAFT* Revision A
Figure 1-5 Timing- RCL(0)- Ordered Read Response
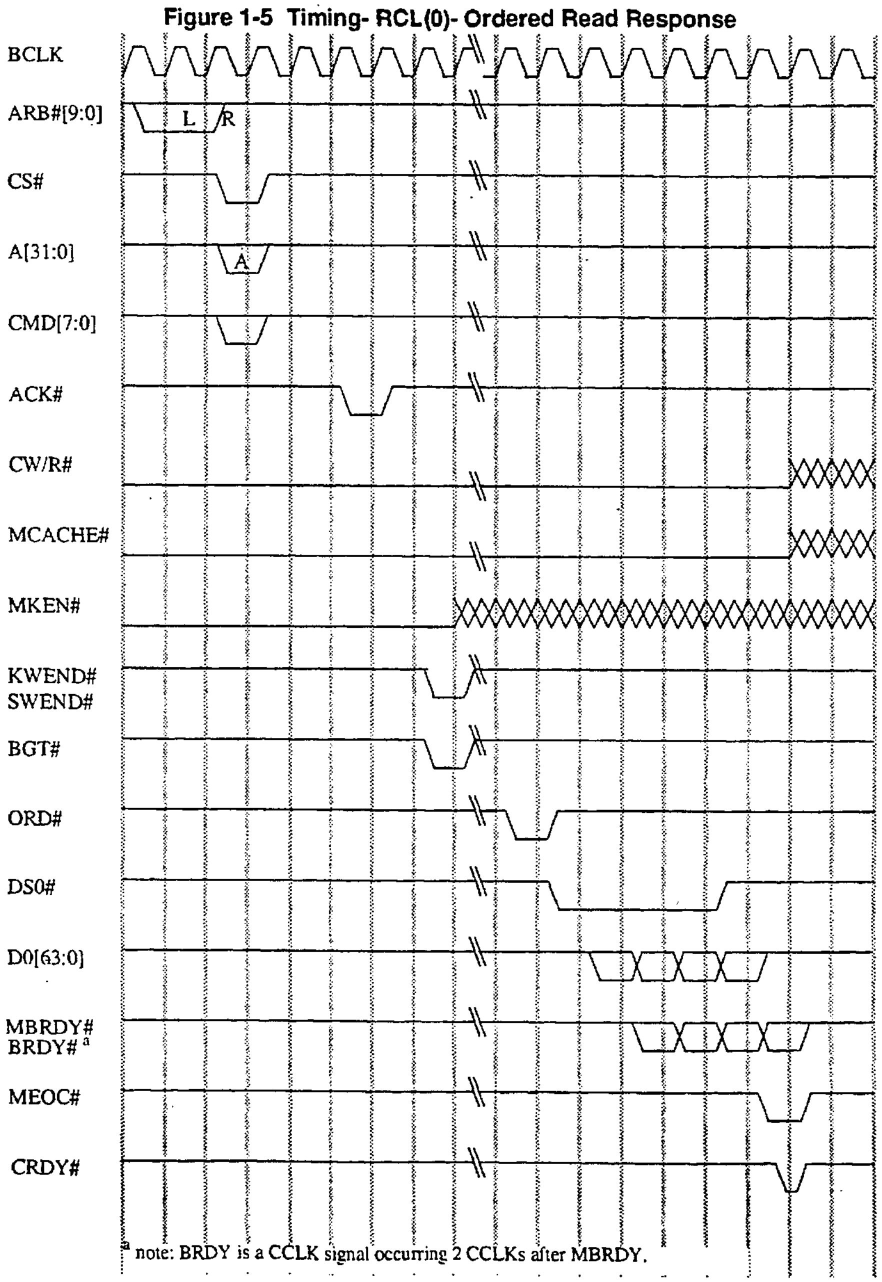
[a] note: BRDY is a CCLK signal occurring 2 CCLKs after MBRDY.

1.4.1.2 RIL(0) -Ordered Read Response

Figure 1-5 shows relative timing positions and does not depict actual bus sequences (i.e. a NAKed RIL(0), a cancelled RIL(0), etc.). The allocation fills the line from memory and places the line status in the modified state directly.

The XA-MP Bus signals are synchronous and change on the rising edge of BCLK. The signals to P5/C5C/C8C are synchronous with either BCLK or CCLK. For details of the P5/C5C/C8C, see their respective T-Specifications.

Figure 1-6 Timing- RIL(0) - Ordered Read Response
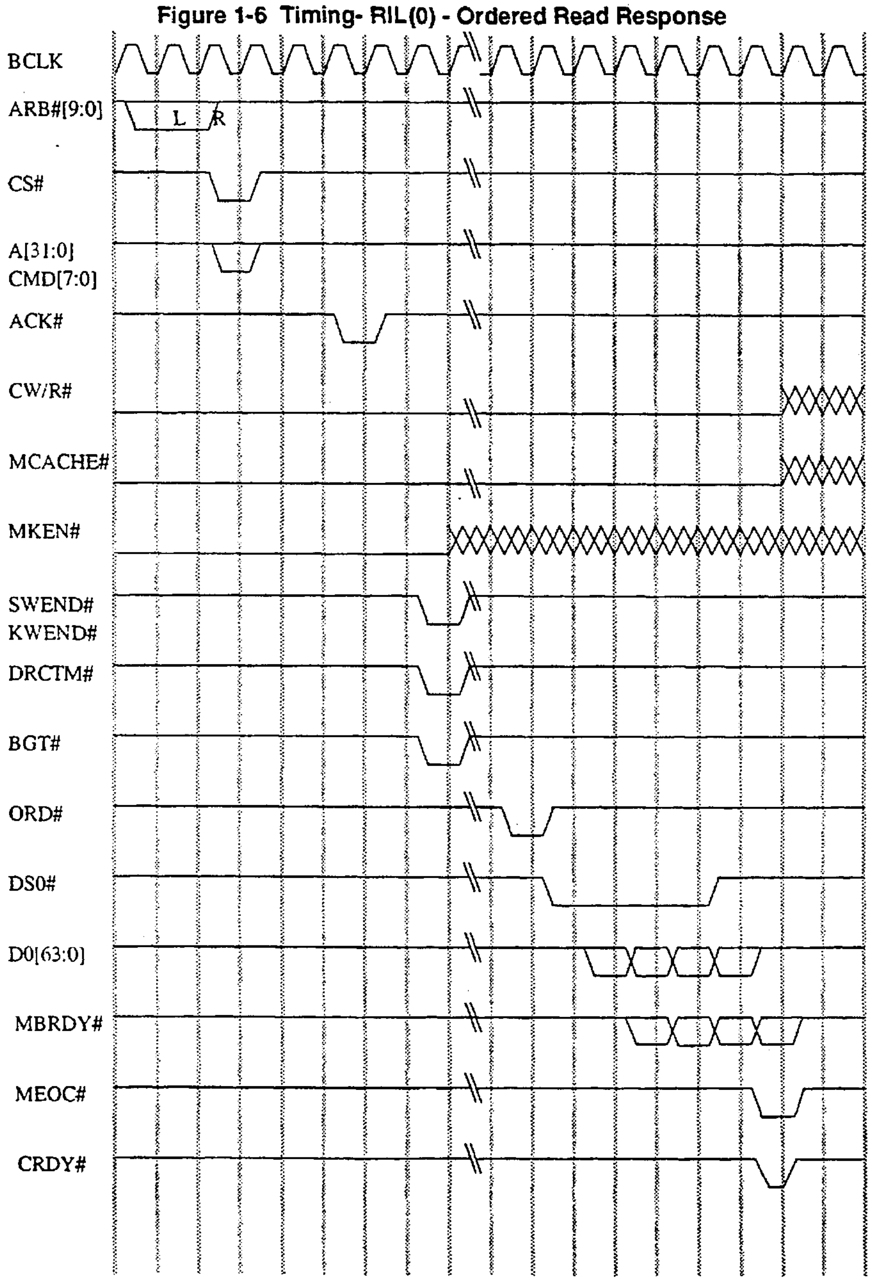

1.4.1.3 RCL(0) - Out Of Order Read Response

Figure 1-6 shows relative timing positions and does not depict actual bus sequences (i.e. a NAKed RCL(0), a cancelled RCL(0), etc.). This is an example of a line fill from a cache- to -cache transfer. The signal DRCTM# is asserted at the acknowledgment phase due to the assertions of ACK#, CDM#, and MCI#.During the transfer of data, the signals MBRDY, MEOC#, & CRDY are asserted to the P5/C5/C8 when the data is error free.

The XA-MP Bus signals are synchronous and change on the rising edge of BCLK. The signals to P5/C5C/C8C are synchronous with either BCLK or CCLK. For details of the P5/C5C/C8C, see their respective T-Specifications.

| Specification 60600215 | IM-2 R0.1 EPS-1 | ***DRAFT*** Revision A |
|---|---|---|
Figure 1-7 Timing- RCL(0) - Out Of Order Read Response
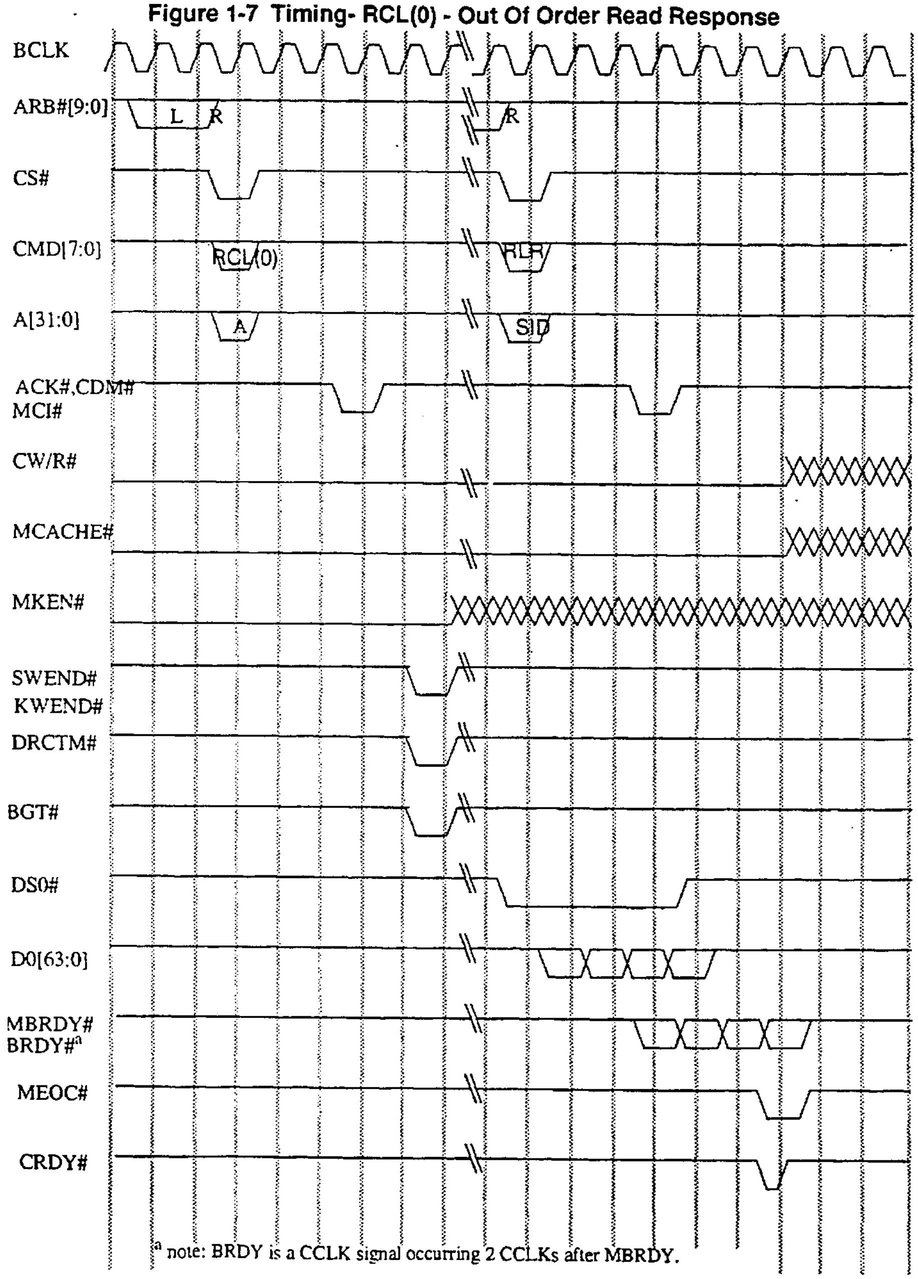
[a] note: BRDY is a CCLK signal occurring 2 CCLKs after MBRDY.

1.4.1.4 WCL Cycle

Figure 1-7 shows relative timing positions and does not depict actual bus sequences (i.e. a NAKed WCL, a cancelled WCL, etc.). The WCL is used for dirty line replacements and intervene write-backs.

The XA-MP Bus signals are synchronous and change on the rising edge of BCLK. The signals to P5/C5C/C8C are synchronous with either BCLK or CCLK. For details of the P5/C5C/C8C, see their respective T-Specifications.

Specification 60600215 IM-2 R0.1 EPS-1 *DRAFT* Revision A
Figure 1-8 Timing - WCL Cycle
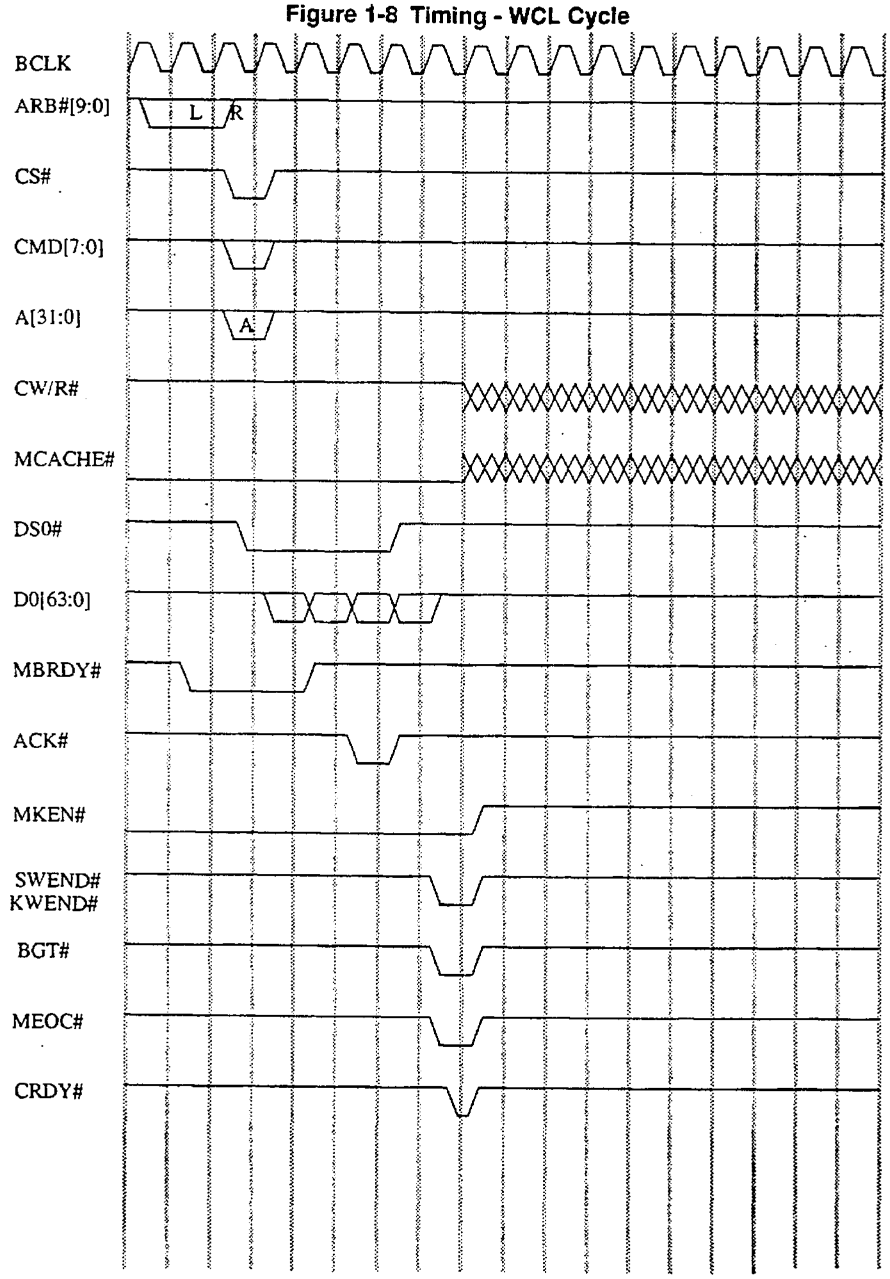

1.4.1.5 PICL Cycle

Figure 1-8 shows relative timing positions and does not depict actual bus sequences (i.e. a NAKed PICL, etc.). The PICL is used for S->M line state changes. The write-through is squashed.

The XA-MP Bus signals are synchronous and change on the rising edge of BCLK. The signals to P5/C5C/C8C are synchronous with either BCLK or CCLK. For details of the P5/C5C/C8C, see their respective T-Specifications.

Figure 1-9 Timing - PICL Cycle

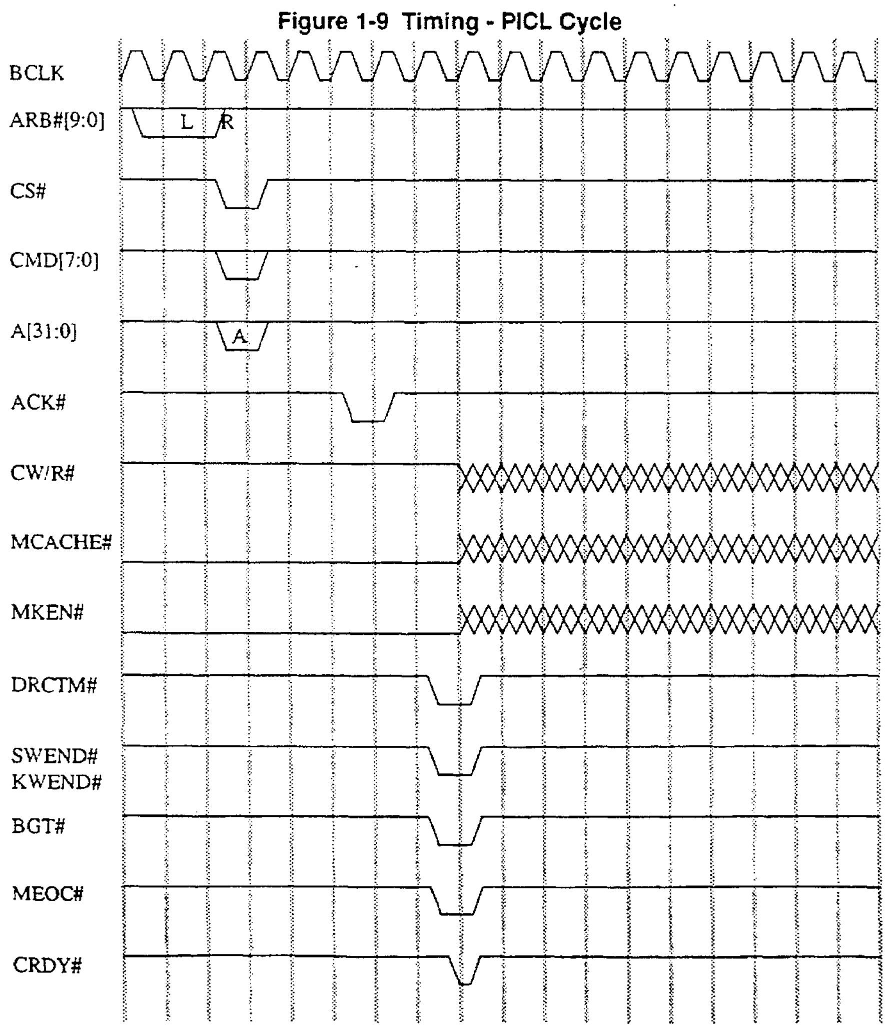

1.4.1.6 RLR Cycle
Figure 1-9 shows timing positions of the RLR.
The XA-MP Bus signals are synchronous and change on the rising edge of BCLK. The signals to P5/C5C/C8C are synchronous with either BCLK or CCLK. For details of the P5/C5C/C8C, see their respective T-Specifications.
Figure 1-10 Timing -RLR Cycle
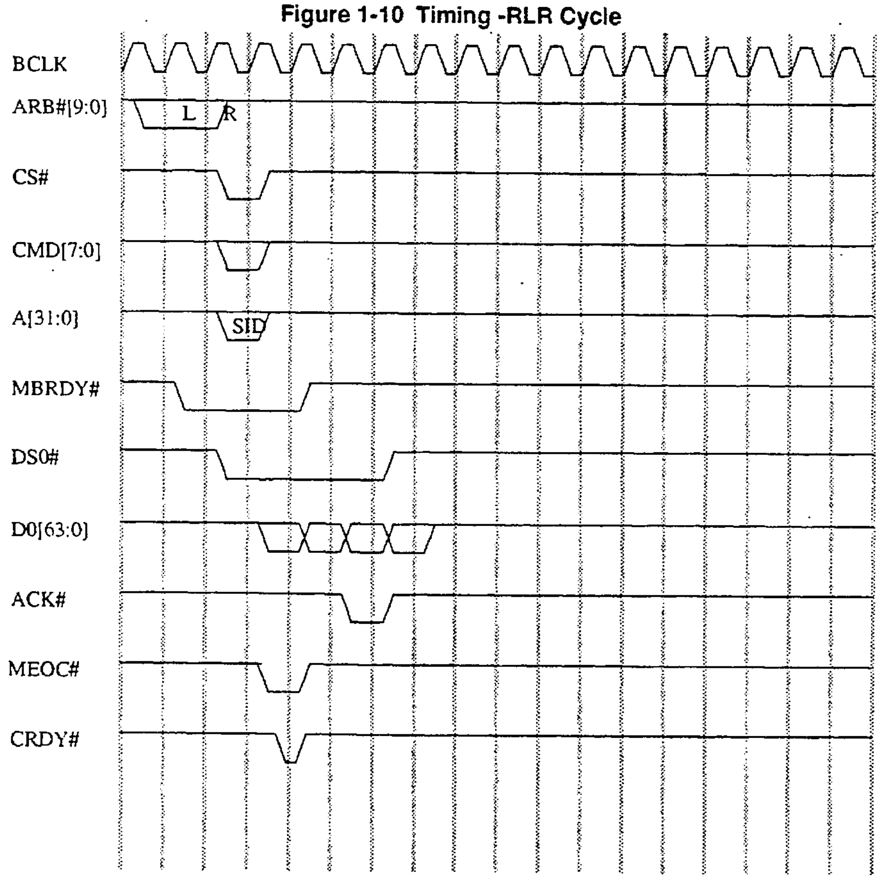

1.4.1.7 RBW(0) and RBWL(0) -Ordered Read Response

Figure 1-10 shows relative timing positions and does not depict actual bus sequences (i.e. a NAKed RBW(0), a cancelled RBW(0), etc.). The XA-MP Bus signals are synchronous and change on the rising edge of BCLK. The signals to P5/C5C/C8C are synchronous with either BCLK or CCLK. For details of the P5/C5C/C8C, see their respective T-Specifications.

Figure 1-11 Timing - RBW(0)/RBWL(0)-Ordered Read Response
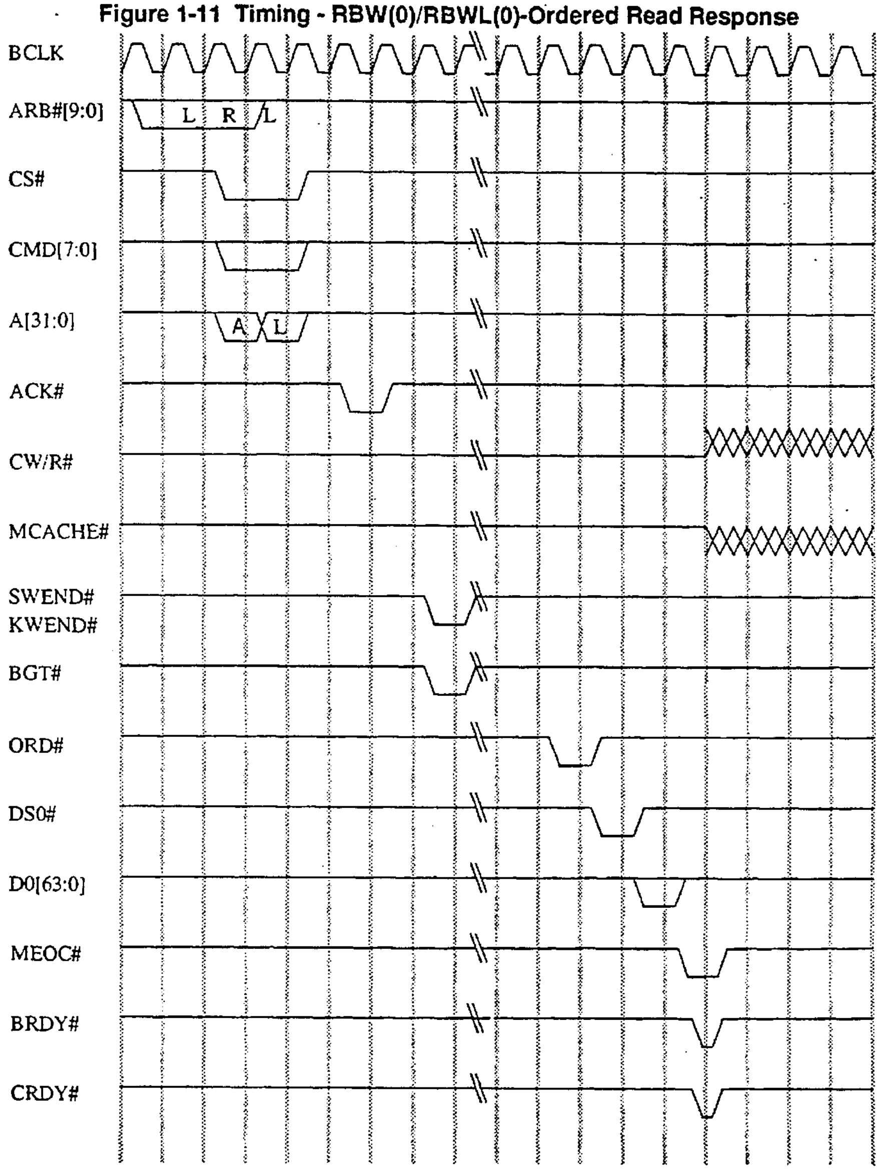

1.4.1.8 RBW(0) and RBWL(0) - Out Of Order Read Response

Figure 1-11 shows relative timing positions and does not depict actual bus sequences (i.e. a NAKed RBW(0), a cancelled RBW(0), etc.). The XA-MP Bus signals are synchronous and change on the rising edge of BCLK. The signals to P5/C5C/C8C are synchronous with either BCLK or CCLK. For details of the P5/C5C/C8C, see their respective T-Specifications.

Figure 1-12 Timing -RBW(0) and RBWL(0) - Out Of Order Read Response
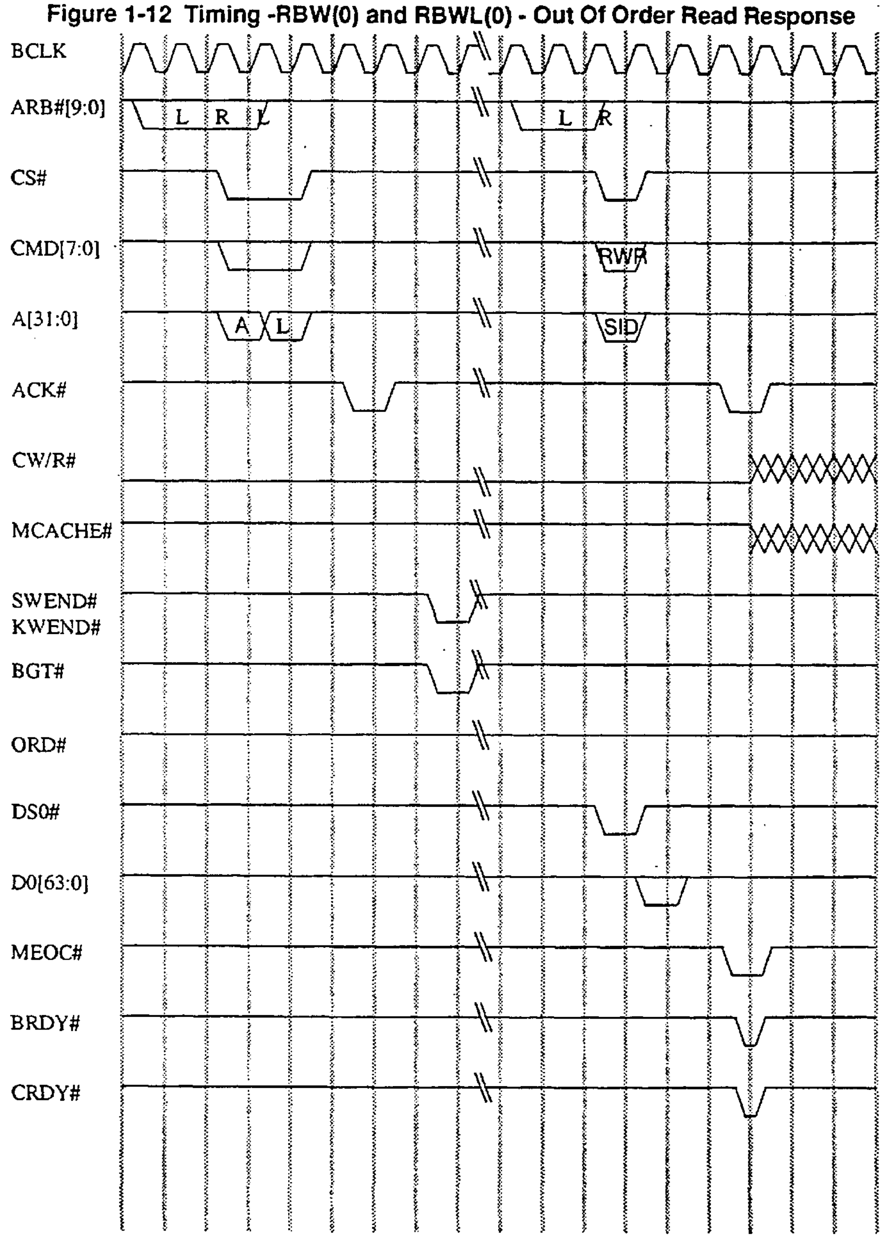

1.4.1.9 WBW and WBWL Cycle

Figure 1-12 shows the relative timing positions and does not depict actual bus sequences (i.e. a NAKed WBW, a cancelled WBW, etc.). The XA-MP Bus signals are synchronous and change on the rising edge of BCLK. The signals to P5/C5C/C8C are synchronous with either BCLK or CCLK. For details of the P5/C5C/C8C, see their respective T-Specifications.

Figure 1-13 Timing - WBW/WBWL cycle
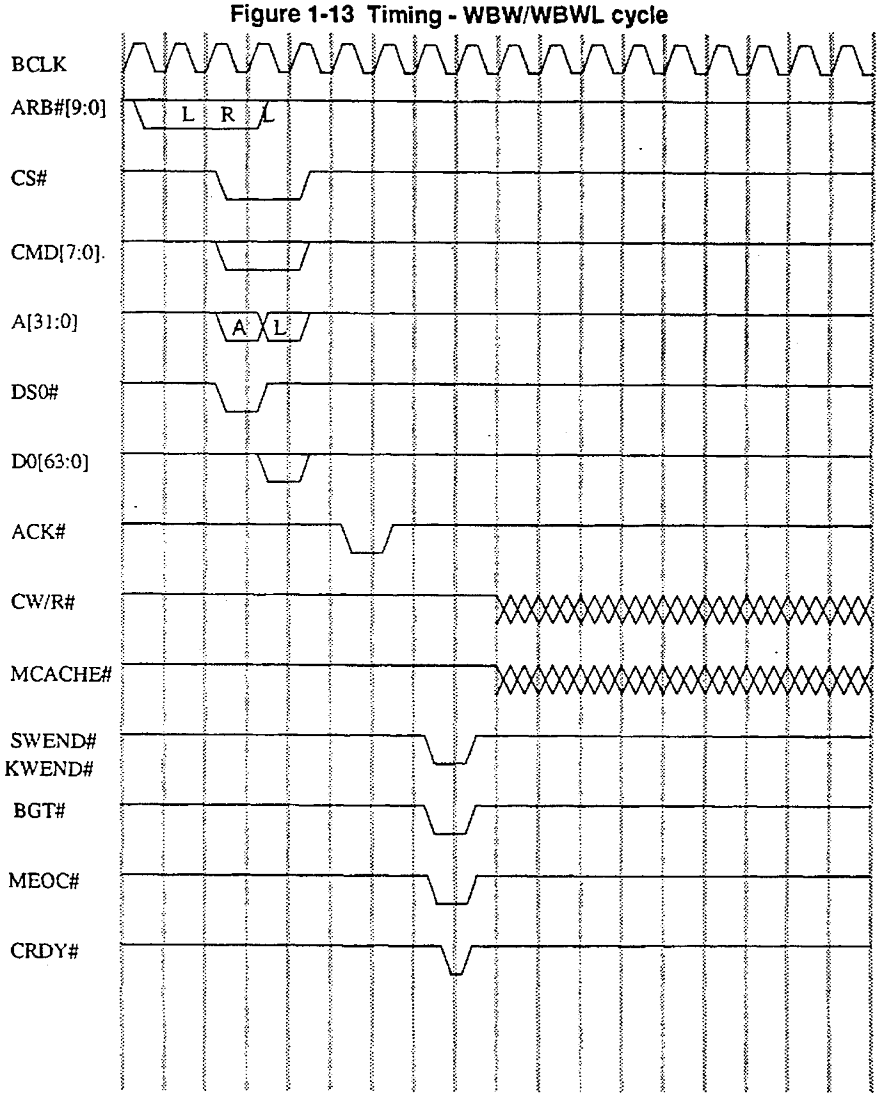
1.4.1.10 RWR Cycle
Figure 1-13 shows timing positions of the RWR. The RWR is used for responding to a register read within the MBC.

The XA-MP Bus signals are synchronous and change on the rising edge of BCLK. The signals to P5/C5C/C8C are synchronous with either BCLK or CCLK. For details of the P5/C5C/C8C, see their respective T-Specifications.

Figure 1-14 Timing - RWR Cycle

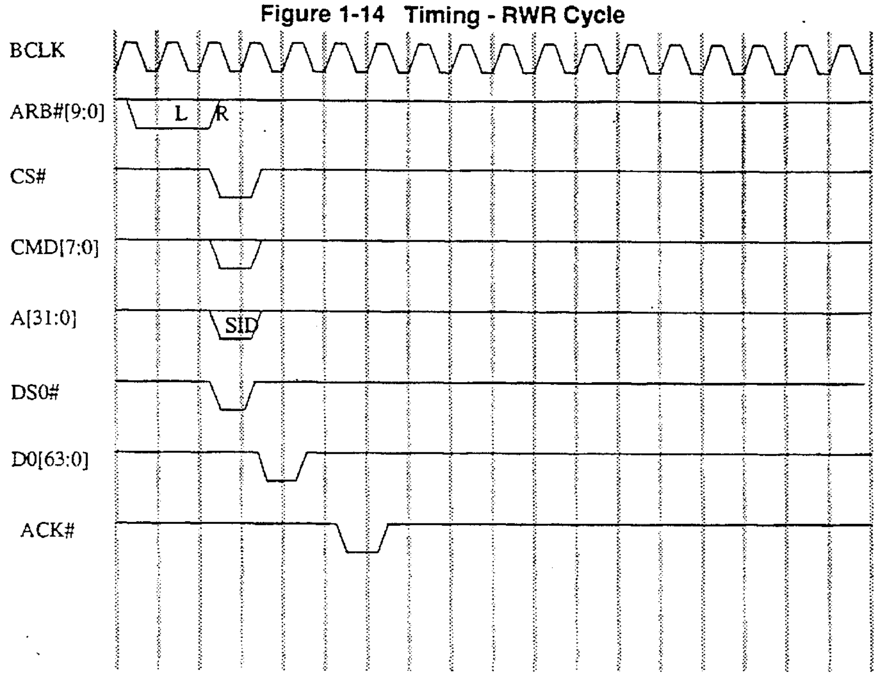

1.4.1.11 IOR(0) Cycle

Figure 1-14 shows the relative timing positions and does not depict actual bus sequences.The XA-MP Bus signals are synchronous and change on the rising edge of BCLK. The signals to P5/C5C/C8C are synchronous with either BCLK or CCLK. For details of the P5/C5C/C8C, see their respective T-Specifications.

Figure 1-15 Timing - IOR(0) Cycle
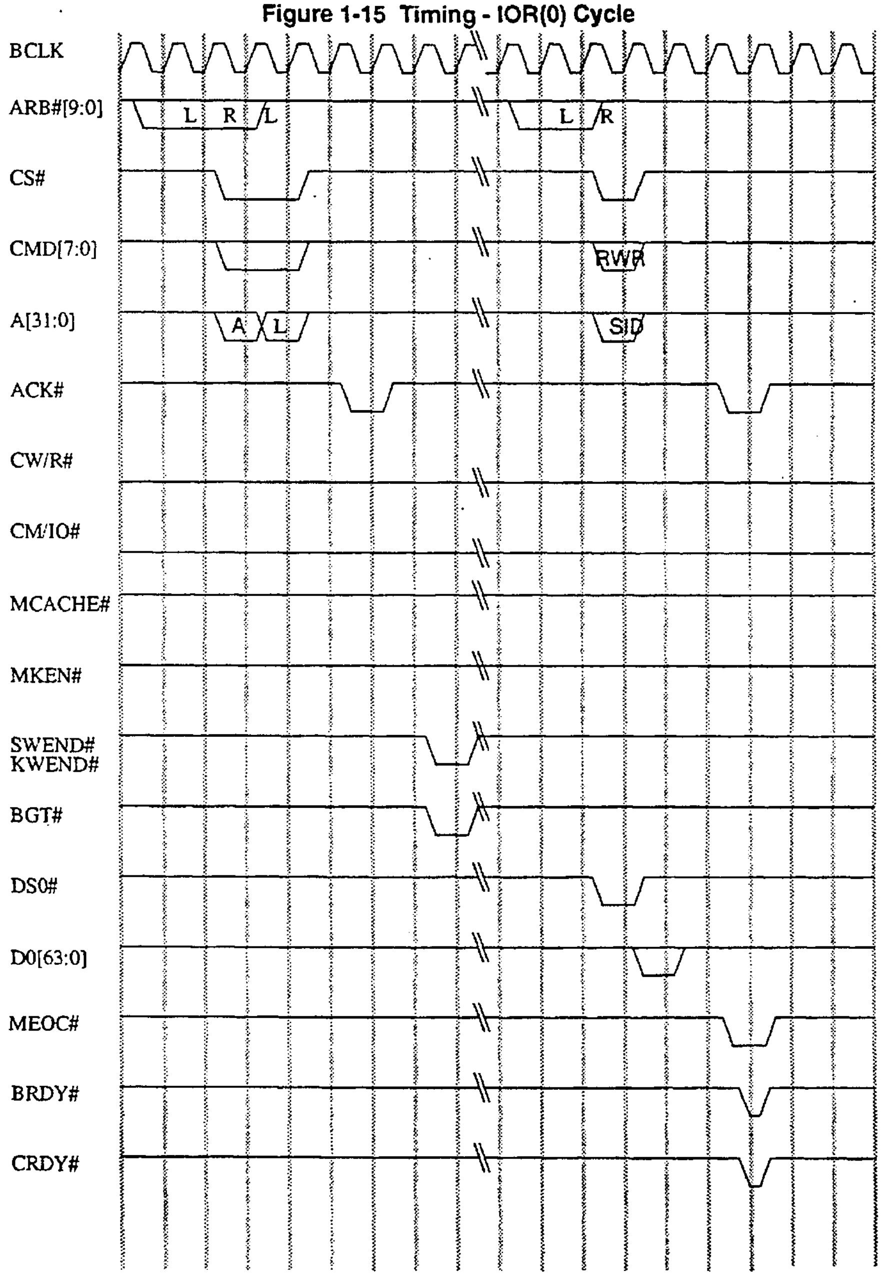

1.4.1.12 IOW Cycle

Figure 1-15 shows the relative timing positions and does not depict actual bus sequences.The XA-MP Bus signals are synchronous and change on the rising edge of BCLK. The signals to P5/C5C/C8C are synchronous with either BCLK or CCLK. For details of the P5/C5C/C8C, see their respective T-Specifications.

Figure 1-16 Timing - IOW cycle
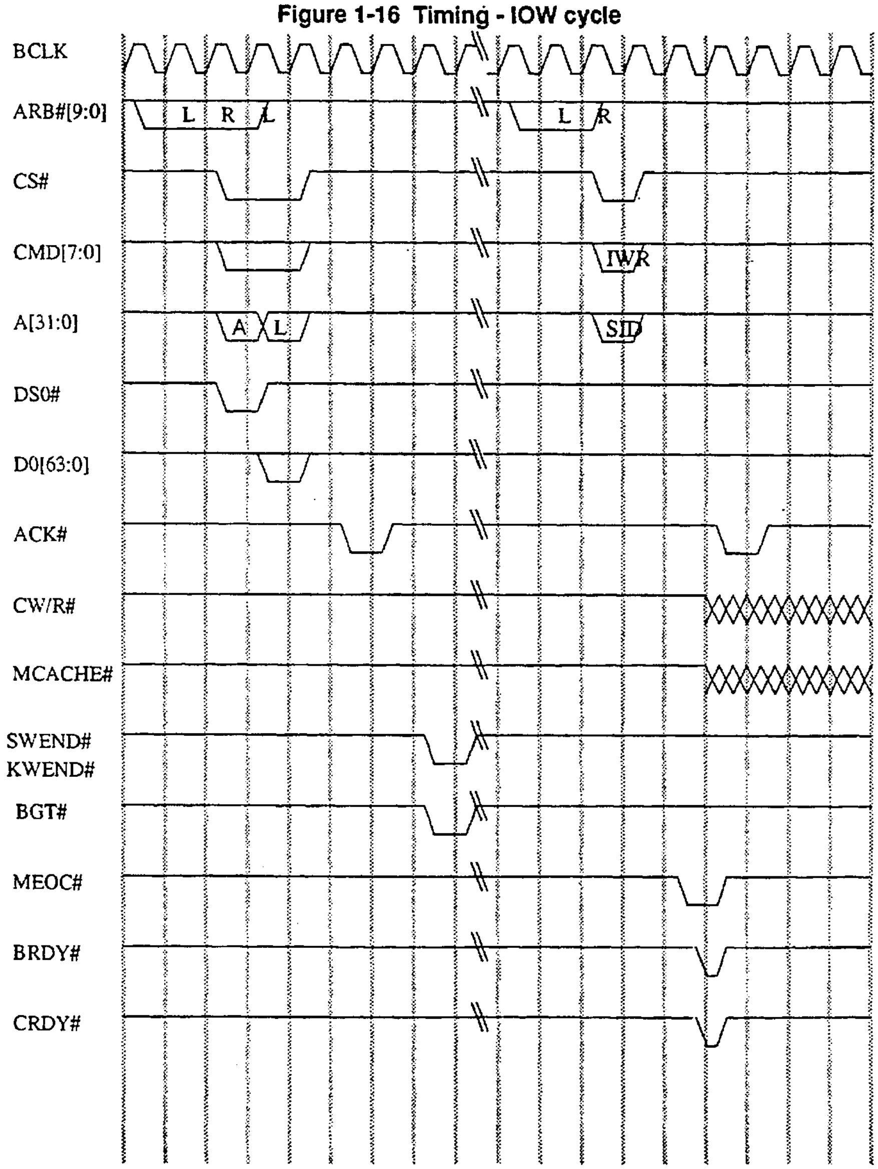

1.4.1.13 INTA(0) Cycle

Figure 1-16 shows the relative timing positions and does not depict actual bus sequences.The XA-MP Bus signals are synchronous and change on the rising edge of BCLK. The signals to P5/C5C/C8C are synchronous with either BCLK or CCLK. For details of the P5/C5C/C8C, see their respective T-Specifications.

Figure 1-17 Timing - INTA(0) Cycle
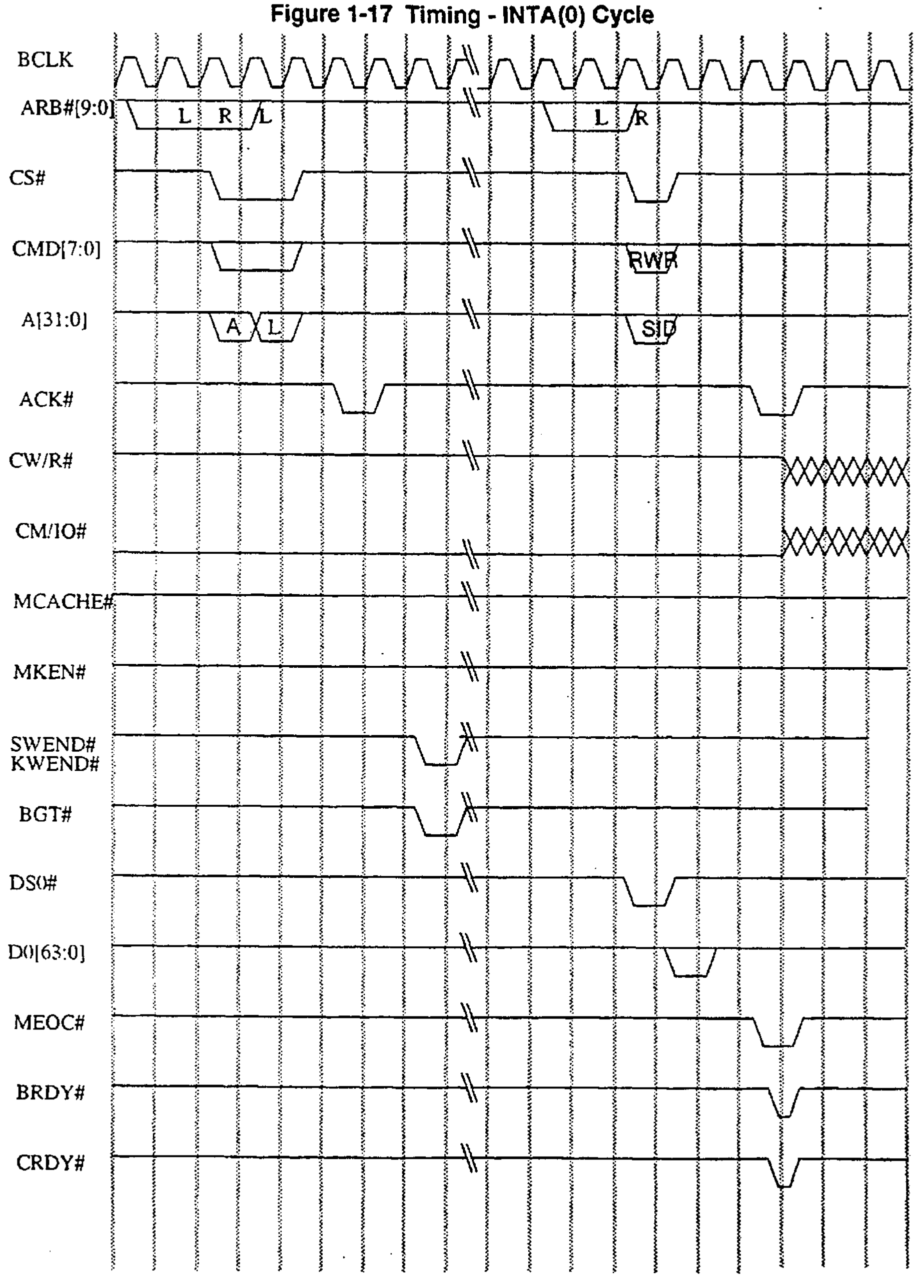

1.4.1.14 Special Cycle
Figure 1-16 shows the relative timing positions and does not depict actual bus sequences. The signals to P5/C5C/C8C are synchronous with either BCLK or CCLK. For details of the P5/C5C/C8C, see their respective T-Specifications.
Figure 1-18 Timing - Special Cycles
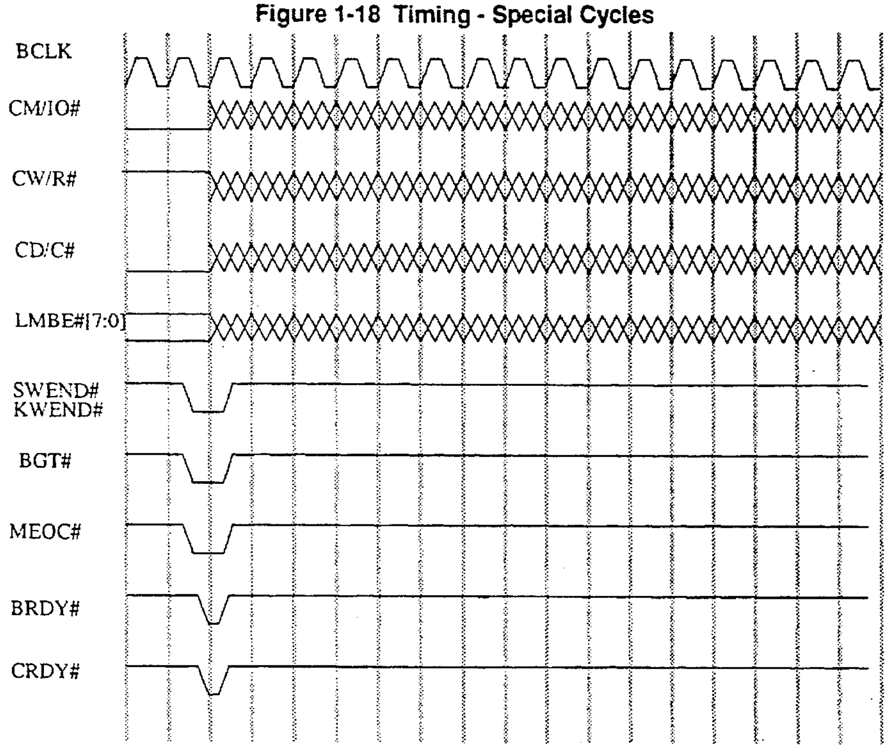

Figure 1-19 Timing - FLUSH Special Cycle
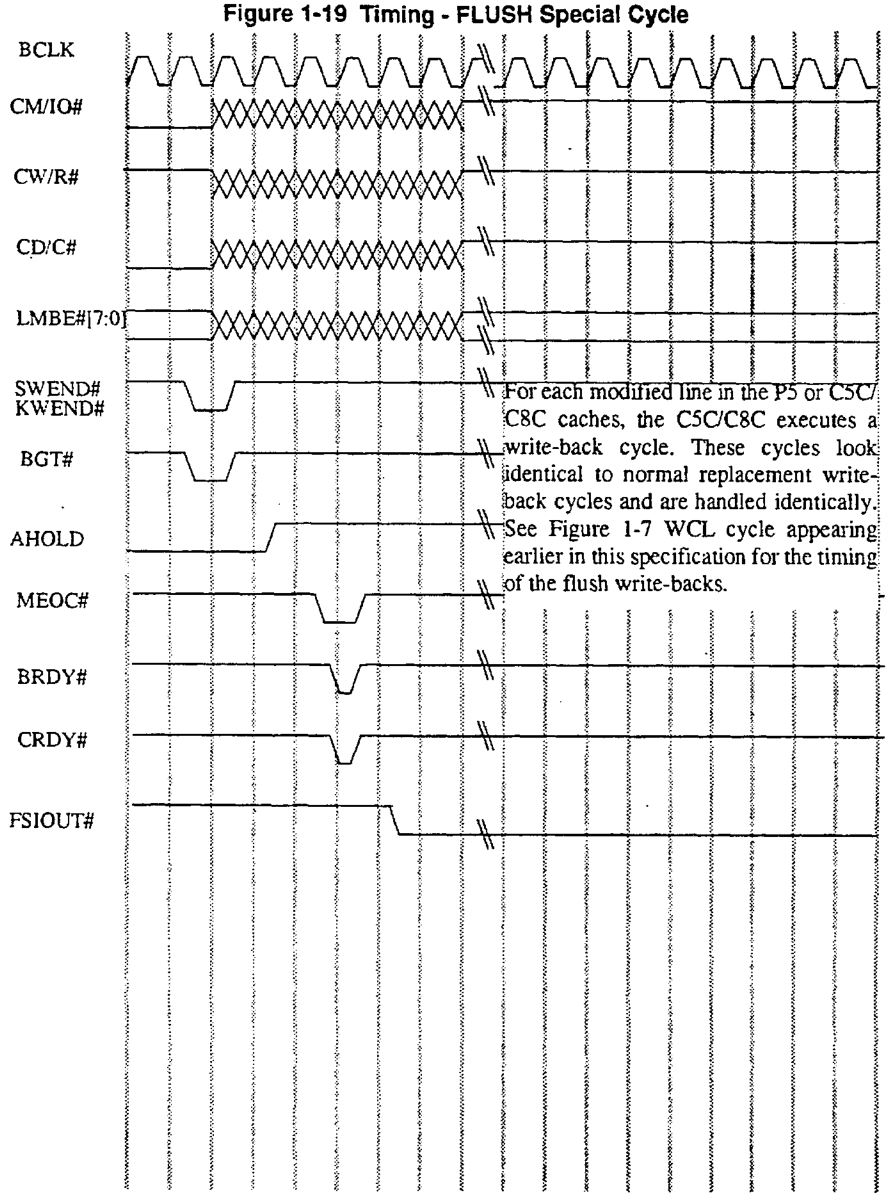

1.4.1.15 NAK Handling

The NAKed transaction will retry.

1.4.1.16 Data Parity Error Handling

The MBC will assert an error interrupt on a Data Parity Error and squash/complete the cycle.

1.4.1.17 Address/command bus parity error handling

The MBC will assert an error interrupt on an Address/Command Bus Parity Error and squash/complete the cycle.

1.4.1.18 Time-out Error Handling

If a transaction is not completed in a number of cycles determined by the contents of the Bus Time Out Counter, an error interrupt will be asserted and the MBC will squash the cycle.

1.4.1.19 Address Lock Cycles

To avoid bus lock, the Memory Bus Controller supports address lock. The address lock will allow non-exclusive accesses (the majority of accesses) to proceed concurrently with exclusive accesses (locks), without violating lock semantics. The Address Lock Register (ALR) is loaded with the cache line address of the first read with lock[1] operation. Subsequent exclusive/non-exclusive accesses by the other agents on the bus to the same cache line will be NAKed. The address lock is cleared when the lock operation is completed or the lock pin is deasserted by the P5/C5C.

It should be pointed out that the lock address should be double-word aligned. The MBC will assert a bus lock and severely reduce multi-processor performance on a nested read lock access (non-aligned double-word read will result in two lock read accesses). Since the cache line size is implementation dependent, programs should also be cache line size independent.

The LOCK# signal driven by the CPU indicates that the requested cycle should lock the memory location for an atomic memory access. All lock activities must appear on the XA-MP Bus because locked cycles are used for synchronization between processors and between tasks.

LOCKed read and write cycles which miss in the C5C/C8C cache are non-cacheable in both the P5 and C5C/C8C. A Read Bus Word with Lock (RBWL(0)) cycle reads the data from the memory on the XA-MP Bus; the P5/C5C/C8C modifies the bus word and a Write Bus Word with Lock (WBWL) updates memory and invalidates other cached copies.

On a locked read-hit to a line in the S or E state, a Read Bus Word with Lock (RBWL(0)) cycle reads the data from the memory on the XA-MP Bus. The S-E state of the data remains unchanged. If the requested data is a hit to a line in the Modified state the CPU will use the C8C data and the M state of the data will remain unchanged.

---

[1]Since only one cache line is locked at a time, it is important that the lock address is cache line aligned. P5 signals unaligned lock via SCYC; this results in XA-MP Bus bus lock.

For locked write-hits, the access is a write-through cycle sending the data to the XA-MP Bus, updating memory and invalidating other cached copies. The M-E state of the data remains unchanged, while the S state is changed to E.

Table 1-18 Locked Cycle Operations

| C5C/C8C/CPU | Address Lock Register[a] | Comment/action |
|---|---|---|
| Locked read Cache Miss | Loaded with cache line address | Read Bus Word with Lock XA-MP Bus cycle initiated |
| Locked read Cache Hit M | Loaded with cache line address | Read Bus Word with Lock XA-MP Bus cycle M -> M |
| Locked read Cache Hit S | Loaded with cache line address | Read Bus Word with Lock XA-MP Bus cycle initiated S -> S |
| Locked read Cache Hit E[b] | Loaded with cache line address | Read Bus Word with Lock XA-MP Bus cycle initiated E-> E |
| Locked write Cache Miss | Clear cache line address | Write Bus Word with Lock XA-MP Bus cycle initiated |
| Locked write Cache Hit M | Clear cache line address | Write Bus Word with Lock XA-MP Bus cycle initiated M -> M |
| Locked write Cache Hit S | Clear cache line address | Write Bus Word with Lock XA-MP Bus cycle initiated S -> E |
| Locked write Cache Hit E | Clear cache line address | Write Bus Word with Lock XA-MP Bus cycle initiated E -> E |

a. The ALR is always cleared when the KLOCK# pin is deasserted.
b. Exclusive state in duplicate secondary tag directory

1.4.1.20 Registers Read/write Cycles

There are a set of memory mapped registers on the CPU/cache unit that are used for configuration and identification. The registers can be accessed by the local CPU (on the same module) or by any remote CPU (from another module). All CPUs, including the local CPU, access these registers through the XA-MP Bus. The registers are:

1. Slice identification
2. Board type identification
3. MBC version identification
4. Configuration
5. Status 6. Address trap for error
7. Memory Attribute Map
8. Performance monitoring counters/registers Refer to section 1.5 for a description of these registers.

1.4.2 P5/C5C/C8C Interface

1.4.2.1 P5/C5C/C8C Cycles

The duplicate secondary tag directory will be updated on C5C/C8C cache line read/write bus activities. The basic phases of the update is shown in the following figure.

Figure 1-20 Phases of Secondary Tag Update

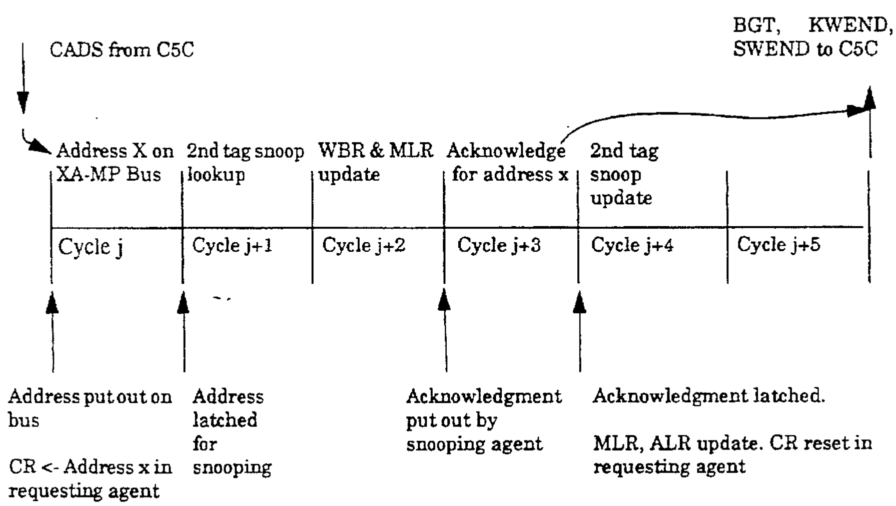

The C5C/C8C bus activities are:

*a. Cache write cycle:*

- Replacement (write back): The write back cycle(s) follows a read cycle caused by a write allocation or a read miss. The read cycle put the line address from the duplicate tag array into the WBR at the end of j+1 and updated the corresponding entry with the replacement line address during j+4. On completion of the write back cycle(s), the WBR will be reset. No other action will be taken.[2]

[2] The write back cycle is distinguished from other write cycles by the assertion of the MCACHE# signal from the C5C.

- Intervene on snoop (write back): The write back cycle is due to a read/write snoop hit on a modified line. The snoop cycle put the line address from the duplicate tag array into the MLR at the end of j+1 and updated the corresponding entry to be invalid during j+4. On completion, the MLR will be reset.

- Intervene on snoop (cache to cache transfer): The cache to cache transfer cycle is due to a cache line read snoop hit on a modified line. Ownership of the line is transfer to the requesting cache at the end of the cycle so the there is no need to load the MLR. The corresponding entry in the duplicate secondary tag directory (DSD) is invalidated during j+4.

- Write through[3]: The write through is due to a P5 write to a non-modified line. The DSD will be looked up. If the corresponding entry is in the shared state (S), an invalidate cache line cycle (PICL) will be initiated on the XA-MP Bus. The entry will be updated to the M state during j+4. However, if the corresponding entry is in the exclusive state (E), then the SRAM will be updated to the M state in the next clock and the write cycle will be squashed (to maintain the MESI cache coherency protocol). If the corresponding entry is in the invalid state (I)[4], there is not a match, or it is a MRO line, then the duplicate secondary tag directory will not be updated and the cycle will be issued as a write bus word cycle.

- Flush: Flush causes the P5/C5C to execute a write-back to main memory of any modified cache lines and then invalidates all P5/C5C tag locations. During the Flush, the MBC will NAK any snoop hits to modified lines. At the end of the Flush, the MBC will invalidate the duplicate secondary tag directory.

b. *Cache Read cycle:*

- Read miss: On a cache read miss cycle, the duplicate secondary tag directory will be updated during j+4 (after the other caching agents return their snoop results). If the signal CDS on the XA-MP Bus indicates a shared line, then the state of the entry will be in the shared state. If the signal CDM on the XA-MP Bus indicates a modified line, then the state of the cache entry will be in the modified state; else it will be in the exclusive state.

- Write Allocation: The write allocation cycle is caused by a write miss to a cacheable location. The initial write is squashed by the MBC and a RIL cycle is initiated. The line status in DSD will be updated to modified during j+4.

c. *Non-cacheable reads:*

- The duplicate secondary tag directory will ignore all non-cacheable reads.

[3]The write through cycle is initiated by a. a CPU write to a C5C shared line (note: MCACHE# & PALLC# of the C5C are not asserted here), b. a non-cacheable write c. a write through due to the PWT signal from the C5C or a write through due to the MRO.

[4] This takes care of the case when two CPUs are both writing to the same shared cache line at the same time and as a result, the cache line entry on one of the C5Cs is invalidated and there is still a pending write to the line that is now in modified state in the other C5C.

Table 1-19 summarizes the state of the C5C and the 2nd tag on a C5C initiated access.

Table 1-19 Cache Tag States

| P5/C5C Cycles | Cache entry states (2nd tag and C5C) | | | Comments/actions[a] |
|---|---|---|---|---|
| | no CDM or CDS | CDM[b] | CDS | |
| Replacement (write back) | NA | NA[c] | NA | Not applicable for the CDM or CDS case (system is not coherent here). The line remains dirty in the output buffer. If it is NAKed, the write back will be retried. |
| Intervention write back | NA | NA | NA | Not applicable for the CDM or CDS case (system is not coherent here). The line remains dirty in the output buffer. If it is NAKed, the write back will be retried. |
| Flush write back | NA | NA | NA | Not applicable for the CDM or CDS case (system is not coherent here). The line remains dirty in the output buffer. If it is NAKed, the write back will be retried. |
| Write through | | | | |
| S->M state write through | M | NA | M | Not applicable for the CDM case (system is not coherent). |
| Non-cacheable write | NA | NA | NA | Non cacheable write. There is no corresponding cache entry anyway. If CDM is asserted, then the write will be NAKed. The write back will be retried. |
| Write through (e.g. PWT) | no change | no change | no change | If CDM is asserted, the write will be NAKed and then retried. If CDS is asserted. There will be no change in state. |
| Read miss | E | M | S | If CDM is asserted, a cache to cache ownership transfer will occur. |
| Write allocation | M | M | M | If CDM is asserted, a cache to cache ownership transfer will occur. |
| Non-cacheable read | NA | NA | NA | Non cacheable read. There is no corresponding cache entry. |

a. It is assumed that the C5C is not busy (e.g. servicing an intervene cycle.) If it is busy then the bus cycle will be NAKed and no cache (both second tag and C5C) update will be initiated.

b. XA-MP Bus system bus signal. CDM indicates the line is shared and modified. CDS indicates the line is shared and clean.

c. Not applicable.

1.4.2.2 Write Cycle:

There are three basic types of write cycles:

1. CPU generated write cycles
2. Cache generated write cycles caused by a cache replacement or FLUSH
3. Cache generated intervene cycles caused by a snoop hit Write cycles begin with CADS# assertion; intervene cycles begin with SNPADS#.

1.4.2.2.1 CPU Generated Write Cycles

CPU generated write cycles are for up to 8 bytes. When the CPU begins a write cycle, following can happen:

1. The CPU write is a hit to a modified line: The write is terminated by the CPU cache immediately and invisibly to the MBC.
2. The write is to a shared location: the write is posted to the C8C memory cycle buffers and the cycle is terminated by the cache.
3. The write is a cache miss: This type of write is posted to a C8C memory cycle buffer (If PALLC# is asserted, the write may be turned into an allocation).
4. The write is a LOCKed write: Locked writes are posted regardless of tag state. The write is then treated as if it were a miss except there is no tag state change and no allocation allowed.

1.4.2.2.2 Cache Generated Write Cycles

Cache generated write cycles are for the length of a cache line (32 bytes). The C5C/C8C will generate a write cycle in the following situations:

1. A line fill or allocation causing a cache replacement: The line is placed in the write-back buffer of the C8C. If no cycle is pending, CADS# is asserted. If a snoop hits the write-back buffer, the data is written out via SNPADS# like a normal snoop hit. The write back is then cancelled since the data was written through the snoop hit.
2. Intervene on snoop (write back): A snoop hit to a modified location causes a line of cache data to be written out to memory. Snoop hits are the highest priority cycle and must be serviced immediately. A snoop hit to a modified line causes the snooped line to be written to the snoop buffer of the C8C. SNPADS# is then asserted.
3. Intervene on snoop (cache to cache transfer): A snoop hit to a modified location causes a line of cache data to be written out to the requesting agent. Snoop hits are the highest priority cycle and must be serviced immediately. A snoop hit to a modified line causes the snooped line to be written to the snoop buffer of the C8C. SNPADS# is then asserted.
4. Write backs caused by FLUSH: Write backs caused by FLUSH are indistinguishable from write-back cycles caused by replacement.

1.4.2.2.3 Memory Bus Controller Responsibility

The Memory Bus Controller recognizes a write cycle with CADS# and CW/R# (or SNAPADS# for snoop cycles). If the line is cacheable[5], the MBC knows the cycle is a write back cycle, otherwise it is a CPU-generated cycle.

The data is available for writing in the appropriate C8C buffer in the next clock after the MBC detects CDTS# active. The MBC asserts MSEL# to enable bursting and bursts through the write using MBRDY#. MSEL# activation also causes MZBT# to be sampled. The MBC drives MZBT# inactive at all times for data to be written according to CPU burst order.

MEOC# is asserted to end the write cycle and switch the C8C buffers from the current ones in use to the next pending cycle. If this write cycle is turned into an allocation, MFRZ# is sampled with MEOC# to freeze the write data in the C8C. CRDY# is asserted to end the cycle and allow the C5C/C8C to dispose of the information.

1.4.2.2.4 Write to C5C/C8C Shared or Exclusive Lines

CPU generated write cycles to C5C/C8C shared lines are signaled to the XA-MP Bus when the line is shared in the MBC duplicate directory so that other caches can invalidate their copies of this information. If the line is in the exclusive state then the MBC squashes any XA-MP Bus activity. In either case, DRCTM# is asserted with SWEND (SWEND# assertion occurs with KWEND# and BGT# assertion) to force the line into the modified state.

1.4.2.2.5 Write Allocation and Read for Ownership

A write allocation is a read for ownership. This is because ownership is being transferred. In read for ownership cycles, the memory is avoided as much as possible. First, the write cycle is squashed to avoid the memory. Second, a line fill is performed as a cache to cache transfer with DRCTM# asserted. All caches are snooped with invalidate to eliminate their copies.

An allocation cycle is a read of a cache line caused by a write miss to the same location. In its simplest form, a write miss is written to the C8C buffer by the CPU, then the C5C requests a line from the same location. The C8C merges the write data in with the memory data from the read. Meanwhile, the CPU only sees the write cycle.

Write allocations may only be done if PALLC# is asserted by the C5C during CADS# of the write cycle. For the allocation to occur, MKEN# must be returned asserted by the MBC during the KWEND# of the write cycle. If MKEN# is asserted then the write is squashed on the XA-MP Bus and the C5C/C8C follows with a read for the cache line. This saves a data write to memory.

If the write cycle is squashed, MFRZ# must be used with MEOC# so that the line fill data from the subsequent read is read around the write data into the C8C buffer. The line fill cycle is like any other line fill cycle except that the CPU doesn't get any data. During a write allocation, DRCTM# must be asserted during SWEND# activation to fill the line to the M state, and any cache supplying the data must invalidate its copy.

SWEND# is not sampled for the write portion of the allocation for allocation cycles.

1.4.2.3 Read Cycles

The CPU initiates all read cycles. These are usually line fills to the CPU and line fills to the C5C/C8C. The C5C signals cacheability with MCACHE# during CADS# to indicate whether the cycle may be cacheable. The MBC returns MKEN# to ultimately determine cacheability.

---

[5]Cacheability is determined by the MBC with the signals MCACHE and MKEN being asserted.

Read hit cycles are serviced by the cache without MBC intervention. The only read cycles seen by the MBC[6] are read misses and locked read cycles.

Read misses cause CADS# to be asserted at most two clocks after ADS# of the CPU read cycle. If cacheable, as determined by MCACHE#, the MBC will return four MBRDYs to the C5C/C8C and four BRDYs to the CPU[7] and. If the transfer is non-cacheable, the MBC returns one BRDY to the CPU, MBRDY# is not signalled to the C5C/C8C since the data is only required by the CPU.

If the line is cacheable, it may cause another cached line to be bumped out of the cache. This is called a replacement and if modified, causes a write-back cycle. While one of the C8C buffers is being filled for the line fill, the write back buffer is loaded. If the line fill turns out to be non-cacheable, at the end of the transfer, the write back buffer is discarded, and the line in the cache remains valid. Otherwise, CADS# will be generated after the read cycle so that the write back can be performed. The write back need not happen immediately after the line fill since the write back buffer can be snooped.

All locked reads go to the MBC. If the read is a cache hit to a modified line, the C5C/C8C will ignore the data the MBC returns and provide it from its C8C array. Locked reads are not cacheable by the CPU or the C5C/C8C. Snoop write backs that are a result of a LOCKed read/write request must go to memory.

1.4.2.3.1 Memory Bus Controller Responsibility

Once the MBC sees a read cycle, it must determine whether the read is cacheable or not using MCACHE# and its own address map decoding. If the transfer is non-cacheable, the P5 expects one transfer. If cacheable, the CPU and the cache expect four transfers[8].

MKEN# is sampled during KWEND# to determine cacheability. Before MKEN# is sampled, KEN# is active assuming cacheability for the CPU. The MBC deasserts MKEN# during KWEND# to make the cycle non-cacheable.

The MBC sends the fill command to the memory. During the command acknowledge phase, other MBCs look up the status of the line in their duplicate tag array. If another MBC finds the line in the modified state, it inhibits the memory cycle (MCI) and signals the requesting MBC that it has the line(CDM). If the data transfer goes from one cache to another, DRCTM# is asserted with SWEND# to place the line in the modified state and the sending cache invalidates the line.

MSEL# is activated and MBRDY# is used to sample input data from the read cycle. The CPU read data path is clear once CDTS# has been asserted. BRDY# is returned to the CPU after each MBRDY# for each piece of input data. Once the transfer completes, MEOC# and CRDY# are asserted to complete the cycle in the C5C/C8C.

1.4.2.4 I/O and special cycles

I/O and special cycles (flush, etc.) are decoded by the C5C and not posted. These cycles wait until all buffers have been written and all cycles have been completed before they cause CADS# assertion. The CPU waits until the special cycle ends with the MBCs BRDY# assertion before it continues.

[6]except I/O or special cycles.
[7]Except read-only data and uncached P5 data or code when the CPU will only get one BRDY.
[8]Except read-only data and uncached P5 data or code when the CPU will only get one transfer.

When the C5C/C8C is performing a flush, many write back cycles are required. These cycles look like ordinary write back cycles, and are handled as such. FSIOUT# is asserted during the flush.

1.4.2.5 MBC-C5C/C8C Protocol

The following figures show the relationship between C5C/C8C read/write accesses and the MBC.

1.4.2.5.1 Read/write from C5C

In Figure 1-20 the C5C initiates a memory or I/O read/write request. The MBC latches the C5C address for address lookup (Memory Attribute Map lookup and address decode) right after the CADS# synchronization. The attributes (MKEN and MRO) will be asserted as a result of the lookup comparison.

Figure 1-21 Timing - MAM Lookup

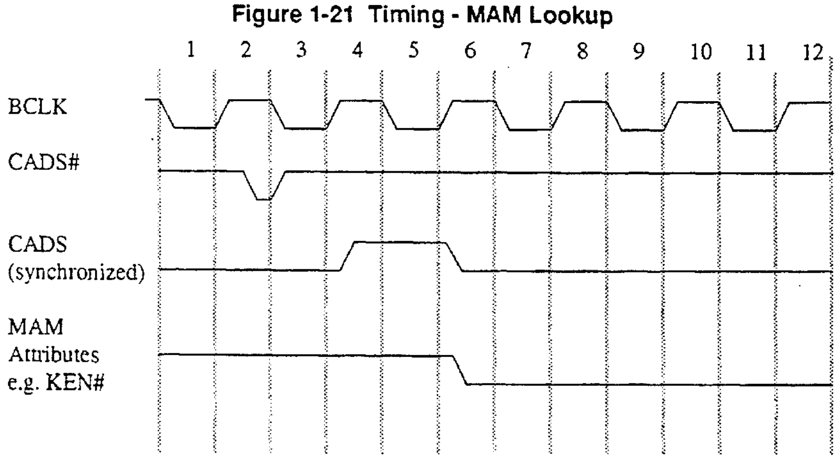

1.4.2.5.2 Read from C5C+Arbitration

Figure 1-21 also illustrates a read. The MBC starts arbitrating for the bus once the CADS is synchronized/recognized (col. 4-5) since all non-APIC reads will require a system bus transaction. Assuming it wins the bus right away, then a read cycle follows (address is put onto the bus - col. 10-11). If the read is not a cache line read then the ARB# line will be held for one more cycle so that the byte enable information can be passed onto the address bus. The same timing diagram basically holds true for non-cacheable write through cycle, write back cycles, and I/O write cycle. The only exception is that the MBC must wait until the data bus is available before the address and data is put onto the bus (Figure 1-22).

Figure 1-22 Timing - C5C Read, Earliest Arbitration for System Bus

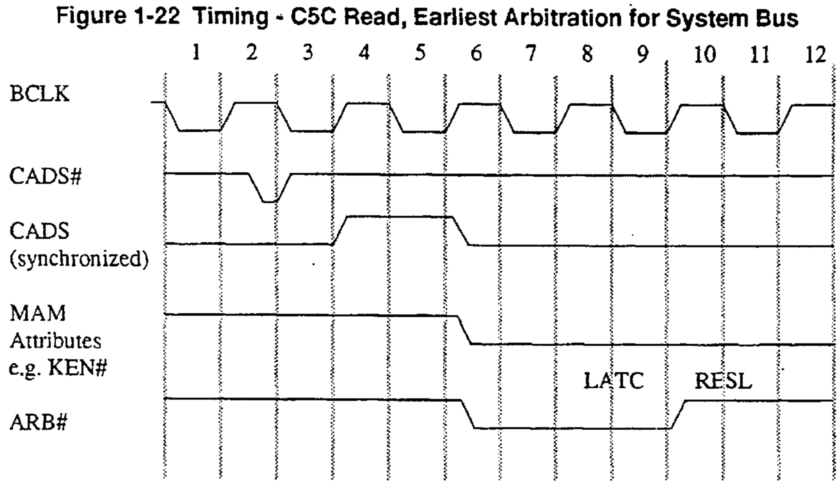

1.4.2.5.3 Noncaching write from C5C+Arbitration

Figure 1-22 illustrates a non-caching write from the C5C. The system bus is idle at arbitration time. The MBC starts arbitrating for the bus (col. 5-8) once the CADS is synchronized/recognized since most of the writes will require a system bus transaction. Assuming the MBC wins the address bus and data bus right away, then a write cycle follows (address, data strobe, and data are asserted on the bus). The ARB# line will be extended for one more cycle(col.9-10) so that the byte enable information can be passed on to the address bus.

Figure 1-23 Timing - Noncaching write from C5C Earliest Arbitration for Bus

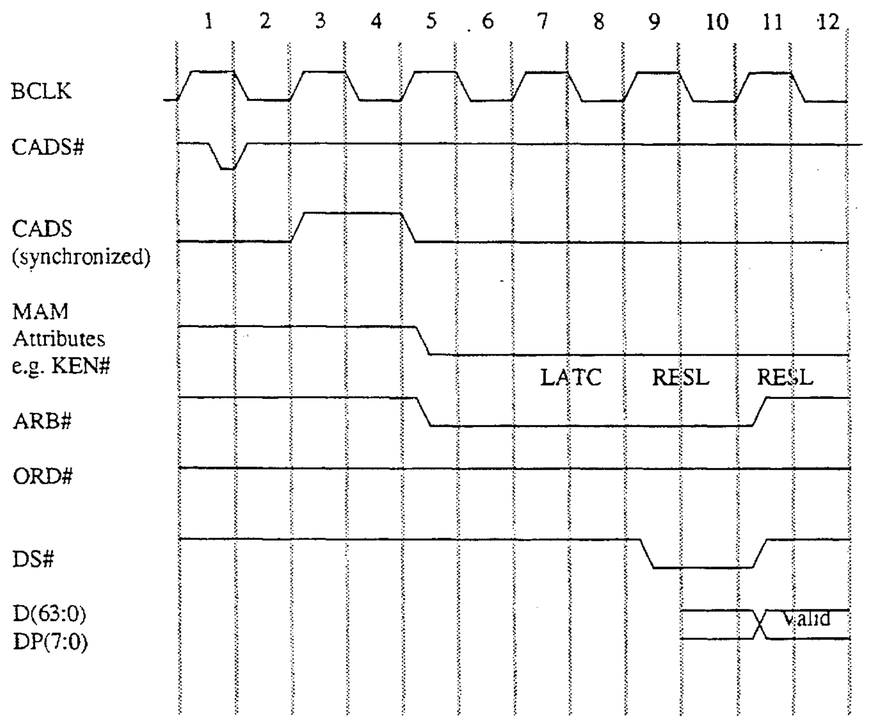

1.4.2.5.4 Write Through

1.4.2.5.4.1 Write Squashing (E->M state transition)

Figure 1-23 illustrates a scenario for a write through due to an exclusive state to modified state transition. In this case, a duplicate secondary tag directory lookup (DSD) is performed while the MBC starts arbitration. The DSD is looked up as soon as the CADS is synchronized/recognized (col.2-3). The state of the line is determined to be exclusive in the secondary tag (at col. 6), the DSD is updated to modified in col. 7 and the arbitration line, ARB#, is deasserted (at col.8).

Figure 1-24 Timing - Write Squash

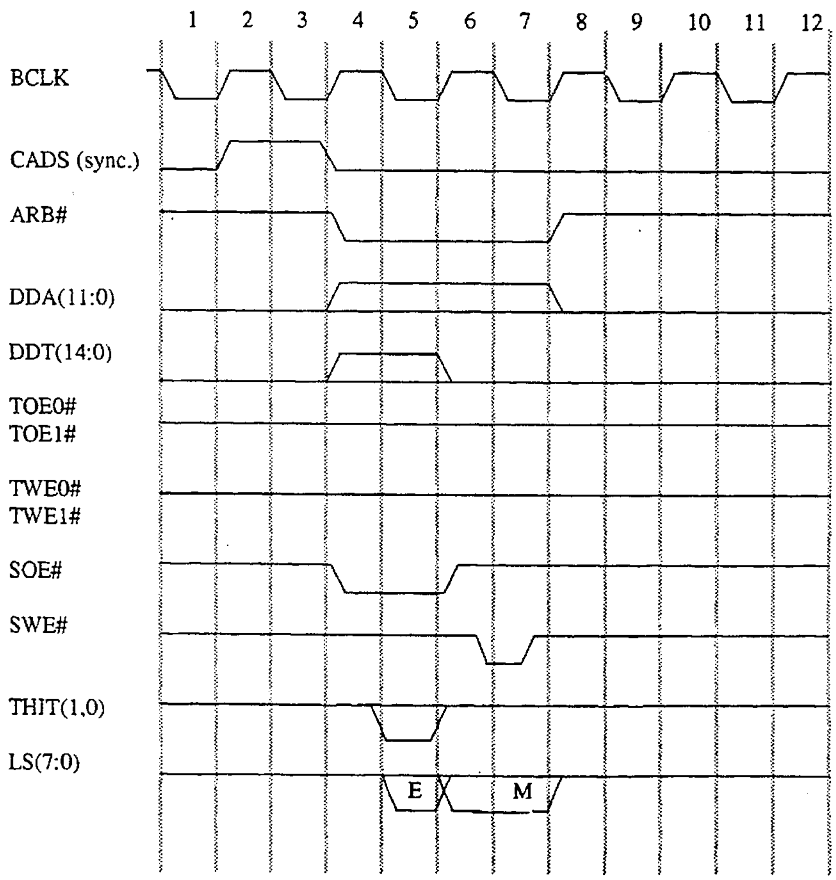

1.4.2.5.4.2 Write through (S->M state transition)

Figure 1-24 illustrates a scenario for a write through due to a shared state to modified state transition. In this case, a DSD lookup is performed while the MBC starts arbitration to get its turn to access the system bus. The DSD is looked up as soon as the CADS is synchronized/recognized (col. 2-3). The state of the line is determined to be shared in the 2nd tag at col. 5-6. Thus the arbitration line (ARB#) remains asserted with an address cycle (PICL) following on the bus (col. 8). The duplicate secondary tag directory is updated to modified after the acknowledgment phase on the bus.

Figure 1-25 Timing - Write through (S->M state transition)

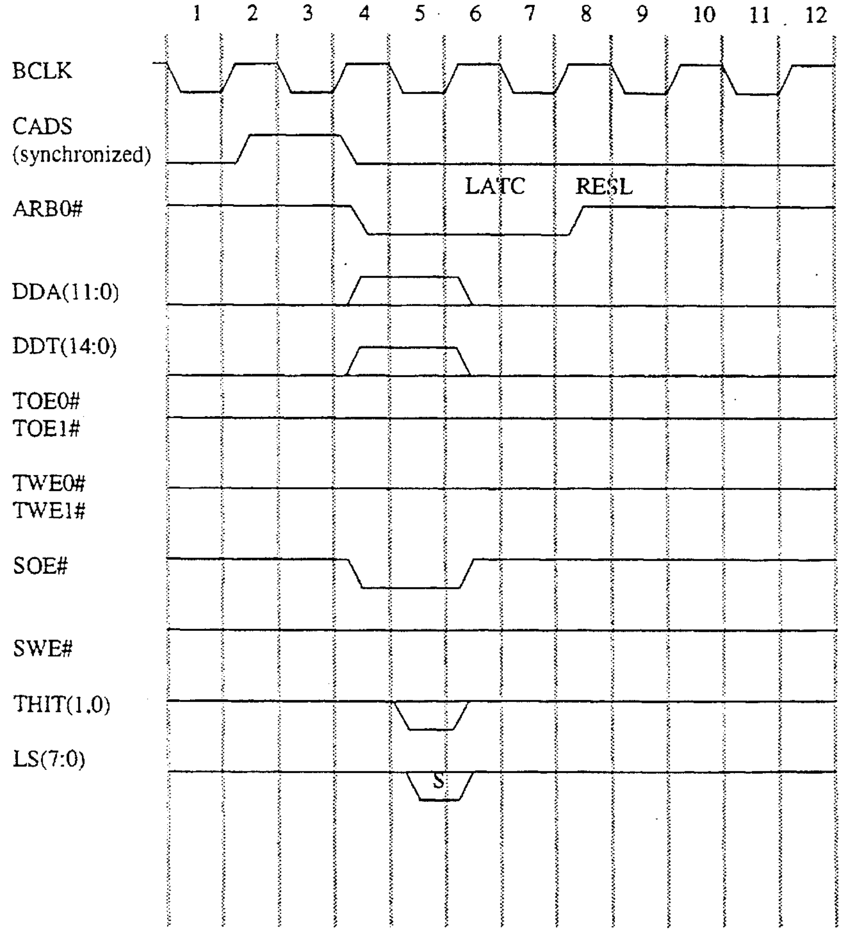

1.4.3 Processor Data Path Interface

T. B. D.

1.4.4 Secondary Tag Interface

The duplicate secondary tag directory shadows the C5C cache controller and snoops the shared memory multiprocessor bus under the control of the MBC. The organization of the duplicate secondary tag directory and its operation are described in the following sections.

1.4.4.1 Organization

Two 4K*15 bit cache tag RAMs and one 4K*8 bit resetable SRAM will be configured to form the duplicate secondary tag directory external to the C5C/C8C. The cache tag RAMs are divided into two sets to support the C5C/C8C two way set associative cache. Each set will have a 12 bit set address and a 15 bit address tag. Associated with each address tag are two bit entries in the 4K*8 bit SRAM each two-bit entry indicating the four possible virtual states of the corresponding C5C/C8C cache entry. The four virtual states are the invalid state (I), the shared state (S), the exclusive state (E) and the modified state (M). Here, they are virtual in the sense that the C5C will have the MSI three states only and the MBC will provide the MESI cache coherency bus protocol by maintaining the four states in the secondary tag. This difference in the states supported by the C5C and the secondary tag is necessary because if the C5C maintains the four states, then it will not notify the secondary tag of an E state to M state transition. Thus, making it impossible for the secondary tag to keep track of the C5C internal states (M or E). With the C5C maintaining the MSI states, the MESI cache coherency protocol is implemented by having the MBC filtering out C5C writes due to shared state to modified state transition (when the secondary tag indicates an exclusive state to modified state transition) and by having the MBC filtering out snoop traffic on clean data.

Four 27 bit address registers/comparators internal to the MBC are also associated with the secondary tag. They are used by the MBC to keep track of special conditions that could exist in the multiprocessor system. The latching points (when they become valid) of the registers are shown in the figure below and their functions are described in the following section.

Figure 1-26 Register Latching Points

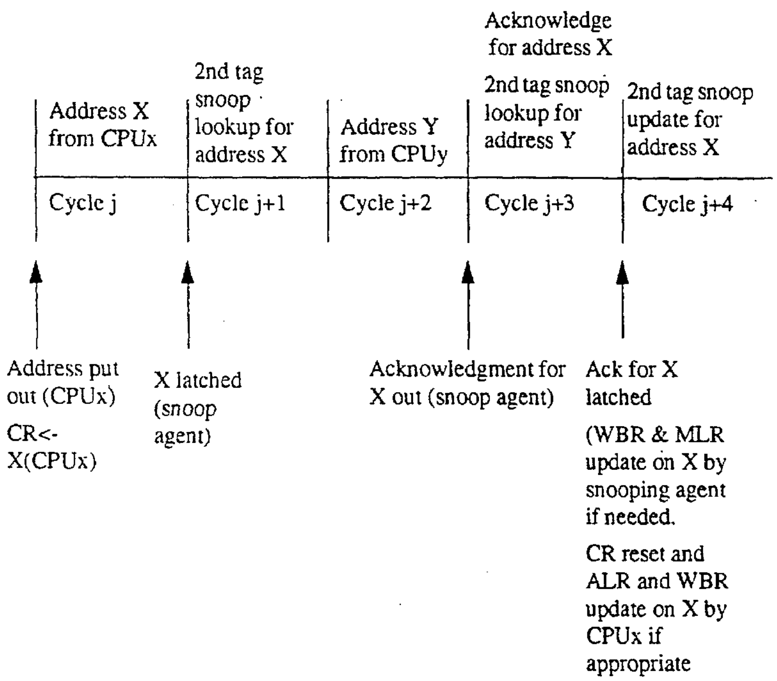

Two address cycles are shown in the figure at cycle j and cycle j+2 (maximum address issue rate of the XA-MP Bus). Address X is put out onto the bus by CPUx at the beginning of cycle j. At the same time, X is latched into the CR by CPUx. At the end of cycle j, X is latched by the snooping agents on the bus; Duplicate Secondary tag Directory (DSD) lookup is performed by the snooping agents during cycle j+1. The WBR or MLR registers will be updated during cycle j+2 based on the result of the DSD snoop. The WBR or MLR will be discarded at the beginning of cycle j+4 if the response is illegal or a NAK. At the beginning of cycle j+3, the acknowledgment for X is put out onto the bus and is latched by CPUx at the beginning of cycle j+4. The CR register of CPUx is reset at the beginning of cycle j+ 4 and the ALR register of CPUx is updated if appropriate (i.e. acknowledgment is positive). The DSD of both CPUx and the snooping agents are updated at the beginning of cycle j+4 based on the results of the acknowledgment. While all of the above is occurring, address Y is put onto the bus by CPUy at the beginning of cycle j+2. The corresponding 2nd tag snoop and update for address Y are performed at cycle j+3 and cycle j+6.

The functions of the four registers are:

1. Modified Line Register (MLR-27 bits): The MBC and the C5C have a policy of updating the DSD at the end of a snoop cycle. On a snoop hit to a modified line, the secondary tag is updated before the writeback intervene[9] cycle takes place. Hence, the state of the entry is not exactly correct in the C5C or the DSD. In fact, the corresponding entry will be invalid. To keep the system coherent, the address of the writeback intervene cycle is stored in the MLR. The MLR is looked up during a snoop cycle so that appropriate action can take place on a snoop hit (e.g. assertion of the NAK line of the XA-MP Bus).

2. Write Back Register (WBR-27 bits): On a read miss or write allocation, the contents of the corresponding cache entry will be replaced. If the cache entry to be replaced is modified, then a write back will have to be scheduled. Information for the write back will be lost in the DSD once it is updated for the read or write allocation operation; so the address of the write back cycle is stored in the WBR. The WBR is looked up during a snoop cycle so that the appropriate action can take place on a snoop hit (in this case, a snoop cycle to the C5C). If there is a snoop hit to the WBR register, the contents of the register is transferred to the MLR register and the WBR register is reset (if the MLR is occupied, then the address cycle will be NAKed).

3. Address Lock Register (ALR-27 bit) The ALR keeps track of the on-going lock operation. It is looked up during a snoop cycle so that appropriate action can take place on a snoop hit (e.g. assertion of the NAK line of the XA-MP Bus).

4. Current Register (CR- 27 bits) The current register keeps track of the on-going transaction. This register is valid only during the snooping window of the on-going transaction (after the address for the on-going transaction is put on the XA-MP Bus and before the snoop acknowledgment for the address is received). It is looked up during a snoop cycle so that a NAK can take place on a snoop hit. This is used to handle the case when the address X and address Y are the same (conflict resolution).

1.4.4.2 Theory of Operation.

The Duplicate Secondary tag Directory (DSD) will be looked up and updated if necessary during an address bus snoop cycle or a P5/C5C bus cycle. The following two sections describe the look up/update process controlled by the MBC.

1.4.4.2.1 Address bus Snoop cycle.

In general, the MBC will initiate a DSD snoop cycle at the end of the XA-MP Bus address cycle (when the address on the bus is latched). However, under certain circumstances, it may not be able to do so. In that case the MBC will assert the NAK line of the XA-MP Bus and no further action will take place.

[9]Note the writeback is to memory only. If it were a cache-to-cache transfer, then the MLR wouldn't be used; the receiving cache will respond.

Figure 1-27 Bus Snoop Cycle Phases

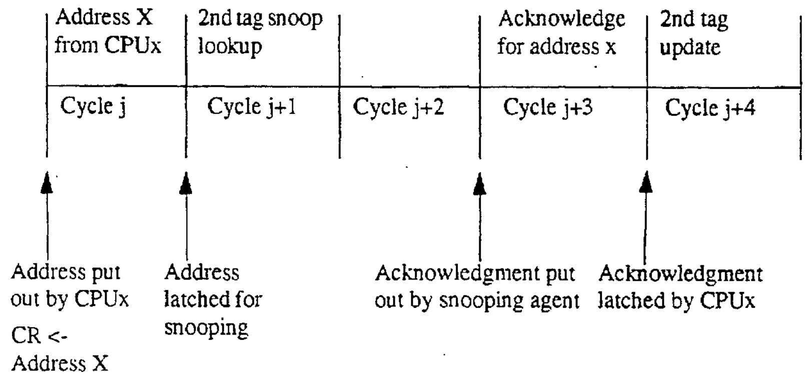

Here, the MBC is required to return the duplicate secondary tag directory snoop results in two bus clocks after the snoop address is latched. The snoop cycle is divided into two phases: tag look up and tag update. During the tag look up phase, the secondary tag RAM will be read and the contents will be compared with the bus address to decide if there is a match. The SRAM is looked up concurrently to determine the state of the corresponding entry. The result of the snoop will be based on the combined results of the two lookups. The snoop result of the tag lookup phase will be available internally one clock after the address is latched and the results will be put onto the bus one clock later.

Bus cycles that each cache unit has to snoop on are:

1. Posted write
- non cacheable write and write due to a Memory Read Only (MRO) cache line
- write through:
    1. Write due to an S state to an M state transition
    2. Write due to a software write through (PWT signal from the CPU)
2. Writeback
- replacement: this is due to a read miss or a write allocation of a modified line
- intervene: this is due to a write cycle snoop hit on a modified line
3. Noncacheable read
4. Cacheable read
- read miss
- write allocation read
5. Locked read/write cycles
6. BIC Enhanced Read & Merge Invalidate The outcome of a snoop hit on anyone of the above cycle is dependent on many factors. They are the bus cycle type, state of the cache entry (M, E, or S), pending MBC address bus cycle type (pre-acknowledgment phase and post-acknowledge phase), and pending P5/C5C cycle (pre-CADS). All possible combinations of these factors are divided into the following classes:

1. Interaction between all possible bus cycles and all possible CPU cache entry states of the snooping agent.

2. Interaction between all possible bus cycles and all possible pending cycles of the snooping agent (snoop hit on a different cache line).
3. Interaction between all possible bus cycles and all possible pending cycles which hit on the same cache line.

Interactions between bus cycles and cache entry states or pending cycles can result in situations where the completion of the bus cycle cannot be coherent (e.g a WCL bus cycle to a line that is modified in another cache). This will be referred to here as a "Coherency Error". Two things happen here:

1. The responder will signal modified (without ACK or NAK) and record the event in the "Coherency Error Register"
2. The requestor will capture the acknowledgment (unless NAK was asserted by another bus agent) as an illegal command.

Refer to the "XA-MP Bus Target Specification" for details regarding Illegal Responses and see the "Software Visible Registers" section in this specification concerning coherency errors.

1.4.4.2.2 Bus Snoop Cycles vs. CPU Cache Entry States

Table 1-20 depicts the relationship between bus snoop cycle type, current cache entry state and new cache entry state (on a snoop hit) of the secondary tag and the C5C. Since the C5C maintains three states (MSI) only, the E state and the S state in the secondary tag is equivalent to the S state in the C5C. Here, the bus cycle is assumed not to hit the pending cycle or the address lock register in the snooping agent. Even if it does hit the pending cycle, it is after the snooping window has been closed (BGT and SWEND have been asserted).

Table 1-20 CPU Cache Entry States

| XA-MP Bus Cycles | Cache entry states (2nd tag and C5C) | | Comments/actions[a] |
|---|---|---|---|
| | current | next | |
| Posted write - Write Bus Word (WBW)<br>- noncacheable write<br>- S->M->I write through[b] | M | I | The cycle will be NAKed and an intervene cycle (write to memory) will result. The MLR is updated. |
| | E | I | |
| | S | I | |
| | I | I | |
| Posted write - Invalid Cache Line (PICL)<br>- S->M write through | M | M | Coherency Error |
| | E | E | Coherency Error |
| | S | I | |
| | I | I | |

Table 1-20 CPU Cache Entry States

| XA-MP Bus Cycles | Cache entry states (2nd tag and C5C) current | Cache entry states (2nd tag and C5C) next | Comments/actions[a] |
|---|---|---|---|
| Writeback - Write Cache Line (WCL)<br>- replacement<br>- cache flush<br>- intervene cycle | M | M | Coherency Error |
| | E | E | Coherency Error |
| | S | S | Coherency Error |
| | I | I | |
| Noncacheable read - Read Bus Word (RBW)<br>- noncacheable read<br>- non caching device read | M | I | The cycle will be NAKed and an intervene cycle (write to memory) will result. The MLR is updated. |
| | E | E | |
| | S | S | |
| | I | I | |
| Cacheable read - Read Cache Line (RCL(3-0))<br>- read miss | M | I | Out of order intervene cycle - a cache to cache ownership transfer will result. |
| | E | S | |
| | S | S | |
| | I | I | |
| Cacheable read - Read Invalidate Line (RIL(3-0))<br>- write allocation | M | I | Out of order intervene cycle - a cache to cache ownership transfer will result. |
| | E | I | |
| | S | I | |
| | I | I | |
| Locked read - Read Bus Word Locked (RBWL)<br>- Locked Read | M | I | The cycle will be NAKed and an intervene cycle (write to memory) will result. The MLR is updated. |
| | E | S | |
| | S | S | |
| | I | I | |
| Locked write - Write Bus Word Locked (WBWL)<br>- Locked write | M | M | Coherency Error- The Locked read should leave modified snooped cached lines invalid. |
| | E | E | Coherency Error - The Locked read should leave exclusive snooped cached lines shared. |
| | S | I | |
| | I | I | |

Table 1-20 CPU Cache Entry States

| XA-MP Bus Cycles | Cache entry states (2nd tag and C5C) | | Comments/actions[a] |
|---|---|---|---|
| | current | next | |
| BIC Enhanced Read & Merge-Invalid Cache Line (BICL) | M | I | The cycle will be NAKed and an intervene cycle (write to memory) will result. The MLR is updated. |
| | E | I | |
| | S | I | |
| | I | I | |

a. It is assumed that the C5C is not busy (e.g. servicing an intervene cycle). If it is busy, then the bus cycle will be NAKed and no cache (both second tag and C5C) update will be initiated.

b. An S->M state transition will usually result in a PICL cycle (see row on posted write). However, if an invalidation cycle to the cache line happens after the C5C has started the address cycle(CADS) for the S->M transition and before the MBC has gotten onto the bus, then the MBC has to issue a WBW instead of the PICL.

1.4.4.2.3 Bus Snoop Cycles vs. Pending Cycles

1.4.4.2.3.1 Snoop Hit On a Different Cache Line

Pending MBC bus cycles are divided into phases. They are:

1. Bus acquisition phase (pre-CS): This phase starts when the MBC receives the CADS signal from the C5C or a retry as a result of a NAK response has occurred. The MBC will start arbitrating for the XA-MP Bus; wait for the arbitration cycle, participate in the arbitration group formation and start the address cycle on the XA-MP Bus. This phase ends when the MBC asserts CS# on the XA-MP Bus.
2. Bus snooping-acknowledgment phase: This phase starts as soon as the address cycle starts (the address is put onto the bus). It ends when the BGT/SWEND cycle to the C5C is initiated: responses from the XA-MP Bus agents are received and the BGT/SWEND cycle to the C5C is initiated by the MBC. NAKs will inhibit BGT/SWEND and re-enter phase 1.
3. Read Data transfer phase (post-BGT): This phase is used for In-order/out of order reads. It starts as soon as the BGT/SWEND is initiated and ends when all the read data are received.

There are three possible outcomes of a snoop hit cycle. They are:

1. a C5C intervene cycle is needed
2. a C5C snoop cycle is needed (a C5C state transition is needed, e.g. S->I)
3. no C5C snoop cycle is needed (no C5C state transition is needed, e.g. E->S)

The following table illustrates the relationship between the three phases of the pending cycle, possible outcomes, and the corresponding actions.

Table 1-21 Snoop Hit to Different Cache Lines

| Cycle Phase | Snoop Outcome | Comment/action[a] |
|---|---|---|
| Bus Acquisition Phase (pre-CS) | C5C intervene cycle needed | Bus cycle squashed (cancelled). A C5C intervene cycle will be initiated. |
| | C5C snoop cycle needed | Pending cycle continues as usual. A C5C update cycle will be initiated (see section 1.4.4.2.2 for state transition). |
| | No C5C snoop cycle needed | Pending cycle continues as usual. |
| Bus Snoop Acknowledge Phase | C5C intervene cycle needed | Pending cycle continues as usual[b]. A C5C intervene cycle will be initiated. |
| | C5C snoop cycle needed | Pending cycle continues as usual. A C5C update cycle will be initiated (see section 1.4.4.2.2 for state transition). |
| | No C5C snoop cycle needed | Pending cycle continues as usual. |
| Data Transfer Phase (post-BGT) | C5C intervene cycle needed | Pending cycle continues as usual. A C5C intervene cycle will be initiated. |
| | C5C snoop cycle needed | Pending cycle continues as usual. A C5C update cycle will be initiated (see section 1.4.4.2.2 for state transition). |
| | No C5C snoop cycle needed | Pending cycle continues as usual. |

a. It is assumed that the C5C is not busy (e.g. servicing an intervene cycle). If it is busy, then the bus cycle will be NAKed and no cache (neither second tag nor C5C) update will be initiated.
b. An exception to this occurs when the pending cycle is a RCL or RIL. The MBC will NAK its own bus cycle which then reverts to a squashed cycle (during the pre-CS NAK retry phase).

1.4.4.2.3.2 Snoop Hit on Pending Line

This section is a special case of the previous section (1.4.4.2.3). Here, we consider the case of a snoop hit on the same cache line as the pending line. In some cases, the MBC cannot really determine if there is a snoop hit on a pending line or not. This section walks through combinations of bus and pending cycles to assure no inconsistency could be introduced.

For the cycles discussed in this section, the following general rules apply:

1. The MBC will not be able to tell if it is a duplicate tag hit on a pending noncacheable cycle (Pending noncacheable read or write cycles will not be considered further in this section).
2. Only pending reads extend into the post-BGT phase.
3. Snooped bus cycles, except WCL, will be NAKed on a CR snoop hit[10]. The Current

[10] The MBC will not NAK a snooped cycle CR hit when its' bus cycle is NAKed by another snooping agent's CR hit.

Register (CR) is valid during the address out (CS#) to acknowledgment window (BGT#).

4. Coherent bus cycle will always be NAKed on a Modified Line Register (MLR) snoop hit. The MLR, when occupied, is valid until its' intervene write-back is completed.
5. Coherent snoop hits on the WBR will either transfer ownership to the requesting agent (who will snoop on it) or the contents of the register is transferred to the MLR and the WBR is reset (if the MLR is occupied, then the address cycle will be NAKed).
6. Coherent bus cycles will always be NAKed on an Address Lock Register (ALR) snoop hit. The ALR, when occupied, is valid from the acknowledgment of an RBWL until a WBWL is completed or the Lock pin is deasserted.

The following table summarizes the action taken as a result of a snoop hit on a pending line.

Table 1-22 Snoop Hits on Pending Cycles

| PICL Pending - Posted Write Through (S->M) | |
|---|---|
| **XA-MP Bus cycle** | **Snoop Hit Result** |
| WCL | The MBC will signal a coherency error. |
| PICL | If the C5C is busy, then the bus cycle will be NAKed. If the C5C is not busy, then the secondary tag will be invalidated and a C5C update cycle will be initiated. The pending cycle will be changed from a PICL to a WBW if the C5C is not busy. |
| BICL | |
| WBW | |
| RBW(3-0) | There will be no effect to the pending write through cycle |
| RBWL(3-0) | |
| WBWL(3-0) | If the C5C is busy, then the bus cycle will be NAKed. If the C5C is not busy, then the secondary tag will be invalidated and a C5C update cycle will be initiated. The pending cycle will be changed from a PICL to a WBW. |
| RIL(3-0) | |
| RCL(3-0) | There will be no effect on the current pending cycle. |

Table 1-22 Snoop Hits on Pending Cycles

WBW Pending - Posted Write Through (S->M->I)

| XA-MP Bus cycle | Snoop Hit Result |
|---|---|
| WCL | The MBC will not be able to tell if it is a snoop hit on a pending write cycle or not (since the corresponding cache entry has been invalidated). |
| PICL | |
| BICL | |
| WBW | |
| RBW(3-0) | |
| RBWL(3-0) | |
| WBWL(3-0) | |
| RIL(3-0) | |
| RCL(3-0) | |

WBR Hit - Replacement Write Back Pending - pre-CS

| XA-MP Bus cycle | Snoop Hit Result |
|---|---|
| WCL | The MBC will signal a coherency error |
| PICL | |
| BICL | The bus cycle will be NAKed. If the C5C is not busy, then the secondary tag will be invalidated and a C5C intervene cycle will be initiated (write to the memory). The MLR will be updated from the WBR and the WBR is reset. The MBC will squash the pending WCL cycle. The C5C will schedule an intervene cycle and cancel the writeback cycle. |
| WBW | |
| RBW(3-0) | |
| RBWL(3-0) | |
| WBWL(3-0) | The MBC will signal a coherency error |
| RIL(3-0) | If the C5C is busy. then the cycle will be NAKed and no action will take place. If the C5C is not busy, then a C5C intervene cycle will be initiated (so that an out of order intervene cache to ache transfer cycle will take place). The WBR will be reset. The MBC will squash the pending WCL cycle. The C5C will schedule an intervene cycle and cancel the writeback cycle. |
| RCL(3-0) | |

Table 1-22 Snoop Hits on Pending Cycles

| MLR Hit - Replacement Write Back Pending - pre-CS | |
|---|---|
| **XA-MP Bus cycle** | **Snoop Hit Result** |
| WCL | The MBC will signal a coherency error |
| PICL | |
| BICL | The bus cycle will be NAKed |
| WBW | |
| RBW(3-0) | |
| RBWL(3-0) | |
| WBWL(3-0) | The MBC will signal a coherency error |
| RIL(3-0) | The bus cycle will be NAKed |
| RCL(3-0) | |

| RCL - Cacheable Read Miss Pending - post BGT (I->S,E) | |
|---|---|
| **XA-MP Bus cycle** | **Snoop Hit Result** |
| WCL | The MBC will signal a coherency error. |
| PICL | (S): in order response pending - The bus cycle will be NAKed; out of order - no effect.<br>(E): The MBC will signal a coherency error. |
| BICL | in order response pending - The bus cycle will be NAKed; out of order - no effect. |
| WBW | If the C5C is busy, then the bus cycle will be NAKed. If the C5C is not busy, then the secondary tag will be invalidated and a C5C update cycle will be initiated. |
| RBW(3-0) | There will be no effect on the pending cycle |
| RBWL(3-0) | Without BUSL-There will be no effect on the pending cycle.(The exclusive line is marked shared)<br>With BUSL-The bus cycle will be NAKed. |
| WBWL(3-0) | (I->S): If the C5C is busy, then the bus cycle will be NAKed. If the C5C is not busy, then the secondary tag will be invalidated and a C5C update cycle will be initiated.<br>(I->E): The MBC will signal a coherency error. |
| RIL(3-0) | There will be no effect on the pending cycle (The exclusive line is marked shared) |
| RCL(3-0) | There will be no effect on the pending cycle (The exclusive line is marked shared) |

Table 1-22 Snoop Hits on Pending Cycles

| RIL,RCL -Cacheable Read Miss Pending - Write Allocate or Read Miss - post BGT(I->M) | |
|---|---|
| **XA-MP Bus cycle** | **Snoop Hit Result** |
| WCL | The MBC will signal a coherency error. |
| PICL | |
| BICL | The bus cycle will be NAKed. If the C5C is not busy, then the secondary tag will be invalidated and a C5C intervene cycle will be initiated (write to the memory). The MLR register will be updated with the address of the intervene cycle. |
| WBW | |
| RBW(3-0) | |
| RBWL(3-0) | **Without BUSL**-The bus cycle will be NAKed. If the C5C is not busy, then the secondary tag will be invalidated and a C5C intervene cycle will be initiated (write to the memory). The MLR register will be updated with the address of the intervene cycle.<br>**With BUSL**-The bus cycle will be NAKed. |
| WBWL(3-0) | The MBC will signal a coherency error. |
| RIL(3-0) | If the C5C is busy, then the bus cycle will be NAKed and no action will take place. If the C5C is not busy, then the secondary tag will be invalidated and a C5C intervene cycle will be initiated (so that an out of order intervene cache to cache transfer cycle will take place). |
| RCL(3-0) | |

Table 1-22 Snoop Hits on Pending Cycles

| XA-MP Bus cycle | Snoop Hit Result |
|---|---|
| **RBWL - Locked Read Bus Word Pending - pre CS** | |
| WCL | (M,E,S->M,E,S): The MBC will signal a coherency error. |
| PICL | (S->S): If the C5C is busy, then the bus cycle will be NAKed. If the C5C is not busy, then the secondary tag will be invalidated and a C5C update cycle will be initiated.<br>(E,M->E,M): The MBC will signal a coherency error. |
| BICL | (E, S->E, S): If the C5C is busy, then the bus cycle will be NAKed. If the C5C is not busy, then the secondary tag will be invalidated and a C5C update cycle will be initiated.<br>(M->M): The bus cycle will be NAKed. If the C5C is not busy, then the secondary tag will be invalidated and a C5C intervene cycle will be initiated (write to the memory). The MLR register will be updated with the address of the intervene cycle. |
| WBW | |
| RBW(3-0) | (M->M): The bus cycle will be NAKed. If the C5C is not busy, then the secondary tag will be invalidated and a C5C intervene cycle will be initiated (write to the memory). The MLR register will be updated with the address of the intervene cycle. |
| RBWL(3-0) | (E,S->E,S): There is no effect on the pending cycle, the exclusive line is marked shared.<br>(M->M): The bus cycle will be NAKed. If the C5C is not busy, then the secondary tag will be invalidated and a C5C intervene cycle will be initiated (write to the memory). The MLR register will be updated with the address of the intervene cycle. |
| WBWL(3-0) | (M,E->M,E): The MBC will signal a coherency error.<br>(S->S): If the C5C is busy, then the bus cycle will be NAKed. If the C5C is not busy, then the secondary tag will be invalidated and a C5C update cycle will be initiated. |
| RIL(3-0) | (M->M): If the C5C is busy, then the bus cycle will be NAKed and no action will take place. If the C5C is not busy, then the secondary tag will be invalidated and a C5C intervene cycle will be initiated (so that an out of order intervene cycle will take place). |
| RCL(3-0) | |
| **WBWL - Locked Write Bus Word Pending - pre CS** | |
| **XA-MP Bus cycle** | **Snoop Hit Result** |
| WCL | (M,E,S->M,E,S): The MBC will signal a coherency error. |
| PICL | (M,E->M,E): The MBC will signal a coherency error.<br>(S->S): The MBC will NAK the PICL |
| BICL | There will be no effect on the pending cycle; the ALR will NAK the bus cycle. |
| WBW | |
| RBW(3-0) | |
| RBWL(3-0) | |
| WBWL(3-0) | (M,E,S,I->M,E,S,I): The MBC will signal a coherency error |
| RIL(3-0) | There will be no effect on the pending cycle; the ALR will NAK the bus cycle. |
| RCL(3-0) | |

1.4.4.3 Duplicate Secondary Tag Protocol

The following timing diagrams specify the timing relationship between XA-MP Bus snoop cycles, C5C cacheable read/write cycles, and secondary directory tag lookup cycles. For the purpose of discussion, each half bus clock column is labeled with a number (from 1-12). A[35:3] denotes the system address bus. It is implicitly assumed from the bus specification that the CS# (command strobe) is always active when A[35:3] is active.

1.4.4.3.1 Snoop Hit/Miss With No State Change

Figure 1-27 illustrates a snoop miss cycles or snoop hit cycles that will not require any tag state change, for example, a read snoop hit on an S state line. The THIT[1:0] from the tag RAM and the states of the cache entry from the SRAM are read (in columns 4-5 & 8-9) where THIT[0:1] & SOE# are active. Based on this information, it is decided that no 2nd tag update is needed. Hence the tag write enable, TWE[1:0], and the SRAM write enable, SWE, remains inactive.

Figure 1-28 Snoop hit/miss with no state change

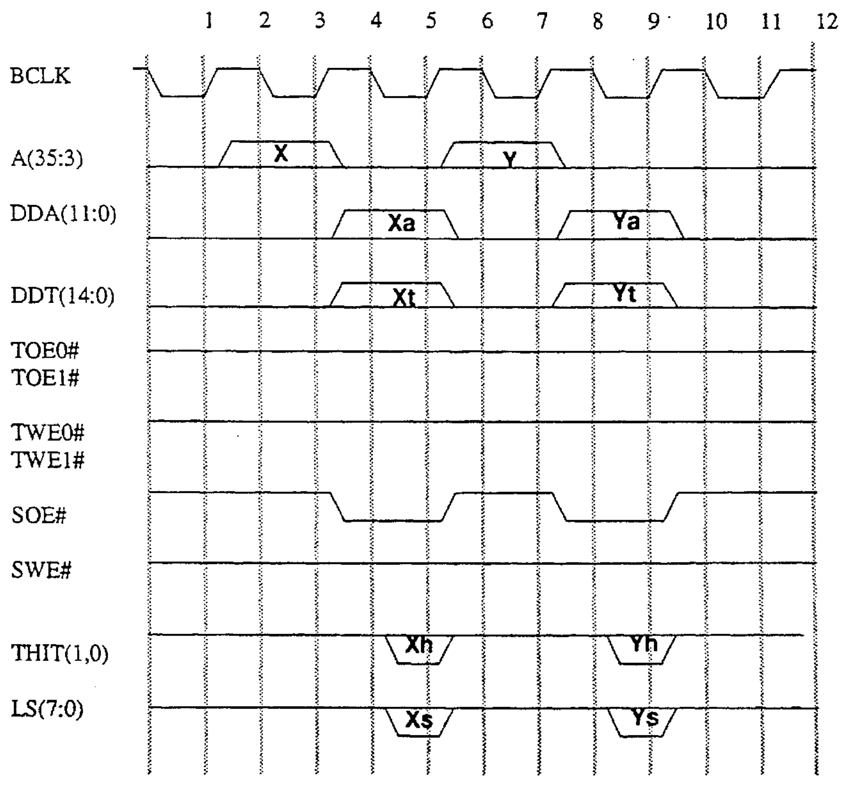

1.4.4.3.2 Snoop Hit With State Change (Clean Line Hit)

Figure 1-28 illustrates two consecutive snoop hits on two clean lines that require state change only (S-> I state, E -> S state).[11] The THIT[1:0] from the tag RAM and the states of the cache entry from the SRAM are read first (column 1-2 & 5-6)where THIT[0:1] & SOE# are active). Based on THIT[0:1], it is decided that only a state change is necessary. Thus the state of the 2nd tag is updated after the acknowledge phases by asserting SWE# and the LS[7:0] (column 7-8 & 11-12).

Figure 1-29 Snoop hit with state change (clean line hit)

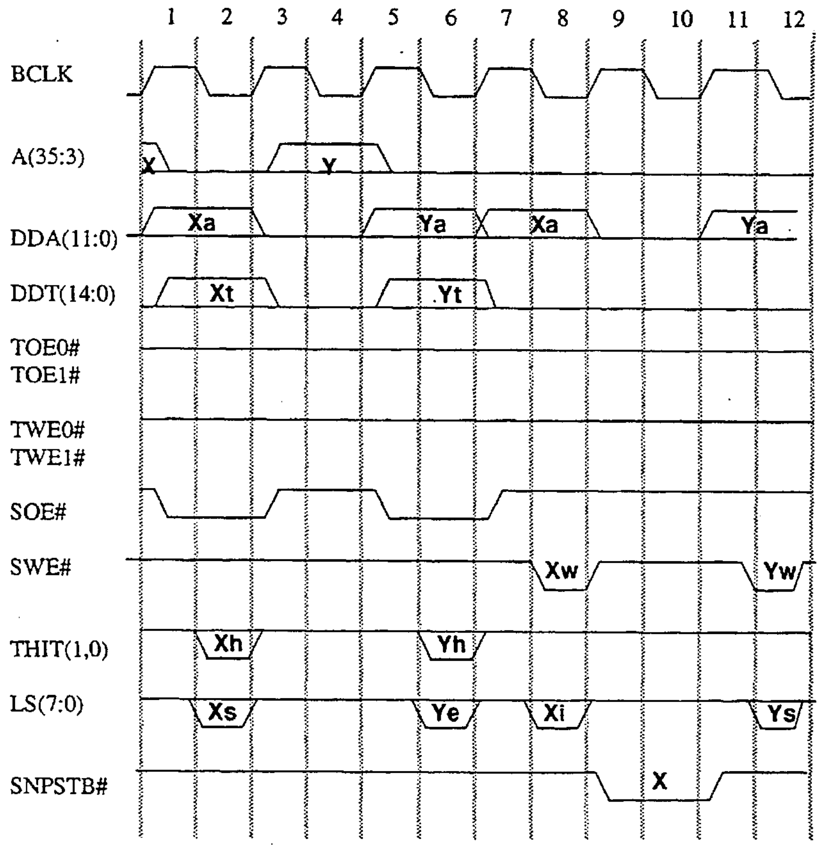

[11]The transition to an I state will cause an invalidation cycle to the C5C.

1.4.4.3.3 Snoop hit with state change (modified line write back)

Figure 1-29 illustrates a snoop hit on an M state. The THIT[1:0] from the tag RAM and the states of the cache entry from the SRAM are read first (column 3-4 where THIT[0:1] & SOE# are active). Based on THIT[1:0] & M, it was decided that there is a snoop hit on a modified line (an intervention cycle). This means that the cache entry has to be invalidated and the address of the dirty line is to be latched into the MLR (modified line register). The 2nd tag is updated (column 19 where SWE# is active).

Figure 1-30 Timing - Snoop hit with state change (modified line write back)

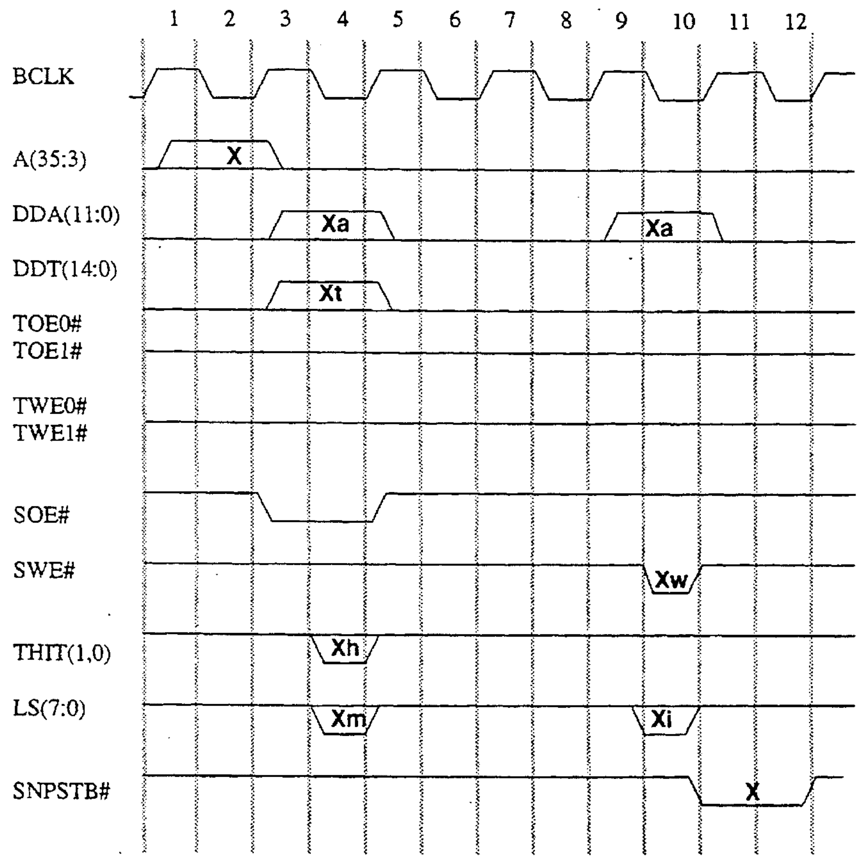

1.4.4.3.4 Cacheable Read And Snoop

Figure 1-30 illustrates a cacheable read miss cycle from the corresponding C5C (X) and then a bus snoop cycle (Y) which requires a state change (E->S). Since the read miss could result in a cache line replacement, the SRAM was looked up after the address of the cacheable read miss cycle is put onto the system bus (column 1-2). The contents of the tag RAM(z) as addressed with CWAY will be read (column 1-2 where the TOE0/TOE1 is asserted) and latched into the MBC. If the cache line to be replaced is dirty (based on SRAM information), then the WBR is loaded in the next clock. If the acknowledgment is not positive then the WBR contents are cleared. The 2nd tag will be updated with the new read address (column 7-8 where TWE0/TWE1 is asserted) and the SRAM will be updated (column 8 where SWE is asserted) according to the nature of the positive acknowledgment (e.g. shared, exclusive)[12]. The 2nd tag is looked up for another system bus snoop cycle (column 5-6) in between the cacheable read request cycles, and its state is changed to S (column 12).

Figure 1-31 Timing - Cacheable read and snoop

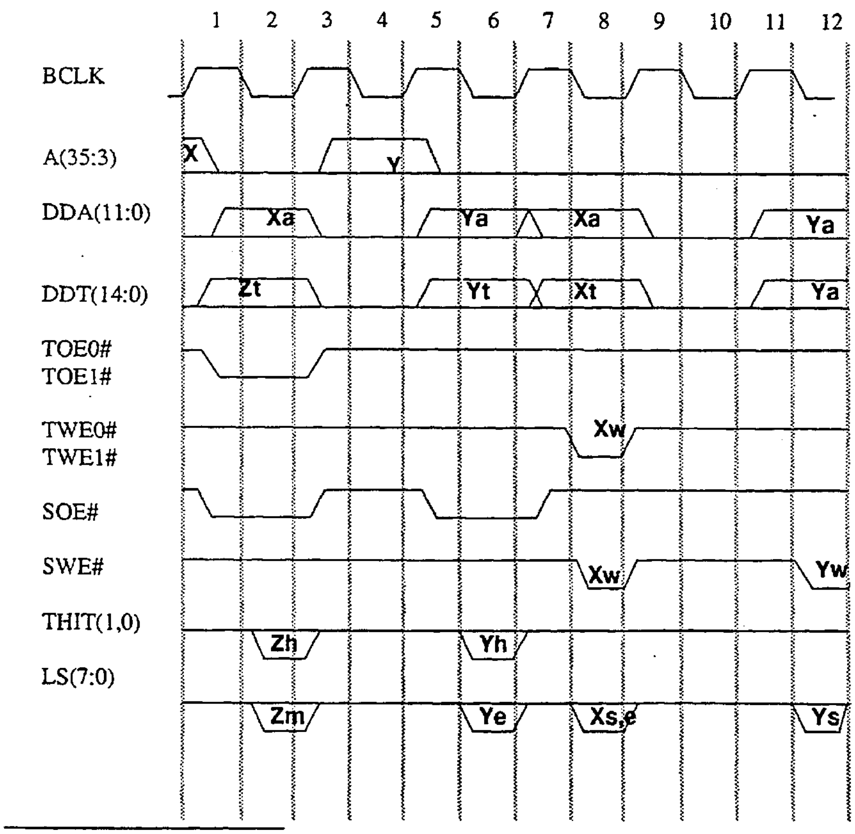

[12]See earlier chapters for specifications for the new cache state.

1.4.5 APIC Interface

1.4.6 SCAN Interface

1.4.7 Miscellaneous Interface

1.5 SOFTWARE VISIBLE REGISTERS

Introduction

This chapter describes all the software visible portion of the MBC. This includes address lock, I/O mapped registers, memory mapped registers and performance monitoring registers.

1.5.1 Register Mapping

Table 1-23 summarizes the memory mapped registers and their corresponding addresses. All reserved bits are set to zero and cannot be modified. The registers are described in more details in the following sections.

Table 1-23 XA-MP Bus Slice Initialization and Configuration Registers

| Register | Relative Byte Location | Register Name |
|---|---|---|
| These registers are common to all slices. For a complete description refer to the "XA-MP Bus Target Specification" | 000-090 h | |
| | 0A0-0F0 h | Reserved |
| 31 Reserved 12 \| 11 Control 0 | 100 h | Control/Status 2 |
| 31 Cache Coherence Error Register 0 | 110 h | CC_Error |
| 31 Reserved 24 \| 23 ISA PC compatibility map 1 0 | 120 h | ISA_Map1 |
| 31 ISA PC compatibility map 0 0 | 130 h | ISA_Map0 |
| 31 Reserved 08 \| 7 CBAR 0 | 140 h | CBAR |
| 31 Reserved 16 \| 15 REV 0 | 150 h | MBC Rev |
| 31 Programmable Attribute Map Register 1 0 | 160h | PAM1 |
| 31 Programmable Attribute Map Register 0 0 | 170h | PAM0 |
| 31 Reserved 0 | 180-3A0 h | Reserved |
| 31 Performance Monitor Counter 3 0 | 3B0 h | PMC3 |

Table 1-23 XA-MP Bus Slice Initialization and Configuration Registers

| | | | | |
|---|---|---|---|---|
| 31 | Performance Monitor Counter 2 | 0 | 3C0 h | PMC2 |
| 31 | Performance Monitor Counter 1 | 0 | 3D0 h | PMC1 |
| 31 | Performance Monitor Counter 0 | 0 | 3E0 h | PMC0 |
| 31 | Performance Monitor Selection Register | 0 | 3F0 h | PMSR |

1.5.2 Begin_init

Table 1-24 Register Addressing Using XA-MP Bus

| XA-MP Bus Address | | |
|---|---|---|
| A31-A15 | A14-A10 | A9-A3 |
| begin_init | Slice ID | Byte Offset |

The contents of the begin_init register specifies the base address for MBC initialization/configuration registers which can be located on any 32 Kilobyte boundary. Each MBC calculates an offset from the contents of the begin_init register. The offset is determined by the physical bus slice location multiplied by 1 Kilobyte. Table 1-24 illustrates the mapping that is done to generate a memory mapped register address on the XA-MP Bus. For a complete description refer to the "XA-MP Bus Target Specification"

1.5.2.1 Control/Status Register 2

The Control/Status Register is used to control the overall operating state of a given slice. Bits 22 thru 31 are read-only bits and bits 0 thru 6 are read/write. When writing to this register, commands are entered and then acted upon by the slice. The slice may also write this register to indicate status it wishes to display to the software (i.e the ST field to indicate the result of its internal test). When reading from this register, the status of the commands are returned from the slice.

Table 1-25 Control/Status Register 2

| Offset 100 h | Control/Status Register 2 | | | | | | | | | |
|---|---|---|---|---|---|---|---|---|---|---|
| 31 | 30 | 29-22 | 21-07 | 06 | 05 | 04 | 03 | 02 | 01 | 00 |
| HALT | SHTDN | PDP | Reserved | FLSH | BSP | KEN | C5ST | P5ST | INITP5 | RESET |

Table 1-26 Field Description - Control/Status Register

| Bit Field | Bit Setting | Operating Mode |
|---|---|---|
| RESET | X | refer to Table 1-27 |
| INITP5 | X | refer to Table 1-27 |
| P5ST | 0 | P5C BIST fail and initialization state |
| | 1 | P5C BIST pass |
| C5ST | 0 | C5C BIST fail and initialization state |
| | 1 | C5C BIST pass |
| KEN | 0 | caching disabled - initialization state |
| | 1 | caching enabled |
| BSP | 0 | not the Boot Strap Processor - initialization state |
| | 1 | Boot Strap Processor |
| PDP | x | PDP Status (CPU errors stored in PDP#0) |
| SHTDN | 0 | The P5 is not shut down - initialization state |
| | 1 | The P5 is shutdown |
| HALT | 0 | The P5 is not halted - initialization state |
| | 1 | The P5 is halted |

RESET

This bit in conjunction with the INITP5 bit in this register determines the type of initialization started by the MBC as a result of setting the INIT bit in the common control/status register. Table 1-27 illustrates the available initialization states.

Table 1-27 Initialization States

| RESET | INITP5 | Initialization State |
|---|---|---|
| 0 | 0 | RESET with BIST- P5/C5C/C8C master clear - power up state |
| 0 | 1 | run INIT -P5 clear |
| 1 | 0 | RESET without BIST - P5/C5C/C8C master clear |
| 1 | 1 | RESET with BIST- P5/C5C/C8C master clear |

INITP5

Refer to the RESET description for an explanation of this bit.

BSP

This bit when asserted indicates that this is the boot strap processor. If asserted it enables the DOS compatibility features within the MBC.

1.5.2.2 CC_Error Register

The MBC will set the cache coherency error code in the Bus Responder Trap register when a XA-MP Bus coherency error is detected. The MBC will also assert the XA-MP Bus SLE# signal if appropriate. The cc_error register will be set to record information regarding the coherency error detected by the MBC.

The cc_error register is a read only register that is initialized to 0x00000_0000. The cc_error register is returned to the initialization value after a XA-MP bus read operation. While write operations to this register are not normal, write access is provided to facilitate increased testability. Bits [31:6] of the cc_error register cannot be modified. The contents of the cc_error register is illustrated in Table 1-28 and defined in Table 1-29.

Table 1-28 CC_Error Registers

| Offset 0x110 | CC_Error Register | | | | | | |
|---|---|---|---|---|---|---|---|
| | 31–06 | 05 | 04 | 03 | 02 | 01 | 00 |
| | Reserved | HITALR | HITMLR | HITWBR | HITM | HITE | HITS |

Table 1-29 CC_Error Register Bit Definitions

| Bit Field | Bit Setting | Operating Mode |
|---|---|---|
| HITS | 0 | No snoop hit on a shared line |
| | 1 | Snoop hit on a shared line |
| HITE | 0 | No snoop hit on an exclusive line |
| | 1 | Snoop hit on an exclusive line |
| HITM | 0 | No snoop hit on a modified line |
| | 1 | Snoop hit on a modified line |
| HITWBR | 0 | No snoop hit on the write back register (WBR) |
| | 1 | Snoop hit on the write back register (WBR) |

Table 1-29 CC_Error Register Bit Definitions

| Bit Field | Bit Setting | Operating Mode |
|---|---|---|
| HITMLR | 0 | No snoop hit on the modified line register (MLR) |
| | 1 | Snoop hit on the modified line register (MLR) |
| HITALR | 0 | No snoop hit on the address lock register (ALR) |
| | 1 | Snoop hit on the address lock register (ALR) |

1.5.2.3 ISA_Map Registers

The ISA_map registers are provided to facilitate PC compatibility. The ISA_map register is used to enable or disable particular address regions (e.g. blocks) within the ISA defined address space. Since all program memory (e.g. RAM) will reside on the XA-MP Bus, the ISA_map register is not required to enable/disable these regions. In addition the ISA_map register supports ROM shadowing for those ISA regions that may contain ROM.

The MBC signals as non-cacheable to the P5/C5C/C8C any access to the XA-MP Bus that is enabled in the ISA-map register.The ISA_map registers are read/write registers and initialize to 0x0000_0000. While all bits in the ISA_map0 register can be modified, only bits [23:00] in the ISA_map1 register can be modified. The contents of the ISA_map registers are illustrated in Table 1-30 and defined in Table 1-31.

Table 1-30 ISA_map Registers

Offset 0x0120 — ISA_Map0 Register

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| 7EXP1 | 7EXP0 | 6EXP1 | 6EXP0 | 5EXP1 | 5EXP0 | 4EXP1 | 4EXP0 | 3EXP1 | 3EXP0 | 2EXP1 | 2EXP0 | 1EXP1 | 1EXP0 | 0EXP1 | 0EXP0 |

| 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|
| 7VID1 | 7VID0 | 6VID1 | 6VID0 | 5VID1 | 5VID0 | 4VID1 | 4VID0 | 3VID1 | 3VID0 | 2VID1 | 2VID0 | 1VID1 | 1VID0 | 0VID1 | 0VID0 |

Offset 0x0130 — ISA_Map1 Register

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| Reserved | | | | | | | | 15MBEN | 14MBEN | 13MBEN | 12MBEN | 11MBEN | 10MBEN | 09MBEN | 08MBEN |

| 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|
| 3BIOS1 | 3BIOS0 | 2BIOS1 | 2BIOS0 | 1BIOS1 | 1BIOS0 | 0BIOS1 | 0BIOS0 | 3EBIOS1 | 3EBIOS0 | 2EBIOS1 | 2EBIOS0 | 1EBIOS1 | 1EBIOS0 | 0EBIOS1 | 0EBIOS0 |

Table 1-31 ISA_map Register Bit Definitions

| Bit Field | Bit Setting | Operating Mode |
|---|---|---|
| 08MBEN - 15MBEN | The 08MBEN (0x0080_0000 - 0x008f_ffff) through 15MBEN (0x00f0_0000 - 0x00ff_ffff) are used to mark individual 1 mega-byte regions in the upper 8 mega-bytes of the ISA address space as cacheable or non-cacheable. | |
| 0BIOS[1:0] - 3BIOS[1:0] | The 0BIOS (0x000f_0000 - 0x000f_3fff) through 3BIOS (0x000f_a000 - 0x000f_ffff) are used to enable, disable or shadow individual 16 kilo-byte regions in the 64 kilo-byte ISA BIOS memory region. For performance reasons, the BIOS will be typically shadowed in XA-MP memory. | |
| | 0x0 | Memory region cacheable |
| | 0x1 | Memory region cacheable, read only (write protected) |
| | 0x2 | Memory region non-cacheable |
| | 0x3 | Memory region non-cacheable |
| 0EBIOS[1:0] - 3EBIOS[1:0] | The 0EBIOS (0x000e_0000 - 0x000e_3fff) through 3EBIOS (0x000e_a000 - 0x000e_ffff) are used to mark individual 16 kilo-byte regions in the 64 kilo-byte ISA Extended BIOS memory region as read-only, cacheable, or non-cacheable. | |
| | 0x0 | Memory region cacheable |
| | 0x1 | Memory region cacheable, read only (write protected) |
| | 0x2 | Memory region non-cacheable |
| | 0x3 | Memory region non-cacheable |
| 00EXP[1:0] - 07EXP[1:0] | The 00EXP[1:0] (0x000c_0000 - 0x000c_3fff) through 07EXP[1:0] (0x000d_a000 - 0x000d_ffff) are used to mark individual 16 kilo-byte regions in the 128 kilo-byte ISA Expansion Device address space as read-only, cacheable, or non-cacheable | |
| | 0x0 | Memory region cacheable |
| | 0x1 | Memory region cacheable, read only (write protected) |
| | 0x2 | Memory region non-cacheable |
| | 0x3 | Memory region non-cacheable |
| 00VID[1:0] - 07VID[1:0] | The 00VID[1:0] (0x000a_0000 - 0xa3fff) through 07VID[1:0] (0x000b_a000 - 0x000b_ffff) are used to mark individual 16 kilo-byte regions in the 128 kilo-byte ISA video memory address space as read-only, cacheable, or non-cacheable. | |
| | 0x0 | Memory region cacheable |
| | 0x1 | Memory region cacheable, read only (write protected) |
| | 0x2 | Memory region non-cacheable |
| | 0x3 | Memory region non-cacheable |

1.5.2.4 Cacheability Barricade Address Register

The Cacheability Barricade Address Register (CBAR) splits the 4 gigabyte memory address space into a cacheable region and a non-cacheable region. Every combination of the CBAR puts the memory space below as cacheable and above as non-cacheable. The two regions are selectable in 16 megabyte increments.

For example, when CBAR = 01h, a cacheable region is created within addresses range 0000_0000h - 00FF_FFFFh and a non-cacheable region from 0100_0000h - FFFF_FFFFh; when CBAR = 02h a cacheable region is created within addresses range 0000_0000h - 01FF_FFFFh and a non-cacheable region from 020_0000h - FFFF_FFFFh, etc. This pattern continues and when CBAR = FFh a cacheable region is created within addresses range 0000_0000h - FEFF_FFFFh and a non-cacheable region from FF00_0000h - FFFF_FFFFh.

When the CBAR = 00h,the barricade is turned off and all memory is cacheable except as set non-cacheable by the other address maps of the MBC. The other mapping registers; PAM0 & 1 and ISA map0 & 1 can be used to create non-cacheable windows within the CBAR cacheable region.

The contents of the register are illustrated in Table 1-28.

Table 1-32 Cacheability Barricade Address Register

<table>
<tr><td colspan="8">Offset 0x0140h</td><td colspan="24">Cacheability Barricade Address Register</td></tr>
<tr><td>31</td><td>30</td><td>29</td><td>28</td><td>27</td><td>26</td><td>25</td><td>24</td><td>23</td><td>22</td><td>21</td><td>20</td><td>19</td><td>18</td><td>17</td><td>16</td><td>15</td><td>14</td><td>13</td><td>12</td><td>11</td><td>10</td><td>09</td><td>08</td><td>07</td><td>06</td><td>05</td><td>04</td><td>03</td><td>02</td><td>01</td><td>00</td></tr>
<tr><td colspan="24">Reserved</td><td colspan="8">Barricade Address</td></tr>
</table>

1.5.2.5 Programmable Attribute Map Registers

The Programmable Attribute Map (PAM) Registers provide two programmable address decode segments, each with a field of 2 attribute bits. These address regions are defined through a programmable base address and a block size for each of the segments. Should a memory reference lie within any block defined by a PAM, each of the two attribute bits of the register are applied to the reference. The PAM Registers are intended to enable or disable an address region within the EISA address space. Since all program memory will reside on the XA-MP Bus, the PAM register is not required to enable/disable these regions. In addition the PAM register supports ROM shadowing for those regions that may contain ROM.

The contents of the register are illustrated in Table 1-33.

Table 1-33 Programmable Attribute Map Register

<table>
<tr><td colspan="10">Offset 0x0160h, 0170h</td><td colspan="22">Programmable Attribute Map Register 1, 0</td></tr>
<tr><td>31</td><td>30</td><td>29</td><td>28</td><td>27</td><td>26</td><td>25</td><td>24</td><td>23</td><td>22</td><td>21</td><td>20</td><td>19</td><td>18</td><td>17</td><td>16</td><td>15</td><td>14</td><td>13</td><td>12</td><td>11</td><td>10</td><td>09</td><td>08</td><td>07</td><td>06</td><td>05</td><td>04</td><td>03</td><td>02</td><td>01</td><td>00</td></tr>
<tr><td colspan="10">Base Address</td><td colspan="15">Reserved</td><td colspan="4">Block Size</td><td></td><td>PRO</td><td>PKEN#</td></tr>
</table>

Table 1-34 PAM Register Field Description

| Bit Field | Description |
|---|---|
| Base Address[31:22] | This field specifies the base address for each of the two segments. The validity of these bits is a function of the programmed block size. |
| Block Size[06:03] | The Block Size field specifies the size of each segment. Along with the base address field, memory blocks can be decoded anywhere in the 4 gigabyte address space with sizes of 4, 16 and 32MB.<br><br>Bit[06:03] / Block Size / Valid Address Bits:<br>1100 / 4M / A[31:22]<br>1101 / 8M / A[31:23]<br>1111 / 32M / A[31:25] |
| PKEN# | The default state of memory is cacheable(PKEN#=0). Writing a "1" to the PKEN# attribute bit causes the associated address range to be non-cacheable. Since PAM address ranges can overlap with each other, and also with ranges specified with other cacheable/non-cacheable mechanisms, the conflict will be resolved according to the following rule: If any one mechanism marks a particular range as non-cacheable, then that range is non-cacheable |
| PRO | The default state of memory is non-write protected(PRO=0). Writing a "1" to the PRO bit causes the associated address range to be write protected. Since PAM address ranges can overlap with each other, and also with ranges specified with other write protect mechanisms, the conflict will be resolved according to the following rule: If any one mechanism marks a particular range as write protected, then that range is write protected |

1.5.2.6 MBC Revision Register

This register contains the revision number of the MBC. It is hardwired inside the MBC.

Table 1-35 MBC Revision Register Format

| Offset 150 h | | | | | | | | | | | | | | | | Identification Register | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
| Reserved | | | | | | | | | | | | | | | | REV[15:00] | | | | | | | | | | | | | | | |

1.5.3 Performance Monitoring Registers

The MBC contains four 32-bit performance monitoring counters to measure various parameters that contribute to the performance of the system. The counters are usable by software for performance validation and architectural analysis. Each of the four counter can be programmed to count any one of 14 distinct events. Table 1-38 lists the performance monitoring events that may be counted in the MBC. While write operations to the counters are not normal, write access is provided to facilitate increased testability. It should be noted that some of the events are generally readily visible on the bus (denoted with *).

The Performance Monitoring Counters are thirty-two bit counters that are incremented when a specific event occurs. One register, the Performance Monitoring Control Register, is used to control all of the various Performance Monitoring Counters. The counters are cleared when read through the XA-MP Bus or upon system initialization.

Table 1-36 Performance Monitoring Counter

| Offset 3B0 h, 3C0 h, 3D0 h, 3E0 h | Performance Monitoring Register 3, 2, 1, 0 |
|---|---|
| 31–00 | CNT[31:00] |

1.5.3.1 Performance Monitor Select Register

The Performance Monitor Select Register is used to enable and disable the various performance monitoring counters. A field in the Performance Monitoring Control Register is used to control each Performance Monitoring Counter. The field controls whether a counter is enable and what it counts when it is enabled. The Performance Monitoring Control register is a read/write register and is initialized to 00000000 Hex.

Table 1-37 Performance Monitor Select Register Enable/Disable Register Format

| Offset 3F0h | PMS Register | | |
|---|---|---|---|
| 31–24 | 23–16 | 15–08 | 07–00 |
| PMS_SEL3 | PMS_SEL2 | PMS_SEL1 | PMS_SEL0 |

Table 1-38 Field Description - PMR E/D Register

| Bit Field | Bit Setting | Performance Monitoring Counter x Counts: |
|---|---|---|
| PMS_SELx | 00 h | Performance monitor register x is disabled |
| | 01 h | CLKCTR - Bus clock counter (this counter counts only the bus clock is used to provide a frame of reference). |
| | 02 h | CRM - Code read misses |
| | 03 h | DRM - Data read misses |
| | 04 h | DWM - Data write misses |
| | 05 h | WB -Write backs* |
| | 06 h | WHSD - Write hits to shared data |
| | 07 h | WHED - Write hits to exclusive data |
| | 08 h | SNPCTR - Total number of XA-MP Bus snoops* |
| | 09 h | RSHSL - Read snoop hits to shared lines* |
| | 0A h | WSHSL - Write snoop hits shared lines* |
| | 0B h | RSHML - Read snoop hit to modified line* |
| | 0C h | WSHML - Write snoop hits to modified lines* |
| | 0D h | RSHEL - Read snoop hits to exclusive lines |
| | 0E h | WSHEL - Write snoop his to exclusive lines |
| | 0F h | AL - Address locks* |
| | 10 h | NAKCTR - Total number of XA-MP Bus negative acknowledgments |
| | 11 h | NAKLOK - Negative acknowledgments generated due to lock |
| | 12 h | NAKWBR - Negative acknowledgments generated due to snoop hits on the write back register |
| | 13 h | NAKMLPI - Negative acknowledgments generated due to snoop hits on modified lines during a pending intervention cycle |
| | 14 h | NAK2TBSY - Negative acknowledgments generated due to 2nd tag directory resource conflict |

1.6 TESTABILITY

1.6.1 IEEE 1149.1

T.B.D.

1.6.1.1 Boundary Scan

T.B.D.

1.6.1.2 Internal Scan

T.B.D

1.6.1.3 BIST

T.B.D.

1.7 ELECTRICAL SPECIFICATIONS

1.7.1 Power & Ground

T.B.D.

1.7.2 Maximum Ratings

T.B.D.

1.7.3 DC Specifications

T.B.D.

1.7.4 AC Specifications

T.B.D.

1.8 MECHANICAL SPECIFICATIONS

1.8.1 Package Information

T.B.D.

1.8.2 Package Thermal Specifications

T.B.D.

APPENDIX 7

PROCESSOR DATA PATH

TABLE OF CONTENTS

PROCESSOR DATA PATH (PDP) ..... 1
1.1 INTRODUCTION ..... 1
1.1.1 Product Description ..... 1
1.1.2 Revision History ..... 1
1.1.3 References ..... 2
1.2 FUNCTIONAL DESCRIPTION ..... 2
1.2.1 Block Diagram ..... 3
1.2.1.1 XA-MP Interface ..... 5
1.2.1.2 Cache Data Interface ..... 5
1.2.1.3 MBC Interface ..... 5
1.2.1.4 Input FIFO ..... 5
1.2.1.5 Output FIFO ..... 5
1.2.1.6 MBC Input Data Register (MBC-IN) ..... 5
1.2.1.7 MBC Output Data Register (MBC-OUT) ..... 6
1.2.1.8 Parity Control ..... 6
1.2.1.9 Parity Checking ..... 6
1.2.1.10 Error Collector ..... 6
1.2.1.11 State Machine ..... 7
1.2.1.12 SCAN Control ..... 7
1.3 PIN DESCRIPTION ..... 8
1.3.1 XA-MP Bus Interface Pins(All GTL's except PWRG which is TTL) ..... 8
1.3.2 MBC/PDP Interface Pins(All CMOS signals) ..... 9
1.3.3 PROCESSOR Board/PDP Interface Pins(All TTL signals) ..... 11
1.3.4 Cache Data Array Interface(All TTL signals) ..... 12
1.3.5 Boundary Scan Signals(All TTL signals) ..... 12
1.4 PDP Timing Diagrams ..... 12

1 PROCESSOR DATA PATH (PDP)

1.1 INTRODUCTION

This specification describes the functionality of the Processor Data Path (PDP) which is part of the XA-MP chip set. The PDP interfaces one of the 64-bit XA-MP data buses to a 64-bit secondary cache made up of C8C's. When combined with a second PDP, the full dual 64-bit XA-MP data bus is supported.

1.1.1 Product Description

This product when combined with a second PDP, and under control of the Memory Bus Controller (MBC), provides a full glueless interface to the XA-MP bus. Figure 1-1 shows the application of the PDP in a CPU module using P5 technology.

Figure 1-1 CPU Module Using PDP's.

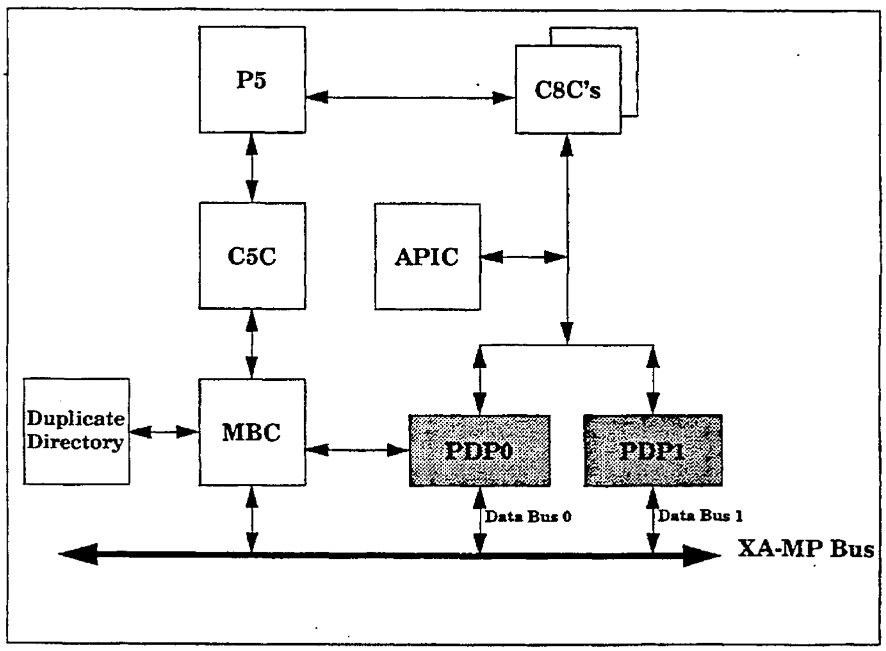

1.1.2 Revision History

The current version (0.0) is the first revision of this document.

1.1.3 References

The following are related documents that this section refers to:

1. 82489DX Advanced Programmable Interrupt Controller
2. Preliminary P5 CPU Data Book
3. Preliminary C5C/C8C Data Book for the P5 CPU
4. XA-MP Bus Target Specification Revision 0.0
5. XA-MP Memory Bus Controller Target Specification Revision 0.0

1.2 FUNCTIONAL DESCRIPTION

The PDP provides the data connection between the XA-MP Bus and a secondary cache under control of the Memory Bus Controller. The PDP as shown in Figure 1-2 supports the following interfaces:

1. 64-bit local data bus to secondary cache
2. 64-bit data interface to XA-MP Bus
3. 8-bit data and 3-bit command interface to MBC
4. 5-bit IEEE 1149.1 Boundary Scan interface
5. Byte parity on XA-MP and local data busses
6. P5 & C5C error collection logic The PDP supports all read and write operations issued by the processor via the secondary cache. This is done by providing read and write buffers for cache line fills or cast outs. This buffer management is under direction of the MBC.

The PDP supports a byte parity protection scheme on both the XA-MP Bus incoming data transfers and data transfers from the cache data interface. Errors from the XA-MP bus are reported to the MBC via the PDPPCHK# signal, while data from the cache data bus is reported to the MBC via the PDPUDE# signal. The MBC will use these signals to report DPE# and UDE# on the XA-MP Bus.

The PDP also supports P5 & C5C error collection logic. Errors detected are latched by the PDP and reported back to the MBC via the CPUERRROn# signal. The MBC will then read the latched error(s) and store the information in a software visible register.

Figure 1-2 PDP Connections
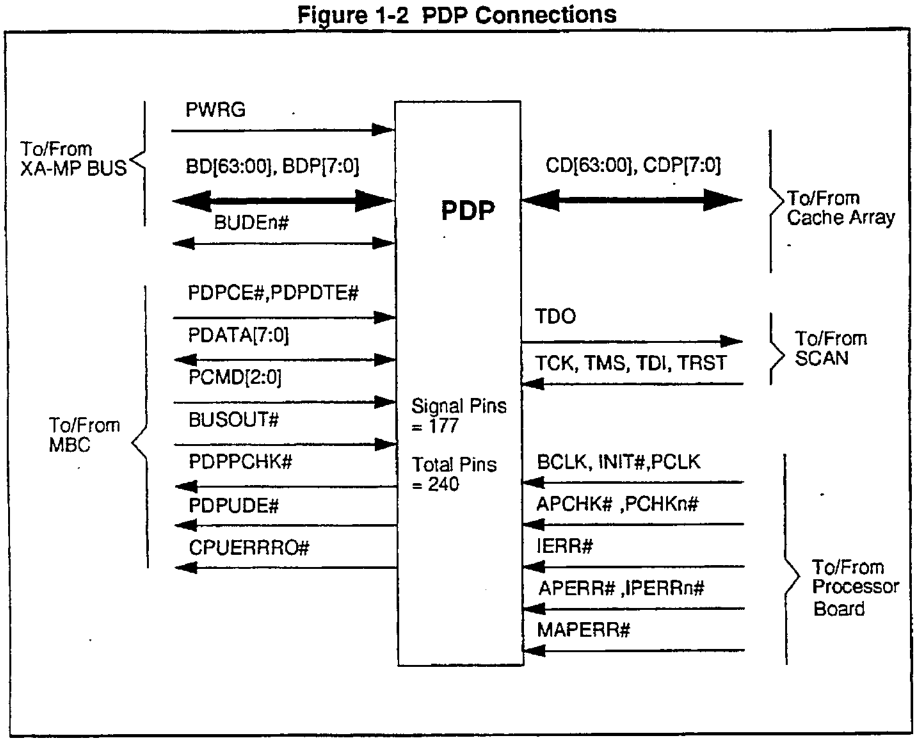
1.2.1 Block Diagram
The block diagram is shown in Figure 1-3. As shown, the PDP is composed of the following blocks.
1. XA-MP Interface
2. Cache Data Interface
3. MBC Interface
4. Input FIFO
5. Output FIFO
6. MBC Input Data
7. MBC Output Data
8. Parity Control
9. XAMP Bus input data Parity Checking
10. Error Collector
11. State Machine
12. SCAN Control
13. Phase Lock Loop

Figure 1-3 PDP Block Diagram
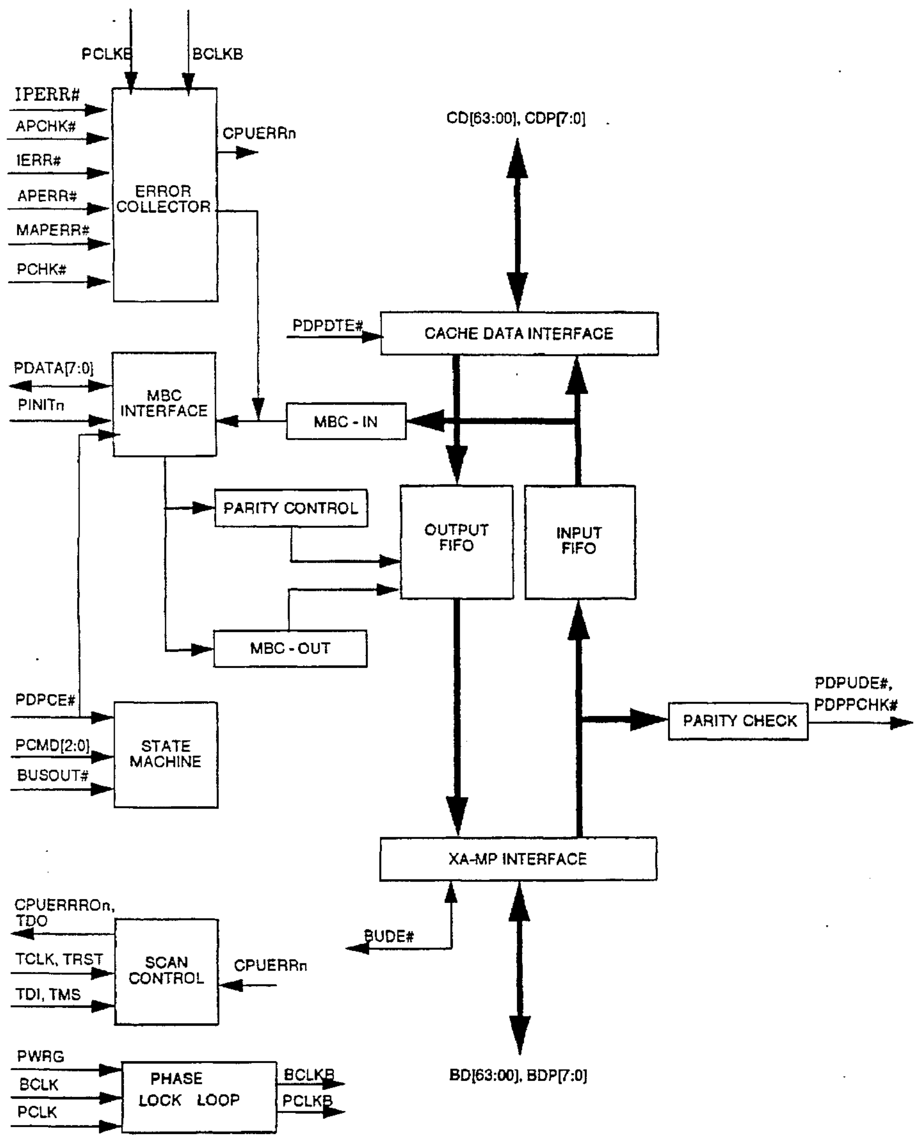

1.2.1.1 XA-MP Interface

The XA-MP Interface is responsible for all PDP communications with the XA-MP Bus. Features include the following:

Provide high speed transceivers to the XA-MP data bus

1.2.1.2 Cache Data Interface

The Cache Data Interface is responsible for all PDP communications with the cache data buffer made up of C8Cs. Operation include the following:

1. Provide transceivers to the cache data bus
2. Direct single bus word or cache line fill operations from the input FIFO
3. Receive single bus word or cache write back data from the cache data bus and direct the data to the output FIFO

1.2.1.3 MBC Interface

The MBC interface is responsible for all PDP communications with the MBC.Under control of the MBC sends data to the MBC-IN register.Features include the following:

1.Provides PDATA(7 downto 0) bi-directional interface signals between PDP and MBC.

2. Receives PINIT signal from MBC for initializing the PDP chip.

1.2.1.4 Input FIFO

The Input FIFO is responsible for capturing incoming data from the XA-MP bus for cache reads or writes to the MBC registers. Operations include the following:

1. Under control of the MBC sends data to the MBC-IN register
2. Under control of the MBC sends data to the Cache Data Interface

1.2.1.5 Output FIFO

The Output FIFO is responsible for capturing data from the Cache Data Interface and directing it to the XA-MP Interface. Operations include the following:

1. Under control of the MBC direct data to the XA-MP Interface
2. Generate odd parity for XA-MP data as instructed by parity control register
3. Check data parities and send UDE to XA-MP interface.

1.2.1.6 MBC Input Data Register (MBC-IN)

The MBC-IN register captures data from the XA-MP bus which is directed at the software visible registers in the MBC. Operations include the following:

1. Loads data from Input FIFO when instructed by MBC.

2. Shifts out byte data through PDATA[7:0] when instructed by MBC

1.2.1.7 MBC Output Data Register (MBC-OUT)

The MBC-OUT register is used by the MBC to transfer its internal software visible registers to the XA-MP Bus. Operations include the following:

1. Shifts in byte data through PDATA[7:0] when instructed by the MBC
2. Enables data onto the XA-MP data bus when instructed by the MBC

1.2.1.8 Parity Control

The parity control register is used generate odd parity for the selected data byte for all outgoing XA-MP bus transactions. This register is loaded through PDATA[7:0] when instructed by the MBC.

1.2.1.9 Parity Checking

Parity checking is done by the PDP for both incoming and outgoing XA-MP data. Operations include the following:

1. Parity Checking of all incoming XA-MP data on every bus clock. Error signal (PDPPCHK#) is registered and sent to MBC. The MBC then decides to send DPE# on the XA-MP Bus.
2. Parity Checking on outgoing XA-MP data. Error signal is registered and sent to MBC. The MBC then decides to send UDE# on the XA-MP Bus.

1.2.1.10 Error Collector

Error collection is done by the PDP for errors detected by both P5 and C5C.The following errors are collected by PDP and sent to PDATA Bus encoded as follows:

1. From P5: APCHK#,IERR# and PCHK#
2. From C5C: APERR#, IPERR# and MAPERR#

| PDATA(7 downto 0) to MBC | | | | | | | |
|---|---|---|---|---|---|---|---|
| 07 | 06 | 05 | 04 | 03 | 02 | 01 | 00 |
| 0 | 0 | IPERR# | PCHK# | APCHK# | IERR# | APERR# | MAPERR# |

1.2.1.11 State Machine

The State Machine is responsible for controlling operations within the PDP as instructed by the MBC. Operations include the following:

1. Input FIFO Control
2. Output FIFO Control
3. MBC Interface Control
4. Cache Data Interface Control
5. XA-MP Bus Interface Control

1.2.1.12 SCAN Control

The SCAN Control is responsible for all 1149.1 Boundary Scan operations.

1.3 PIN DESCRIPTION

The different sets of signals of the PDP(with a total of 177 signal pins) are classified as follows:

1. XA-MP Bus Interface Pins
2. MBC Interface Pins
3. Processor Board Interface Pins
4. Cache Data Array Interface Pins
5. Scan Interface Pins

1.3.1 XA-MP Bus Interface Pins(All GTL's except PWRG which is TTL)

Table 1-1 XA-MP Bus Interface Pins

<table>
<tr><th>PIN NAME</th><th>Type</th><th>DESCRIPTION</th></tr>
<tr><td>BD[63:00]</td><td>I/O</td><td>Bus Data. A 64-bit data bus between the PDP and the XA-MP Bus.</td></tr>
<tr><td>BDP[7:0]</td><td>I/O</td><td>Bus Data Parity. These bits indicate even parity for each byte of data bus BD[63:00] according to the following table. These bits are valid at the same time as the data bus.
<table>
<tr><th>Data Bits</th><th>Parity Bit</th><th>Data Bits</th><th>Parity Bit</th></tr>
<tr><td>BD[63:56]</td><td>BDP[7]</td><td>BD[31:24]</td><td>BDP[3]</td></tr>
<tr><td>BD[55:48]</td><td>BDP[6]</td><td>BD[23:16]</td><td>BDP[2]</td></tr>
<tr><td>BD[47:40]</td><td>BDP[5]</td><td>BD[15:08]</td><td>BDP[1]</td></tr>
<tr><td>BD[39:32]</td><td>BDP[4]</td><td>BD[07:00]</td><td>BDP[0]</td></tr>
</table>
</td></tr>
<tr><td>BUDE#</td><td>I/O</td><td>Bus Uncorrected Data Error, when low indicates that the data present on the Data Bus contains an uncorrectable data error.</td></tr>
<tr><td>PWRG</td><td>I</td><td>Power Good signal coming from power supply.</td></tr>
<tr><td>74</td><td></td><td>TOTAL PINS</td></tr>
</table>

1.3.2 MBC/PDP Interface Pins(All CMOS signals)

Table 1-2 MBC/PDP Interface Pins

| Signal Name | Type | Description |
|---|---|---|
| PDATA[7:0] | I/O | PDP Data. An 8-bit field used to transfer data between the PDP and MBC. The contents of this field are as defined by the PCMD field. |
| PDPCE# | I | PDP Chip Enable. An active low signal, from the MBC to the PDP, is used by the MBC to select one of two PDPs for operation. This signal in turn is used to qualify PDPDTE#, BUSOUT#, PDPCMD#, and PDPUDE#. |
| PDPDTE# | I | PDP Data Enable. An active low signal, from the MBC when asserted along with PDPCE# enables PDP data onto the cache data bus. The PDP will be enabled onto the cache data bus for every bus clock in which this signal is active. |
| PCMD[2:0] | I | PDP CoMmanD - these signals, used in conjunction with the PDPCE#[1:0], flow from the MBC to PDP and are used by PDP to receive commands from MBC. (see table below) |
| BUSOUT# | I | Bus Out. An active low signal, form the MBC to the PDP when combined with PDPCE#, is used to enable data from the PDP onto the XA-MP Bus. Data is enabled onto the bus for every Bus Clock that BUSOUT# is active. |

| DESCRIPTION | PCMD2 | PCMD1 | PCMD0 |
|---|---|---|---|
| Inactive/reserved for external device | 0 | 0 | 0 |
| load MBC register into PDP<br>PDATA(7:0) = 0 - register read | 0 | 0 | 1 |
| read error field from PDP | 0 | 1 | 0 |
| load parity control inside PDP | 0 | 1 | 1 |
| load MBC register from PDP | 1 | 0 | 0 |
| read word/line data returned to C8C<br>PDATA(7:0) = 0 - read line ordered<br>PDATA(7:0) = 1 - read word ordered<br>PDATA(7:0) = 2 - read line out of order<br>PDATA(7:0) = 3 - read word out of order<br>PDATA(7:0) = 4 - force read line of all zero<br>PDATA(7:0) = 5 - force read word of all zero | 1 | 0 | 1 |
| write word/line<br>PDATA(7:0) = 0 - write line<br>PDATA(7:0) = 1 - write word<br>PDATA(7:0) = 4 - abort write | 1 | 1 | 0 |
| reserved | 1 | 1 | 1 |

Table 1-2 MBC/PDP Interface Pins

| Signal Name | Type | Description |
|---|---|---|
| PDPPCHK# | O | PDP Parity Check. An active low signal, from the PDP to the MBC when asserted, indicates that the PDP detected a parity error on the data received on the XA-MP Bus. This signal is true one Bus Clock after the error is detected and will remain asserted as long as the data on the XA-MP Bus is in error. |
| CPUERRRO# | O | CPU Error. This active low signal indicates that the PDP has detected a CPU error condition. This signal is asserted when ever the PDP detects IERR#, PCHK#, APERR#, APCHK#, IPERR# or MAPERR# true. The CPUERRRO# signal is asserted one or two BCLKs after one or more of the above errors occurs, and remains active for one or two BCLK period. |
| PDPUDE# | O | PDP Uncorrected Data Error. An active low signal, form the PDP to the MBC is used to indicate that the data presently selected inside the PDP onto the outputs of the XA-MP Bus transceivers contains an uncorrected error. This signal is asserted as long as the data selected inside the PDP is in error. |
| 17 | | TOTAL PINS |

1.3.3. PROCESSOR Board/PDP Interface Pins(All TTL signals)

Table 1-3 Processor Board/PDP Interface

| Signal Name | Type | Description |
|---|---|---|
| INIT# | I | Initialize. This signal is sent to PDP from the processor board, when low causes the PDP to initialize itself. |
| BCLK | I | Bus Clock. Frequency equals 33.3 Mhz. |
| PCLK | I | Processor Clock. This signal is used to sample error signals from the processor. The clock can have a frequency up to 66 Mhz |
| APCHK | I | Address Parity Check. This active low signal indicates that the P5 detected an Address Parity Error during an inquire cycle. This signal is sampled by PCLK and when true causes the PDP to store the error and assert CPUERR# |
| IERR | I | Internal Error. This active low signal indicates that the P5 detected an Internal Error. This signal is sampled by PCLK and when true causes the PDP to store the error and assert CPUERR#. |
| PCHK | I | Parity Check Error. This active low signal indicates that the P5 detected a parity error on a data read. This signal is sampled by PCLK and when true causes the PDP to store the error and assert the signal CPUERRRO#. |
| APERR | I | Address Parity Error. This active low signal indicates that the C5C detected an Address Parity Error on the P5 address bus. This signal is sampled by PCLK and when true causes the PDP to store the error and assert CPUERR# |
| IPERR | I | Internal Parity Error. This active low signal indicates that the C5C detected an internala TAGRAM parith error and/or an internal address path parity error. This signal is sampled by PCLK and when true causes the PDP to store the error and assert the signal CPUERRRO#. |
| MAPERR | I | Memory Address Bus Parity Error. This active low signal indicates that the C5C detected an Address Parity Error on the MBC address signals. This signal is sampled by PCLK and when true causes the PDP to store the error and assert CPUERR# |
| 9 | | TOTAL PINS |

1.3.4 Cache Data Array Interface(All TTL signals)

Table 1-4 Cache Data Array Interface

<table>
<tr><th>PIN NAME</th><th>Type</th><th>DESCRIPTION</th></tr>
<tr><td>CD[63:00]</td><td>I/O</td><td>Cache Data. A 64-bit data bus between the PDP and the Cache Data Array (C8Cs). This bus is defaulted to receiving data from the Cache. Data is driven from the PDP to this bus when PDPCE# and PDPDTE# are active.</td></tr>
<tr><td>CDP[7:0]</td><td>I/O</td><td>Cache Data Parity. These bits indicate even parity for each byte of data bus CD[63:00] according to the following table. These bits are valid at the same time as the Cache Data bus.
<table>
<tr><th>Data Bits</th><th>Parity Bit</th><th>Data Bits</th><th>Parity Bit</th></tr>
<tr><td>CD[63:56]</td><td>CDP[7]</td><td>CD[31:24]</td><td>CDP[3]</td></tr>
<tr><td>CD[55:48]</td><td>CDP[6]</td><td>CD[23:16]</td><td>CDP[2]</td></tr>
<tr><td>CD[47:40]</td><td>CDP[5]</td><td>CD[15:08]</td><td>CDP[1]</td></tr>
<tr><td>CD[39:32]</td><td>CDP[4]</td><td>CD[07:00]</td><td>CDP[0]</td></tr>
</table></td></tr>
<tr><td>72</td><td></td><td>TOTAL PINS</td></tr>
</table>

1.3.5 Boundary Scan Signals(All TTL signals)

Table 1-5 Boundary Scan Signals

| Signal Name | Type | Description |
|---|---|---|
| TCK | I | Test Clock |
| TMS | I | Serial Test Mode Select |
| TDI | I | Serial Test Data Input |
| TDO | O | Serial Test Data Output |
| TRST | I | Test Reset |
| 5 | | TOTAL PINS |

1.4 PDP Timing Diagrams

Figure 1-4 Timing- Ordered Read Cache Line-RC(I)L
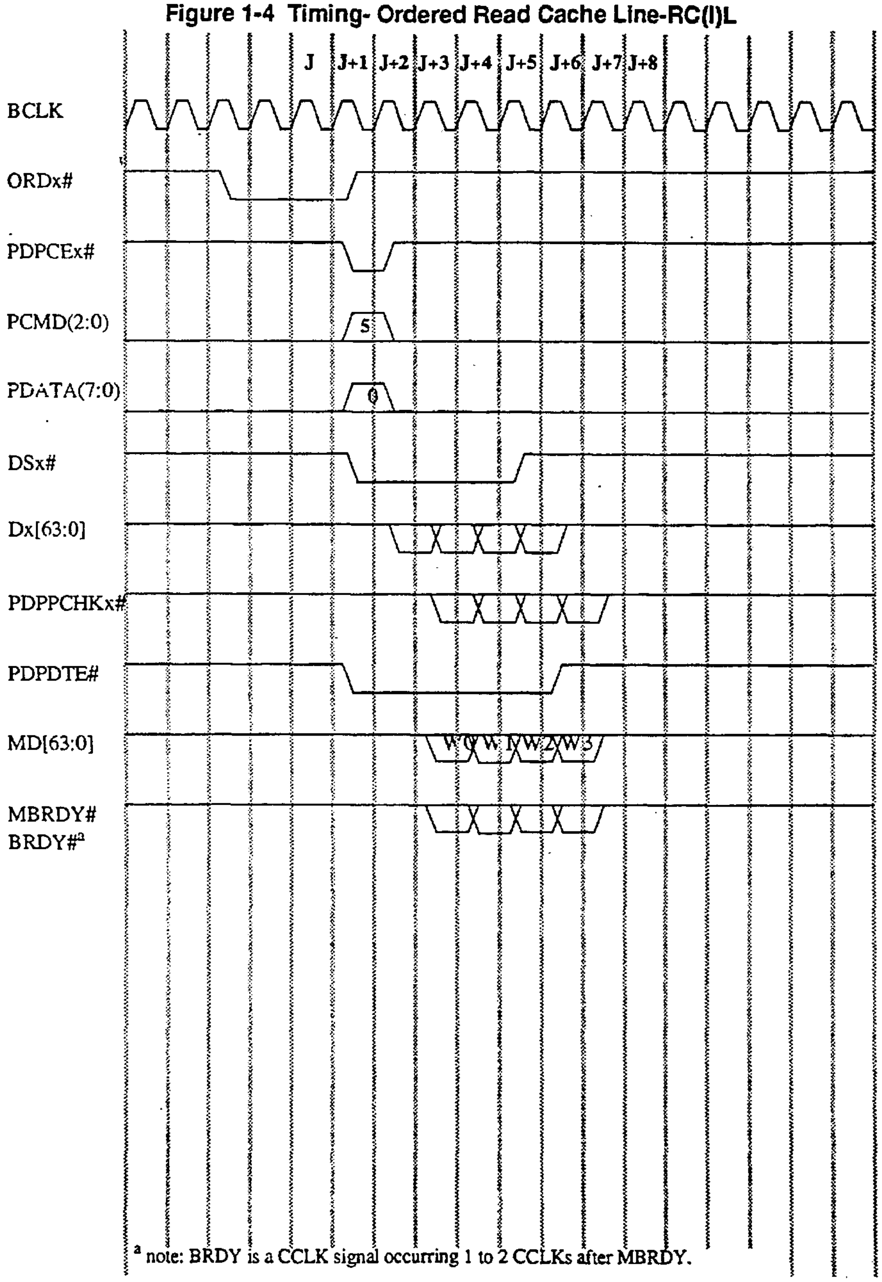
[a] note: BRDY is a CCLK signal occurring 1 to 2 CCLKs after MBRDY.

Figure 1-5 Timing- Out Of Order Read Cache Line-RC(I)L
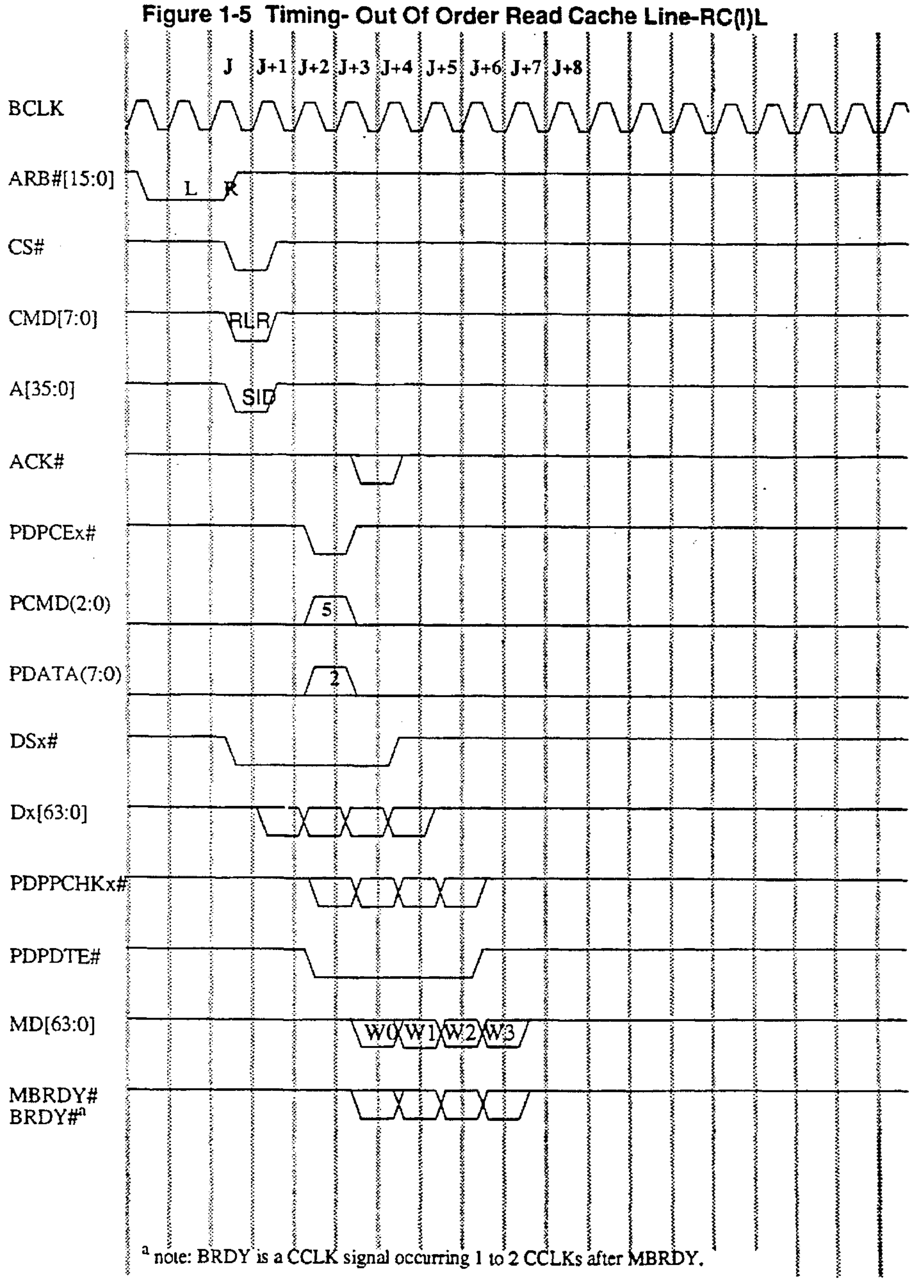
[a] note: BRDY is a CCLK signal occurring 1 to 2 CCLKs after MBRDY.

Figure 1-6 Timing -Ordered Read Bus Word-RBW(L)
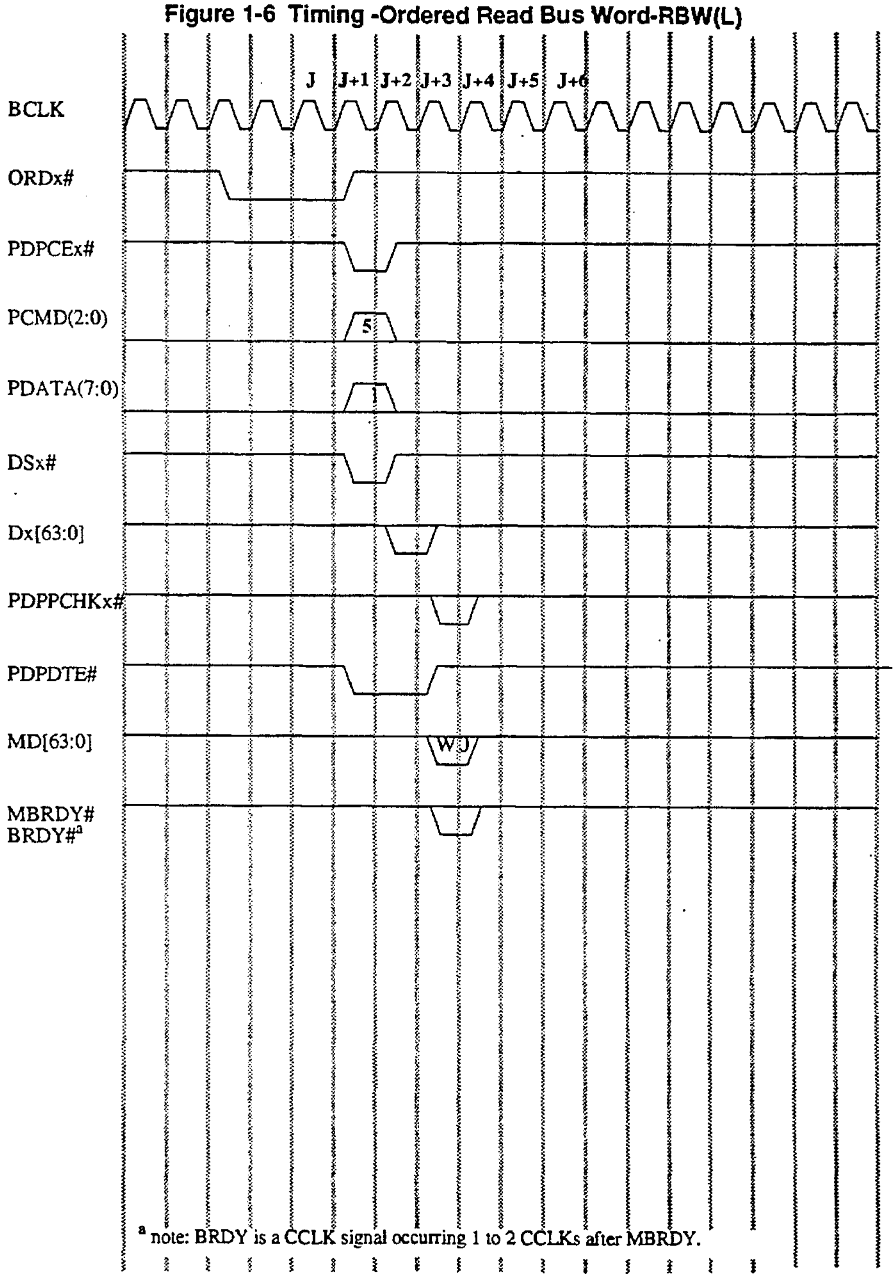
[a] note: BRDY is a CCLK signal occurring 1 to 2 CCLKs after MBRDY.

Figure 1-7 Timing -Out Of Order Read Bus Word-RBW(L),INTA&IOR
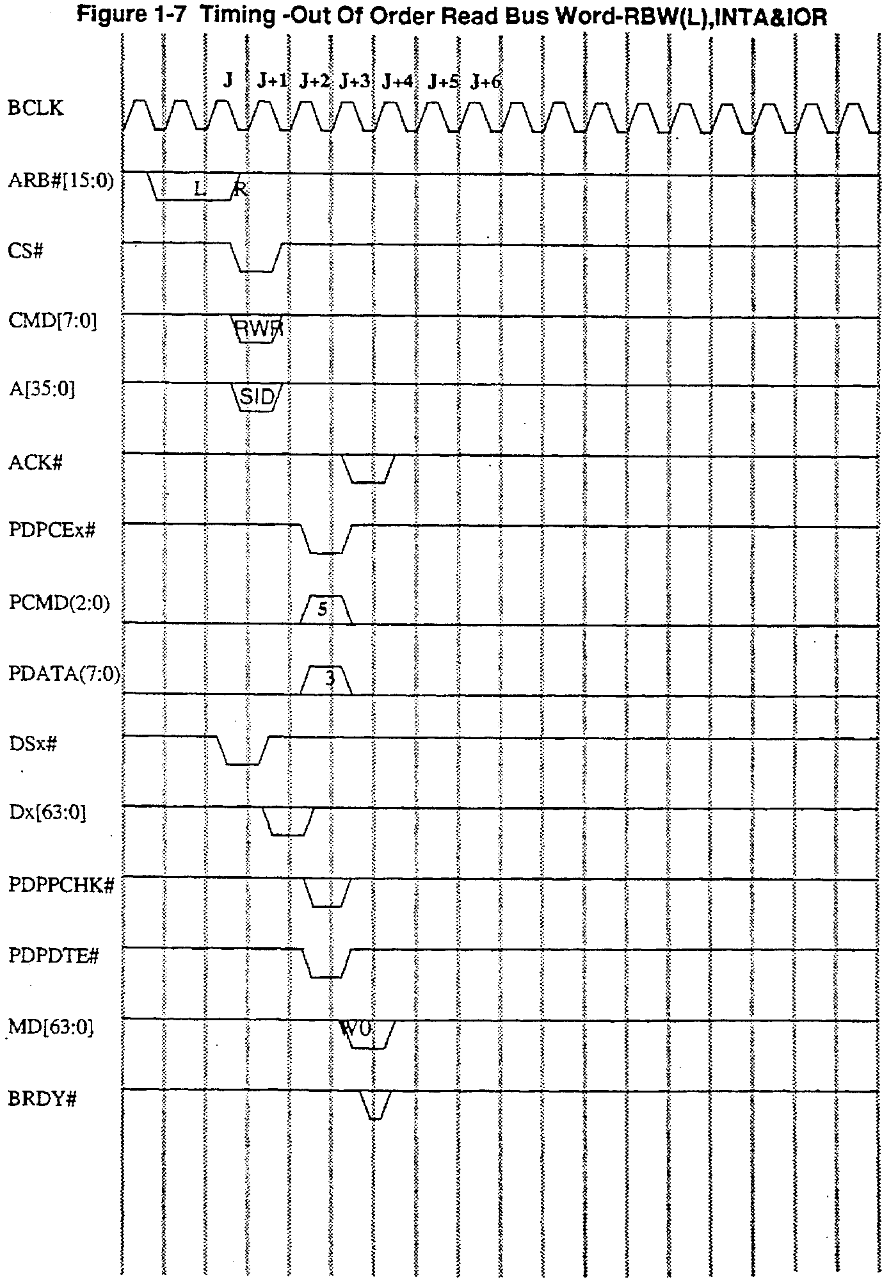

Figure 1-8 Timing -Read Cache Line Response Cycle-RLR
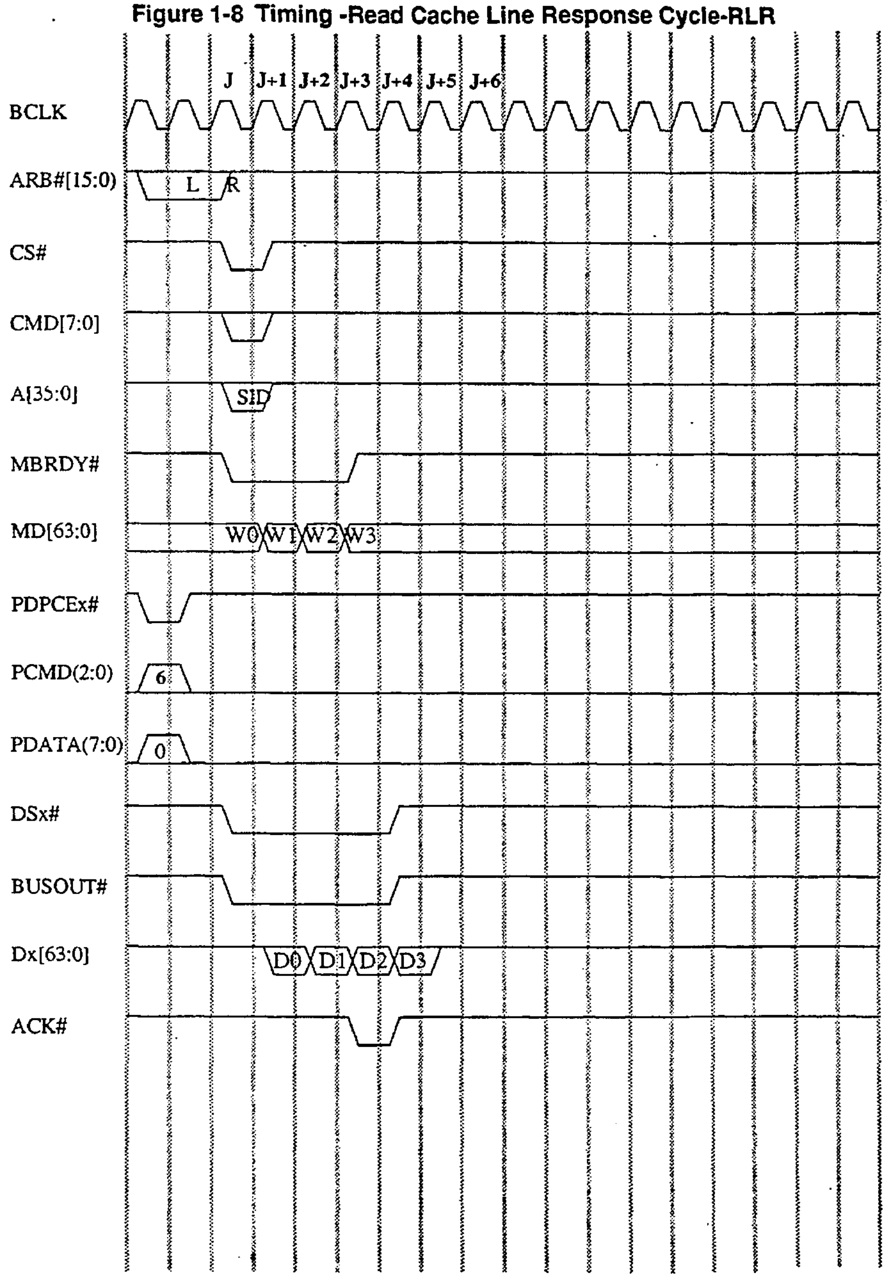

Figure 1-9 Timing -Read Word Response Cycle-RWR
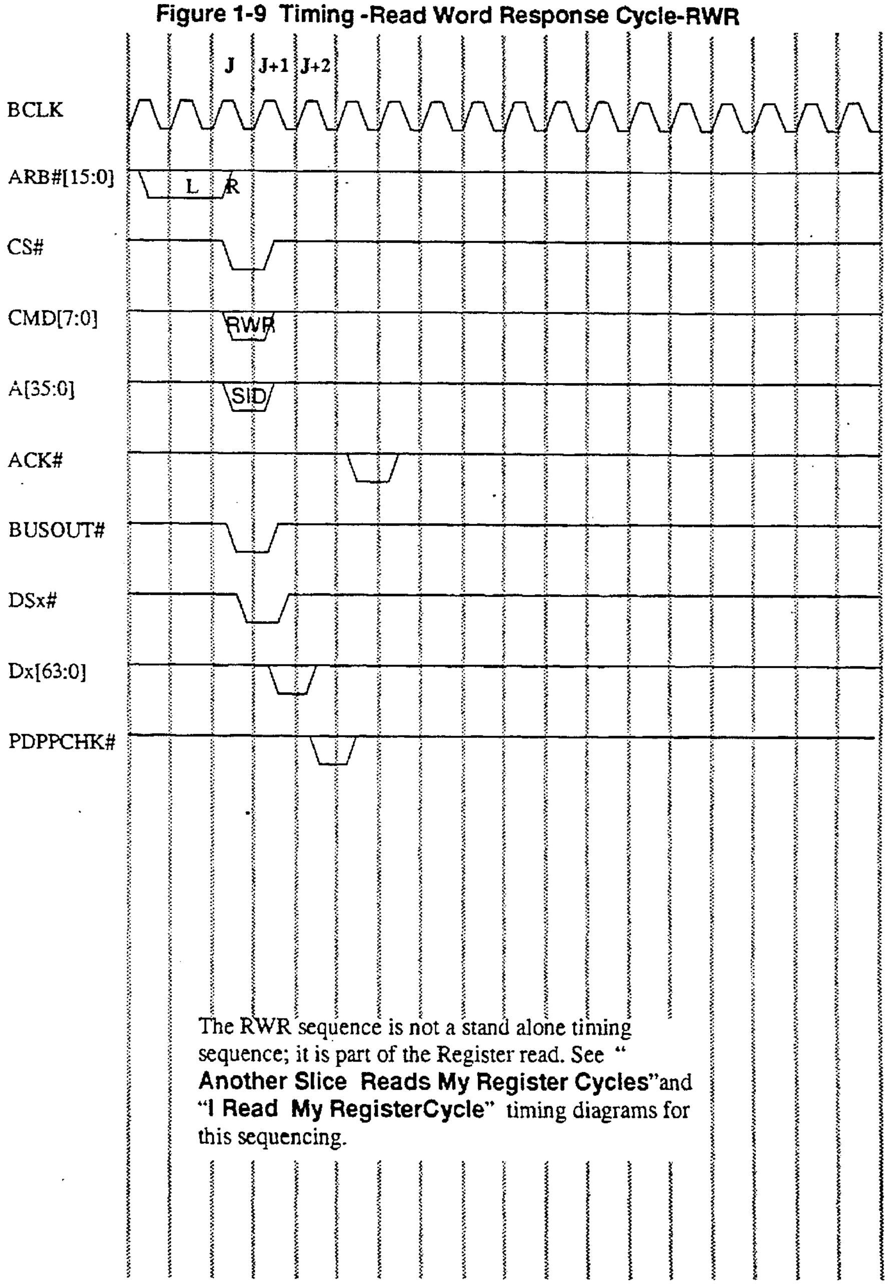
The RWR sequence is not a stand alone timing sequence; it is part of the Register read. See "Another Slice Reads My Register Cycles"and "I Read My RegisterCycle" timing diagrams for this sequencing.

Figure 1-10 Timing - Write Cache Line Cycle-WCL
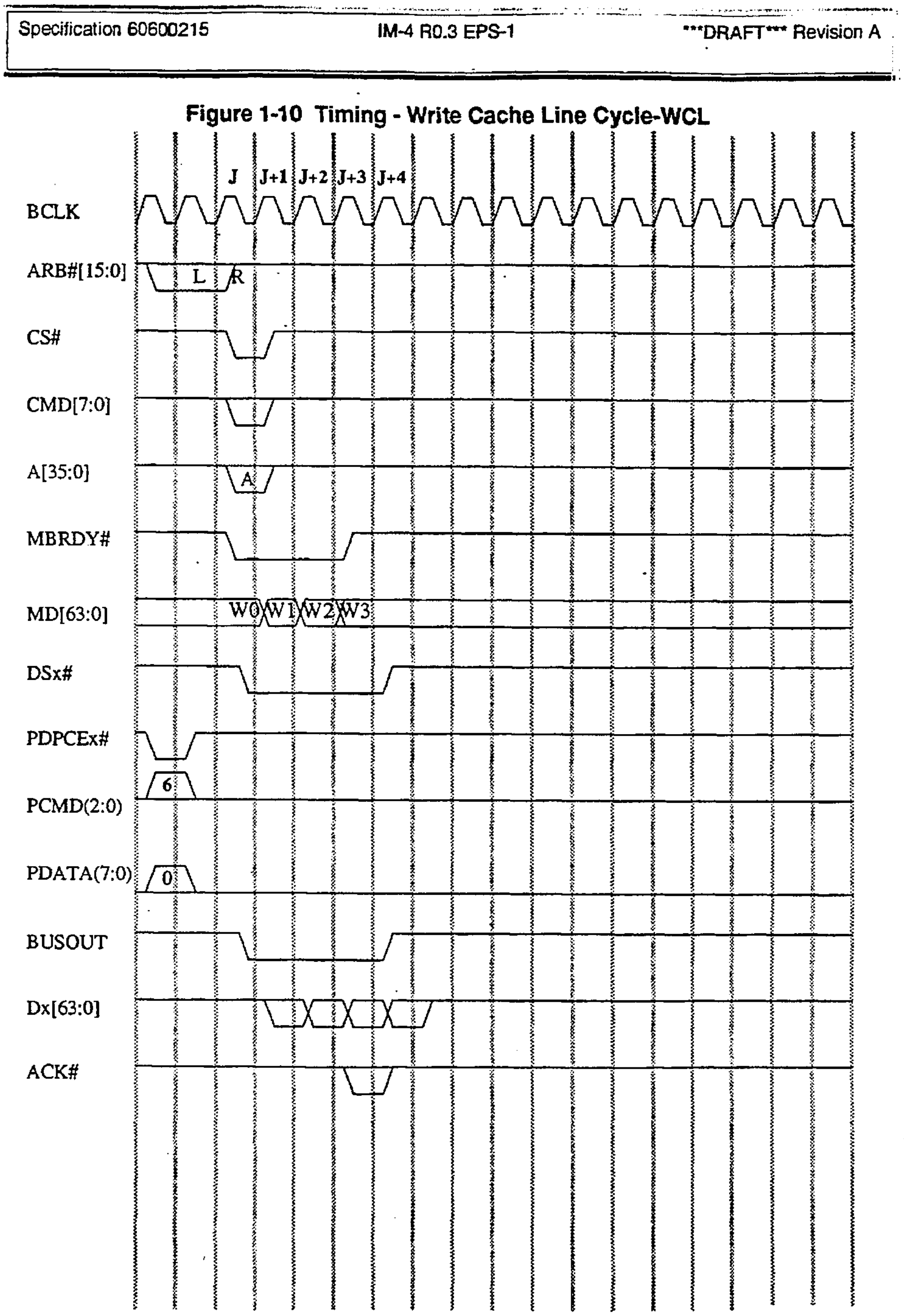

Specification 60600215 IM-4 R0.3 EPS-1 *DRAFT* Revision A
Figure 1-11 Timing - Write Bus Word cycle-WBW(L)&IOW
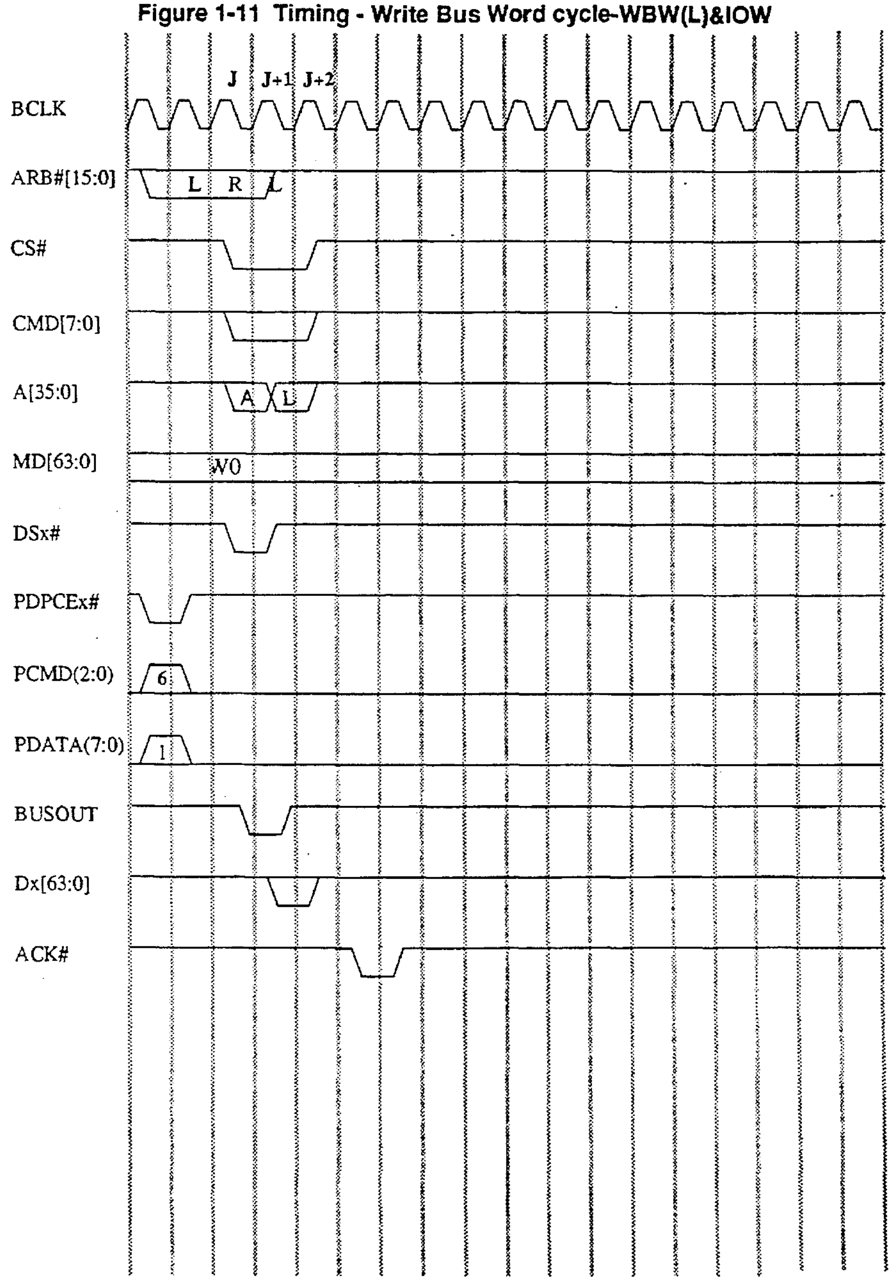

Figure 1-12 Timing -Another Slice Reads My Register Cycles
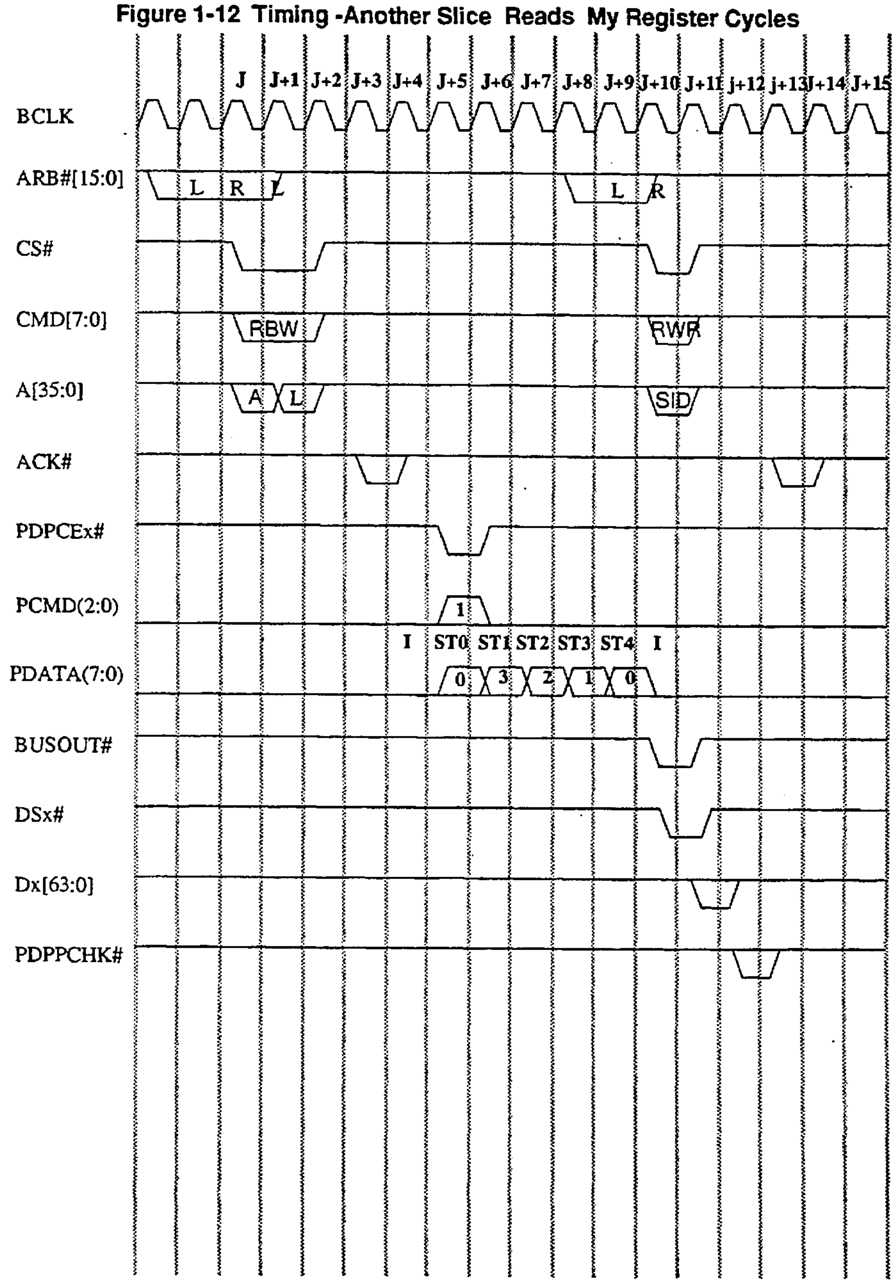

Figure 1-13 Timing - Another Slice Writes My Register cycle
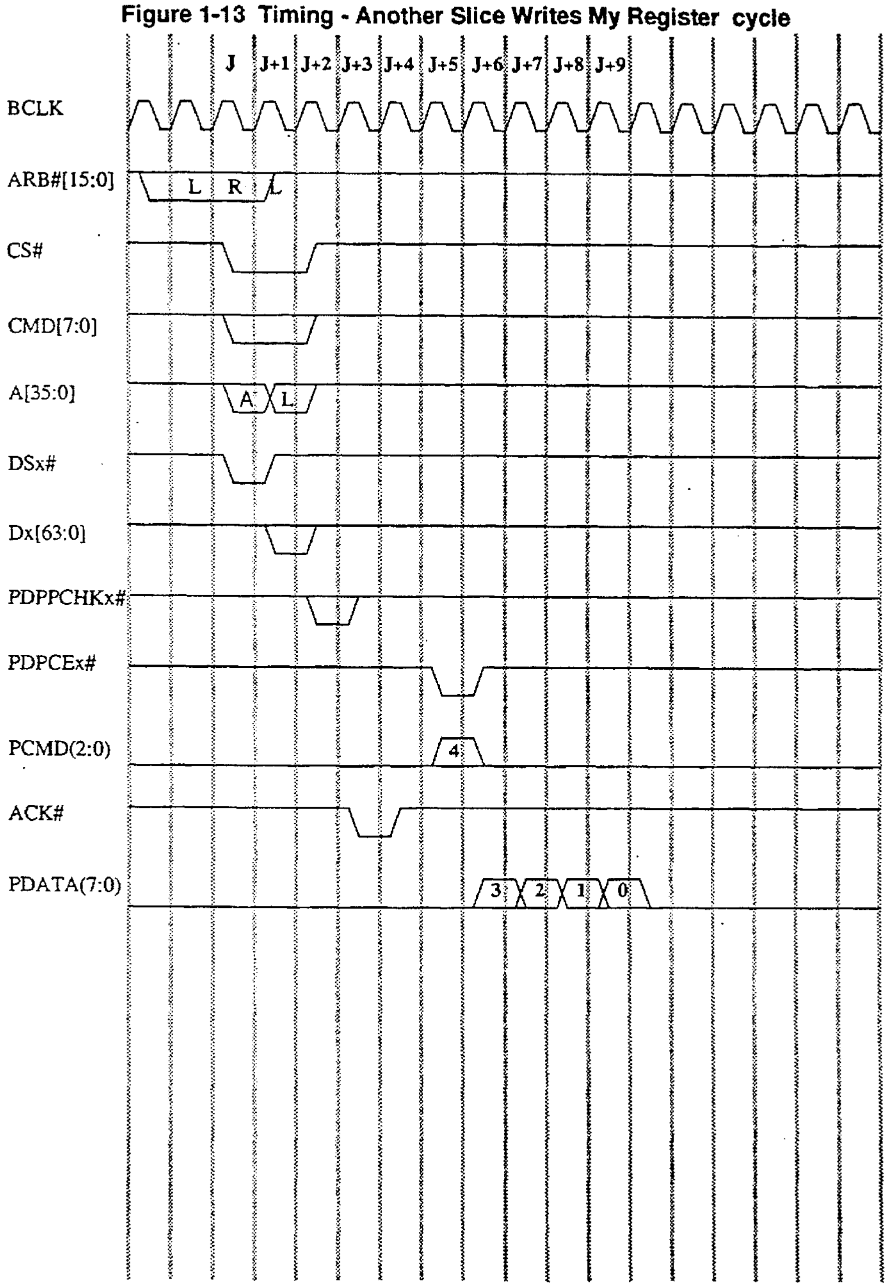

Figure 1-14 Timing -I Read My RegisterCycle
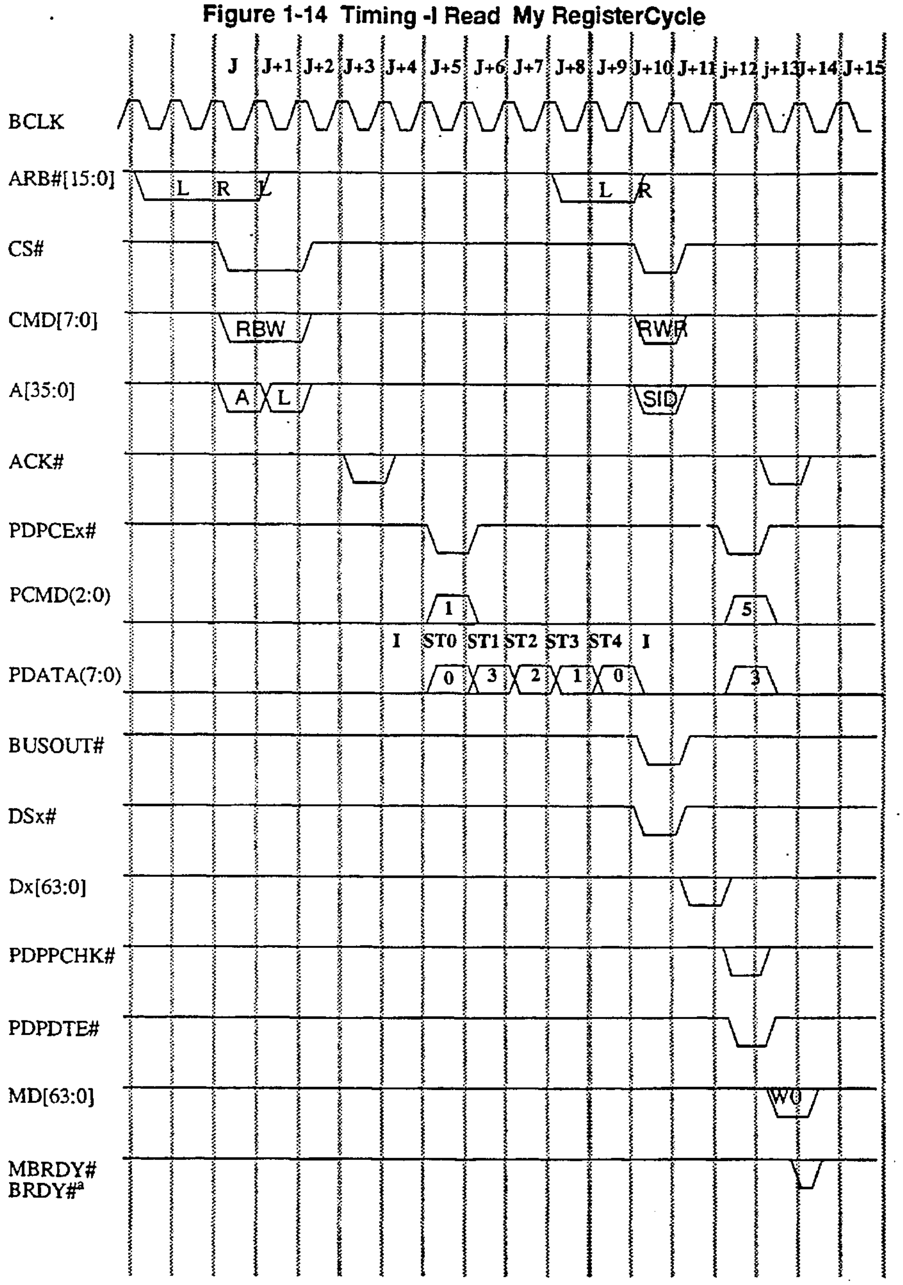

Figure 1-15 Timing -I WRITE My RegisterCycle
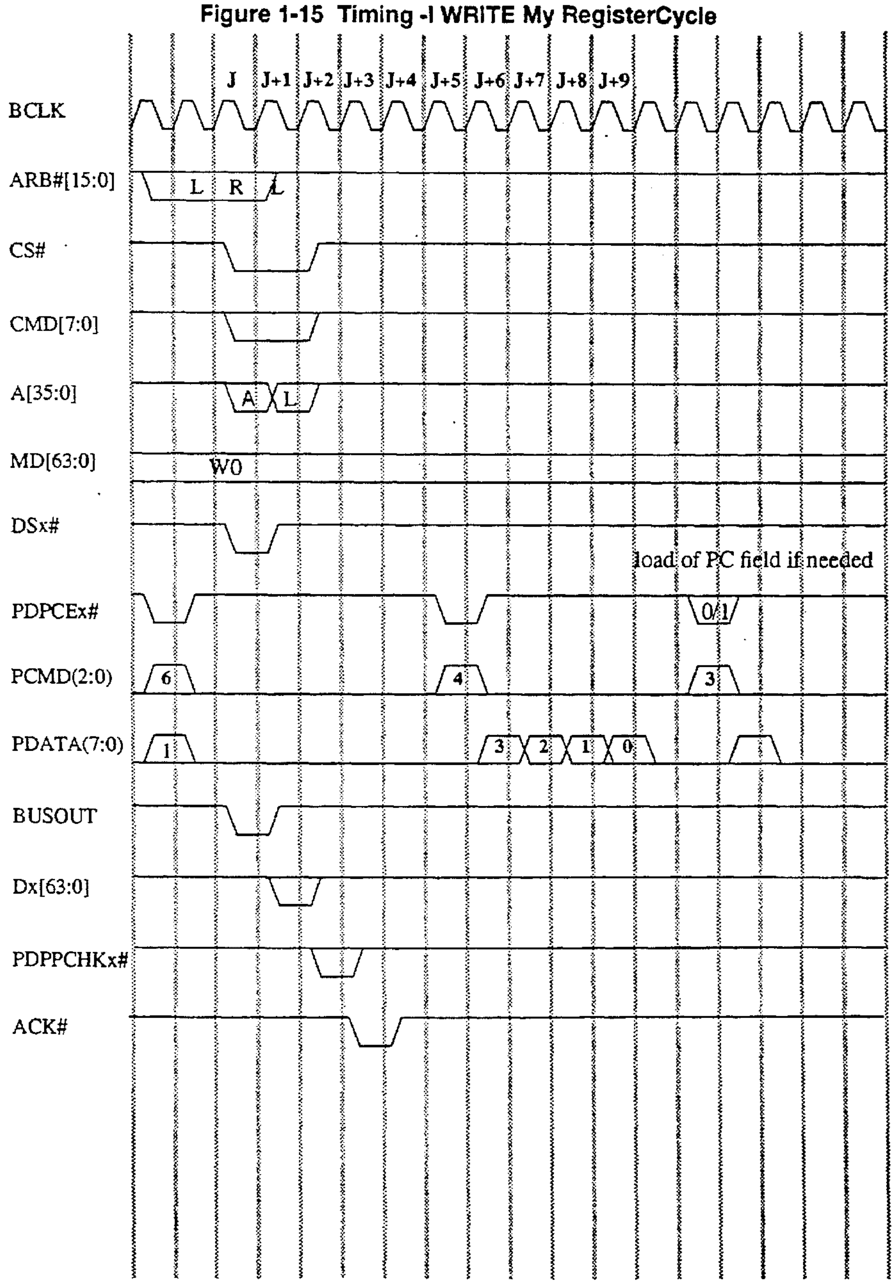

APPENDIX 8

SNOOP CONTROL A

Snoop Control
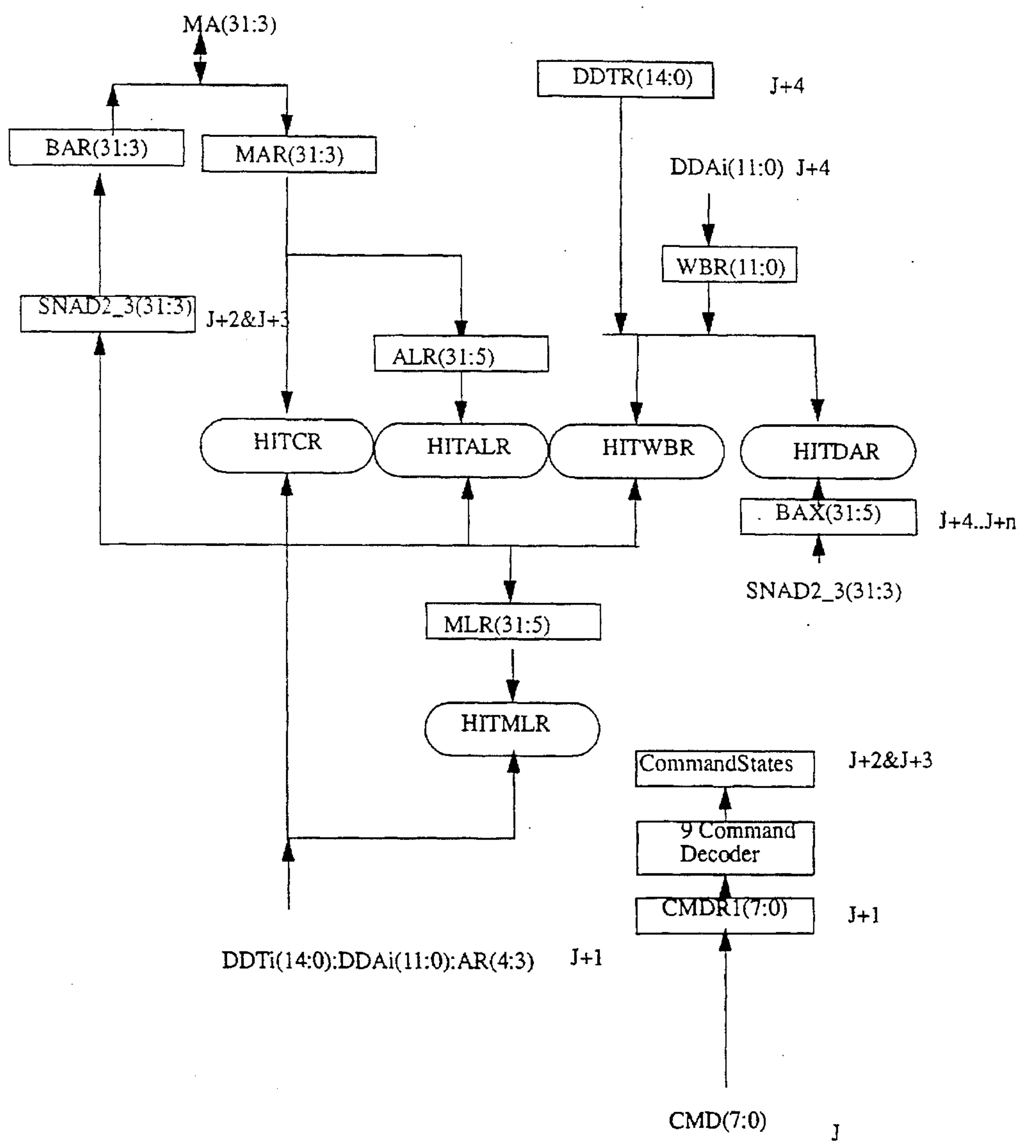

Snoop Control

Hypertext Index of Snoop Control Flow

StartUp....3
MYCYC....4
WBW....5
PICL....9
MYPICL....10
WCL....12
MYWCL....13
RBW....14
RCL....15
MYRCL....18
RIL....19
MYRIL....20
RBWL....21
MYRBWL....22
WBWL....23
BICL....24
Performance Monitor
Snoop write....25
Snoop read....26
Snoop BICLor PICL....27

Snoop Control
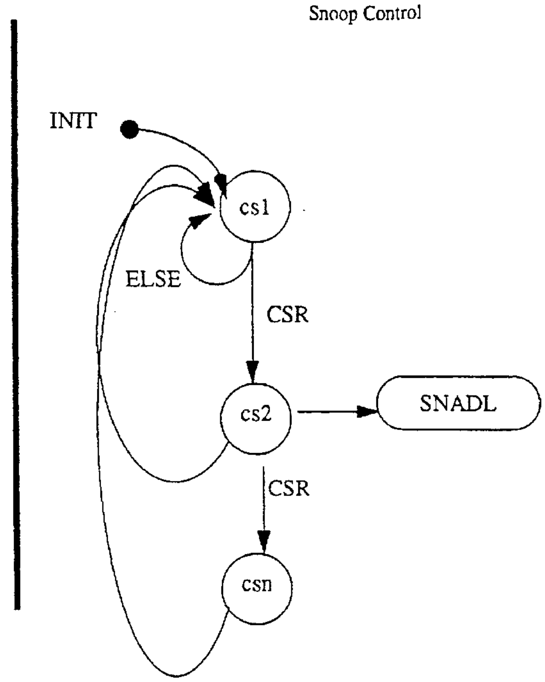
```
IF(SNADL)THEN(
SNAD2_3(31:5):=DDTi:DDAi,
CMDR2_3(1:0):=CMDR1(1:0),
HITCR2_3:=(MAR(31:5).EQ.DDTi:DDAi)&CRBSY,
PNDHIT2_3:=(MAR(31:5).EQ.DDTi:DDAi),
HITALR2_3:=(ALR(31:5).EQ.DDTi:DDAi)&ALRBSY,
HITMLR2_3:=(MLR(31:5).EQ.DDTi:DDAi)&MLRBSY,
HITWBR2_3:=(DDTR:WBR.EQ.DDTi:DDAi)&WBRBSY
DD_BZ2_3_3:=DD_BZ
);
```
StartUp
SnoopControl
TJ031692

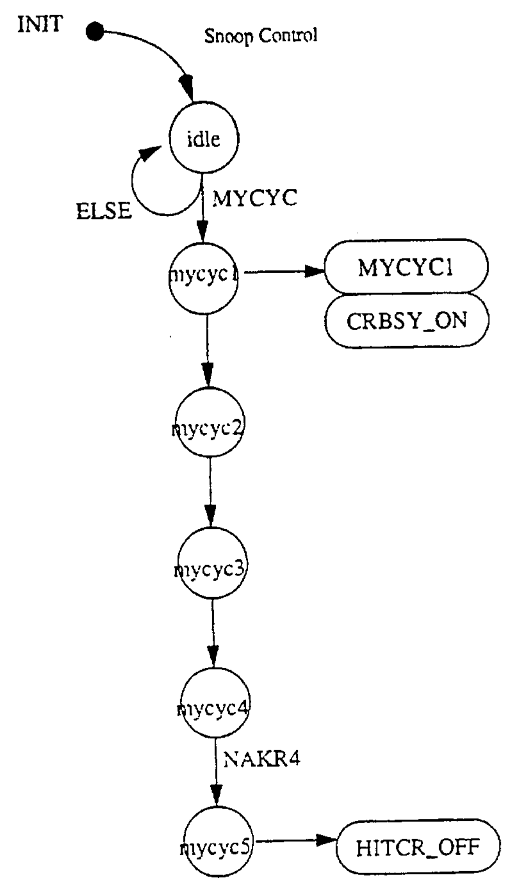
MYCYC
SnoopControl
TJ031692

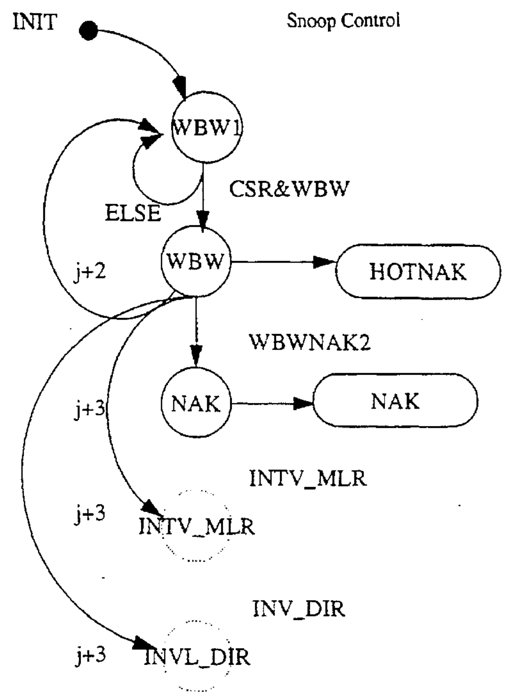
WBW=(CMDR1.EQ.18)&!MYCYC1;
WBWNAK
=&[(HITCR2_3&!(MYCYC4&NAKR4))
+(HITALR2_3+HITMLR2_3+DD_BZ2_3)
+(SNPBSY&(HITE2_3+HITS2_3+HITM2_3+HITWBR2_3))
+((MLRBSY+FLUSH)&(HITM2_3+HITWBR2_3))];
INTV_MLR
=!WBWNAK&(HITM2_3+HITWBR2_3);
INV_DIR
=!WBWNAK&(HITE2_3+HITS2_3);
HOTNAK=WBWNAK+INTV_MLR;
SNPBSY=SNPBSY3_4+SNPBSY5+SNPBSYni;
HOTMCI=INTV_MLR
WBW
SnoopControl
TJ031692

Snoop Control

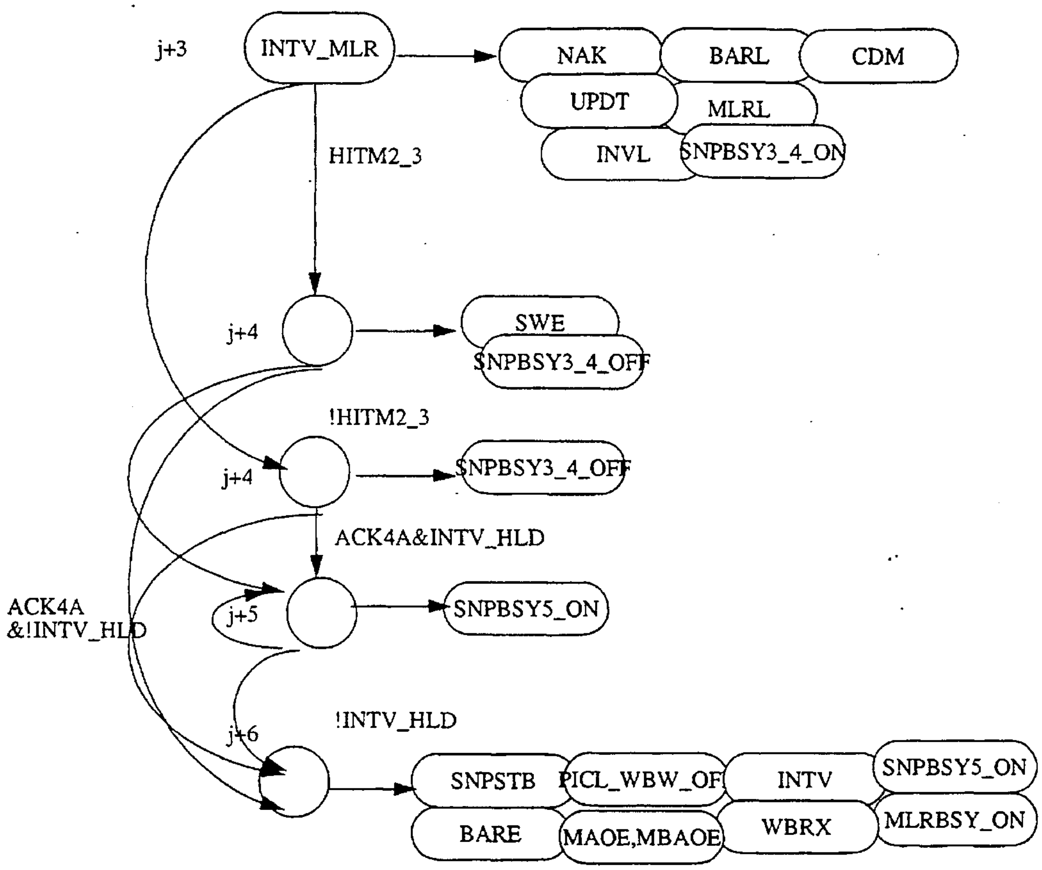

IF(BARL)THEN(BAR(31:3):=SNAD2_3,BAX(31:3):=SNAD2_3);
IF(MLRL)THEN(MLR(31:3):=SNAD2_3);
IF(BARE)THEN(MA=BAR);
IF(WBRX&(BAX.EQ.WBR))THEN(WBRBSY:=0);
INTV_HLD=PREBGT+MYCYC+PRECS+CPSNP;
IF(INTV&!INTV_OFF)THEN(INTV_ON);
IF(INTV_OFF)THEN(INTV_OFF)
UPDT=HITM2_3;
ACK4A=!CAER4&ACKR4;
SWE=ACK4A;
IF(SNPBSY3_4_ON)THEN(SNPBSY3_4=1);
IF(SNPBSY3_4_OFF)THEN(SNPBSY3_4=0);
IF(SNPBSY5_ON)THEN(SNPBSY3_4=1);
IF(!SNPCYCni)THEN(SNPBSY5=0);

Intervene
WriteBack
SnoopControl
TJ031692

Snoop Control
Figure 0-1 Timing-WBWSnoopCycle
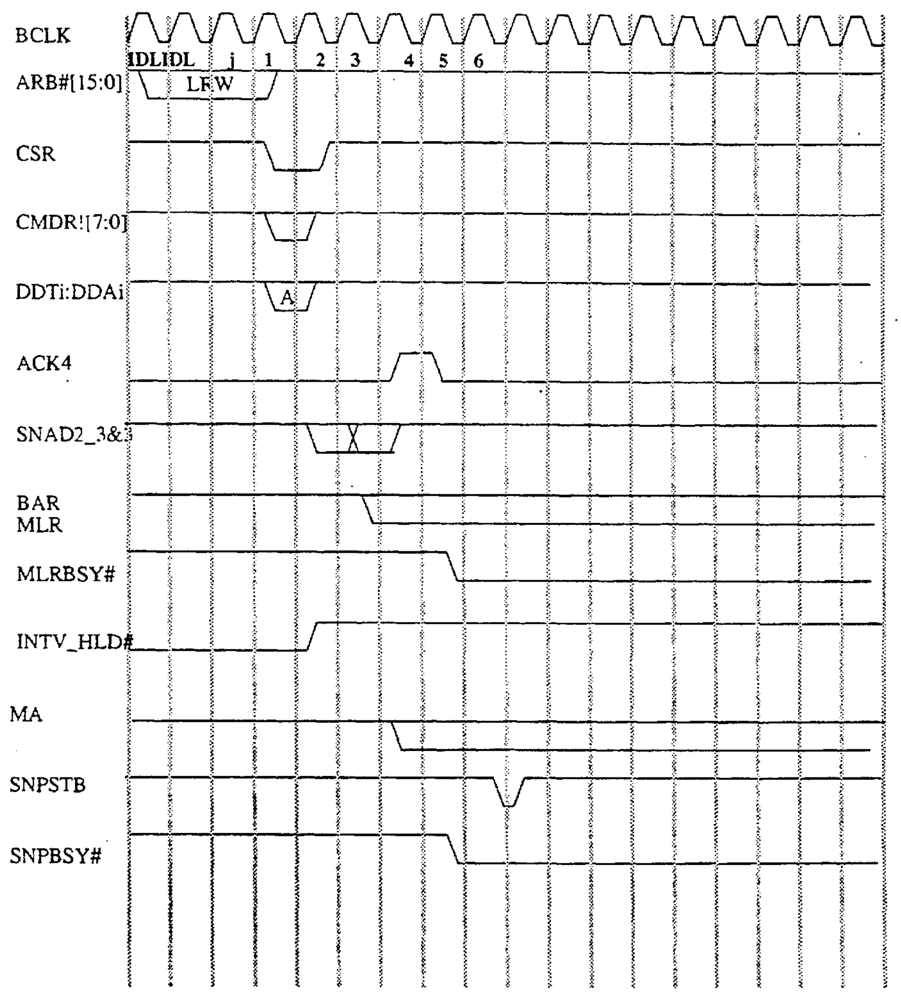

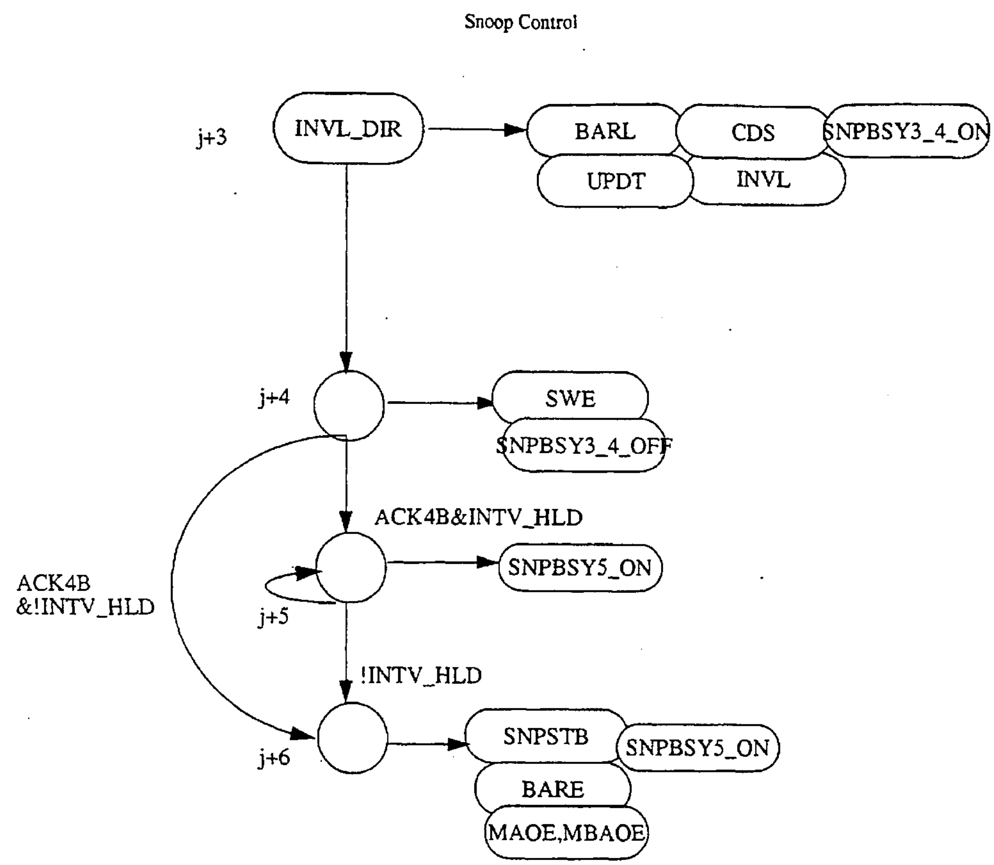
ACK4B=!CAER4&ACKR4&!NAKR4&((MCIR4&!CDSR4)+!CDMR4);
SWE=ACK4B;
Invalidate
SnoopControl
TJ031692

Snoop Control
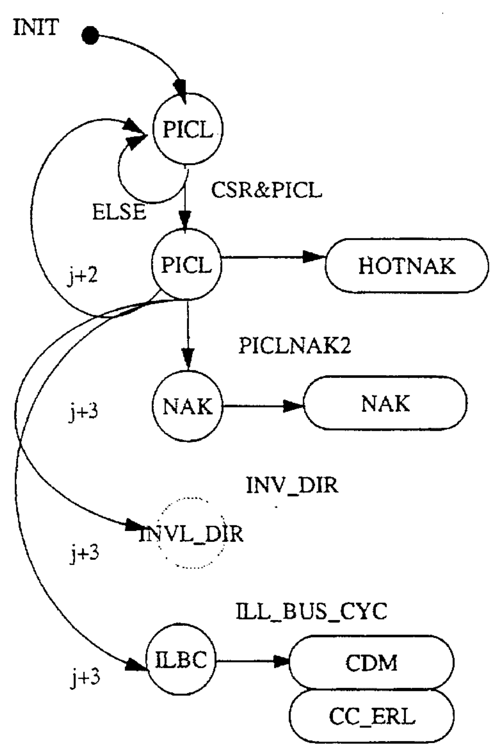
PICL=(CMDR1.EQ.1C)&!BUSLR&!MYCYC1;
PICLNAK2
=[DD_BZ2_3+(HITCR2_3&!(MYCYC4&NAKR4))+HITALR2_3
+((SNPBSY+(PNDRCL2_6&PNDHIT2_3))&HITS2_3)];
INV_DIR
=!PICLNAK2&HITS2_3;
ILL_BUS_CYC
=!PICLNAK2&(HITM2_3+HITE2_3+HITWBR2_3+HITMLR2_3);
HOTNAK=PICLNAK;
PNDRCL2_6=PNDRD12_6&PNDRD02_6;
PNDRIL2_6=PNDRD12_6&PNDRD02_6;
PNDRBW2_6=PNDRD12_6&PNDRD02_6;
PICL
SnoopControl
TJ021692
PREVIOUS HOME

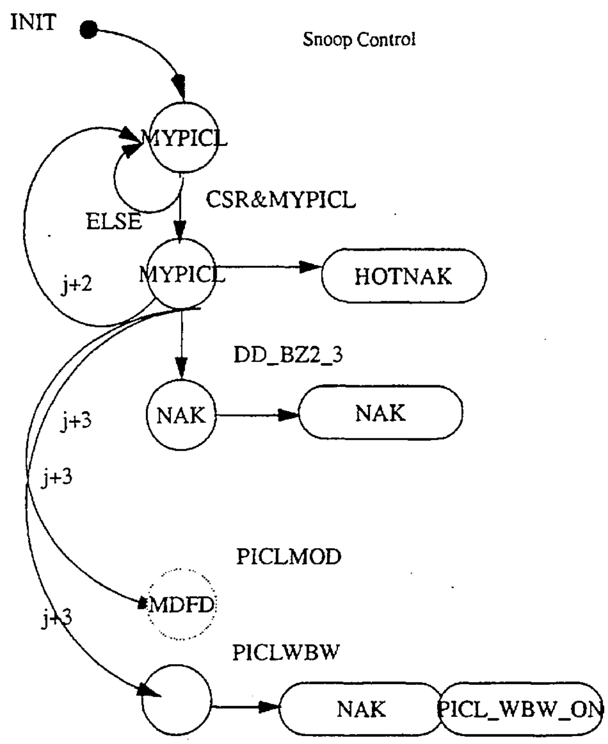
MYPICL=(CMDR1.EQ.1C)&MYCYC;
PICLMOD
=!DD_BZ2_3&(HITS2_3+HITE2_3);
PICLWBW
=!DD_BZ2_3&!(HITS2_3+HITE2_3);
HOTNAK=DD_BZ2_3+PICLWBW;
MYPICL
SnoopControl
TJ021692

Snoop Control
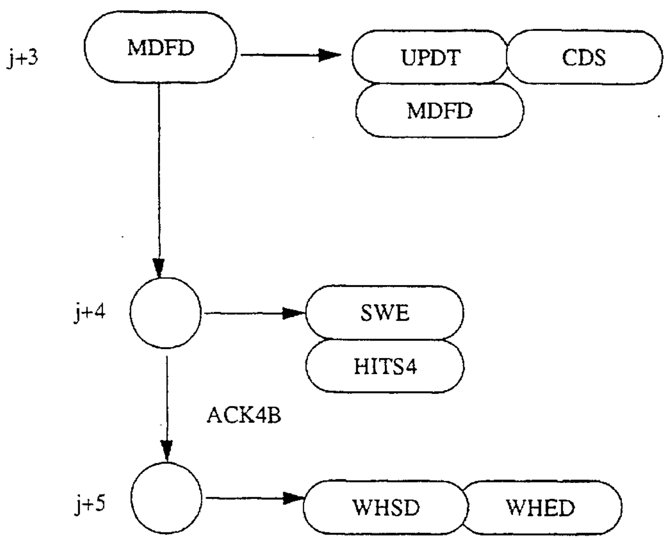
SWE=ACK4B;
HITS4:=HITS2_3
WHSD=HITS4;
WHED=!HITS4
Modified
SnoopControl
TJ021692

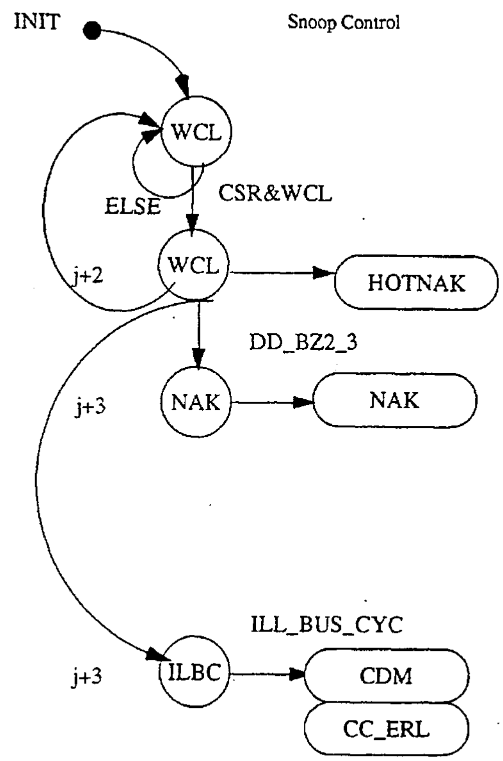
WCL=(CMDR1.EQ.08)&!MYCYC1;
WCLNAK2
=DD_BZ2_3;
ILL_BUS_CYC
=!DD_BZ2_3&
&(HITM2_3+HITE2_3+HITS2_3+HITALR2_3+HITWBR2_3+HITMLR2_3);
HOTNAK=DD_BZ2_3;
WCL
SnoopControl
TJ021692

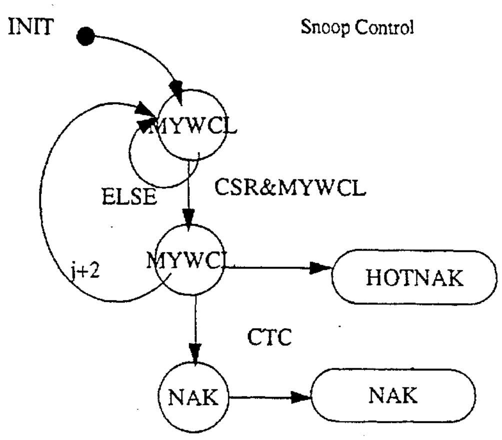
MYWCL=(CMDR1.EQ.08)&MYCYC1;
HOTNAK=CTC;
MYWCL
SnoopControl
TJ021692

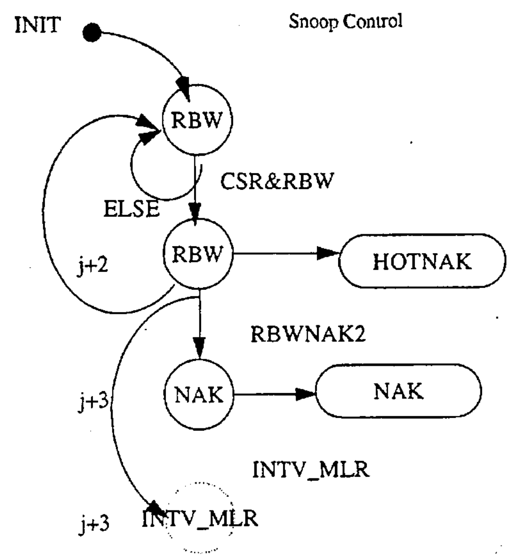
RBW=(CMDR1.EQ.10..13)&!BUSLR&!MYCYC1;
RBWNAK2
=[((HITCR2_3&!(MYCYC4&NAKR4))
+HITALR2_3+HITMLR2_3+DD_BZ2_3)
+((SNPBSY+MLRBSY+FLUSH)&(HITM2_3+HITWBR2_3))];
INTV_MLR
=!RBWNAK2&(HITM2_3+HITWBR2_3);
HOTNAK=RBWNAK+INTV_MLR;
HOTMCI=INTV_MLR
RBW
SnoopControl
TJ021692

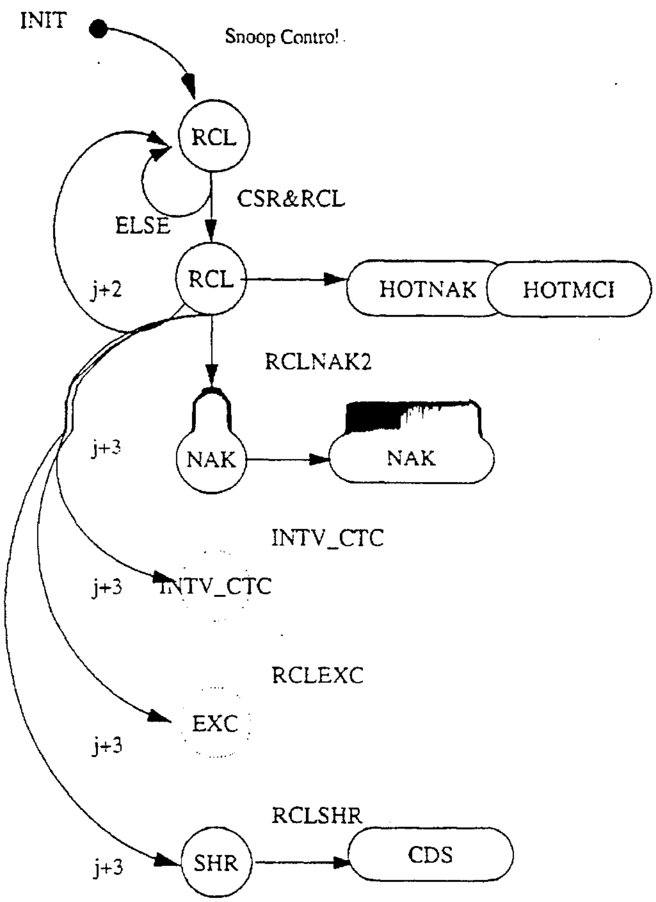
RCL=(CMDR1.EQ.00..03)&!BUSLR&!MYCYC1;
RCLNAK2
=[((HITCR2_3&!(MYCYC4&NAKR4))
+HITALR2_3+HITMLR2_3+DD_BZ2_3)
+((SNPBSY+MLRBSY+FLUSH)&(HITM2_3+HITWBR2_3))
+(PNDRIL2_6&PNDHIT2_3)];
PNDRIL2_6=(pendingin-orderRIL)
INTV_CTC=!RCLNAK2&(HITM2_3+HITWBR2_3);
RCLEXC=!RCLNAK2&HITE2_3;
RCLSHR=!RCLNAK2&HITS2_3;
HOTNAK=RCLNAK;
HOTMCI=INTV_CTC;
RCL
SnoopControl
TJ021692

Snoop Control
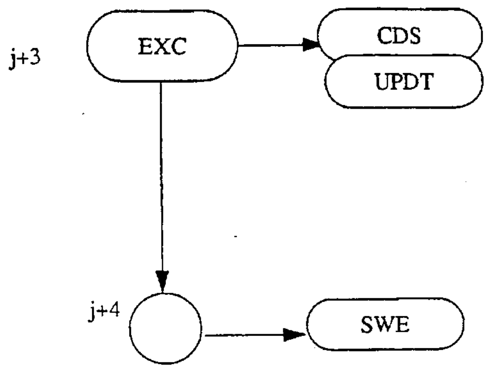
SWE=ACK4B;
Exclusive
SnoopControl
TJ021692

Snoop Control
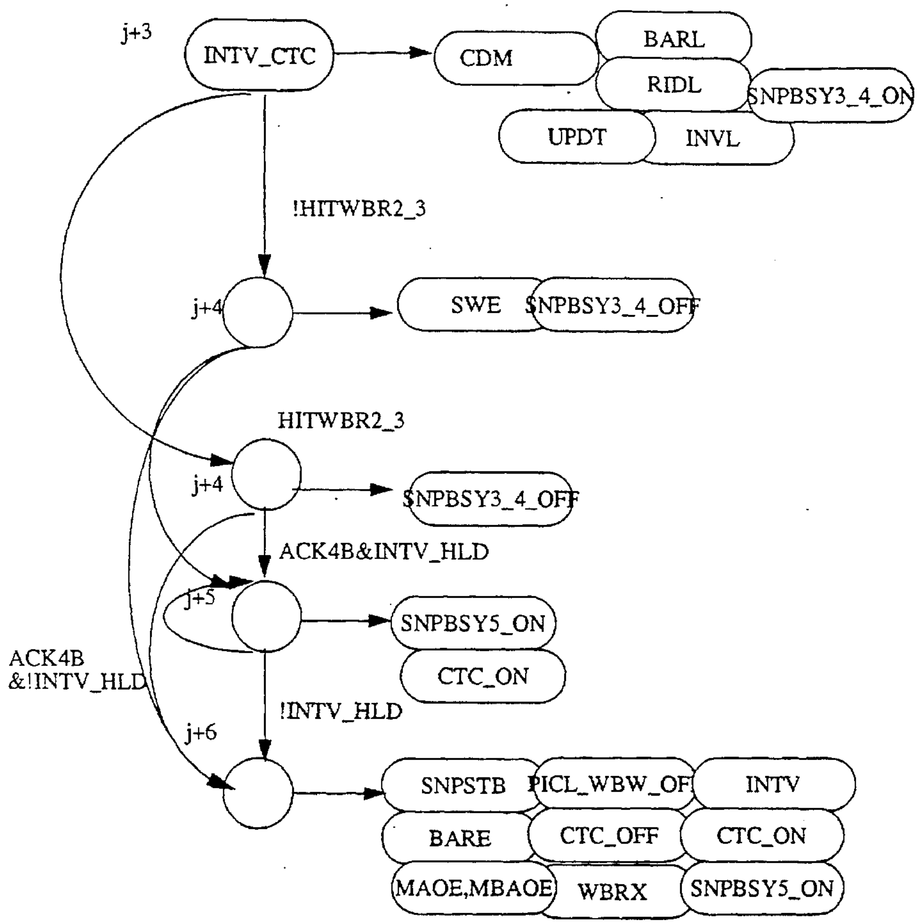
IF(RIDL)THEN
(RIDRLR(5:0):=RSID(3:0):CMDR2_3(1:0));
SWE=ACK4B;
Intervene
Cache-To-
Cache
SnoopControl
TJ021692

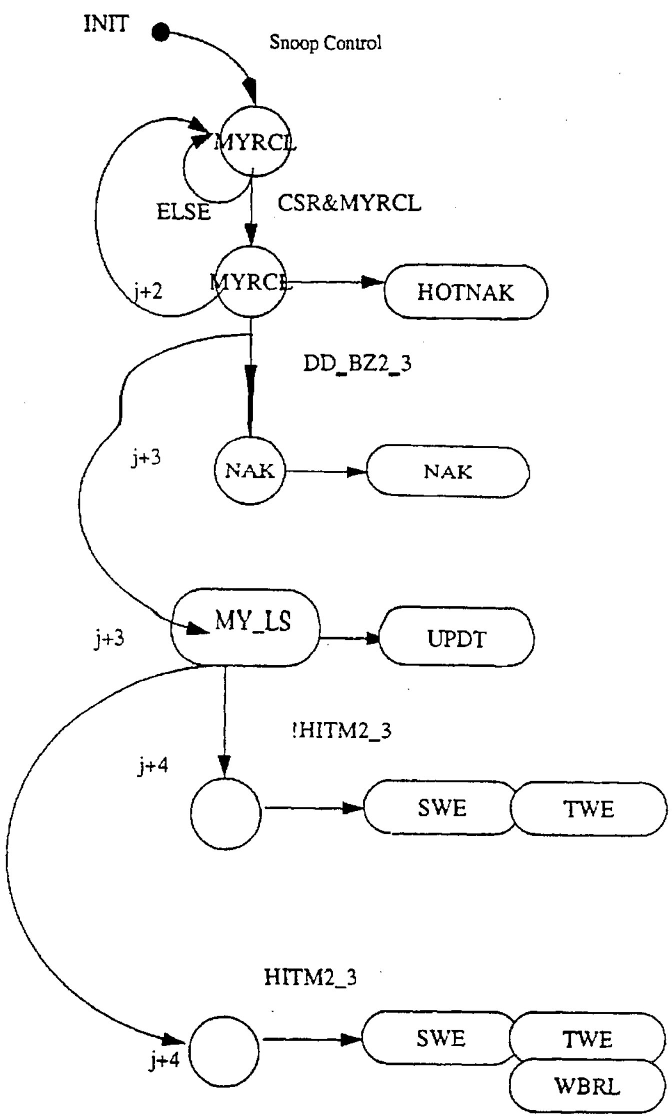
MYRCL=(CMDR1.EQ.00..03)&!BUSLR&MYCYC1;
HOTNAK=DD_BZ2_3;
IF(WBRL&!DPERTY)THEN(WBR(11:0)=DDAi,WBRBSY_ON,WB);
SWE=ACK4B;
TWE=ACK4B;
WBRL=ACK4B;
MYRCL
SnoopControl

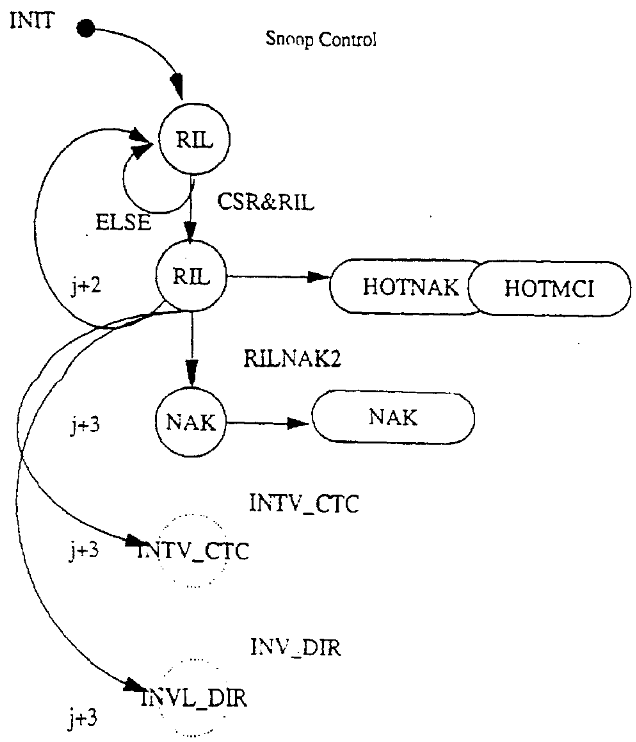
RIL=(CMDR1.EQ.04..07)&!BUSLR&!MYCYC1;
RILNAK2
=[((HITCR2_3&!(MYCYC4&NAKR4))
+HITALR2_3+HITMLR2_3+DD_BZ2_3)
+((PNDRIL2_6+PNDRCL2_6)&PNDHIT2)
+((HITM2_3+HITE2_3+HITS2_3+HITWBR2_3)&SNPBSY)
+((HITWBR2_3+HITM2_3)&(MLRBSY+FLUSH))];
INTV_CTC
=!RILNAK2&(HITWBR2_3+HITM2_3);
INV_DIR
=!RILNAK2&(HITE2_3+HITS2_3);
HOTNAK=RILNAK;
HOTMCI=INTV_CTC;
RIL
SnoopControl
TJ021692

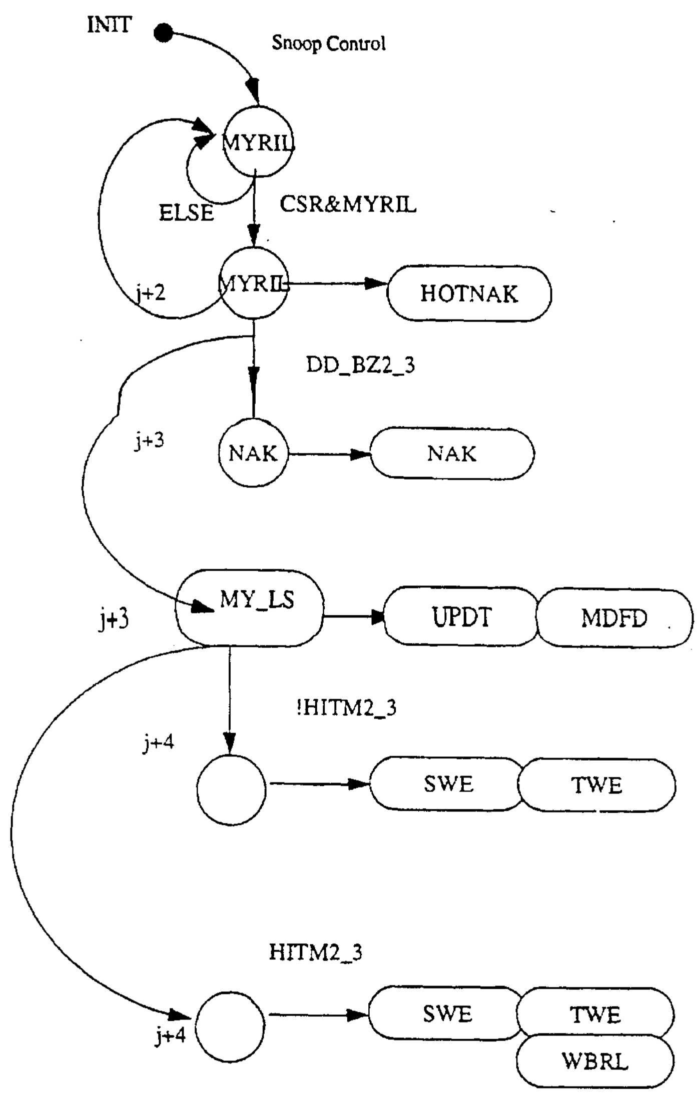
MYRIL=(CMDR1.EQ.04..07)&!BUSLR&MYCYC1;
HOTNAK=DD_BZ2_3;
IF(WBRL&!DPERTY)THEN(WBR(11:0)=DDAi,WBRBSY_ON,WB);
SWE=ACK4B;
TWE=ACK4B;
WBRL=ACK4B;
MYRIL
SnoopControl
TJ021692

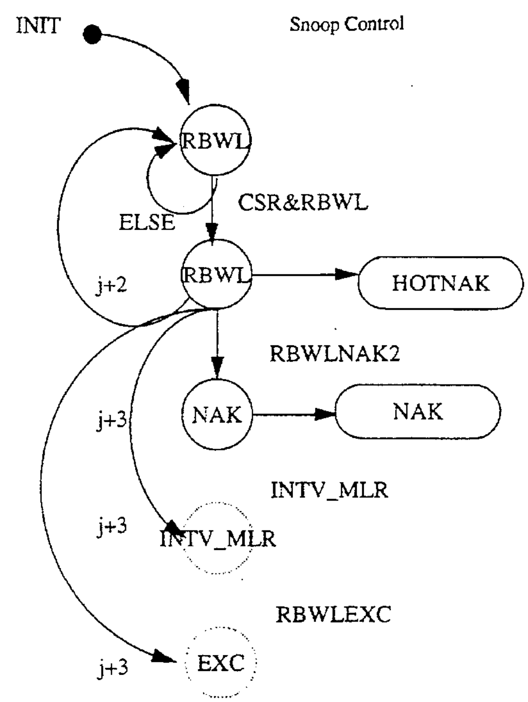
RBWL=(CMDR1.EQ.20..23)&!MYCYC1;
RBWLNAK2
=[((HITCR2_3&!(MYCYC4&NAKR4))
+HITALR2_3+HITMLR2_3+DD_BZ2_3)
+((HITM2_3+HITWBR2_3)&(SNPBSY+MLRBSY+FLUSH))
+(BUSL&(PNDRCL2_6+PNDRIL2_6+PNDRBW2_6 + ALRBSY))];
INTV_MLR
=!RBWLNAK2&(HITM2_3+HITWBR2_3);
RBWLEXC
=!RBWLNAK2&HITE2_3;
HOTNAK=RBWLNAK+INTV_MLR;
HOTMCI=INTV_MLR
RBWL
SnoopControl
TJ021692
PREVIOUS HOME

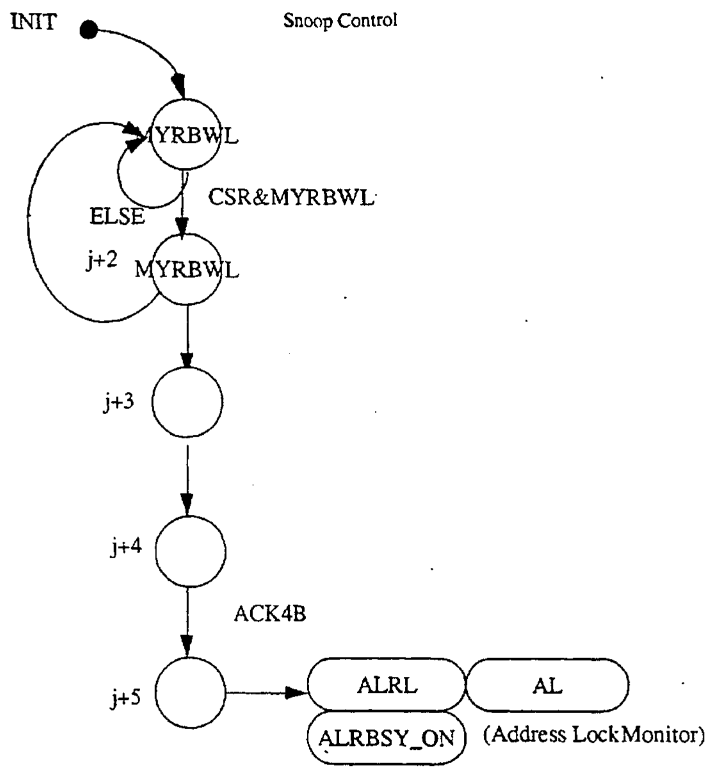
MYRBWL=(CMDR1.EQ.20..23)&MYCYC1&!CSCYC;
IF(ALRL)THEN(ALR(31:5)=MAR(31:5))
MYRBWL
SnoopControl
TJ021692

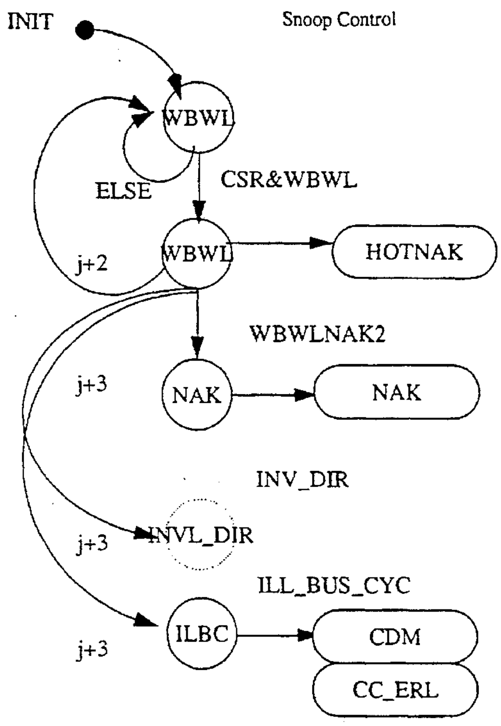
WBWL=(CMDR1.EQ.28)&!MYCYC1;
WBWLNAK2
=[((HITCR2_3&!(MYCYC4&NAKR4))
+DD_BZ2_3)
+(SNPBSY&HITS2_3&!HITALR2_3)];
INV_DIR
=!WBWLNAK2&HITS2_3&!HITALR2_3;
IL_BUS_CYC
=!WBWNAK2&(HITM2_3+HITE2_3+HITALR2_3+HITWBR2_3+HITMLR2_
3);
HOTNAK=WBWLNAK;
WBWL
SnoopControl
TJ021692

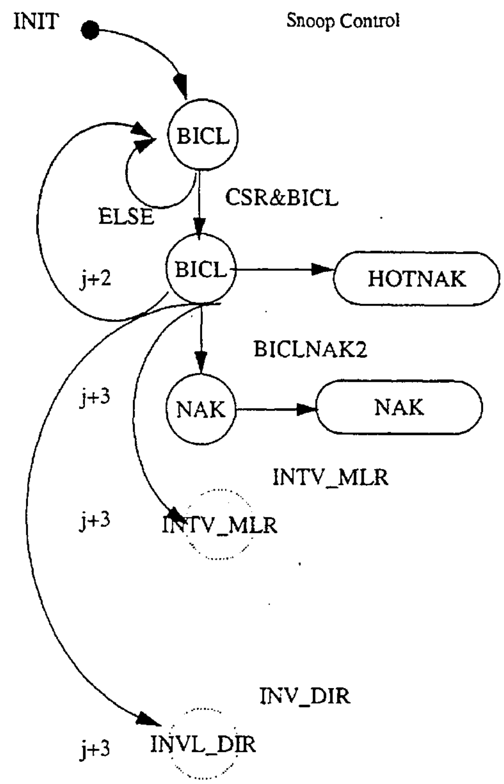
BICL=(CMDR1.EQ.0C)&!BUSLR;
BICLNAK2
=[((HITCR2_3&!(MYCYC4&NAKR4))
+HITALR2_3+HITMLR2_3+DD_BZ2_3)
+((HITM2_3+HITWBR2_3)&(SNPBSY+MLRBSY+FLUSH))
+((HITE2_3+HITS2_3)&SNPBSY)
+(PNDRCL2_6&PNDHIT2)];
PNDRCL2_6=(pendingin-orderRCL)
INTV_MLR
=!BICLNAK2&(HITM2_3+HITWBR2_3);
INV_DIR
=!BICLNAK2&(HITE2_3+HITS2_3);
HOTNAK=BICLNAK+INTV_MLR;
HOTMCI=INTV_MLR
BICL
SnoopControl
TJ021692

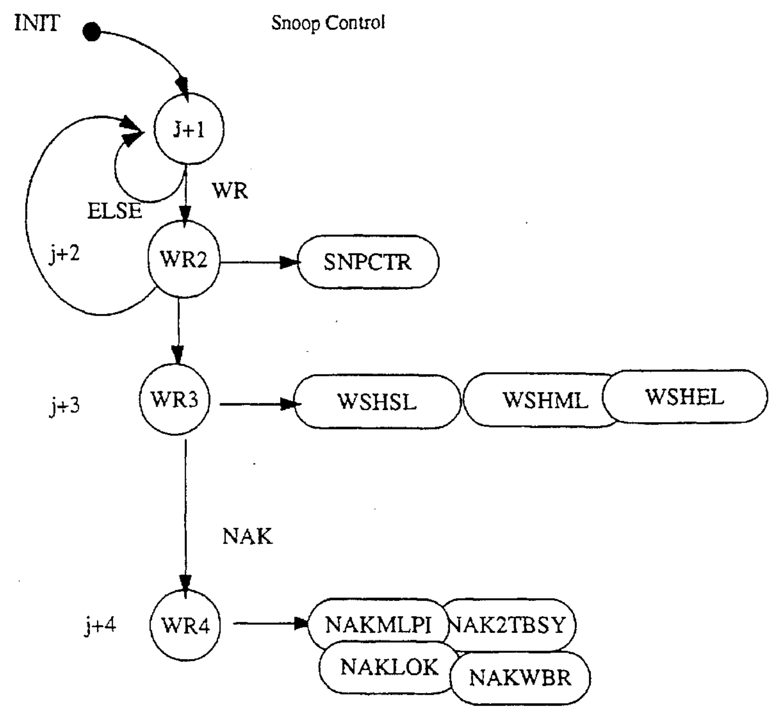
WR=!MYCYC1&CSR&WBW;
WSHSL:=HITS2_3;
WSHML:=HITM2_3;
WSHEL:=HITE2_3;
NAKMLPI:=HITMLR2_3&INTV;
NAK2TBSY:=DD_BZ2_3;
NAKLOK:=HITALR2_3;
NAKWBR:=HITWBR2_3;
WriteMonitor
SnoopControl
TJ031692

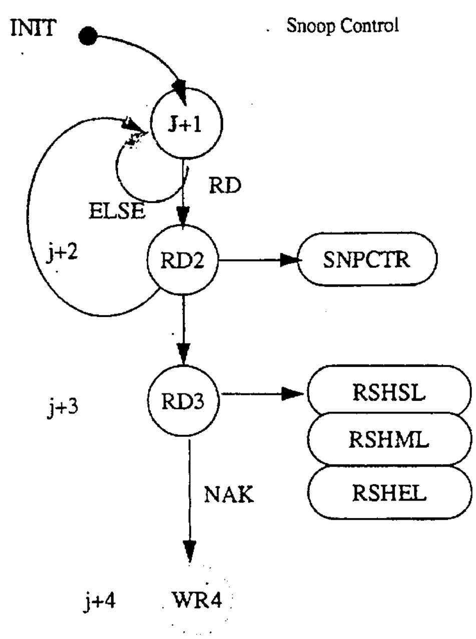
RD=!MYCYC1&CSR&((!BUSL&(RBW+RCL+RIL))+RBWL);
RSHSL:=HITS2_3;
RSHML:=HITM2_3;
RSHEL:=HITE2_3;
ReadMonitor
SnoopControl
TJ031692

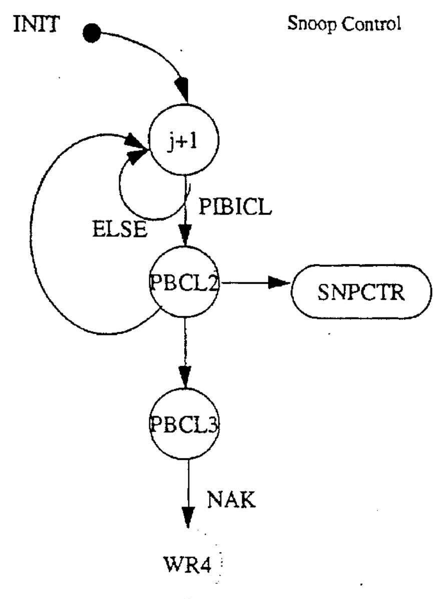
PIBICL=!MYCYC1&CSR&(PICL+BICL)&!BUSLR;
PICL-
BICLMonitor
SnoopControl
TJ031692

APPENDIX 9

BUS INTERFACE CONTROLLER

1 BRIDGE INTERFACE CONTROLLER (BIC)

The Bridge Interface Controller (BIC) is realized with a chip set consisting of two ASICs. These ASICs are referred to as the Address Bridge Interface Controller and the Data Bridge Interface Controller.

1.1 INTRODUCTION

The BIC provides the functionality required for the realization of XA-MP I/O Bridge modules. The objective of an XA-MP I/O Bridge is to maximize XA-MP bus bandwidth while facilitating the use of commodity peripheral adapters for the implementation of high speed I/O controllers. An I/O Bridge is an intelligent device redirecting the I/O traffic between the system bus and expansion bus(es). There are three types of transactions that are relayed from one bus to the other by the I/O Bridge:

1. Interrupts generated on the expansion bus which need to be directed to the XA-MP bus to reach their destination processors.
2. The access requested by agents on the XA-MP bus to devices or memory resources on the expansion bus.
3. The accesses required by expansion bus masters to main memory on the XA-MP bus.

An I/O Bridge will support DMA transfers from expansion bus devices. An I/O Bridge is required to adhere to the MESI (Modified, Exclusive, Shared and Invalid) cache coherency protocol of the system bus.

1.1.1 Product Description

An I/O Bridge is logically composed of an Advanced Programmable Interrupt Controller, an ABIC and one or two DBICs. The ABIC provides the address path between the XA-MP bus and the i486™ bus while the DBIC provides the data path. The BIC supports either single or dual XA-MP bus implementations. Two DBICs are required for a dual bus implementation. An Advanced Programmable Interrupt Controller is required to redirect interrupts to other agents on the XA-MP bus.

The BIC provides the bridge between the XA-MP bus and an i486™ based bus. An expansion bus (e.g. EISA bus) or an I/O controller can then be interfaced to the i486™ based bus with standard VLSI components. The BIC is responsible for maintaining cache coherency on all expansion bus initiated XA-MP bus memory operations. The XA-MP architecture allows for multiple BIC based expansion busses or I/O controllers in the system.

One of the I/O Bridges in the XA-MP system must be operated in a compatible mode (a.k.a. cBIC). One of the functions of the compatible I/O Bridge is to provide a single EISA bus that will provide the functionality required for an XA-MP processor module to boot MS-DOS and run shrink wrapped MS-DOS applications. The BIC can be configured to provide compatible I/O Bridge functions. These compatible mode functions are as follows:

1. System initialization registers for boot strap processor determination
2. Boot ROM for system initialization firmware
3. MS-DOS PC compatibility
4. 8259A Interrupt compatibility
5. Providing the system initialization and power fail signals.

The BIC provides the capability for XA-MP bus requesting agents to lock the i486™ bus and devices on the i486™ bus to lock the XA-MP bus. The XA-MP bus supports address and bus based locks while the i486™ bus supports bus based locks.

1.1.2 Revision History

The current version (0.0) is the first version of this document.

1.1.3 References

The following are related documents that this section refers to:

1. "XA-MP Specification Revision 2.0"
2. "MPIC/CCU EAS Revision 2.0"
3. "APIC EAS"
4. "MPIC Target Specification Revision 1.0"
5. "XA-MP Memory Controller (MC) Target Specification Revision 0.0"
6. "XA-MP Bus Architecture Specification Revision 0.0"
7. "XA-MP Memory Data Path (MDP) Target Specification Revision 0.0"
8. "XA-MP Memory Bus Controller (MBC) Target Specification Revision 0.0"
9. "XA-MP Processor Data Path (PDP) Target Specification Revision 0.0"

1.2 FUNCTIONAL DESCRIPTION

The BIC is one of the key components required for the development of I/O Bridges in XA-MP based multi-processor systems. Its primary function is to provide a bridge between the XA-MP bus and an i486™ bus. The major functional components of the BIC are the i486™ bus window, XA-MP bus window and i486™ bus sequencer. These functional components are illustrated in Figure 1-1.

The i486™ bus provides an interface for the implementation of an expansion bus (e.g. EISA) or high speed peripherals (e.g. FDDI chip set). The BIC handles accesses initiated from either the XA-MP bus or the i486™ bus. Accesses initiated by the XA-MP bus are viewed through the BIC i486™ bus window while accesses initiated by the i486™ bus are viewed through the BIC XA-MP bus window.

The basic architecture of the BIC is as outlined in this document.

1.2.1 Functional Block Diagram
A functional high level block diagram of the BIC is illustrated in Figure 1-1.
Figure 1-1 Bridge Interface Controller Functional Block Diagram
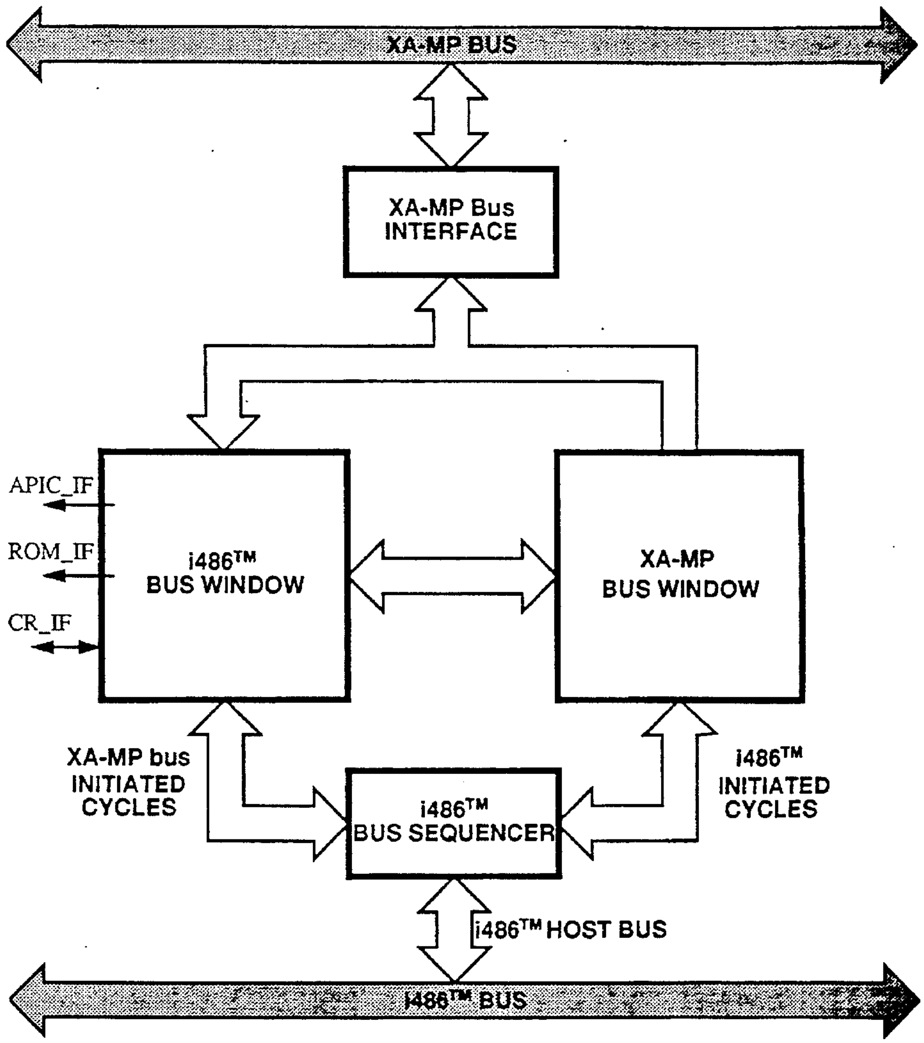

1.2.2 XA-MP Bus Interface

The BIC functions both as an XA-MP bus requesting and responding agent. Therefore, the BIC supports the entire XA-MP bus arbitration logic.

The BIC fully decodes the four giga-byte XA-MP bus memory and I/O address space.

The BIC supports XA-MP bus configurations with single or dual sixty-four bit data buses. In a dual data bus configuration, the BIC determines which data bus to use based on even cache line boundaries. When a data operation is performed with the XA-MP bus A[05]=0 the BIC uses D0[63:0]. When a data operation is performed with A[05]=1, the BIC uses D1[63:0]. Single or dual data bus usage is configured on the ABIC through the use of an external device which holds configuration information. The ABIC will load this configuration information immediately following initialization. An external pin is provided on the DBIC for XA-MP data bus configurations. The BIC always generates out-of-order responses. The BIC will accept both in-order and out-of-order responses.

1.2.3 i486™ Bus Interface

The i486™ bus is used by the BIC to access i486™ bus resources. These accesses are always through the BIC's i486™ bus window. The i486™ bus is also used by i486™ bus requesting agents to access XA-MP resources. Accesses by i486™ requesting agents are always through the BIC's XA-MP bus window. In addition, one i486™ data bus pin is used for register transfers between the ABIC and the DBIC.

1.2.4 XA-MP Bus Window

The XA-MP bus window provides the interface for i486™ bus requesting agents to access XA-MP bus memory resources. All cycles initiated by i486™ bus requesting agents access the BIC through the XA-MP bus window. The XA-MP bus window contains a 16 cache line buffer pool to increase i486™ bus access performance and to conserve XA-MP bus bandwidth. XA-MP bus cache coherency is maintained on this buffer pool.

1.2.5 i486™ Bus Window

The i486™ bus window provides the interface for XA-MP bus requesting agents to access BIC and i486™ bus resources. All cycles initiated by XA-MP bus requesting agents access the BIC through the i486™ bus window.

1.2.6 Advanced Programmable Interrupt Controller Interface

The Advanced Programmable Interrupt Controller (APIC) is a support device for multi-processor systems integrating interrupt control and timers. The APIC provides interrupts that are generated by i486™ bus devices and are required to be routed to XA-MP bus processing units. The interrupts are routed from the I/O APIC on an I/O Bridge to a local APIC on a processor through a specialized APIC bus.

The APIC is interfaced to the i486™ bus of the BIC. A chip select for the APIC is provided by the BIC.

The APIC can only be accessed through the XA-MP bus. The user visible registers of the APIC (i.e. I/O Register Select and i486™ Window Register) reside in the 1K byte configuration/initialization memory region of the BIC.

1.2.7 ROM Address Decode

The BIC provides a chip select to enable system ROM which may be implemented on an I/O Bridge. The system ROM is interfaced to the BIC through the i486™ bus.

When the BIC is configured in compatible mode, XA-MP bus requests after system initialization to the ffff_0000h through ffff_ffffh memory region will be aliased to 000f_0000h through 000f_ffffh and result in the enable of the system ROM chip select.

The BIC can be configured through the ISA_map register to provide either read only, write only, read/write enable or disable access to the 000f_0000h through 000f_ffffh region.

1.2.8 Identification Register Interface

The BIC provides an interface to an external device that contains a 16 bit slice identification, 8 bit slice revision value, and single/dual XA-MP data bus configuration.

Immediately following system initialization, the BIC will load the slice revision and configuration information into its internal Slice-ID register and the slice identification value into the internal Identification register.

1.2.9 Detailed Block Diagrams

The BIC is realized with two ASICs. The ABIC (Address Bridge Interface Controller) and the DBIC(Data Bridge Interface Controller). The ABIC provides the address/command interfaces for the XA-MP and i486™ buses as well as controlling the DBIC. The DBIC provides the data path interface for both buses.

The BIC supports single and dual XA-MP data bus configurations. A dual data bus configuration requires one ABIC and two DBICs.

1.2.9.1 ABIC Detailed Block Diagram

A detailed block diagram illustrating the major functional components of the ABIC is provided in Figure 1-2.

Figure 1-2 ABIC BLOCK DIAGRAM

1.2.9.2 DBIC Detailed Block Diagram

A detailed block diagram illustrating the major functional components of the DBIC is provided in Figure 1-3.

Figure 1-3 ABIC BLOCK DIAGRAM
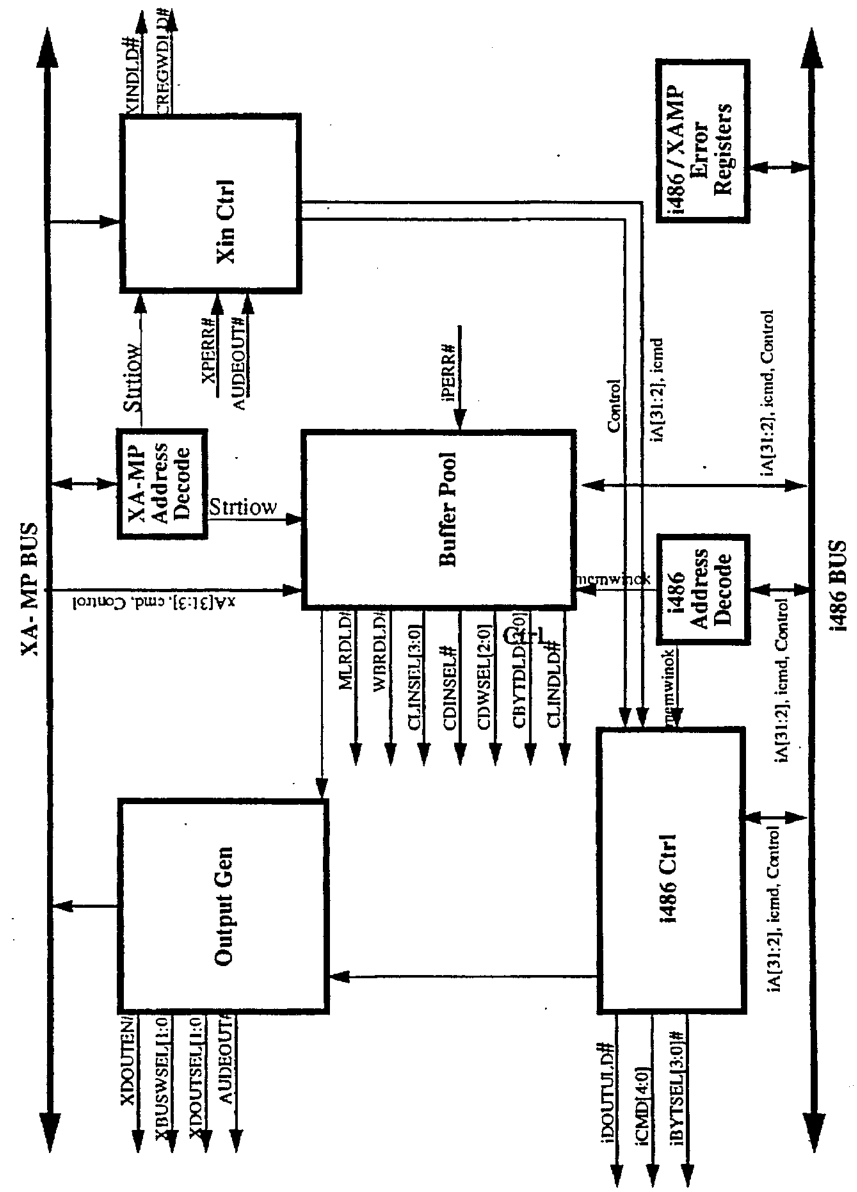

1.2.9.2.1 XA-MP INPUT Sub-Block

The features of the XA-MP bus input Control Block are as follows:

1. Ordered Queue Control
2. In Order Response Control
3. Out of Order Response Control
4. i486 Window Cycle Watcher
5. i486 Window FIFO, programmable for depth of 1 to 4

1.2.9.2.2 i486 Control Sub-Block

The features of the i486 Control Sub-Block are as follows:

1. i486 cycle generator
2. i486 cycle watcher
3. Register read/write controller
4. i486 bus arbiter

1.2.9.2.3 Buffer Pool Sub-Block

The features of the buffer pool sub-block are as follows:

1. Provide/accept data from i486 bus cycles to XA-MP bus window buffer pool hits
2. Provide XA-MP output block with requests for buffer pool misses and lock cycles
3. Provide XA-MP output block with prefetch requests for i486 bus reads and writes
4. Load WBR with data to be written to memory (end of line castout)
5. Load WBR with data to be written to memory (buffer pool miss and LRU modified)
6. Load WBR with data to be written to memory (prefetch and LRU modified)
7. Load MLR with data to be written to memory (XA-MP bus hit to modified line)
8. Maintain MESI cache coherency on XA-MP bus for XA-MP bus window buffer pool

1.2.9.2.4 XA-MP Output Sub-Block

The features of the XA-MP output sub-block are as follows:

1. XA-MP bus Arbiter
2. XA-MP bus Cycle generator. This block generates both responses (RWR,IOWR) and requests.
3. MLR,WBR Controller

1.2.9.2.5 XA-MP/i486 Address Decode Blocks

The features of the XA-MP and i486 Address Decode Sub-Block are as follows:

1.
2.

1.2.9.2.6 XA-MP/i486Error Registers Block

The features of the XA-MP and i486 Error Registers Sub-Block are as follows:

1.
2.

Figure 1-4 DBIC BLOCK DIAGRAM
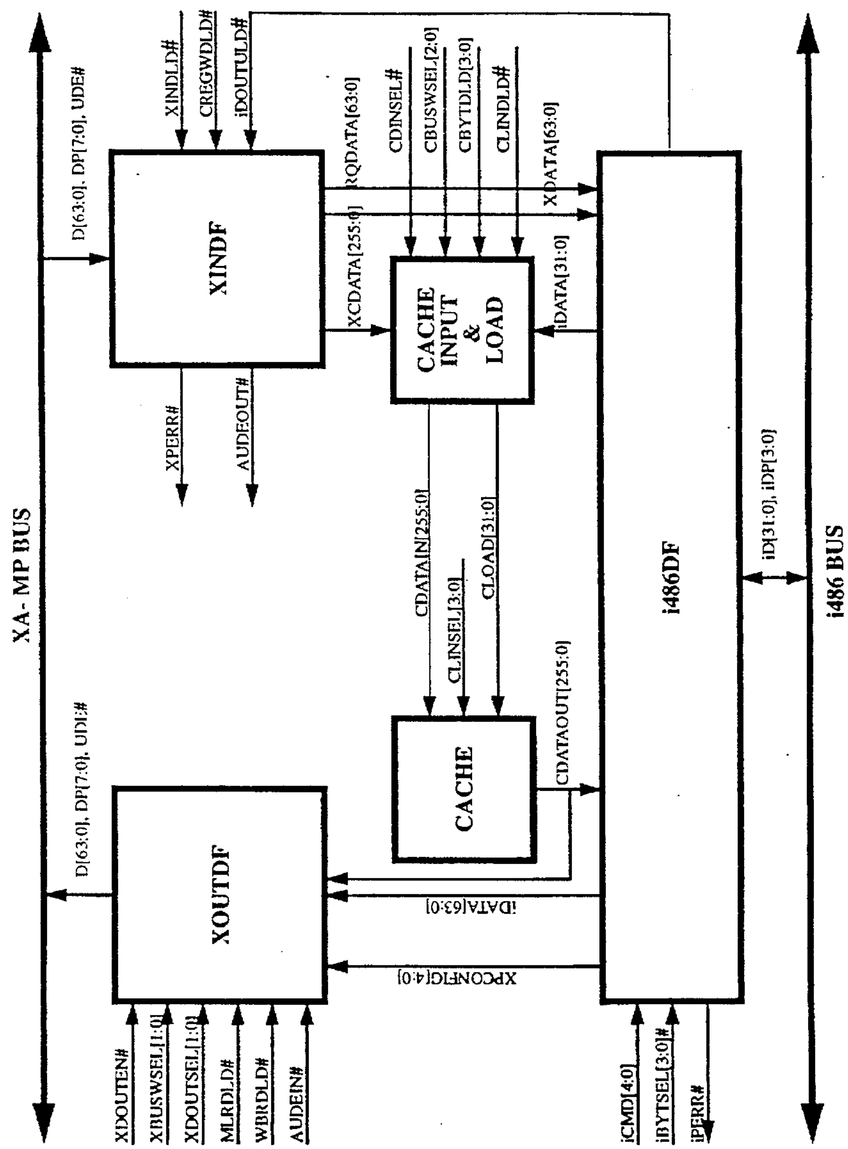

1.2.9.2.7 XINDF Sub-Block

The functions of the XA-MP bus input data flow (XINDF) are as follows:

1. XA-MP data bus input.
1. XA-MP bus parity checking. The ABIC is notified of parity errors through XPERR#.
2. XA-MP bus UDE# reception. The ABIC is notified of XA-MP bus uncorrectable data received through AUDEOUT#.
3. XA-MP bus cache line assembler. A cache line is assembled for storage in the cache(XCDATA[255:0]). Cache line assembly is controlled by the ABIC by CREGWDLD#.
4. Separate data path(XDATA[63:0] to provide the requested XA-MP bus window data to the i486™ bus on read miss operations(i.e. the data is supplied to the XA-MP bus window requestor and stored in the cache in parallel).
5. i486™ bus window request queue. The request queue is a FIFO with a programmable depth of one to four and a width of 64 bits. The FIFO is loaded with XA-MP bus data with XINDLD# and unloaded to provide data to the i486™ bus with iDOUTULD#.

1.2.9.2.8 XOUTDF Sub-Block

The functions of the XA-MP bus output data flow (XOUTDF) are as follows:

1. XA-MP bus data output. Data output is enabled with XDOUTEN#
2. XA-MP bus even parity generation. Odd parity can be forced on a per byte basis for system testing (XPCONFIG[4:0]).
3. Generation of the XA-MP bus UDE# signal as controlled by the ABIC (AUDEIN#).
4. 256 bit write back replacement register used for cache line cast outs. The write back register is loaded with WBRDLD#.
5. 256 bit modified line register used to return a modified line to memory on an XA-MP bus snoop hit. The modified line register is loaded with MLRDLD#
6. XA-MP bus data is supplied with i486™ bus data, write back replacement register or the modified line replacement register. The particular data is selected with XDOUTSEL[1:0].
7. XA-MP bus cache line disassember. A cache line is disassembled in real time for cache line output. XBUSWSEL[1:0] addresses one of four bus words of a cache line for output.

1.2.9.2.9 CACHE Sub-Block

The functions of the cache sub-block are as follows:

1. 256 bit by 16 line storage. Lines are addressed with CLINSEL[3:0].
2. 256 bit data input path (CDATAIN[255:0]).
3. 256 bit output path (CDATAOUT) used for XA-MP bus data and for i486™ bus data.
4. Byte writable (CLOAD[31:0]).

1.2.9.2.10CACHE INPUT & LOAD Sub-Block

The functions of the Cache Input & Load sub-block are as follows:

1. Selects data from either the XA-MP bus (XCDATA[255:0] or i486™ bus (iDATA[31:0]) for storage in the cache (CDATAIN[255:0]].
2. Loads entire XA-MP bus cache line data or i486™ bus data. i486™ bus data can be loaded with any combination of valid i486™ bus byte enables. CLOAD[31:0] provides the cache byte load enables. CBUSWSEL[2:0] selects one of eight i486™ bus doubleword cache locations. CBYTDLD[3:0]# selects the appropriate bytes within the addressed i486™ bus doubleword. CLINDLD# loads an entire line. CBUSWSEL[2:0] and CBYTDLD[3:0]# are used to load i486™ bus data into the cache. CLINDLD# is used to load XA-MP bus data into the cache.

1.2.9.2.11 i486DF Sub-Block

The functions of the i486™ bus data flow (i486DF) are as follows:

1. i486™ bus data input and output.
2. i486™ bus even parity checking. Indication of an i486™ bus parity error is provided to the ABIC through iPERR#.
3. i486™ bus parity generation. Odd parity can be forced on a per byte basis for system testing.
4. Selects data from the cache (iCDATAOUT[255:0]), i486™ bus request queue (RQDATA[63:0] or XA-MP bus (XDATA[63:0]) for i486™ bus data output. Output data is selected with iBYTSEL[3:0]#. 64 bit i486™ bus window data requests are supported.
5. Provides data to the cache (iDATA[31:0]) and for output on the XA-MP bus (iDATA[63:0]). 64 bit i486™ bus window data operations are supported. i486™ bus data is loaded with iBYTSEL[3:0]#.
6. Serialization and de-serialization logic for BIC software visible register read and write operations.
7. Parity Configuration register to control the XA-MP bus parity configuration (XPCONFIG[4:0] and i486™ bus parity configuration.
8. ABIC command decode (iCMD[4:0]).

1.3 PIN DESCRIPTION

This section describes the interface pins of the ABIC and DBIC which together make up BIC.

1.3.1 ABIC Pin Description

The interface pins of the ABIC are classified as follows:

1. XA-MP Bus Interface Pins
2. i486™ Bus Interface Pins
3. ABIC/DBIC Interface Pins
4. SCAN Interface Pins
5. Miscellaneous Interface Pins

1.3.1.1 ABIC XA-MP Bus Interface Pins

The XA-MP bus signals are interfaced to the ABIC through the pins contained in Table 1-1.

Table 1-1 ABIC XA-MP Bus Interface Pins

<table>
<tr><th>Signal Name</th><th>Type</th><th>Function</th></tr>
<tr><td>A[31:03]</td><td>I/O</td><td>The address bus defines either a 4 gigabyte memory or I/O address depending on the XA-MP bus command. The address is valid on the bus clock leading edge in which the command strobe is valid. On non-cache line commands (i.e. RBW, WBW) the byte lane information for byte(7-0) is valid one clock after the command strobe on address signals A[15:08]. A zero on a byte lane indicates that byte is valid while a one indicate that it is invalid. All the other address bits are driven to zero. Party is only checked on A[15:08]. On read out of order data responses (e.g. RLR, RWR, IOWR] the module and slice ID of the target is indicated on bits A[14:08]. The rest of the address bits under these conditions will be driven to zeros with good parity. The agents checking parity on the bus only need to check A[15:08]. On XA-MP commands that do not use the address bus, the address signals will be driven to all zeros with good parity. The byte lane mappings are shown in the table below:
<table>
<tr><th>Address Bit</th><th>Byte</th></tr>
<tr><td>A15</td><td>7</td></tr>
<tr><td>A14</td><td>6</td></tr>
<tr><td>A13</td><td>5</td></tr>
<tr><td>A12</td><td>4</td></tr>
<tr><td>A11</td><td>3</td></tr>
<tr><td>A10</td><td>2</td></tr>
<tr><td>A09</td><td>1</td></tr>
<tr><td>A08</td><td>0</td></tr>
</table>
</td></tr>
<tr><td>AP</td><td>I/O</td><td>This bit provides even parity for address bits A[31:03]. This bit is valid at the same time as the command/address strobe and is checked by all agents every time the command/address strobe is valid. An agent that finds the parity incorrect will signal a command address error (CAE#).</td></tr>
</table>

Table 1-1 ABIC XA-MP Bus Interface Pins

| Signal Name | Type | Function |
|---|---|---|
| CMD[7:0] | I/O | The 8-bit command bus allows for up to 256 XA-MP bus commands as shown in the following table. On commands where a out of order response may occur, the module ID is part of the command word as bits CMD[1:0]. This allows for up to 4 modules to share each slice ID. The command is valid at the same time as the address signals. |

| Command | Code | Command | Code | Command | Code | Command | Code |
|---|---|---|---|---|---|---|---|
| RCL(0) | 00 | RBW(0) | 10 | RBWL(0) | 20 | IOR(0) | 30 |
| RCL(1) | 01 | RBW(1) | 11 | RBWL(1) | 21 | IOR(1) | 31 |
| RCL(2) | 02 | RBW(2) | 12 | RBWL(2) | 22 | IOR(2) | 32 |
| RCL(3) | 03 | RBW(3) | 13 | RBWL(3) | 23 | IOR(3) | 33 |
| RIL(0) | 04 | | | | | | |
| RIL(1) | 05 | | | | | | |
| RIL(2) | 06 | | | | | | |
| RIL(3) | 07 | Reserved | 14-17 | Reserved | 24-27 | Reserved | 34-37 |
| WCL | 08 | WBW | 18 | WBWL | 28 | IOW(0) | 38 |
| RLR | 09 | RWR | 19 | | | IOW(1) | 39 |
| | | IOWR | 1A | | | IOW(2) | 3A |
| Reserved | 0A-0B | Reserved | 1B | Reserved | 29-2B | IOW(3) | 3B |
| BICL | 0C | PICL | 1C | | | INTA(0) | 3C |
| | | | | | | INTA(1) | 3D |
| | | | | | | INTA(2) | 3E |
| | | | | | | INTA(3) | 3F |
| Reserved | 0D-0F | Reserved | 1D-1F | Reserved | 2C-2F | Reserved | 40-FF |

| Signal Name | Type | Function |
|---|---|---|
| CP | I/O | Even parity for the 8-bit command. This bit is valid at the same time as the command/address strobe and is checked by the addressed agent every time the command/address strobe is valid. The addressed agent that finds the parity incorrect will signal a command address error (CAE#). |
| CS# | I/O | Command Strobe. This active low signal when true indicates valid information on the address and command signals. |
| DS0# | I/O | Data Strobe 0. This active low signal when true indicates valid information on data bus 0 on the next bus clock cycle after the strobe. |
| DS1# | I/O | Data Strobe 1. This active low signal when true indicates valid information on data bus 1 on the next bus clock cycle after the strobe. |
| ORD0# | I | Ordered Response Request 0. This active low signal when true indicates the request of an ordered data response on data bus 0. This signal remains valid until the in-order requestor gains access to the data bus (DS0 goes inactive from the previous user). |
| ORD1# | I | Ordered Response Request 1. This active low signal when true indicates the request of an ordered data response on data bus 1. This signal remains valid until the in-order requestor gains access to the data bus (DS1 goes inactive from the previous user). |

Table 1-1 ABIC XA-MP Bus Interface Pins

<table>
<tr><th>Signal Name</th><th>Type</th><th>Function</th></tr>
<tr><td>BUSL#</td><td>I/O</td><td>
Bus Lock. This active low signal is used to indicate that an XA-MP bus requesting agent is performing a full bus lock operation. This means that any other agent that needs to perform a bus operation will not be allowed to arbitrate for the bus while this signal is active, except for cases needed to maintain cache coherence and out of order data being returned due to prior read operations.
When an agent wants to perform a bus operation it must first check to see if Bus Lock is not asserted before asserting its arbitration signal. If after asserting its arbitration signal, another agent acquires the bus and asserts Bus Lock, then all agents must deassert their arbitration signals and not rearbitrate for the bus until the Bus Lock signal goes inactive. The only exceptions to this rule are:
1. RLR and RWR cycles to complete prior operations.<br>2. Data being returned as part of a read issued by the bus locking agent.<br>3. Cache line writes to maintain cache coherence.
Any other cycles on the bus while bus lock is true will receive a no response according to the following table:
<table>
<tr><th>Response Allowed</th><th>No Response</th></tr>
<tr><td>RWR<br>RLR<br>IOWR<br>WCL<br>WBW<br>WBWL<br>RBWL</td><td>IOR<br>IOW<br>INTA<br>RCL<br>RBW<br>BICL<br>PICL</td></tr>
</table>
When the agent does acquire the XA-MP Bus, Bus Lock is asserted at the same time as the address/command strobe (for RBWL or WBWL only) and is held active until the end of the Bus Lock operation or if the bus cycle gets a NAK or error response.
The agent that owns the Bus Lock can release the signal without issuing a bus cycle, but it must be done synchronous with the bus clock.
</td></tr>
<tr><td>ACK#</td><td>I/O</td><td>Acknowledge. This active low signal is issued by the responding bus agent to the requestor, and indicates the acceptance of the command in the absence of a NAK.</td></tr>
<tr><td>NAK#</td><td>I/O</td><td>Negative Acknowledge. This active low signal is used to indicate a temporary busy condition by either the responding agent (i.e. memory or I/O) or by a listening agent (i.e. cache).</td></tr>
<tr><td>MCI#</td><td>I/O</td><td>Memory Cycle Inhibit. This active low signal serves two purposes. First it indicates to the requesting agent that the memory request will be out-of-order (i.e. memory mapped I/O or cache intervene cycle). Second it is used by the I/O bridges in the system to inhibit the XA-MP system memory from cycling to memory mapped location they contain. This eliminates the need for the XA-MP memory to know where all the memory mapped "holes" in the system are. Each I/O bridge will be responsible for indicating on the XA-MP bus all memory mapped locations by use of this signal.</td></tr>
</table>

Table 1-1 ABIC XA-MP Bus Interface Pins

| Signal Name | Type | Function |
|---|---|---|
| CDM# | I/O | Cache Data Modified. This active low signal indicates that a cache in the system has the requested cache line (RCL or RIL) in the modified state. This signal is used by the requesting agent to set the cache line status to the modified state when the ACK response occurs on the bus. |
| CDS# | I/O | Cache Data Shared. This active low signal indicates that a cache in the system has the requested cache line (RCL) in the shared or exclusive state. This signal is used by the requesting agent to properly set the line status of the cache line (exclusive or shared) when the ACK response occurs on the bus. |
| CAE# | I/O | Command or Address Error. This active low signal indicates an error on the command or address bus and is driven by the agent detecting the error 3 bus clocks after the address strobe. |
| DPE0# | I/O | Data Parity Error 0. This active low signal indicates that a parity error was detected by an agent receiving data sent on data bus 0. This signal is driven by the responding agent 2 bus clocks after receipt of the data in error. |
| DPE1# | I/O | Data Parity Error 1. This active low signal indicates that a parity error was detected by an agent receiving data sent on data bus 1. This signal is driven by the responding agent 2 bus clocks after receipt of the data in error. |
| SLEY# | I/O | Slice Error Yellow. This active low signal is used to indicate that a "yellow" type error (non-fatal) has occurred. If the signal is already active, the agent will wait until it is cleared before activating the signal. Once active this signal is kept active until the error is cleared by system software. This signal can be looked at by any processor in the system for further processing. The signal is asynchronous to bus transfers but synchronous to the bus clock. |
| SLER# | I/O | Slice Error Red. This active low signal is used to indicate that a "red" type error (fatal) has occurred. If the signal is already active, the agent will wait until it is cleared before activating the signal. Once active this signal is kept active until the error is cleared by system software. This signal can be looked at by any processor in the system for further processing. The signal is asynchronous to bus transfers but synchronous to the bus clock. |
| ARB#[00] | O | Active Low Arbitration Signal a agent asserts this signal to acquire the XA-MP command/address bus. This signal is etched diagonally down the bus is such a manner that each slice on the bus will see it as ARB#[01], ARB#[02] etc. depending on slice position. |
| ARB#[09:01] | I | This the collection of all the ARB#[00] signals for every slice on the XA-MP bus. A agent uses these signals to determine its position in the arbitration queue, its slice ID on initialization and the ID used when making a request on the XA-MP bus. |
| PWRF# | O | Power Fail. This active low System Power Fail signal indicates to all bus slices that valid DC power is going to fail in 4 milliseconds. This signal is driven by the ABIC when in cBIC mode. |
| BCLK | I | Bus Clock 33.3 Mhz |

Table 1-1 ABIC XA-MP Bus Interface Pins

| Signal Name | Type | Function |
|---|---|---|
| BINIT# | I/0 | Bus Initialize. This active low signal is used to perform a full initialize on all bus slices. This signal is driven by the ABIC when in cBIC mode. This signal must be held low for at least 10 bus clocks after power is valid. |
| 68 | | TOTAL PINS |

1.3.1.2 ABIC i486™ Bus Interface Pins

The i486™ bus signals are interfaced to the ABIC through the pins contained in Table 1-2.

Table 1-2 ABIC i486™ Bus Interface Pins

<table>
<tr><th>Signal Name</th><th>Type</th><th>Description</th></tr>
<tr><td>iA[31:2]</td><td>I/O</td><td>Thirty address lines.</td></tr>
<tr><td>iBE#[3:0]</td><td>I/O</td><td>Byte Enable lanes for the data bus.</td></tr>
<tr><td>iPCHK#</td><td>O</td><td>Parity Check, used to indicate a even parity error on received data. Parity is checked only on the active byte lanes. iPCHK# is only asserted on i486™ bus window read operations.</td></tr>
<tr><td>iM/IO#<br>iD/C#<br>iW/R#</td><td>I/O<br>I/O<br>I/O</td><td>These signals are used to specify the type of i486™ bus cycle. Memory or I/O (iM/IO#), differentiates memory space from I/O space. Data or Control (iD/C#), differentiates data cycles from all other cycles. Write or Read (iW/R#), indicates whether the cycle is write or read. These cycle types are encoded as follows:
<table>
<tr><th>M/IO#</th><th>D/C#</th><th>W/R#</th><th>Bus Cycle Initiated</th></tr>
<tr><td>0</td><td>0</td><td>0</td><td>Interrupt Acknowledge</td></tr>
<tr><td>0</td><td>0</td><td>1</td><td>Reserved</td></tr>
<tr><td>0</td><td>1</td><td>0</td><td>I/O Read</td></tr>
<tr><td>0</td><td>1</td><td>1</td><td>I/O Write</td></tr>
<tr><td>1</td><td>0</td><td>0</td><td>Code Read (Note: A Code Read cycle is never generated by the ABIC but is accepted.)</td></tr>
<tr><td>1</td><td>0</td><td>1</td><td>Reserved</td></tr>
<tr><td>1</td><td>1</td><td>0</td><td>Memory Read</td></tr>
<tr><td>1</td><td>1</td><td>1</td><td>Memory Write</td></tr>
</table></td></tr>
<tr><td>iLOCK#</td><td>I/O</td><td>Indicates locked bus cycle. The assertion of iLOCK# as an input will generate a bus based lock on the XA-MP bus. The assertion of iLOCK# as an output will generate a bus based lock on the i486™ bus.</td></tr>
<tr><td>iADS#</td><td>I/O</td><td>Address Status, indicates the validity of the address lines.</td></tr>
</table>

Table 1-2 ABIC i486™ Bus Interface Pins

| Signal Name | Type | Description |
|---|---|---|
| iRDY# | I/O | Ready, indicates that data has been accepted and the bus cycle is complete. |
| iBLAST# | O | Burst Last, indicates the next time iRDY# is asserted, the bus cycle is complete. |
| iINITIN# | I | Initialize in, when in cBIC mode this signal when asserted causes BINIT# to be driven on the XA-MP bus. |
| iINITOUT# | O | Initialize out, asserted by the ABIC upon detection of the initialize bit in the BIC's software visible registers, or by a non-cBIC upon detection of BINIT# on the XA-MP bus. |
| iBREQ | O | Bus Request, indicates the ABIC has internally generated a bus request. |
| iHOLD | I | Hold, asserted by an i486™ bus master to request the i486™ bus. |
| iHLDA | O | Hold Acknowledge, issued by the ABIC to grant the i486™ bus to a requesting i486™ bus master. |
| iBS16#,<br>iBS8# | I<br>I | The bus size 16 and 8 cause the BIC to generate multiple i486™ bus cycles. These signals are asserted by i486™ bus devices that cannot accept 32 bit data transfers. |
| iPWRF# | I | Power Fail, when in cBIC mode the assertion of this signal results in the assertion of the XA-MP bus PWRF# signal. |
| 50 | | TOTAL PINS |

1.3.1.3 ABIC/DBIC Interface Pins

The ABIC/DBIC interface pins used for communication between the ABIC and DBIC are contained in Table 1-2.

Table 1-3 ABIC/DBIC Interface Pins

| Signal Name | Type | Description |
|---|---|---|
| XDOUTEN0# | O | XA-MP data bus 0 output enable. This signal when asserted, results in DBIC0 driving data onto data bus 0 of the XA-MP bus. |
| XDOUTEN1# | O | XA-MP data bus 1 output enable. This signal when asserted, results in DBIC1 driving data onto data bus 1 of the XA-MP bus. |

Table 1-3 ABIC/DBIC Interface Pins

<table>
<tr><th>Signal Name</th><th>Type</th><th>Description</th></tr>
<tr><td>XBUSWSEL[1:0]</td><td>O</td><td>XA-MP bus word select. These signals select the appropriate XA-MP bus word of a cache line of data specified by XDOUTSEL[1:0] in preparation for a burst transfer onto the XA-MP bus. The table below provides the encoding of XBUWSEL[1:0]:
<table>
<tr><th>XBUSWSEL[1:0]</th><th>XA-MP Bus Word</th></tr>
<tr><td>00</td><td>0</td></tr>
<tr><td>01</td><td>1</td></tr>
<tr><td>10</td><td>2</td></tr>
<tr><td>11</td><td>3</td></tr>
</table></td></tr>
<tr><td>XDOUTSEL[1:0]</td><td>O</td><td>XA-MP bus data out select. These signals are used to select data from internal holding registers in the DBIC in preparation for transfer onto the XA-MP bus. The source of data will be either from the i486™ bus, modified line register or write back register. The table below provides the encoding of XDOUTSEL[1:0]:
<table>
<tr><th>XDOUTSEL[1:0]</th><th>Register</th></tr>
<tr><td>00</td><td>Modified Line Register</td></tr>
<tr><td>01</td><td>Write Back Register</td></tr>
<tr><td>10</td><td>i486™ Bus Data Register</td></tr>
<tr><td>11</td><td>Reserved</td></tr>
</table></td></tr>
<tr><td>WBRDLD#</td><td>O</td><td>Write Back Register Load. When asserted, the DBIC will load the Write Back Register with the cache line addressed by the CLINSEL[3:0] signals.</td></tr>
<tr><td>MLRDLD#</td><td>O</td><td>Modified Line Register Load. When asserted, the DBIC will load the Modified Line Register with the cache line addressed by the CLINSEL[3:0] signals.</td></tr>
</table>

Table 1-3 ABIC/DBIC Interface Pins

| Signal Name | Type | Description |
|---|---|---|
| iBYTSEL[3:0]# | O | i486™ bus data byte select. These signals provide two functions: First, when the BIC is receiving i486™ bus data, these signals when active will load the appropriate bytes into the DBIC i486™ bus data register, where iBYTSEL[0]# loads iD[7:0] and iBYTSEL[3]# loads iD[31:24]. Second, when the BIC is transmitting i486™ bus data, these signals are used to select data from internal holding registers in the DBIC in preparation for transfer onto the i486™ bus. The source of data will be either from the request queue, data cache or the XA-MP bus. The table below provides the encoding of the iBYTSEL[3:0]# signals when the BIC is transmitting i486™ bus data: |
| iPERR# | I | i486™ data bus parity error. This signal is asserted by the DBIC upon receipt of i486™ bus data with bad parity. |
| XPERR0# | I | XA-MP data bus 0 parity error. This signal is asserted by DBIC0 upon receipt of XA-MP bus data with bad parity on XA-MP data bus 0. |
| XPERR1# | I | XA-MP data bus 1 parity error. This signal is asserted by DBIC1 upon receipt of XA-MP bus data with bad parity on XA-MP data bus 1. |

| iBYTSEL[3:0]# | Data Register |
|---|---|
| 00h | Request Queue Data bits [63:32] |
| 01h | Request Queue Data bits [31:00] |
| 02h | XA-MP Bus Data bits [63:32] |
| 03h | XA-MP Bus Data bits [31:00] |
| 04h | Cache Data bits [255:224] |
| 05h | Cache Data bits [223:192] |
| 06h | Cache Data bits [191:160] |
| 07h | Cache Data bits [159:128] |
| 08h | Cache Data bits [127:96] |
| 09h | Cache Data bits [95:64] |
| 0ah | Cache Data bits [63:32] |
| 0bh | Cache Data bits [31:00] |
| 0ch | Reserved |
| 0dh | Reserved |
| 0eh | Reserved |
| 0fh | Reserved |

Table 1-3 ABIC/DBIC Interface Pins

| Signal Name | Type | Description |
|---|---|---|
| CREGWDLD# | O | Cache register word data load. This signal when asserted, results in the DBIC loading XA-MP bus words (e.g. cache line fill) to assemble a cache line from the XA-MP data bus for storage in the DBIC data cache. |
| CDINSEL | O | Cache data in select. This signal is used to select data from the XA-MP bus or i486™ bus for storage in the DBIC data cache. A low level selects XA-MP bus data while a high level selects i486™ bus data. |
| CLINSEL[3:0] | O | Cache data line select. These signals are used to address one of sixteen cache lines in the DBIC data cache. |
| CDWSEL[2:0] | O | Cache double word select. These signals are used to address one of eight i486™bus double word locations of the cache line selected by the CLINSEL[3:0] signals. The CDWSEL[2:0] signals are used in conjunction with the CBYTDLD[3:0]# signals to write i486™ bus data into the DBIC data cache. |
| CLINDLD# | O | Cache line data load. This signal when asserted, results in the storage of a cache line from the XA-MP bus into the DBIC data cache at the location specified by the CLINSEL[3:0] signals. |
| CBYTDLD[3:0]# | O | Cache byte data load. These signals when asserted, result in the storage of from one to four bytes of i486™ bus data into the cache location specified by the CLINSEL[3:0] and CBUSWSEL[2:0] signals. CBYTDLD[0]# pertains to iD[7:0] while CBYTDLD[3]# loads iD[31:24]. |
| XINDLD# | O | XA-MP input data load. This signal when asserted, enables the loading of the XA-MP bus data into the i486™ bus window request queue. |

Table 1-3 ABIC/DBIC Interface Pins

| Signal Name | Type | Description |
|---|---|---|
| iCMD[4:0] | O | These signals provide a 5 bit encoded command which the ABIC uses to control the i486™ bus data path in the DBIC. The encoding of the iCMD[4:0] signals is provided in the table below: |

in

| iCMD[4:0] | DBIC Action |
|---|---|
| 00h | None |
| 01h | Unload i486™ bus window Request Queue. |
| 02h | Load i486™ bus data output register with data specified by the iBTY-SEL[3:0]# signals and unload the i486™ bus window Request Queue. |
| 03h | Load i486™ bus data output register with data specified by the iBTY-SEL[3:0]# signals. |
| 04h | Shift DBIC internal register data. Used on XA-MP bus operations to the BIC software visible registers. |
| 05h | Shift and drive DBIC0 internal register data for transmission to the ABIC. This command is used for XA-MP bus write operations to the BIC software visible registers. |
| 06h | Shift register data, drive DBIC0 data bus and load the i486™ bus parity configuration in both DBICs. Used on BIC slice specific control/status register write operations from the XA-MP bus. |
| 07h | Shift register data, drive DBIC0 data bus and load the XA-MP Bus parity configuration in both DBICs. Used on BIC slice common control/status register write operations from the XA-MP bus. |
| 08h | Drive the contents of the i486™ bus output register in DBIC0 onto the i486™ bus. |
| 09h | Load i486™ bus data into the DBIC. |

Table 1-3 ABIC/DBIC Interface Pins

| Signal Name | Type | Description |
|---|---|---|
| | | |
| iD[0] | I/O | Internal register data. This one bit bidirectional bus is used to send/receive the XA-MP bus slice software visible registers to/from the ABIC. |

| iCMD[4:0] | DBIC Action |
|---|---|
| 0bh | Load i486™ bus data into the upper double word (i.e. iD[63:32]) DBIC i486™ bus window Reply Queue. |
| 0ch | Load i486™ bus data into the lower double word (i.e. iD[31:00]) DBIC i486™ bus window Reply Queue. |
| 0dh | Reserved |
| . . . | . . . |
| 14h | Reserved |
| 15h | Shift and drive DBIC1 internal register data for transmission to the ABIC. This command is used for XA-MP bus write operations to the BIC software visible registers. |
| 16h | Shift register data, drive DBIC1 data bus and load the i486™ bus parity configuration in both DBICs. Used on BIC slice specific control/status register write operations from the XA-MP bus. |
| 17h | Shift register data, drive DBIC1 data bus and load the XA-MP bus parity configuration in both DBICs. Used on BIC slice common control/status register write operations from the XA-MP bus. |
| 18h | Drive the contents of the i486™ bus output register in DBIC1 onto the i486™ bus. |
| 19h | Reserved |
| . . . | . . . |

Table 1-3 ABIC/DBIC Interface Pins

| Signal Name | Type | Description |
|---|---|---|
| AUDE0IN# | I | This signal when asserted, indicates DBIC0 received uncorrectable XA-MP bus data. |
| AUDE1IN# | I | This signal when asserted, indicates DBIC1 received uncorrectable XA-MP bus data. |
| AUDE0OUT# | O | This signal when asserted, results in DBIC0 generating UDE0# for the data selected by the XBUSWSEL[1:0] and XDOUTSEL[1:0] signals. |
| AUDE1OUT# | 0 | This signal when asserted, results in DBIC1 generating UDE1# for the data selected by the XBUSWSEL[1:0] and XDOUTSEL[1:0] signals. |
| 40 | | TOTAL PINS |

1.3.1.4 ABIC SCAN Interface Pins

The SCAN signals supported by the ABIC to provide an IEEE 1149.1 compliant Test Access Port are contained in Table 1-10.

Table 1-4 ABIC Scan Interface Pins

| Signal Name | Type | Description |
|---|---|---|
| TCK | I | Test Clock |
| TMS | I | Serial Test Mode Select |
| TDI | I | Serial Test Data Input |
| TDO | O | Serial Test Data Output |
| TRST | I | Test Reset |
| 5 | | TOTAL PINS |

1.3.1.5 ABIC Miscellaneous Interface Pins

The miscellaneous interface pins provided by the ABIC are used for the following purposes:

1. Diagnostic LED display
2. Boot ROM chip select
3. APIC chip select
4. Loading of slice identification, revision and XA-MP data bus configuration from an external device.

5. XA-MP bus window decode.

Table 1-5 ABIC Miscellaneous Interface Pins

| Signal Name | Type | Description |
|---|---|---|
| cBIC/BIC# | I | This signal is used to configure the ABIC in compatible mode. When this signal is high the BIC is configured in cBIC mode. |
| CS-APIC# | O | Chip Select for the APIC. |
| CS-ROM# | O | Chip Select for the system ROM. |
| IDREGD | I | This signal provides a serial data input path to load the slice identification, revision, and XA-MP data bus configuration from an external device. |
| LED | O | This signal provides a serial data output path for displaying diagnostic LED information. |
| IDREGGO# | O | This signal when asserted, is used by an external device to start shifting slice identification, revision and XA-MP data bus configuration data on the IDREGD input signal. In addition, this signal is used to inform an external device that diagnostic display information is present on the LED output. |
| XWIN_CYC | O | This signal when asserted, indicates the cycle on the i486™ bus addresses the XA-MP bus window. |
| 7 | | TOTAL PINS |

1.3.1.6 ABIC Pin Summary

A summary of the ABIC interface pins is contained in Table 1-6.

Table 1-6 ABIC Pin Summary

| | | |
|---|---|---|
| 68 | | **ABIC XA-MP Bus Pins** |
| 50 | | **ABIC i486™ Bus Pins** |
| 40 | | **ABIC/DBIC Interface Pins** |
| 5 | | **ABIC SCAN Interface Pins** |
| 7 | | **ABIC Miscellaneous Interface Pins** |
| | 170 | **TOTAL ABIC INTERFACE PINS** |
| | 51 | **Power and Grounds (30% of signals)** |
| | 221 | GRAND TOTAL - ABIC PINS |

1.3.2 DBIC Interface Pins

The interface pins of the DBIC are classified as follows:

1. XA-MP Bus Interface Pins 2. i486™ Bus Interface Pins
3. ABIC/DBIC Interface Pins
4. SCAN Interface Pins
5. Miscellaneous Interface Pins

1.3.2.1 DBIC XA-MP Bus Interface Pins

The XA-MP bus signals are interfaced to the DBIC through the pins contained in Table 1-7.

Table 1-7 DBIC XA-MP Bus Interface Pins

<table>
<tr><th>Signal Name</th><th>Type</th><th>Function</th></tr>
<tr><td>D[63:00]</td><td>I/O</td><td>The data bus is used for cache line operations and memory or I/O write operations on the bus. Data is valid on the bus clock leading edge one clock after data strobe is valid. In a dual data bus system (i.e. data bus 1 exists) the selection of the data bus for write and read operations is done by the state of address bit A[05]. If A[05] = 0, then data will be written/returned on data bus 0, while if A[05] = 1, then data will be written/returned on data bus 1.</td></tr>
<tr><td>DP[7:0]</td><td>I/O</td><td>These bits indicate even parity for the data bus according to the following table. These bits are valid at the same time as D[63:00].<br><table><tr><th>Data Bits</th><th>Parity Bit</th><th>Data Bits</th><th>Parity Bit</th></tr><tr><td>D[63:56]</td><td>DP[7]</td><td>D[31:24]</td><td>DP[3]</td></tr><tr><td>D[55:48]</td><td>DP[6]</td><td>D[23:16]</td><td>DP[2]</td></tr><tr><td>D[47:40]</td><td>DP[5]</td><td>D[15:08]</td><td>DP[1]</td></tr><tr><td>D[39:32]</td><td>DP[4]</td><td>D[07:00]</td><td>DP[0]</td></tr></table></td></tr>
<tr><td>UDE#</td><td>I/O</td><td>Uncorrected Data Error. This active low signal indicates that the data present on the data bus contains an uncorrectable data error.</td></tr>
<tr><td>BCLK</td><td>I</td><td>Bus Clock 33.3 Mhz</td></tr>
<tr><td>DBCLK</td><td>I</td><td>Double Bus Clock 66 Mhz</td></tr>
<tr><td>75</td><td></td><td>TOTAL PINS</td></tr>
</table>

1.3.2.2 DBIC i486™ Bus Interface Pins

The i486™ bus signals used to interface i486™ bus compatible components to the DBIC are provided through the pins contained in Table 1-2.

Table 1-8 DBIC i486™ Bus Interface Pins

| Signal Name | Type | Description |
|---|---|---|
| iD[31:00] | I/O | Thirty-two bit data bus. |
| iDP[3:0] | I/O | These bits indicate even parity for the i486™ data bus according to the following table.<br><br>Data Bits / Parity Bit:<br>iD[31:24] — iDP[3]<br>iD[23:16] — iDP[2]<br>iD[15:08] — iDP[1]<br>iD[07:00] — iDP[0] |
| iINIT# | I | An active low system initialization signal |
| 37 | | TOTAL PINS |

1.3.2.3 ABIC/DBIC Interface Pins

The ABIC/DBIC interface pins used for communication between the DBIC and ABIC are contained in Table 1-2.

Table 1-9 ABIC/DBIC Interface Pins

| Signal Name | Type | Description |
|---|---|---|
| XDOUTEN# | I | XA-MP data bus output enable. This signal when asserted, results in the DBIC driving data on the XA-MP data bus. |
| XBUSWSEL[1:0] | I | XA-MP bus word select. These signals select the appropriate XA-MP bus word of a cache line of data specified by XDOUTSEL[1:0] in preparation for a burst transfer onto the XA-MP bus. Refer to Table 1-2 for the encoding of the XBUSWSEL[1:0] signals. |
| XDOUTSEL[1:0] | I | XA-MP bus data out select. These signals are used to select data from internal holding registers in the DBIC in preparation for transfer onto the XA-MP bus. The source of data will be either from the i486™ bus, modified line register or write back register. Refer to Table 1-2 for the encoding of the of XDOUTSEL[1:0] signals. |
| WBRDLD# | I | Write Back Register Load. When asserted, the DBIC will load the Write Back Register with the cache line addressed by the CLINSEL[3:0] signals. |
| MLRDLD# | I | Modified Line Register Load. When asserted, the DBIC will load the Modified Line Register with the cache line addressed by the CLINSEL[3:0] signals. |

Table 1-9 ABIC/DBIC Interface Pins

| Signal Name | Type | Description |
|---|---|---|
| iBYTSEL[3:0]# | I | i486™ bus data byte select. These signals provide two functions: First, when the BIC is receiving i486™ bus data, these signals when active will load the appropriate bytes into the DBIC i486™ Bus Data Register. Where iBYTSEL[0]# loads iD[7:0] and IBYTSEL[3]# loads iD[31:24]. Second, when the BIC is transmitting i486™ bus data, these signals are used to select data from internal holding registers in the DBIC in preparation for transfer onto the i486™ bus. The source of data will be either from the request queue, data cache or the XA-MP bus. Refer to Table 1-2 for the encoding of the iBYTSEL[3:0]# signals when the BIC is transmitting i486™ bus. |
| iPERR# | O | i486™ data bus parity error. This signal is asserted by the DBIC upon receipt of i486™ bus data with bad parity. |
| XPERR# | O | XA-MP data bus parity error. This signal is asserted by the DBIC upon receipt of XA-MP bus data with bad parity. |
| CREGWDLD# | I | Cache register word data load. This signal when asserted, results in the DBIC loading XA-MP bus words (e.g. cache line fill) to assemble a cache line from the XA-MP data bus for storage in the DBIC data cache. |
| CDINSEL | I | Cache data in select. This signal is used to select data from the XA-MP bus or i486™ bus for storage in the DBIC data cache. A low level selects XA-MP Bus data while a high level selects i486™ bus data. |
| CLINSEL[3:0] | I | Cache data line select. These signals are used to address one of sixteen cache lines in the DBIC data cache. |
| CDWSEL[2:0] | I | Cache double word Select. These signals are used to address one of eight double word locations of the cache line selected by the CLINSEL[3:0] signals. The CDWSEL[2:0] signals are used in conjunction with the CBYTDLD[3:0]# signals to write i486™ bus data in the DBIC data cache. |
| CLINDLD# | I | Cache line data load. This signal when asserted, result in the storage of a cache line in the DBIC data cache at the location specified by the CLINSEL[3:0] signals. |
| CBYTDLD[3:0]# | I | Cache byte data load. These signals when asserted, result in the storage from one to four bytes of i486™ bus data in the cache location specified by the CLINSEL[3:0] and CBUSWSEL[2:0] signals. CBYTDLD[0]# pertains to iD[7:0] while CBYT-DLD[3]# loads iD[31:24]. |
| XINDLD# | I | XA-MP input data load. This signal when asserted, enables the loading of the XA-MP bus data in the i486™request queue. |
| iCMD[4:0] | I | These signals provide a 5 bit encoded command, that the ABIC uses to control the i486™ bus data path in the DBIC. Refer to Table 1-2 for the encoding of the iCMD[4:0] signals. |
| AUDEIN# | I | This signal when asserted, results in the DBIC generating UDEx# for the data selected by the XBUSWSEL[1:0] and XDOUTSEL[1:0] signals to be driven on the XA-MP bus. |

Table 1-9 ABIC/DBIC Interface Pins

| Signal Name | Type | Description |
|---|---|---|
| AUDE0OUT# | O | This signal when asserted, indicates the DBIC received uncorrectable XA-MP bus data. |
| 35 | | TOTAL PINS |

1.3.2.4 DBIC SCAN Interface Pins

The SCAN signals supported by the DBIC to provide an IEEE 1149.1 compliant Test Access Port are contained in Table 1-10.

Table 1-10 DBIC Scan Interface Pins

| Signal Name | Type | Description |
|---|---|---|
| TCK | I | Test Clock |
| TMS | I | Serial Test Mode Select |
| TDI | I | Serial Test Data Input |
| TDO | O | Serial Test Data Output |
| TRST | I | Test Reset |
| 5 | | TOTAL PINS |

1.3.2.5 DBIC Miscellaneous Interface Pins

The only miscellaneous interface pin of the DBIC is used to configure the DBIC for single or dual XA-MP bus operations. The Miscellaneous Interface Pins supported by the DBIC are contained in Table 1-10.

Table 1-11 DBIC Miscellaneous Interface Pins

| Signal Name | Type | Description |
|---|---|---|
| BUS0_BUS1# | I | In a single bus configuration this signal should be connected to a logic one. In a dual bus configuration, the DBIC connected to data bus 0 should have this signal at a logic one while the DBIC supporting data bus 1 should have the pin connected to a logic 0. |
| 1 | | TOTAL PINS |

1.3.2.6 DBIC Pin Summary

A summary of the DBIC interface pins is contained in Table 1-12.

Table 1-12 DBIC Pin Summary

| | | |
|---|---|---|
| 75 | | DBIC XA-MP Bus Pins |
| 37 | | DBIC i486™ Bus Pins |
| 35 | | ABIC/DBIC Interface Pins |
| 5 | | DBIC SCAN Interface Pins |
| 1 | | Miscellaneous Interface Pins |
| | 153 | TOTAL DBIC INTERFACE PINS |
| | 46 | Power and Grounds (30% of signals) |
| | 199 | GRAND TOTAL - DBIC PINS |

1.4 OPERATION

This describes and provides waveforms for the following operations:

1. XA-MP Bus Window
2. i486™ Bus Window
3. Miscellaneous Interfaces

1.4.1 XA-MP Bus Window

The XA-MP bus window provides the interface for i486™ bus masters to access XA-MP bus resources. All i486™ cycles initiated by i486™ bus masters access the XA-MP bus through the XA-MP bus window.

The XA-MP bus window as viewed from the XA-MP bus, behaves as an XA-MP bus secondary cache. The BIC provides a fully associative write-back buffer pool to maintain data coherency when transferring data to and from the XA-MP bus. The buffer pool is sixteen lines each 32 bytes in size. The MESI (Modified, Exclusive, Shared and Invalid) cache protocol is used by the BIC.

1.4.1.1 XA-MP Bus Window Address Mapping

The XA-MP bus window is defined through the expbegin_mem and expend_mem registers. The expbegin_mem register specifies the starting address of the window while the expend_mem register defines the ending address of the window. Access ti XA-MP bus memory resources are provided through the window. All i486™ bus cycles that address this window and are not enabled in the i486™ bus window (either through the ISA_map, relocation windows, or memory to I/O conversion window)

are accepted by the BIC and passed to the XA-MP bus. The size of the i486™ bus memory to XA-MP bus window can range from 32 bytes to 4GB. The window will start on even cache line boundaries (i.e., 32 bytes). If the 32MByte translation window is configured within the bounds of the XA-MP bus window, it is important to note that i486™ accesses to addresses within the translation window will produce anomalous behavior in the BIC.

1.4.1.2 XA-MP Bus Window Buffer Pool

The XA-MP bus window contains a 16 cache line buffer pool to increase i486™ bus access performance and to conserve XA-MP bus bandwidth. For accesses to the XA-MP bus window, the BIC snoops the i486™ bus for hits and misses in the buffer pool. XA-MP bus cache coherency is also maintained on this buffer pool. The coherency protocol for the XA-MP bus is MESI, which means that the state, at any given time, of a line in the buffer pool can be either Modified, Exclusive, Shared or Invalid. To maintain XA-MP bus cache coherency, the BIC is required to snoop the XA-MP bus and take appropriate action as a snooping agent. Refer to section 1.4.1.10, Buffer Pool XA-MP Bus Snooping.

1.4.1.3 XA-MP Bus Window Read Operations

When an i486™ bus master initiates a read cycle (e.g. disk write) to the XA-MP bus window, the BIC checks the buffer pool for a hit or a miss. On a hit, the BIC will not generate an XA-MP bus cycle. The BIC supplies the requested data unless the buffer pool line is marked with UDE.

On a miss (e.g. Invalid), the BIC performs an XA-MP bus Read Cache Line (RCL) cycle. The cache line will be supplied either in-order or through an out-of-order cache intervention cycle (e.g. Modified line). When the cache line is obtained, the BIC will write the line into the cache. If the cycle is completed with no errors, the BIC will supply the requested data to the i486™ bus master while writing the line into the buffer pool. If the cycle had any errors, the BIC will not assert RDY# and will store the line in the buffer pool with UDE.

The state of the line in the buffer pool will be Modified, Exclusive, Shared or Invalid due to XA-MP bus window memory read misses.

1.4.1.4 XA-MP Bus Window Write Operations

When an i486™ bus master initiates a write cycle to the XA-MP bus window (e.g. disk read) the BIC checks the buffer pool for a hit or a miss. On a hit, the BIC stores the data in the buffer pool and does not generate an XA-MP bus cycle.

On a miss, (e.g. Invalid) the BIC will issue an XA-MP bus Bridge Invalidate Cache Line (BICL) command. The BICL transaction ensures that the cache line will be valid in XA-MP bus main memory and invalid in all of the XA-MP bus caches. If an XA-MP bus cache contains the line in the Modified state, it will negative acknowledge the BIC and then update main memory. In this case, the BIC is required to retry the BICL transaction until it is not NAKed. If successful, the BIC will write the i486™ bus data into the buffer pool and set the line status to Modified. If the BICL fails, no RDY# is asserted and the line is not stored in the buffer pool.

If the data is stored in the buffer pool and a parity error is detected on the i486™ bus (with parity enabled through the software visible registers), the data will be stored with UDE.

The state of the line in the buffer pool will be Modified or Invalid due to XA-MP bus window memory write misses.

1.4.1.5 Parity Error/UDE Handling

Actions taken on the XA-MP bus interface for parity errors which occur on the XA-MP bus are as specified in the XA-MP Bus Architecture Specification. If the data obtained by the BIC through an XA-MP bus RCL operation has either bad parity or UDEx#, the data is stored with UDE on a word basis. For XA-MP bus window read misses, RDY# is only asserted for successful RCLs which have no parity errors or UDE for any of the bytes in the line. For XA-MP bus window read hits, RDY# is only asserted for accesses to XA-MP words which are stored in the buffer pool with no UDE. A parity error received on an XA-MP bus window write operation will result in the BIC accepting the data, setting the iner_trap registers and asserting the XA-MP bus SLER# signal. The data received with bad i486™ bus parity will be stored in the buffer pool with UDE.

1.4.1.6 Buffer Pool Replacement Policy

A modified Least Recently Used (LRU) replacement policy is used for the buffer pool. A line is replaced when the LRU is not invalid and either an XA-MP bus window buffer pool miss occurs or a prefetch is requested. If the LRU is not modified, then the LRU will be overwritten with the new line. If the LRU is modified, then the write back register must be loaded to update main memory either through a WCL or up to four WBWs. A WCL will occur if: the BIC received the line modified from another cache as a result of a RCL or the BIC did a BICL and modified all 32 bytes of the line. Otherwise, WBWs will be generated for each XA-MP bus word which has been modified by the BIC. The write back replacement register (WBR) is the place used to store modified lines which need to be cast back to memory when the LRU is modified and a buffer pool miss or prefetch occurs, when an end-of-line castout occurs, or when a flush operation is performed.

1.4.1.7 Buffer Pool Prefetch

The XA-MP bus window provides a prefetching feature. Prefetching of the next ascending cache line can be enabled or disabled through the software visible registers. There are two types of prefetching which can be enabled/disabled separately: one for XA-MP bus window reads, and one for XA-MP bus window writes. When enabled for reads, a RCL will be issued on the XA-MP bus when a buffer pool read hit is detected to any byte in the i486™ bus doubleword as configured in the software visible registers. When enabled for writes, a BICL will be issued on the XA-MP bus when a buffer pool write hit is detected to any byte in the i486™ bus double word as configured in the software visible registers. If the LRU is modified and the WBR or MLR is full at the time when a prefetch is requested, the prefetch will be inhibited.

1.4.1.8 Buffer Pool End-of-Line Castout

The XA-MP bus window provides a castout feature. If enabled through the software visible registers, when a buffer pool read or write hit to byte 31 (MSB)is detected, an end-of-line castout will occur. If the line is in the exclusive or shared state, the line will be invalidated. If the line is in the modified state, the line will be written to the WBR. If the line is modified and the WBR or MLR is full at the time when an end-of-line castout is requested, the castout will be inhibited.

1.4.1.9 Buffer Pool Flush

The software visible registers provide a mechanism for clearing the buffer pool. If the flush bit is set, all of the modified buffers will be written back to memory through the MLR. All of the exclusive and shared buffers will be invalidated. XA-MP bus window accesses will not be serviced during this time. XA-MP bus snooping will continue to NAK hits to modified lines, but the MLR will not be loaded. Modified lines will continue to be loaded sequentially into the WBR. At the completion of the flush operation, the BIC will reset the flush bit in the software visible registers.

Accesses to the XA-MP bus window will be prevented during buffer pool flush operations.

1.4.1.10 Buffer Pool XA-MP Bus Snooping

The BIC snoops XA-MP bus cycles specified in Table 1-15 which are not initiated by the BIC and which are not to the i486™ window. In addition to snooping the buffer pool lines, the BIC also snoops two registers. These registers are the write back replacement register (WBR) and the modified line register (MLR).

The MLR is loaded and written to memory as a result of an XA-MP bus snoop hit to a modified line. Only one memory intervene will be serviced at a time. If a hit to a modified line is detected when either the MLR or WBR is full, NAK# will be asserted on the XA-MP bus. Operations involving the modified line register take priority over write back replacement operations.

The BIC will write the line in the MLR back to memory through either a WCL or up to four WBW commands. If the BIC modified all bytes in the line or the line was obtained modified through an RCL command the BIC will write the line to main memory with a WCL command on the XA-MP bus. If only a portion of the line is modified, a sequence of WBW commands will be issued by the BIC to merge the data in memory.

If no coherency error is detected, a hit to a modified line will cause CDM# to be asserted on the XA-MP bus and a hit to a shared or exclusive line will cause CDS# to be asserted on the XA-MP bus.

If a coherency error is detected, NAK# is inhibited and CDM# is asserted on the XA-MP bus thus generating an illegal response. The BIC will also set the cache coherency error bit in the Bus Response Trap register and record the type of coherency error in the cc_error register.

Table 1-13 provides the actions taken by the BIC as a result of XA-MP bus snoop hits to buffer pool tags.Table 1-13 contains the actions taken by the BIC on snoop hits to the modified line register or the write back replacement register.

A "waterfall" case exists when one cache is waiting for data to be returned through an out-of-order response (because it is modified) when another cache requests that data. When, the BIC will NAK the request as usual, load the data into its buffer pool when available, use it as planned, and then write it out to the MLR.

Table 1-13 Snoop Hit Cache Tag Actions

| XA-MP bus Cycle | BIC Buffer Entry States | | Comments/Actions |
|---|---|---|---|
| | Current | Next | |
| Write Bus Word(WBW) | M | I | The BIC will Negative Acknowledge the cycle and a write to memory will result. The MLR is loaded. |
| | E | I | |
| | S | I | |
| | I | I | |
| Write Bus Word Lock(WBWL) | M | I | Coherency Error - The BIC will record "M" in the cc_error register. This is a cache coherency error since the locked read should leave a modified snooped cache line invalid. |
| | E | I | Coherency Error - The BIC will record "E" in the cc_error register. This is a cache coherency error since the locked read should leave an exclusive snooped cache line invalid. |
| | S | I | |
| | I | I | |
| Processor Invalidate Cache Line (PICL) | M | M | Coherency Error - The BIC will record "M" in the cc_error register. This is a cache coherency error since a processor should already have a valid copy of the line. |
| | E | E | Coherency Error - The BIC will record "E" in the cc_error register. This is a cache coherency error since a processor should already have a valid copy of the line. |
| | S | I | |
| | I | I | |

Table 1-13 Snoop Hit Cache Tag Actions

| XA-MP bus Cycle | BIC Buffer Entry States | | Comments/Actions |
|---|---|---|---|
| | Current | Next | |
| Bridge Invalidate Cache Line (BICL) | M | I | The BIC will Negative Acknowledge the cycle and a write to memory will result. The MLR is loaded. |
| | E | I | |
| | S | I | |
| | I | I | |
| Write Cache Line(WCL) | M | M | Coherency Error - The BIC will record "M" in the cc_error register. This is a cache coherency error since a line must be owned by one cache to be allowed to write into it. |
| | E | E | Coherency Error - The BIC will record "E" in the cc_error register. This is a cache coherency error since a line must be owned by one cache to be allowed to write into it. |
| | S | S | Coherency Error - The BIC will record "S" in the cc_error register. This is a cache coherency error since a line must be owned by one cache to be allowed to write into it. |
| | I | I | |
| Read Bus Word(RBW) | M | I | The BIC will Negative Acknowledge the cycle and a write to memory will result. The MLR is loaded. |
| | E | E | |
| | S | S | |
| | I | I | |
| Read Bus Word Lock(RBWL) | M | I | The BIC will Negative Acknowledge the cycle and a write to memory will result. The MLR is loaded. |
| | E | S | |
| | S | S | |
| | I | I | |

Table 1-13 Snoop Hit Cache Tag Actions

| XA-MP bus Cycle | BIC Buffer Entry States | | Comments/Actions |
|---|---|---|---|
| | Current | Next | |
| Read Cache Line(RCL) | M | I | The BIC will Negative Acknowledge the cycle and a write to memory will result. The MLR is loaded. |
| | E | S | |
| | S | S | |
| | I | I | |
| Read and Invalidate Line(RIL) | M | I | The BIC will Negative Acknowledge the cycle and a write to memory will result. The MLR is loaded. |
| | E | I | |
| | S | I | |
| | I | I | |

Table 1-14 XA-MP bus Snoop Hit to MLR/WBR Actions

| XA-MP bus Cycle | Comments/Actions |
|---|---|
| Write Bus Word(WBW) | The BIC will Negative Acknowledge the cycle and then continue to update memory. |
| Write Bus Word Lock(WBWL) | Coherency error - The BIC will record MLR or WBR in the cc_error register and then continue to update memory. |
| Processor Invalidate Cache Line (PICL) | Coherency error - The BIC will record MLR or WBR in the cc_error register and then continue to update memory. |
| Bridge Invalidate Cache Line (BICL) | The BIC will Negative Acknowledge the cycle and then continue to update memory. |
| Write Cache Line(WCL) | Coherency error - The BIC will record MLR or WBR in the cc_error register and then continue to update memory. |

Table 1-14 XA-MP bus Snoop Hit to MLR/WBR Actions

| XA-MP bus Cycle | Comments/Actions |
|---|---|
| Read Bus Word(RBW) | The BIC will Negative Acknowledge the cycle and then continue to update memory. |
| Read Cache Line(RCL) | The BIC will Negative Acknowledge the cycle and then continue to update memory. |
| Read and Invalidate Line(RIL) | The BIC will Negative Acknowledge the cycle and then continue to update memory. |
| Read Bus Word Lock (RBWL) | The BIC will Negative Acknowledge the cycle and then continue to update memory. |

1.4.1.11 XA-MP Bus Interface

During XA-MP bus window operations the BIC operates as an XA-MP bus requester and responder to complete transactions requested through the i486™ bus. The BIC conforms to the XA-MP bus interface as defined in the "XA-MP Bus Architecture Specification"

1.4.1.11.1XA-MP Bus Arbitration

When arbitrating for the XA-MP bus the BIC will break into the current arbitration group when an XA-MP bus transaction is required to complete an XA-MP bus window operation. To avoid the situation where two BICs in a system could saturate the XA-MP address/command bus, the BIC will not break into the same arbitration group twice. Aside from this the BIC will arbitrate for the XA-MP bus as specified in the "XA-MP Bus Architecture Specification."

1.4.1.11.2XA-MP Bus Commands

The subset of XA-MP bus commands generated by the BIC for XA-MP bus window operations is provided in Table 1-15.

Table 1-15 BIC XA-MP Bus Window Commands

| Command | Type | Function |
|---|---|---|
| RCL(0) | Cache | Read Cache Line. This command requests a cache line transfer without requiring the invalidation of any other shared or exclusive cache lines. |
| BICL | Cache | Bridge Invalidate Cache Line. This address only command (no data is transferred) results in all caches in the system invalidating their copy of the cache line. |
| WCL | Cache | Write Cache Line. This command is used to write a modified cache line back to memory. |
| WBW | Memory | Write Bus Word. WBW uses a single address to write data up to the width of the bus. This command is used to write a modified cache line back to memory where not all bytes in the cache line are modified. Four WBW commands may be required to write a modified cache line back to memory. |
| WBWL | Locking | Write Bus Word Lock. The BIC uses the WBWL(0) with BUSL to perform a bus based lock on the XA-MP bus as a result of an i486™ bus initiated write lock operation to the XA-MP bus window. |
| RBWL(0) | Locking | Read Bus Word Lock. The BIC uses the RBWL(0) to perform a bus based lock on the XA-MP bus as a result of an i486™ bus initiated read lock operation to the XA-MP bus window. |

1.4.1.11.3XA-MP Bus Byte Enable Combinations

The XA-MP bus window generates both cache and non-cache line operations. For non-cache line write operations, any combination of the XA-MP byte enables may be generated by the BIC. Both contiguous and non-contiguous enables are generated by the BIC.

1.4.1.12 i486™ Bus Interface

The BIC is both an i486™ bus requester and responder. During XA-MP bus window operations the BIC only operates as an i486™ bus responder to complete transactions requested by the i486™ bus.

1.4.1.12.1i486™ Bus Arbitration

The BIC provides three signals on the i486™ bus for external devices to request and thereby perform XA-MP bus window operations. These signals are Bus Request Output (iBREQ#), Bus Hold Request Input (iHOLD), and Bus Hold Acknowledge (iHLDA).

iBREQ# is always asserted in the first clock of a i486™ bus cycle, along with iADS#. The BIC asserts iBREQ# whenever a i486™ bus window cycle is pending.Futhermore, if the BIC is currently not driving the bus (due to iHOLD), iBREQ# is asserted in the same clock the iADS# would have been asserted if the BIC were driving the bus. It will be asserted if additional cycles are necessary to complete a transfer, or if more cycles are pending internally. However, if no additional cycles are necessary to complete the current transfer, iBREQ# can be negated before iRDY# comes back for the current cycle. After the first clock of the bus cycle, iBREQ# may change state. This signal is driven regardless of the state of bus hold. iBREQ# is active HIGH and is never floated. During a hold state, internal events may cause iBREQ# to be deasserted prior to any bus cycles.

iHOLD allows an i486™ bus requester to request access to the i486™ bus. The BIC will respond to an active iHOLD signal by asserting iHLDA and placing most of its output and input/output pins in a high impedance state (i.e floated) after completing its current bus cycle or sequence of locked cycles. All of the i486™ bus signals are floated with the exception of iBREQ#, iHLDA and iPCHK#.The BIC will maintain its i486™ bus interface is this state until iHOLD is deasserted.

iHLDA indicates that the BIC has given the i486™ bus to another i486™ bus resquester. The BIC will not assert iHLDA as long as requests are pending in the i486™ bus window. iHLDA goes active in response to a hold request presented on the iHOLD pin. iHLDA is driven active in the same clock that the BIC floats its i486™ bus. iHLDA will be driven inactive when leaving bus hold and the BIC will resume driving the i486™ bus.

The i486™ bus arbitration mechanism is illustrated in Figure 1-4.

Figure 1-5 Timing - iHOLD/iHLDA

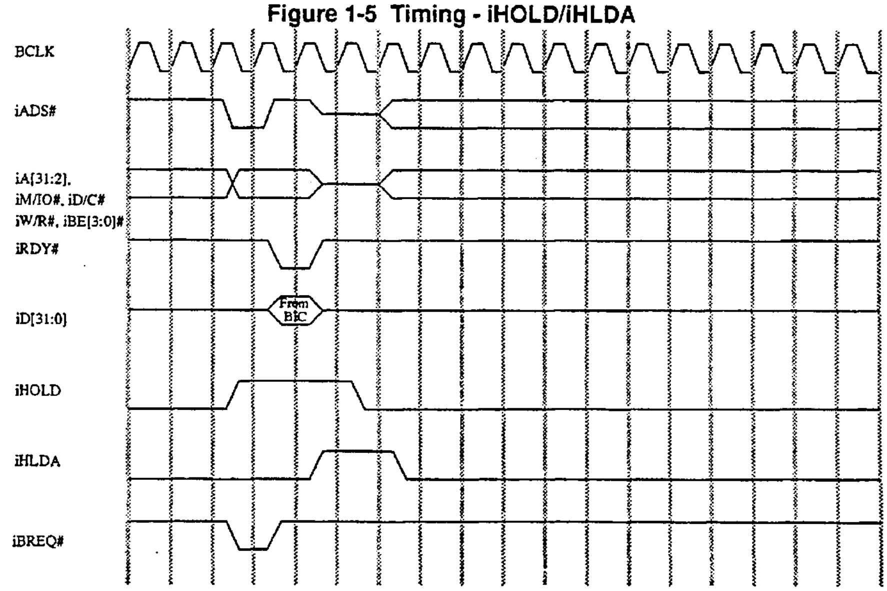

1.4.1.12.2 i486™ Bus Commands

The XA-MP bus window only supports non-burst memory read and write operations on the i486™ bus. Byte, word and double word transfers are supported. Burst and I/O operations are not supported by the BIC through the XA-MP bus window.

1.4.1.13 i486™ Bus Byte Enable Combinations

The i486™ bus byte enable combinations supported by the BIC for XA-MP bus window operations are contained in Table 1-16.

Table 1-16 i486™ Data Bus Byte Enables

| Byte Enables | | | |
|---|---|---|---|
| iBE[3]# | iBE[2]# | iBE[1]# | iBE[0]# |
| 1 | 1 | 1 | 0 |
| 1 | 1 | 0 | 0 |
| 1 | 0 | 0 | 0 |
| 0 | 0 | 0 | 0 |
| 1 | 1 | 0 | 1 |
| 1 | 0 | 0 | 1 |
| 0 | 0 | 0 | 1 |
| 1 | 0 | 1 | 1 |
| 0 | 0 | 1 | 1 |
| 0 | 1 | 1 | 1 |

1.4.1.14 XA-MP Bus Window Waveforms

This section provides waveforms for the XA-MP, DBIC/ABIC, and i486™ bus interfaces for XA-MP bus window operations.

1.4.1.14.1 XA-MP Bus Window Read Miss - Ordered Reply

Figure 1-5 illustrates the timing of an XA-MP bus window read miss where the requested XA-MP bus data is returned in-order. The timing does not depict retry or error bus sequences (i.e. a NAKed RCL, etc.).

Figure 1-6 Timing - XA-MP Bus Window Read Miss (In-Order)
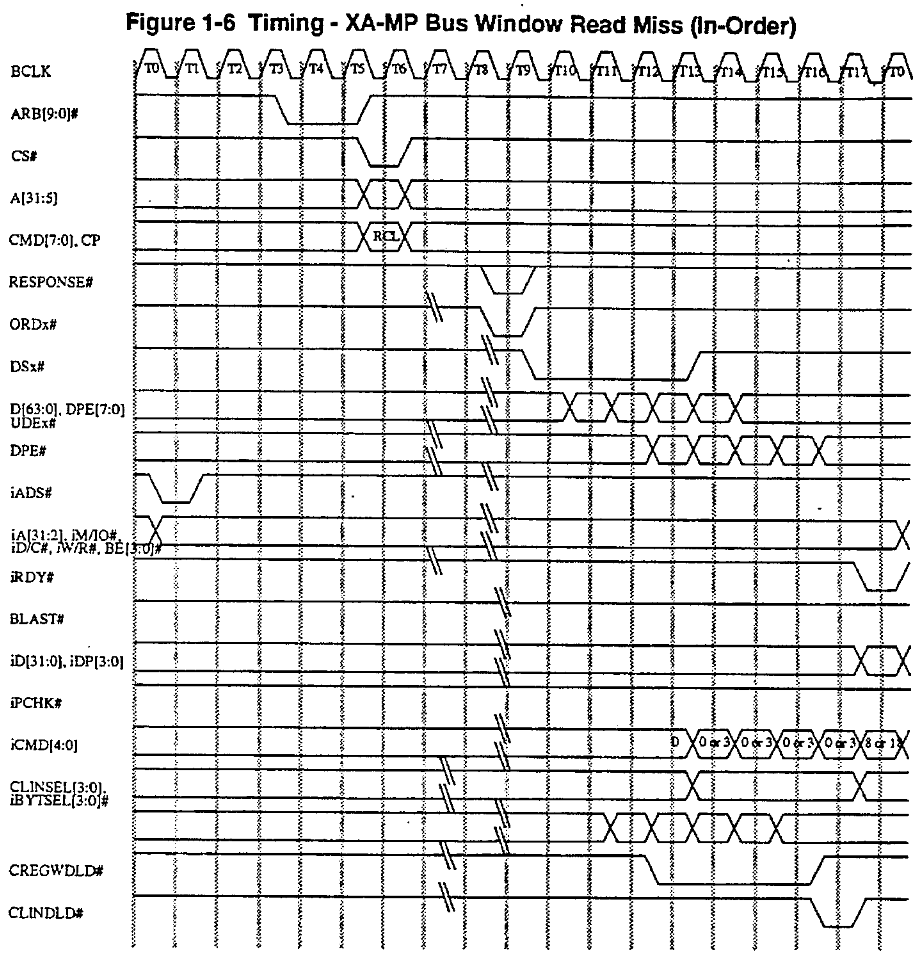
1.4.1.14.2XA-MP Bus Window Read Miss - Out of Order Reply
Figure 1-6 illustrates the timing of an XA-MP bus window read miss where the requested XA-MP bus data is returned out-of-order. The timing does not depict retry or error bus sequences (i.e. a NAKed RCL, etc.).

Figure 1-7 Timing - XA-MP Bus Window Read Miss (Out-of-Order)
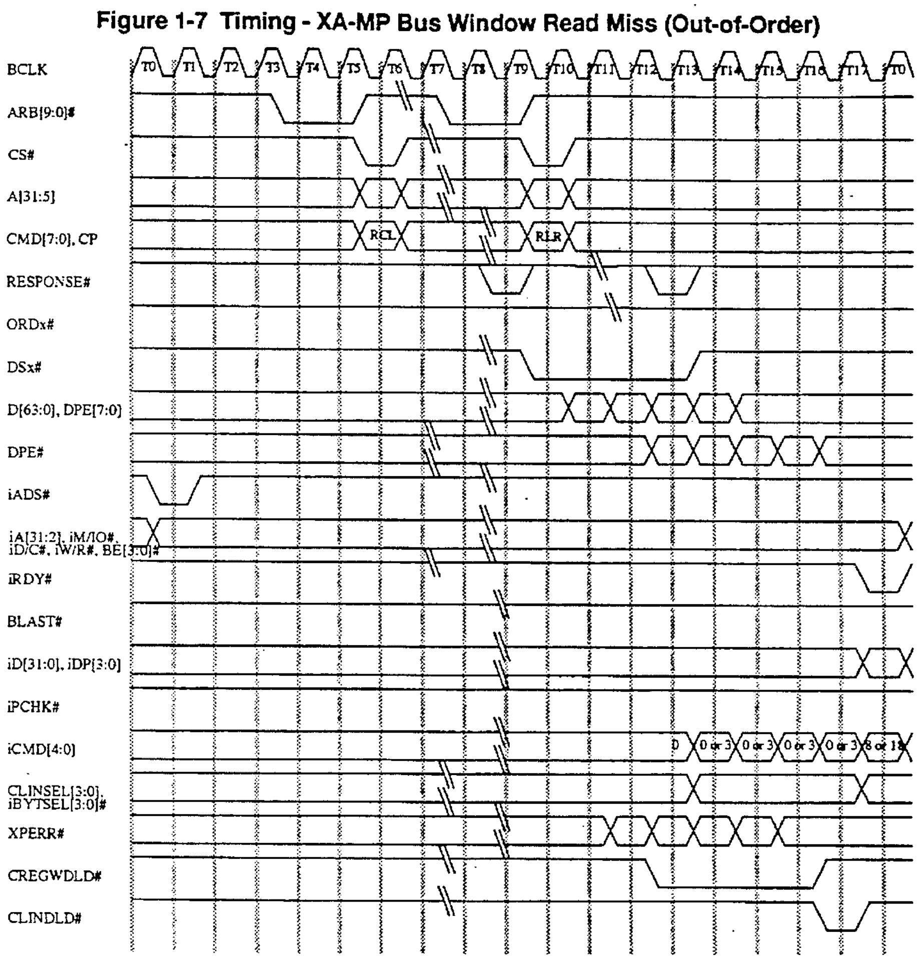
1.4.1.14.3XA-MP Bus Window Read Hit
Figure 1-7 illustrates the timing of an XA-MP bus window read hit. The BIC inserts at least one wait state. No XA-MP bus transactions are performed.

Figure 1-8 Timing - XA-MP Bus Window Read Hit

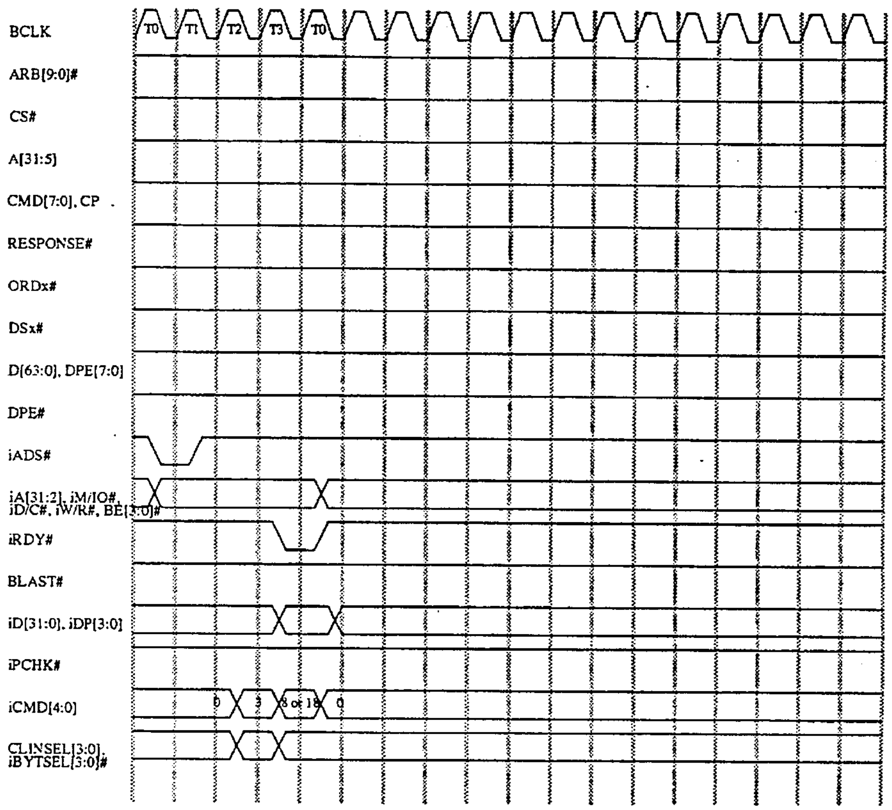

1.4.1.14.4 XA-MP Bus Window Read Miss Replacement

Figure 1-8 illustrates the timing of an XA-MP bus window read miss when the LRU is modified. When the RCL request is successful, the address is loaded into the WBR and the LRU list is modified. The data for the WBR is loaded earlier in the cycle to allow the RCL data to be directly written into the cache when it is available.

The timing does not depict retry or error bus sequences (i.e. a NAKed RCL, etc.).

Figure 1-9 Timing - XA-MP Bus Window Read Miss Replacement
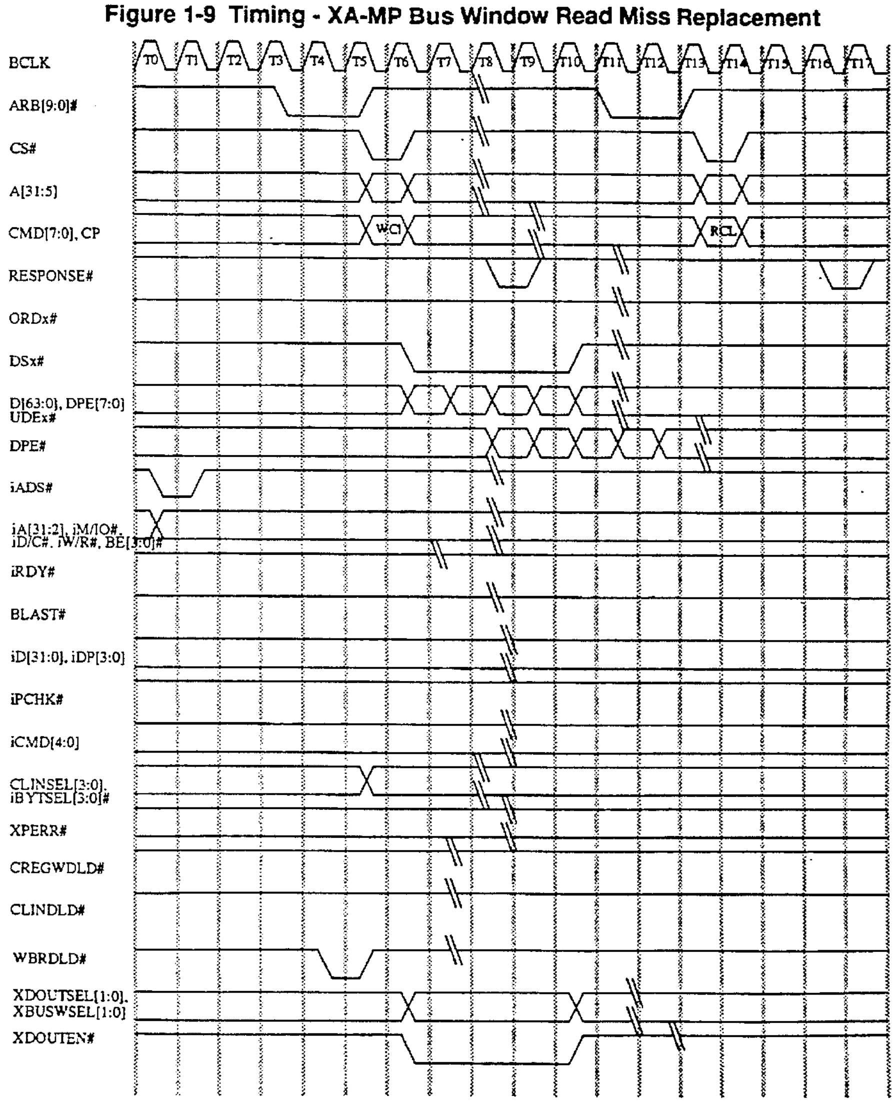

| Specification 60600215 | IM-2 R0.1 EPS-1 | ***DRAFT*** Revision A |
|---|---|---|
Figure 1-9 Timing - XA-MP Bus Window Read Miss Replacement cont...
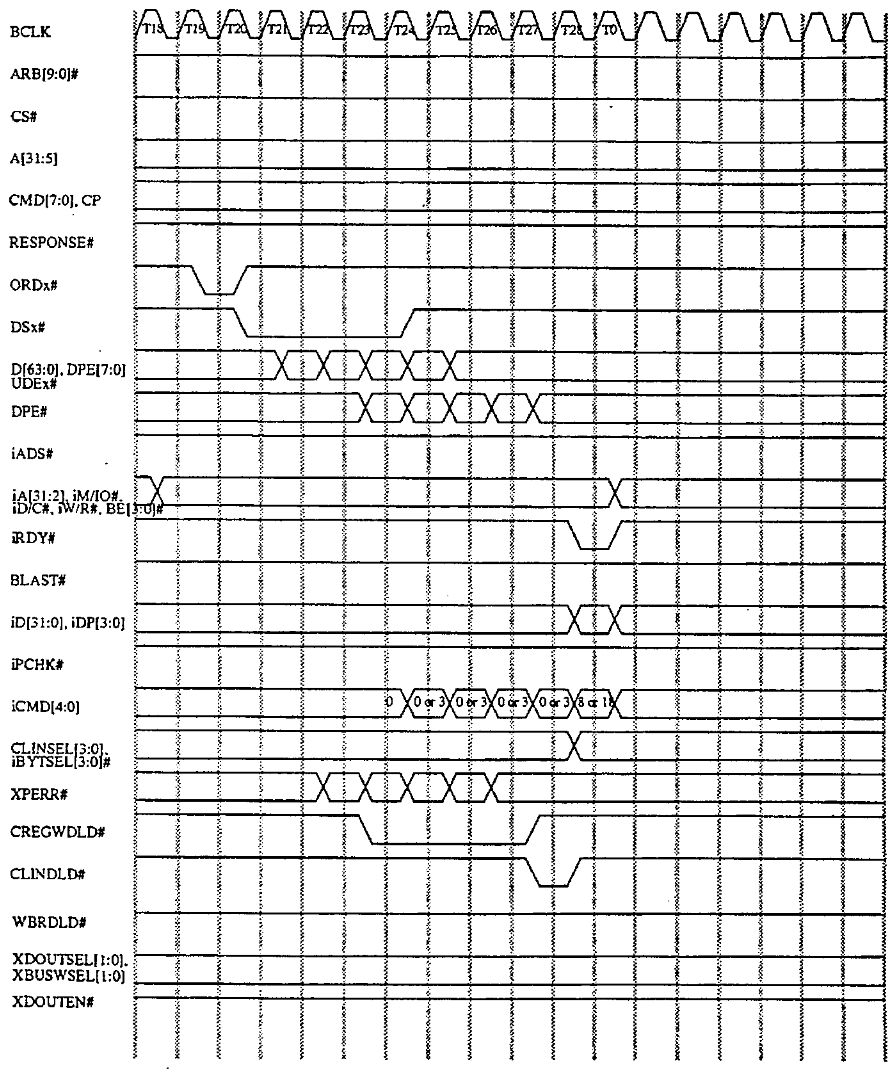
1.4.1.14.5XA-MP Bus Window Write Miss
Figure 1-9 illustrates an XA-MP bus window write miss. The timing does not depict retry or error bus sequences (i.e. a NAKed BICL, etc.).

Figure 1-10 Timing - XA-MP Bus Window Write Miss
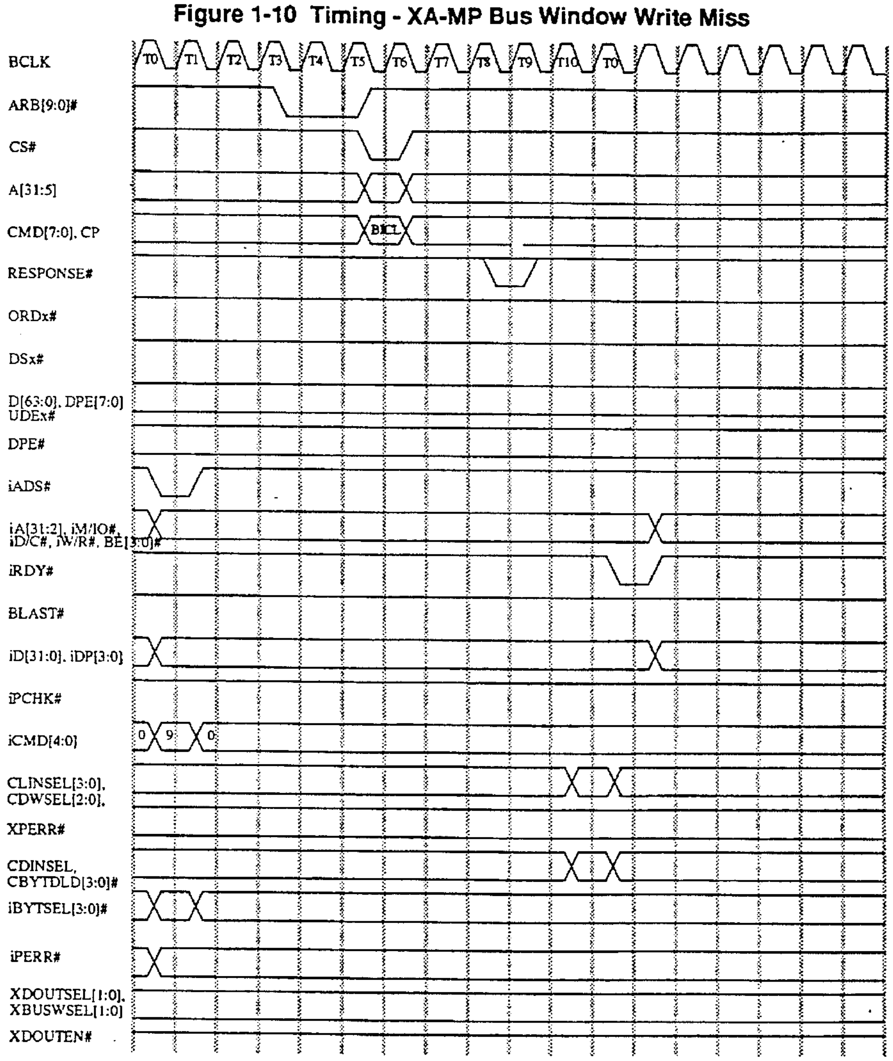
1.4.1.14.6XA-MP Bus Window Write Hit
Figure 1-10 illustrates the timing of a XA-MP bus window write hit. The BIC inserts at least one wait state. No XA-MP bus transactions are performed.

Figure 1-11 Timing - XA-MP Bus Window Write Hit
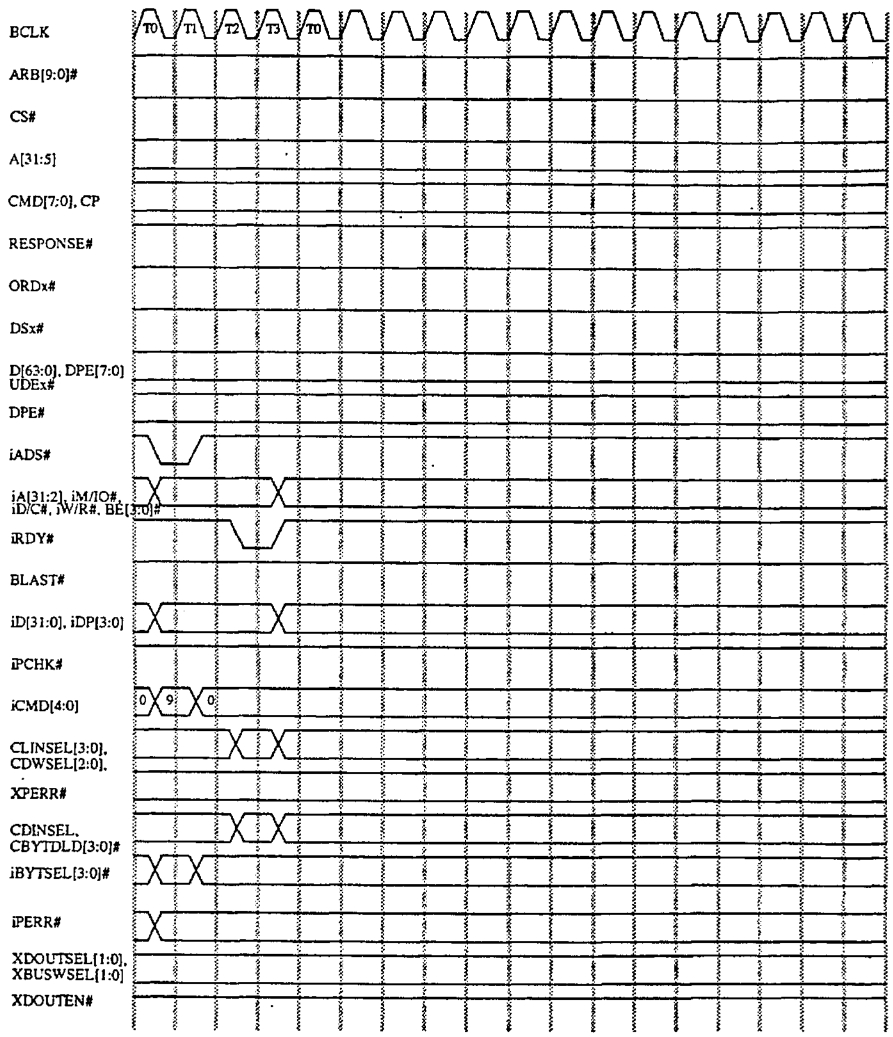

Cache coherency in not supported by the i486™ bus window. All transactions initiated by XA-MP bus requesting agents are I/O or non-cached memory cycles. Any memory resource interfaced to the i486™ bus cannot be cached by XA-MP bus agents.

1.4.2.1 i486™ Bus Window Addressing Mapping

The i486™ bus window supports the following mapping arrangements for XA-MP bus cycles to i486™ bus cycles:

1. XA-MP bus I/O cycles to i486™ bus I/O cycles
2. XA-MP bus memory cycles to i486™ bus memory cycles
3. XA-MP bus memory cycles to i486™ bus I/O cycles

1.4.2.1.1 XA-MP I/O to i486™ I/O

The XA-MP I/O to i486™ I/O window is responsible for mapping XA-MP bus I/O cycles to i486™ bus I/ O cycles. The window is defined through the begin_io and end_io registers. The begin_io register specifies the starting address of the window while the contents of the end_io register defines the ending address of the window. The complete 4 giga-byte XA-MP bus address is decoded by the BIC.

The size of the XA-MP bus I/O to i486™ bus I/O window can range from 16 bytes to 4GB. The window will start on even 16 byte boundaries.

1.4.2.1.2 XA-MP Memory to i486™ Memory

Several windows are provided for mapping XA-MP bus memory cycles to i486™ bus memory cycles. These windows are:

1. One ISA Compatible window
2. Two 8MB relocation windows
3. Two 4MB relocation windows

1.4.2.1.2.1 ISA Window

The ISA compatible window is configured through the ISA_map0 and ISA_map1 registers. These registers are used to define the lowest 16MB address space of the XA-MP bus. Access to the following ISA defined memory regions that may reside on the i486™ bus are controlled through the ISA_map registers:

1. 1MB block granularity for the 9MB to 16MB memory region
2. 16KB block granularity for the BIOS (000f_0000h- 000f_ffffh) memory region
3. 16KB block granularity for the Extended BIOS (000e_0000h - 000e_ffffh) memory region
4. 16KB block granularity for the ISA Expansion Device (000c_0000h - 000d_ffffh) memory region
5. 16KB block granularity for the VGA (000a_0000h - 000b_fffffh) memory region No address translation is performed between the XA-MP and i486™ bus for the ISA-map region.

Shadowing and write protection is provided for the BIOS, Extended BIOS, ISA Expansion Device and VGA memory regions to enable caching for the regions that may contain program code.

ISA_map registers are provided to facilitate "PC" Compatibility. Two registers are used to enable or disable particular address regions (e.g. blocks) within the 16 mega-byte ISA defined address space. Since all program memory (e.g. RAM) will reside on the XA-MP bus, the ISA_map registers are not required to enable/disable these regions.

While the ISA window is intended for use only by a BIC configured in the compatible mode, its use by other BICs in the system is not precluded.

1.4.2.1.2.2Relocatable Windows

The relowin_base register defines the starting address of a 32 mega-byte translation window. This window provides up to four relocatable memory regions in which XA-MP bus memory cycles are translated to i486™ bus memory cycles at different addresses. These relocatable windows facilitate mapping of specific 4MB or 8MB XA-MP bus memory address blocks to any 4MB or 8MB blocks within the 4GB i486™ bus memory address space. Each of the four windows can be individually enabled or disabled.

This scheme allows the lower regions of the i486™ bus address space to be used while not conflicting with contiguous XA-MP bus system memory. Also, i486™ devices can be mapped into the upper regions of XA-MP bus memory space.However, address blocks mapped to one of these regions are not accessible through the XA-MP bus window.

The XA-MP bus memory address of the translation window can be configured to reside on any even 32MByte boundary within the 4GB memory map. If an XA-MP access hits within first 8 Mbytes of the 32Mbyte translation window, the i486™ bus address used is determined by the contents of the 8MB_rel1 register, as illustrated in Table 1-17.

Table 1-17 i486 Window Relocation Windows

| relowin_base register offset | XA-MP Bus A[24:20] | i486™ Bus Relocation Register |
|---|---|---|
| 00MB - 07MB | 00-07h | 8MB_rel1 |
| 08MB - 15MB | 08-0fh | 8MB_rel0 |
| 16MB - 19MB | 10-13h | 4MB_rel1 |
| 20MB - 23MB | 14-17h | 4MB_rel0 |
| 24MB - 31MB | 18-1fh | Reserved |

1.4.2.1.3 XA-MP Memory to i486™ I/O

This window is responsible for mapping XA-MP bus memory cycles to i486™ bus I/O cycles. The purpose of this window is to provide a migration path from I/O mapped to memory mapped expansion bus modules.

The window is defined through the begin_con and end_con registers. The begin_con register specifies the starting address of the window while the contents of the end_con register defines the ending address of the window. The complete 4 giga-byte XA-MP bus address is decoded by the BIC.

The size of the XA-MP bus memory to i486™ bus I/O window can range from 16 bytes to 64GB. The window will start on even 16 byte boundaries.

1.4.2.2 i486™ Bus Window Queues

A request queue and a response queue are provided by the i486™ bus window. The request queue is used to store memory and I/O requests from the XA-MP bus until they can be processed either by the BIC internally or the i486™ bus. This queue holds both i486™ bus window transactions and accesses to the software visible registers. The response queue is used to store the requested data until the XA-MP bus is available.

When the BIC accepts a write request, the XA-MP bus requesting agent is acknowledged and the data is placed in the request queue. The transaction is completed when the BIC generates the necessary cycle(s) internally or on the i486™ bus.

When the BIC accepts a read request, the XA-MP bus requesting agent is acknowledged and the BIC generates the necessary cycle(s) internally or on the i486™ bus to obtain the requested data. The data is then placed in the response queue and the BIC generates an out-of-order XA-MP bus cycle.

If the request queue is full or the i486™ bus is in use by another master, the BIC will negative acknowledge all read and write requests, causing the XA-MP bus requesting agents to retry the request.

In order to avoid deadly embraces, the request and response queues are emptied and no XA-MP bus requests will be accepted when the i486™ bus has been granted to another master. Therefore, the depth of the i486™ bus window request queue is dependent on the minimum time-out requirement of an i486™ bus master. To provide flexibility in the design of I/O bridges, the depth of the request queue can be configured in the BIC command/status register to have a depth of one, two, three or four. The response queue has a singular fixed depth of one.

1.4.2.3 XA-MP Bus Interface

During i486™ bus window operations the BIC operates as an XA-MP bus responder to complete transactions requested through the XA-MP bus. The BIC conforms to the XA-MP bus interface as defined in the "XA-MP Bus Architecture Specification."

1.4.2.3.1 XA-MP Bus Arbitration

When performing i486™ bus window operations, the BIC only arbitrates for the XA-MP bus to provide out of order responses. The responses are Read Word Response(RWR) and IOWR(I/O Write Response).

The BIC arbitrates for the XA-MP bus as described in Section 1.4.2.5.

1.4.2.3.2 XA-MP Bus Commands

The subset of XA-MP bus commands generated by the BIC for i486™ bus window operations are provided in Table 1-18.

Table 1-18 i486 Bus Window XA-MP Bus Commands

| Command | Type | Function |
|---|---|---|
| RBW | Memory | Read Bus Word. RBW uses a single address to read data up to the width of the XA-MP Bus (i.e. 64 Bits) from the i486™ bus memory space or the software visible registers. |
| RBWL | Locking | Read Bus Word Lock. This command is identical to RBW and additionally results in the BIC performing a bus based lock on the i486™ bus. Locked operations to the software visible registers are supported by the BIC. |
| WBW | Memory | Write Bus Word. WBW uses a single address to write data up to the width of the XA-MP bus (i.e. 64 bits) to the i486™ bus memory space or the software visible registers. |
| WBWL | Locking | A Write Bus Word Lock. This command is identical to WBW and additionally results in the BIC performing a bus based lock on the i486™ bus. Locked operations to the software visible registers are supported by the BIC. |
| IOR | I/O | I/O Read. Uses a single address to read data up to the width of the XA-MP Bus (i.e. 64 Bits) from the i486™ bus I/O space. |
| IOW | I/O | I/O Write. Uses a single address to write data up to the width of the XA-MP bus (i.e. 64 bits) to the i486™ bus I/O space. |
| IOWR | Response | I/O Write Response. This XA-MP bus address only cycle indicates to the appropriate XA-MP bus requester that the IOW has been completed. |
| RWR | Response | Read Word Response. This XA-MP bus cycle is an out-of-order reply by the BIC to provide the data requested by an XA-MP bus requester (e.g. IOR, RBW, or RBWL). |
| INTA | PC Compatible | Interrupt Acknowledge. This command is used by an XA-MP bus requester to acquire an interrupt vector directly from the interrupting source. This function is provided for PC compatibility. The BIC will only respond to an INTA when configured for compatible mode. |

1.4.2.3.3 XA-MP Bus Byte Enable Combinations

The XA-MP bus byte enable combinations accepted on the XA-MP bus ~~for~~ i486™ bus window operations are contained in Table 1-19.

Table 1-19 XA-MP Bus Data Bus Byte Enables

| Byte Enables | | | | | | | |
|---|---|---|---|---|---|---|---|
| A[15] | A[14] | A[13] | A[12] | A[11] | A[10] | A[9] | A[8] |
| 1 | 1 | 1 | 0 | 0 | 0 | 0 | 0 |
| 1 | 1 | 0 | 0 | 0 | 0 | 0 | 0 |
| 1 | 0 | 0 | 0 | 0 | 0 | 0 | 0 |
| 1 | 1 | 0 | 1 | 0 | 0 | 0 | 0 |
| 1 | 0 | 0 | 1 | 0 | 0 | 0 | 0 |
| 0 | 0 | 0 | 1 | 0 | 0 | 0 | 0 |
| 1 | 0 | 1 | 1 | 0 | 0 | 0 | 0 |
| 0 | 0 | 1 | 1 | 0 | 0 | 0 | 0 |
| 0 | 1 | 1 | 1 | 0 | 0 | 0 | 0 |
| 0 | 0 | 0 | 0 | 1 | 1 | 1 | 0 |
| 0 | 0 | 0 | 0 | 1 | 1 | 0 | 0 |
| 0 | 0 | 0 | 0 | 1 | 0 | 0 | 0 |
| 0 | 0 | 0 | 0 | 1 | 1 | 0 | 1 |
| 0 | 0 | 0 | 0 | 1 | 0 | 0 | 1 |
| 0 | 0 | 0 | 0 | 0 | 0 | 0 | 1 |
| 0 | 0 | 0 | 0 | 1 | 0 | 1 | 1 |
| 0 | 0 | 0 | 0 | 0 | 0 | 1 | 1 |
| 0 | 0 | 0 | 0 | 0 | 1 | 1 | 1 |
| 1 | 1 | 1 | 0 | 1 | 1 | 1 | 1 |
| 1 | 1 | 0 | 0 | 1 | 1 | 1 | 1 |
| 1 | 0 | 0 | 0 | 1 | 1 | 1 | 1 |
| 1 | 1 | 0 | 1 | 1 | 1 | 1 | 1 |
| 1 | 0 | 0 | 1 | 1 | 1 | 1 | 1 |
| 0 | 0 | 0 | 1 | 1 | 1 | 1 | 1 |
| 1 | 0 | 1 | 1 | 1 | 1 | 1 | 1 |

1.4.1.14.7XA-MP Bus Window Write Miss Replacement

Figure 1-11 illustrates the timing of an XA-MP bus window write miss when the LRU is modified.When the RCL request is successful, the address is loaded into the WBR and the LRU list is modified.The data for the WBR is loaded earlier in the cycle to allow the RCL data to be directly written into the cache when it is available. The timing does not depict retry or error bus sequences (i.e. a NAKed BICL, etc.).

Specification 60600215 IM-2 R0.1 EPS-1 *DRAFT* Revision A
Figure 1-12 Timing - XA-MP Bus Window Write Miss Replacement
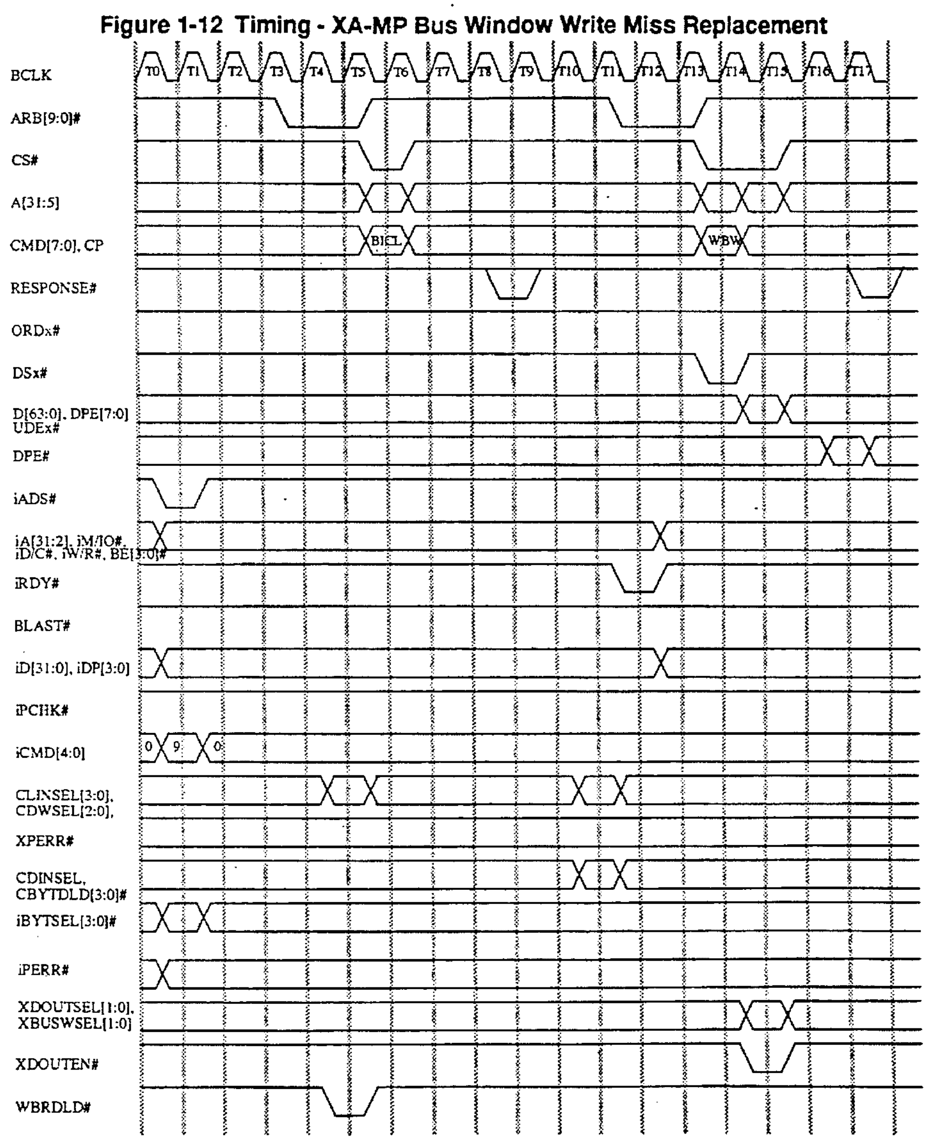

1.4.1.14.8XA-MP Bus Window Memory Intervention

Figure 1-12 illustrates the timing of an XA-MP bus snoop hit to a modified line. The data is replaced with a single WBW (i.e. the BIC only modified the first eight bytes of the line that is to be written to memory). For an example of a WCL replacement refer to Figure 1-8. The timing does not depict retry or error bus sequences (i.e. a NAKed WBW, etc.).

Figure 1-13 Timing - XA-MP Bus Window Memory Intervention

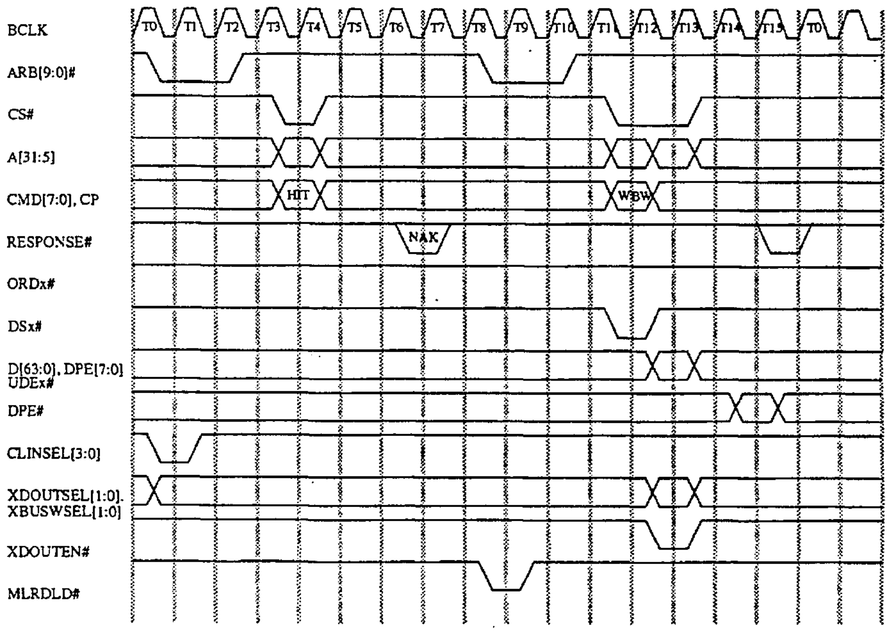

1.4.1.14.9XA-MP Bus Window Locking Operation

The BIC supports locking operations through the XA-MP Bus Window. A read/write locked operation is initiated by a i486™ bus requester by performing a memory read followed by a write operation with the iLOCK# signal asserted on the i486™ bus through both operations. The locking operation results in a bus lock on both the XA-MP and i486™ bus.

Should the locked memory operation result in a BIC cache hit, the effected line will be written back to XA-MP bus memory before the lock operation on the XA-MP bus is performed. Both the XA-MP and i486™ bus will remain locked until the iLOCK# signal is de-asserted.Therefore, a number of locked memory operations can be performed.

Figure 1-13 illustrates the timing of a XA-MP bus window locking operation that does not result in a cache hit. The timing is does not depict retry or error bus sequences (i.e. a NAKed RBWL/WBWL, a cancelled RBWL/WBWL, etc.).

Figure 1-14 Timing - XA-MP Bus Window Locking Operation
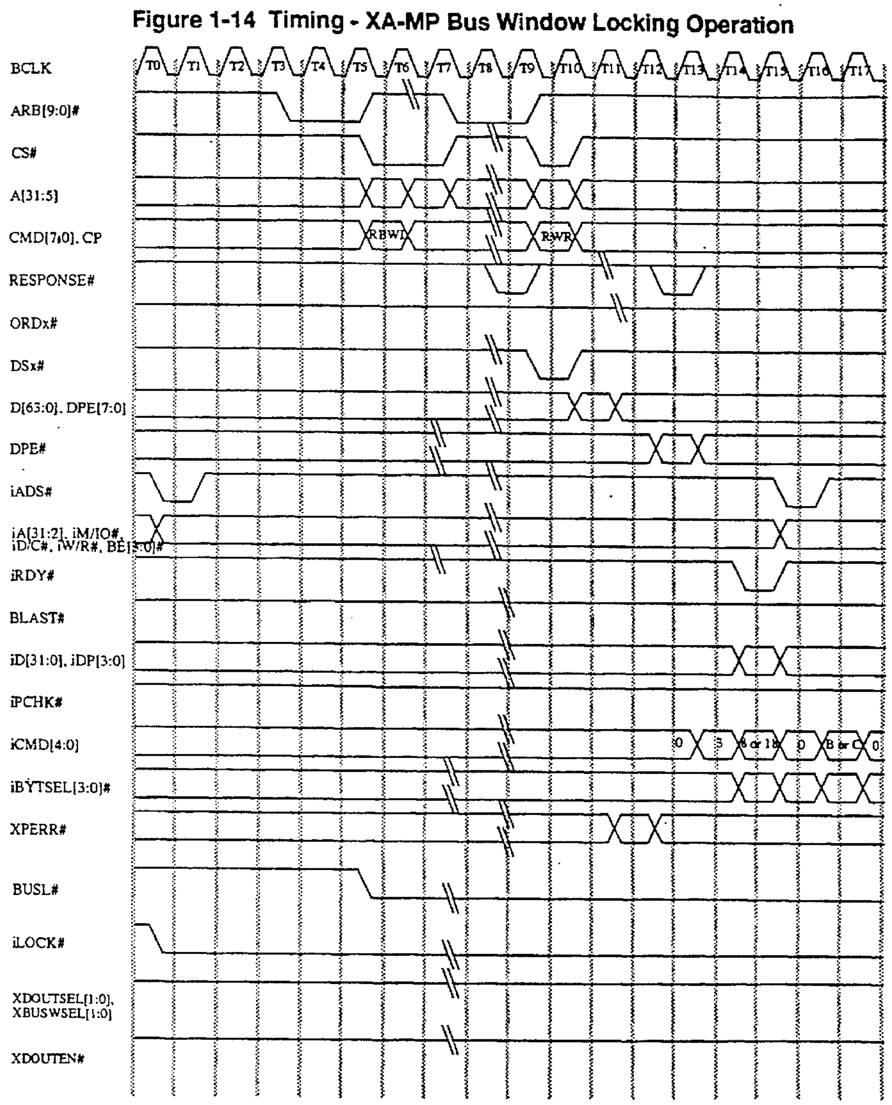

Figure 1-14 Timing - XA-MP Bus Window Locking Operation cont...
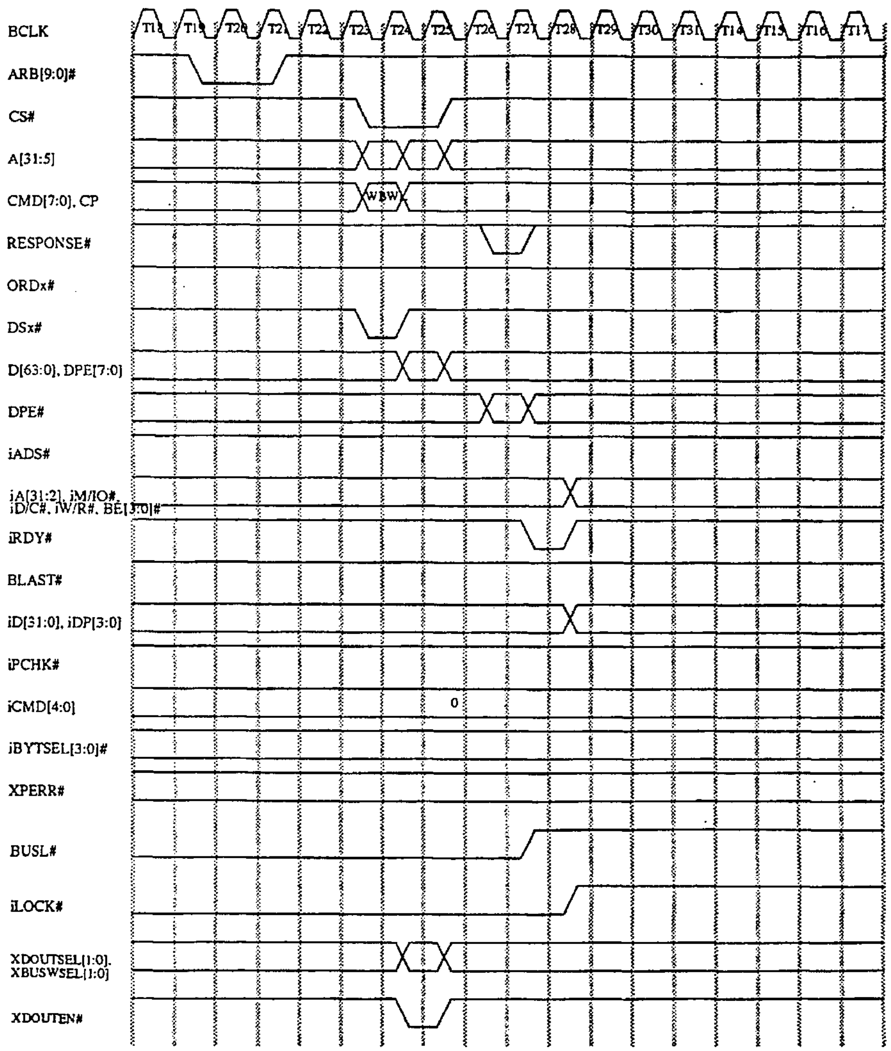
1.4.2 i486™ Bus Window
Devices on the XA-MP bus access i486™ bus resources through the i486™ bus window. This section describes the XA-MP and i486™ bus interfaces used during i486™ bus window operations.

Table 1-19 XA-MP Bus Data Bus Byte Enables

| Byte Enables | | | | | | | |
|---|---|---|---|---|---|---|---|
| A[15] | A[14] | A[13] | A[12] | A[11] | A[10] | A[9] | A[8] |
| 0 | 0 | 1 | 1 | 1 | 1 | 1 | 1 |
| 0 | 1 | 1 | 1 | 1 | 1 | 1 | 1 |
| 1 | 1 | 1 | 1 | 1 | 1 | 1 | 0 |
| 1 | 1 | 1 | 1 | 1 | 1 | 0 | 0 |
| 1 | 1 | 1 | 1 | 1 | 0 | 0 | 0 |
| 1 | 1 | 1 | 1 | 1 | 1 | 0 | 1 |
| 1 | 1 | 1 | 1 | 1 | 0 | 0 | 1 |
| 1 | 1 | 1 | 1 | 0 | 0 | 0 | 1 |
| 1 | 1 | 1 | 1 | 1 | 0 | 1 | 1 |
| 1 | 1 | 1 | 1 | 0 | 0 | 1 | 1 |
| 1 | 1 | 1 | 1 | 0 | 1 | 1 | 1 |
| 0 | 0 | 0 | 0 | 0 | 0 | 0 | 0 |
| 0 | 0 | 0 | 0 | 1 | 1 | 1 | 1 |
| 1 | 1 | 1 | 1 | 0 | 0 | 0 | 0 |

1.4.2.4 i486™ Bus Interface

During i486™ bus window operations the BIC operates as an i486™ requester to complete transactions requested by XA-MP bus requesters.

1.4.2.5 i486™ Bus Arbitration

Refer to Section 1.4.1.11.1 for the details of i486™ bus arbitration.

1.4.2.6 i486™ Bus Commands

The BIC generates the following i486™ bus cycles for the i486™ bus window.

1. Memory Read
2. Memory Write
3. I/O Read
4. I/O Write
5. Interrupt Acknowledge The BIC does not generate any burst cycles. Only non-burst (minimally 2-2) cycles are generated by the BIC. The non-assertion of the iRDY# signal indicates the insertion of wait states by the i486™ bus responder.

Double word, word and byte operations as well as dynamic bus sizing operations are supported by the BIC.

1.4.2.7 i486™ Bus Byte Enable Configurations

Refer to Table 1-20 for the byte enable combinations generated on the i486™ bus for i486™ bus window operations.

Table 1-20 i486™ Data Bus Byte Enables

| Byte Enables | | | |
|---|---|---|---|
| iBE[3]# | iBE[2]# | iBE[1]# | iBE[0]# |
| 1 | 1 | 1 | 0 |
| 1 | 1 | 0 | 0 |
| 1 | 0 | 0 | 0 |
| 0 | 0 | 0 | 0 |
| 1 | 1 | 0 | 1 |
| 1 | 0 | 0 | 1 |
| 0 | 0 | 0 | 1 |
| 1 | 0 | 1 | 1 |
| 0 | 0 | 1 | 1 |
| 0 | 1 | 1 | 1 |

1.4.2.8 i486™ Bus Window Waveforms

This section provides waveforms for the XA-MP, DBIC/ABIC, and i486™ bus interfaces for i486™ bus window operations.

1.4.2.8.1 i486™ Bus Window Memory or I/O Read - 64 Bit

A aligned bus word XA-MP bus RBW, IOR or RBWL operation results in the BIC generating two double word operations on the i486™ bus unless a byte sizing is requested by the i486™ bus responder. The lower double word is requested first on the i486™ bus.

Figure 1-14 illustrates the timing of a i486™ bus window 64 bit memory or I/O read where no wait states are inserted by the i486™ bus responder. The requested data will be returned out-of-order by the BIC. The timing does not depict retry or error bus sequences (e.g. a NAKed RBW, a cancelled RBW, etc.).

Specification 60600215 IM-2 R0.1 EPS-1 *DRAFT* Revision A
Figure 1-15 Timing - i486™ Bus Window Memory or I/O Read - 64 Bit
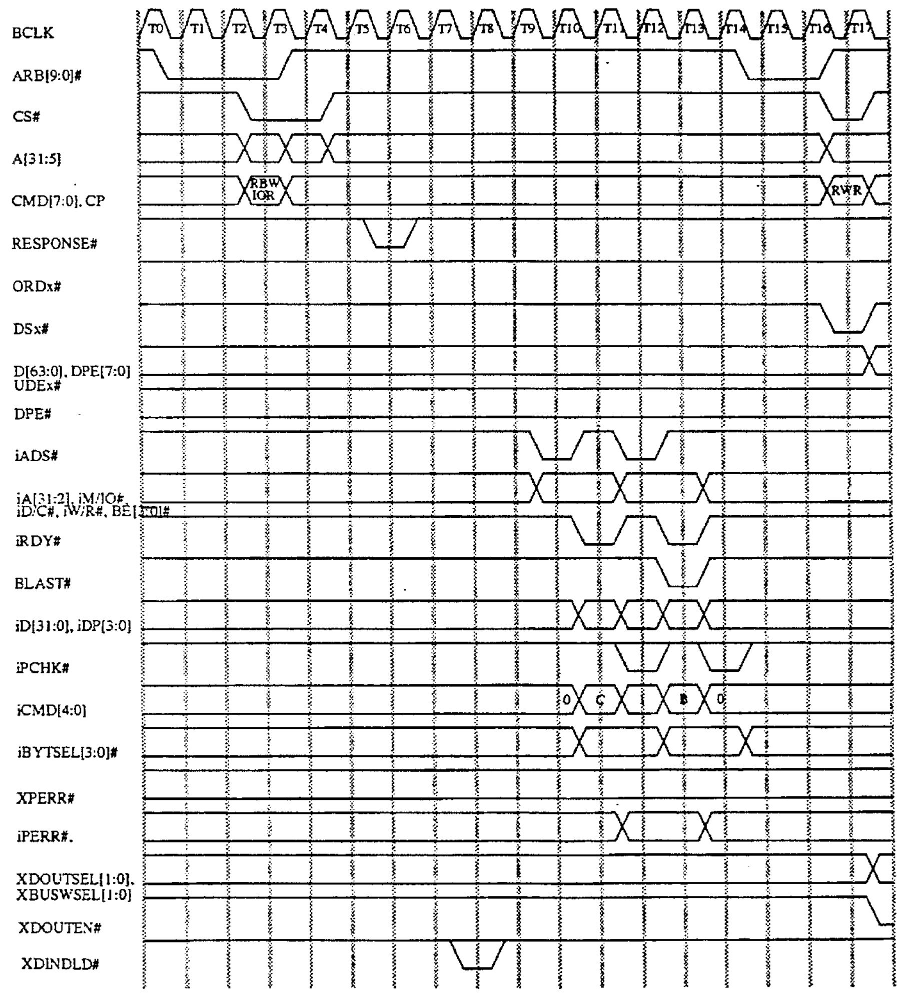

Figure 1-15 Timing - - i486™ Bus Window Memory or I/O Read - 64 Bit cont...
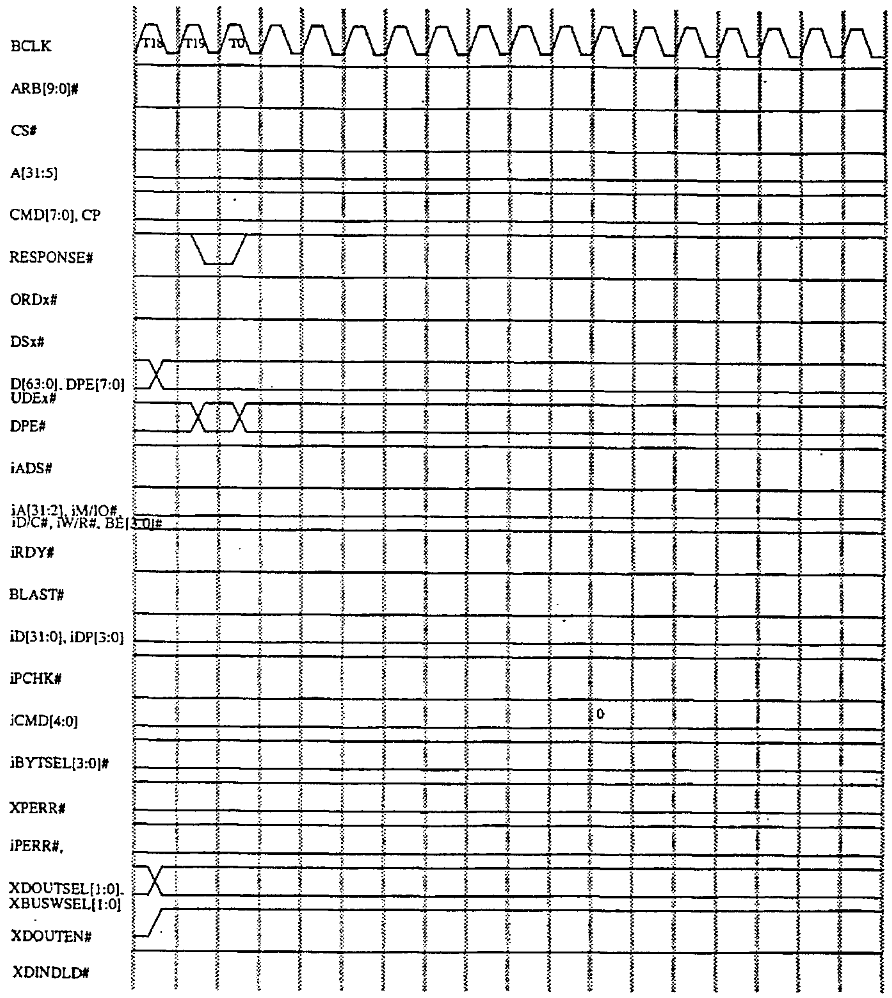

1.4.2.8.2 i486™ Bus Window Memory Write - 64 Bit

A aligned bus word XA-MP bus WBW or WBWL operations results in the BIC generating two double word operations on the i486™ bus unless a byte sizing is requested by the i486™ bus responder. The lower double word is written first on the i486™ bus.

Figure 1-15 illustrates the timing of a i486™ bus window 64 bit memory write where no wait states are inserted by the i486™ bus responder. The timing does not depict retry or error bus sequences (e.g. a NAKed WBW, a cancelled WBW, etc.).

Figure 1-16 Timing - i486™ Bus Window Memory Write - 64 Bit

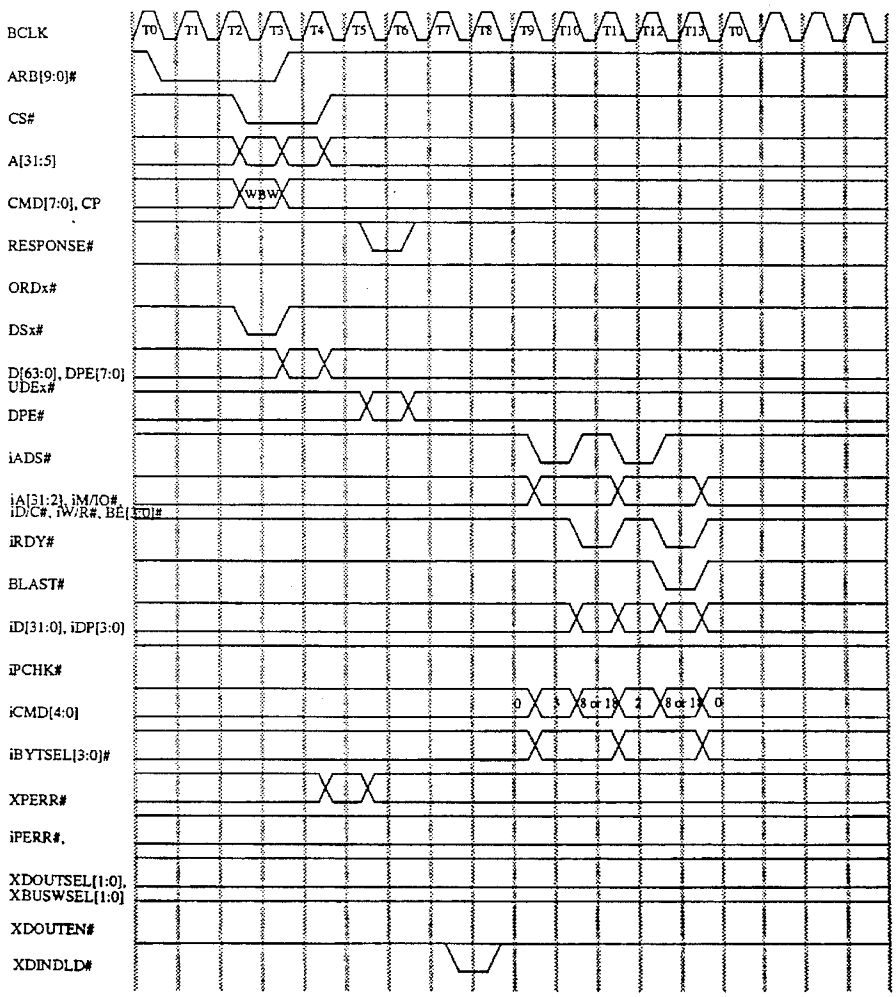

1.4.2.8.3 i486™ Bus Window I/O Write - 64 Bit

A aligned bus word XA-MP bus IOW operation results in the BIC generating two double word operations on the i486™ bus unless a byte sizing is requested by the i486™ bus responder. The lower double word is written first on the i486™ bus. Unlike the XA-MP bus WBW command the IOW returns a response (i.e. IOWR) that indicates data acceptance by the i486™ bus addressed device (i.e. non-posted write operation).

Figure 1-16 illustrates the timing of a i486™ bus window 64 bit I/O write where no wait states are inserted by the i486™ bus responder. The timing does not depict retry or error bus sequences (e.g. a NAKed IOW, a cancelled IOW, etc.).

Figure 1-17 Timing - i486™ Bus Window I/O Write - 64 Bit
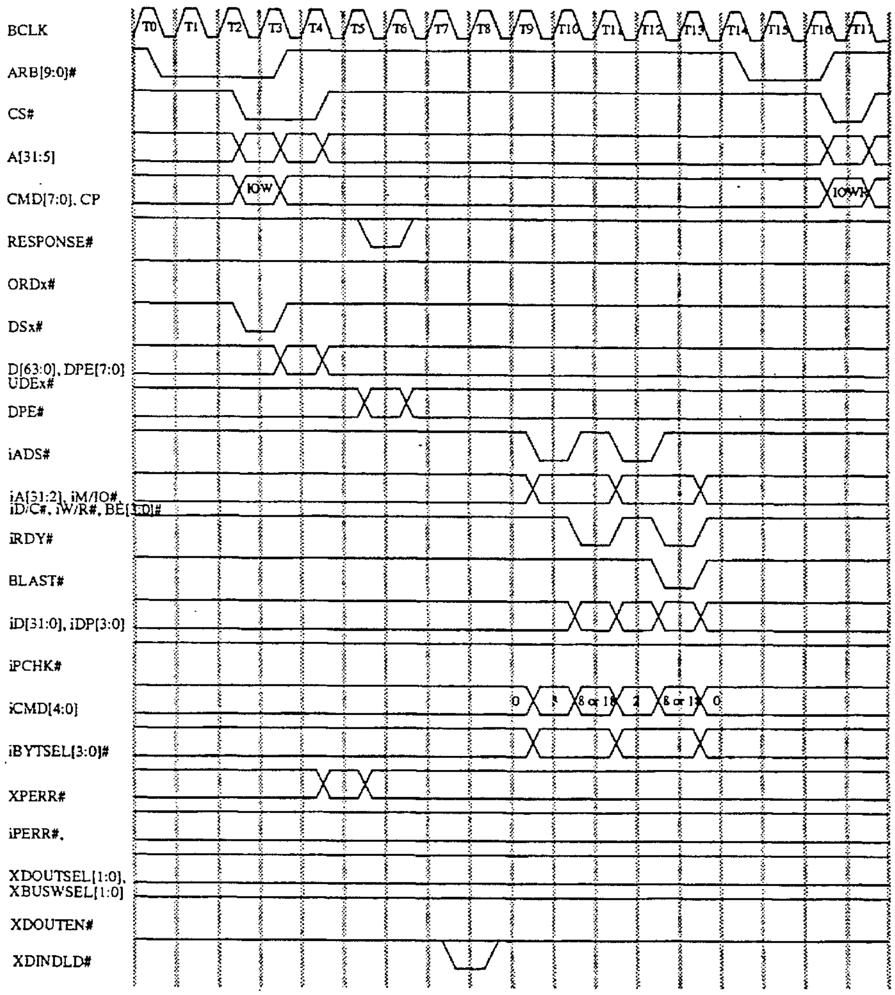

Figure 1-17 Timing - i486™ Bus Window I/O Write - 64 Bit cont...
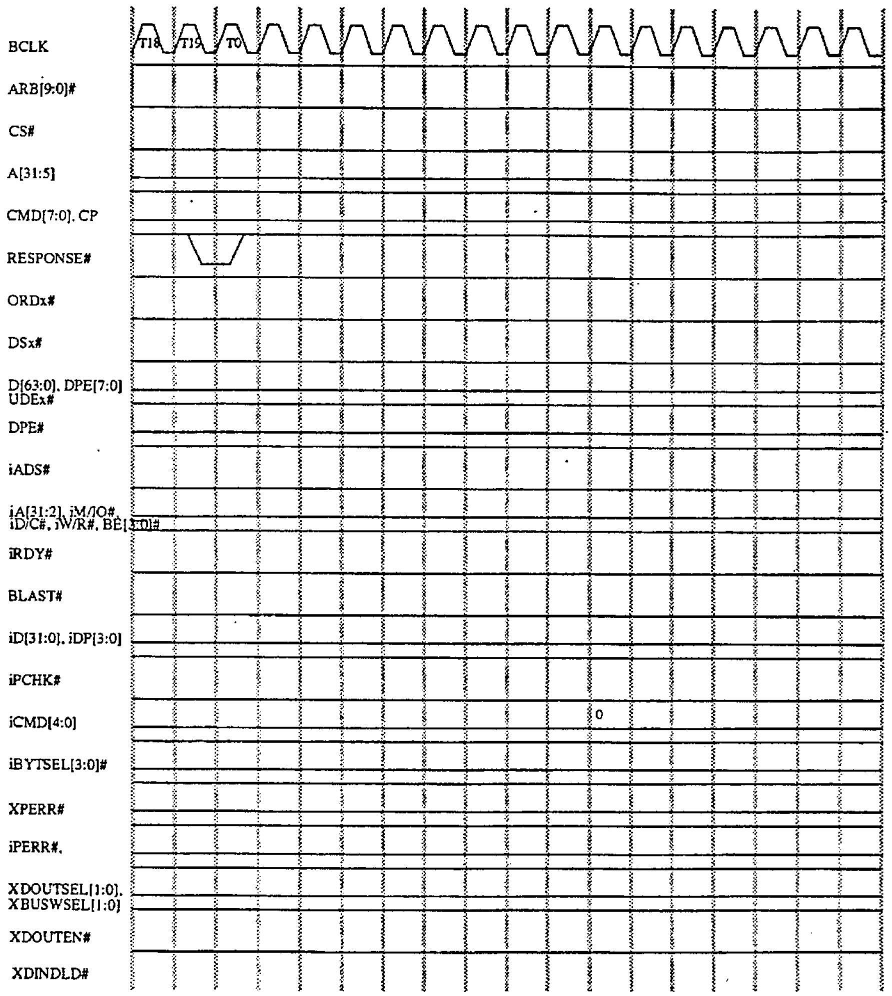
1.4.2.8.4 i486™ Bus Window Memory or I/O Read - 32/16/8 Bit
A aligned double word, word, byte XA-MP bus RBW, IOR or RBWL operation results in the BIC generating a single cycle on the i486™ bus unless a byte sizing is requested by the i486™ bus responder.

Figure 1-17 illustrates the timing of a i486™ bus window 32/16/8 bit memory or I/O read where no wait states are inserted by the i486™ bus responder. The requested data will be returned out-of-order by the BIC. The timing does not depict retry or error bus sequences (e.g. a NAKed RBW, a cancelled RBW, etc.).
Figure 1-18 Timing - i486™ Bus Window Memory or I/O Read - 32/16/8 Bit
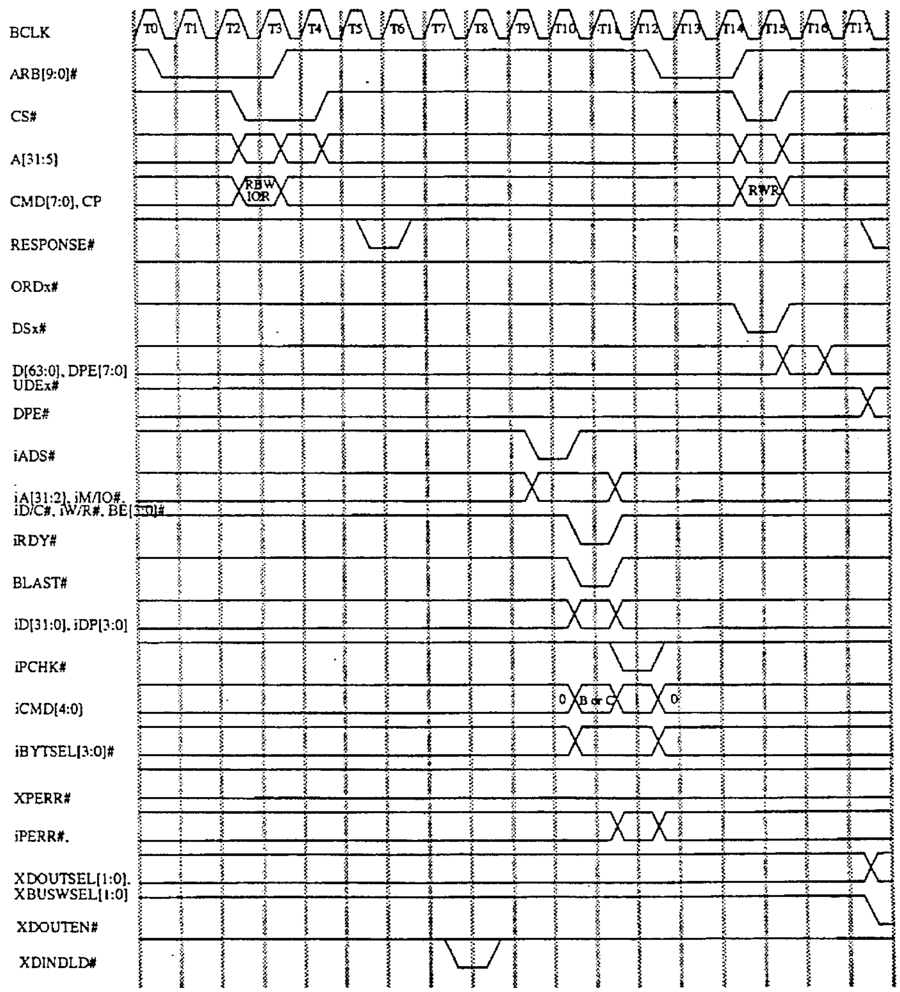

1.4.2.8.5 i486™ Bus Window Memory Write - 32/16/8 Bit

A aligned double word, word or byte XA-MP bus WBW or WBWL operations results in the BIC generating a single cycle on the i486™ bus unless a byte sizing is requested by the i486™ bus responder.

Figure 1-18 illustrates the timing of a i486™ bus window 32/16/8 bit memory write where no wait states are inserted by the i486™ bus responder. The timing does not depict retry or error bus sequences (e.g. a NAKed WBW, a cancelled WBW, etc.).

Figure 1-19 Timing - i486™ Bus Window Memory Write - 32/16/8 Bit

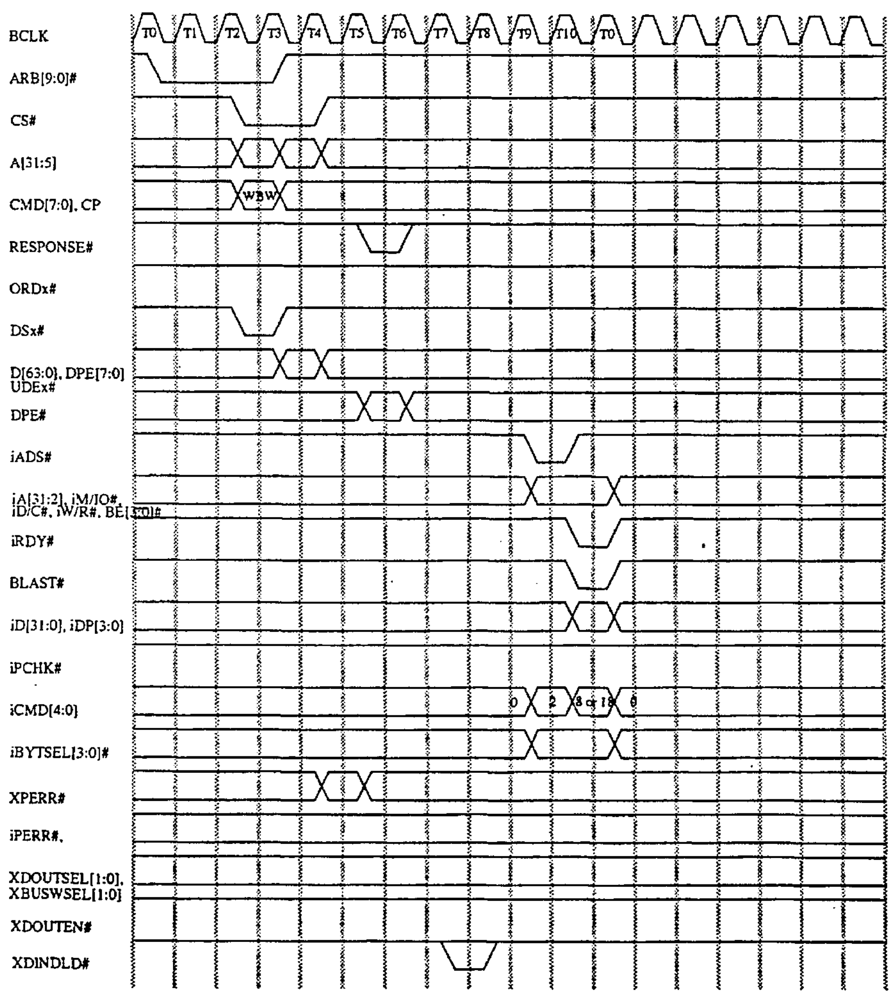

1.4.2.8.6 i486™ Bus Window I/O Write - 32/16/8 Bit

A aligned double word, word or byte XA-MP bus IOW operation results in the BIC generating a single cycle on the i486™ bus unless a byte sizing is requested by the i486™ bus responder. Unlike the XA-MP bus WBW command the IOW returns a response (i.e. IOWR) that indicates data acceptance by the i486™ bus addressed device (i.e. non-posted write operation).

Figure 1-19 illustrates the timing of a i486™ bus window 64 bit I/O write where no wait states are inserted by the i486™ bus responder. The timing does not depict retry or error bus sequences (e.g. a NAKed IOW, a cancelled IOW, etc.).

Figure 1-20 Timing - i486™ Bus Window I/O Write - 32/16/8 Bit

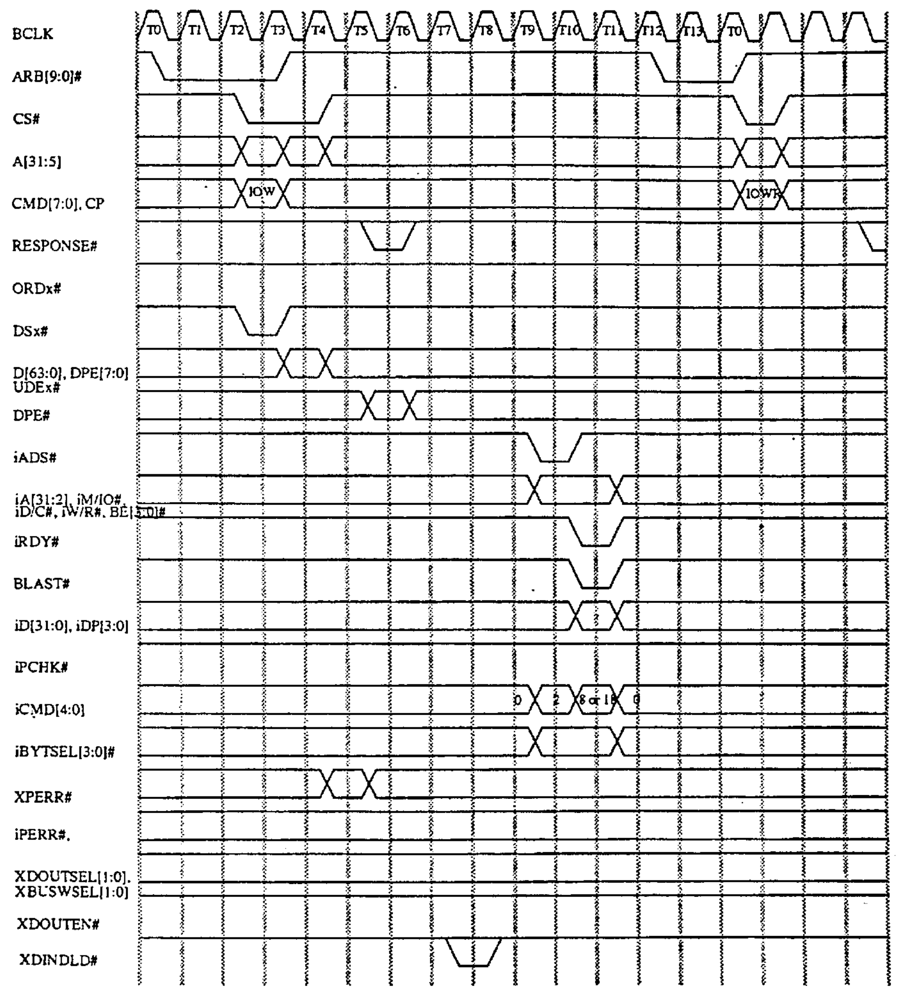

1.4.2.8.7 i486™ Bus Window Dynamic Bus Sizing

The BIC supports both 16 and 8 bit external busses through the iBS16# and iBS8# signals. iBS16# and BS8# allow the devices on the i486™ bus to specify, on a cycle by cycle basis, whether the addressed component can supply 8, 16 or 32 bits. If both iBS16# and iBS8# are asserted for any bus cycle, the BIC will respond as if only iBS8# were active.

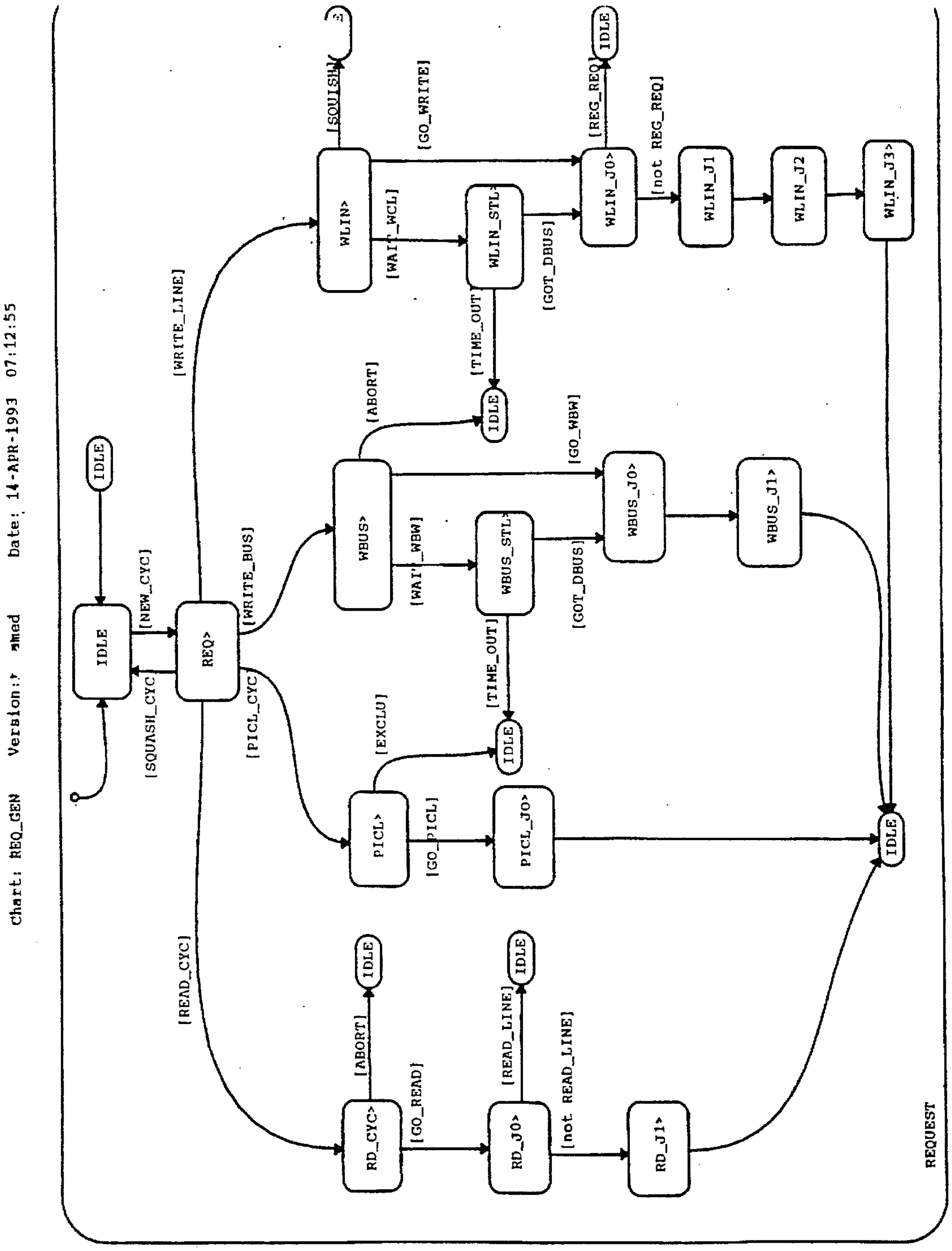
Chart: REQ_GEN
Date: 14-APR-1993 07:12:55
IDLE
[NEW_CYC]
REQ>
[SQUASH_CYC]
[WRITE_LINE]
[WRITE_BUS]
[PICL_CYC]
[READ_CYC]
WLIN>
[SQUISH]
[GO_WRITE]
[WAIT_WCL]
WLIN_STL
[TIME_OUT]
[GOT_DBUS]
WLIN_J0>
[REG_REQ]
[not REG_REQ]
WLIN_J1
WLIN_J2
WLIN_J3>
WBUS>
[ABORT]
[GO_WBW]
[WAIT_WBW]
WBUS_STL
WBUS_J0>
WBUS_J1>
PICL>
[EXCLU]
[GO_PICL]
PICL_J0>
RD_CYC>
[GO_READ]
RD_J0>
[READ_LINE]
[not READ_LINE]
RD_J1>
REQUEST Asserting the iBS16# or iBS8# signal can result in the BIC generating multiple i486™ bus cycles to complete the requested XA-MP bus operations. The BIC will assert iBLAST# on the last i486™ bus cycle.

Figure 1-20 illustrated a 16 bit XA-MP write operation where a i486™ bus device asserts iBS#8. The timing does not depict retry or error bus sequences (e.g. a NAKed RBW, a cancelled RBW, etc.).

Figure 1-21 Timing - 486™ Bus Window Dynamic Bus Sizing

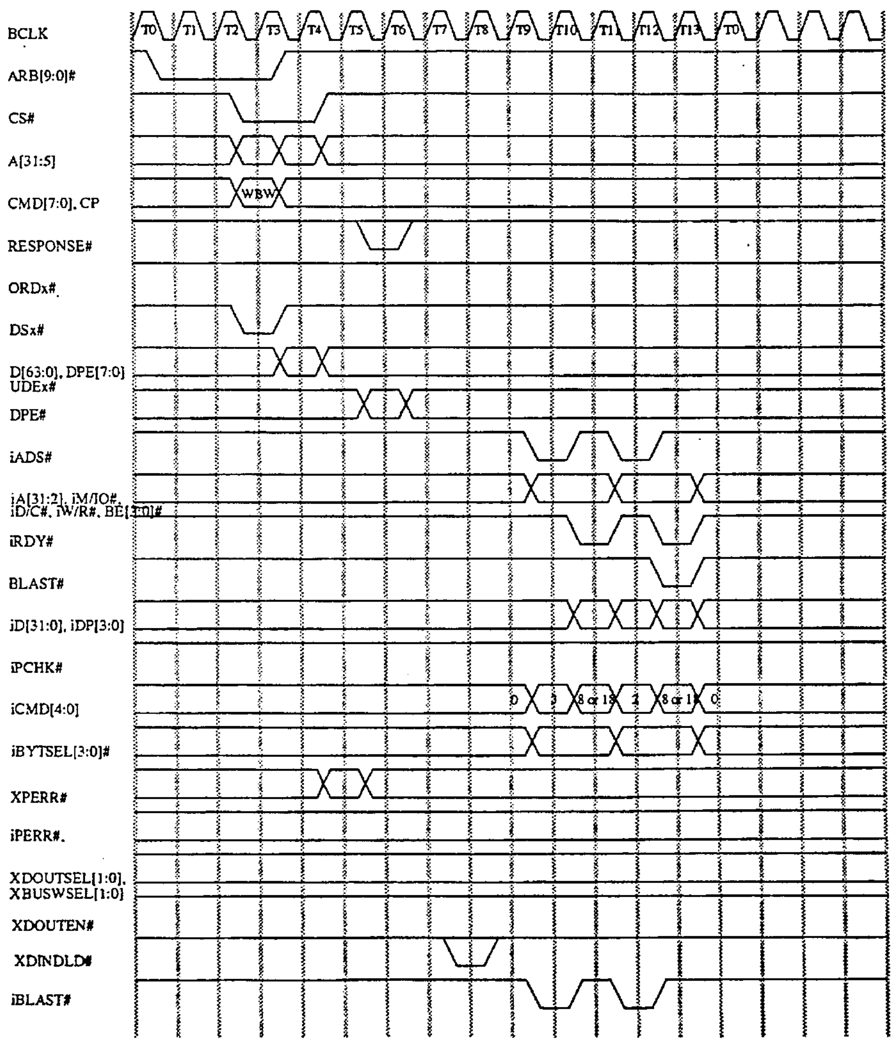

1.4.2.8.8 i486™ Bus Window Locking Operation

When a XA-MP bus requesting agent initiates an lock transaction, the request will be queued in the i486™ bus window request queue. The BIC supports both XA-MP bus address and bus based locks. Generation of either type of lock request to the i486™ bus window will result in a i486™ bus lock. When the i486™ bus is locked the BIC has exclusive use of the bus. Therefore, devices capable of i486™ bus mastership are blocked from acquiring the i486™ bus. The BIC will only accept one XA-MP bus lock request. Others will be NAKed until the first lock operations is complete.

Figure 1-21 illustrates a i486™ bus window read/write lock operation. The BIC supports un-aligned locks where more than one read and write operation is performed.The timing does not depict retry or error bus sequences (e.g. a NAKed RBWL, a cancelled RBWL, etc.).

Specification 60600215 IM-2 R0.1 EPS-1 *DRAFT* Revision A
Figure 1-22 Timing - 486™ Bus Window Locking Operation
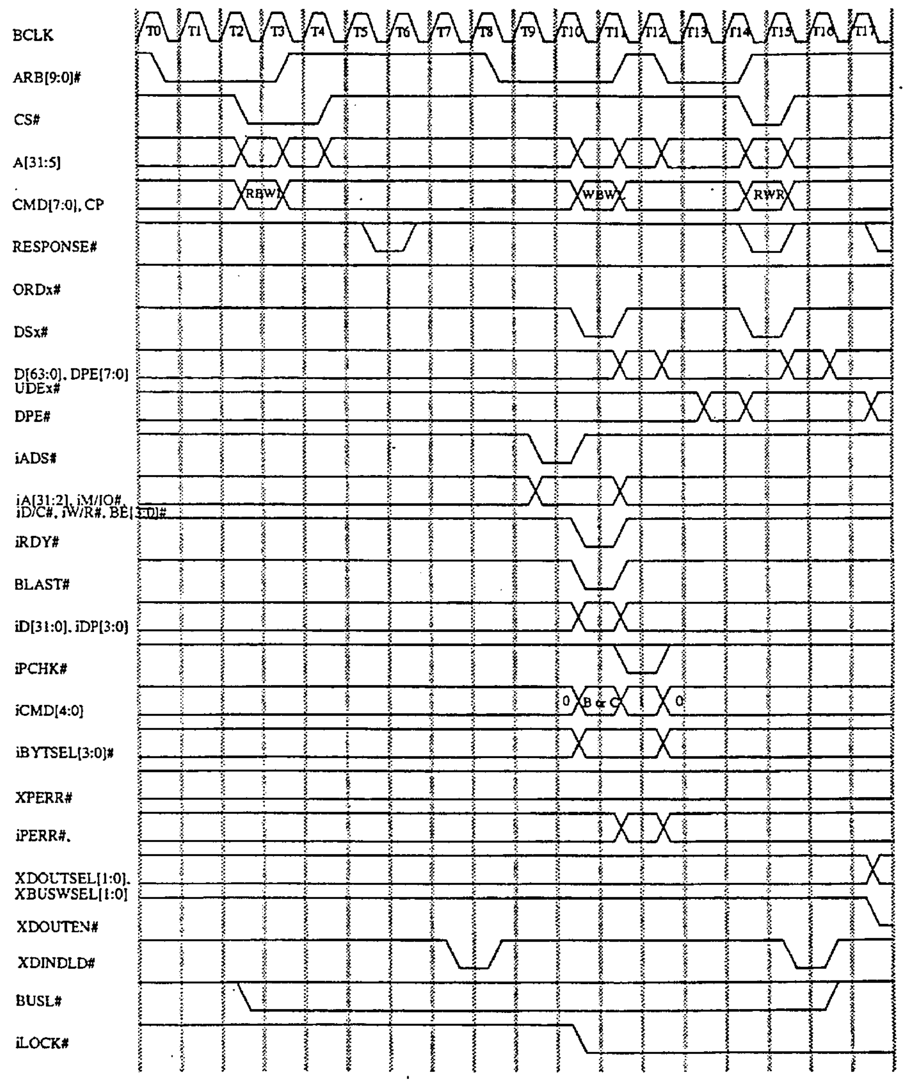

Figure 1-22 Timing - i486™ Bus Window Locking Operation cont...
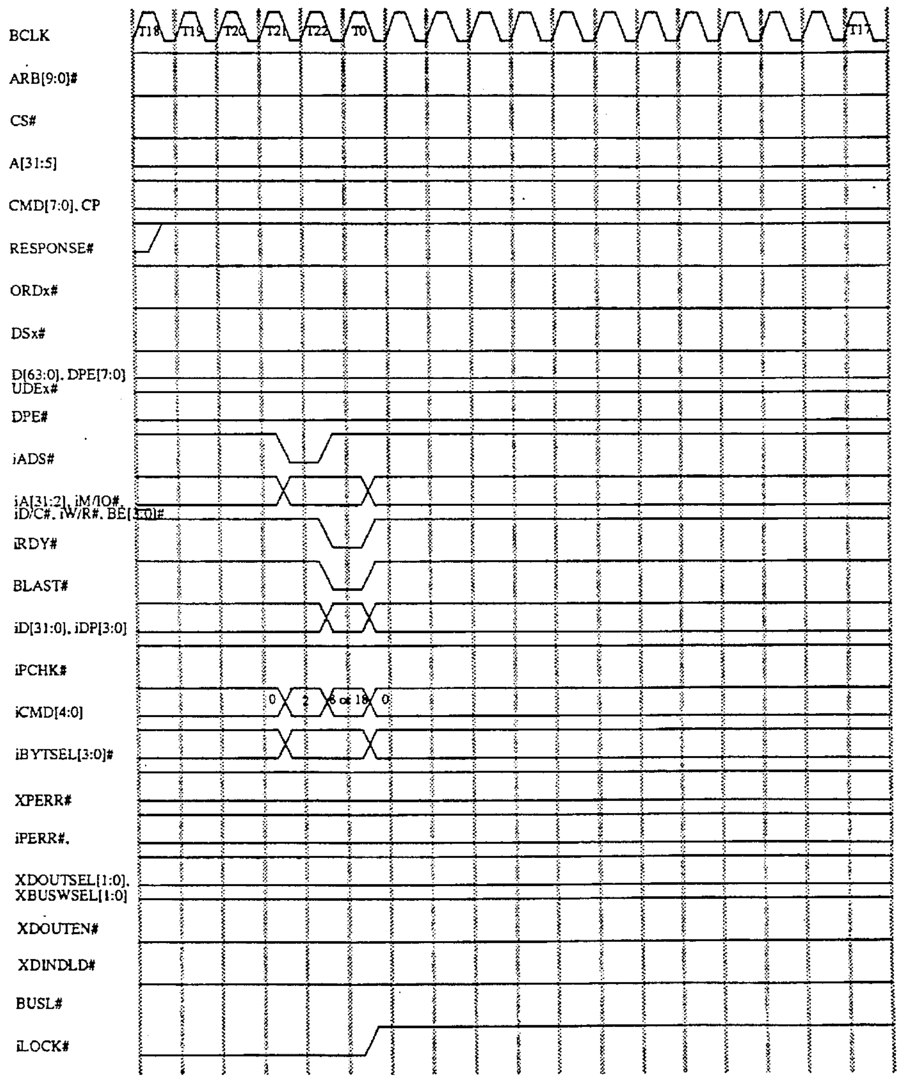

1.4.2.8.9 i486™ Bus Window Interrupt Acknowledge

A XA-MP bus IACK operations results in the CBIC generating a interrupt acknowledge cycle on the i486™ bus. Only the BIC configured in compatible mode will respond to a XA-MP IACK transaction. The interrupt acknowledge cycle is a unique cycle that consists of two locked cycles. Data returned on the first cycle is ignored by the BIC. The interrupt vector is returned during the second cycle on the lower 8 bits of the i486™ bus.

The state of iA[2] distinguishes the first and second interrupt acknowledge cycles. The address of the first cycle is 00000004h and 00000000h for the second. iBE[3:0]# remain at a value of 1h for both cycles.

Each interrupt acknowledge cycle is terminated when a i486™ bus device returns iRDY#. Wait states can be added by withholding iRDY#. The BIC automatically generates four idle clocks between the first and second cycles to allow for 8259A recovery time.

Figure 1-22 illustrates the timing of a i486™ bus window interrupt acknowledge cycle where no wait states are inserted by the i486™ bus responder. The interrupt vector will be returned out-of-order by the BIC. The timing does not depict retry or error bus sequences (e.g. a NAKed IACK, a cancelled IACK, etc.).

Specification 60600215 IM-2 R0.1 EPS-1 *DRAFT* Revision A
Figure 1-23 Timing - i4 86™ Bus Window Interrupt Acknowledge
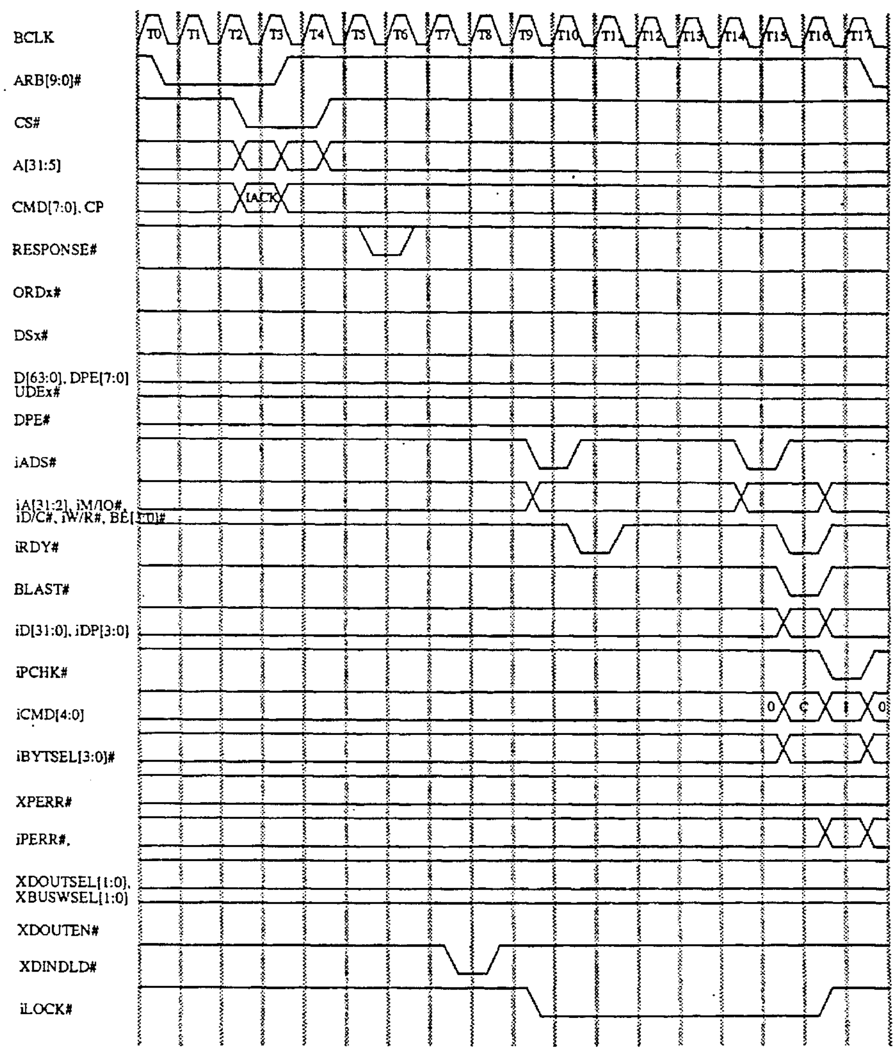

| Specification 60600215 | IM-2 R0.1 EPS-1 | ***DRAFT*** Revision A |
|---|---|---|
Figure 1-23 Timing - i4 86™ Bus Window Interrupt Acknowledge cont...
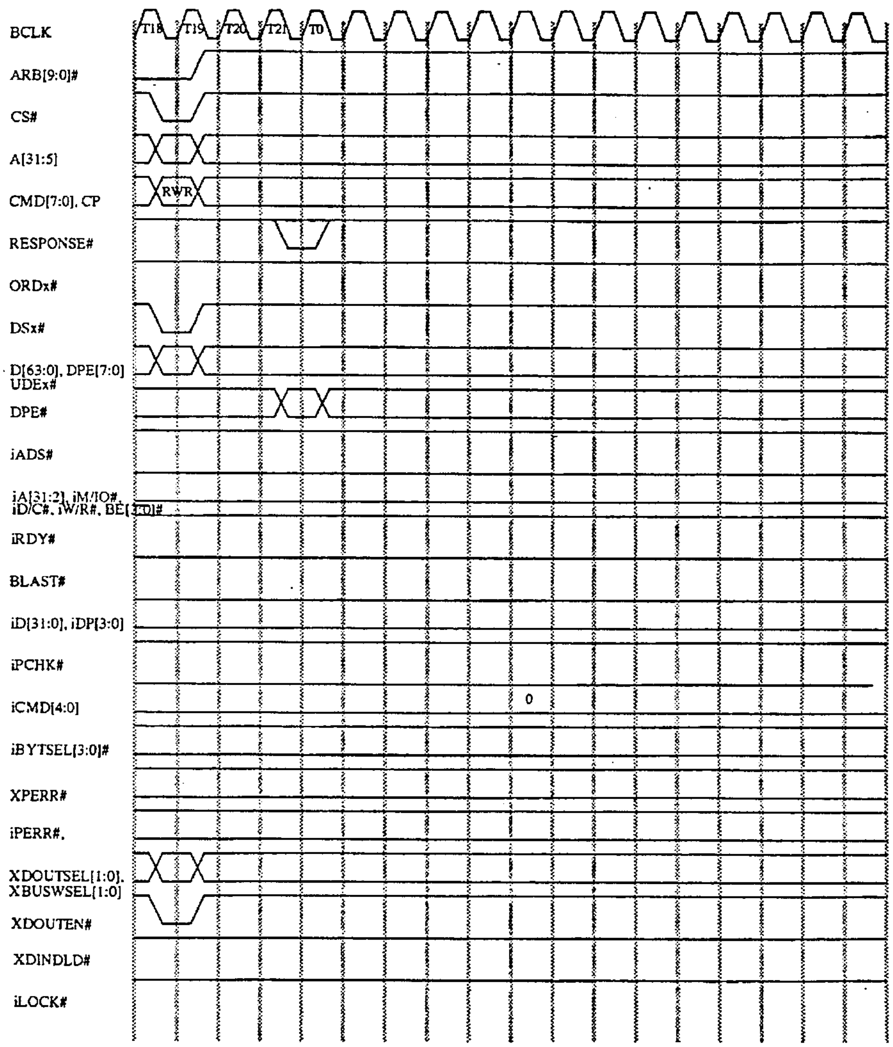

1.4.2.8.10 Software Visible Register Read

The BICs software visible registers reside in the ABIC. A XA-MP read operation to the software visible registers results in the ABIC transferring the addressed register to the DBIC. The transfer is performed serially via the iD[0] data bit of the i486™ bus. The least significant bit of the register of the addressed register is transferred first.The BIC will only respond to a double word RBW XA-MP bus operations.The register read operation is performed through the i486™ bus window. XA-MP lock operations are supported for software visible register operations.

Figure 1-23 illustrates the timing of a i486™ bus window 32 bit software visible read operation. The requested data will be returned out-of-order by the BIC. Note that even though Figure 1-23 does not show the assertion of RESPONSE# and DPE#, they occur at the normal time. The timing does not depict retry or error bus sequences (e.g. a NAKed RBW, a cancelled RBW, etc.)

Figure 1-24 Timing - Software Visible Register Read

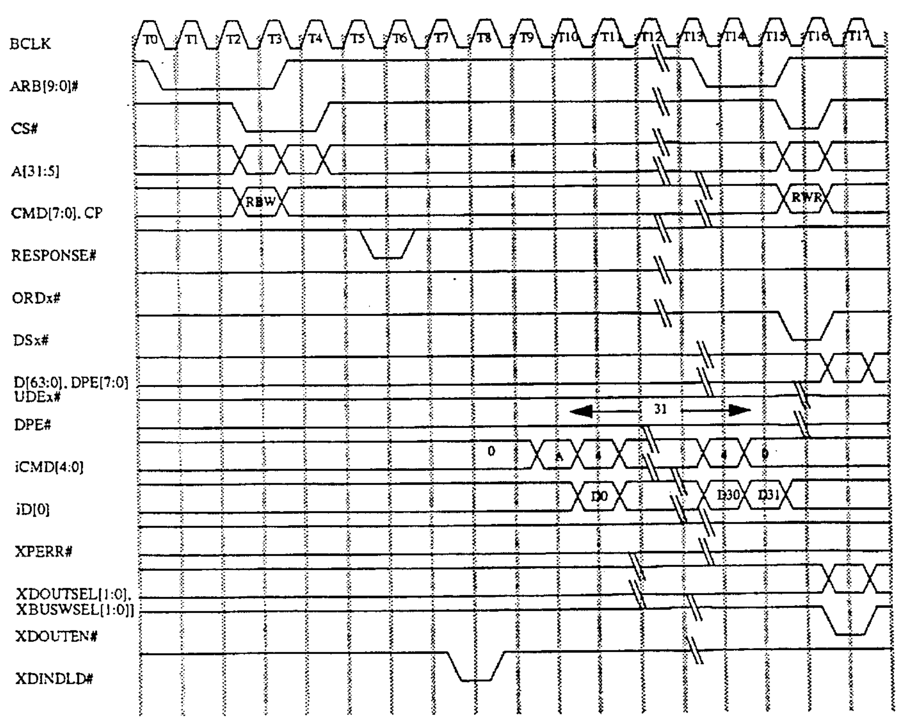

1.4.2.8.11 Software Visible Register Write

The BICs software visible registers reside in the ABIC. A XA-MP write operation to the software visible registers results in the ABIC initiating a serial transfer of the addressed register data to the DBIC. All software visible registers are written to as defined in this section with the exception of the slice_control/status register. Refer to section 1.4.2.8.12 for a description of a XA-MP write operation to the slice_control/status register.

The BIC supports both single and dual XA-MP data bus configures. The BUS0_BUS1# DBIC input pins configure the DBIC for XA-MP data bus 0 or 1. Therefore, using the iCMD[4:0] command bits the ABIC can address the DBIC connected to appropriate data bus to output the register data on the i486™ data bus. The transfer is performed serially by the DBIC that received the register data via the iD[0] data bit of the i486™ bus.

The least significant bit of the register of the addressed register is transferred first.The BIC will only respond to a double word WBW XA-MP bus operations.The register write operation is performed through the i486™ bus window. XA-MP lock operations are supported for software visible register operations.

Figure 1-24 illustrates the timing of a i486™ bus window 32 bit software visible write operation. The timing does not depict retry or error bus sequences (e.g. a NAKed WBW, a cancelled WBW, ...).

Figure 1-25 Timing - Software Visible Register Write Operation

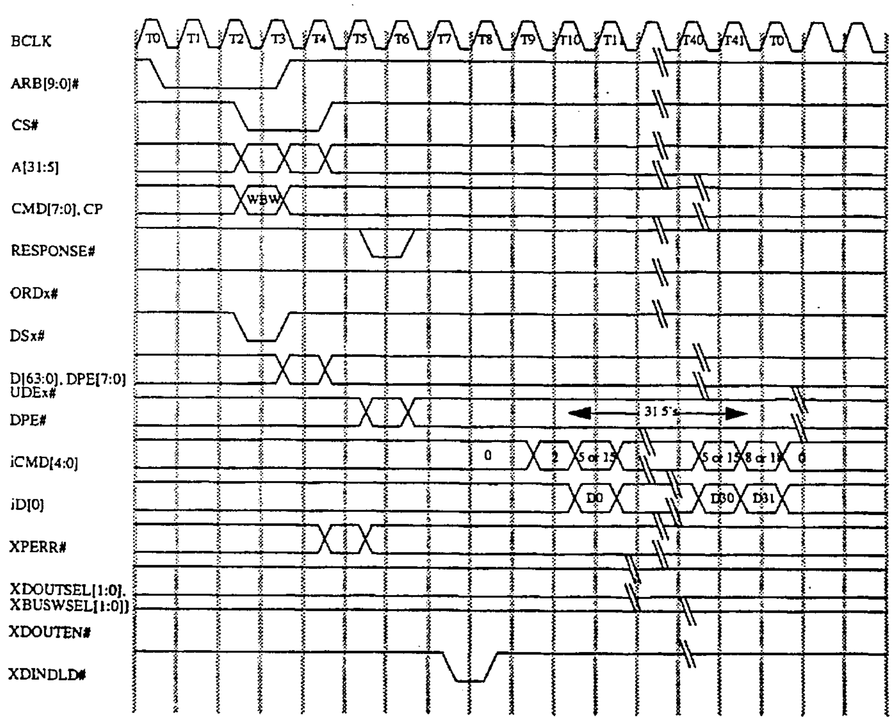

1.4.2.8.12Software Visible Parity Configuration Write

The BICs software visible slice common and specific control/status registers reside in both the ABIC and DBIC. Only the bits with in the registers that configure the XA-MP and i486™ bus byte parity generation (i.e. odd or even) reside in the DBIC. During a XA-MP bus read operation the contents of the registers are supplied by the ABIC as described in section 1.4.2.8.10. However, a XA-MP bus write operation results in the DBIC transferring the ABIC the register contents serially and capturing the parity configuration bits.

The BIC supports both single and dual XA-MP data bus configures. In a dual bus configuration both DBICs must receive the parity configuration bits. The DBIC that receives the register data will then output the 32 bit value on the i486™ data bus (i.e. iD[31:0]) where both DBICs then capture the parity configuration bits. Following the capture operation the complete register data is then transferred serially via the iD[0] data bit of the i486™ data bus to the ABIC. The BUS0_BUS1# DBIC input pins configure the DBIC for XA-MP data bus 0 or 1. Therefore, using the iCMD[4:0] command bits the ABIC can address the DBIC connected to appropriate data bus to output the register data on the i486™ data bus. The same method is used in a single XA-MP data bus implementation where only one DBIC captures the data.

The BIC will only respond to a double word WBW XA-MP bus operations.The slice common and specific_control/status register write operations are performed through the i486™ bus window. XA-MP bus lock operations are supported.

Figure 1-25 illustrates the timing of a i486™ bus window 32 bit slice common or specific control/status register write operation. The timing does not depict retry or error bus sequences (e.g. a NAKed WBW, a cancelled WBW, ...).

Figure 1-26 Timing - Software Visible Parity Configuration Write
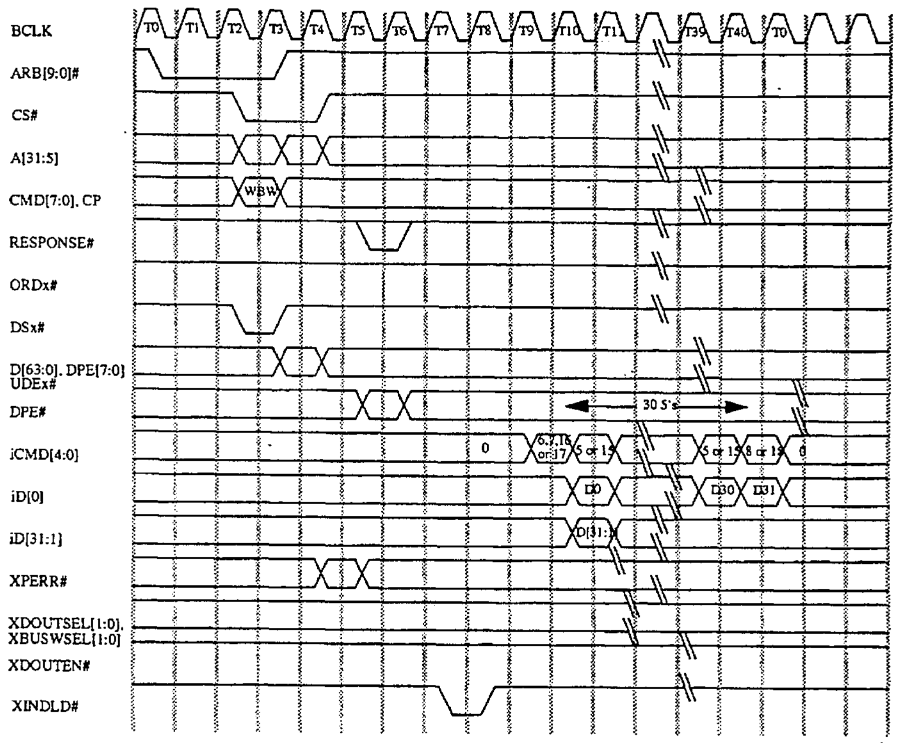

1.4.2.8.13System Boot ROM/APIC Read

The ABIC provides the XA-MP bus address decode logic for access to the system boot ROM and APIC. The ROM and APIC are accessed through the i486™ bus window. Only XA-MP aligned double word read operations to the APIC are supported by the BIC. Aligned bus word, double word, word and byte read operations are supported for the system boot ROM. In addition XA-MP bus lock and i486™ dynamic bus sizing operations are also supported.

Figure 1-26 illustrates the timing of a i486™ bus window read to the APIC or system boot ROM where no wait states are inserted by the i486™ bus responder. The ABIC will assert the CS-ROM# or CS-APIC# at the same time as iADS and will deassert the signal when iRDY# is received.The requested data will be returned out-of-order by the BIC. The timing does not depict retry or error bus sequences (e.g. a NAKed RBW, a cancelled RBW, etc.).

Figure 1-27 Timing - System Boot ROM/APIC Read
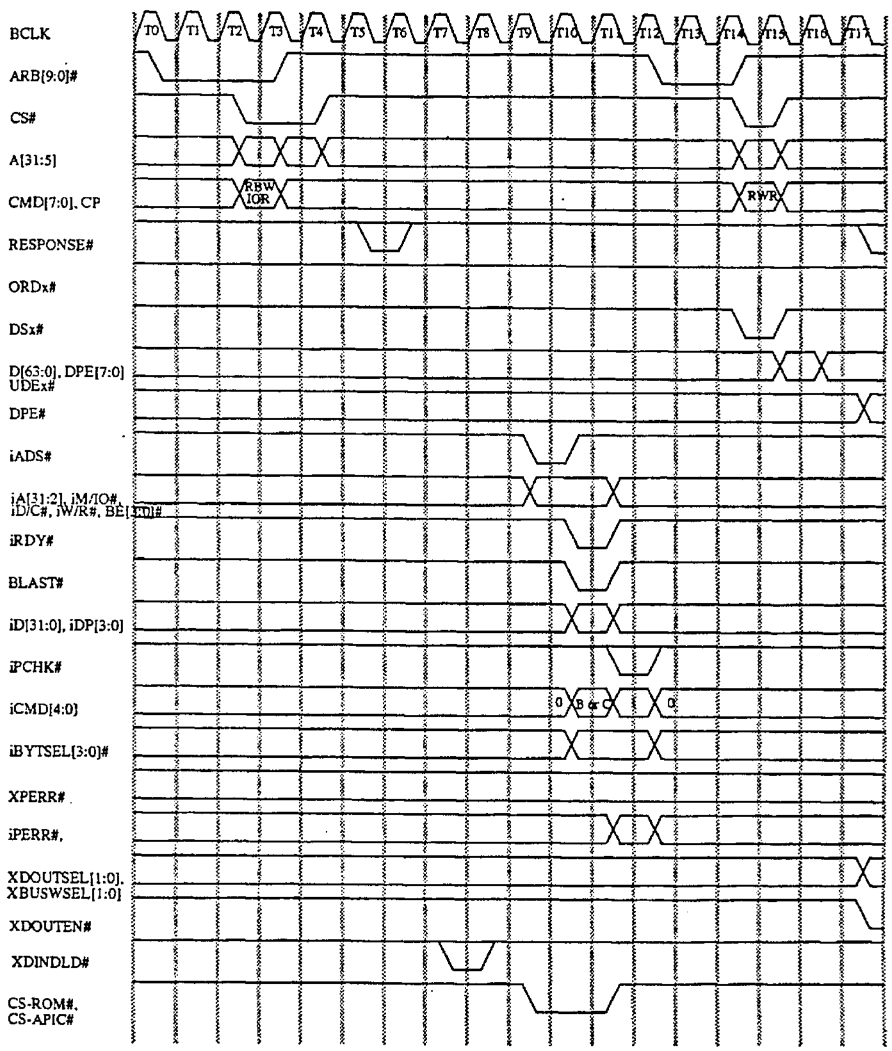

1.4.2.8.14 System Boot ROM/APIC Write

The ABIC provides the XA-MP bus address decode logic for access to the system boot ROM and APIC. The ROM and APIC are accessed through the i486™ bus window. Only XA-MP aligned double word write operations to the APIC are supported by the BIC. Aligned bus word, double word, word and byte write operations are supported for the system boot ROM. In addition XA-MP bus lock and i486™ dynamic bus sizing operations are also supported.

Figure 1-27 illustrates the timing of a i486™ bus window read to the APIC or system boot ROM where no wait states are inserted by the i486™ bus responder. The ABIC will assert the CS-ROM# or CS-APIC# at the same time as iADS and will deassert the signal when iRDY# is received. The timing does not depict retry or error bus sequences (e.g. a NAKed WBW, a cancelled WBW, etc.)

Figure 1-28 Timing - System Boot ROM/APIC Write
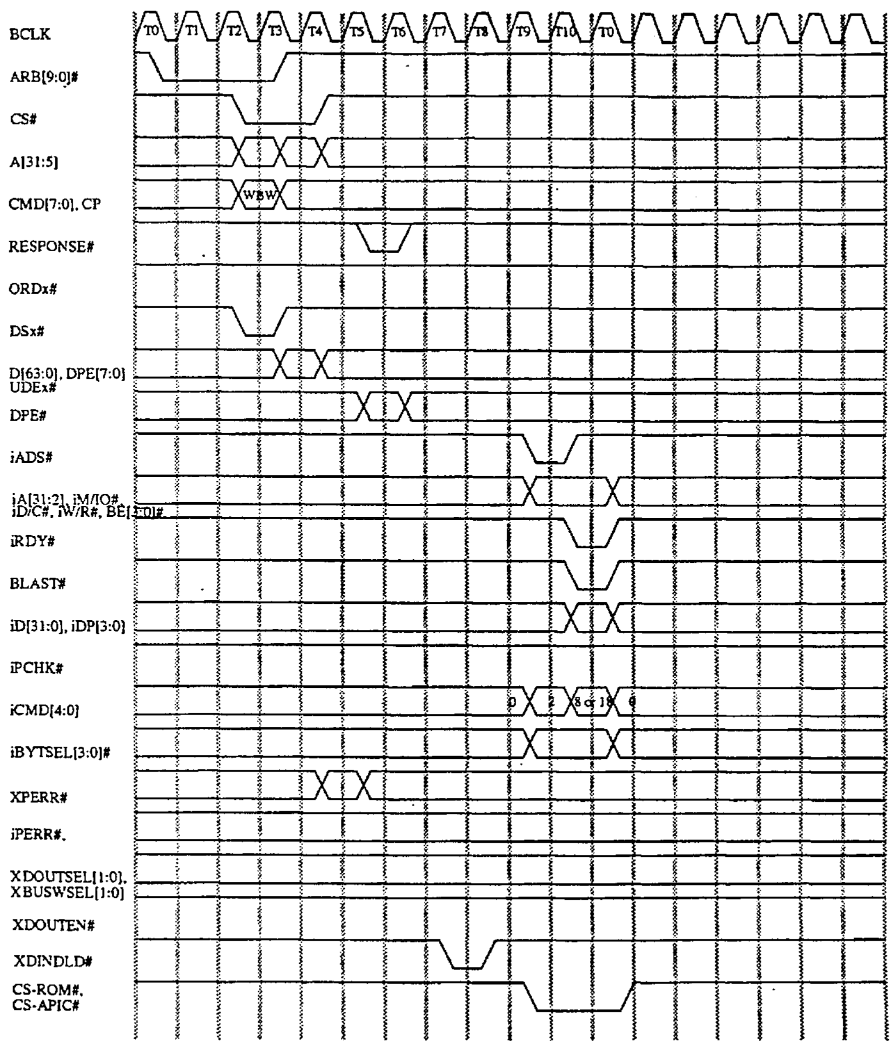

1.4.2.9 Parity Error Handling

A parity error on the XA-MP bus interface is handled as specified in the XA-MP Bus Architecture Specification. If data obtained by the BIC on XA-MP bus write operations has bad parity or UDEx# associated with it, it is not loaded into the i486™ bus window. A parity error on the i486™ bus as a result of an i486™ bus window read operation will result in the BIC accepting the data, setting the iner_trap registers and asserting the XA-MP bus SLER# signal. The data received with bad i486™ bus parity will be transferred on the XA-MP bus with the UDEx# signal asserted.

1.4.3 Miscellaneous Interfaces

The operation of the identification register, diagnostic LED, initialize, and power fail interfaces is described in this section.

1.4.3.1 Identification Register and LED Interface

The ABIC obtains information regarding slice type (16 bits), slice revision (8 bits) and XA-MP data bus configuration (1 bit: 0 = single data bus, 1 = dual data bus) serially from an external device. The data is obtained on the IDREGD input pin following an XA-MP bus initialization. The ABIC initiates the loading of the configuration information through the assertion of the IDREGDGO# output. The slice type information is transferred first, followed by the slice revision and XA-MP data bus configuration. The least significant bit of each element is transferred first.

The ABIC provides diagnostic LED information serially to an external device through the LED output. Eight bits of information are provided by the ABIC. Seven bits represent the state of the phase indicators and one bit for the indicator field contained in the slice common control/status register. The ABIC informs an external device that LED information is being transferred through the assertion of the IDREGDGO# signal. The LED information is transferred following an XA-MP bus initialization and whenever the slice common control/status register is updated. The phase indication status bits are transferred first followed by the indicator field. The least significant bit of the phase indication is transferred first.

Even though the IDREGDGO# is used for two purposes, if it is asserted following an update of the slice common control/status register to change the LEDs, the configuration data that may be transmitted by an external device is ignored by the ABIC except immediately following initialize.

Figure 1-29 Timing - Identification Register and LED Interface

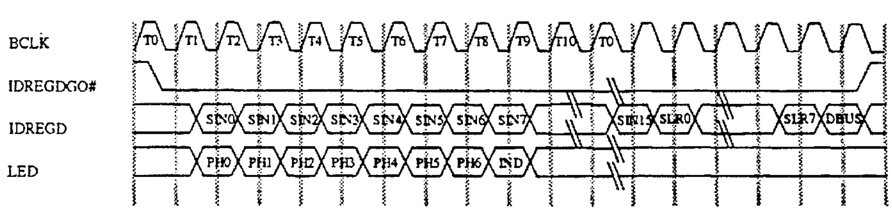

1.4.4 Initialize

The manner in which the BIC handles the initialization is dependent on which mode it is configured.

When configured in cBIC mode, an asynchronous active low iINITIN# input to the ABIC will result in the synchronous (to BCLK) assertion of both BINIT# and iINITOUT#. BINIT# provides the initialization for the XA-MP bus. iINITOUT# provides the initialization for the i486™ bus and DBIC. The iINITIN# signal is intended to provide a mechanism to implement push-button and power-on system reset. The assertion of BINIT# by another XA-MP bus agent will result in the ABIC asserting iINITOUT# and self initialization.

When configured in the BIC mode, the iINITIN# input to the ABIC has no effect and the BINIT# signal is never asserted. The BIC is initialized with BINIT# which is expected to be asserted by another XA-MP bus agent. The assertion of BINIT# by another XA-MP bus agent will result in the ABIC asserting iINITOUT# and self initialization.

Independent of the BICs configured mode, the initialization function provided in the XA-MP slice common registers will result in the assertion of iINITOUT# when activated.

1.4.5 Powerfail

The manner in which the BIC handles power fail is dependent on which mode it is configured.

When configured in cBIC mode, an asynchronous active low iPWRF# input to the ABIC will result in the synchronous (e.g. to BCLK) assertion of PWRF# on the XA-MP bus.

When configured in BIC mode, the iPWRF# input to the ABIC has no effect.

1.5 SOFTWARE VISIBLE REGISTERS

The BIC provides four types of registers. The registers physically reside in the ABIC. These register types are classified as follows:

1. System Initialization Registers
2. Slice Common Registers
3. Slice Specific Registers
4. Performance Monitoring Registers The system initialization registers are used in the system initialization process. The slice common registers are defined in the "XA-MP Bus Architecture Specification," and provide a set of registers that are consistent across all XA-MP slices. The slice specific registers are used to configure and operate the BIC. Performance monitoring registers are provided to facilitate the measurement of pre-defined parameters to assist in system tuning.

Each XA-MP bus slice is allocated a 1 kilo-byte memory mapped area for slice common, slice specific and performance monitoring registers. The memory mapped location of this register space is determined by the contents of the begin_init register offset by XA-MP bus slice ID multiplied by 1 kilo-byte.

Every XA-MP slice contains a Separate begin_init register. The begin_init registers start at an XA-MP memory address of fffc_0000h and reside on even 128 bit boundaries. An XA-MP module determines the location of its begin_init register through calculating an offset from fffc_0000h. The offset is determined by multiplying the slice ID by 16.

The begin_init register is a read/write register and is initialized to 0000_0000h. Only the A[31:15] bits within the register can be modified. The contents of the begin_init register are illustrated in Table 1-20.

Table 1-21 begin_init Register

<table>
<tr><th colspan="32">begin_init Register</th></tr>
<tr><td>31</td><td>30</td><td>29</td><td>28</td><td>27</td><td>26</td><td>25</td><td>24</td><td>23</td><td>22</td><td>21</td><td>20</td><td>19</td><td>18</td><td>17</td><td>16</td><td>15</td><td>14</td><td>13</td><td>12</td><td>11</td><td>10</td><td>09</td><td>08</td><td>07</td><td>06</td><td>05</td><td>04</td><td>03</td><td>02</td><td>01</td><td>00</td></tr>
<tr><td colspan="15">Reserved</td><td colspan="17">A[31:15]</td></tr>
</table>

The software visible registers must be addressed as double words and reside on 128 bit boundaries. Accesses other than double words will not be responded to by the BIC. All reserved bit fields in the registers are set to 0 and cannot be modified.

1.5.1 System Initialization Registers

System initialization registers are provided for the initialization of XA-MP based systems. The system initialization registers provide a mechanism for the "fair" selection of a boot strap processor. XA-MP based systems may have more than one I/O Bridge containing a BIC, but one and only one BIC in the system must be configured in cBIC mode. The system initialization registers are provided by the BIC only when it is configured in the compatible mode.

1.5.1.1 System Initialization Register Mapping

The system initialization registers reside in the memory region of the system ROM. As such, they are shadowed and aliased along with the ROM. These registers mapped as illustrated in Table 1-21.

Table 1-22 System Initialization Register Mapping

| DESCRIPTION | A31-A00 |
|---|---|
| bsp_lock | 000f_ffb0h |
| bsp_id | 000f_ffc0h |
| once_here | 000f_ffd0h |
| read_slice | 000f_ffe0h |

1.5.1.2 bsp_lock Register

The bsp_lock register is used to determine the boot strap processor during system initialization. This register allows all XA-MP bus processors an equal opportunity to become the boot strap processor. Following system initialization this register will return a value of 0000_0000h the first time it is read. Subsequent register read operations will return the value of 0000_0001h. Therefore, the first XA-MP bus processor to read this register and obtain the value of 0000_0000h will be selected as the boot strap processor.

The bsp_lock register is a read only register that is initialized to 0000_0000h. The contents of the bsp_lock register are illustrated in Table 1-22.

Table 1-23 bsp_lock Register

<table>
<tr><th colspan="32">bsp_lock Register</th></tr>
<tr><td>31</td><td>30</td><td>29</td><td>28</td><td>27</td><td>26</td><td>25</td><td>24</td><td>23</td><td>22</td><td>21</td><td>20</td><td>19</td><td>18</td><td>17</td><td>16</td><td>15</td><td>14</td><td>13</td><td>12</td><td>11</td><td>10</td><td>09</td><td>08</td><td>07</td><td>06</td><td>05</td><td>04</td><td>03</td><td>02</td><td>01</td><td>00</td></tr>
<tr><td colspan="31">Reserved</td><td>BSPLCK</td></tr>
</table>

1.5.1.3 bsp_id Register

The bsp_id register is used to store the ID of the XA-MP bus boot strap processor. The register is loaded by the BIC with the XA-MP bus requesting agent's slice ID on the first read operation performed on the bsp_lock register after system initialization.

The purpose of the bsp_id register is to provide a mechanism to identify a failed boot strap processor. If the first selected boot strap processor fails in the process of initializing the system, another processor can become the boot processor. A read to the bsp_id Register may provide the ID of the failed processor.

The bsp_id register is a read/write register that is initialized to 0000_0000h. While write operations to this register are not normal, write access is provided to facilitate increased testability. Only the bits[07:00] within the register can be modified. The contents of the bsp_id register are illustrated in Table 1-23 and defined in Table 1-31.

Table 1-24 bsp_id Register

<table>
<tr><th colspan="32">bsp_id Register</th></tr>
<tr><td>31</td><td>30</td><td>29</td><td>28</td><td>27</td><td>26</td><td>25</td><td>24</td><td>23</td><td>22</td><td>21</td><td>20</td><td>19</td><td>18</td><td>17</td><td>16</td><td>15</td><td>14</td><td>13</td><td>12</td><td>11</td><td>10</td><td>09</td><td>08</td><td>07</td><td>06</td><td>05</td><td>04</td><td>03</td><td>02</td><td>01</td><td>00</td></tr>
<tr><td colspan="24">Reserved</td><td>BVALD</td><td colspan="5">BSID[4:0]</td><td>BMID1</td><td>BMID0</td></tr>
</table>

Table 1-25 bsp_id Register Bit Definitions

| Bit Field | Definition |
|---|---|
| BVALD | When set, the BVALD bit indicates that the information contained in the bsp_id register is valid. The rationale for this bit is to distinguish between the initialization state of the bsp_id register and a boot strap processor whose slice ID and module ID are equal to 0. |
| BSID[4:0] | The 5 bit encoded slice ID of the boot strap processor. |
| BMID[1:0] | The 2 bit encoded module ID of the boot strap processor. |

1.5.1.4 once_here Register

The once_here register is used by XA-MP processors to determine the state of the system initialization process. All processors will attempt to become the boot strap processor by being first to read the bsp_lock register. Those that fail will halt. After completing system initialization the boot processor will set the once_here register to 0000_0001h (i.e., OHERE bit = 1) and re-activate the other processors. Reading a 1 in the once_here register will inform the other processors that initial restart firmware (e.g. try to become the boot strap processor) should not be re-executed.

The once_here register is a read/write register and is initialized to 0000_0000h. Only the OHERE bit within the register can be modified. The contents of the once_here register are illustrated in Table 1-23.

Table 1-26 once_here Register

| once_here Register | |
|---|---|
| 31 30 29 28 27 26 25 24 23 22 21 20 19 18 17 16 15 14 13 12 11 10 09 08 07 06 05 04 03 02 01 | 00 |
| Reserved | OHERE |

1.5.1.5 read_slice Register

The read_slice register is used by XA-MP processors to determine their slice identification, enabling a processor to determine the address to access its own slice identification and configurations registers. The slice identification is provided by bits [6:2] and the module identification is provided by bits [1:0] of the register.

The read_slice register is a read only register and is initialized to 0000_0000h. The contents of the read_slice register are illustrated in Table 1-26.

Table 1-27 read_slice Register

<table>
<tr><th colspan="32">read_slice Register</th></tr>
<tr><td>31</td><td>30</td><td>29</td><td>28</td><td>27</td><td>26</td><td>25</td><td>24</td><td>23</td><td>22</td><td>21</td><td>20</td><td>19</td><td>18</td><td>17</td><td>16</td><td>15</td><td>14</td><td>13</td><td>12</td><td>11</td><td>10</td><td>09</td><td>08</td><td>07</td><td>06</td><td>05</td><td>04</td><td>03</td><td>02</td><td>01</td><td>00</td></tr>
<tr><td colspan="25">Reserved</td><td colspan="5">SID[4:0]</td><td>M I. D 1</td><td>M I D 0</td></tr>
</table>

1.5.2 Slice Common Registers

Each XA-MP bus slice is allocated a 1 kilo-byte block of memory space for memory mapped initialization registers. The slice common registers occupy the first 256 bytes of this block. The address mapping of the slice common registers is illustrated in Table 1-27 and are defined in the "XA-MP Bus Architecture Specification." The initialization values of the slice common registers are defined in Table 1-28.

Table 1-28 Slice Common Register Mapping

| DESCRIPTION | A31-A15 | A14-A10 | A9-A0 |
|---|---|---|---|
| Slice-ID Register | begin_init | Slice ID | 0000h |
| Slice Type | begin_init | Slice ID | 0010h |
| Control/Status Register | begin_init | Slice ID | 0020h |
| Clears Register | begin_init | Slice ID | 0030h |
| Bus Time Out Value Counter | begin_init | Slice ID | 0040h |
| Bus Request Trap Register Yellow 1 | begin_init | Slice ID | 0050h |
| Bus Request Trap Register Yellow 0 | begin_init | Slice ID | 0060h |
| Bus Request Trap Register Red 1 | begin_init | Slice ID | 0070h |
| Bus Request Trap Register Red 0 | begin_init | Slice ID | 0080h |
| Bus Response Trap Register | begin_init | Slice ID | 0090h |
| Reserved | begin_init | Slice ID | 00A0h |
| : | : | : | : |
| Reserved | begin_init | Slice ID | 00F0h |

Table 1-29 Slice Common Register Initialization Values

| DESCRIPTION | INITIALIZATION VALUE |
|---|---|
| Slice-ID Register | 0000_XXXXh |
| Slice Type | 0000_XXXXh |
| Control/Status Register - cBIC configuration | 0000_ff05h |
| non-cBIC configuration | 0000_ff06h |
| Clears Register | 0000_0000h |
| Bus Time Out Value Counter | 0000_0000h |
| Bus Request Trap Register Yellow 1 | 0000_0000h |
| Bus Request Trap Register Yellow 0 | 0000_0000h |
| Bus Request Trap Register Red 1 | 0000_0000h |
| Bus Request Trap Register Red 0 | 0000_0000h |
| Bus Respond Trap Register | 0000_0000h |

1.5.3 Slice Specific Registers

The slice specific registers are used to configure, operate and obtain status from the BIC.

1.5.3.1 Slice Specific Register Mapping

The slice specific registers are contained within the 1 kilo-byte memory mapped register map. These registers and their associated addresses are illustrated in Table 1-29.

Table 1-30 Slice Specific Register Mapping

| DESCRIPTION | A31-A15 | A14-A10 | A9-A0 |
|---|---|---|---|
| slice_control/status | begin_init | Slice ID | 0100h |
| cc_error | begin_init | Slice ID | 0110h |
| ISA_map1 | begin_init | Slice ID | 0120h |
| ISA_map0 | begin_init | Slice ID | 0130h |
| relowin_base | begin_init | Slice ID | 0140h |
| 8MB_rel1 | begin_init | Slice ID | 0150h |
| 8MB_rel0 | begin_init | Slice ID | 0160h |
| 4MB_rel1 | begin_init | Slice ID | 0170h |

Table 1-30 Slice Specific Register Mapping

| DESCRIPTION | A31-A15 | A14-A10 | A9-A0 |
|---|---|---|---|
| 4MB_rel0 | begin_init | Slice ID | 0180h |
| begin_io | begin_init | Slice ID | 0190h |
| end_io | begin_init | Slice ID | 01a0h |
| begin_con | begin_init | Slice ID | 01b0h |
| end_con | begin_init | Slice ID | 01c0h |
| expbegin_mem | begin_init | Slice ID | 01d0h |
| expend_mem | begin_init | Slice ID | 01e0h |
| buffer_level | begin_init | Slice ID | 01f0h |
| i486_bto | begin_init | Slice ID | 0200h |
| iner_trap1 | begin_init | Slice ID | 0210h |
| iner_trap0 | begin_init | Slice ID | 0220h |
| APIC i/o register select | begin_init | Slice ID | 0230h |
| APIC i/o register window | begin_init | Slice ID | 0240h |
| Reserved | begin_init | Slice ID | 0250h |
| : | : | : | : |
| Reserved | begin_init | Slice ID | 03a0h |

1.5.3.2 slice_control/status Register

The slice_control/status register is a read/write register. The register initializes to 0000_0000h for a BIC configuration with only one XA-MP data bus or 0000_0040h for dual data bus configurations. Only bits[4:0] and bits[20:07] of the register can be modified. The contents of the control/status register are illustrated in Table 1-30 and defined in Table 1-31.

Table 1-31 slice control/status Register

<table>
<tr><td colspan="11">Offset 0100h</td><td colspan="21">slice control/status Register</td></tr>
<tr><td>31</td><td>30</td><td>29</td><td>28</td><td>27</td><td>26</td><td>25</td><td>24</td><td>23</td><td>22</td><td>21</td><td>20</td><td>19</td><td>18</td><td>17</td><td>16</td><td>15</td><td>14</td><td>13</td><td>12</td><td>11</td><td>10</td><td>09</td><td>08</td><td>07</td><td>06</td><td>05</td><td>04</td><td>03</td><td>02</td><td>01</td><td>00</td></tr>
<tr><td colspan="11">Reserved</td><td>iPARE</td><td colspan="5">RPRE[4:0]</td><td colspan="5">WPRE[4:0]</td><td>MRPRE</td><td>MWPRE</td><td>FLUSH</td><td>DDB</td><td>EOLC</td><td>QUES1</td><td>QUES0</td><td>iPC2</td><td>iPC1</td><td>iPC0</td></tr>
</table>

Table 1-32 slice_control/status Register Bit Definitions

| Bit Field | Bit Setting | Operating Mode |
|---|---|---|
| iPARE | 0 | Disable parity checking on the i486™ bus by the BIC. |
| | 1 | Enable parity checking on the i486™ bus by the BIC. |
| RPRE | If the MRPRE bit has enabled prefetching, the RPRE field is used to configure when prefetching should occur on XA-MP bus window read operations. The current implementation uses RPRE[4:2] to prefetch when any or all bytes in a double word are accessed. | |
| WPRE | If the MWPRE bit has enabled prefetching, the WPRE field is used to configure when prefetching should occur on XA-MP bus window write operations. The current implementation uses WPRE[4:2] to prefetch when any or all bytes in a double word are accessed. | |
| MRPRE | 0 | Disable prefetching on i486™ bus requester XA-MP bus memory read operations. |
| | 1 | Enable prefetching on i486™ bus requester XA-MP bus memory read operations. |
| MWPRE | 0 | Disable prefetching on i486™ bus requester XA-MP bus window write operations. |
| | 1 | Enable prefetching on i486™ bus requester XA-MP bus window write operations. |
| FLUSH | 0 | The BIC clears this bit after completion of a flush operation. |
| | 1 | All of the cache buffers will be invalidated. Any buffer line in the modified state will be written to XA-MP bus memory before being invalidated. |
| DDB | The DDB (Dual Data Bus) provides the status of the XA-MP data bus configuration. | |
| | 0 | Single XA-MP data bus configuration. |
| | 1 | Dual XA-MP data bus configuration. |
| EOLCO | If the EOLCO (End-of-Line Caste Out) bit is set the BIC will caste out cache lines when the last byte (32 nd) of a line is accessed. If this bit is not set, the BIC will only caste out lines under the LRU policy and on snoop hits. | |
| | 0 | End-of-Line Caste Out disabled. |
| | 1 | End-of-Line Caste Out enabled. |
| QUES[1:0] | QUES[1:0] is used to configure the depth of the i486™ window request queue. | |
| | 0h | Configures the depth of the i486™ window request queue to one. |
| | 1h | Configures the depth of the i486™ window request queue to two. |
| | 2h | Configures the depth of the i486™ window request queue to three. |
| | 3h | Configures the depth of the i486™ window request queue to four. |

Table 1-32 slice_control/status Register Bit Definitions

| Bit Field | Bit Setting | Operating Mode |
|---|---|---|
| iPC[2:0] | The parity control bits are used for testing the parity logic of the i486™ bus. | |
| | 0h | Generate EVEN i486™ data bus parity. |
| | 1 -3h | Reserved |
| | 4h | iDP[3] - Generate ODD i486™ data bus parity - byte 3 |
| | 5h | iDP[2] - Generate ODD i486™ data bus parity - byte 2 |
| | 6h | iDP[1] - Generate ODD i486™ data bus parity - byte 1 |
| | 7h | iDP[0] - Generate ODD i486™ data bus parity - byte 0 |

1.5.3.3 cc_error Register

The cache coherency error register is a read/write register that is initialized to 0000_0000h. The cc_error register is returned to the initialization value after an XA-MP bus read operation. While write operations to this register are not normal, write access is provided to facilitate increased testability. Bits [4:0] of the cc_error register can be modified. The contents of the cc_error register are illustrated in Table 1-32 and defined in Table 1-33.

Table 1-33 cc_error Registers

| Offset 0110h | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| | | | | | | | | | | | | | | cc_error Register | | | | | | | | | | | | | | | | | |
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
| Reserved | | | | | | | | | | | | | | | | | | | | | | | | | | | MLR | WBR | M | E | S |

Table 1-34 cc_error Register Bit Definitions

| Bit Field | Bit Setting | Operating Mode |
|---|---|---|
| MLR | 0 | No error. Initialization State. |
| | 1 | XA-MP bus snoop hit to the modified line register (MLR). |
| WBR | 0 | No error. Initialization State. |
| | 1 | XA-MP bus snoop hit to the write back register (WBR). |
| M | 0 | No error. Initialization State. |
| | 1 | XA-MP bus snoop hit to a modified line. |
| E | 0 | No error. Initialization State. |
| | 1 | XA-MP bus snoop hit to an exclusive line. |

Table 1-34 cc_error Register Bit Definitions

| Bit Field | Bit Setting | Operating Mode |
|---|---|---|
| S | 0 | No error. Initialization State. |
| | 1 | XA-MP bus snoop hit to a shared line. |

1.5.3.4 ISA_map Registers

The ISA_map registers are used by the i486™bus window. They are read/write registers and initialize to 0000_0000h. While all bits in the ISA_map0 register can be modified, only bits [23:00] in the ISA_map1 register can be modified. The contents of the ISA_map registers are illustrated in Table 1-34 and defined in Table 1-35.

Table 1-35 ISA_map Registers

Offset 0120h ISA_map1 Register

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| Reserved | | | | | | | | 15MBEN | 14MBEN | 13MBEN | 12MBEN | 11MBEN | 10MBEN | 09MBEN | 08MBEN | 3BIOS1 | 3BIOS0 | 2BIOS1 | 2BIOS0 | 1BIOS1 | 1BIOS0 | 0BIOS1 | 0BIOS0 | 3EBIOS1 | 3EBIOS0 | 2EBIOS1 | 2EBIOS0 | 1EBIOS1 | 1EBIOS0 | 0EBIOS1 | 0EBIOS0 |

Offset 0130h ISA_map0 Register

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| 7EXP1 | 7EXP0 | 6EXP1 | 6EXP0 | 5EXP1 | 5EXP0 | 4EXP1 | 4EXP0 | 3EXP1 | 3EXP0 | 2EXP1 | 2EXP0 | 1EXP1 | 1EXP0 | 0EXP1 | 0EXP0 | 7VID1 | 7VID0 | 6VID1 | 6VID0 | 5VID1 | 5VID0 | 4VID1 | 4VID0 | 3VID1 | 3VID0 | 2VID1 | 2VID0 | 1VID1 | 1VID0 | 0VID1 | 0VID0 |

Table 1-36 ISA_map Register Bit Definitions

| Bit Field | Bit Setting | Operating Mode |
|---|---|---|
| 08MBEN - 15MBEN | The 08MBEN (0080_0000h - 008f_ffffh) through 15MBEN (00f0_0000h - 00ff_ffffh) are used to enable or disable individual 1 mega-byte regions in the upper 8 mega-bytes of the ISA address space. | |
| 0BIOS[1:0] - 3BIOS[1:0] | The 0BIOS (000f_0000h - 000f_3fffh) through 3BIOS (000f_c000h - 000f_ffffh) are used to enable, disable or shadow individual 16 kilo-byte regions in the 64 kilo-byte ISA BIOS memory region. For performance reasons, the BIOS will typically be shadowed in XA-MP memory. | |
| | 0h | Memory Region Disabled |
| | 1h | Read Enable Only |
| | 2h | Write Enable Only |
| | 3h | Read/Write Enable |
| 0EBIOS[1:0] - 3EBIOS[1:0] | The 0EBIOS (000e_0000h - 000e_3fffh) through 3EBIOS (000e_c000h - 000e_ffffh) are used to enable, disable or shadow individual 16 kilo-byte regions in the 64 kilo-byte ISA Extended BIOS memory region. For performance reasons, the ROM contained on ISA Expansion devices will typically be shadowed in XA-MP memory. | |
| | 0h | Memory Region Disabled |
| | 1h | Read Enable Only |
| | 2h | Write Enable Only |
| | 3h | Read/Write Enable |
| 00EXP[1:0] - 07EXP[1:0] | The 00EXP[1:0] (000c_0000h - 000c_3fffh) through 07EXP[1:0] (000d_c000h - 000d_ffffh) are used to enable, disable or shadow individual 16 kilo-byte regions in the 128 kilo-byte ISA Expansion Device address space. For performance reasons, the ROM contained on ISA Expansion devices will typically be shadowed in XA-MP memory. | |
| | 0h | Memory Region Disabled |
| | 1h | Read Enable Only |
| | 2h | Write Enable Only |
| | 3h | Read/Write Enable |
| 00VID[1:0] - 07VID[1:0] | The 00VID[1:0] (000a_0000h - 000a_3fffh) through 07VID[1:0] (000b_c000h - 000b_ffffh) are used to enable, disable or shadow individual 16 kilo-byte regions in the 128 kilo-byte ISA video memory address space. Shadow control is provided for this memory region since ISA Expansion Devices containing ROM may occupy a portion of the video region. | |
| | 0h | Memory Region Disabled |
| | 1h | Read Enable Only |
| | 2h | Write Enable Only |
| | 3h | Read/Write Enable |

1.5.3.5 relowin_base Register

The 32MByte translation window is used by the i486™ bus window. The relowin_base register is a read/write register that is initialized to 0000_0000h. Only bits [06:00] and [31:28] of the register can be modified. The contents of the register are illustrated in Table 1-37 and defined in Table 1-38.

Table 1-37 relowin_base Register

| Offset 0140h | | | | relowin_base Register | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
| 8MB1EN | 8MB0EN | 4MB1EN | 4MB0EN | Reserved | | | | | | | | | | | | | | | | | | | | | A[31:25] | | | | | | |

Table 1-38 relowin_base Register Bit Definitions

| Bit Field | Bit Setting | Operating Mode |
|---|---|---|
| A[31:25] | XA-MP bus address defining the starting address of a 32 MByte translation window. | |
| 8MB1EN | 0 | 8MB_rel1 translation window disabled. Initialization State. |
| | 1 | 8MB_rel1 translation window enabled. |
| 8MB0EN | 0 | 8MB_rel0 translation window disabled. Initialization State. |
| | 1 | 8MB_rel0 translation window enabled. |
| 4MB1EN | 0 | 4MB_rel1 translation window disabled. Initialization State. |
| | 1 | 4MB_rel1 translation window enabled. |
| 4MB0EN | 0 | 4MB_rel0 translation window disabled. Initialization State. |
| | 1 | 4MB_rel0 translation window enabled. |

1.5.3.6 8MB_rel Registers

The 8MB_rel registers are used to translate an 8 mega-byte region of the XA-MP bus to any even 8 mega-byte i486™ bus memory region. The value contained in the registers is used by the BIC to replace the upper XA-MP bus memory address bits when passing the cycle to the i486™ bus.

The 8MB_rel registers are read/write registers that are initialized to 0000_0000h. Only bits [08:00] of the registers can be modified. The contents of two registers are defined in Table 1-43.

Table 1-39 8MB_rel Registers

| Offset 0150h | 8MB_rel1 Register | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
| Reserved | | | | | | | | | | | | | | | | | | | | | | | A[31:23] | | | | | | | | |

| Offset 0160h | 8MB_rel0 Register | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
| Reserved | | | | | | | | | | | | | | | | | | | | | | | A[31:23]. | | | | | | | | |

1.5.3.7 4MB_rel Registers

The 4MB_rel registers are used to translate a 4 mega-byte region of the XA-MP bus to any even 4 mega-byte i486™ bus memory region. The value contained in the register is used by the BIC to replace the upper XA-MP bus memory address bits when passing the cycle to the i486™ bus.

The 4MB_rel registers are read/write registers that are initialized to 0000_0000h. Only bits [09:00] of the registers can be modified. The contents of two registers are defined in Table 1-43.

Table 1-40 4MB_rel Registers

| Offset 0170h | 4MB_rel1 Register | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
| Reserved | | | | | | | | | | | | | | | | | | | | | | A[31:22] | | | | | | | | | |

| Offset 0180h | 4MB_rel0 Register | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
| Reserved | | | | | | | | | | | | | | | | | | | | | | A[31:22] | | | | | | | | | |

1.5.3.8 begin_io and end_io

The begin_io and end_io registers define a starting and ending address for the i486™ bus I/O space window. The address decode is disabled if both the begin_io and end_io registers are equal to zero.

The begin_io and end_io registers are read/write registers that are initialized to 0000_0000h. Only bits [27:00] can be modified. The contents of two registers are defined in Table 1-43.

Table 1-41 begin_io and end_io Registers

| Offset 0190h | begin_io Register | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
| Reserved | | | | A[31:04] | | | | | | | | | | | | | | | | | | | | | | | | | | | |

| Offset 01a0h | end_io Register | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
| Reserved | | | | A[31:04] | | | | | | | | | | | | | | | | | | | | | | | | | | | |

1.5.3.9 begin_con and end_con Registers

The begin_con and end_con registers define the starting and ending XA-MP bus memory addresses the BIC will decode for conversion. The address decode is disabled if both the begin_con and end_con registers are equal to zero.

The begin_con and end_con registers are read/write registers that are initialized to 0000_0000h. Only bits [27:00] can be modified. The contents of two registers are defined in Table 1-43.

Table 1-42 begin_con and end_con Registers

| Offset 01b0h | begin_con Register | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
| Reserved | | | | A[31:04] | | | | | | | | | | | | | | | | | | | | | | | | | | | |

| Offset 01c0h | end_con Register | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
| Reserved | | | | A[31:04] | | | | | | | | | | | | | | | | | | | | | | | | | | | |

1.5.3.10 expbegin_mem and expend_mem Registers

The expbegin_mem and expend_mem registers provide the starting and ending i486™ bus memory addresses for the XA-MP bus window. The address decode is disabled if both the expbegin_mem and expend_mem registers are equal to zero.

The expbegin_mem and expend_mem registers are read/write registers that are initialized to 0000_0000h. Bits [31:27] of the registers cannot be modified. The contents of two registers are defined in Table 1-43.

Table 1-43 expbegin_mem and expend_mem Registers

| Offset 01d0h | | | | | expbegin_mem Register | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
| Reserved | | | | | A[31:05] | | | | | | | | | | | | | | | | | | | | | | | | | | |

| Offset 01e0h | | | | | expend_mem Register | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
| Reserved | | | | | A[31:05] | | | | | | | | | | | | | | | | | | | | | | | | | | |

1.5.3.11 buffer_level Register

The buffer level register provides the maximum number of cache buffers in use at any time from when it was last read to the present time. Reading a value of 0h means zero cache lines have been used while 10h means 16 lines.

The buffer_level register is a read/write register that is initialized to 0000_0000h. While write operations to this register are not normal, write access is provided to facilitate increased testability. Bits [31:05] of the buffer_level register cannot be modified. The contents of the buffer_level register are illustrated in Table 1-43.

Table 1-44 buffer_level Register

| Offset 01f0h | | | | | expbegin_mem Register | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
| RESERVED | | | | | | | | | | | | | | | | | | | | | | | | | | | LVL[4:0] | | | | |

1.5.3.12 i486_bto Register

The i486_bto register provides a mechanism to detect and report a non-responding i486™ bus device. A register value of 0000_0000h hex disables the Bus Time out Counter. The value contained in the i486_bto register is loaded into an internal down counter. The counter is decreased at a rate equal to the XA-MP bus clock (e.g. 33 MHz) when iADS# is active. When iRDY# is asserted the counter is re-loaded with the value contained in the i486_bto register. All i486™ bus cycles (e.g. BIC and external i486™ bus device generated) cycles are timed. A time out condition exists if the counter reaches a value of zero before the initiated i486™ bus cycle completes. When a time out condition occurs the BIC will load the iner_trap registers, set the SLER and INER bit in the control/status register and assert the XA-MP bus SLER# signal.

The i486_bto register is a read/write register and is initialized to 0000_0000h. The contents of the register are illustrated in Table 1-45.

Table 1-45 i486_bto Register

| Offset 0200h | i486_bto Register |
|---|---|
| 31–00 | iBTO[31:00] |

1.5.3.13 iner_trap Registers

The iner_trap registers are used to report errors that are internal to the BIC. All errors will result in the BIC asserting the XA-MP bus SLER# signal. The iner_trap registers are loaded when an internal error is detected. The iner_trap registers are cleared through the slice common clears register.

The iner_trap registers are read/write registers that are initialized to 0000_0000h. While write operations to this register are not normal, write access is provided to facilitate increased testability. Bits [20:0] of the iner_trap1 register cannot be modified. The contents of the iner_trap registers are illustrated in Table 1-46 and defined in Table 1-47.

Table 1-46 iner_trap Registers

| Offset 0210h | iner_trap1 Register | | | |
|---|---|---|---|---|
| 31–24 | 23–21 | 20 | 19–16 | 15–00 |
| ERR[7:0] | CMD [2:0] | iHLDA | iBE[3:0] | Reserved |

| Offset 0220h | iner_trap0 Register | |
|---|---|---|
| 31–02 | 01 | 00 |
| iA[31:02] | 0 | 0 |

Table 1-47 iner_trap Register Bit Definitions

| Bit Field | Bit Setting | Operating Mode |
|---|---|---|
| ERR[7:0] | The eight bit error field is used to encode the type of error that occurred on the i486™ bus. | |
| | 00h | No errors. Initialization state |
| | 01h | i486™ Bus Time Out |
| | 02h | i486™ Bus Data Parity Error |
| | 03h | Invalid i486™ bus byte enable(s) |
| | 04h | Invalid i486™ bus cycle (iM/IO#, iD/C#, iW/R#) |
| | 05h | Reserved |
| | : | : |
| | ffh | Reserved |
| CMD[2:0] | The three bit command field is used to encode the i486™ bus command (e.g. cycle type) that the error occurred on. | |
| | 0h | Interrupt Acknowledge |
| | 1h | Reserved |
| | 2h | I/O Read |
| | 3h | I/O Write |
| | 4h | Reserved |
| | 5h | Reserved |
| | 6h | Memory Read |
| | 7h | Memory Write |
| iHLDA | i486™ bus ownership when the error occurred. | |
| | 0 | i486™ bus ownership by the BIC when the error occurred. |
| | 1 | i486™ bus ownership by the an external i486™ bus device when the error occurred. |
| BE[3:0] | The four bit field is used to provide the i486™ bus byte enables that the error occurred on. | |
| A[31:2] | The address if applicable, of the access that caused the error on the i486™ bus. | |

1.5.3.14 APIC I/O select and window Registers

One of the major components of an XA-MP bus based I/O Bridge aside from the BIC is a Multi-Processor Interrupt Controller (APIC). The major feature provided by the APIC is the support of symmetrical interrupts. Since the APIC is a required component on all I/O Bridges, the BIC provides the XA-MP bus address decode function for the APIC. While the APIC I/O select and I/O register window software visible registers do not physically reside in the BIC they appear in the BIC slice specific register memory map.

1.5.4 Performance Monitor Registers

The BIC provides counters which are used for performance monitoring purposes. Four counters are provided to count events which allow the measurement of bus utilization, cache cycles and system performance. The objective of the performance monitor registers is to provide useful information to optimize XA-MP bus based systems.

The performance monitor registers occupy the last 80 bytes of the 1 kilo-byte slice memory mapped register block. The address mapping of the performance monitor registers is illustrated in Table 1-48 and are defined in the "XA-MP Bus Architecture Specification".

The Performance Monitor Counters are thirty-two bit counters that are incremented when a specific event occurs. The Performance Parameter Select Register is used to select the parameter for each to the counters to measure.

Table 1-48 Performance Monitor Register Mapping

| DESCRIPTION | A31-A15 | A14-A10 | A9-A0 |
|---|---|---|---|
| Performance Monitor Counter 3 | begin_init | Slice ID | 03b0h |
| Performance Monitor Counter 2 | begin_init | Slice ID | 03c0h |
| Performance Monitor Counter 1 | begin_init | Slice ID | 03d0h |
| Performance Monitor Counter 0 | begin_init | Slice ID | 03e0h |
| Performance Monitor Selection Register | begin_init | Slice ID | 03f0h |

1.5.4.1 Performance Monitoring Counter Registers

Refer to the "XA-MP Bus Architecture Specification" for a detailed description of the performance monitor counters.

1.5.4.2 Performance Monitor Selection Register

The performance monitor selection register is used to control the performance monitor counter registers. A individual counter can be disabled or configured to count a particular event.

The performance monitor selection register is a read/write register that is initialized to 0000_0000h. The contents of the performance monitor selection register are illustrated in Table 1-32 and defined in Table 1-50.

Table 1-49 Performance Monitor Selection Register

| Offset 03F0h | Performance Monitor Selection Register | | | | | | | |
|---|---|---|---|---|---|---|---|---|
| 31 | 30–24 | 23 | 22–16 | 15 | 14–08 | 07 | 06–00 |
| E3 | PMS3 | E2 | PMS2 | E1 | PMS1 | E0 | PMS0 |

Table 1-50 Performance Monitor Selection Register Bit Definitions

| Bit Field | Bit Setting | Operating Mode |
|---|---|---|
| E0 - E3 | 0 | Disables an associated performance monitor counter. |
| | 1 | Enables an associated performance monitor counter. |
| PMS0 - PMS3 | This seven bit field is used to select a performance parameter to count. | |
| | 00h | XA-MP bus clocks |
| | i486™ Bus Window Parameters: | |
| | 01h | Number of i486™ Window I/O reads, (i.e. XA-MP bus IOR command). |
| | 02h | Number of i486™ Window I/O writes, (i.e. XA-MP bus IOW command). |
| | 03h | Number of i486™ Window memory reads, (i.e. XA-MP bus RBW command, including memory to I/O conversions). |
| | 04h | Number of i486™ Window memory writes, (i.e. XA-MP bus WBW command, including memory to I/O conversions). |
| | 05h | Number of i486™ Window Request Queue full XA-MP bus NAKs. |
| | 06h | Number of XA-MP bus generated locks to the i486™ bus. |
| | 07-3f | Reserved |
| | XA-MP Bus Window Parameters: | |
| | 40h | Number of XA-MP bus snoop hits to modified lines. |
| | 41h | Number of RCLs. |
| | 42h | Number of BICLs. |
| | 43h | Number of WCLs. |
| | 44h | Number of WBWs |
| | 45h | Number of i486™ bus initiated lock operations |
| | 46h | Number of non-locking memory reads. |
| | 47h | Number of non-locking memory writes. |
| | 48h | Number of wait states generated. |
| | 49h | Number of i486™ bus cache misses. |
| | 4ah | Number of i486™ bus cache hits. |
| | 4bh | Number of LRU cast outs. |
| | 4ch - 7fh | Reserved |

1.6 TESTABILITY

TBS

1.6.1 IEEE 1149.1

TBS

1.6.1.1 Boundary Scan

TBS

1.6.1.2 Internal Scan

TBS

1.6.1.3 BIST

TBS

1.7 ELECTRICAL SPECIFICATIONS

TBS

1.7.1 Power & Ground

TBS

1.7.2 Maximum Ratings

TBS

1.7.3 DC Specifications

TBS

1.7.4 AC Specifications

TBS

1.8 MECHANICAL SPECIFICATIONS

TBS

1.8.1 Package Information

TBS

1.8.2 Package Thermal Specifications

TBS

APPENDIX 10

ARBITRATION LOGIC B

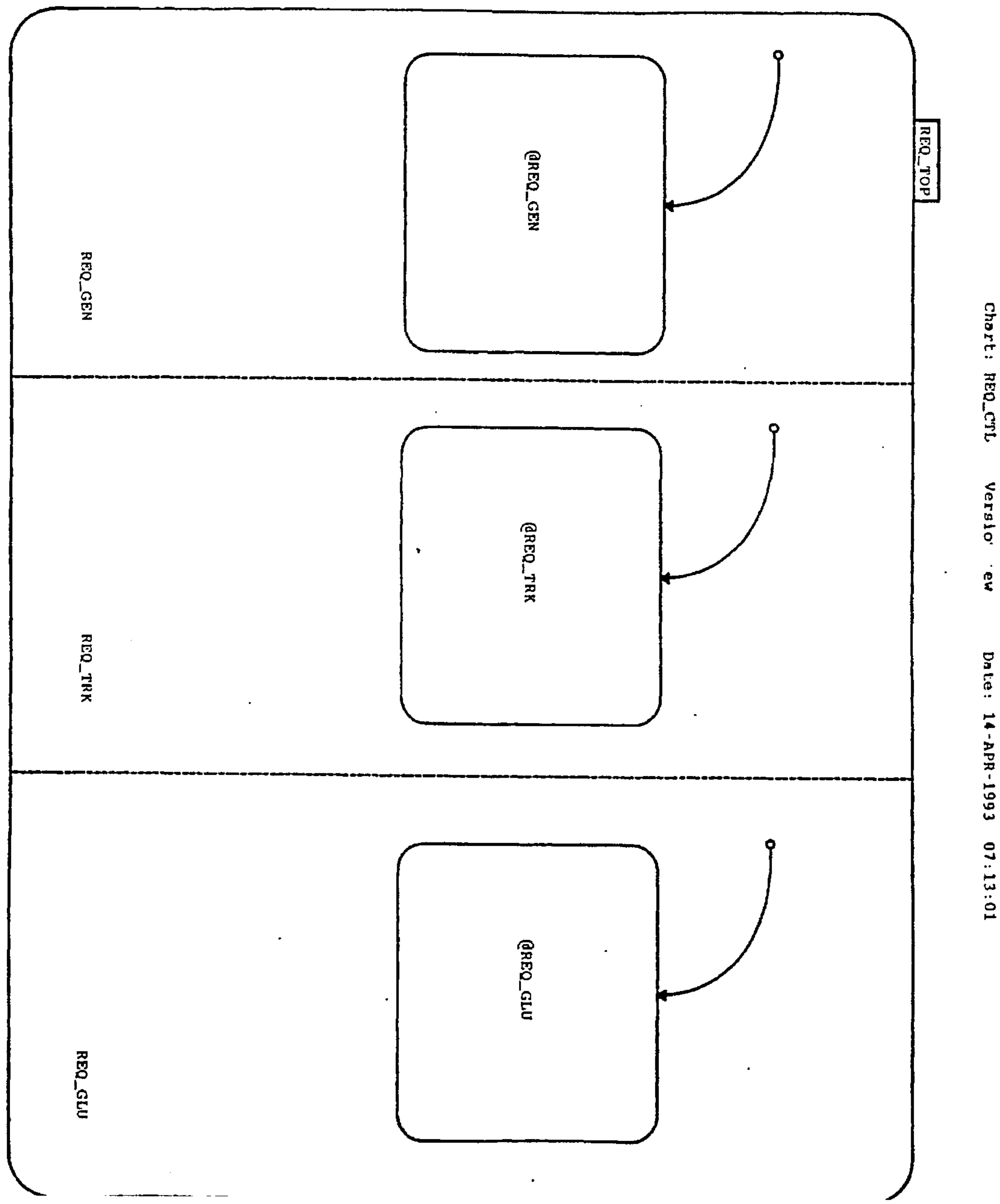
REQ_TOP
@REQ_GEN
REQ_GEN
@REQ_TRK
REQ_TRK
@REQ_GLU
REQ_GLU
Chart: REQ_CTL
Date: 14-APR-1993 07:13:01

```
onary for chart REQ_CTL
-------  -------------

nts defined and/or used in chart REQ_CTL
----------------------------------------
 (condition); defined in chart: REQ_CTL
ition: CADS_RQ=1 and CM_IOI=0 and CW_RI=0 and PALLCI=1 and
       MY_MKEN=0

 (data-item); defined in chart: REQ_CTL
 BIT

(condition); defined in chart: REQ_CTL
ition: APICI=1

 (data-item); defined in chart: REQ_CTL
 BIT

0 (data-item); defined in chart: REQ_CTL
 BIT

(data-item); defined in chart: REQ_CTL
 BIT-ARRAY
es: 9 Downto 0

R (data-item); defined in chart: REQ_CTL
 BIT

: (data-item); defined in chart: REQ_CTL
 BIT

SED (data-item); defined in chart: REQ_CTL
 BIT

(condition); defined in chart: REQ_CTL
ition: CADS33=1 and not STP_CADS

3 (data-item); defined in chart: REQ_CTL
 BIT

RQ (data-item); defined in chart: REQ_CTL
 BIT

 (data-item); defined in chart: REQ_CTL
 BIT

EQ (data-item); defined in chart: REQ_CTL
 BIT

I (data-item); defined in chart: REQ_CTL
 BIT

 (data-item); defined in chart: REQ_CTL
 BIT

RACK (data-item); defined in chart: REQ_CTL
 BIT

(data-item); defined in chart: REQ_CTL
 BIT

DS1R (data-item); defined in chart: REQ_CTL
Type: BIT

DS4_EVE (data-item); defined in chart: REQ_CTL
Type: BIT

DS4_ODD (data-item); defined in chart: REQ_CTL
Type: BIT

ENABLED (condition); defined in chart: REQ_CTL
Definition: SEN=1 or REG_RQ=1

EXTINTAR (data-item); defined in chart: REQ_CTL
Type: BIT

FSTINT (data-item); defined in chart: REQ_CTL
Type: BIT

INTA (condition); defined in chart: REQ_CTL
Definition: CM_IOI=1 and CD_CI=1 and CW_RI=1 and EXTINTAR=1

INTERVENE (condition); defined in chart: REQ_CTL
Definition: INTV=1

INTV (data-item); defined in chart: REQ_CTL
Type: BIT

INT_1ST (condition); defined in chart: REQ_CTL
Definition: CADS_RQ=1 and INTA and not MBEI(7..0)=0x01

KLOCK33N (data-item); defined in chart: REQ_CTL
Type: BIT

MASK (data-item); defined in chart: REQ_CTL
Type: BIT-ARRAY
Indices: 9 Downto 1

MBEI (data-item); defined in chart: REQ_CTL
Type: BIT-ARRAY
Indices: 7 Downto 0

ME_NXT (condition); defined in chart: REQ_CTL
Definition: (ARBR(9..1) and MASK(9..1))=0x000

ME_NXT_LOC (condition); defined in chart: REQ_CTL
Definition: (ARBR(9..1) and MASK(9..1))=0x000

MYCYCLE (condition); defined in chart: REQ_CTL
Definition: SET_RESL and (BUSLR=0 or RESPREQ=1 or in(MY_BUSL))
            and ME_NXT_LOC

MYREQ (data-item); defined in chart: REQ_CTL
Type: BIT

MY_BUSL (state); defined in chart: REQ_GLU

MY_INT (condition); defined in chart: REQ_CTL
Definition: CD_CI=1 and CW_RI=1 and CM_IOI=1 and EXTINTAR=0
```

```
KEN (data-item); defined in chart: REQ_CTL
: BIT

CYC (cond.cion); defined in chart: REQ_CTL
nition: ((CADS or SNPADS) and not TRACKING or NXT_CYC) and
        ARB_ER=0 and ENABLED

RB (condition); defined in chart: REQ_CTL
nition: ARBR=0b0000000000

CYC (condition); defined in chart: REQ_CTL
nition: CADS_RQ=1 or SNP_RQ=1 or REG_RQ=1

R (data-item); defined in chart: REQ_CTL
: BIT-ARRAY
ces: 3 Downto 0

CI (data-item); defined in chart: REQ_CTL
: BIT

QSH (data-item); defined in chart: REQ_CTL
: BIT

_SNP (data-item); defined in chart: REQ_CTL
: BIT

.0 (condition); defined in chart: REQ_CTL
nition: KLOCK33N=0 and CM_IOI=0 and CW_RI=1

RQ (data-item); defined in chart: REQ_CTL
: BIT

REQ (data-item); defined in chart: REQ_CTL
: BIT

CADS (data-item); defined in chart: REQ_CTL
: BIT

SNPADS (data-item); defined in chart: REQ_CTL
: BIT

(data-item); defined in chart: REQ_CTL
: BIT

RESL (condition); defined in chart: REQ_CTL
nition: (ARBR(OWNER)=0 and BUS_USED=1 or BUS_USED=0) and not
        NO_ARB

DS (condition); defined in chart: REQ_CTL
nition: SNPADS33=1

DS33 (data-item); defined in chart: REQ_CTL
: BIT

RQ (data-item); defined in chart: REQ_CTL
: BIT

_CYC (condition); defined in chart: REQ_CTL
nition: CD_CI=1 and CW_RI=0

SQUASH_CYC (condition); defined in chart: REQ_CTL
Definition: INT_1ST or INTERVENE and CADS_RQ=1 or ALLCT

STP_CADS (condition); defined in chart: REQ_CTL
Definition: MY_INT or SPEC_CYC or INTERVENE or APIC

TMOUT (data-item); defined in chart: REQ_CTL
Type: BIT

TMOUT_HLD (data-item); defined in chart: REQ_CTL
Type: BIT

TRACKING (condition); defined in chart: REQ_CTL
Definition: CYC_TRACK=1
```

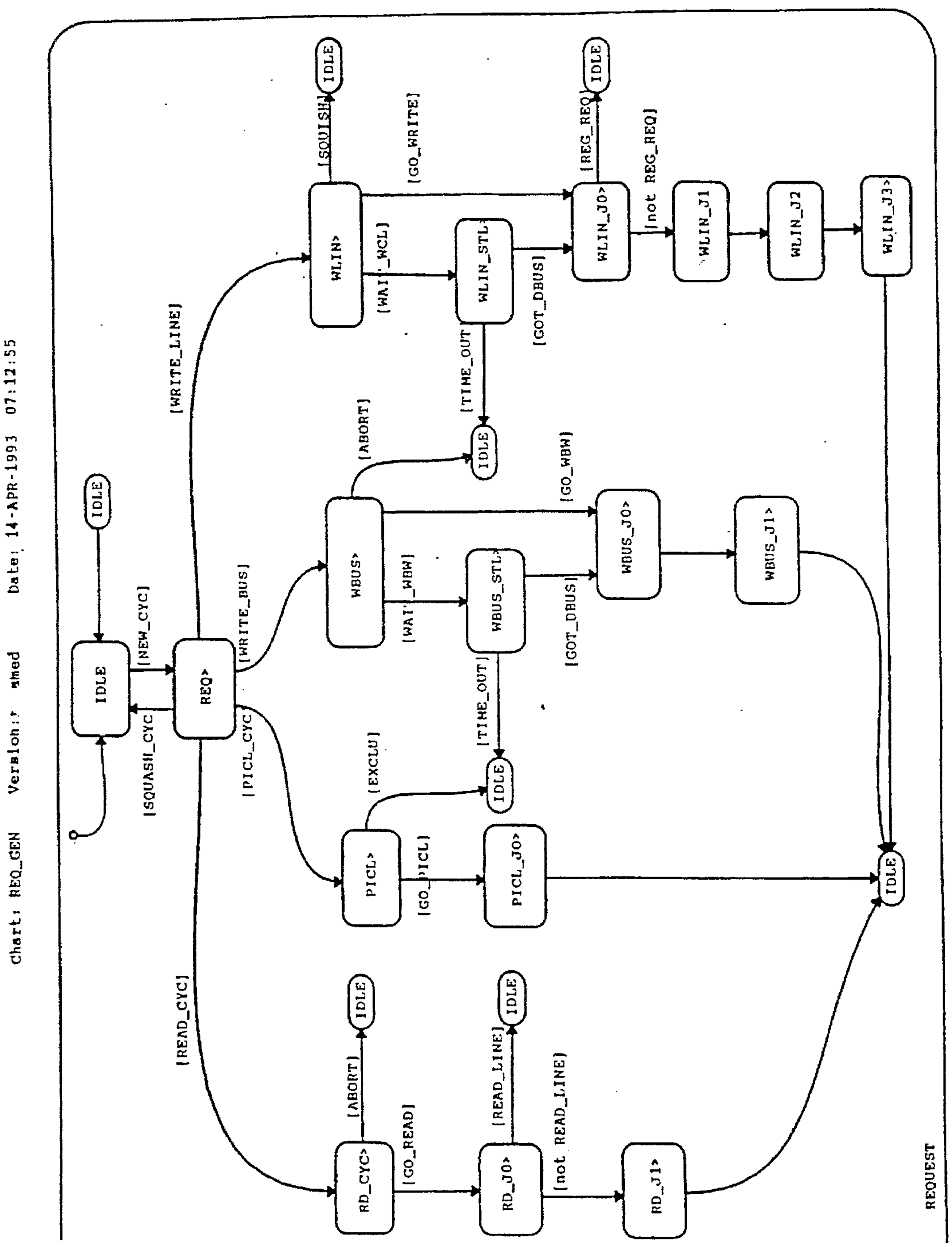
Chart: REQ_GEN
Date: 14-APR-1993 07:12:55
IDLE
[NEW_CYC]
[SQUASH_CYC]
REQ>
[WRITE_LINE]
[WRITE_BUS]
[PICL_CYC]
[READ_CYC]
WLIN>
[SQUISH]
[GO_WRITE]
[WAIT_WCL]
WLIN_STL
[GOT_DBUS]
[TIME_OUT]
WLIN_J0>
[REG_REQ]
[not REG_REQ]
WLIN_J1
WLIN_J2
WLIN_J3>
WBUS>
[ABORT]
[GO_WBW]
[WAIT_WBW]
WBUS_STL
WBUS_J0>
WBUS_J1>
PICL>
[EXCLU]
[GO_PICL]
PICL_J0>
RD_CYC>
[GO_READ]
RD_J0>
[READ_LINE]
[not READ_LINE]
RD_J1>
REQUEST

```
.onary for chart REQ_GEN
.-------  -------------

:s with ..atic Reactions and Activities Throughout/Within
-----------------------------------------------------------

 BASIC
:ions: entering/MY_CMD(7..0):=0x1C;
       MEM_ADD;
       PICL_SNP:=1
       exiting/PICL_SNP:=0;
       MYREQ:=0;
       ARBONO:=1

_J0
 BASIC
:ions: entering/START_BUS;
       CLR_REQ:=1
       exiting/CLEAR_BUS;
       MYCYC:=0;
       CLR_REQ:=0

tC
: BASIC
tions: entering/READ_CMD;
       MY_BL(7..0):=not MBEI(7..0);
       if IORO then
         IO_ADD
       else
         MEM_ADD
       end if
       exiting/if ABORT then
         MYREQ:=0;
         ARBONO:=1
       end if

0
: BASIC
tions: entering/START_BUS;
       if READ_LINE then
         MYREQ:=0;
         ARBONO:=1;
         MYREAD:=1
       end if;
       CLR_REQ:=1
       exiting/MYCYC:=0;
       CLR_REQ:=0;
       if READ_LINE then
         CLEAR_BUS;
         MYREAD:=0
       end if

1
: BASIC
tions: entering/BYTE_ADD;
       MYREQ:=0;
       ARBONO:=1
       exiting/CLEAR_BUS
```

```
Type: BASIC
Reactions: entering/MYREQ:=1
           exiting/if INT_1ST then
             FSTINT:=1
           end if;
           if ALLCT then
             ALLOC:=1
           end if;
           if SQUASH_CYC then
             MYREQ:=0
           end if;
           if SNP_RQ=1 or REG_RQ=1 or CADS_RQ=1 and WCL then
             RESPREQ:=1
           end if

WBUS
Type: BASIC
Reactions: entering/WBUS_CMD;
           MY_BL(7..0):=not MBEI(7..0);
           if IOW then
             IO_ADD
           else
             MEM_ADD
           end if
           exiting/if ABORT then
             MYREQ:=0;
             ARBONO:=1
           end if

WBUS_J0
Type: BASIC
Reactions: entering/START_BUS;
           DSONO:=MAR5;
           DS1NO:=not MAR5;
           CLR_REQ:=1
           exiting/MYCYC:=0;
           CLR_REQ:=0;
           ARBONO:=1

WBUS_J1
Type: BASIC
Reactions: entering/BYTE_ADD;
           DSONO:=1;
           DS1NO:=1;
           MYREQ:=0;
           MY_BL(7..0):=not MBEI(7..0)
           exiting/CLEAR_BUS

WBUS_STL
Type: BASIC
Reactions: exiting/if TIME_OUT then
             MYREQ:=0;
             ARBONO:=1
           end if

WLIN
Type: BASIC
Reactions: entering/if WRITE_MEM then
             MY_CMD(7..0):=0x08;
             MEM_ADD
```

```
        end if;
        i  `ACHE_2_CACHE then
            _CMD(7..0):=0x09;
          RLR_ADD
        end if;
        if REGISTER_READ then
          MY_CMD(7..0):=0x19;
          REG_ADD
        end if
        exiting/if SQUISH then
          MYREQ:=0;
          ARBONO:=1;
          RESPREQ:=0
        end if

_J0
: BASIC
tions: entering/START_BUS;
        MYREQ:=0;
        ARBONO:=1;
        RESPREQ:=0;
        if MAR5=1 and REG_RQ=0 or ODD_RG=1 and REG_RQ=1 then
          DS1NO:=0
        else
          DSONO:=0
        end if;
        CLR_REQ:=1
        exiting/CLEAR_BUS;
        MYCYC:=0;
        if REG_REQ then
          DSONO:=1;
          DS1NO:=1
        end if;
        CLR_REQ:=0

_J3
: BASIC
tions: entering/MYREQ:=0;
        MYREQ:=0
        exiting/DSONO:=1;
        DS1NO:=1

_STL
: BASIC
tions: exiting/if TIME_OUT then
          MYREQ:=0;
          ARBONO:=1;
          RESPREQ:=0
        end if

ents defined and/or used in chart REQ_GEN
-----------------------------------------
T (condition); defined in chart: REQ_GEN
nition: INTERVENE or TIME_OUT

PAR (data-item); defined in chart: REQ_GEN
nition: ADD_PAR1 xor ADD_PAR2 xor ADD_PAR3

PAR1 (data-item); defined in chart: REQ_GEN
nition: MY_AD(31) xor MY_AD(30) xor MY_AD(29) xor MY_AD(28)
            xor MY_AD(27) xor MY_AD(26) xor MY_AD(25) xor MY_AD
            (24)

ADD_PAR2 (data-item); defined in chart: REQ_GEN
Definition: MY_AD(23) xor MY_AD(22) xor MY_AD(21) xor MY_AD(20)
            xor MY_AD(19) xor MY_AD(18) xor MY_AD(17) xor MY_AD
            (16) xor MY_AD(15) xor MY_AD(14) xor MY_AD(13) xor
            MY_AD(12)

ADD_PAR3 (data-item); defined in chart: REQ_GEN
Definition: MY_AD(11) xor MY_AD(10) xor MY_AD(9) xor MY_AD(8) xor
            MY_AD(7) xor MY_AD(6) xor MY_AD(5) xor MY_AD(4) xor
            MY_AD(3)

ALLCT (condition); defined in chart: REQ_CTL
Definition: CADS_RQ=1 and CM_IOI=0 and CW_RI=0 and PALLCI=1 and
            MY_MKEN=0

ALLOC (data-item); defined in chart: REQ_CTL
Type: BIT

AO (data-item); defined in chart: REQ_GEN
Type: BIT-ARRAY
Indices: 31 Downto 3

APO (data-item); defined in chart: REQ_GEN
Type: BIT

APODD (data-item); defined in chart: REQ_GEN
Type: BIT

ARBONO (data-item); defined in chart: REQ_CTL
Type: BIT

BG_INT (data-item); defined in chart: REQ_GEN
Type: BIT-ARRAY
Indices: 16 Downto 0

BLODD (data-item); defined in chart: REQ_GEN
Type: BIT

BYTE_ADD (action); defined in chart: REQ_GEN
Definition: AO(31..16):=0xFFFF;
            AO(15..8):=MY_BL(7..0);
            AO(7..3):=0x1F;
            if (MY_CMD=0x10 or MY_CMD=0x20) and REG_ACC or MY_CMD=
            0x18 or MY_CMD=0x19 or MY_CMD=28 or MY_CMD=0x38 then
              APO:=MBE_PAR xor BLODD
            else
              APO:=MBE_PAR
            end if

CACHE_2_CACHE (condition); defined in chart: REQ_GEN
Definition: SNP_RQ=1 and not TO_MEM

CADS_RQ (data-item); defined in chart: REQ_CTL
Type: BIT

CD_CI (data-item); defined in chart: REQ_CTL
Type: BIT
```

```
R_BUS (ar-tion); defined in chart: REQ_GEN
nition:    O(7..0):=0xFF;
        C.O:=1;
        AO(31..3):=0b11111111111111111111111111111;
        APO:=1;
        CSNO:=1;
        FRC_PAR:=0

REQ (data-item); defined in chart: REQ_CTL
: BIT

 (data-item); defined in chart: REQ_GEN
: BIT-ARRAY
ces: 7 Downto 0

PAR (data-item); defined in chart: REQ_GEN
nition: MY_CMD(7) xor MY_CMD(6) xor MY_CMD(5) xor MY_CMD(4)
        xor MY_CMD(3) xor MY_CMD(2) xor MY_CMD(1) xor MY_CMD
        (0)

OI (data-item); defined in chart: REQ_CTL
: BIT

NI (data-item); defined in chart: REQ_GEN
: BIT

(data-item); defined in chart: REQ_GEN
: BIT

D (data-item); defined in chart: REQ_GEN
: BIT

NI (data-item); defined in chart: REQ_GEN
: BIT

 (data-item); defined in chart: REQ_GEN
: BIT

I (data-item); defined in chart: REQ_CTL
: BIT

O (data-item); defined in chart: REQ_GEN
: BIT

 (data-item); defined in chart: REQ_CTL
: BIT

O (data-item); defined in chart: REQ_GEN
: BIT

 (data-item); defined in chart: REQ_CTL
: BIT

EVE (data-item); defined in chart: REQ_CTL
: BIT

ODD (data-item); defined in chart: REQ_CTL
: BIT

EXCLU (condition); defined in chart: REQ_GEN
Definition: PCLSQSH=1 or ABORT

FRC_PAR (data-item); defined in chart: REQ_GEN
Type: BIT

FSTINT (data-item); defined in chart: REQ_CTL
Type: BIT

GOT_DBUS (condition); defined in chart: REQ_GEN
Definition: MYDBUS and not TIME_OUT

GO_PICL (condition); defined in chart: REQ_GEN
Definition: MYCYCLE and not (EXCLU or TIME_OUT)

GO_READ (condition); defined in chart: REQ_GEN
Definition: MYCYCLE and not (INTERVENE or TIME_OUT)

GO_WBW (condition); defined in chart: REQ_GEN
Definition: MYCYCLE and MYDBUS and not ABORT

GO_WRITE (condition); defined in chart: REQ_GEN
Definition: MYCYCLE and MYDBUS and not SQUISH

INTA (condition); defined in chart: REQ_CTL
Definition: CM_IOI=1 and CD_CI=1 and CW_RI=1 and EXTINTAR=1

INTERVENE (condition); defined in chart: REQ_CTL
Definition: INTV=1

INT_1ST (condition); defined in chart: REQ_CTL
Definition: CADS_RQ=1 and INTA and not MBEI(7..0)=0x01

IORO (condition); defined in chart: REQ_GEN
Definition: CM_IOI=1 and CD_CI=0 and CW_RI=1

IOW (condition); defined in chart: REQ_GEN
Definition: CM_IOI=1 and CD_CI=0 and CW_RI=0

IO_ADD (action); defined in chart: REQ_GEN
Definition: MY_AD(31..5):=MAR(31..5);
            MY_AD(4..3):=MAR(4..3)

KLOCK33N (data-item); defined in chart: REQ_CTL
Type: BIT

MAR (data-item); defined in chart: REQ_GEN
Type: BIT-ARRAY
Indices: 31 Downto 3

MAR5 (data-item); defined in chart: REQ_GEN
Type: BIT

MBEI (data-item); defined in chart: REQ_CTL
Type: BIT-ARRAY
Indices: 7 Downto 0

MBE_PAR (data-item); defined in chart: REQ_GEN
Definition: MY_BL(7) xor MY_BL(6) xor MY_BL(5) xor MY_BL(4) xor
            MY_BL(3) xor MY_BL(2) xor MY_BL(1) xor MY_BL(0)
```

```
HEI (dat- 'tem); defined in chart: REQ_GEN
: BIT

ADD (action); defined in chart: REQ_GEN
nition: MY_AD(31..5):=MAR(31..5);
        MY_AD(4..3):=MAR(4..3)

SY (data-item); defined in chart: REQ_GEN
: BIT

C (data-item); defined in chart: REQ_GEN
: BIT

CLE (condition); defined in chart: REQ_CTL
nition: SET_RESL and (BUSLR=0 or RESPREQ=1 or in(MY_BUSL))
        and ME_NXT_LOC

US (condition); defined in chart: REQ_GEN
nition: ORD0R=0 and (DS0R=0 or DS4_EVE=1) and (MAR5=0 and
        REG_RQ=0 or ODD_RG=0 and REG_RQ=1) or ORD1R=0 and
        (DS1R=0 or DS4_ODD=1) and (MAR5=1 and REG_RQ=0 or
        ODD_RG=1 and REG_RQ=1)

AD (data-item); defined in chart: REQ_GEN
:: BIT

Q (data-item); defined in chart: REQ_CTL
:: BIT

D (data-item); defined in chart: REQ_GEN
:: BIT-ARRAY
ces: 31 Downto 3

L (data-item); defined in chart: REQ_GEN
:: BIT-ARRAY
ces: 7 Downto 0

MD (data-item); defined in chart: REQ_GEN
:: BIT-ARRAY
ces: 7 Downto 0

KEN (data-item); defined in chart: REQ_CTL
:: BIT

RO (data-item); defined in chart: REQ_GEN
:: BIT

_CYC (condition); defined in chart: REQ_CTL
inition: ((CADS or SNPADS) and not TRACKING or NXT_CYC) and
        ARB_ER=0 and ENABLED

_RG (data-item); defined in chart: REQ_GEN
:: BIT

R (data-item); defined in chart: REQ_GEN
:: BIT

R (data-item); defined in chart: REQ_GEN
:: BIT

PALLCI (data-item); defined in chart: REQ_CTL
Type: BIT

PCLSQSH (data-item); defined in chart: REQ_CTL
Type: BIT

PICL (state); defined in chart: REQ_GEN

PICL_CYC (condition); defined in chart: REQ_GEN
Definition: CADS_RQ=1 and PICL_PND and PICL_WBW=0

PICL_PND (condition); defined in chart: REQ_GEN
Definition: KLOCK33N=1 and CM_IOI=0 and CW_RI=0 and MCACHEI=0 and
            PALLCI=0 and CPWTNI=1 and CPCDNI=1 and MY_MRO=1

PICL_SNP (data-item); defined in chart: REQ_CTL
Type: BIT

PICL_WBW (data-item); defined in chart: REQ_GEN
Type: BIT

PRECS (condition); defined in chart: REQ_GEN
Definition: in(RD_CYC) or in(PICL) or in(WBUS) or in(WLIN) or in
            (WBUS_STL) or in(WLIN_STL)

RBW0 (condition); defined in chart: REQ_GEN
Definition: KLOCK33N=1 and CM_IOI=0 and CW_RI=1 and RDYSRCNI=0
            and (MY_MKEN=1 or MCACHEI=0)

RBWL0 (condition); defined in chart: REQ_CTL
Definition: KLOCK33N=0 and CM_IOI=0 and CW_RI=1

RCL0 (condition); defined in chart: REQ_GEN
Definition: KLOCK33N=1 and CM_IOI=0 and CW_RI=1 and MY_MKEN=0 and
            MCACHEI=1 and RDYSRCNI=0

RDYSRCNI (data-item); defined in chart: REQ_GEN
Type: BIT

RD_CYC (state); defined in chart: REQ_GEN

READ_CMD (action); defined in chart: REQ_GEN
Definition: if RCL0 then
              MY_CMD(7..0):=0x00
            end if;
            if RIL0 then
              MY_CMD(7..0):=0x04
            end if;
            if RBW0 then
              MY_CMD(7..0):=0x10
            end if;
            if RBWL0 then
              MY_CMD(7..0):=0x20
            end if;
            if IOR0 then
              MY_CMD(7..0):=0x30
            end if;
            if INTA then
              MY_CMD(7..0):=0x3C
```

```
        end if

)_CYC (cc    tion); defined in chart: REQ_GEN
inition: CADS_RQ=1 and (RCLO or RILO or RBWO or RBWLO or IORO
        or INTA) and not SQUASH_CYC

)_LINE (condition); defined in chart: REQ_GEN
inition: RCLO or RILO

ISTER_READ (condition); defined in chart: REQ_GEN
inition: REG_RQ=1

_ACC (condition); defined in chart: REQ_GEN
inition: MAR(31..15)=BG_INT(16..0) and MAR(14)=0 or MAR(31..12)
        =0xFFFC0 and MAR(11..9)=0b000

_ADD (action); defined in chart: REQ_GEN
inition: MY_AD(31..15):=0x00;
        MY_AD(14):=0b0;
        MY_AD(13..8):=RIDRWR(5..0);
        MY_AD(7..3):=0x00

_REQ (condition); defined in chart: REQ_GEN
inition: REG_RQ=1

_RQ (data-item); defined in chart: REQ_CTL
e: BIT

PREQ (data-item); defined in chart: REQ_CTL
e: BIT

RLR (data-item); defined in chart: REQ_GEN
e: BIT-ARRAY
ices: 5 Downto 0

RWR (data-item); defined in chart: REQ_GEN
e: BIT-ARRAY
ices: 5 Downto 0

0 (condition); defined in chart: REQ_GEN
inition: KLOCK33N=1 and CM_IOI=0 and CW_RI=1 and RDYSRCNI=1

_ADD (action); defined in chart: REQ_GEN
inition: MY_AD(31..15):=0x00;
        MY_AD(14):=0b0;
        MY_AD(13..8):=RIDRLR(5..0);
        MY_AD(7..3):=0x00

_RQ (data-item); defined in chart: REQ_CTL
e: BIT

ASH_CYC (condition); defined in chart: REQ_CTL
inition: INT_1ST or INTERVENE and CADS_RQ=1 or ALLCT

ISH (condition); defined in chart: REQ_GEN
inition: INTERVENE and CADS_RQ=1 or TIME_OUT

RT_BUS (action); defined in chart: REQ_GEN
inition: CMDO(7..0):=MY_CMD(7..0);
        AO(31..3):=MY_AD(31..3);
        CSNO:=0;
        MYCYC:=1;
        if (MY_CMD=0x10 or MY_CMD=0x20) and REG_/    or MY_CMD=
        0x18 or MY_CMD=0x19 or MY_CMD=0x28 or MY_...D=0x38 then
          APO:=ADD_PAR xor APODD;
          CPO:=CMD_PAR xor CPODD;
          if APODD=1 or CPODD=1 or BLODD=1 then
            FRC_PAR:=1
          end if
        else
          APO:=ADD_PAR;
          CPO:=CMD_PAR
        end if

TIME_OUT (condition); defined in chart: REQ_GEN
Definition: TMOUT=1 or TMOUT_HLD=1

TMOUT (data-item); defined in chart: REQ_CTL
Type: BIT

TMOUT_HLD (data-item); defined in chart: REQ_CTL
Type: BIT

TO_MEM (condition); defined in chart: REQ_GEN
Definition: MLRBSY=1

WAIT_WBW (condition); defined in chart: REQ_GEN
Definition: MYCYCLE and not (MYDBUS or ABORT)

WAIT_WCL (condition); defined in chart: REQ_GEN
Definition: MYCYCLE and not (MYDBUS or SQUISH)

WBUS (state); defined in chart: REQ_GEN

WBUS_CMD (action); defined in chart: REQ_GEN
Definition: if WBW or PICL_PND and PICL_WBW=1 then
              MY_CMD(7..0):=0x18
            end if;
            if WBWL then
              MY_CMD(7..0):=0x28
            end if;
            if IOW then
              MY_CMD(7..0):=0x38
            end if

WBUS_STL (state); defined in chart: REQ_GEN

WBW (condition); defined in chart: REQ_GEN
Definition: KLOCK33N=1 and CM_IOI=0 and CW_RI=0 and MCACHEI=0 and
            (CPCDNI=0 or CPWTNI=0 or PALLCI=1 and MY_MKEN=1 or
            PALLCI=1 and MY_MRO=0)

WBWL (condition); defined in chart: REQ_GEN
Definition: KLOCK33N=0 and CM_IOI=0 and CW_RI=0

WCL (condition); defined in chart: REQ_GEN
Definition: CM_IOI=0 and CW_RI=0 and MCACHEI=1

WLIN (state); defined in chart: REQ_GEN
```

```
.STL (state); defined in chart: REQ_GEN

:_BUS (c    ition); defined in chart: REQ_GEN
ition: CADS_RQ=1 and (WBW or WBWL or IOW or PICL_WBW=1 and
        PICL_PND)

:_LINE (condition); defined in chart: REQ_GEN
ition: SNP_RQ=1 or REG_RQ=1 or WCL and CADS_RQ=1

:_MEM (condition); defined in chart: REQ_GEN
ition: SNP_RQ=1 and TO_MEM or CADS_RQ=1
```

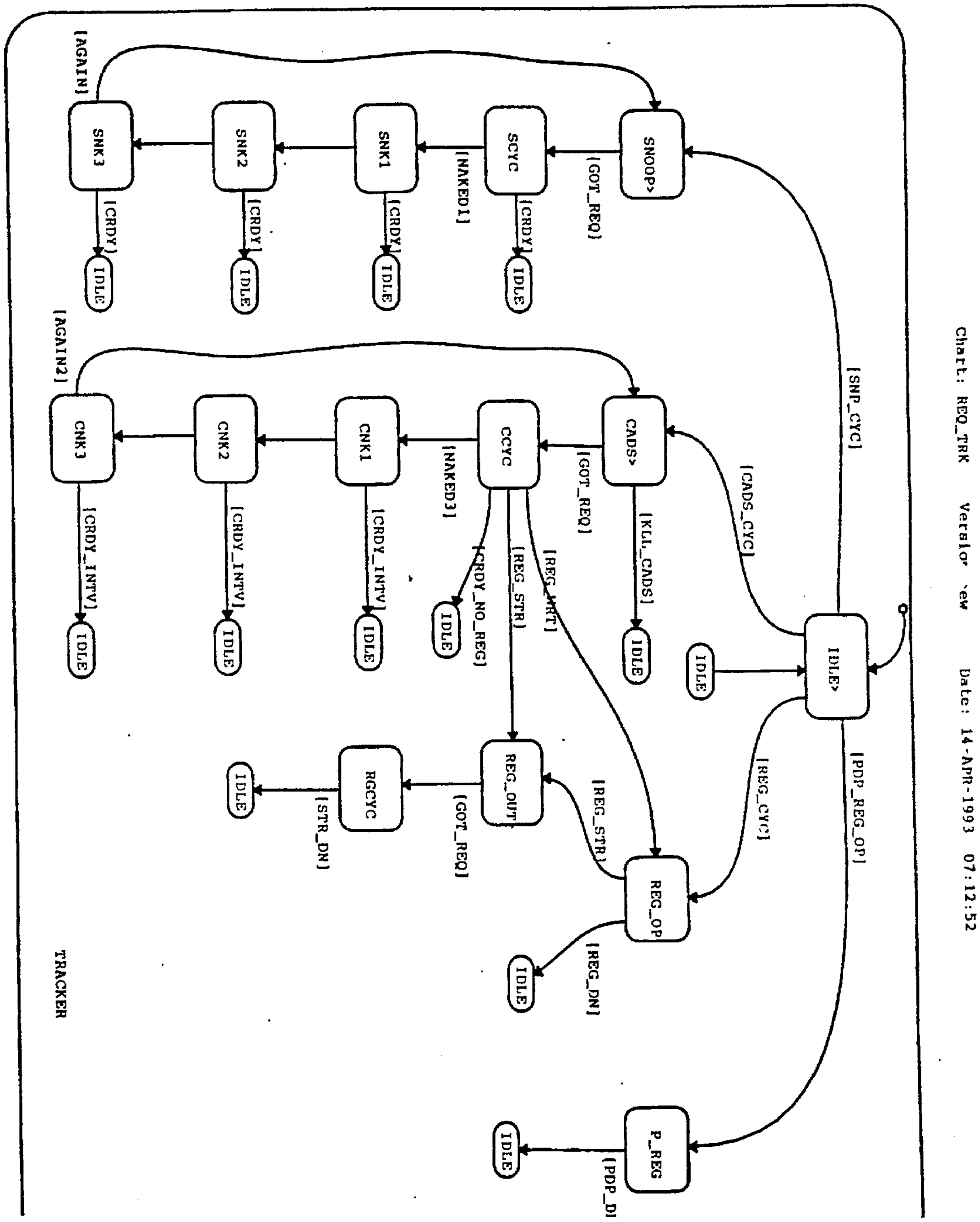
Chart: REQ_TRK
Date: 14-APR-1993 07:12:52
TRACKER
IDLE>
SNOOP>
SCYC
SNK1
SNK2
SNK3
CADS>
CCYC
CNK1
CNK2
CNK3
REG_OUT
RGCYC
REG_OP
P_REG
IDLE
[SNP_CYC]
[GOT_REQ]
[NAKED1]
[CRDY]
[AGAIN]
[CADS_CYC]
[KLL_CADS]
[NAKED3]
[CRDY_INTV]
[AGAIN2]
[CRDY_NO_REG]
[REG_STR]
[REG_HIT]
[REG_CYC]
[PDP_REG_OP]
[STR_DN]
[REG_DN]

```
ionary for chart REQ_TRK
--------  -------------

es with static Reactions and Activities Throughout/Within
----------------------------------------------------------

: BASIC
tions: entering/CADS_RQ:=not (TMOUT or TMOUT_HLD)
       exiting/CADS_RQ:=0

: BASIC
tions: exiting/CYC_TRACK:=1
       entering/CYC_TRACK:=0

OUT
: BASIC
tions: entering/REG_RQ:=not (TMOUT or TMOUT_HLD)
       exiting/REG_RQ:=0

P
: BASIC
tions: entering/SNP_RQ:=not (TMOUT or TMOUT_HLD)
       exiting/SNP_RQ:=0

ents defined and/or used in chart REQ_TRK
-----------------------------------------

N (condition); defined in chart: REQ_TRK
nition: not CRDY

N2 (condition); defined in chart: REQ_TRK
nition: not CRDY_INTV

C (data-item); defined in chart: REQ_CTL
: BIT

(condition); defined in chart: REQ_CTL
nition: CADS33=1 and not STP_CADS

_CYC (condition); defined in chart: REQ_TRK
nition: (CADS or SAW_CADS=1) and not (SNP_CYC or REG_CYC) and
        INIT_REG=0 and SEN=1

_RQ (data-item); defined in chart: REQ_CTL
: BIT

REQ (data-item); defined in chart: REQ_CTL
: BIT

(condition); defined in chart: REQ_TRK
nition: CRDY33N=0

33N (data-item); defined in chart: REQ_TRK
: BIT

_INTV (condition); defined in chart: REQ_TRK
nition: CRDY33N=0 or INTV=1

_NO_REG (condition); defined in chart: REQ_TRK
nition: CRDY33N=0 and not REG_WRT

CYC_TRACK (data-item); defined in chart: REQ_CTL
Type: BIT

GOT_REQ (condition); defined in chart: REQ_TRK
Definition: CLR_REQ=1 or TMOUT_HLD=1 or TMOUT=1

INIT_REG (data-item); defined in chart: REQ_TRK
Type: BIT

INTV (data-item); defined in chart: REQ_CTL
Type: BIT

KLL_CADS (condition); defined in chart: REQ_TRK
Definition: INTV=1 or PICL_SNP=1 and PCLSQSH=1 or ALLOC=1 or in
            (REQUEST.REQ) and SQUASH_CYC

NAKED1 (condition); defined in chart: REQ_TRK
Definition: NAKRTRY=1 and not CRDY

NAKED3 (condition); defined in chart: REQ_TRK
Definition: NAKRTRY=1 and not CRDY_INTV

NAKRTRY (data-item); defined in chart: REQ_TRK
Type: BIT

PCLSQSH (data-item); defined in chart: REQ_CTL
Type: BIT

PDP_DN (condition); defined in chart: REQ_TRK
Definition: PDP_REG=0 and INIT_REG=0

PDP_REG (data-item); defined in chart: REQ_TRK
Type: BIT

PDP_REG_OP (condition); defined in chart: REQ_TRK
Definition: SEN=1 and (PDP_REG=1 and not (REG_CYC or SNP_CYC or
            CADS_CYC) or INIT_REG=1)

PICL_SNP (data-item); defined in chart: REQ_CTL
Type: BIT

REG_CYC (condition); defined in chart: REQ_TRK
Definition: RG_BSY=1 and INIT_REG=0

REG_DN (condition); defined in chart: REQ_TRK
Definition: RG_BSY=0 and not REG_STR

REG_RD (data-item); defined in chart: REQ_TRK
Type: BIT

REG_RQ (data-item); defined in chart: REQ_CTL
Type: BIT

REG_STR (condition); defined in chart: REQ_TRK
Definition: REG_RD=1

REG_WRT (condition); defined in chart: REQ_TRK
Definition: RG_BSY=1 and WRREG=1
```

```
state); defined in chart: REQ_GEN

[ (dat.   .em); defined in chart: REQ_TRK
 BIT

DS (data-item); defined in chart: REQ_CTL
 BIT

PADS (data-item); defined in chart: REQ_CTL
 BIT

lata-item); defined in chart: REQ_CTL
 BIT

333 (data-item); defined in chart: REQ_CTL
 BIT

YC (condition); defined in chart: REQ_TRK
ition: (SNPADS33=1 or SAW_SNPADS=1) and not REG_CYC and
       INIT_REG=0 and SEN=1

Q (data-item); defined in chart: REQ_CTL
 BIT

H_CYC (condition); defined in chart: REQ_CTL
ition: INT_1ST or INTERVENE and CADS_RQ=1 or ALLCT

N (condition); defined in chart: REQ_TRK
ition: REG_RD=0

 (data-item); defined in chart: REQ_CTL
 BIT

_HLD (data-item); defined in chart: REQ_CTL
 BIT

: (data-item); defined in chart: REQ_TRK
 BIT
```

1101
1102
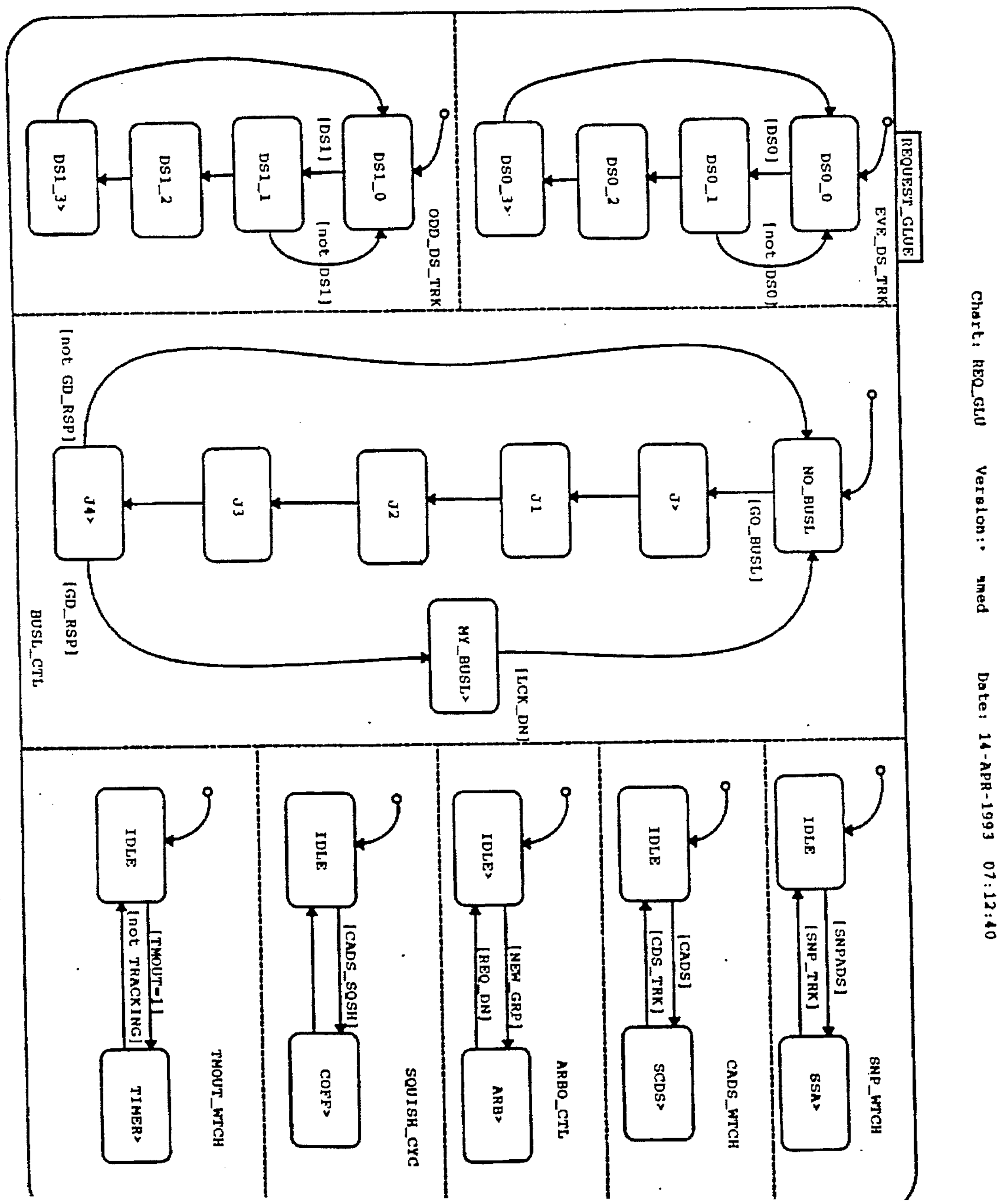

```
ionary for chart REQ_GLU
--------  -------------

es with Static Reactions and Activities Throughout/Within
---------------------------------------------------------

: BASIC
tions: entering/ARBONO:=0;
       LD_MASK

: BASIC
tions: entering/ALLOC:=0;
       FSTINT:=0

3
: BASIC
tions: entering/DS4_EVE:=1
       exiting/DS4_EVE:=0

3
: BASIC
tions: entering/DS4_ODD:=1
       exiting/DS4_ODD:=0

:: BASIC
ue name: ARBO_CTL.IDLE
tions: entering/ARBONO:=1

:: BASIC
tions: entering/BUSLNO:=0

:: BASIC
tions: exiting/if not GD_RSP then
         BUSLNO:=1
       end if

USL
:: BASIC
tions: exiting/BUSLNO:=1

:: BASIC
tions: entering/SAW_CADS:=1
       exiting/SAW_CADS:=0

:: BASIC
tions: entering/SAW_SNPADS:=1
       exiting/SAW_SNPADS:=0

ER
:: BASIC
tions: entering/TMOUT_HLD:=1
       exiting/TMOUT_HLD:=0

ments defined and/or used in chart REQ_GLU
---------------------------------------------
ALLCT (condition); defined in chart: REQ_CTL
Definition: CADS_RQ=1 and CM_IOI=0 and CW_RI=0 and P    :I=1 and
            MY_MKEN=0

ALLOC (data-item); defined in chart: REQ_CTL
Type: BIT

ARBONO (data-item); defined in chart: REQ_CTL
Type: BIT

ARBR (data-item); defined in chart: REQ_CTL
Type: BIT-ARRAY
Indices: 9 Downto 0

BUSLNO (data-item); defined in chart: REQ_GLU
Type: BIT

BUSLR (data-item); defined in chart: REQ_CTL
Type: BIT

CADS (condition); defined in chart: REQ_CTL
Definition: CADS33=1 and not STP_CADS

CADS_RQ (data-item); defined in chart: REQ_CTL
Type: BIT

CADS_SQSH (condition); defined in chart: REQ_GLU
Definition: ALLOC=1 or FSTINT=1

CDS_TRK (condition); defined in chart: REQ_GLU
Definition: CADS_RQ=1 or INTERVENE

CSCYCNI (data-item); defined in chart: REQ_GLU
Type: BIT

DS0 (condition); defined in chart: REQ_GLU
Definition: DS0R=1

DS0R (data-item); defined in chart: REQ_CTL
Type: BIT

DS1 (condition); defined in chart: REQ_GLU
Definition: DS1R=1

DS1R (data-item); defined in chart: REQ_CTL
Type: BIT

DS4_EVE (data-item); defined in chart: REQ_CTL
Type: BIT

DS4_ODD (data-item); defined in chart: REQ_CTL
Type: BIT

FSTINT (data-item); defined in chart: REQ_CTL
Type: BIT

GD_RSP (condition); defined in chart: REQ_GLU
Definition: RSP(4..0)=0x10 or RSP(4..0)=0x11 or RSP(4..0)=0x14 or
            RSP(4..0)=0x15
```

```
JSL (condition); defined in chart: REQ_GLU
ition:    YCLE and RBWLO and SPLIT_CYC

 (condition); defined in chart: REQ_CTL
ition: CM_IOI=1 and CD_CI=1 and CW_RI=1 and EXTINTAR=1

RVENE (condition); defined in chart: REQ_CTL
ition: INTV=1

) (condition); defined in chart: REQ_GLU
ition: ARBR(9..0)=0x0001 or ARBR(9..0)=0x0002 or ARBR(9..0)=
       0x0004 or ARBR(9..0)=0x0008 or ARBR(9..0)=0x0010

L (condition); defined in chart: REQ_GLU
ition: ARBR(9..0)=0x0020 or ARBR(9..0)=0x0040 or ARBR(9..0)=
       0x0080 or ARBR(9..0)=0x0100 or ARBR(9..0)=0x0200

_SLOT (condition); defined in chart: REQ_GLU
ition: LAST1 or LAST0

ON (condition); defined in chart: REQ_GLU
ition: not SPLIT_CYC

ASK (action); defined in chart: REQ_GLU
ition: if SID(3..0)=0x0 then
         MASK(9..1):=0x1FF
       end if;
       if SID(3..0)=0x1 then
         MASK(9..1):=0x1FE
       end if;
       if SID(3..0)=0x2 then
         MASK(9..1):=0x1FC
       end if;
       if SID(3..0)=0x3 then
         MASK(9..1):=0x1F8
       end if;
       if SID(3..0)=0x4 then
         MASK(9..1):=0x1F0
       end if;
       if SID(3..0)=0x5 then
         MASK(9..1):=0x1E0
       end if;
       if SID(3..0)=0x6 then
         MASK(9..1):=0x1C0
       end if;
       if SID(3..0)=0x7 then
         MASK(9..1):=0x180
       end if;
       if SID(3..0)=0x8 then
         MASK(9..1):=0x100
       end if;
       if SID(3..0)=0x9 then
         MASK(9..1):=0x000
       end if

(data-item); defined in chart: REQ_CTL
 BIT-ARRAY
es: 9 Downto 1

MBEI (data-item); defined in chart: REQ_CTL
Type: BIT-ARRAY
Indices: 7 Downto 0

MYCYCLE (condition); defined in chart: REQ_CTL
Definition: SET_RESL and (BUSLR=0 or RESPREQ=1 or in(MY_BUSL))
            and ME_NXT_LOC

MYREQ (data-item); defined in chart: REQ_CTL
Type: BIT

MY_BUSL (state); defined in chart: REQ_GLU

NEW_CYC (condition); defined in chart: REQ_CTL
Definition: ((CADS or SNPADS) and not TRACKING or NXT_CYC) and
            ARB_ER=0 and ENABLED

NEW_GRP (condition); defined in chart: REQ_GLU
Definition: OK_2_FORM and (NEW_CYC and not STP_ARB or MYREQ=1 and
            not SQUASH_CYC)

NO_ARB (condition); defined in chart: REQ_CTL
Definition: ARBR=0b0000000000

NO_BUSL (state); defined in chart: REQ_GLU

OK_2_FORM (condition); defined in chart: REQ_GLU
Definition: (BUSLR=0 or RESPREQ=1 or in(MY_BUSL)) and (LAST_SLOT
            or NO_ARB)

RBWLO (condition); defined in chart: REQ_CTL
Definition: KLOCK33N=0 and CM_IOI=0 and CW_RI=1

REQ_DN (condition); defined in chart: REQ_GLU
Definition: MYREQ=0 or BUSLR=1 and RESPREQ=0 and in(NO_BUSL)

RESPREQ (data-item); defined in chart: REQ_CTL
Type: BIT

RSP (data-item); defined in chart: REQ_GLU
Type: BIT-ARRAY
Indices: 4 Downto 0

SAW_CADS (data-item); defined in chart: REQ_CTL
Type: BIT

SAW_SNPADS (data-item); defined in chart: REQ_CTL
Type: BIT

SID (data-item); defined in chart: REQ_GLU
Type: BIT-ARRAY
Indices: 3 Downto 0

SNPADS (condition); defined in chart: REQ_CTL
Definition: SNPADS33=1

SNP_RQ (data-item); defined in chart: REQ_CTL
Type: BIT

SNP_TRK (condition); defined in chart: REQ_GLU
```

```
nition: SNP_RQ=1

T_CYC (condition); defined in chart: REQ_GLU
nition: CSCYCNI=0

SH_CYC (condition); defined in chart: REQ_CTL
nition: INT_1ST or INTERVENE and CADS_RQ=1 or ALLCT

ARB (condition); defined in chart: REQ_GLU
nition: INTA and not MBEI(7..0)=0x01 or ALLCT

T (data-item); defined in chart: REQ_CTL
: BIT

T_HLD (data-item); defined in chart: REQ_CTL
: BIT

KING (condition); defined in chart: REQ_CTL
nition: CYC_TRACK=1
```

APPENDIX 11

ARBITRATION LOGIC C

ZENITH DATA SYSTEMS

0.0.1 Miscellaneous Pins

The serial interface is used to load in the slice revision field (SLR) into the Slice ID Register, the slice identification number field (SIN) of the Slice Type Register, the single bus configuration bit (SBC) of the Control/Status Register and store out the phase indicator field (PH) bits and indicator bit (IND) of the Control/Status Register. The load in bits are input on the SHF_DATA pin in the order SLR(0), SLR(1) ... SLR(7), SIN(0), SIN(1), ... SIN(15), SBC. The phase indicator field (PH) bits and indicator bit (IND) of the Control/Status Register are stored out on the SHF_DATA pin in the order PH(0), PH(1), ... PH(6), IND .

Figure 0-1 Timing- External Serial Interface - STORE OUT

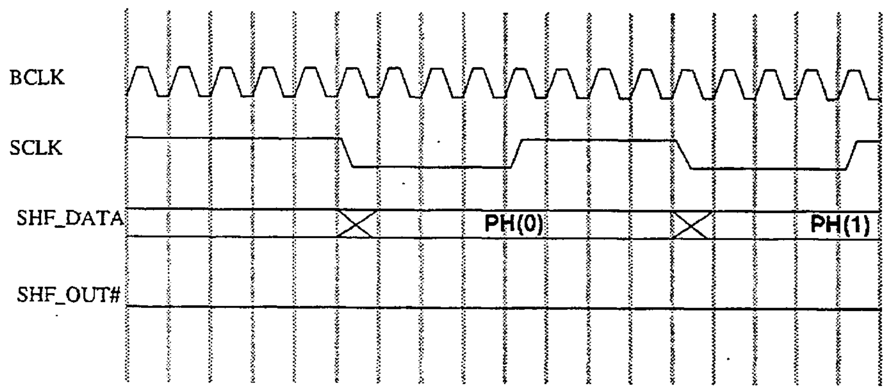

Figure 0-2 Timing- External Serial Interface - LOAD IN

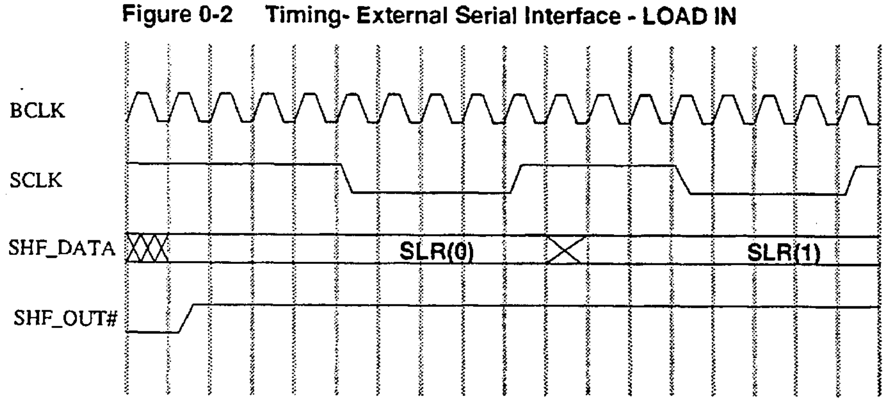

Table 0-3 Serial Interface

| Signal Names | Type | Description |
|---|---|---|
| SCLK | O | SHiFt CLocK - Approx 4MHZ ( BCLK/8 ) |
| SHF_OUT# | O | SHiFt OUT - Active Low direction of transfer - normally asserted(low) |

ZENITH DATA SYSTEMS

Table 0-3 Serial Interface

| Signal Names | Type | Description |
|---|---|---|
| SHF_DATA | I/O | SHiFt DATA - serial data in/out |
| 3 | | Total Pins |

ZENITH DATA SYSTEMS

Tne Serial Interface is used to input initial configuration (eg. SLR & SIN ) and output LED status (eg. IND & PH). The interface doesn't require system clocks, synchronizers or critical timed components.

The null state of the interface is :

SCLK = 1, not running first transition will be high to low
SHF_DATA = Driven by Master (eg. MBC)
SHF_OUT# = 0, asserted The SCLK operates at a frequency of approx 4 MHZ. For a 33 MHZ Master, the SCLK will run symmetrically for 4 BCLKs low followed by 4 BCLKS high; 8 BCLKS total. The frequency of the SCLK was determined by the worst possible timing of a PAL/PROM conbination for the input serial cycle. The input design permits up to 180 ns for the combined PAL/PROM/etc. and 60ns for the Master. This allows a selection for the PAL/PROM/etc. combination from a very wide range of part types. The SCLK must be started with a high to low transition and only run when serial data shifting.

The SHF_DATA must not be tristated for more than 60ns. This can be done by actively driving the bus from the Master except for the input cycle (done once at power up). The input cycle is entered when the SHF_OUT is deasserted, the Master tristates and the Slave acquires the SHF_-DATA. The SHF_DATA turn-around is completed during the propagation delay of SHF_OUT/PAL combination.

For seamless operation, the serial interface is sequenced at master clear time in IN to OUT order; and then OUT only.

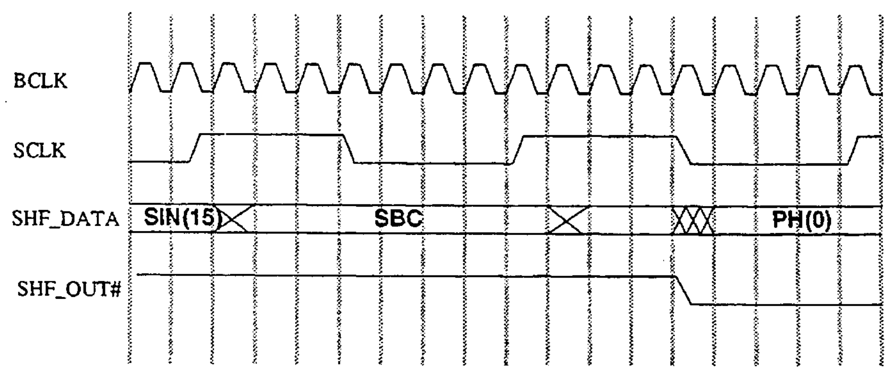

ZENITH DATA SYSTEMS
MBC Serial Data Path Block Diagram
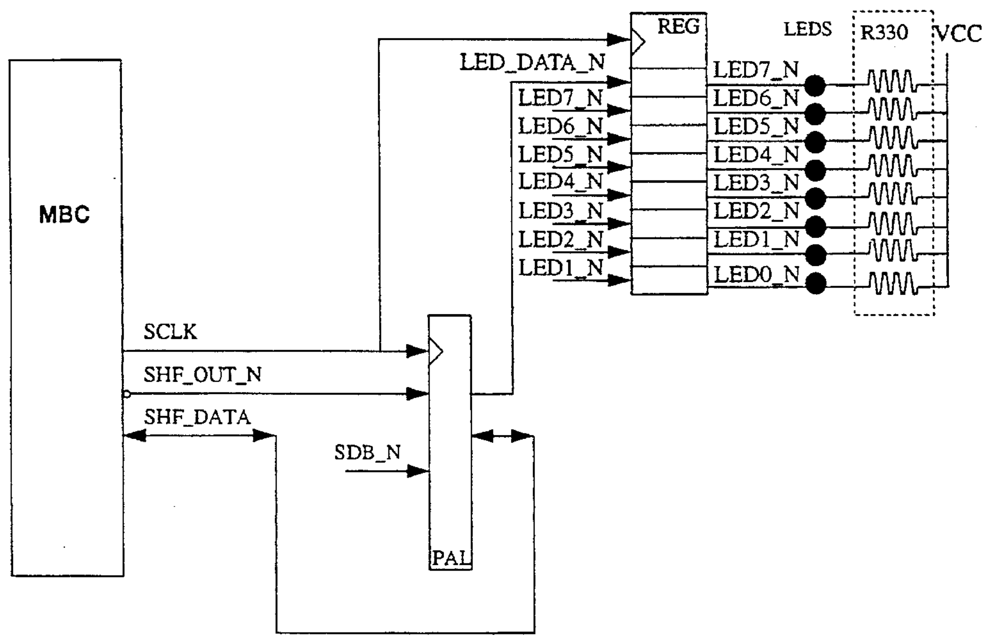

ZENITH DATA SYSTEMS
Phase Indicator REGISTER
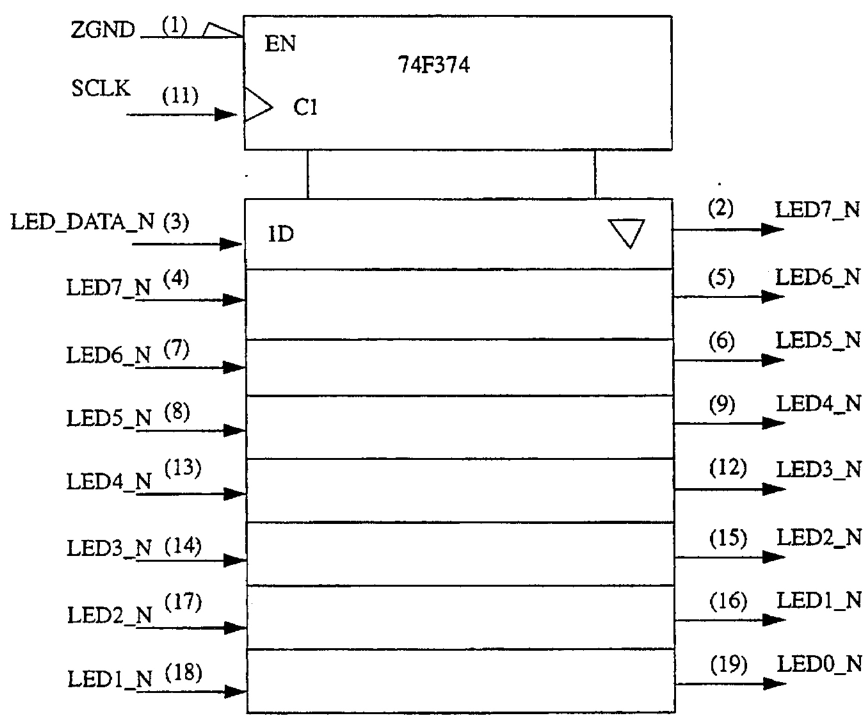

ZENITH DATA SYSTEMS

SLR/SIN bits

Table 1: SLR/SIN bit numbering

| BIT_CTR(2:0) = | BIT_CTR(4:3) = | | |
|---|---|---|---|
| | 00 | 01 | 10 |
| 7 | SLR_7 | SIN_07 | SIN_15 |
| 6 | SLR_6 | SIN_06 | SIN_14 |
| 5 | SLR_5 | SIN_05 | SIN_13 |
| 4 | SLR_4 | SIN_04 | SIN_12 |
| 3 | SLR_3 | SIN_03 | SIN_11 |
| 2 | SLR_2 | SIN_02 | SIN_10 |
| 1 | SLR_1 | SIN_01 | SIN_09 |
| 0 | SLR_0 | SIN_00 | SIN_08 |

ZENITH DATA SYSTEMS
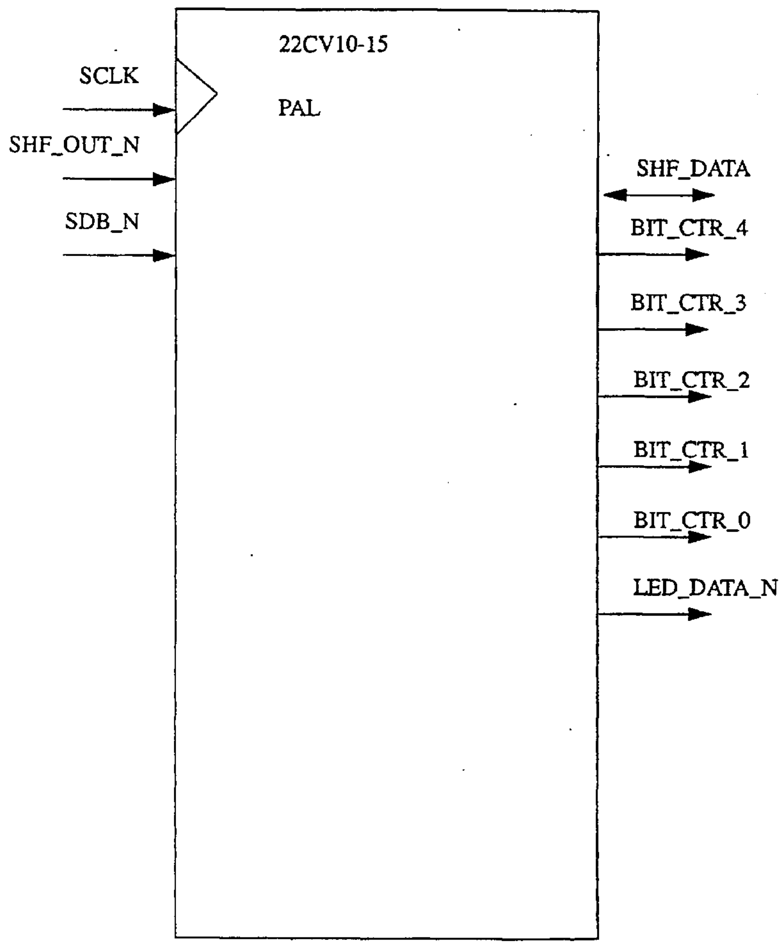

ZENITH DATA SYSTEMS
PAL
Serial bit counter
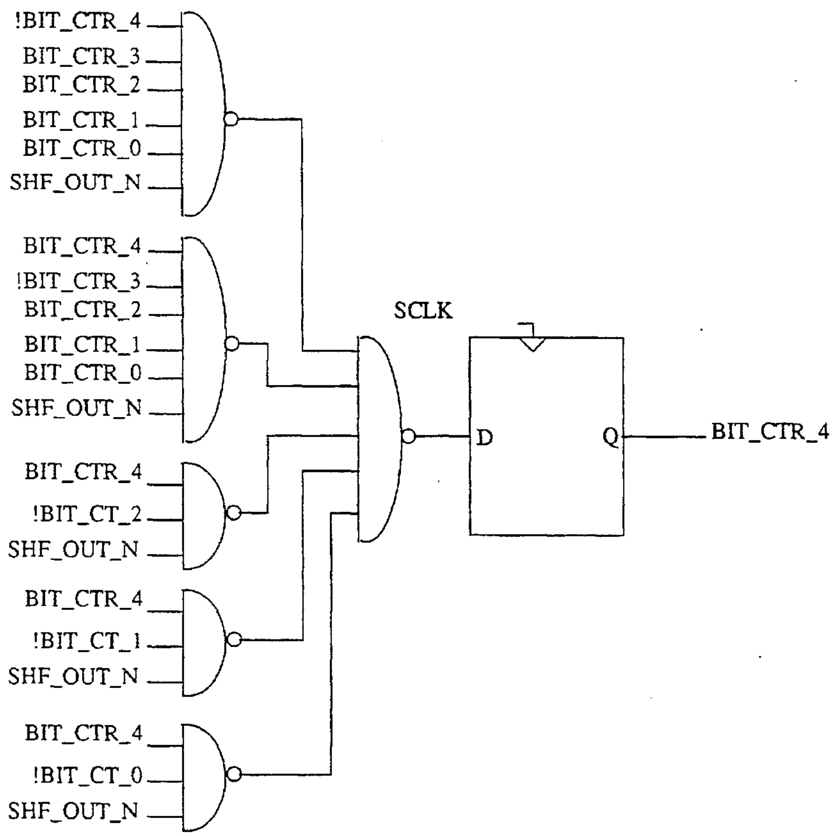

ZENITH DATA SYSTEMS
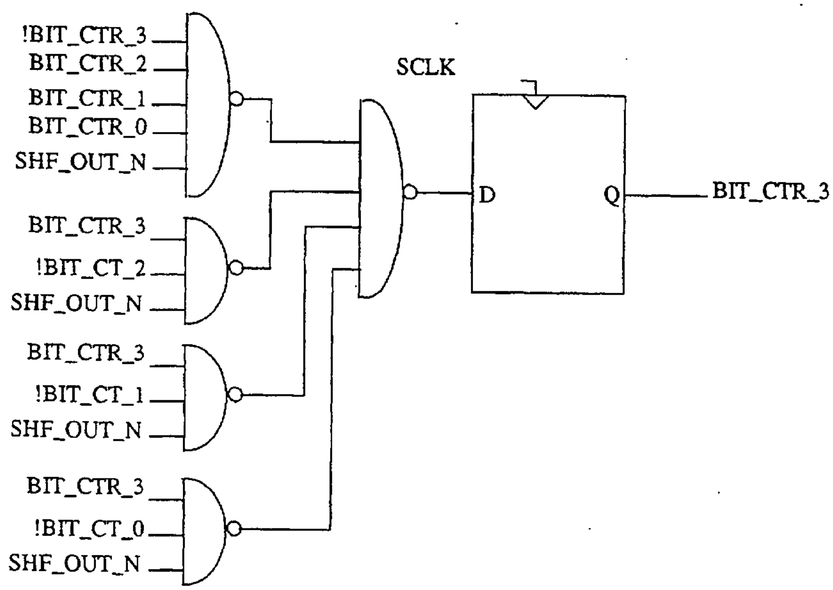

ZENITH DATA SYSTEMS
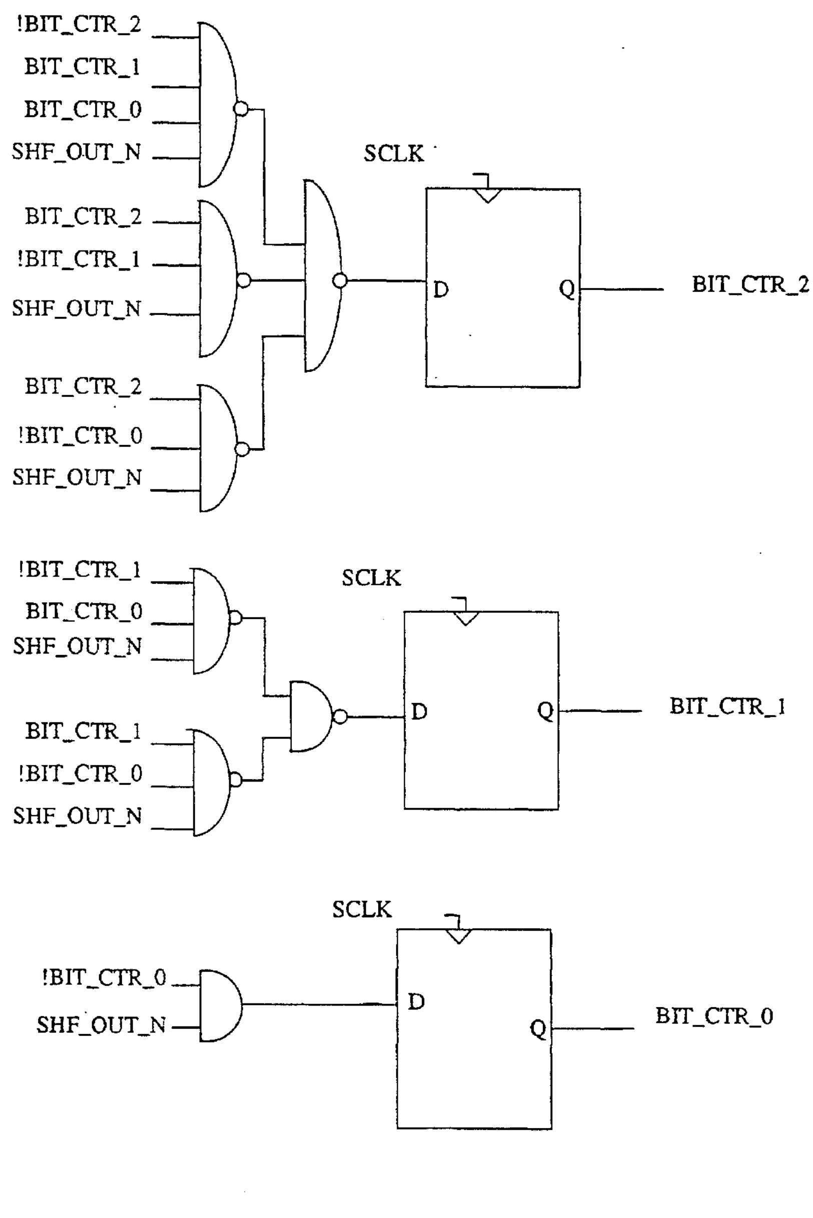

ZENITH DATA SYSTEMS
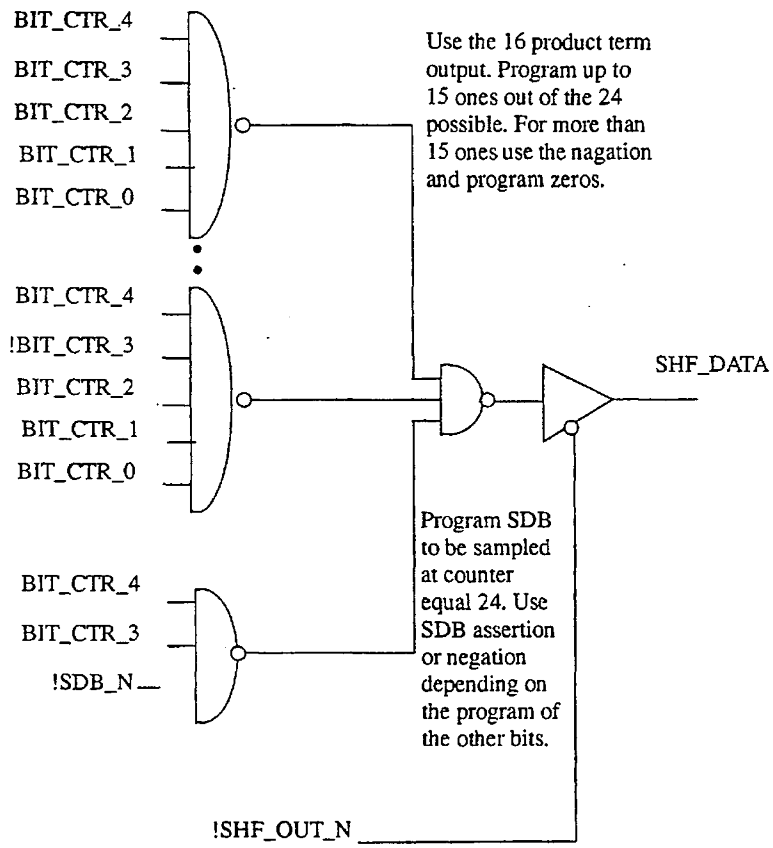

ZENITH DATA SYSTEMS
PAL
LED DATA
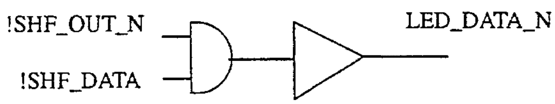

What is claimed is:

1. In a data processing system including a plurality of functional units connected from a system bus for requesting data reads from a memory and a plurality of memories for independently responding to data read requests for providing the data on the bus, a data transfer control means, comprising:

in at least one of said plurality of functional units, a request generation means for asserting a data read request on the system bus by placing a read command and an address of the data on the bus;

in at least one of said plurality of memories, a response means responsive to read requests on the system bus for responding to the read requests in the order in which the read requests are received by said at least one of said plurality of memories; said response means including;

a request queue for storing read requests in the order received by said at least one of said plurality of memories, a request tracking means responsive to read requests appearing on the system bus for tracking the occurrence of read requests received by said at least one of said plurality of memories relative to the occurrences of read requests accepted by others of the plurality of memories, a response tracking means responsive to in-order read request responses appearing on the system bus from others of the plurality of memories, a means responsive to the request tracking means and to the response tracking means for detecting the coincidence of an in-order read response appearing on the system bus immediately preceding a read request accepted by said at least one of said plurality of memories, and generating a coincidence signal directing said at least one of said plurality of memories to execute the next in-order read request stored in the request queue;

in said at least one of said plurality of functional units, a request tracking means responsive to read requests appearing on the system bus for tracking the occurrence of a read request of the functional means relative to the occurrences of read requests of others of the plurality of functional means, a response tracking means responsive to read request responses appearing on the system bus, a means responsive to the request tracking means and to the response tracking means for detecting the coincidence of a response corresponding to a read request of the functional unit, and generating, responsive to said coincidence response detecting means, a coincidence signal directing the functional unit to accept the data corresponding to the read request of the functional unit from the system bus.

* * * * *

UNITED STATES PATENT AND TRADEMARK OFFICE

CERTIFICATE OF CORRECTION

PATENT NO. : 5,522,069

DATED : May 28, 1996

INVENTOR(S) : Bertone et al.

It is certified that error appears in the above-indentified patent and that said Letters Patent is hereby corrected as shown below:

On the cover sheet of the patent at [73] Assignee: after "Buffalo Grove, Ill." insert --, Intel Corporation, Santa Clara, Cal.--.

Signed and Sealed this

Third Day of September, 1996

Attest:

BRUCE LEHMAN

*Attesting Officer*

*Commissioner of Patents and Trademarks*